United States Patent
Nomura

(10) Patent No.: US 7,025,512 B2
(45) Date of Patent: Apr. 11, 2006

(54) RETRACTING MECHANISM OF A RETRACTABLE LENS

(75) Inventor: Hiroshi Nomura, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/646,759

(22) Filed: Aug. 25, 2003

(65) Prior Publication Data

US 2004/0051981 A1 Mar. 18, 2004

(30) Foreign Application Priority Data

| Aug. 27, 2002 | (JP) | ................................. | 2002-247338 |
| Feb. 3, 2003 | (JP) | ................................. | 2003-025445 |
| Feb. 3, 2003 | (JP) | ................................. | 2003-025446 |

(51) Int. Cl.
*G03B 17/04* (2006.01)

(52) U.S. Cl. ........................ 396/349; 396/529; 359/703; 359/830

(58) Field of Classification Search ......... 396/348–350, 396/529, 533; 359/694, 699–704, 819, 829, 359/830

See application file for complete search history.

(56) References Cited

U.S. PATENT DOCUMENTS

| 4,451,129 A | 5/1984 | Ikari et al. |
| 4,525,050 A | 6/1985 | Ohashi |
| 4,643,554 A | 2/1987 | Ogawa |
| 4,643,555 A | 2/1987 | Wakabayashi |
| 4,721,972 A | 1/1988 | Wakabayashi |
| 4,768,048 A | 8/1988 | Wakabayashi |
| 4,771,303 A | 9/1988 | Matsumoto et al. |
| 4,792,822 A | 12/1988 | Akiyama et al. |
| 4,841,323 A | 6/1989 | Minoru et al. |

(Continued)

FOREIGN PATENT DOCUMENTS

| EP | 0634680 | 1/1995 |
| GB | 2261298 | 5/1993 |
| GB | 2262356 | 6/1993 |
| GB | 2309551 | 7/1997 |
| GB | 2344661 | 6/2000 |
| GB | 2344662 | 6/2000 |
| GB | 2394787 | 5/2004 |
| JP | 58-10708 | 1/1983 |
| JP | 58145930 | 8/1983 |
| JP | 58-162914 | 9/1983 |
| JP | 61-69002 | 4/1986 |

(Continued)

OTHER PUBLICATIONS

English Language Abstract of JP 58–10708.
English Language Abstract of JP 2003–207709.
English Language Abstract of JP 2002–277719.
English Language Abstract of JP 10–282394.
English Language Abstract of JP 58–162914.
English Language Abstract of JP6–308592.
English Language Abstract of JP 61–133933.

*Primary Examiner*—David M. Gray
(74) *Attorney, Agent, or Firm*—Greenblum & Bernstein, P.L.C.

(57) ABSTRACT

A retracting mechanism of a retractable lens includes an external barrel movable in an optical axis direction, an adjustment ring positioned in said external barrel and configured to be guided linearly in the optical axis direction without rotating, a stopper configured to set a rear movement limit of said adjustment ring with respect to said external barrel, a lens frame configured to hold a lens group, said lens frame configured to be screwed into said adjustment ring, a fixing ring fixed to said external barrel and configured to prevent said adjustment ring coming off said external barrel, and at least one spring positioned between said fixing ring and said adjustment ring and configured to bias said adjustment ring toward the rear movement limit of said adjustment ring with respect to said external barrel.

15 Claims, 144 Drawing Sheets

U.S. PATENT DOCUMENTS

| | | | |
|---|---|---|---|
| 4,887,107 A | | 12/1989 | Nakamura et al. |
| 4,974,949 A | * | 12/1990 | Tanaka ........................ 359/704 |
| 4,993,815 A | | 2/1991 | Yamazaki et al. |
| 5,086,312 A | | 2/1992 | Tanaka et al. |
| 5,136,324 A | | 8/1992 | Tsuboi et al. |
| 5,223,873 A | | 6/1993 | Tsuboi |
| 5,264,939 A | | 11/1993 | Chang |
| 5,430,516 A | | 7/1995 | Uziie et al. |
| 5,485,315 A | | 1/1996 | Nomura et al. |
| 5,499,143 A | | 3/1996 | Sakamoto et al. |
| 5,587,754 A | | 12/1996 | Katayama et al. |
| 5,715,482 A | | 2/1998 | Wakabayashi |
| 5,731,913 A | | 3/1998 | Imanari |
| 5,739,962 A | | 4/1998 | Asakura et al. |
| 5,765,049 A | | 6/1998 | Hase et al. |
| 5,818,647 A | | 10/1998 | Nishio et al. |
| 5,832,326 A | | 11/1998 | Tanaka |
| 6,031,998 A | | 2/2000 | Shono |
| 6,052,535 A | | 4/2000 | Uno |
| 6,055,116 A | | 4/2000 | Nomura et al. |
| 6,064,533 A | | 5/2000 | Kenin et al. |
| 6,069,745 A | | 5/2000 | Fujii et al. |
| 6,075,655 A | | 6/2000 | Funahashi |
| 6,115,190 A | | 9/2000 | Hirai |
| 6,185,375 B1 | | 2/2001 | Kazuo |
| 6,204,977 B1 | | 3/2001 | Iwasa |
| 6,324,019 B1 | | 11/2001 | Takanashi et al. |
| 6,366,223 B1 | | 4/2002 | Shono |
| 6,366,323 B1 | | 4/2002 | Shono |
| 2001/0019458 A1 | | 9/2001 | Nomura et al. |
| 2001/0024573 A1 | | 9/2001 | Nomura et al. |
| 2002/0135896 A1 | | 9/2002 | Nomura et al. |
| 2002/0135900 A1 | | 9/2002 | Nomura et al. |
| 2002/0135901 A1 | | 9/2002 | Nomura et al. |
| 2003/0081325 A1 | | 5/2003 | Nomura et al. |
| 2003/0081327 A1 | | 5/2003 | Nomura et al. |
| 2003/0081948 A1 | | 5/2003 | Nomura et al. |
| 2003/0156832 A1 | | 8/2003 | Nomura et al. |
| 2004/0042089 A1 | | 3/2004 | Nomura |
| 2004/0042090 A1 | | 3/2004 | Nomura |
| 2004/0042091 A1 | | 3/2004 | Nomura |
| 2004/0042092 A1 | | 3/2004 | Nomura |
| 2004/0042093 A1 | | 3/2004 | Nomura |
| 2004/0042095 A1 | | 3/2004 | Nomura |
| 2004/0042096 A1 | | 3/2004 | Nomura |
| 2004/0042775 A1 | | 3/2004 | Nomura |
| 2004/0042776 A1 | | 3/2004 | Nomura |
| 2004/0042777 A1 | | 3/2004 | Nomura |
| 2004/0042778 A1 | | 3/2004 | Nomura |
| 2004/0051967 A1 | | 3/2004 | Nomura |
| 2004/0051968 A1 | | 3/2004 | Nomura |
| 2004/0051969 A1 | | 3/2004 | Nomura |
| 2004/0051970 A1 | | 3/2004 | Nomura |
| 2004/0051971 A1 | | 3/2004 | Nomura |
| 2004/0051972 A1 | | 3/2004 | Nomura |
| 2004/0051981 A1 | | 3/2004 | Nomura |
| 2004/0062536 A1 | | 4/2004 | Nomura |
| 2004/0062537 A1 | | 4/2004 | Nomura |
| 2004/0141735 A1 | | 9/2004 | Nomura |

FOREIGN PATENT DOCUMENTS

| | | |
|---|---|---|
| JP | 61-133933 | 6/1986 |
| JP | 61270737 | 12/1986 |
| JP | 63149629 | 6/1988 |
| JP | 64-34623 | 3/1989 |
| JP | 5-313226 | 11/1993 |
| JP | 6-18777 | 1/1994 |
| JP | 6-308592 | 11/1994 |
| JP | 7-191249 | 7/1995 |
| JP | 7-199019 | 8/1995 |
| JP | 7-288724 | 10/1995 |
| JP | 7-295050 | 11/1995 |
| JP | 09-5849 | 1/1997 |
| JP | 10-32740 | 2/1998 |
| JP | 10-282394 | 10/1998 |
| JP | 11109203 | 4/1999 |
| JP | 2000-023002 | 1/2000 |
| JP | 2002-277719 | 9/2002 |
| JP | 2003-114473 | 4/2003 |
| JP | 2003-207709 | 7/2003 |
| JP | 2004-257555 | 9/2004 |

* cited by examiner

Fig. 14
Fig. 15
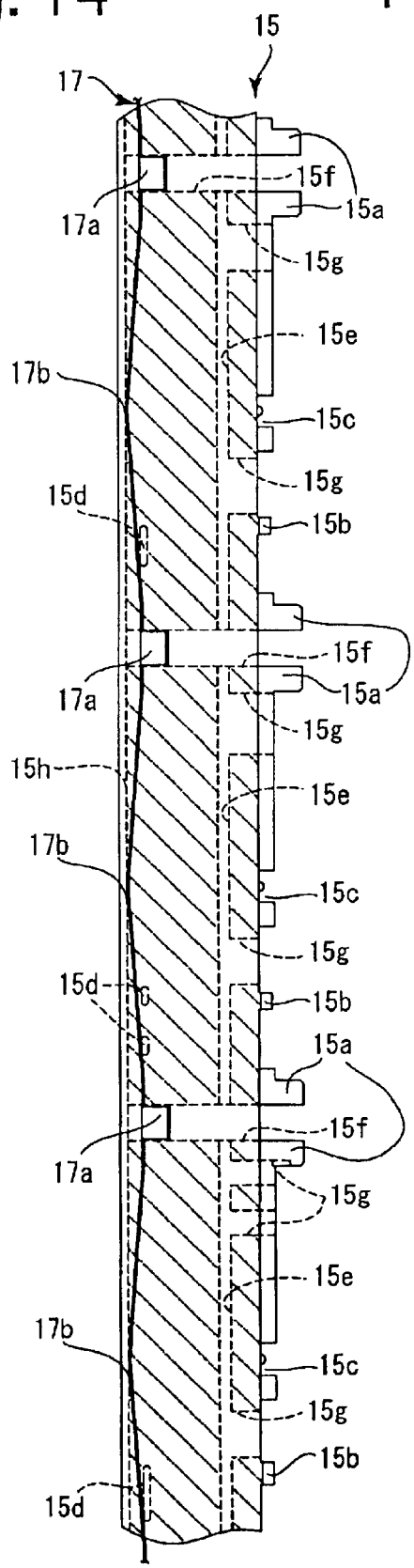
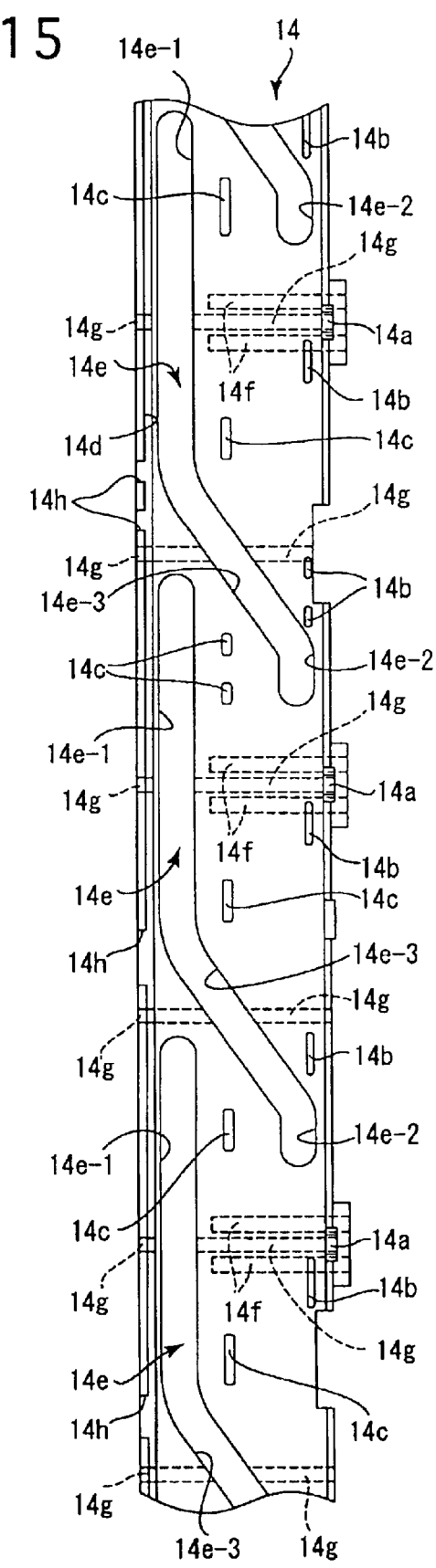

Fig. 44
Fig. 45
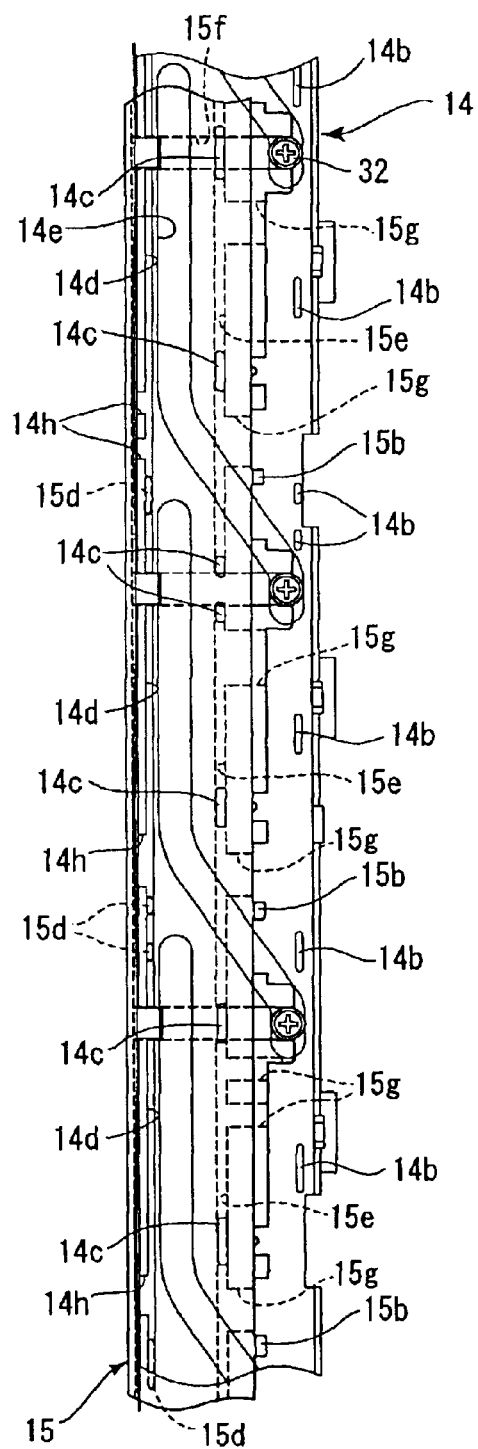
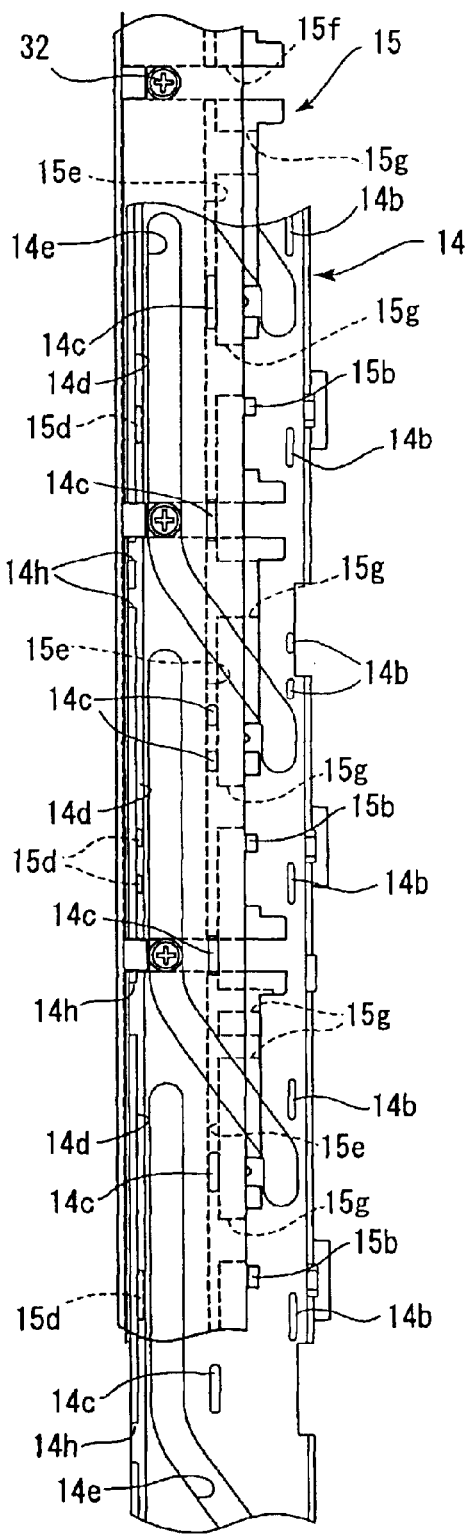

Fig. 144
Fig. 145
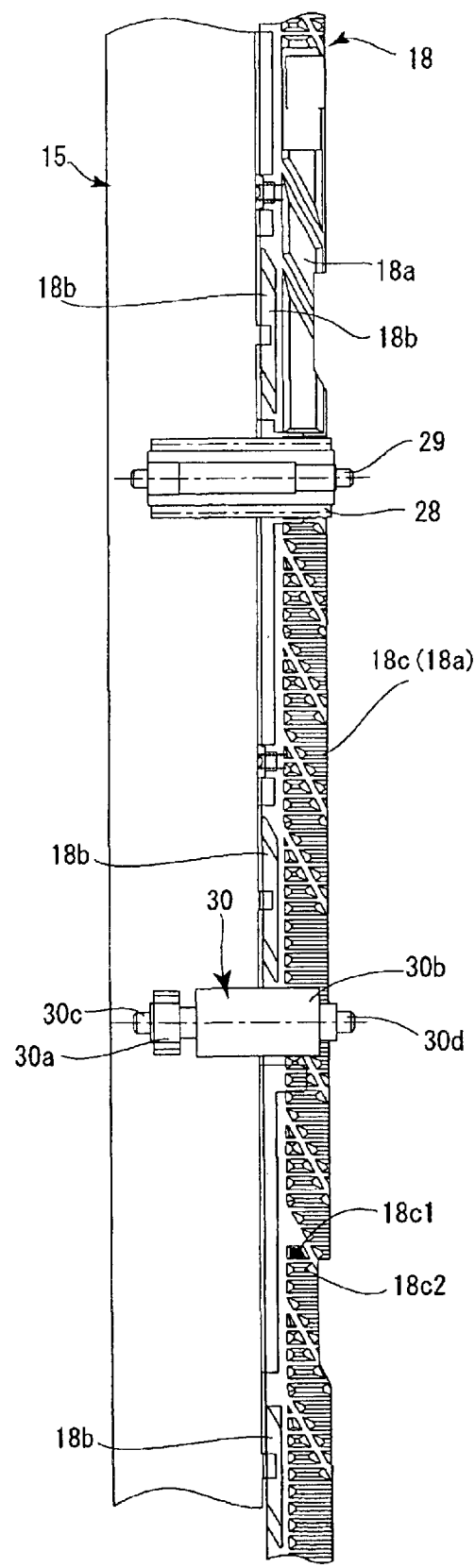
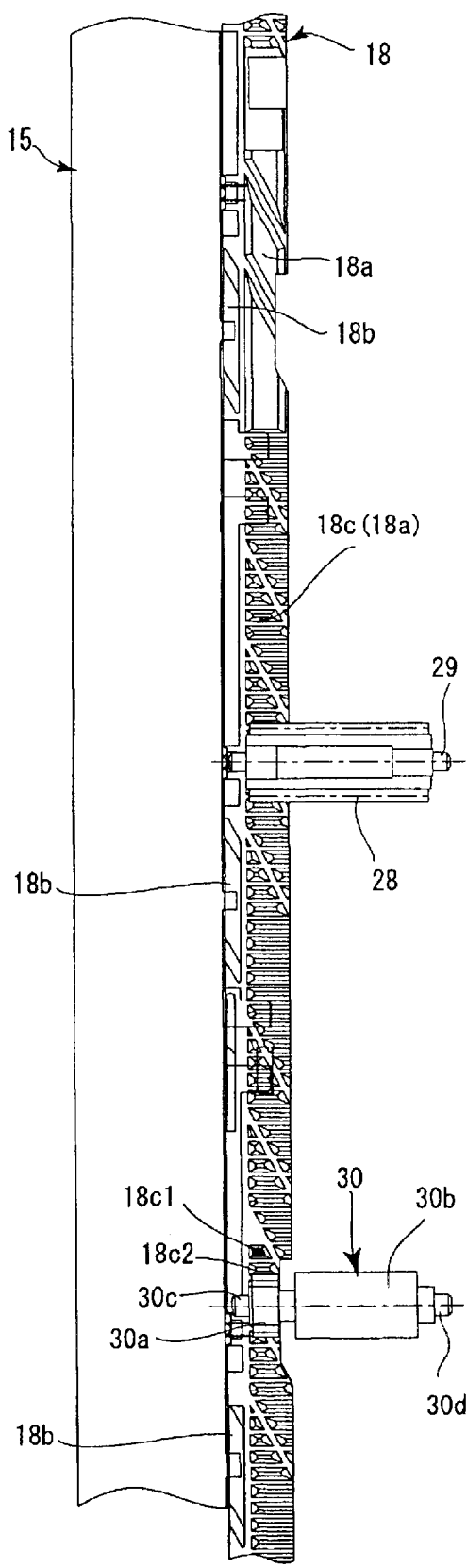

RETRACTING MECHANISM OF A RETRACTABLE LENS

BACKGROUND OF THE INVENTION

1. Field of the Invention

The present invention relates to a retractable lens (retractable lens barrel) which is retracted to reduce the length thereof when not in use, e.g., a retractable photographing (imaging) lens which is retracted into a camera body upon power being turned OFF.

2. Description of the Related Art

In a conventional zoom lens disclosed in Japanese Unexamined Patent Publications Nos. 10-161001 and 11-231201, if a lens group (position-adjustable lens group), an axial position of which is to be adjustable relative to a lens barrel, a lens frame which holds the position-adjustable lens group is screwed into an external barrel, the axial position of the position-adjustable lens group can be adjusted by rotating the lens frame relative to the external barrel.

However, according to this structure, since sufficient space allowing the position-adjustable lens group (the lens frame) to move forward and rearward for adjustment relative to the external barrel must be secured, such a space makes it difficult to reduce the length of the zoom lens to a minimum when the zoom lens is fully retracted.

SUMMARY OF THE INVENTION

The present invention provides a retracting mechanism of a retractable lens (retractable lens barrel) which has a structure making it possible to reduce the length of the retractable lens in its fully retracted state to a minimum while securing the space for adjustment of the position-adjustable lens group in an operating state of the retractable lens.

According to an aspect of the present invention, a retracting mechanism of a retractable lens is provided, including an external barrel movable in an optical axis direction, an adjustment ring positioned in the external barrel and configured to be guided linearly in the optical axis direction without rotating, a stopper configured to set a rear movement limit of the adjustment ring with respect to the external barrel, a lens frame configured to hold a lens group, the lens frame configured to be screwed into the adjustment ring, a fixing ring fixed to the external barrel and configured to prevent the adjustment ring coming off the external barrel, and at least one spring positioned between the fixing ring and the adjustment ring and configured to bias the adjustment ring toward the rear movement limit of the adjustment ring with respect to the external barrel.

It is desirable for the adjustment ring to be positioned in front of the rear movement limit of the adjustment ring, with respect to the external barrel, when the retractable lens is in a retracted state.

The retracting mechanism can further include a movement limiter configured to come into contact with at least one of the fixing ring and the lens frame and prevent the fixing ring and the lens frame from further moving rearward, such that the fixing ring and the lens frame move forward relative to the external barrel when the external barrel moves rearward during a retracting operation of the retractable lens.

The lens frame can include a rearward protrusion which projects rearward so that a rear end of the rearward protrusion is positioned behind a rearmost point on a rear surface of the lens group in the optical axis direction, the rear end of the rearward protrusion configured to come into contact with the movement limiter when the external barrel moves rearward during the retracting operation of the retractable lens.

The movement limiter can include a shutter unit.

The adjustment ring can include at least one guide projection, and the external barrel can include at least one guide groove into which the guide projection of the adjustment ring is configured to be engaged and guide the guide projection linearly in the optical axis direction.

The spring can be at least one compression coil spring, wherein one end of the compression coil spring is in contact with the guide projection, and the other end of the compression coil spring is in contact with at least one spring receiving portion on the fixing ring in front of the guide projection.

The stopper can include at least one engaging projection on the adjustment ring, the engaging projection configured to be positioned in front of the fixing ring and come into contact with a front end surface of the fixing ring.

The engaging projection can be a plurality of engaging projections on an outer peripheral surface of the adjustment ring at different circumferential positions proximate a front end of the adjustment ring.

The fixing ring can include a plurality of recesses configured to allow the plurality of engaging projections to be engaged in the plurality of recesses in the optical axis direction, respectively, when the fixing ring is positioned in a predetermined rotational position relative to the adjustment ring. Relative movement between the fixing ring and the adjustment ring causes rear end surfaces of the plurality of engaging projections and front end surfaces of the fixing ring to come into pressing into contact with each other by a spring force of the spring after the plurality of engaging projections are engaged in the plurality of recesses, respectively.

It is desirable for the plurality of recesses to be at regular intervals in a circumferential direction of the adjustment ring, and for the plurality engaging projections to be at regular intervals in a circumferential direction of the adjustment ring.

The retracting mechanism can further include a retractable lens group positioned along the optical axis on which the lens group is positioned, in an operating state of the retractable lens. At least the lens group and the retractable lens group are independently movable along the optical axis direction. The retractable lens group can be configured to retract to a position outside the optical axis.

The retracting mechanism can further include a rear lens group positioned behind the retractable lens group in the operating state of the retractable lens, wherein the lens group, the retractable lens group and the rear lens group are positioned along the optical axis in the operating state of the retractable lens. It is desirable for the retractable lens group to be configured to retract to the position outside the optical axis while the retractable lens retracts toward a rear of the optical axis direction, to a position radially outside of the rear lens group, when the retractable lens moves from the operating state to a retracted state.

It is desirable for the lens group and the retractable lens group to be configured to move along the optical axis while changing space therebetween to perform a focal-length varying operation in the operating state of the retractable lens, and for the rear lens group to be configured to move along the optical axis to perform a focusing operation in the operating state of the retractable lens.

In another embodiment a retracting mechanism of a retractable lens is provided, including an external barrel movable in an optical axis direction, an adjustment ring positioned in the external barrel and configured to be guided linearly in the optical axis direction without rotating, a lens frame configured to hold a lens group, the lens frame configured to be screwed into the adjustment ring, a fixing ring fixed to the external barrel and configured to prevent the adjustment ring and coming off the external barrel, at least one spring positioned between the fixing ring and the adjustment ring and configured to bias the adjustment ring rearward with respect to the external barrel, and at least one engaging projection on the adjustment ring, the at least one engaging projection configured to engage the fixing ring, and further configured to set a rear movement limit of the adjustment ring with respect to the external barrel, against a biasing force of the at least one spring.

The present disclosure relates to subject matter contained in Japanese Patent Application Nos.2002-247338 (filed on Aug. 27, 2002), 2003-25445 (filed on Feb. 3, 2003) and 2003-25446 (filed on Feb. 3, 2003) which are expressly incorporated herein by reference in their entireties.

BRIEF DESCRIPTION OF THE DRAWINGS

The present invention will be described below in detail with reference to the accompanying drawings in which:

FIG. 14 is a developed view of the third external barrel shown in FIG. 1;

FIG. 15 is a developed view of a first linear guide ring shown in FIG. 1;

FIG. 44 is a developed view of the third external barrel and the first linear guide ring in relation to a set of roller followers fixed to the cam ring, showing the positional relationship between the helicoid ring and the stationary barrel in the retracted state of the zoom lens;

FIG. 45 is a view similar to that of FIG. 44, showing the positional relationship between the helicoid ring and the stationary barrel at the wide-angle extremity of the zoom lens;

FIG. 119 is a view similar to that of FIG. 118, showing a positional relationship between the second lens frame and the position-control cam bar of the CCD holder;

FIG. 120 is a view similar to that of 118, showing the positional relationship between the second lens frame and the position-control cam bar of the CCD holder when the second lens frame is held in the radially retracted position as shown in FIG. 112;

FIG. 121 is a perspective view of an AF lens frame and the CCD holder shown in FIGS. 1 and 4, showing a state where the AF lens frame is fully retracted to contact with and the CCD holder, viewed obliquely from lower front of the CCD holder;

FIG. 122 is a front elevational view of the CCD holder, the AF lens frame and the second lens group moving frame;

FIG. 123 is a perspective view of the CCD holder, the AF lens frame, the second lens group moving frame, the second lens frame and other elements;

FIG. 124 is a view similar to that of FIG. 123, showing a state where the second lens frame has fully moved rearward and fully rotated to the radially retracted position;

FIG. 125 is an axial cross sectional view of a portion of the upper half of the zoom lens shown in FIG. 9, showing a structure wiring a flexible PWB for exposure control in the zoom lens;

FIG. 126 is a perspective view of the second lens frame, the flexible PWB and other elements, showing a manner of supporting the flexible PWB by the second lens frame;

FIG. 127 is a perspective view of the second lens frame and the AF lens frame, showing a state where the second lens frame has retracted closely to the AF lens frame;

FIG. 128 is a side elevational view of the second lens frame and the AF lens frame, showing a state immediately before the second lens frame comes into contact with the AF lens frame;

FIG. 129 is a view similar to that of FIG. 128, showing a state where the second lens frame is in contact with the AF lens frame;

FIG. 130 is a front elevational view of the second lens frame and the AF lens frame, showing a positional relationship therebetween;

Figure 9:
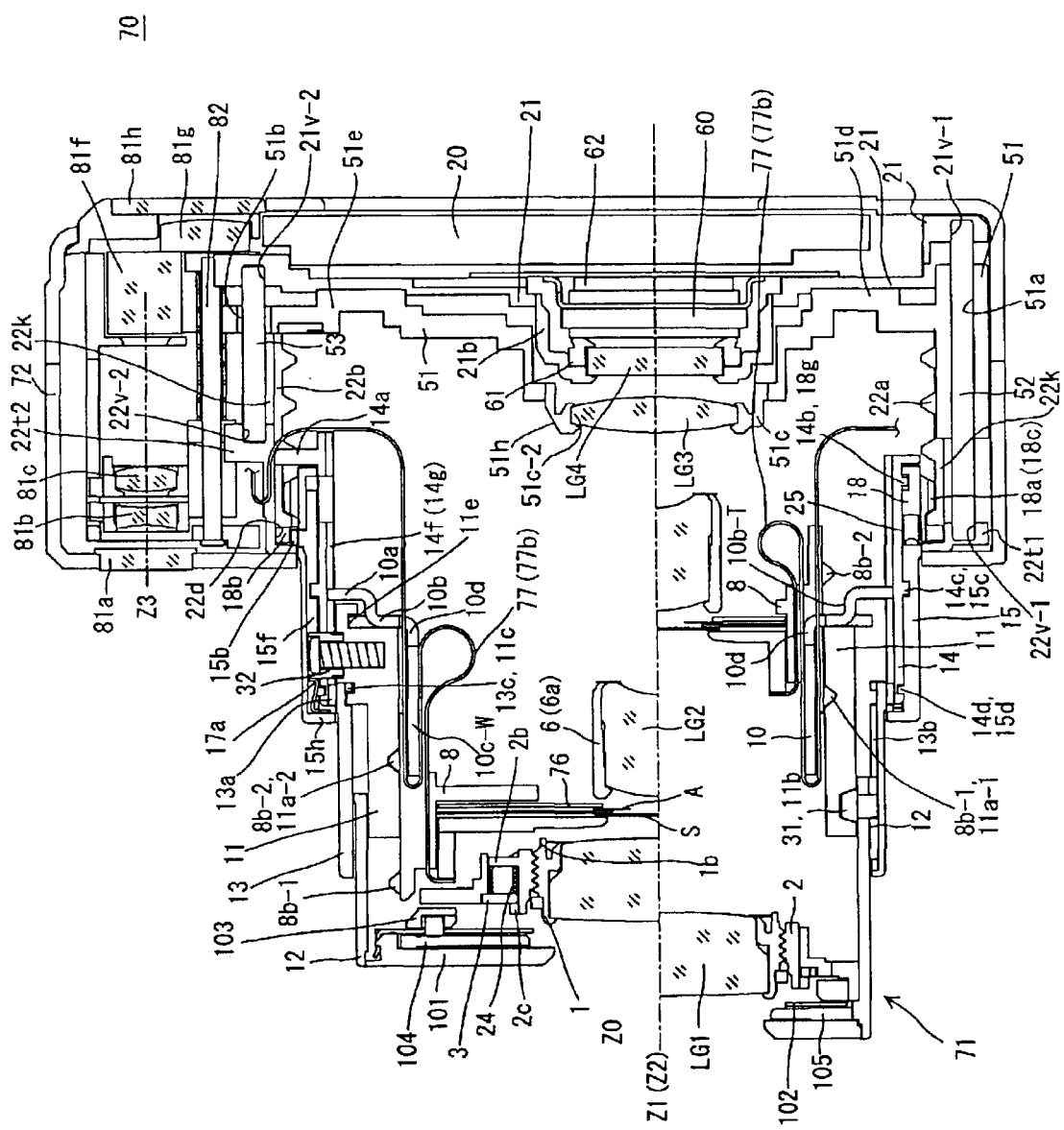
FIG. 9 is an axial cross sectional view of an embodiment of a digital camera incorporating the zoom lens assembly shown in FIGS. 6 through 8, wherein an upper half above a photographing optical axis and a lower half below the photographing optical axis show a state of the zoom lens at telephoto extremity and a state of the zoom lens at wide-angle extremity, respectively.
Figure 10:
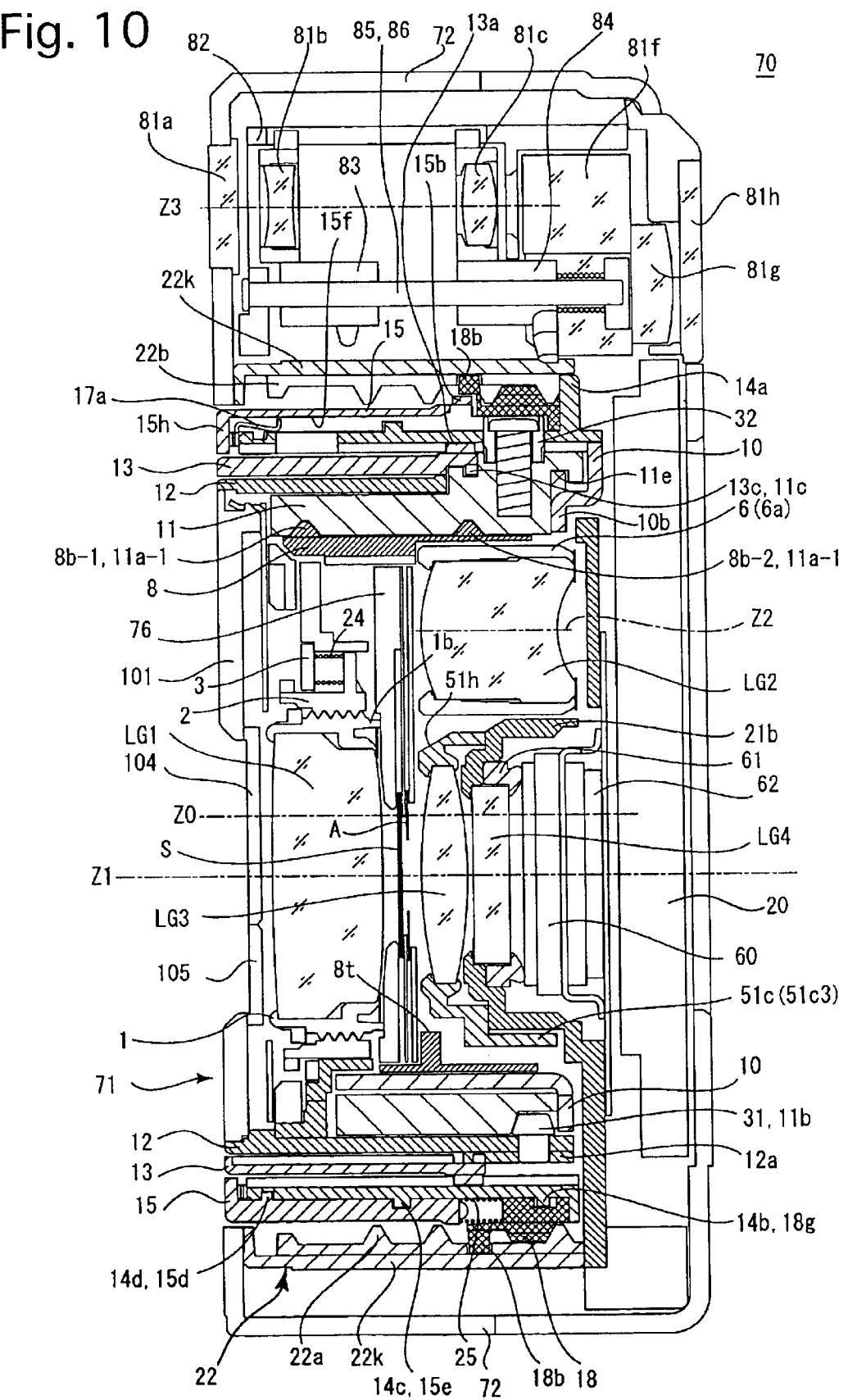
FIG. 10 is an axial cross sectional view of the digital camera shown in FIG. 9 in the retracted state of the zoom lens.
Figure 11:
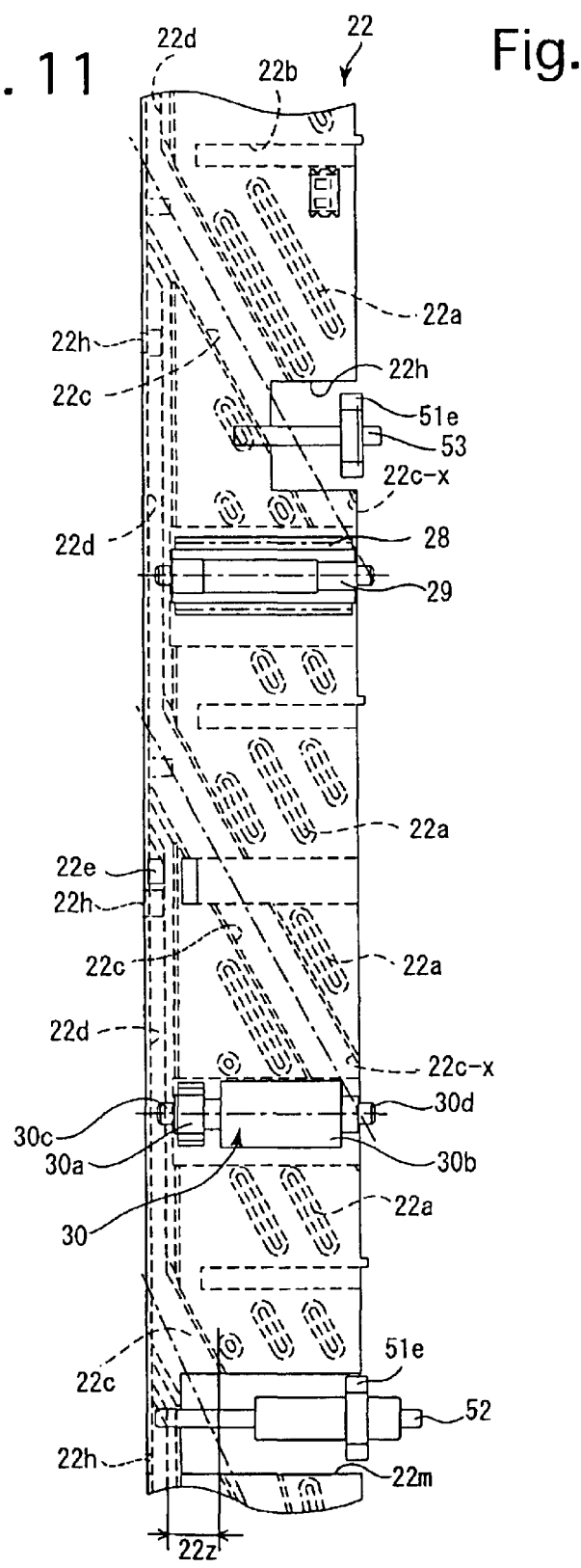
FIG. 11 is a developed view of the stationary barrel shown in FIG. 1.
Figure 23:
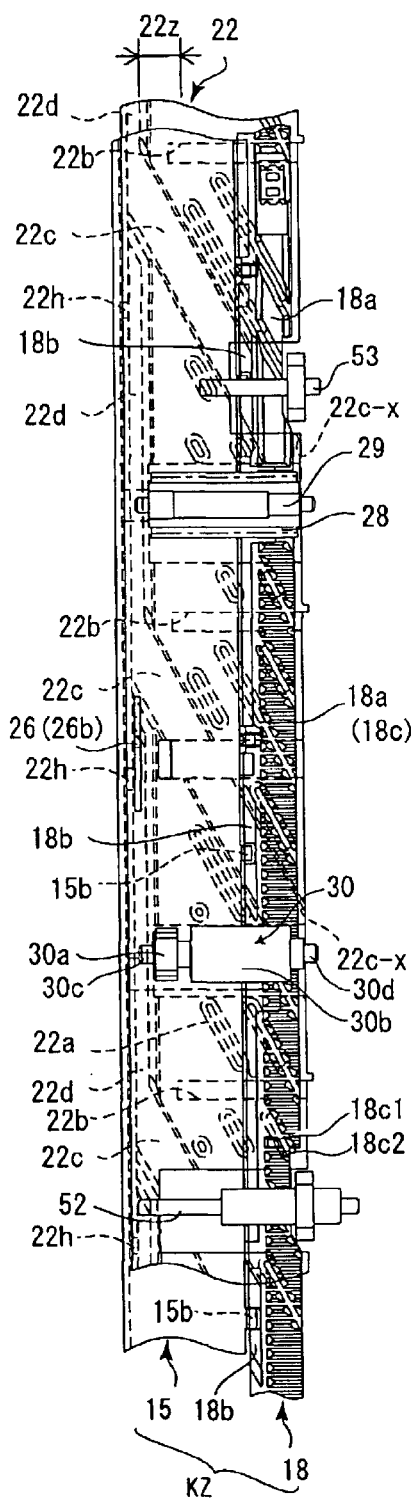
FIG. 23 is a developed view of the helicoid ring, the third external barrel and the stationary barrel, showing the positional relationship thereamong in the retracted state of the zoom lens.
Figure 24:
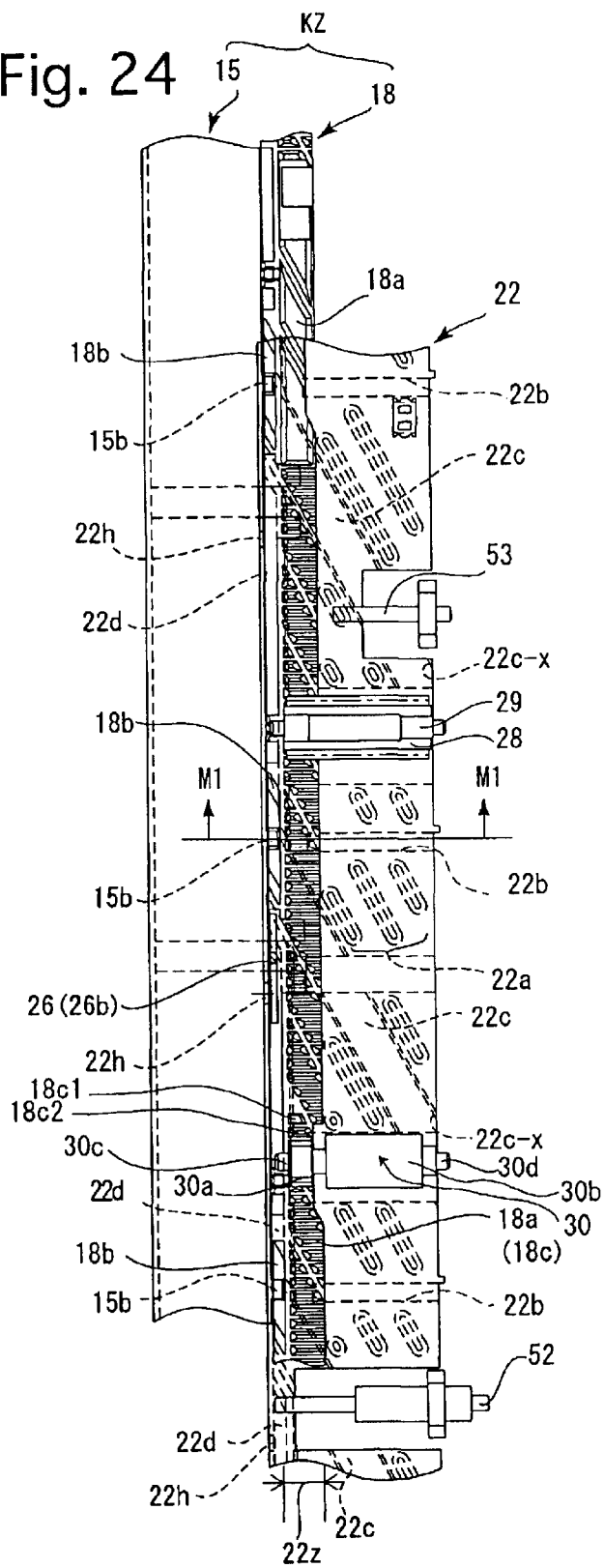
FIG. 24 is a developed view of the helicoid ring, the third external barrel and the stationary barrel, showing the positional relationship thereamong at the wide-angle extremity the zoom lens.
Figure 131:
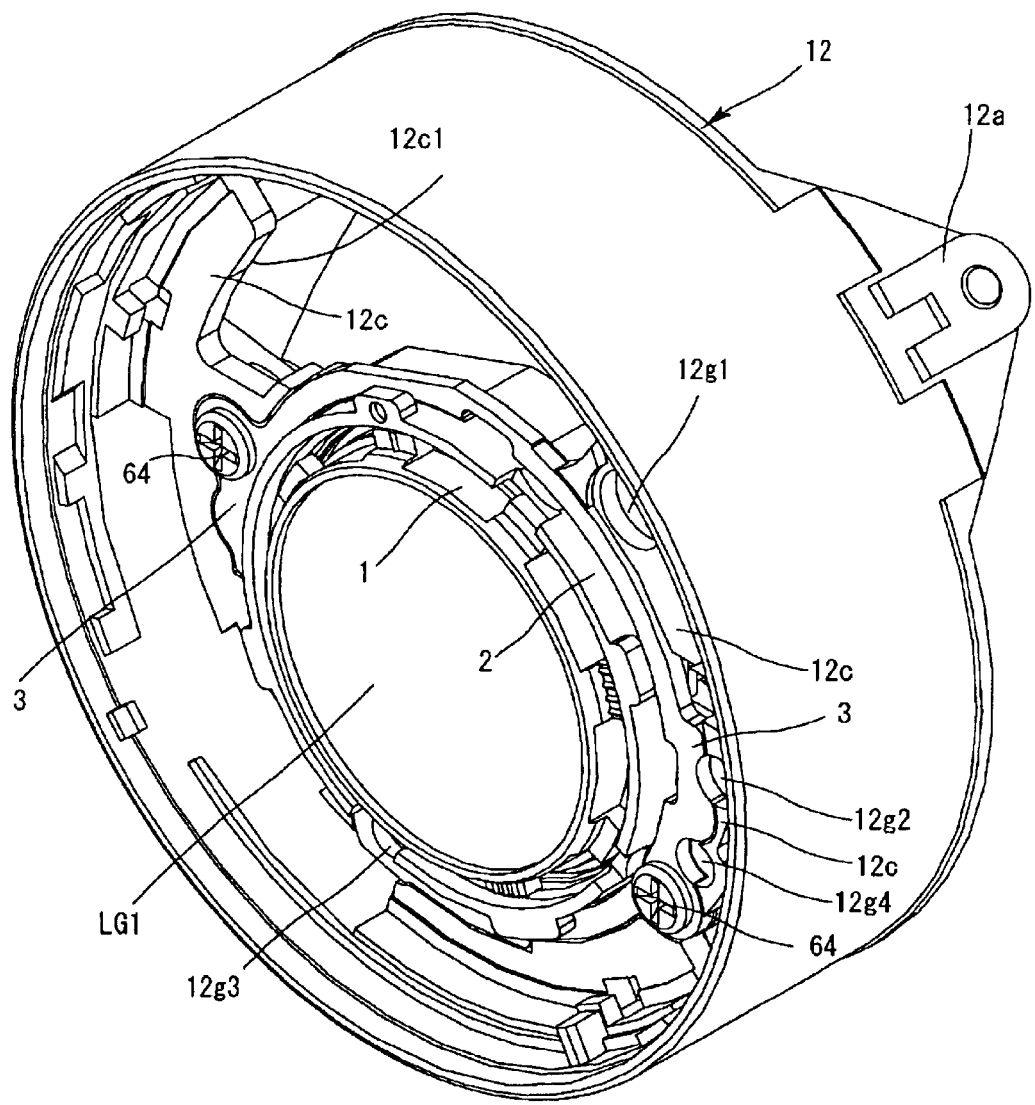
Figure 132:
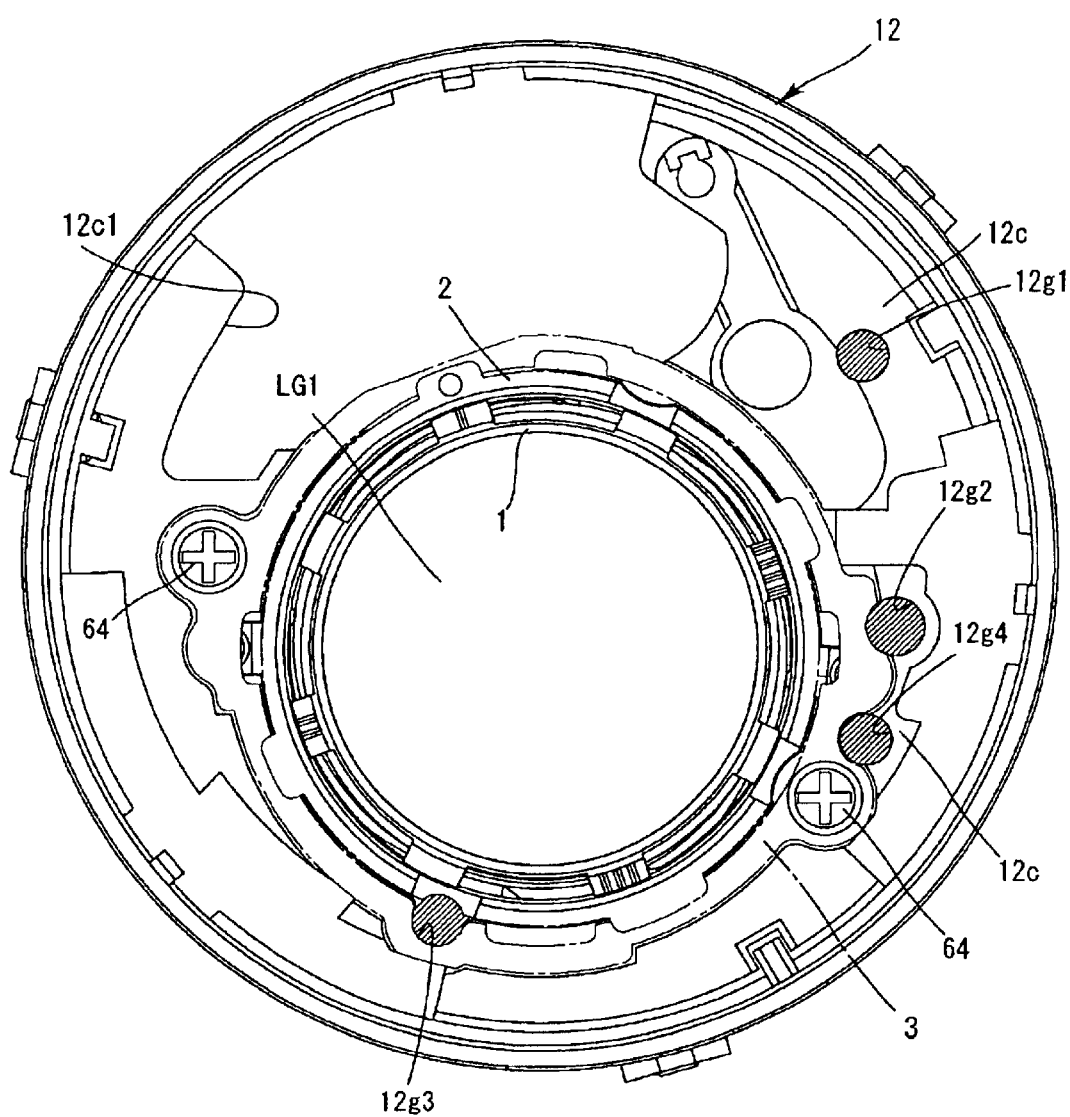
Figure 133:
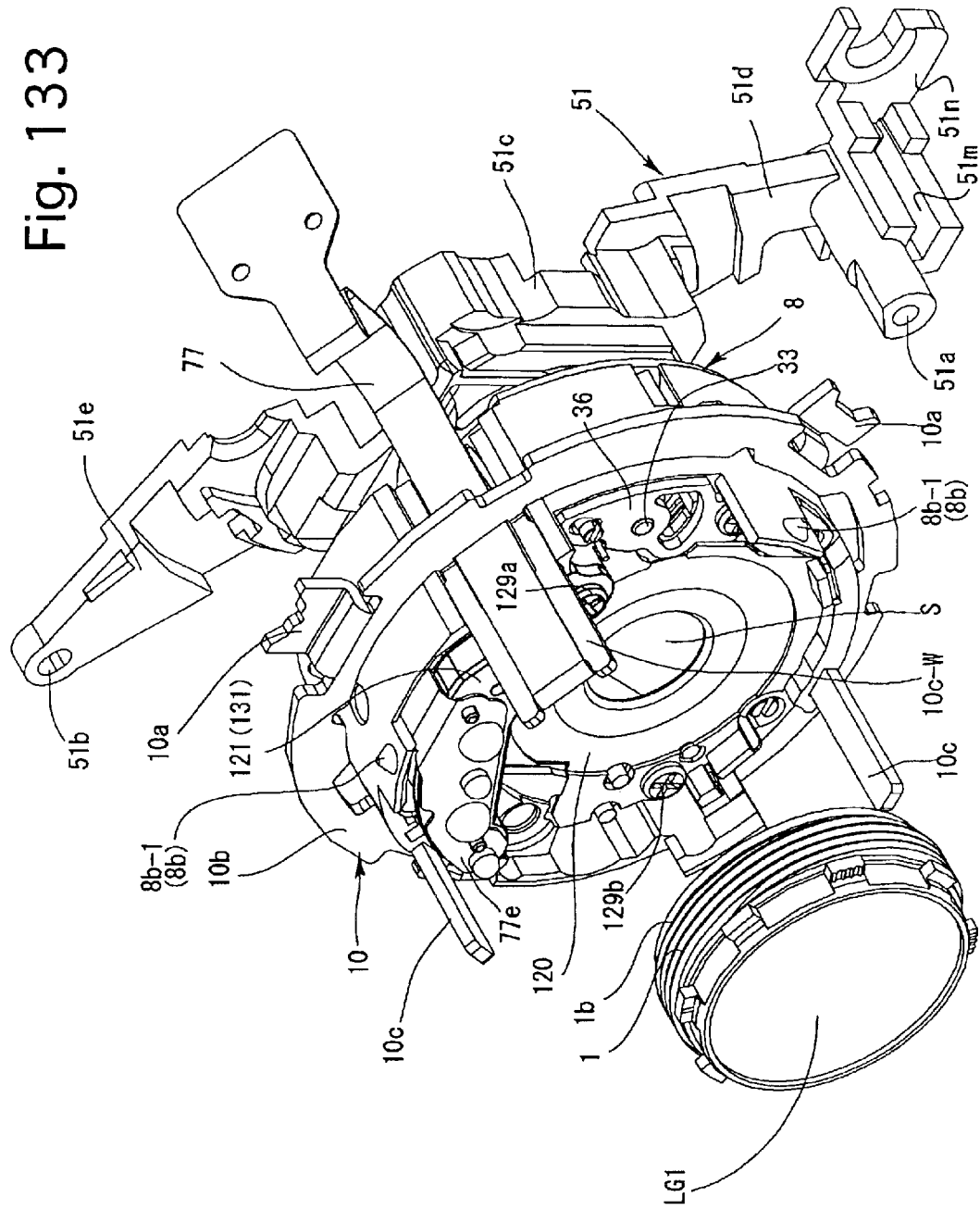
Figure 134:
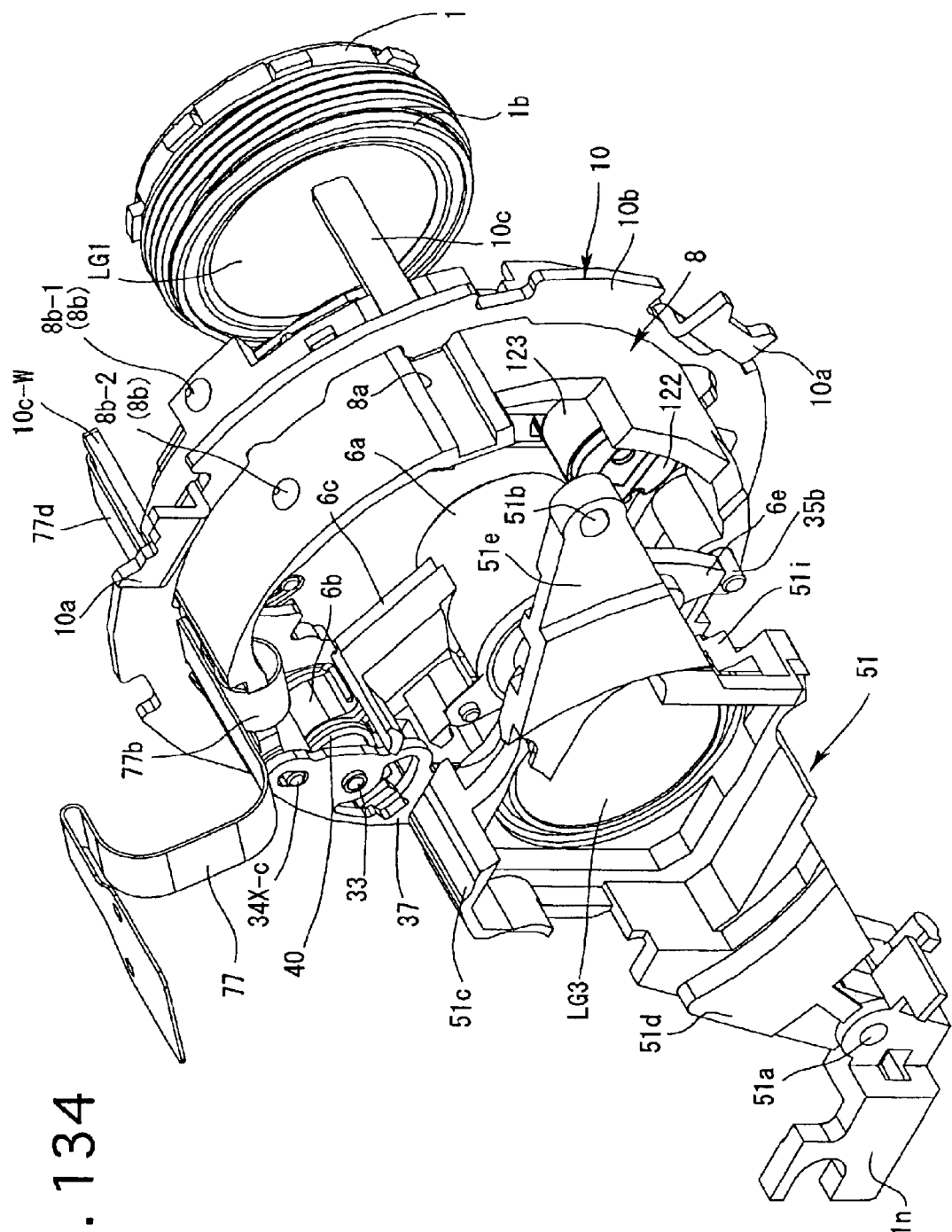
Figure 135:
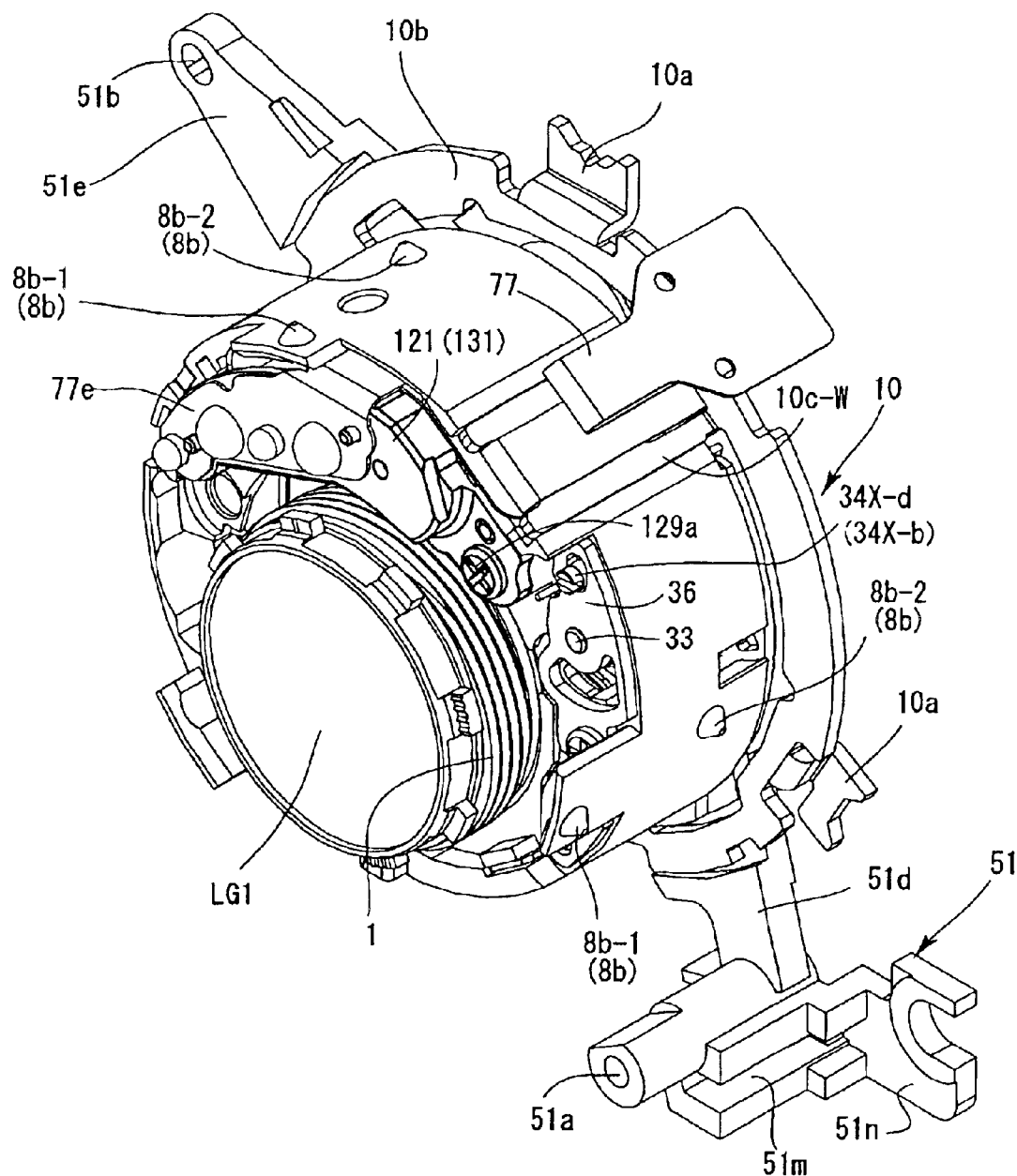
Figure 136:
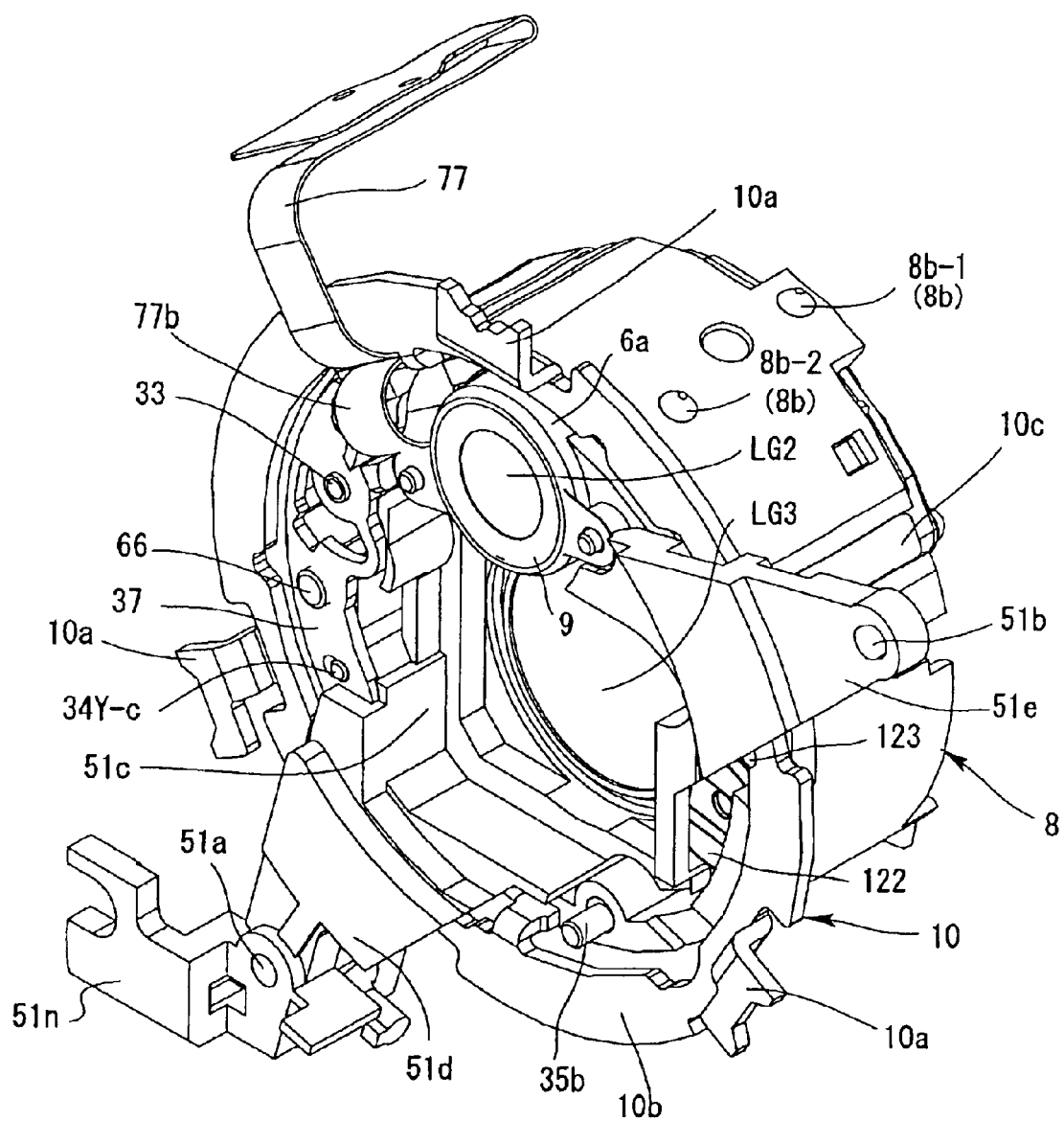
Figure 137:
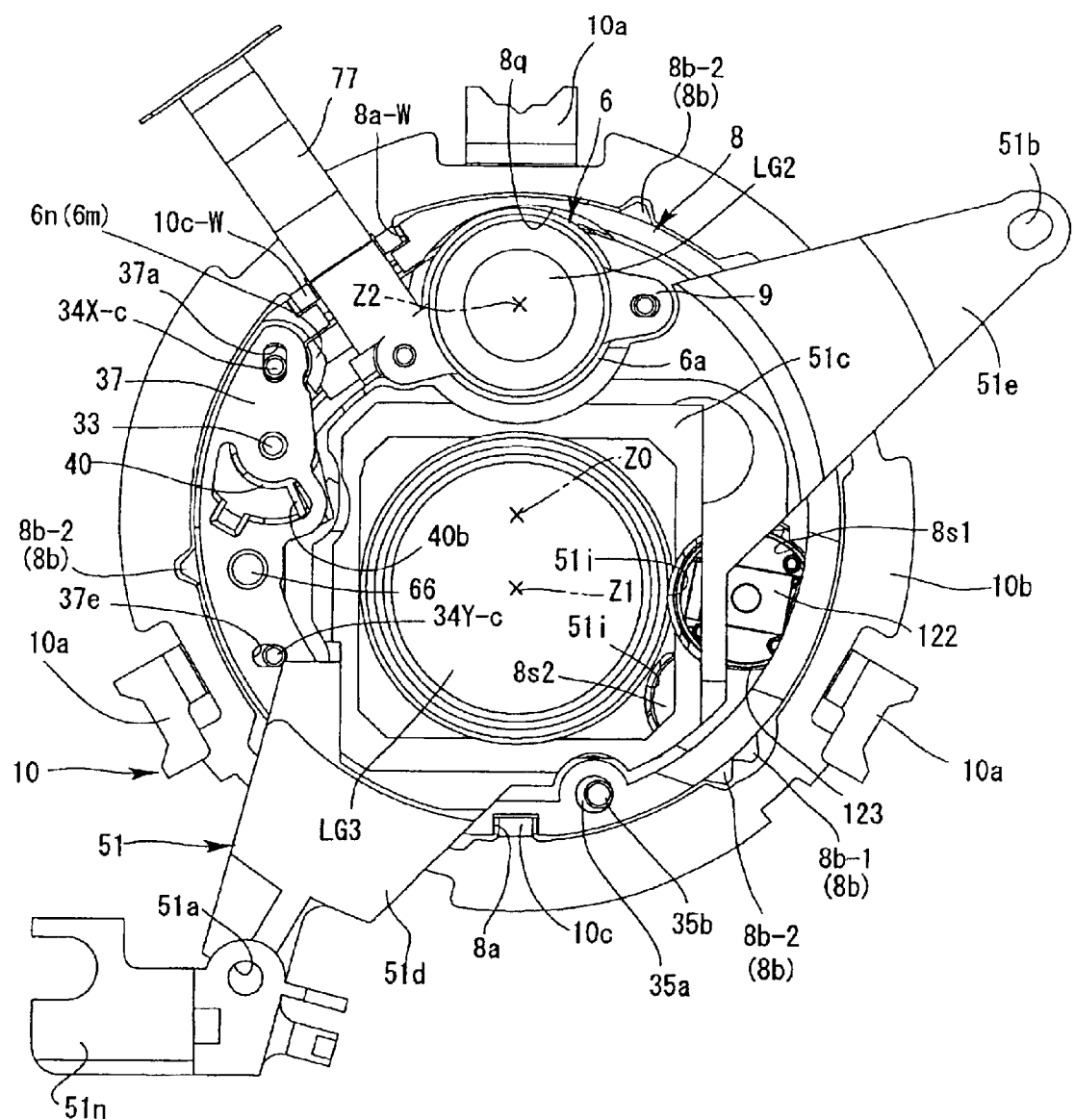
Figure 138:
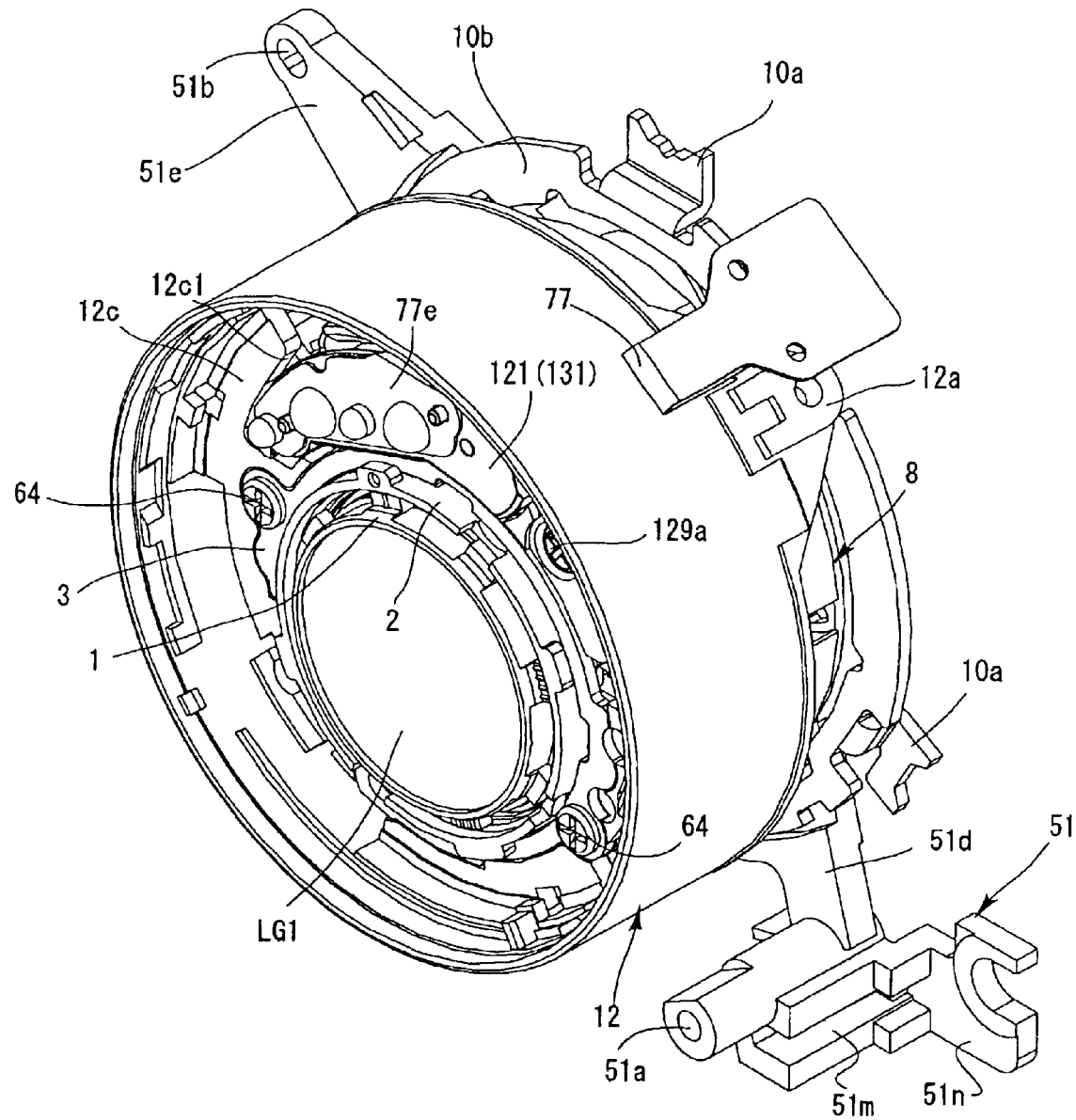
Figure 139:
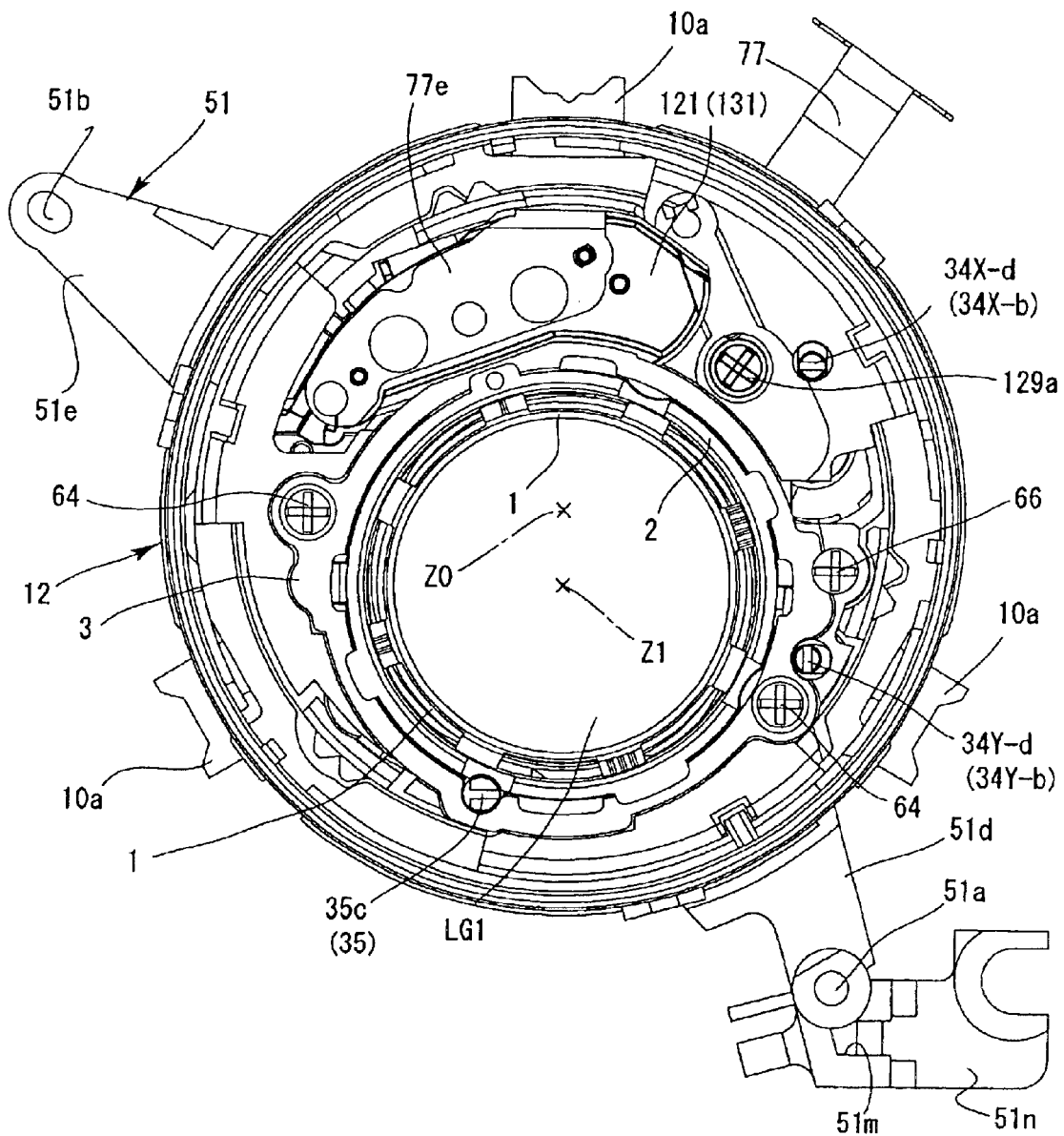
Figure 140:
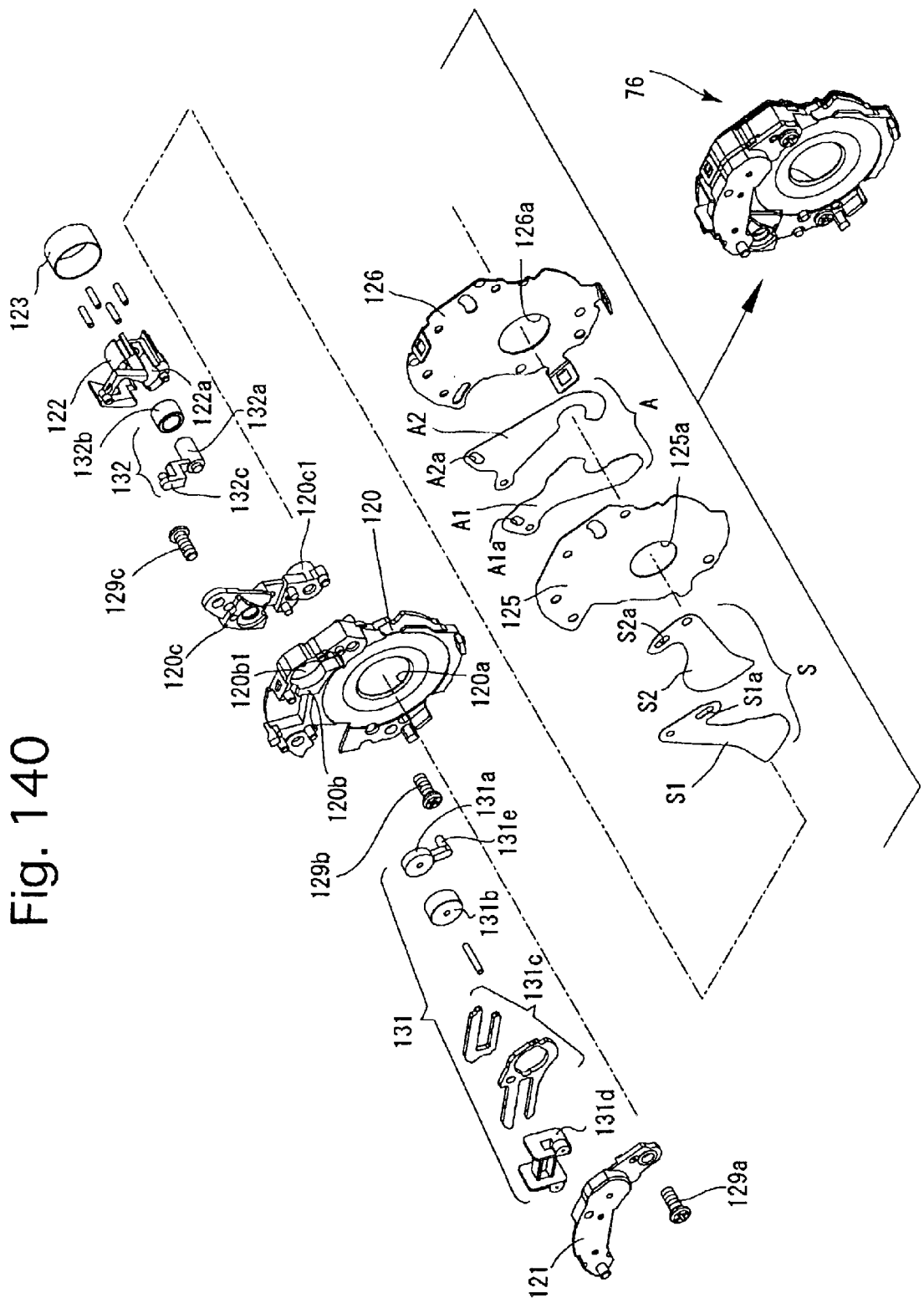
Figure 142:
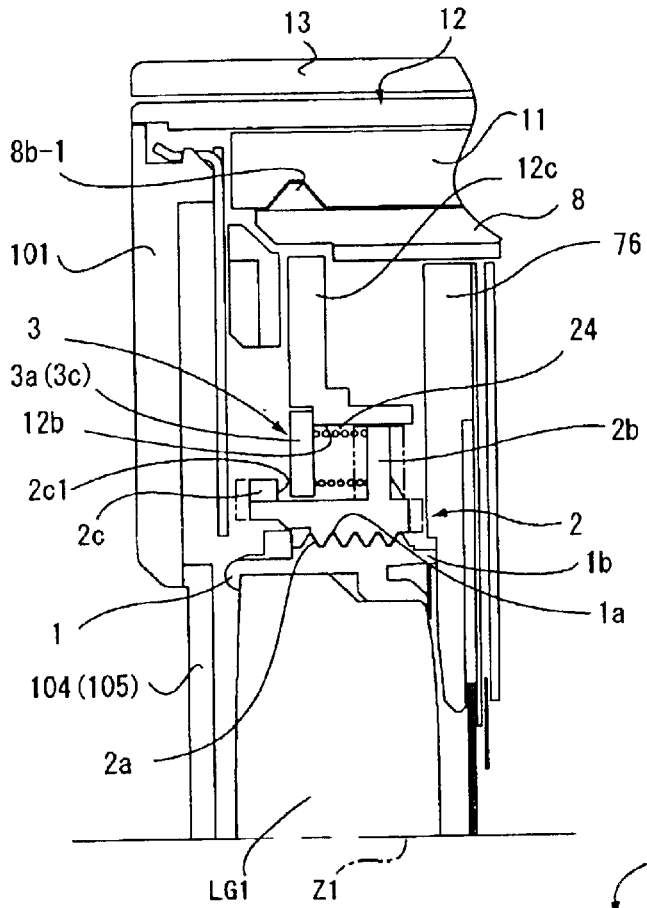
Figure 141:
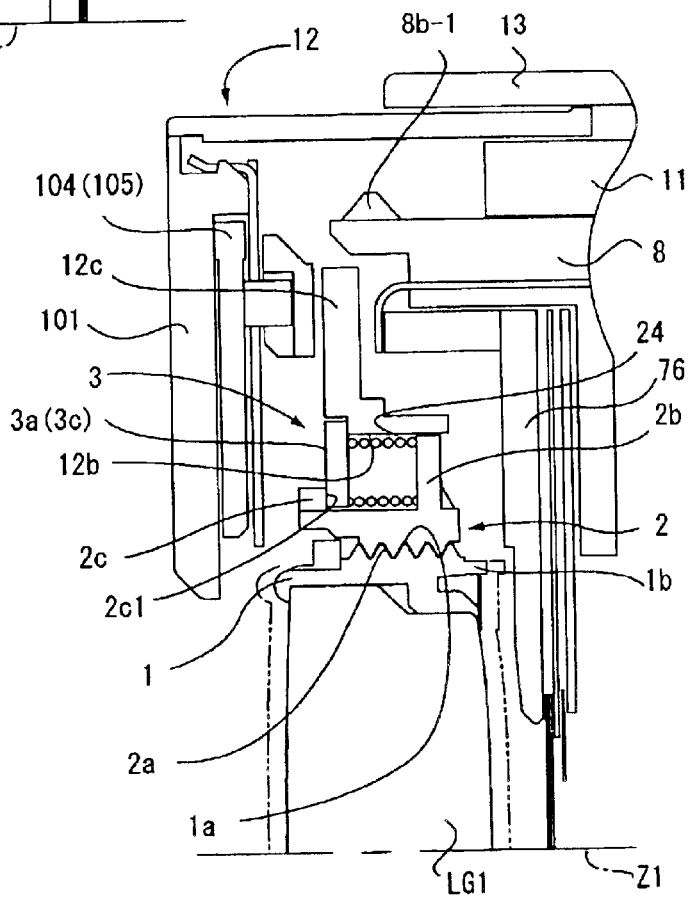
Figure 143:
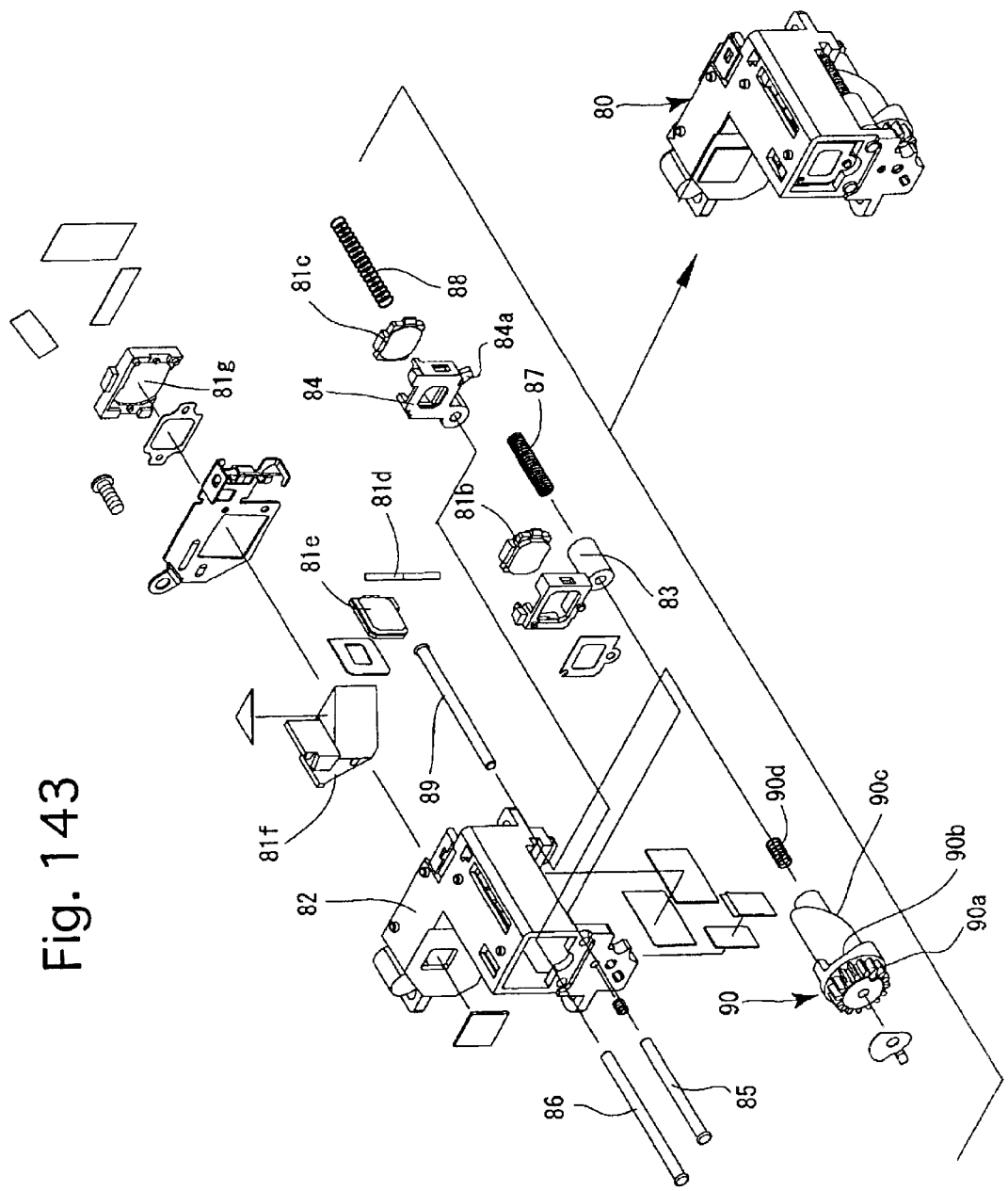
Figure 146:
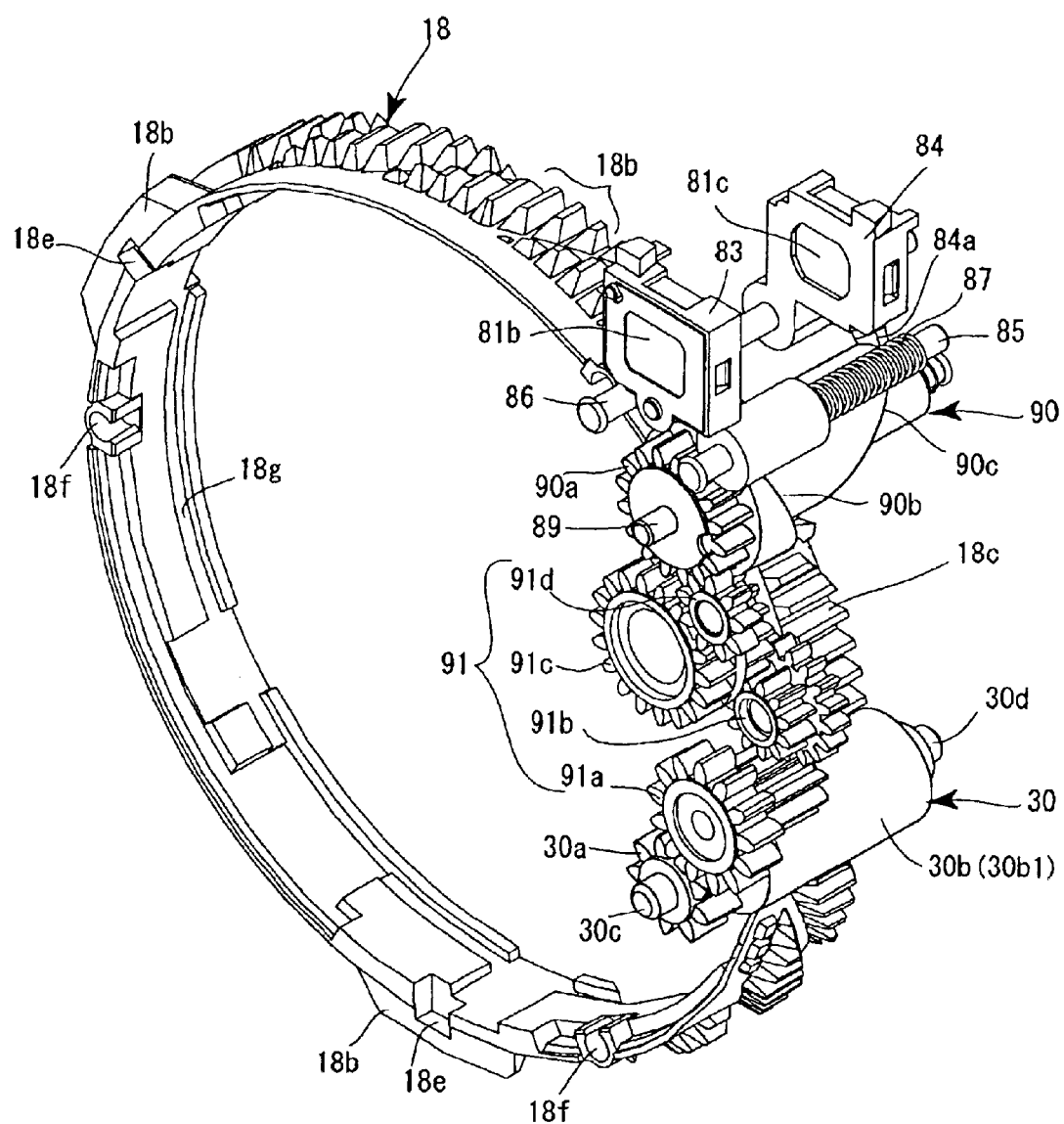
Figure 147:
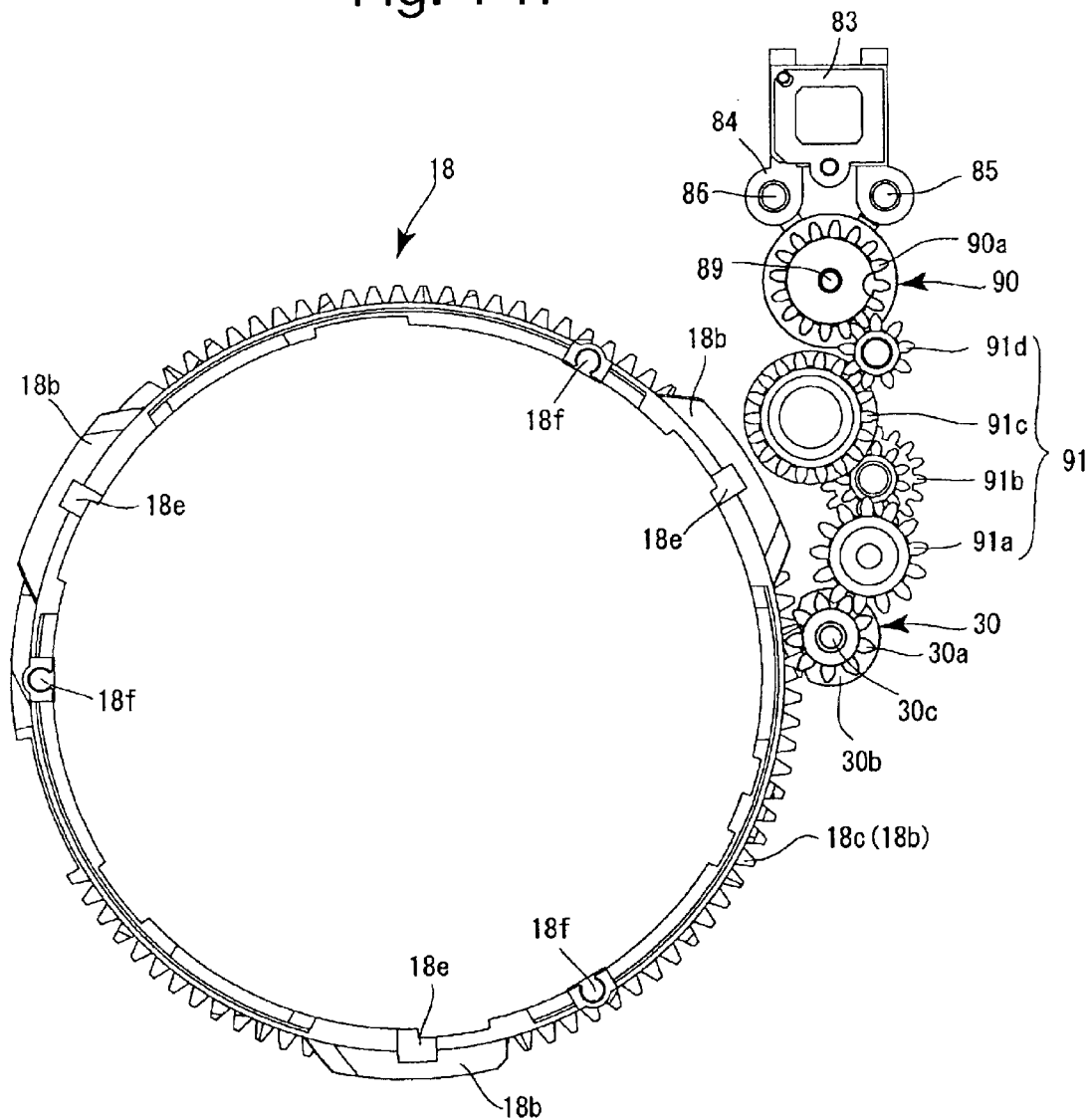
Figure 148:
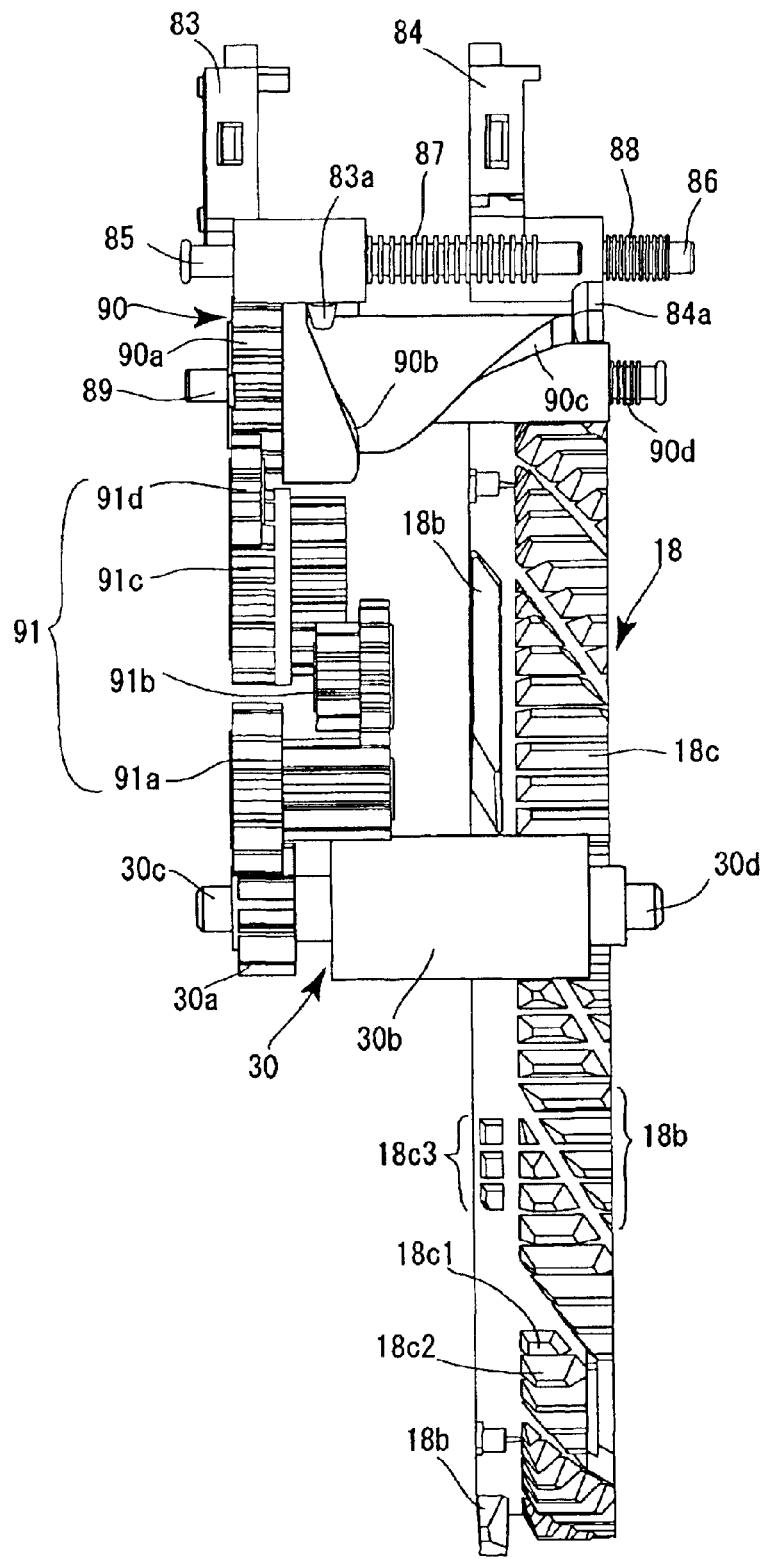
Figure 149:
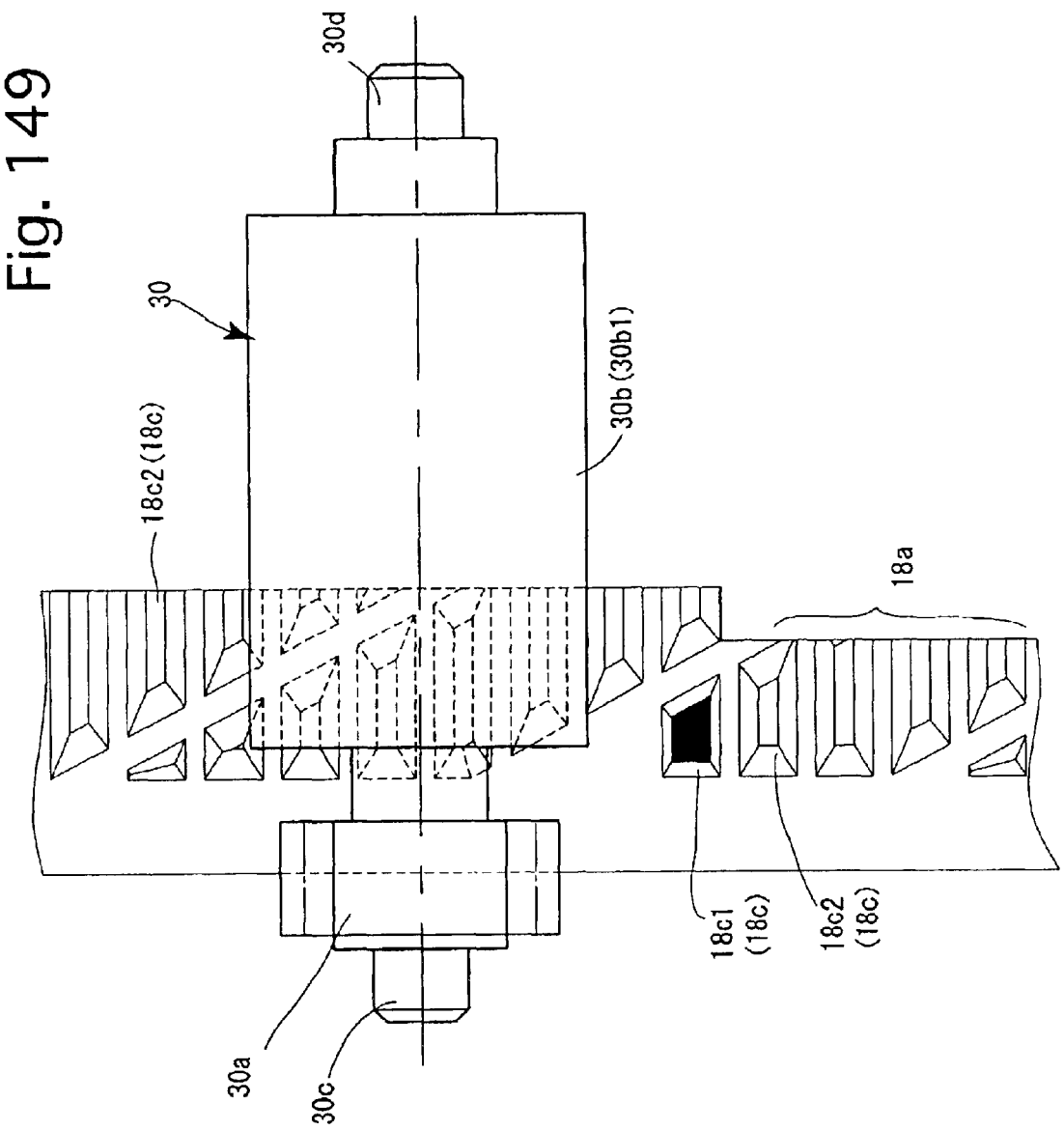

FIG. 131 is a perspective view of the first external barrel that surrounds the second lens group moving frame, and the first lens frame for the first lens group that is held by the first external barrel;

FIG. 132 is a front elevational view of the first external barrel and the first lens frame;

FIG. 133 is a perspective view of the first lens frame, the second lens group moving frame, the AF lens frame and the shutter unit, viewed obliquely from front, showing the positional relationship thereamong at a ready-to-photograph state of the zoom lens;

FIG. 134 is a perspective view of the first lens frame, the second lens group moving frame, the AF lens frame and the shutter unit which are shown in FIG. 133, viewed obliquely from rear thereof;

FIG. 135 is a view similar to that of FIG. 133, showing the positional relationship among the first lens frame, the second lens group moving frame, the AF lens frame and the shutter unit, showing the positional relationship thereamong in the retracted state of the zoom lens;

FIG. 136 is a perspective view of the first lens frame, the second lens group moving frame, the AF lens frame and the shutter unit which are shown in FIG. 135, viewed obliquely from rear thereof;

FIG. 137 is a rear elevational view of the first lens frame, the second lens group moving frame, the AF lens frame and the shutter unit which are shown in FIG. 135;

FIG. 138 is a perspective view, of the first lens frame, the first external barrel, the second lens group moving frame, the AF lens frame and the shutter unit in the retracted state of the zoom lens, showing the positional relationship thereamong in the retracted state of the zoom lens;

FIG. 139 is a front elevational view of the first lens frame, the first external barrel, the second lens group moving frame, the AF lens frame and the shutter unit which are shown in FIG. 138;

FIG. 140 is an exploded perspective view of the shutter unit of the zoom lens;

FIG. 141 is a longitudinal cross sectional view of a portion of the zoom lens in the vicinity of the first lens group in the upper half of the zoom lens shown in FIG. 9, in which the zoom lens is in a ready-to-photograph state;

FIG. 142 is a view similar to that of FIG. 141 and shows the same portion in the upper half of the zoom lens shown in FIG. 10, in which the zoom lens is in the retracted state;

FIG. 143 is an exploded perspective view of the viewfinder unit shown in FIGS. 5 through 8;

FIG. 144 is a developed view, similar to that of FIG. 23, of the helicoid ring and the third external barrel in relation to a zoom gear and a viewfinder drive gear, showing the positional relationship thereamong in the retracted state of the zoom lens;

FIG. 145 is a developed view, similar to that of FIG. 24, of the helicoid ring and the stationary barrel in relation to the zoom gear and the viewfinder drive gear, showing the positional relationship thereamong at the wide-angle extremity the zoom lens;

FIG. 146 is a perspective view of a power transmission system of the zoom lens for imparting rotation of a zoom motor from the helicoid ring to movable lenses of a viewfinder optical system incorporated in the viewfinder unit;

FIG. 147 is a front elevational view of the power transmission system shown in FIG. 148;

FIG. 148 is a side elevational view of the power transmission system shown in FIG. 148;

FIG. 149 is an enlarged developed view of the helicoid ring and the viewfinder drive gear, showing a positional relationship therebetween in the middle of rotation of the helicoid ring in the lens barrel advancing direction from the retracted position shown in FIG. 144 to the wide-angle extremity shown in FIG. 145.

Figure 150:
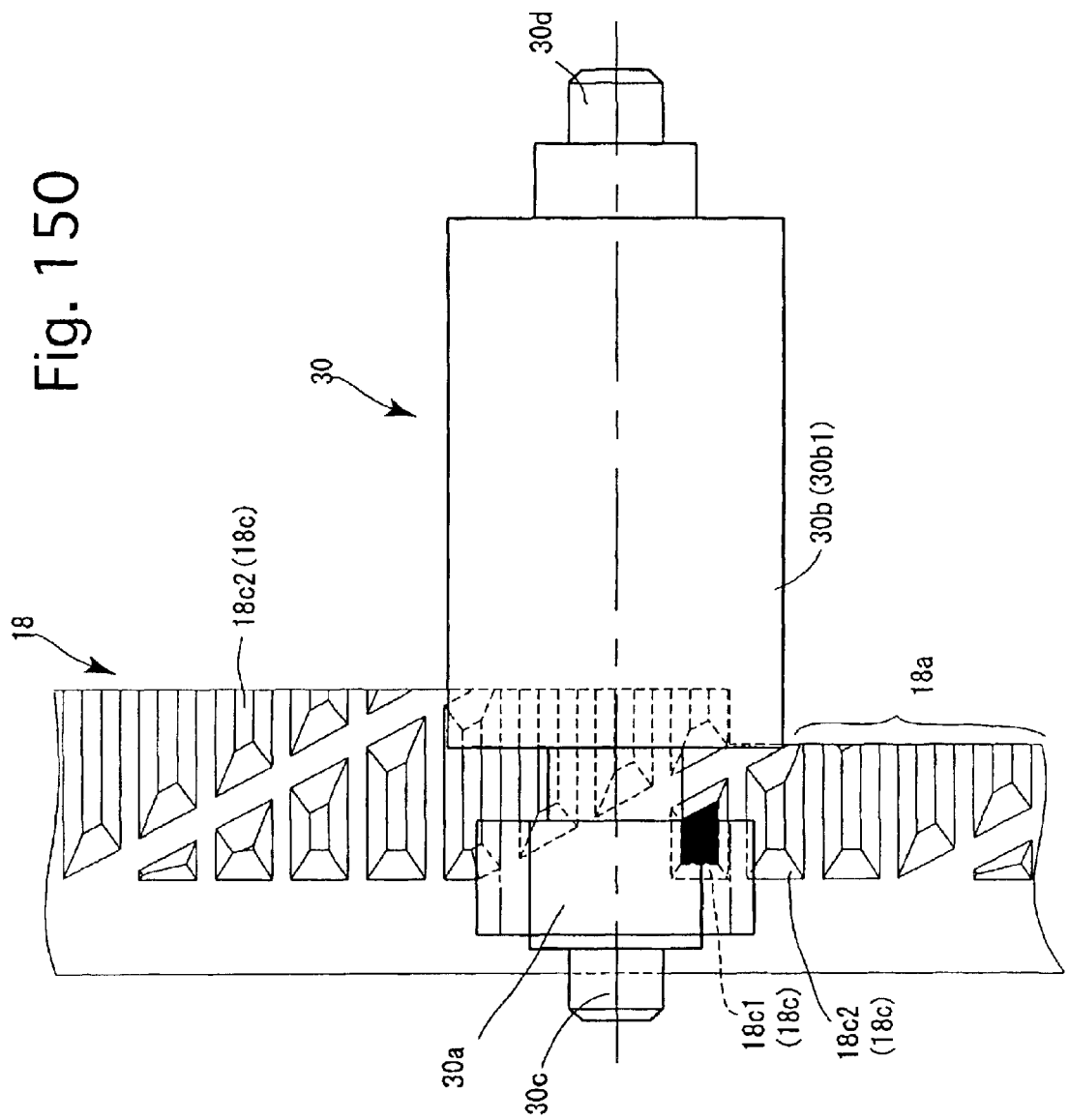
Figure 151:
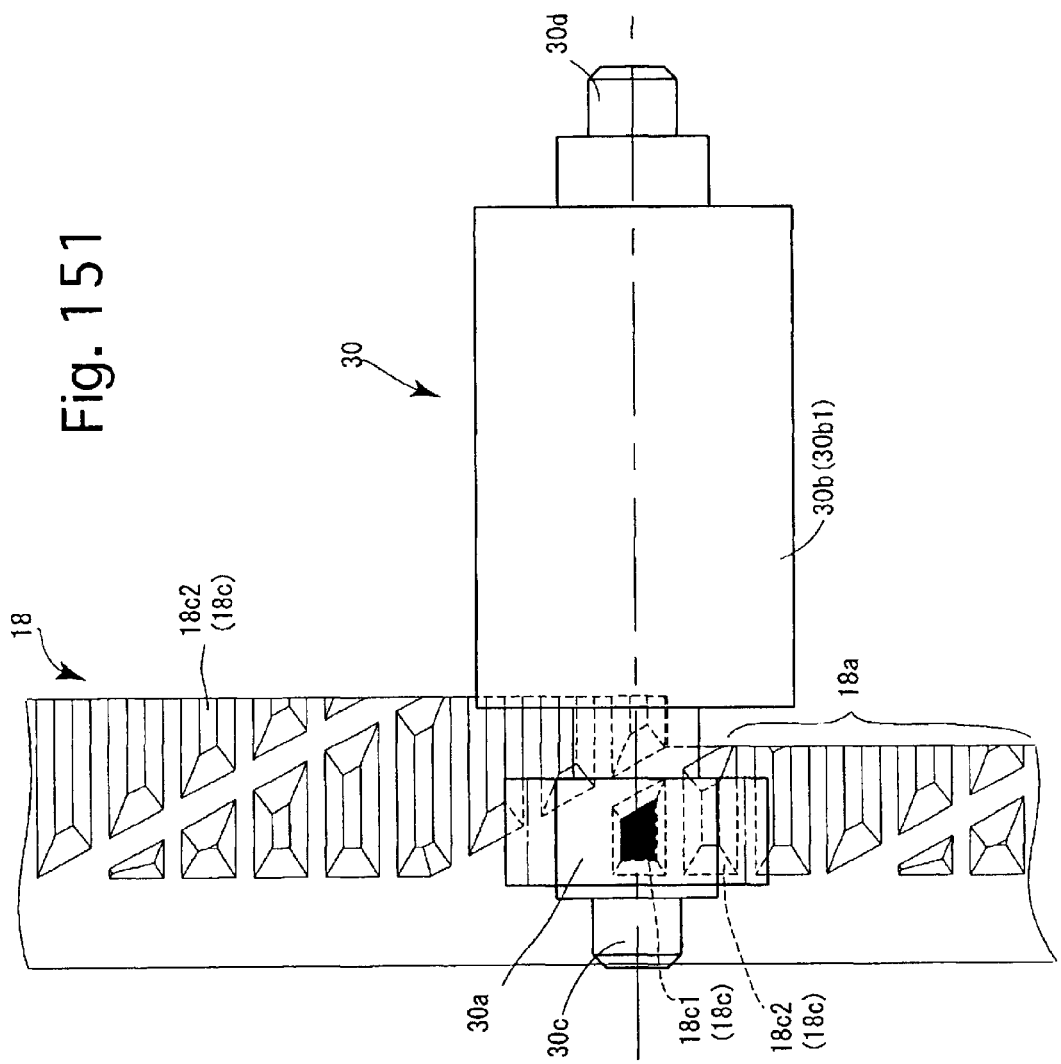
Figure 152:
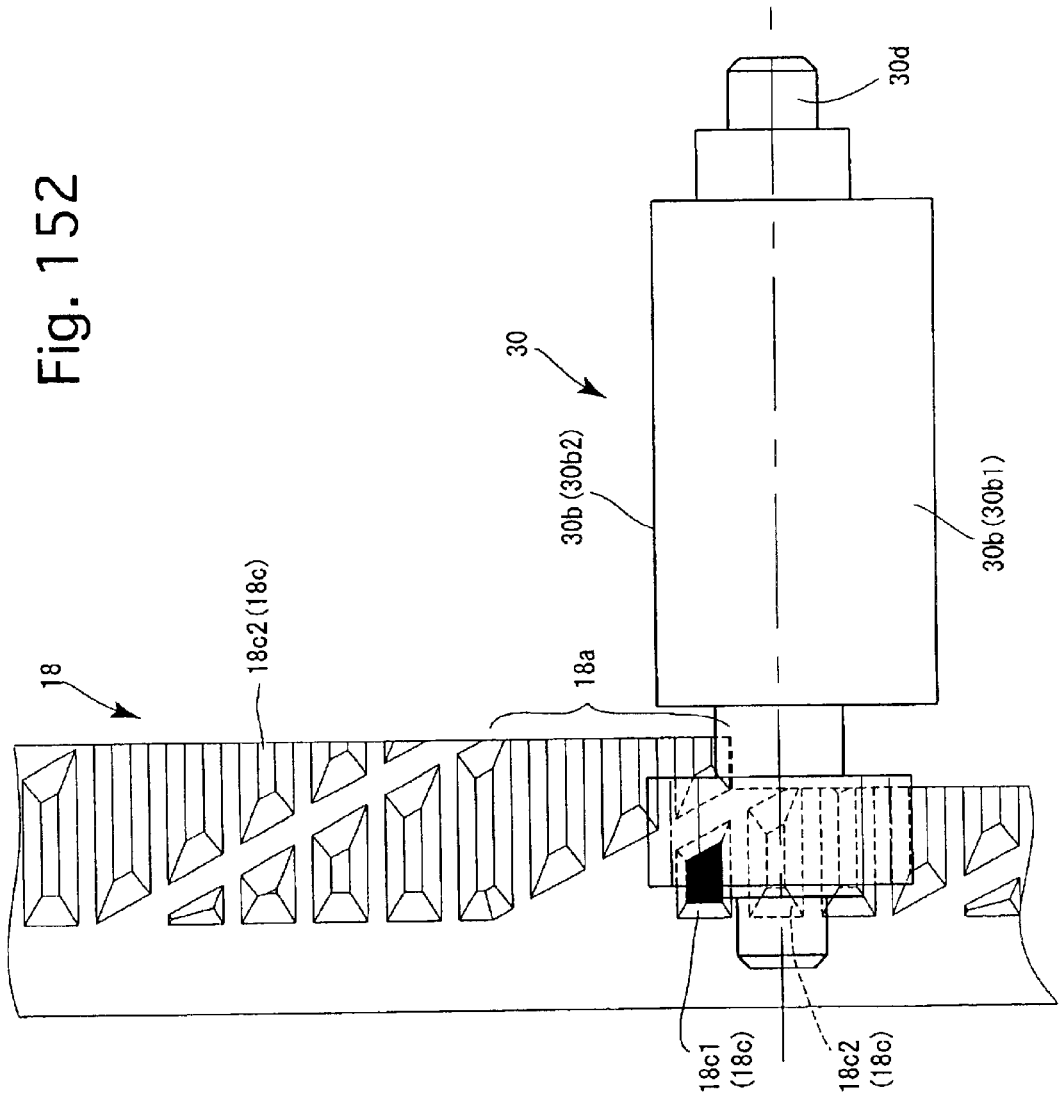
Figure 153:
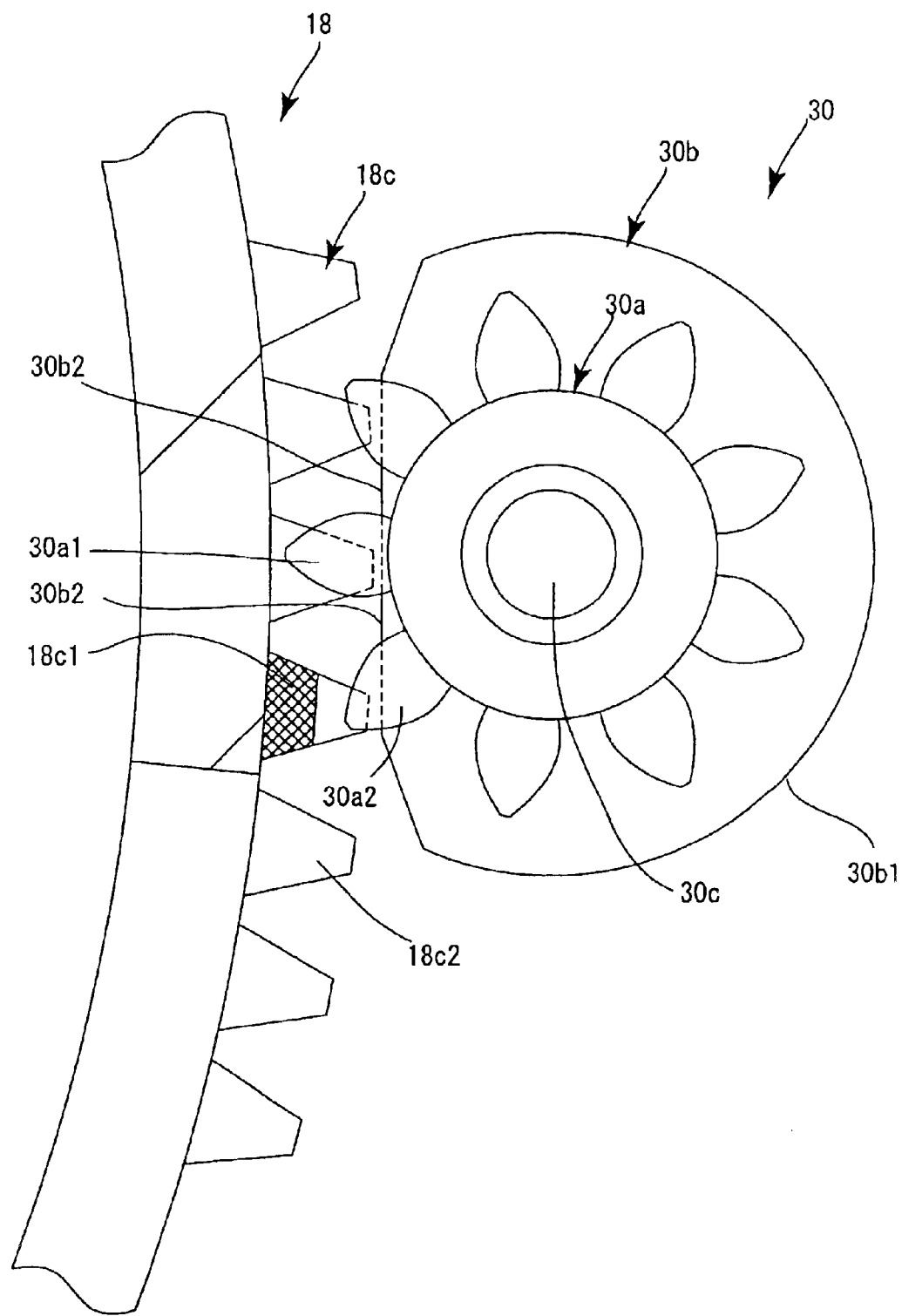
Figure 154:
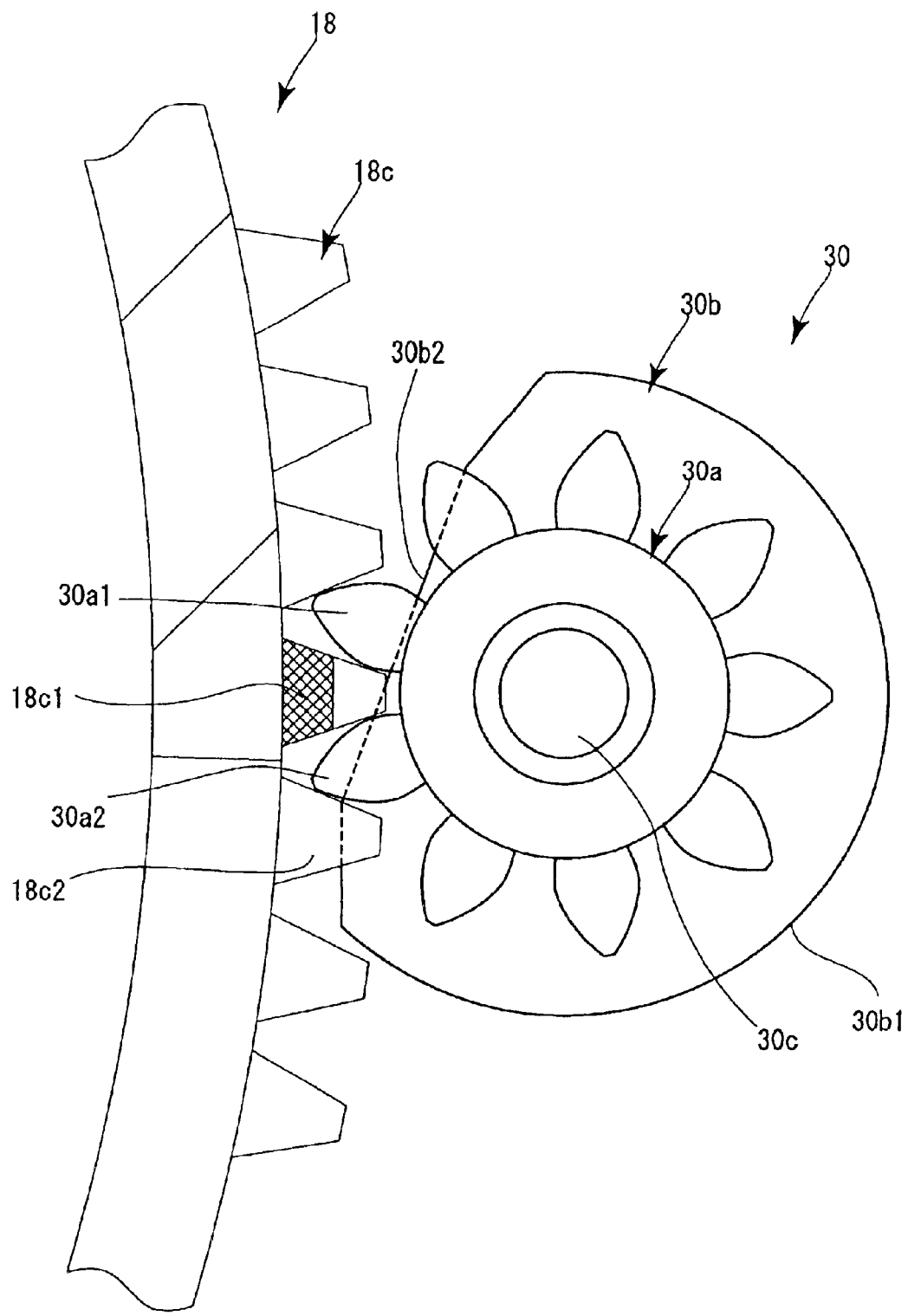
Figure 155:
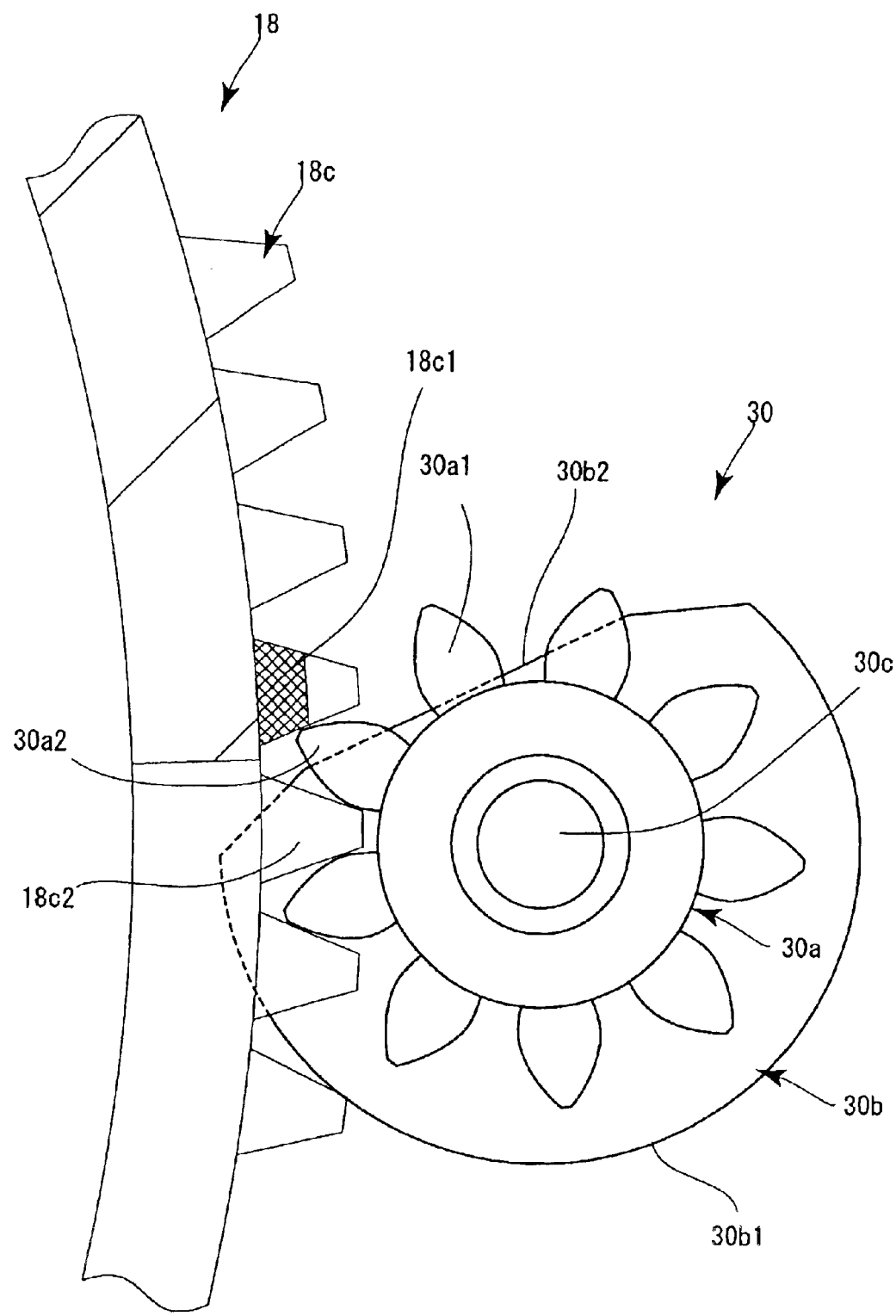
Figure 156:
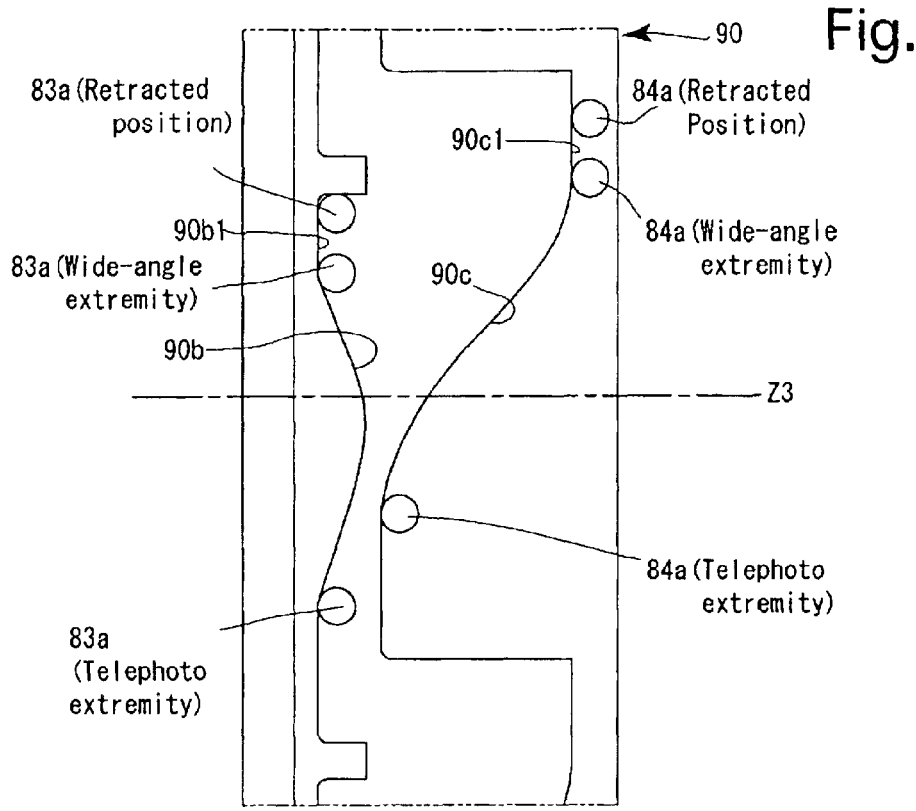
Figure 157:
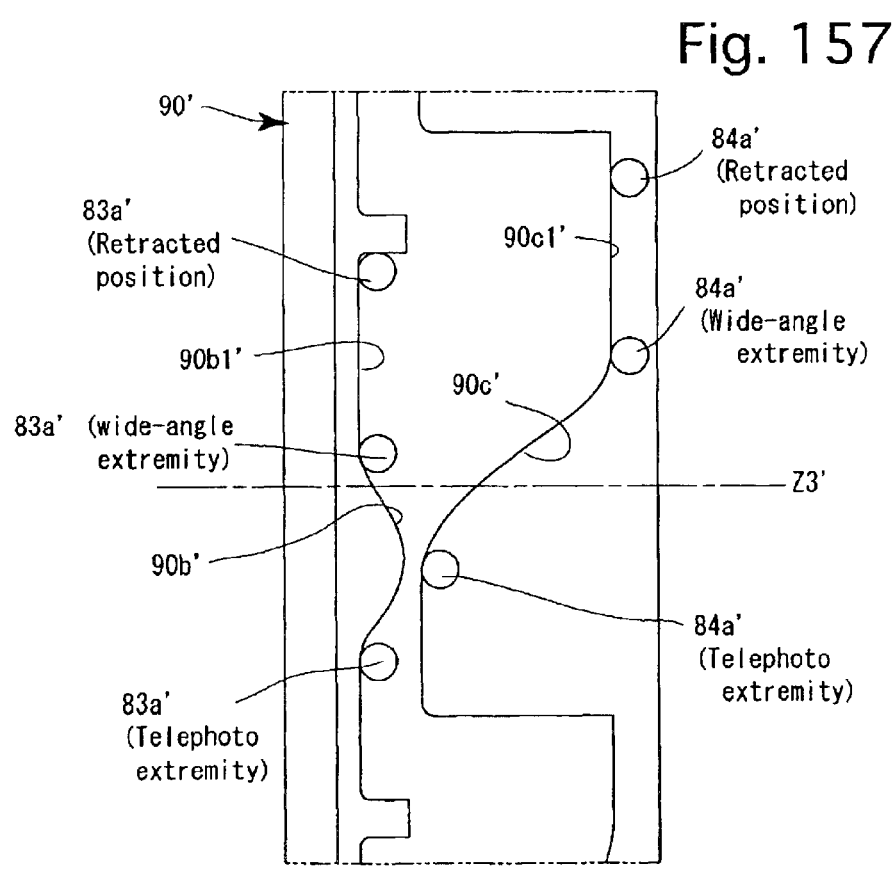

FIG. 150 is a view similar to that of FIG. 149, showing a state subsequent to the state shown in FIG. 149;

FIG. 151 is a view similar to that of FIG. 149, showing a state subsequent to the state shown in FIG. 150;

FIG. 152 is a view similar to that of FIG. 149, showing a state subsequent to the state shown in FIG. 151;

FIG. 153 is a front elevational view of the helicoid ring and the viewfinder drive gear which are shown in FIG. 150;

FIG. 154 is a front elevational view of the helicoid ring and the viewfinder drive gear which are shown in FIG. 151;

FIG. 155 is a front elevational view of the helicoid ring and the viewfinder drive gear which are shown in FIG. 152;

FIG. 156 is a developed view of a cam-incorporated gear of the viewfinder unit; and FIG. 157 is a developed view, similar to that of FIG. 156, of a comparative example of a cam-incorporated gear incorporating an idle running section which is to be compared with the cam-incorporated gear shown in FIG. 156.

DESCRIPTION OF THE PREFERRED EMBODIMENT

In some of the drawings, lines of different thicknesses and/or different types of lines are used as the outlines of different elements for the purpose of illustration. Additionally, in some cross sectional drawings, several elements are shown on a common plane, though positioned in different circumferential positions, for the purpose of illustration.

Figure 22:
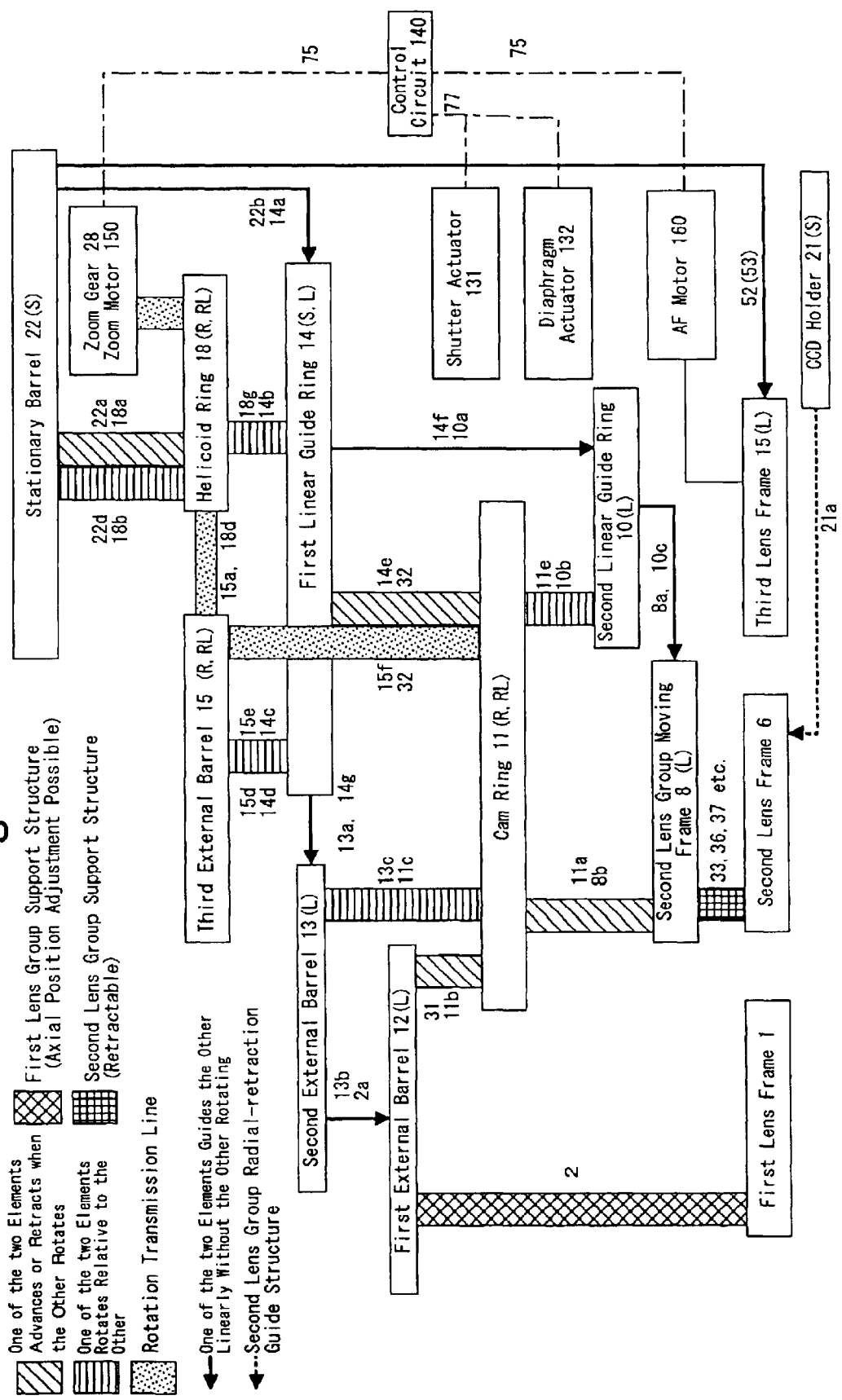
FIG. 22 is a conceptual diagram of elements of the zoom lens, showing the relationship among these elements in relation to the operations thereof.

In FIG. 22, the symbols "(S)", "(L)", "(R)" and "(RL)" which are each appended as a suffix to the reference numeral of some elements of a present embodiment of a zoom lens (zoom lens barrel) 71 (see FIGS. 5 through 10) indicate that the element is stationary, the element is solely movable linearly along a lens barrel axis Z0 (see FIGS. 9 and 10) without rotating about the lens barrel axis Z0, the element is rotatable about the lens barrel axis Z0 without moving along the lens barrel axis Z0, and the element is solely movable along the lens barrel axis Z0 while rotating about the lens barrel axis Z0, respectively. Additionally, in FIG. 22, the symbol "(R, RL)" which is appended as a suffix to the reference numeral of some elements of the zoom lens 71 indicates that the element rotates about the lens barrel axis Z0 without moving along the lens barrel axis Z0 during a zooming operation and that the element moves along the lens barrel axis Z0 while rotating about the lens barrel axis Z0 during the time the zoom lens 71 advances from or retracts into a camera body 72 upon power being turned ON or OFF, while the symbol "(S, L)" which is appended as a suffix to the reference numeral of some elements of the zoom lens 71 indicates that the element is stationary when the zoom lens 71 in a zooming range in which a zooming operation is possible and that the element moves linearly along the lens barrel axis Z0 without rotating about the lens barrel axis Z0 during the time the zoom lens 71 advances from or retracts into the camera body 72 upon power being turned ON or OFF.

As shown in FIGS. 9 and 10, the present embodiment of the zoom lens 71 incorporated in a digital camera 70 is provided with a photographing optical system consisting of a first lens group LG1, a shutter S, an adjustable diaphragm A, a second lens group LG2, a third lens group LG3, a low-pass filter (optical filter) LG4, and a CCD image sensor (solid-state image pick-up device) 60. "Z1" shown in FIGS. 9 and 10 designates the optical axis of the photographing optical system. The photographing optical axis Z1 is parallel to a common rotational axis (the lens barrel axis Z0) of external barrels which form an outward appearance of the zoom lens 71. Moreover, the photographing optical axis Z1 is positioned below the lens barrel axis Z0. The first lens group LG1 and the second lens group LG2 are driven along the photographing optical axis Z1 in a predetermined moving manner to perform a zooming operation, while the third lens group L3 is driven along the photographing optical axis Z1 to perform a focusing operation. In the following descriptions, the term "optical axis direction" means a direction parallel to the photographing optical axis Z1 unless there is a different explanatory note on the expression.

As shown in FIGS. 9 and 10, the camera 70 is provided in the camera body 72 thereof with a stationary barrel 22 fixed to the camera body 72, and a CCD holder 21 fixed to a rear portion of the stationary barrel 22. The CCD image sensor 60 is mounted to the CCD holder 21 to be held thereby via a CCD base plate 62. The low-pass filter LG4 is held by the CCD holder 21 to be positioned in front of the CCD 60 via a filter holder portion 21*b* and an annular sealing member 61. The filter holder portion 21*b* is a portion formed integrally with the CCD holder 21. The camera 70 is provided behind the CCD holder 21 with an LCD panel 20 which indicates a live image so that the user can see how the image about to be taken looks before photographing, captured images so that the user can review pictures which he or she has already taken, and also various photographing information.

Figure 127:
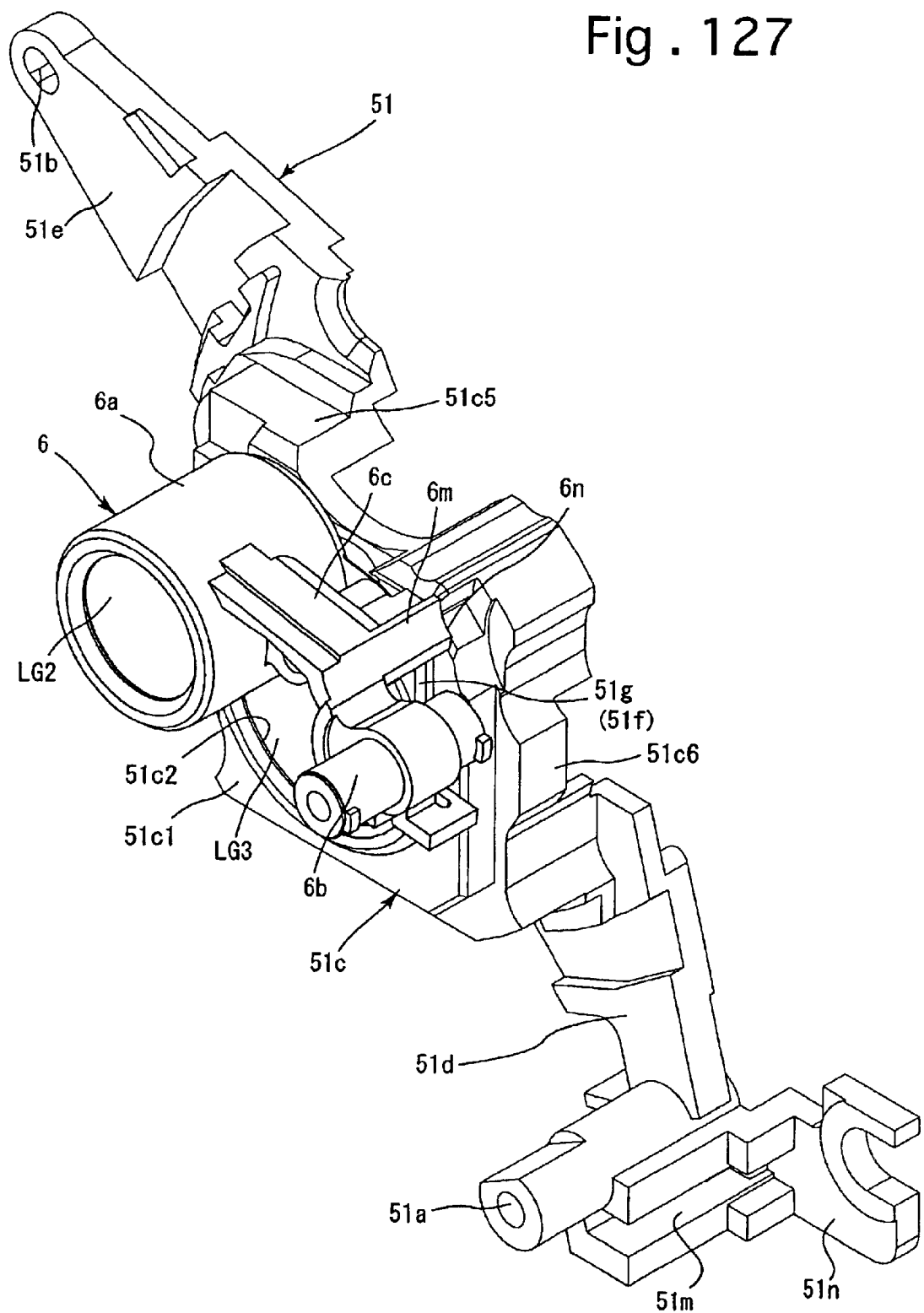

The zoom lens 71 is provided in the stationary barrel 22 with an AF lens frame (a third lens frame which supports and holds the third lens group LG3) 51 which is guided linearly in the optical axis direction without rotating about the photographing optical axis Z1. Specifically, the zoom lens 71 is provided with a pair of AF guide shafts 52 and 53 which extend parallel to the photographing optical axis Z1 to guide the AF lens frame 51 in the optical axis direction without rotating the AF lens frame 51 about the photographing optical axis Z1. Front and rear ends of each guide shaft of the pair of AF guide shafts 52 and 53 are fixed to the stationary barrel 22 and the CCD holder 21, respectively. The AF lens frame 51 is provided on radially opposite sides thereof with a pair of guide holes 51*a* and 51*b* in which the pair of AF guide shafts 52 and 53 are respectively fitted so that the AF lens frame 51 is slidable on the pair of AF guide shafts 52 and 53. In this particular embodiment, the amount of clearance between the AF guide shaft 53 and the guide hole 51*b* is greater than that between the AF guide shaft 52 and the guide hole 51*a*. Namely, the AF guide shaft 52 serves as a main guide shaft for achieving a great positioning accuracy, while the AF guide shaft 53 serves as an auxiliary guide shaft. The camera 70 is provided with an AF motor 160 (see FIG. 1) having a rotary drive shaft which is threaded to serve as a feed screw shaft, and this rotary drive shaft is screwed through a screw hole formed on an AF nut 54 (see FIG. 1). The AF nut 54 is provided with a rotation-preventing protrusion 54*a*. The AF lens frame 51 is provided with a guide groove 51*m* (see FIG. 127), extending in a direction parallel to the optical axis Z1, in which the rotation-preventing protrusion 54*a* is slidably fitted. Furthermore, the AF lens frame 51 is provided with a stopper protrusion 51*n* (see FIG. 127) which is positioned behind the AF nut 54. The AF lens frame 51 is biased forward in the optical axis direction by an extension coil spring 55 serving as a biasing member, and the forward movement limit of the AF lens frame 51 is determined via engagement between the stopper protrusion 51*n* and the AF nut 54. The AF lens frame 51 can be moved rearward against the biasing force of the extension coil spring 55 when a rearward force is applied by the AF nut 54. Due to this structure, rotating the rotary drive shaft of AF motor 160 forward and rearward causes the AF lens frame 51 to move forward and rearward in the optical axis direction. In addition, the AF lens frame 51 can be moved rearward against the biasing force of the extension coil spring 55 when a rearward force is directly applied to the AF lens frame 51.

Figure 4:
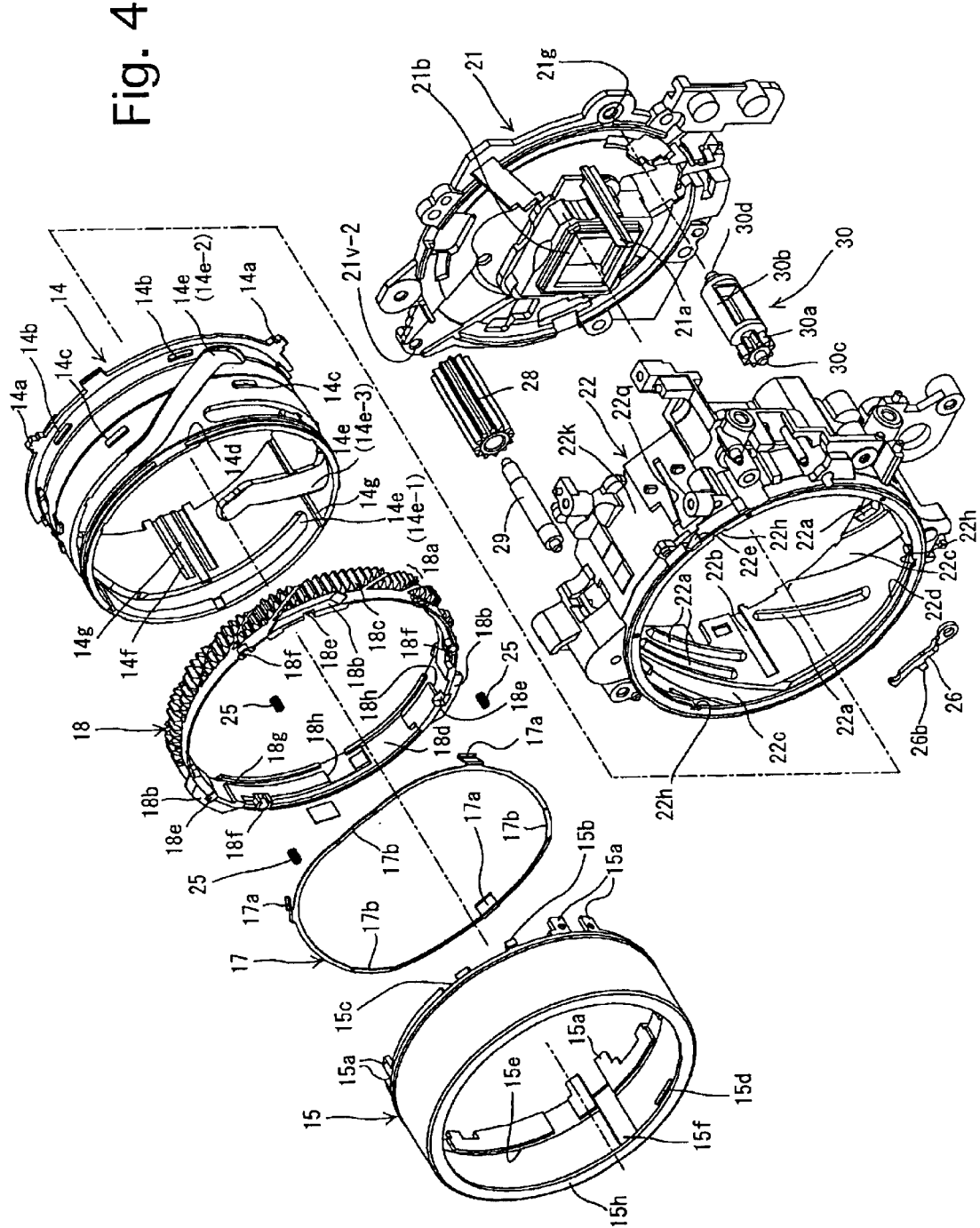
FIG. 4 is an exploded perspective view of a lens barrel advancing-retracting structure of the zoom lens for advancing and retracting a third external barrel from a stationary barrel.
Figure 5:
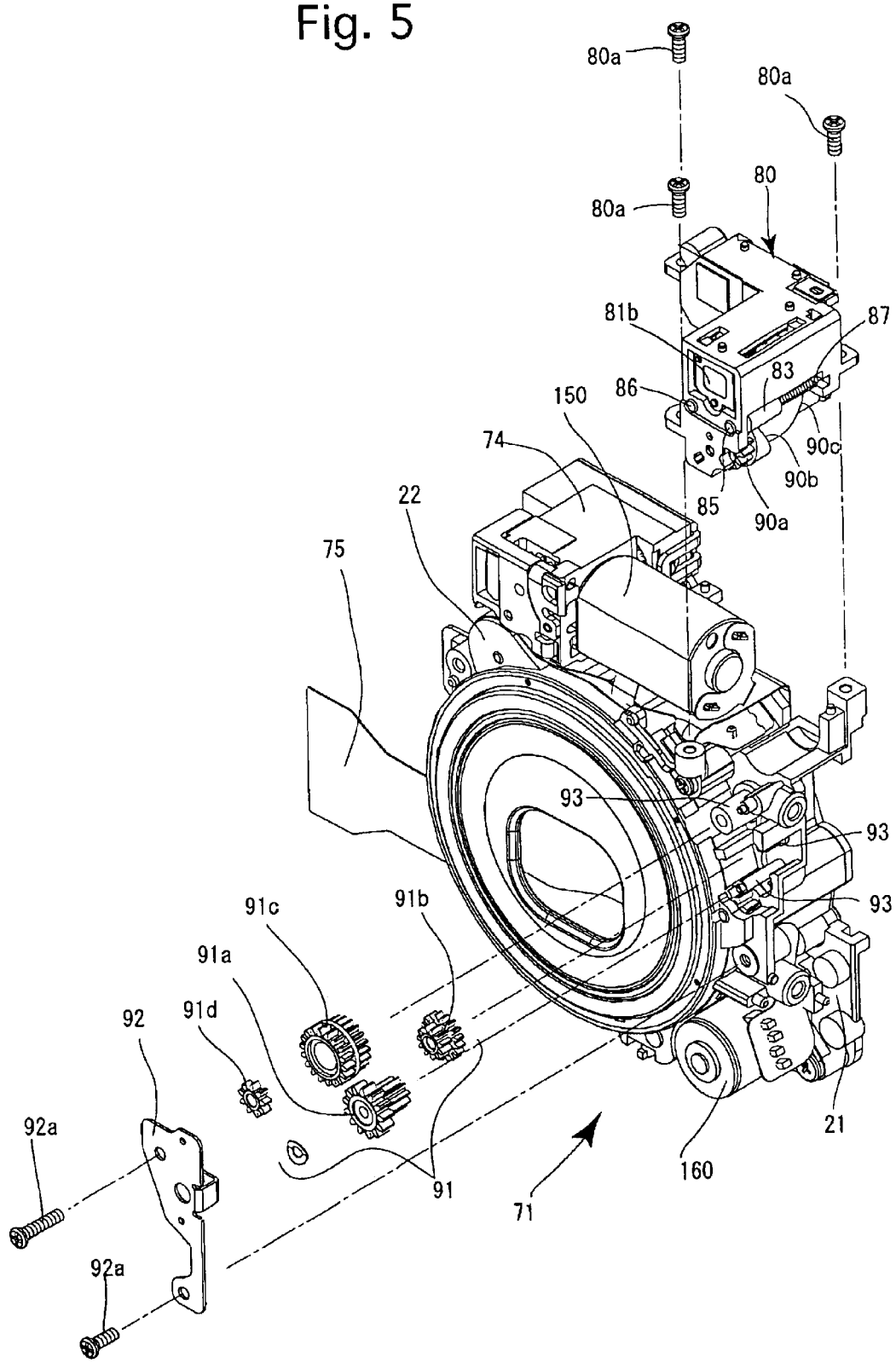
FIG. 5 is a perspective view, partly exploded, of the zoom lens, showing a fixing procedure of a viewfinder unit to the zoom lens and a fixing procedure of a gear train to the zoom lens.
Figure 6:
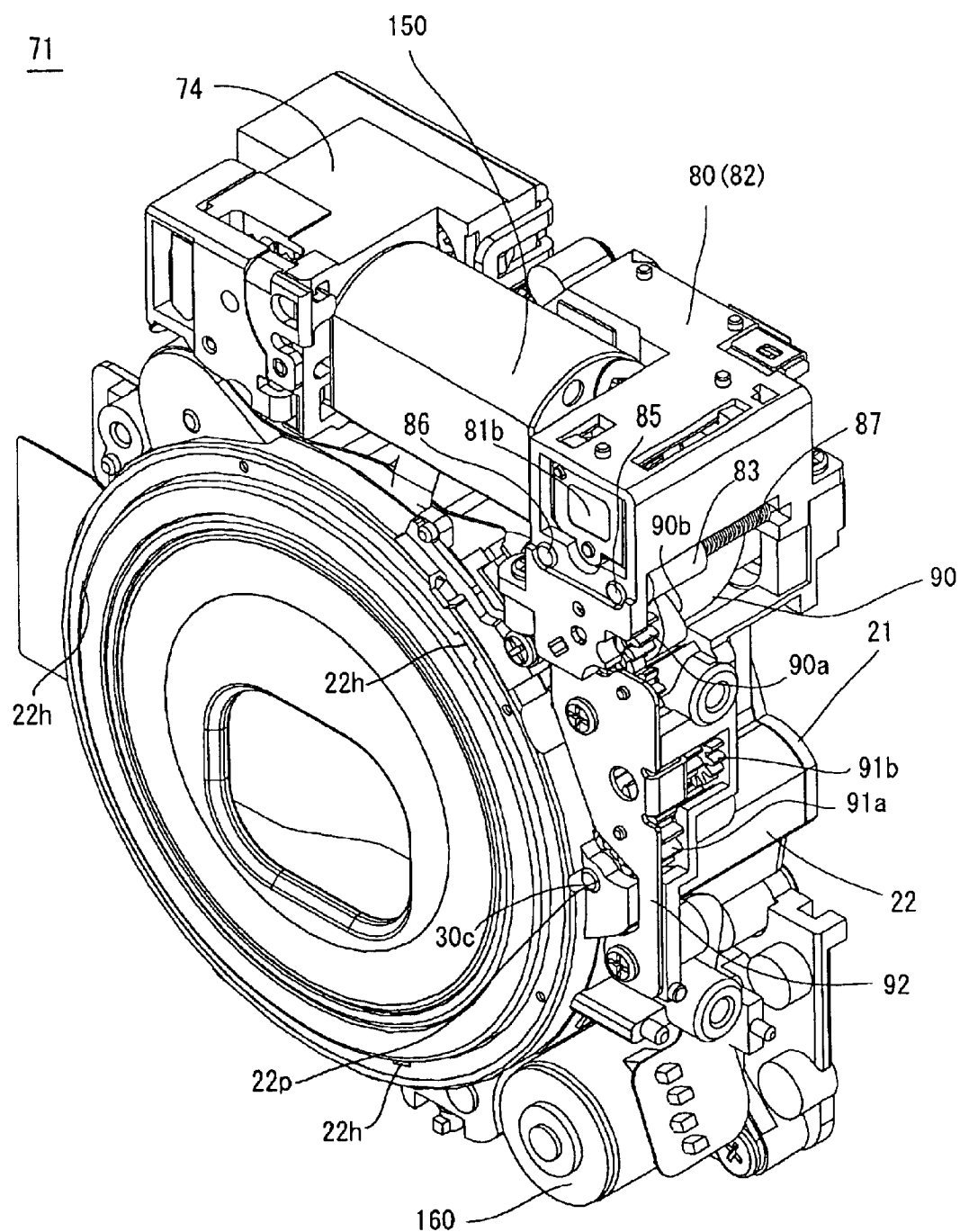
FIG. 6 is a perspective view of a zoom lens assembly made from the elements shown in FIG. 5.

As shown in FIGS. 5 and 6, the camera 70 is provided above the stationary barrel 22 with a zoom motor 150 and a reduction gear train box 74 which are mounted on the stationary barrel 22. The reduction gear train box 74 contains a reduction gear train for transferring rotation of the zoom motor 150 to a zoom gear 28 (see FIG. 4). The zoom gear 28 is rotatably fitted on a zoom gear shaft 29 extending parallel to the photographing optical axis Z1. Front and rear ends of the zoom gear shaft 29 are fixed to the stationary barrel 22 and the CCD holder 21, respectively. Rotations of the zoom motor 150 and the AF motor 160 are controlled by a control circuit 140 (see FIG. 22) via a flexible PWB (printed wiring board) 75 which is partly positioned on an outer peripheral surface of the stationary barrel 22. The control circuit 140 comprehensively controls the overall operation of the camera 70.

As shown in FIG. 4, the stationary barrel 22 is provided on an inner peripheral surface thereof with a female helicoid 22a, a set of three linear guide grooves 22b, a set of three inclined grooves 22c, and a set of three rotational sliding grooves 22d. Threads of the female helicoid 22a extend in a direction inclined with respect to both the optical axis direction and a circumferential direction of the stationary barrel 22. The set of three linear guide grooves 22b extend parallel to the photographing optical axis Z1. The set of three inclined grooves 22c extend parallel to the female helicoid 22a. The set of three rotational sliding grooves 22d are formed in the vicinity of a front end of the inner peripheral surface of the stationary barrel 22 to extend along a circumference of the stationary barrel 22 to communicate the front ends of the set of three inclined grooves 22c, respectively. The female helicoid 22a is not formed on that specific front area (non-helicoid area 22z) of the inner peripheral surface of the stationary barrel 22 which is positioned immediately behind the set of three rotational sliding grooves 22d (see FIGS. 11, 23 through 26).

Figure 12:
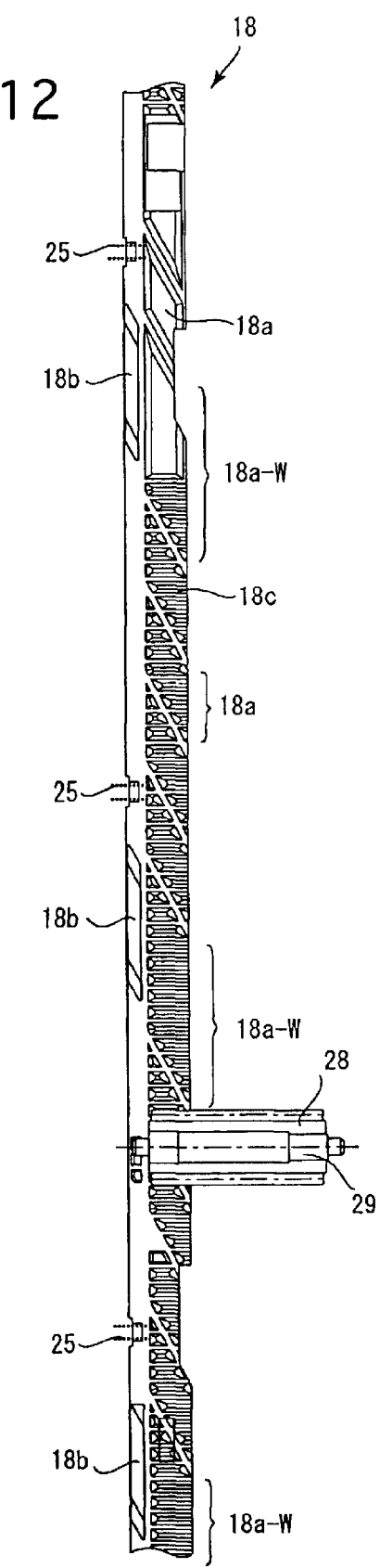
FIG. 12 is a developed view of a helicoid ring shown in FIG. 4.

The zoom lens 71 is provided in the stationary barrel 22 with a helicoid ring 18. The helicoid ring 18 is provided on an outer peripheral surface thereof with a male helicoid 18a and a set of three rotational sliding projections 18b. The male helicoid 18a is engaged with the female helicoid 22a, and the set of three rotational sliding projections 18b are engaged in the set of three inclined grooves 22c or the set of three rotational sliding grooves 22d, respectively (see FIGS. 4 and 12). The helicoid ring 18 is provided on threads of the male helicoid 18a with an annular gear 18c which is in mesh with the zoom gear 28. Therefore, when a rotation of the zoom gear 28 is transferred to the annular gear 18c, the helicoid ring 18 moves forward or rearward in the optical axis direction while rotating about the lens barrel axis Z0 within a predetermined range in which the male helicoid 18a remains in mesh with the female helicoid 22a. A forward movement of the helicoid ring 18 beyond a predetermined point with respect to the stationary barrel 22 causes the male helicoid 18a to be disengaged from the female helicoid 22a so that the helicoid ring 18 rotates about the lens barrel axis Z0 without moving in the optical axis direction relative to the stationary barrel 22 by engagement of the set of three rotational sliding projections 18b with the set of three rotational sliding grooves 22d.

Figure 31:
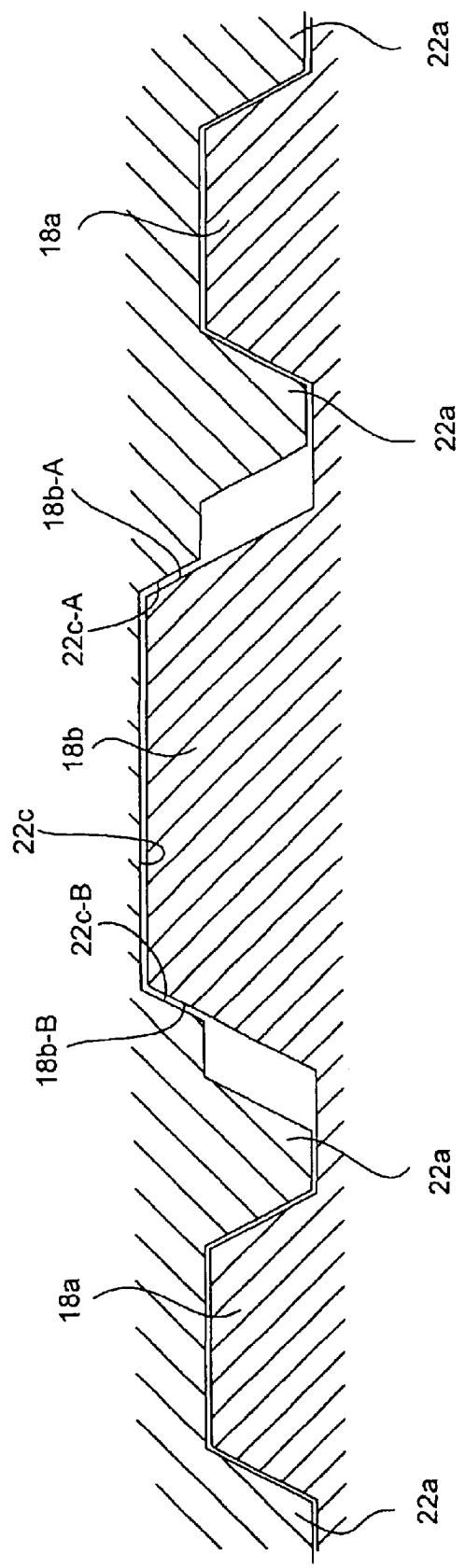
FIG. 31 is a cross sectional view taken along M2—M2 line shown in FIG. 27.

The set of three inclined grooves 22c are formed on the stationary barrel 22 to prevent the set of three rotational sliding projections 18b and the stationary barrel 22 from interfering with each other when the female helicoid 22a and the male helicoid 18a are engaged with each other. To this end, each inclined groove 22c is formed on an inner peripheral surface of the stationary barrel 22 to be positioned radially outwards (upwards as viewed in FIG. 31) from the bottom of the female helicoid 22a as shown in FIG. 31. A circumferential space between two adjacent threads of the female helicoid 22a between which one of the three inclined grooves 22c is positioned is greater than that between another two adjacent threads of the female helicoid 22a between which none of the three inclined grooves 22c is positioned. The male helicoid 18a includes three wide threads 18a-W and twelve narrow threads. The three wide threads 18a-W are positioned behind the three rotational sliding projections 18b in the optical axis direction, respectively (see FIG. 12). The circumferential width of each of the three wide threads 18a-W is greater than that of each of the twelve narrow threads so that each of the three wide threads 18a-W can be positioned in the associated two adjacent threads of the female helicoid 22a between which one of the three inclined grooves 22c is positioned (see FIGS. 11 and 12).

Figure 40:
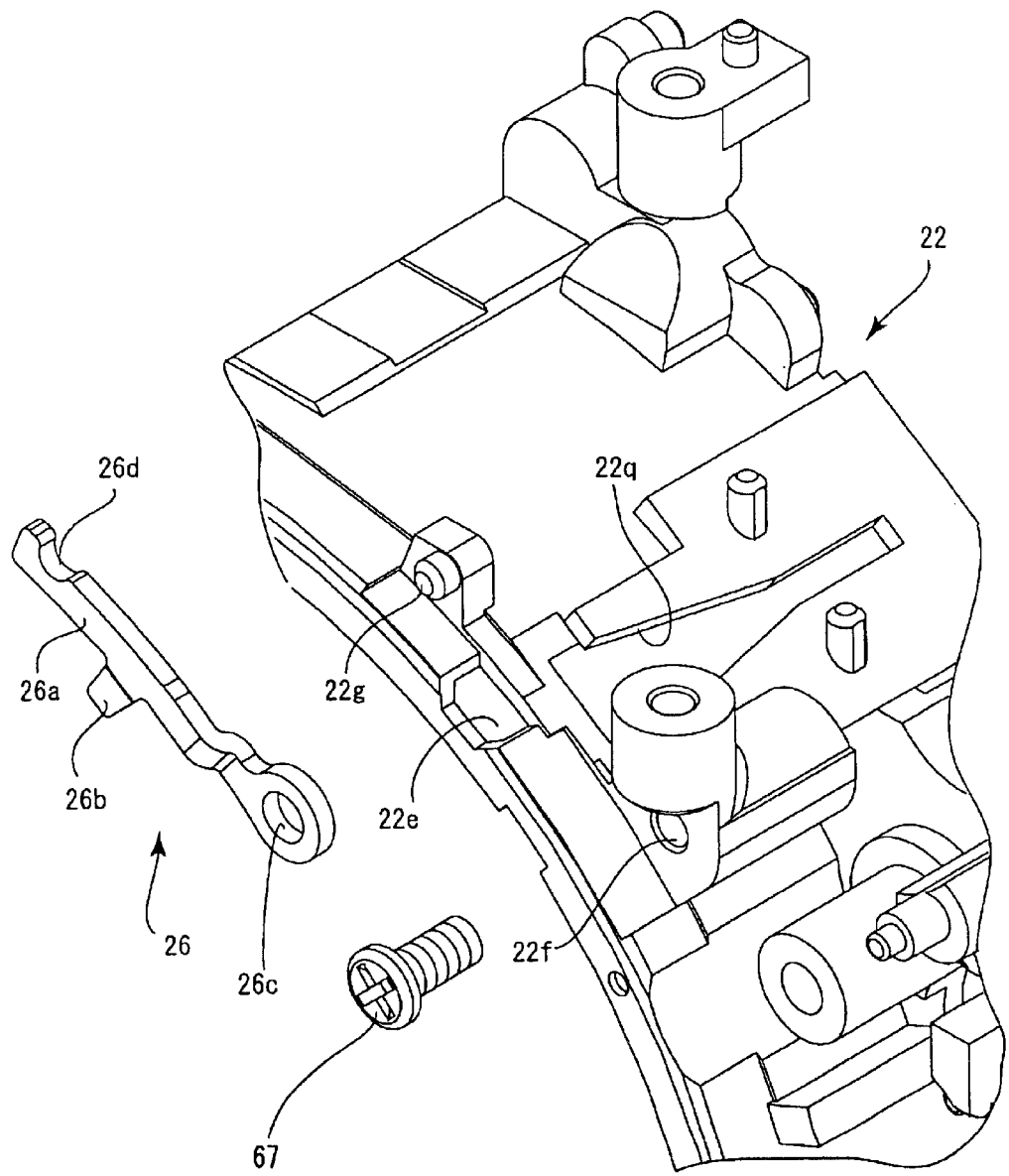
FIG. 40 is a perspective view of a portion of the stationary barrel, the stop member and a set screw therefor, showing a state where the stop member and the set screw have been removed from the stationary barrel.

The stationary barrel 22 is provided with a stop-member insertion hole 22e which radially penetrates through the stationary barrel 22. A stop member 26 having a stop projection 26b is fixed to the stationary barrel 22 by a set screw 67 so that the stop projection 26b can be inserted into and removed from the stop-member insertion hole 22e (see FIGS. 40 and 41).

Figure 13:
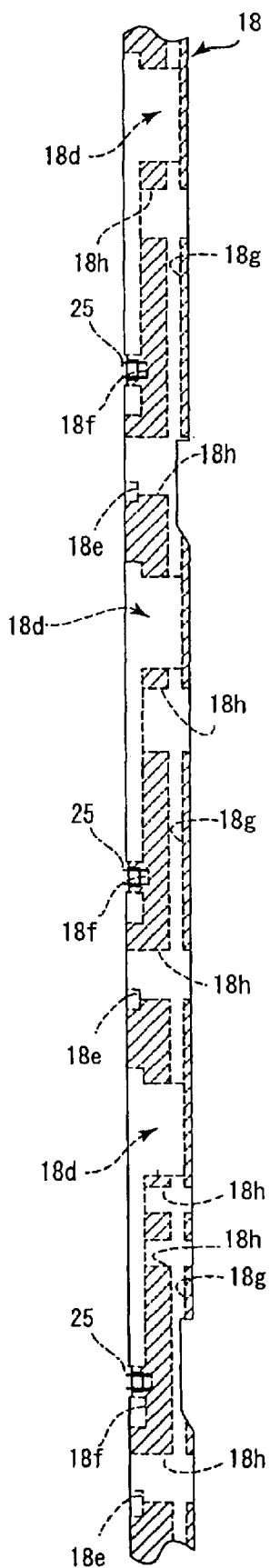
FIG. 13 is a developed view of the helicoid ring shown in FIG. 1, showing a structure of the inner peripheral surface thereof by broken lines.

As will be appreciated from FIGS. 9 and 10, the zoom lens 71 of the camera 70 is of a telescoping type having three external telescoping barrels: a first external barrel 12, a second external barrel 13 and a third external barrel 15 which are concentrically arranged about the lens barrel axis Z0. The helicoid ring 18 is provided, on an inner peripheral surface thereof at three different circumferential positions on the helicoid ring 18, with three rotation transfer recesses 18d (see FIGS. 4 and 13) front ends of which are open at the front end of the helicoid ring 18, while the third external barrel 15 is provided, at corresponding three different circumferential positions on the third external barrel 15, with three pairs of rotation transfer projections 15a (see FIGS. 4 and 14) which project rearward from the rear end of the third external barrel 15 to be inserted into the three rotation transfer recesses 18d from the front thereof, respectively. The three pairs of rotation transfer projections 15a and the three rotation transfer recesses 18d are movable relative to each other in a direction of the lens barrel axis Z0, and are not rotatable relative to each other about the lens barrel axis Z0. Namely, the helicoid ring 18 and the third external barrel 15 rotate in one piece. Strictly speaking, the three pairs of rotation transfer projections 15a and the three rotation transfer recesses 18d are slightly rotatable relative to each other about the lens barrel axis Z0 by the amount of clearance between the three pairs of rotation transfer projections 15a and the three rotation transfer recesses 18d, respectively. This structure will be discussed in detail later.

The helicoid ring 18 is provided, on front faces of the three rotational sliding projections 18b at three different circumferential positions on the helicoid ring 18, with a set of three engaging recesses 18e which are formed on an inner peripheral surface of the helicoid ring 18 to be open at the front end of the helicoid ring 18. The third external barrel 15 is provided, at corresponding three different circumferential positions on the third external barrel 15, with a set of three engaging projections 15*b* which project rearward from the rear end of the third external barrel 15, and also project radially outwards, to be engaged in the set of three engaging recesses 18*e* from the front thereof, respectively. The set of three engaging projections 15*b*, which are respectively engaged in the set of three engaging recesses 18*e*, are also engaged in the set of three rotational sliding grooves 22*d* at a time, respectively, when the set of three rotational sliding projections 18*b* are engaged in the set of three rotational sliding grooves 22*d* (see FIG. 33).

The zoom lens 71 is provided between the third external barrel 15 and the helicoid ring 18 with three compression coil springs 25 which bias the third external barrel 15 and the helicoid ring 18 in opposite directions away from each other in the optical axis direction. The rear ends of the three compression coil springs 25 are respectively inserted into three spring support holes (non-through hole) 18*f* which are formed on the front end of the helicoid ring 18, while the front ends of the three compression coil springs 25 are respectively in pressing contact with three engaging recesses 15*c* formed at the rear end of the third external barrel 15. Therefore, the set of three engaging projections 15*b* of the third external barrel 15 are respectively pressed against front guide surfaces 22*d*-A (see FIGS. 28 through 30) of the rotational sliding grooves 22*d* by the spring force of the three compression coil springs 25. At the same time, the set of three rotational sliding projections 18*b* of the helicoid ring 18 are respectively pressed against rear guide surfaces 22*d*-B (see FIGS. 28 through 30) of the rotational sliding grooves 22*d* by the spring force of the three compression coil springs 25.

The third external barrel 15 is provided on an inner peripheral surface thereof with a plurality of relative rotation guide projections 15*d* which are formed at different circumferential positions on the third external barrel 15, a circumferential groove 15*e* which extends in a circumferential direction about the lens barrel axis Z0, and a set of three rotation transfer grooves 15*f* which extend parallel to the lens barrel axis Z0 (see FIGS. 4 and 14). The plurality of relative rotation guide projections 15*d* are elongated in a circumferential direction of the third external barrel to lie in a plane orthogonal to the lens barrel axis Z0. As can be seen in FIG. 14, each rotation transfer groove 15*f* intersects the circumferential groove 15*e* at right angles. The circumferential positions of the three rotation transfer grooves 15*f* are formed to correspond to those of the three pairs of rotation transfer projections 15*a*, respectively. The rear end of each rotation transfer groove 15*f* is open at the rear end of the third external barrel 15. The helicoid ring 18 is provided on an inner peripheral surface thereof with a circumferential groove 18*g* which extends in a circumferential direction about the lens barrel axis Z0 (see FIGS. 4 and 13). The zoom lens 71 is provided inside the third external barrel 15 and the helicoid ring 18 with a first linear guide ring 14. The first linear guide ring 14 is provided on an outer peripheral surface thereof with a set of three linear guide projections 14*a*, a first plurality of relative rotation guide projections 14*b*, a second plurality of relative rotation guide projections 14*c*, and a circumferential groove 14*d* in this order from rear to front of the first linear guide ring 14 in the optical axis direction (see FIGS. 4 and 15). The set of three linear guide projections 14*a* project radially outwards in the vicinity of the rear end of the first linear guide ring 14. The first plurality of relative rotation guide projections 14*b* project radially outwards at different circumferential positions on the first linear guide ring 14, and are each elongated in a circumferential direction of the first linear guide ring 14 to lie in a plane orthogonal to the lens barrel axis Z0. Likewise, the second plurality of relative rotation guide projections 14*c* project at different circumferential positions on the first linear guide ring 14, and are each elongated in a circumferential direction of the first linear guide ring 14 to lie in a plane orthogonal to the lens barrel axis Z0. The circumferential groove 14*d* is an annular groove with its center on the lens barrel axis Z0. The first linear guide ring 14 is guided in the optical axis direction with respect to the stationary barrel 22 by engagement of the set of three linear guide projections 14*a* with the set of three linear guide grooves 22*b*, respectively. The third external barrel 15 is coupled to the first linear guide ring 14 to be rotatable about the lens barrel axis Z0 relative to the first linear guide ring 14 by both the engagement of the second plurality of relative rotation guide projections 14*c* with the circumferential groove 15*e* and the engagement of the plurality of relative rotation guide projections 15*d* with the circumferential groove 14*d*. The second plurality of relative rotation guide projections 14*c* and the circumferential groove 15*e* are engaged with each other to be slightly movable relative to each other in the optical axis direction. Likewise, the plurality of relative rotation guide projections 15*d* and the circumferential groove 14*d* are engaged with each other to be slightly movable relative to each other in the optical axis direction. The helicoid ring 18 is coupled to the first linear guide ring 14 to be rotatable about the lens barrel axis Z0 relative to the first linear guide ring 14 by engagement of the first plurality of relative rotation guide projections 14*b* with the circumferential groove 18*g*. The first plurality of relative rotation guide projections 14*b* and the circumferential groove 18*g* are engaged with each other to be slightly movable relative to each other in the optical axis direction.

The first linear guide ring 14 is provided with a set of three through-slots 14*e* which radially penetrate the first linear guide ring 14. As shown in FIG. 15, each through-slot 14*e* includes a front circumferential slot portion 14*e*-1, a rear circumferential slot portion 14*e*-2, and an inclined lead slot portion 14*e*-3 which connects the front circumferential slot portion 14*e*-1 with the rear circumferential slot portion 14*e*-2. The front circumferential slot portion 14*e*-1 and the rear circumferential slot portion 14*e*-2 extend parallel to each other in a circumferential direction of the first linear guide ring 14. The zoom lens 71 is provided with a cam ring 11 a front portion of which is positioned inside the first external barrel 12. A set of three roller followers 32 fixed to an outer peripheral surface of the cam ring 11 at different circumferential positions thereon are engaged in the set of three through-slots 14*e*, respectively (see FIG. 3). Each roller follower 32 is fixed to the cam ring 11 by set screw 32*a*. The set of three roller followers 32 are further engaged in the set of three rotation transfer grooves 15*f* through the set of three through-slots 14*e*, respectively. The zoom lens 71 is provided between the first linear guide ring 14 and the third external barrel 15 with a follower-biasing ring spring 17. A set of three follower pressing protrusions 17*a* protrude rearward from the follower-biasing ring spring 17 to be engaged in front portions of the set of three rotation transfer grooves 15*f*, respectively (see FIG. 14). The set of three follower pressing protrusions 17*a* press the set of three roller followers 32 rearward to remove backlash between the set of three roller followers 32 and the set of three through-slots 14*e* when the set of three roller followers 32 are engaged in the front circumferential slot portions 14*e*-1 of the set of three through-slots 14*e*, respectively.

Advancing operations of movable elements of the zoom lens 71 from the stationary barrel 22 to the cam ring 11 will be discussed hereinafter with reference to the above described structure of the digital camera 70. Rotating the zoom gear 28 in a lens barrel advancing direction by the zoom motor 150 causes the helicoid ring 18 to move forward while rotating about the lens barrel axis Z0 due to engagement of the female helicoid 22a with the male helicoid 18a. This rotation of the helicoid ring 18 causes the third external barrel 15 to move forward together with the helicoid ring 18 while rotating about the lens barrel axis Z0 together with the helicoid ring 18, and further causes the first linear guide ring 14 to move forward together with the helicoid ring 18 and the third external barrel 15 because each of the helicoid ring 18 and the third external barrel 15 is coupled to the first linear guide ring 14 to make respective relative rotations between the third external barrel 15 and the first linear guide ring 14 and between the helicoid ring 18 and the first linear guide ring 14 possible and to be movable together along a direction of a common rotational axis (i.e., the lens barrel axis Z0) due to the engagement of the first plurality of relative rotation guide projections 14b with the circumferential groove 18g, the engagement of the second plurality of relative rotation guide projections 14c with the circumferential groove 15e and the engagement of the plurality of relative rotation guide projections 15d with the circumferential groove 14d. Rotation of the third external barrel 15 is transferred to the cam ring 11 via the set of three rotation transfer grooves 15f and the set of three roller followers 32, which are engaged in the set of three rotation transfer grooves 15f, respectively. Since the set of three roller followers 32 are also engaged in the set of three through-slots 14e, respectively, the cam ring 11 moves forward while rotating about the lens barrel axis Z0 relative to the first linear guide ring 14 in accordance with contours of the lead slot portions 14e-3 of the set of three through-slots 14e. Since the first linear guide ring 14 itself moves forward together with the third lens barrel 15 and the helicoid ring 18 as described above, the cam ring 11 moves forward in the optical axis direction by an amount of movement corresponding to the sum of the amount of the forward movement of the first linear guide ring 14 and the amount of the forward movement of the cam ring 11 by engagement of the set of three roller followers 32 with the lead slot portions 14e-3 of the set of three through-slots 14e, respectively.

The above described rotating-advancing operations of the cam ring 11, the third external barrel 15 and the helicoid ring 18 are performed while the set of three rotational sliding projections 18b are moving in the set of three inclined grooves 22c, respectively, only when the male helicoid 18a and the female helicoid 22a are engaged with each other. When the helicoid ring 18 moves forward by a predetermined amount of movement, the male helicoid 18a and the female helicoid 22a are disengaged from each other so that the set of three rotational sliding projections 18b move from the set of three inclined grooves 22c to the set of three rotational sliding grooves 22d, respectively. Since the helicoid ring 18 does not move in the optical axis direction relative to the stationary barrel 22 even if rotating upon the disengagement of the male helicoid 18a from the female helicoid 22a, the helicoid ring 18 and the third external barrel 15 rotate at respective axial fixed positions thereof without moving in the optical axis direction due to the engagement of the set of three rotational sliding projections 18b with the set of three rotational sliding grooves 22d. Furthermore, at substantially the same time when the set of three rotational sliding projections 18b slide into the set of three rotational sliding grooves 22d from the set of three inclined grooves 22c, respectively, the set of three roller followers 32 enter the front circumferential slot portions 14e-1 of the set of three through-slots 14e, respectively. In this state, since the first linear guide ring 14 stops while the set of three roller followers 32 have respectively moved into the front circumferential slot portions 14e-1, the cam ring 11 is not given any force to make the cam ring 11 move forward. Consequently, the cam ring 11 only rotates at an axial fixed position in accordance with rotation of the third external barrel 15.

Rotating the zoom gear 28 in a lens barrel retracting direction thereof by the zoom motor 150 causes the aforementioned movable elements of the zoom lens 71 from the stationary barrel 22 to the cam ring 11 to operate in the reverse manner to the above described advancing operations. In this reverse operation, the above described movable elements of the zoom lens 71 retract to their respective retracted positions shown in FIG. 10 by rotation of the helicoid ring 18 until the set of three roller followers 32 enter the rear circumferential slot portions 14e-2 of the set of three through-slots 14e, respectively.

Figure 18:
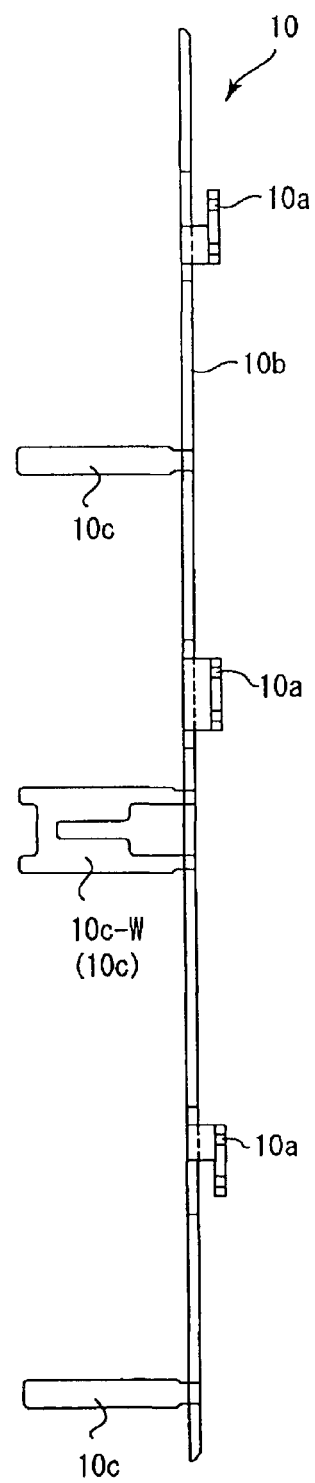
FIG. 18 is a developed view of a second linear guide ring shown in FIG. 1.

The first linear guide ring 14 is provided on an inner peripheral surface thereof with a set of three pairs of first linear guide grooves 14f which are formed at different circumferential positions to extend parallel to the photographing optical axis Z1, and a set of six second linear guide grooves 14g which are formed at different circumferential positions to extend parallel to the photographing optical axis Z1. Each pair of first linear guide grooves 14f are positioned on the opposite sides of the associated linear guide groove 14g (every other linear guide groove 14g) in a circumferential direction of the first linear guide ring 14. The zoom lens 71 is provided inside the first linear guide ring 14 with a second linear guide ring 10. The second linear guide ring 10 is provided on an outer edge thereof with a set of three bifurcated projections 10a which project radially outwards from a ring portion 10b of the second linear guide ring 10. Each bifurcated projection 10a is provided at a radially outer end thereof with a pair of radial projections which are respectively engaged in the associated pair of first linear guide grooves 14f (see FIGS. 3 and 18). On the other hand, a set of six radial projections 13a which are formed on an outer peripheral surface of the second external barrel 13 at a rear end thereof to project radially outwards (see FIG. 3) are engaged in the set of six second linear guide grooves 14g, respectively to be slidable therealong. Therefore, each of the second external barrel 13 and the second linear guide ring 10 is guided in the optical axis direction via the first linear guide ring 14.

Figure 2:
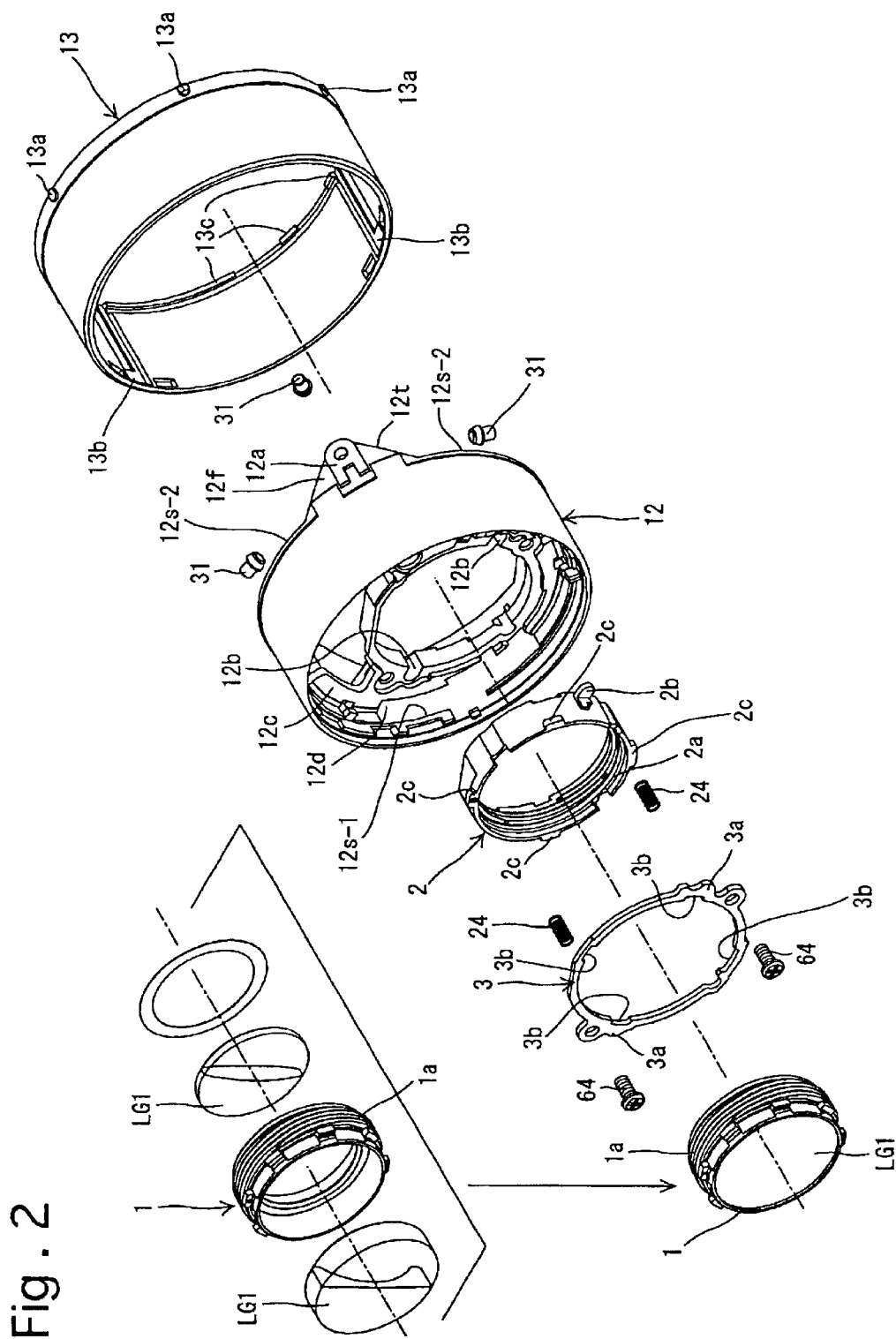
FIG. 2 is an exploded perspective view of a structure supporting a first lens group of the zoom lens.
Figure 3:
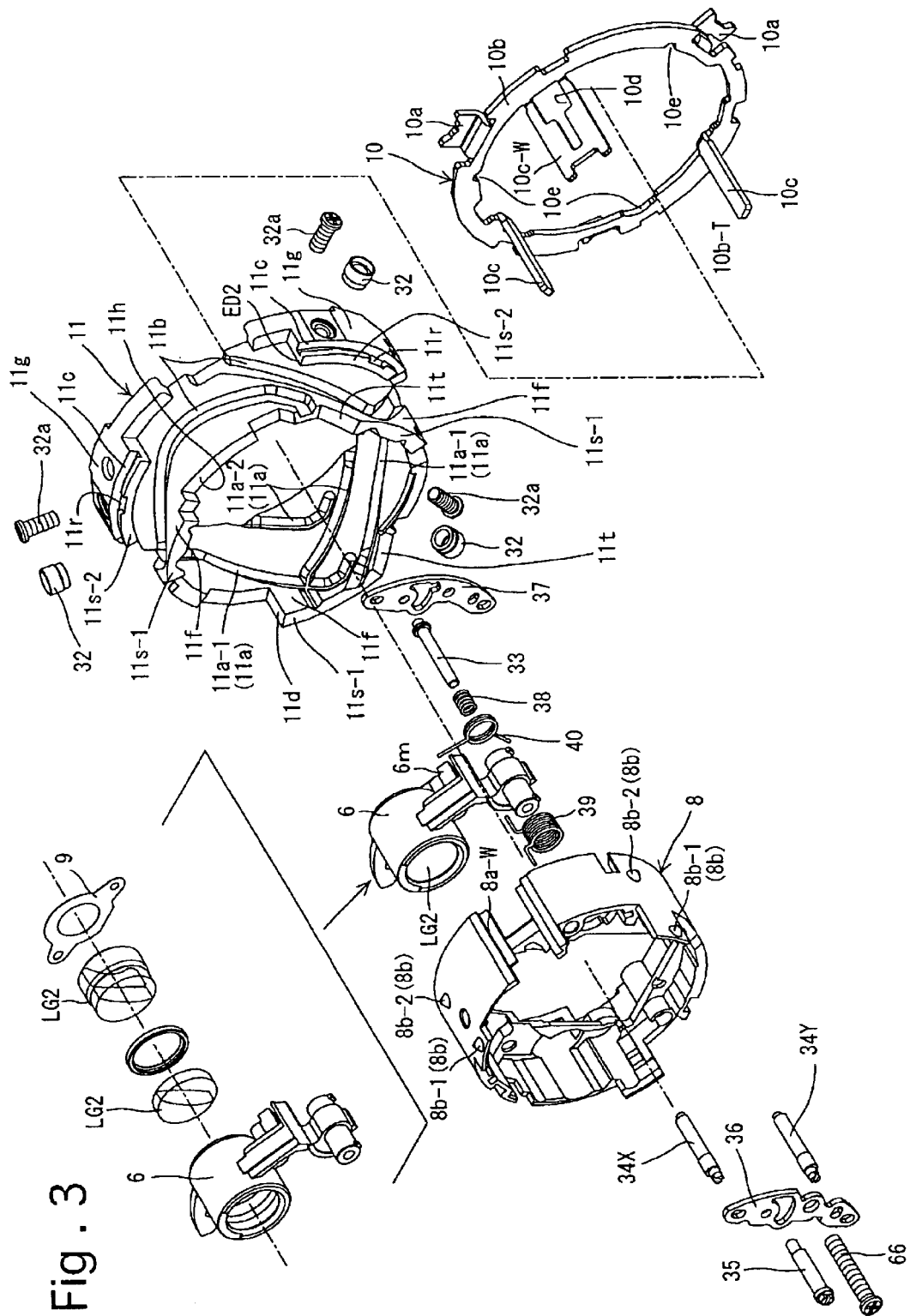
FIG. 3 is an exploded perspective view of a structure supporting a second lens group of the zoom lens.

The zoom lens 71 is provided inside the cam ring 11 with a second lens group moving frame 8 which indirectly supports and holds the second lens group LG2 (see FIG. 3). The first external barrel 12 indirectly supports the first lens group LG1, and is positioned inside the second external barrel 13 (see FIG. 2). The second linear guide ring 10 serves as a linear guide member for guiding the second lens group moving frame 8 linearly without rotating the same, while the second external barrel 13 serves as a linear guide member for guiding the first external barrel 12 linearly without rotating the same.

The second linear guide ring 10 is provided on the ring portion 10b with a set of three linear guide keys 10c (specifically two narrow linear guide keys 10c and a wide linear guide key 10c-W) which project forward in parallel to one another (see FIGS. 3 and 18) from the ring portion 10b. The second lens group moving frame 8 is provided with a corresponding set of three guide grooves 8a (specifically two narrow guide grooves 8a and a wide guide groove 8a-W) in which the set of three linear guide keys 10c are engaged, respectively. As shown in FIGS. 9 and 10, a discontinuous outer edge of the ring portion 10b is engaged in a discontinuous circumferential groove 11e formed on an inner peripheral surface of the cam ring 11 at the rear end thereof to be rotatable about the lens barrel axis Z0 relative to the cam ring 11 and to be immovable relative to the cam ring 11 in the optical axis direction. The set of three linear guide keys 10c project forward from the ring portion 10b to be positioned inside the cam ring 11 opposite edges of each linear guide key 10c in a circumferential direction of the second linear guide ring 10 serve as parallel guide edges which are respectively engaged with circumferentially-opposed guide surfaces in the associated guide groove 8a of the second lens group moving frame 8, which is positioned in the cam ring 11 to be supported thereby, to guide the second lens group moving frame 8 linearly in the optical axis direction without rotating the same about the lens barrel axis Z0.

Figure 125:
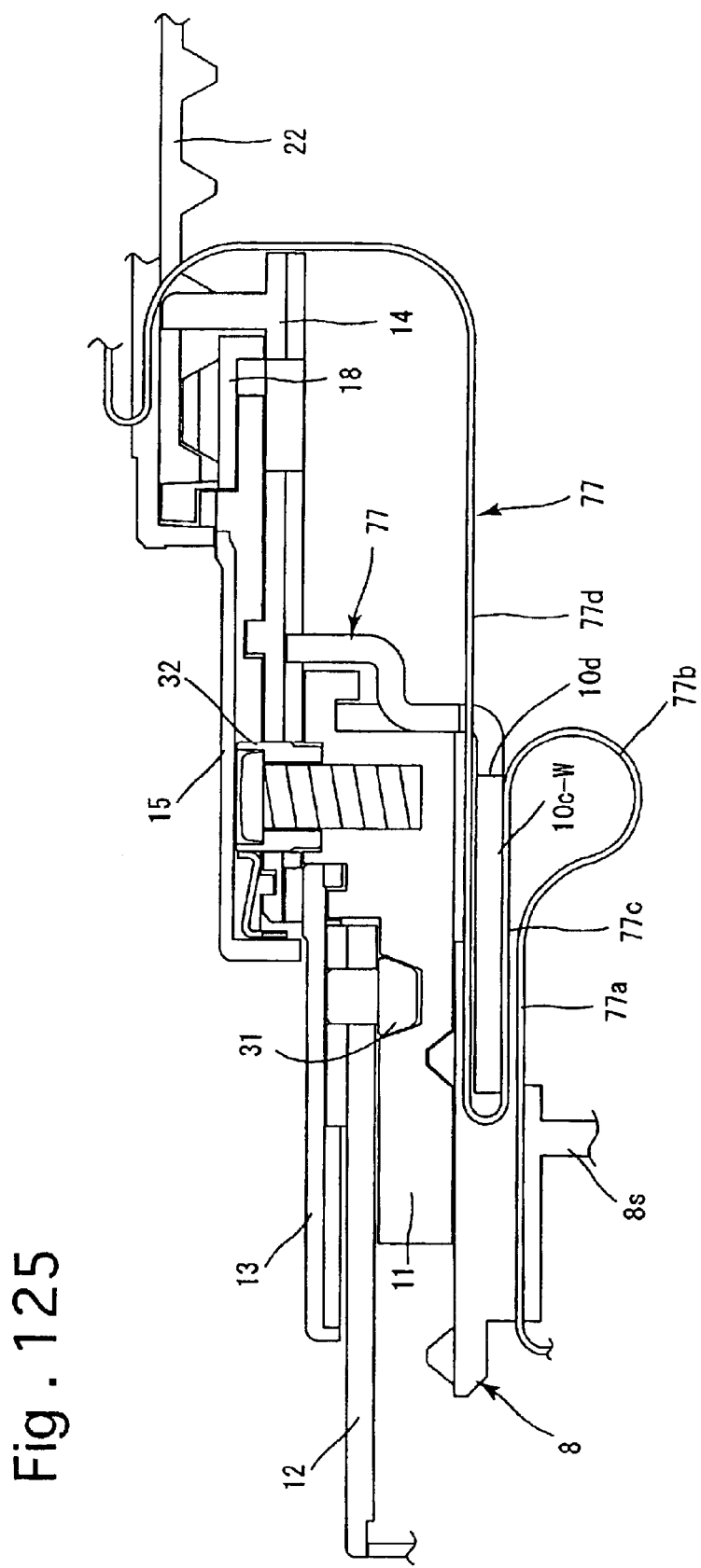

The wide linear guide key 10c-W has a circumferential width greater than those of the other two linear guide keys 10c to also serve as a support member for supporting a flexible PWB (printed wiring board) 77 (see FIGS. 84 through 87) used for exposure control. The wide linear guide key 10c-W is provided thereon with a radial through hole 10d through which the flexible PWB 77 passes (see FIG. 18). A portion of the ring portion 10b from which the wide linear guide key 10c-W projects forward is partly cut out so that the rear end of the radial through hole 10d extends through the rear end of the ring portion 10b. As shown in FIGS. 9 and 125, the flexible PWB 77 for exposure control passes through the radial through hole 10d to extend forward along an outer surface of the wide linear guide key 10c-W from the rear of the ring portion 10b, and subsequently bends radially inwards in the vicinity of the front end of the wide linear guide key 10c-W to extend rearward along an inner surface of the wide linear guide key 10c-W. The wide guide groove 8a-W has a circumferential width greater than those of the other two guide grooves 8a so that the wide linear guide key 10c-W can be engaged in the wide guide groove 8a-W to be slidable therealong. As can be clearly seen in FIG. 19, the second lens group moving frame 8 is provided in the wide guide groove 8a-W with a radial recess 8a-Wa in which the flexible PWB 77 can lie and two separate bottom walls 8a-Wb positioned on opposite sides of the radial recess 8a-Wa to support the wide linear guide key 10c-W thereon. Whereas, each of the other two guide grooves 8a is formed as a simple bottomed groove that is formed on an outer peripheral surface of the second lens group moving frame 8. The second lens group moving frame 8 and the second linear guide ring 10 can be coupled to each other only when the wide linear guide key 10c-W and the wide guide groove 8a-W are aligned in the direction of the lens barrel axis Z0.

Figure 17:
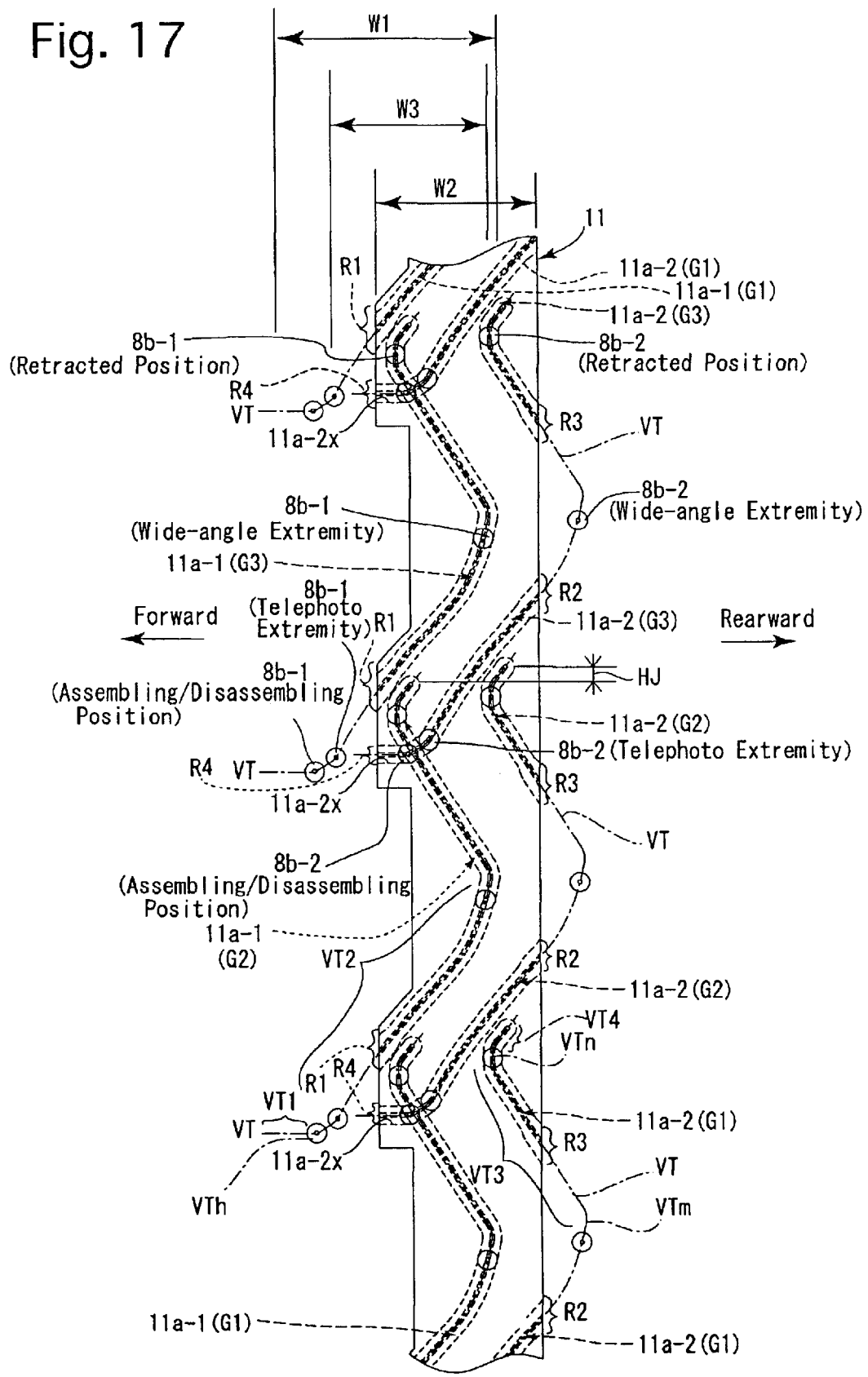
FIG. 17 is a developed view of the cam ring shown in FIG. 1, showing a structure of the inner peripheral surface thereof by broken lines.

The cam ring 11 is provided on an inner peripheral surface thereof with a plurality of inner cam grooves 11a for moving the second lens group LG2. As shown in FIG. 17, the plurality of inner cam grooves 11a are composed of a set of three front inner cam grooves 11a-1 formed at different circumferential positions, and a set of three rear inner cam grooves 11a-2 formed at different circumferential positions behind the set of three front inner cam grooves 11a-1. Each rear inner cam groove 11a-2 is formed on the cam ring 11 as a discontinuous cam groove (see FIG. 17), the detail thereof will be discussed later.

Figure 19:
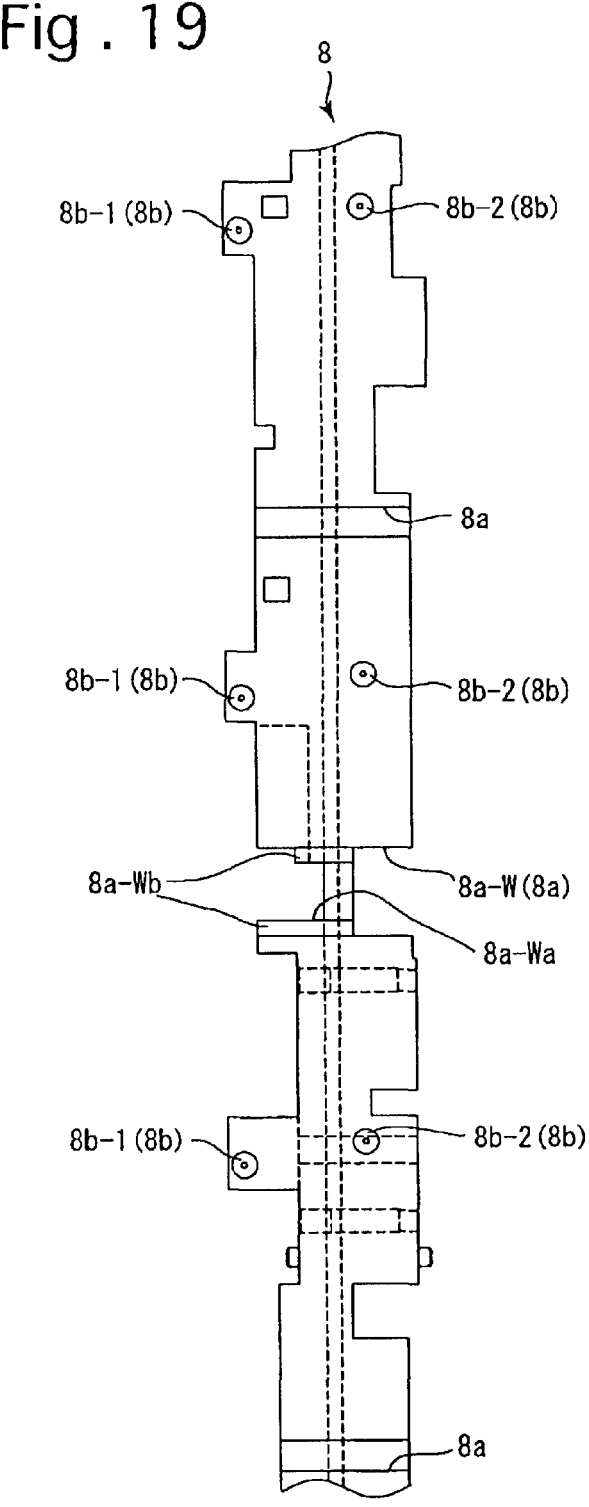
FIG. 19 is a developed view of a second lens group moving frame shown in FIG. 1.

The second lens group moving frame 8 is provided on an outer peripheral surface thereof with a plurality of cam followers 8b. As shown in FIG. 19, the plurality of cam followers 8b include a set of three front cam followers 8b-1 which are formed at different circumferential positions to be respectively engaged in the set of three front inner cam grooves 11a-1, and a set of three rear cam followers 8b-2 which are formed at different circumferential positions behind the set of three front cam followers 8b-1 to be respectively engaged in the set of three rear inner cam grooves 11a-2.

A rotation of the cam ring 11 causes the second lens group moving frame 8 to move in the optical axis direction in a predetermined moving manner in accordance with contours of the plurality of inner cam grooves 11a since the second lens group moving frame 8 is guided linearly in the optical axis direction without rotating via the second linear guide ring 10.

The zoom lens 71 is provided inside the second lens group moving frame 8 with a second lens frame (radially-retractable lens frame) 6 which supports and holds the second lens group LG2. The second lens frame 6 is pivoted on a pivot shaft 33 front and rear ends of which are supported by front and rear second lens frame support plates (a pair of second lens frame support plates) 36 and 37, respectively (see FIGS. 3 and 102 through 105). The pair of second lens frame support plates 36 and 37 are fixed to the second lens group moving frame 8 by a set screw 66. The pivot shaft 33 is a predetermined distance away from the photographing optical axis Z1, and extends parallel to the photographing optical axis Z1. The second lens frame 6 is swingable about the pivot shaft 33 between a photographing position shown in FIG. 9 where the optical axis of the second lens group LG2 coincides with the photographing optical axis Z1 and a radially retracted position (retracted away from the optical axis) shown in FIG. 10 where the optical axis of the second lens group LG2 is eccentric from the photographing optical axis Z1. A rotation limit shaft 35 which determines the photographing position of the second lens frame 6 is mounted to the second lens group moving frame 8. The second lens frame 6 is biased to rotate in a direction to come into contact with the rotation limit shaft 35 by a front torsion coil spring 39. A compression coil spring 38 is fitted on the pivot shaft 33 to remove backlash of the second lens frame 6 in the optical axis direction.

The second lens frame 6 moves together with the second lens group moving frame 8 in the optical axis direction. The CCD holder 21 is provided on a front surface thereof with a position-control cam bar 21a which projects forward from the CCD holder 21 to be engageable with the second lens frame 6 (see FIG. 4). If the second lens group moving frame 8 moves rearward in a retracting direction to approach the CCD holder 21, a retracting cam surface 21c (see FIG. 103) formed on a front end surface of the position-control cam bar 21a comes into contact with a specific portion of the second lens frame 6 to rotate the second lens frame 6 to the radially retracted position.

The second external barrel 13 is provided, on an inner peripheral surface thereof, with a set of three linear guide grooves 13b which are formed at different circumferential positions to extend parallel to one another in the optical axis direction. The first external barrel 12 is provided on an outer peripheral surface at the rear end thereof with a set of three engaging protrusions 12a which are slidably engaged in the set of three linear guide grooves 13b, respectively (see FIGS. 2, 20 and 21). Accordingly, the first external barrel 12 is guided linearly in the optical axis direction without rotating about the lens barrel axis Z0 via the first linear guide ring 14 and the second external barrel 13. The second external barrel 13 is further provided on an inner peripheral surface thereof in the vicinity of the rear end of the second external barrel 13 with a discontinuous inner flange 13c which extends along a circumference of the second external barrel 13. The cam ring 11 is provided on an outer peripheral surface thereof a discontinuous circumferential groove 11c in which the discontinuous inner flange 13c is slidably engaged so that the cam ring 11 is rotatable about the lens barrel axis Z0 relative to the second external barrel 13 and so that the second external barrel 13 is immovable in the optical axis direction relative to the cam ring 11. On the other hand, the first external barrel 12 is provided on an inner peripheral surface thereof with a set of three cam followers 31 which projects radially inwards, while the cam ring 11 is provided on an outer peripheral surface thereof with a set of three outer cam grooves 11b (cam grooves for moving the first lens group LG1) in which the set of three cam followers 31 are slidably engaged, respectively.

The zoom lens 71 is provided inside the first external barrel 12 with a first lens frame 1 which is supported by the first external barrel 12 via a first lens group adjustment ring 2. The first lens group LG1 is supported by the first lens frame 1 to be fixed thereto. The first lens frame 1 is provided on an outer peripheral surface thereof with a male screw thread 1a, and the first lens group adjustment ring 2 is provided on an inner peripheral surface thereof with a female screw thread 2a which is engaged with the male screw thread 1a. The axial position of the first lens frame 1 relative to the first lens group adjustment ring 2 can be adjusted via the male screw thread 1a and the female screw thread 2a. A combination of the first lens frame 1 and the first lens group adjustment ring 2 is positioned inside the first external barrel 12 to be supported thereby and to be movable in the optical axis direction relative to the first external barrel 12. The zoom lens 71 is provided in front of the first external barrel 12 with a fixing ring 3 which is fixed to the first external barrel 12 by two set screws 64 to prevent the first lens group adjustment ring 2 from moving forward and coming off the first external barrel 12.

Figure 1:
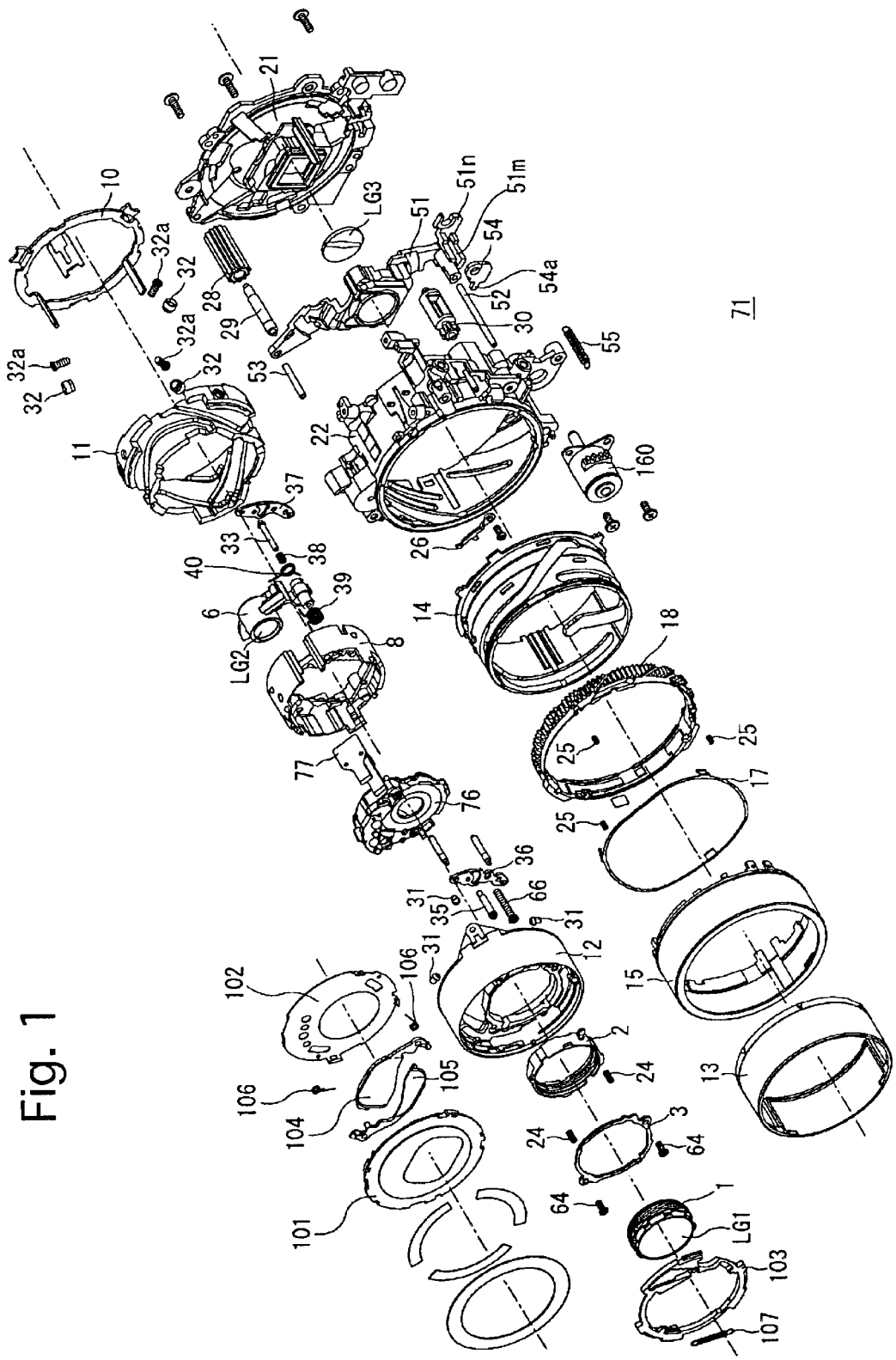
FIG. 1 is an exploded perspective view of an embodiment of a zoom lens according to the present invention.

The zoom lens 71 is provided between the first and second lens groups LG1 and LG2 with a shutter unit 76 including the shutter S and the adjustable diaphragm A (see FIGS. 1, 9 and 10). The shutter unit 76 is positioned in the second lens group moving frame 8 to be supported thereby. The air-distance between the shutter S and the second lens group LG2 is fixed. Likewise, the air-distance between the diaphragm A and the second lens group LG2 is fixed. The zoom lens 71 is provided in front of the shutter unit 76 with a shutter actuator 131 for driving the shutter S, and is provided behind the shutter unit 76 with a diaphragm actuator 132 for driving the diaphragm A (see FIG. 140). The flexible PWB 77 extends from the shutter unit 76 to establish electrical connection between the control circuit 140 and each of the shutter actuator 131 and the diaphragm actuator 132. Note that, in FIG. 9, the flexible PWB 77 is shown in a cross sectional view of a lower half portion of the zoom lens 71 below the photographing optical axis Z1 (the zoom lens 71 set at wide-angle extremity) for the purpose of making the relative locations between the flexible PWB 77 and peripheral elements clearly understandable though the flexible PWB 77 is actually disposed only in the space above the photographing optical axis Z1 in the zoom lens 71.

The zoom lens 71 is provided at the front end of the first external barrel 12 with a lens barrier mechanism which automatically closes a front end aperture of the zoom lens 71 when the zoom lens 71 is retracted into the camera body 72 to protect the frontmost lens element of the photographing optical system of the zoom lens 71, i.e. the first lens group LG1, from getting stains and scratches thereon when the digital camera 70 is not in use. As shown in FIGS. 1, 9 and 10, the lens barrier mechanism is provided with a pair of barrier blades 104 and 105. The pair of barrier blades 104 and 105 are rotatable about two pivots projecting rearward therefrom to be positioned on radially opposite sides of the photographing optical axis Z1, respectively. The lens barrier mechanism is further provided with a pair of barrier blade biasing springs 106, a barrier blade drive ring 103, a drive ring biasing spring 107 and a barrier blade holding plate 102. The pair of barrier blades 104 and 105 are biased to rotate in opposite directions to be closed by the pair of barrier blade biasing springs 106, respectively. The barrier blade drive ring 103 is rotatable about the lens barrel axis Z0, and is engaged with the pair of barrier blades 104 and 105 to open the pair of barrier blades 104 and 105 when driven to rotate in a predetermined rotational direction. The barrier blade drive ring 103 is biased to rotate in a barrier opening direction to open the pair of barrier blades 104 and 105 by the drive ring biasing spring 107. The barrier blade holding plate 102 is positioned between the barrier blade drive ring 103 and the pair of barrier blades 104 and 105. The spring force of the drive ring biasing spring 107 is greater than the spring force of the pair of barrier blade biasing springs 106 so that the barrier blade drive ring 103 is held by the spring force of the drive ring biasing spring 107 in a specific rotational position thereof to open the pair of barrier blades 104 and 105 against the biasing force of the pair of barrier blade biasing springs 106 in the state shown in FIG. 9 where the zoom lens 71 has been extended forward to a point in a zooming range (zooming operation performable range) where a zooming operation can be carried out. In the course of the retracting movement of the zoom lens 71 to the retracted position shown in FIG. 10 from a position in the zooming range, the barrier blade drive ring 103 is forcefully rotated in a barrier closing direction opposite to the aforementioned barrier opening direction by a barrier drive ring pressing surface 11d (see FIGS. 3 and 16) formed on the cam ring 11. This rotation of the barrier blade drive ring 103 causes the barrier blade drive ring 103 to be disengaged from the pair of barrier blades 104 and 105 so that the pair of barrier blades 104 and 105 are closed by the spring force of the pair of barrier blade biasing springs 106. The zoom lens 71 is provided immediately in front of the lens barrier mechanism with a substantially round lens barrier cover (decorative plate) 101 which covers the front of the lens barrier mechanism.

A lens barrel advancing operation and a lens barrel retracting operation of the zoom lens 71 having the above described structure will be discussed hereinafter.

The stage at which the cam ring 11 is driven to advance from the retracted position shown in FIG. 10 to the position shown in FIG. 9 where the cam ring 11 rotates at the axial fixed position without moving in the optical axis direction has been discussed above, and will be briefly discussed hereinafter.

In the state shown in FIG. 10 in which the zoom lens 71 is in the retracted state, the zoom lens 71 is fully accommodated in the camera body 72 so that the front face of the zoom lens 71 is substantially flush with the front face of the camera body 72. Rotating the zoom gear 28 in the lens barrel advancing direction by the zoom motor 150 causes a combination of the helicoid ring 18 and the third external barrel 15 to move forward while rotating about the lens barrel axis Z0 due to engagement of the female helicoid 22a with the male helicoid 18a, and further causes the first linear guide ring 14 to move forward together with the helicoid ring 18 and the third external barrel 15. At this time, the cam ring 11 which rotates by rotation of the third external barrel 15 moves forward in the optical axis direction by an amount of movement corresponding to the sum of the amount of the forward movement of the first linear guide ring 14 and the amount of the forward movement of the cam ring 11 by a leading structure between the cam ring 11 and the first linear guide ring 14, i.e., by engagement of the set of three roller followers 32 with the lead slot portions 14e-3 of the set of three through-slots 14e, respectively. Once the combination of the helicoid ring 18 and the third external barrel 15 advances to a predetermined point, the male helicoid 18a is disengaged from the female helicoid 22a while the set of three roller followers 32 are disengaged from the lead slot portions 14e-3 to enter the front circumferential slot portions 14e-1, respectively. Consequently, each of the helicoid ring 18 and the third external barrel 15 rotates about the lens barrel axis Z0 without moving in the optical axis direction.

A rotation of the cam ring 11 causes the second lens group moving frame 8, which is positioned inside the cam ring 11, to move in the optical axis direction with respect to the cam ring 11 in a predetermined moving manner due to the engagement of the set of three front cam followers 8b-1 with the set of three front inner cam grooves 11a-1 and the engagement of the set of three rear cam followers 8b-2 with the set of three rear inner cam grooves 11a-2, respectively. In the state shown in FIG. 10 in which the zoom lens 71 is in the retracted state, the second lens frame 6, which is positioned inside the second lens group moving frame 8, has rotated about the pivot shaft 33 to be held in the radially retracted position above the photographing optical axis Z1 by the position-control cam bar 21a so that the optical axis of the second lens group LG2 moves from the photographing optical axis Z1 to a retracted optical axis Z2 positioned above the photographing optical axis Z1. In the course of movement of the second lens group moving frame 8 from the retracted position to a position in the zooming range as shown in FIG. 9, the second lens frame 6 is disengaged from the position-control cam bar 21a to rotate about the pivot shaft 33 from the radially retracted position to the photographing position shown in FIG. 9 where the optical axis of the second lens group LG2 coincides with the photographing optical axis Z1 by the sprig force of the front torsion coil spring 39. Thereafter, the second lens frame 6 remains to be held in the photographing position until when the zoom lens 71 is retracted into the camera body 72.

In addition, a rotation of the cam ring 11 causes the first external barrel 12, which is positioned around the cam ring 11 and guided linearly in the optical axis direction without rotating about the lens barrel axis Z0, to move in the optical axis direction relative to the cam ring 11 in a predetermined moving manner due to engagement of the set of three cam followers 31 with the set of three outer cam grooves 11b, respectively.

Therefore, an axial position of the first lens group LG1 relative to a picture plane (a light-sensitive surface of the CCD image sensor 60) when the first lens group LG1 is moved forward from the retracted position is determined by the sum of the amount of forward movement of the cam ring 11 relative to the stationary barrel 22 and the amount of movement of the first external barrel 12 relative to the cam ring 11, while an axial position of the second lens group LG2 relative to the picture plane when the second lens group LG2 is moved forward from the retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the space therebetween. When the zoom lens 71 is driven to advance from the retracted position shown in FIG. 10, the zoom lens 71 firstly goes into a state shown below the photographing lens axis Z1 in FIG. 9 in which the zoom lens 71 is set at wide-angle extremity. Subsequently, the zoom lens 71 goes into the state shown above the photographing lens axis Z1 in FIG. 9 in which the zoom lens 71 is set at telephoto extremity by a further rotation of the zoom motor 150 in a lens barrel advancing direction thereof. As can be seen from FIG. 9, the space between the first and second lens groups LG1 and LG2 when the zoom lens 71 is set at the wide-angle extremity is greater than that when the zoom lens 71 is set at the telephoto extremity. When the zoom lens 71 is set at the telephoto extremity as shown above the photographing lens axis Z1 in FIG. 9, the first and second lens groups LG1 and LG2 have moved to approach each other to have some space therebetween which is smaller than the space in the zoom lens 71 set at the wide-angle extremity. This variation of the space between the first and second lens groups LG1 and LG2 for zooming operation is achieved by contours of the plurality of inner cam grooves 11a (11a-1 and 11a-2) and the set of three outer cam grooves 11b. In the zooming range between the wide-angle extremity and the telephoto extremity, the cam ring 11, the third external barrel 15 and the helicoid ring 18 rotate at their respective axial fixed positions, i.e., without moving in the optical axis direction.

When the first through third lens groups LG1, LG2 and LG3 are in the zooming range, a focusing operation is carried out by moving the third lens group L3 along the photographing optical axis Z1 by rotation of the AF motor 160 in accordance with an object distance.

Driving the zoom motor 150 in a lens barrel retracting direction causes the zoom lens 71 to operate in the reverse manner to the above described advancing operation to fully retract the zoom lens 71 into the camera body 72 as shown in FIG. 10. In the course of this retracting movement of the zoom lens 71, the second lens frame 6 rotates about the pivot shaft 33 to the radially retracted position by the position-control cam bar 21a while moving rearward together with the second lens group moving frame 8. When the zoom lens 71 is fully retracted into the camera body 72, the second lens group LG2 is retracted into the space radially outside the space in which the third lens group LG3, the low-pass filter LG4 and the CCD image sensor 60 are retracted as shown in FIG. 10, i.e., the second lens group LG2 is radially retracted into an axial range substantially identical to an axial range in the optical axis direction in which the third lens group LG3, the low-pass filter LG4 and the CCD image sensor 60 are positioned. This structure of the camera 70 for retracting the second lens group LG2 in this manner reduces the length of the zoom lens 71 when the zoom lens 71 is fully retracted, thus making it possible to reduce the thickness of the camera body 72 in the optical axis direction, i.e., in the horizontal direction as viewed in FIG. 10.

As described above, the helicoid ring 18, the third external barrel 15 and the cam ring 11 move forward while rotating at the stage at which the zoom lens 71 changes from the retracted state shown in FIG. 10 to a ready-to-photograph state shown in FIG. 9 (in which the first through third lens groups LG1, LG2 and LG3 remain within the zooming range), whereas the helicoid ring 18, the third external barrel 15 and the cam ring 11 rotate at the respective axial fixed positions thereof without moving in the optical axis direction when the zoom lens 71 is in the ready-to-photograph state. The third external barrel 15 and the helicoid ring 18 are engaged with each other to be rotatable together about the lens barrel axis Z0 by making the three pairs of rotation transfer projections 15a inserted into the three rotation transfer recesses 18d, respectively. In this state where the three pairs of rotation transfer projections 15a are respectively engaged in the three rotation transfer recesses 18d, the set of three engaging projections 15b are respectively engaged in the set of three engaging recesses 18e, which are formed on inner peripheral surfaces of the helicoid ring 18 in three rotational sliding projections 18b, respectively (see FIGS. 37 and 38). In a state where the relative rotational angle about the lens barrel axis Z0 between the third external barrel 15 and the helicoid ring 18 is such that the three pairs of rotation transfer projections 15a are respectively engaged in the three rotation transfer recesses 18d and that the set of three engaging projections 15b are respectively engaged in the set of three engaging recesses 18e, the front ends of the three compression coil springs 25, the rear ends of which are respectively inserted in the three spring support holes 18f on the front end of the helicoid ring 18, are respectively in pressing contact with the three engaging recesses 15c that are formed at the rear end of the third external barrel 15.

Each of the helicoid ring 18 and the third external barrel 15 is coupled to the first linear guide ring 14 to make respective relative rotations between the third external barrel 15 and the first linear guide ring 14 and between the helicoid ring 18 and the first linear guide ring 14 possible due to the engagement of the first plurality of relative rotation guide projections 14b with the circumferential groove 18g, the engagement of the second plurality of relative rotation guide projections 14c with the circumferential groove 15e and the engagement of the plurality of relative rotation guide projections 15d with the circumferential groove 14d. As can be seen in FIGS. 33 through 36, the second plurality of relative rotation guide projections 14c and the circumferential groove 15e are engaged with each other to be slightly movable relative to each other in the optical axis direction, the plurality of relative rotation guide projections 15d and the circumferential groove 14d are engaged with each other to be slightly movable relative to each other in the optical axis direction, and the first plurality of relative rotation guide projections 14b and the circumferential groove 18g are engaged with each other to be slightly movable relative to each other in the optical axis direction. Accordingly, the helicoid ring 18 and the third external barrel 15 are slightly movable relative to each other in the optical axis direction even though prevented from being separated totally from each other in the optical axis direction via the first linear guide ring 14. The amount of play (clearance) between the helicoid ring 18 and the first linear guide ring 14 in the optical axis direction is greater than that between the third external barrel 15 and the first linear guide ring 14.

When the third external barrel 15 and the helicoid ring 18 are engaged with each other to be rotatable relative to the first linear guide ring 14, the spaces between the three spring support holes 18f and the three engaging recesses 15c in the optical axis direction are smaller than the free lengths of the three compression coil springs 25 so that the three compression coil springs 25 are compressed and held between opposed end surfaces of the third external barrel 15 and the helicoid ring 18. The three compression coil springs 25 compressed between the opposed end surfaces of the third external barrel 15 and the helicoid ring 18 bias the third external barrel 15 and the helicoid ring 18 in opposite directions away from each other by the resilience of the three compression coil springs 25, i.e., bias the third external barrel 15 and the helicoid ring 18 forward and rearward in the optical axis direction by the resilience of the three compression coil springs 25, respectively.

As shown in FIGS. 27 through 31, the stationary barrel 22 is provided in each of the three inclined grooves 22c with two opposed inclined surfaces 22c-A and 22c-B which are apart from each other in a circumferential direction of the stationary barrel. The helicoid ring 18 is provided, on opposite side edges of each of the three rotational sliding projections 18b in a circumferential direction of the helicoid ring 18, with two circumferential end surfaces 18b-A and 18b-B which face the two opposed inclined surfaces 22c-A and 22c-B in the associated inclined grooves 22c, respectively. Each of the two opposed inclined surfaces 22c-A and 22c-B in each inclined groove 22c extend parallel to threads of the female helicoid 22a. The two circumferential end surfaces 18b-A and 18b-B of each of the three rotational sliding projections 18b are parallel to the two opposed inclined surfaces 22c-A and 22c-B in the associated inclined groove 22c, respectively. The two circumferential end surfaces 18b-A and 18b-B of each rotational sliding projection 18b are shaped so as not to interfere with the two opposed inclined surfaces 22c-A and 22c-B in the associated inclined groove 22c, respectively. More specifically, when the male helicoid 18a are engaged with the female helicoid 22a, the two opposed inclined surfaces 22c-A and 22c-B in each inclined groove 22c do not hold the associated rotational sliding projection 18b therebetween as shown in FIG. 31. In other words, the two opposed inclined surfaces 22c-A and 22c-B in each inclined groove 22c are not engaged with the two circumferential end surfaces 18b-A and 18b-B of the associated rotational sliding projection 18b, respectively, when the male helicoid 18a are engaged with the female helicoid 22a.

One of the three rotational sliding projections 18b is provided on the circumferential end surface 18b-A thereof with an engaging surface 18b-E (see FIGS. 37, 38, 39, 42 and 43) with which the stop projection 26b of the stop member 26 can be engaged. The engaging surface 18b-E is parallel to the lens barrel axis Z0.

Figure 37:
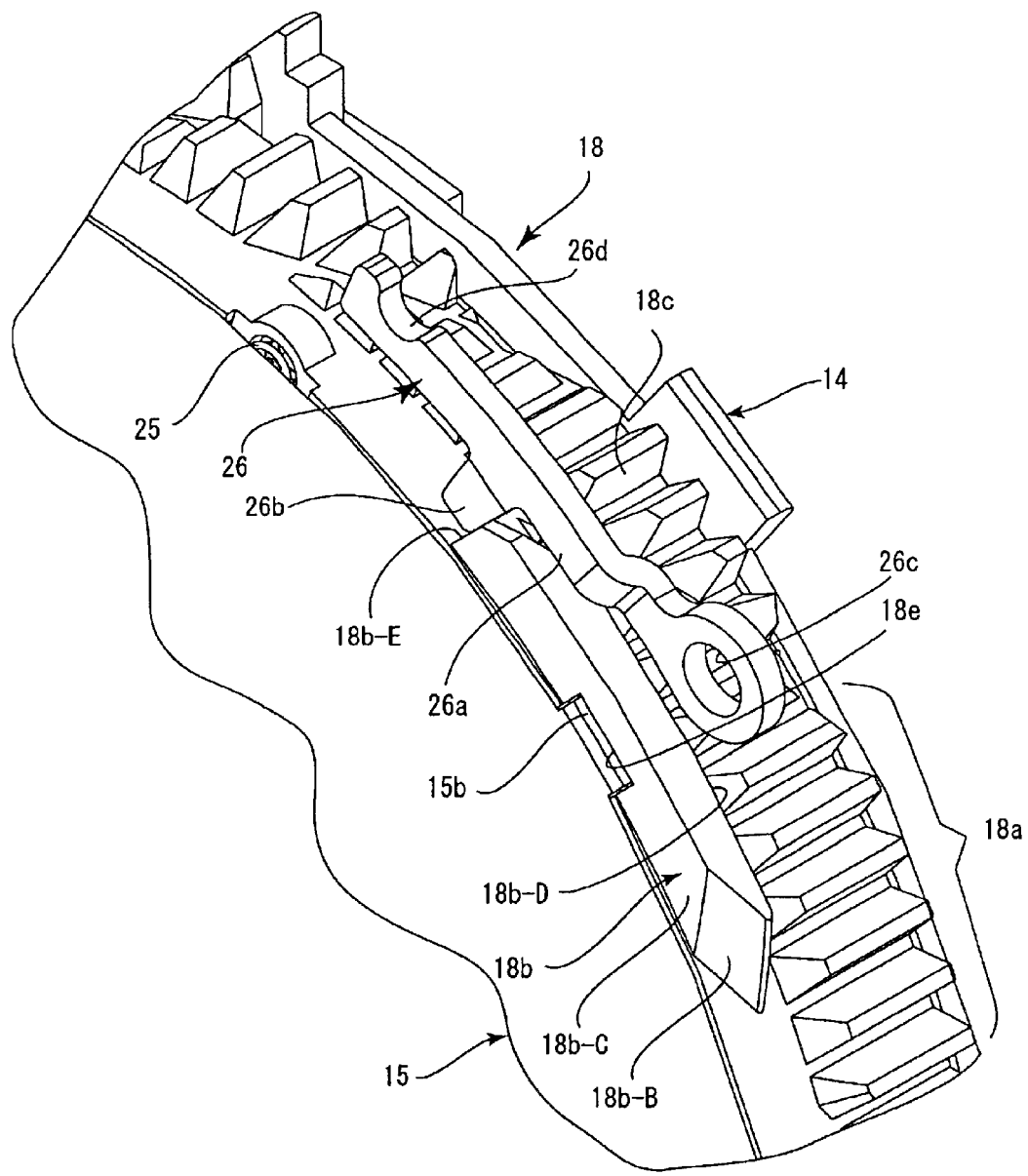
FIG. 37 is an enlarged perspective view of a portion of the connecting portion between the third external barrel and the helicoid ring.
Figure 38:
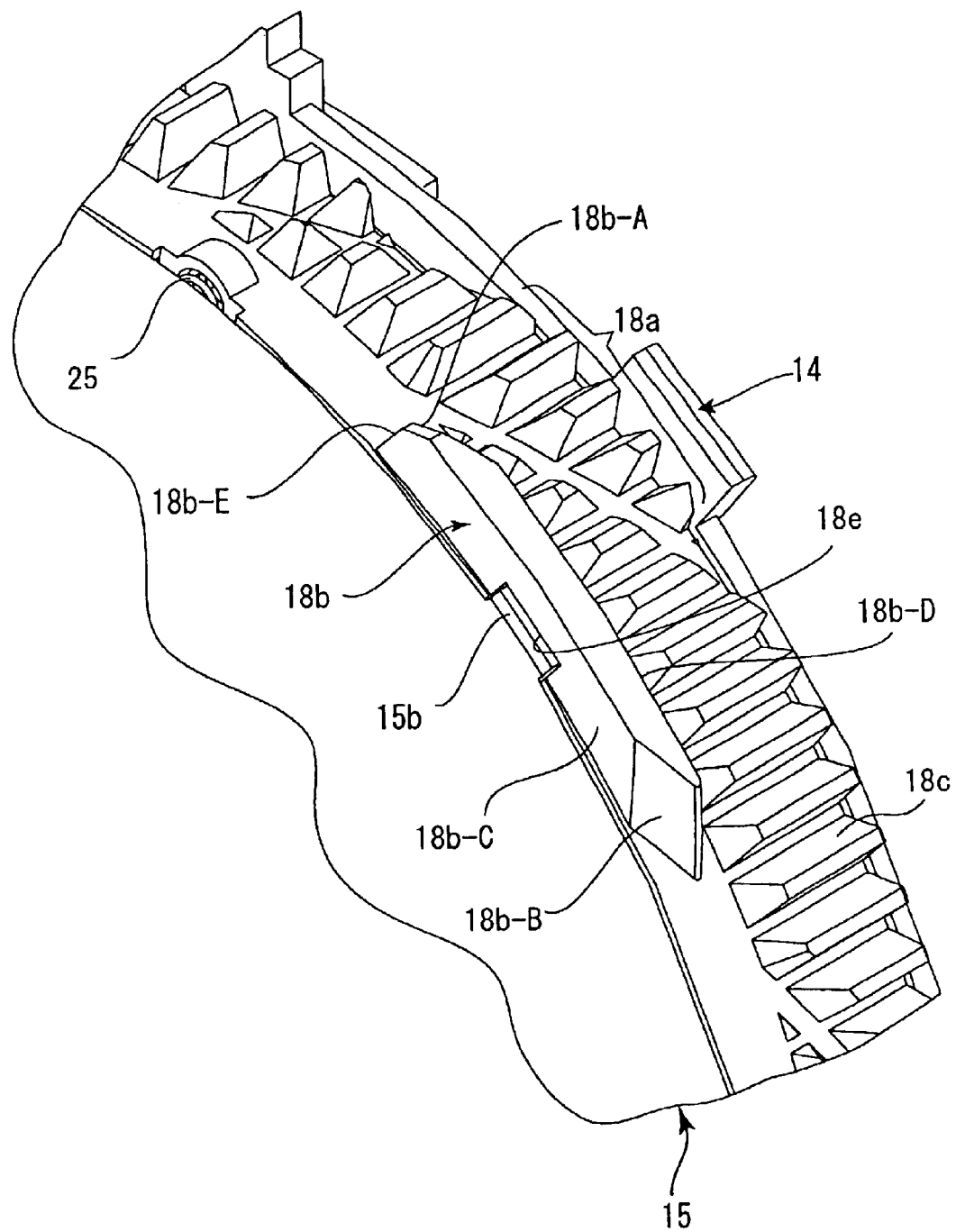
FIG. 38 is a view similar to that of FIG. 37, showing a state where a stop member has been removed.
Figure 39:
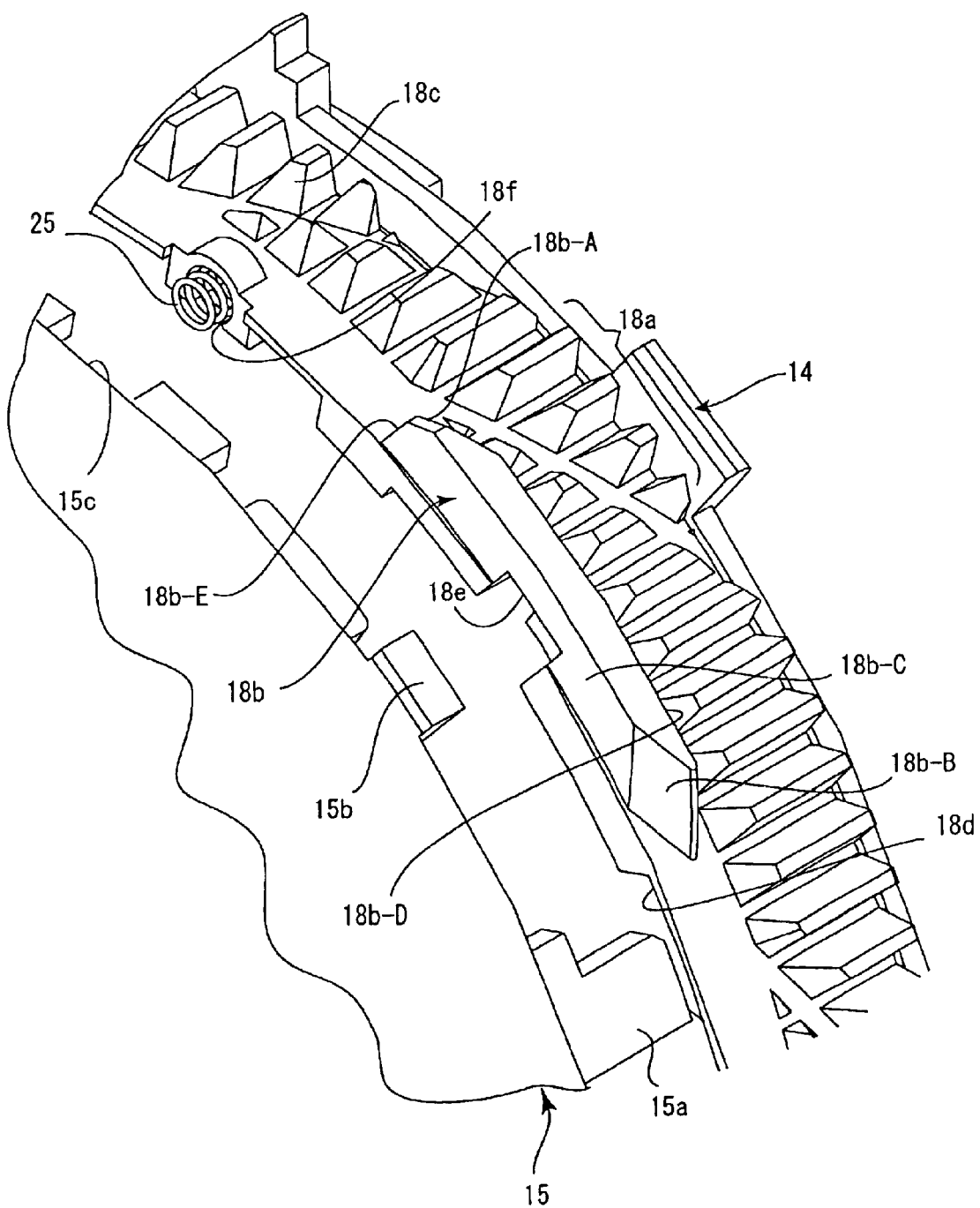
FIG. 39 is a view similar to that of FIG. 38, showing a state where the third external barrel and the helicoid ring have been disengaged from each other in the optical axis direction from the state shown in FIG. 38.

As described above, the stationary barrel 22 is provided in each of the set of three rotational sliding grooves 22d with two opposed surfaces: the front guide surface 22d-A and the rear guide surface 22d-B which are apart from each other in the optical axis direction to extend parallel to each other. Each of the three rotational sliding projections 18b is provided with a front sliding surface 18b-C and a rear sliding surface 18b-D which extend parallel to each other to be slidable on the front guide surface 22d-A and the rear guide surfaces 22d-B, respectively. As shown in FIGS. 37 through 39, the set of three engaging recesses 18e are respectively formed on front sliding surfaces 18b-C of the three rotational sliding projections 18b of the helicoid ring 18 to be open at the front end of the helicoid ring 18.

Figure 27:
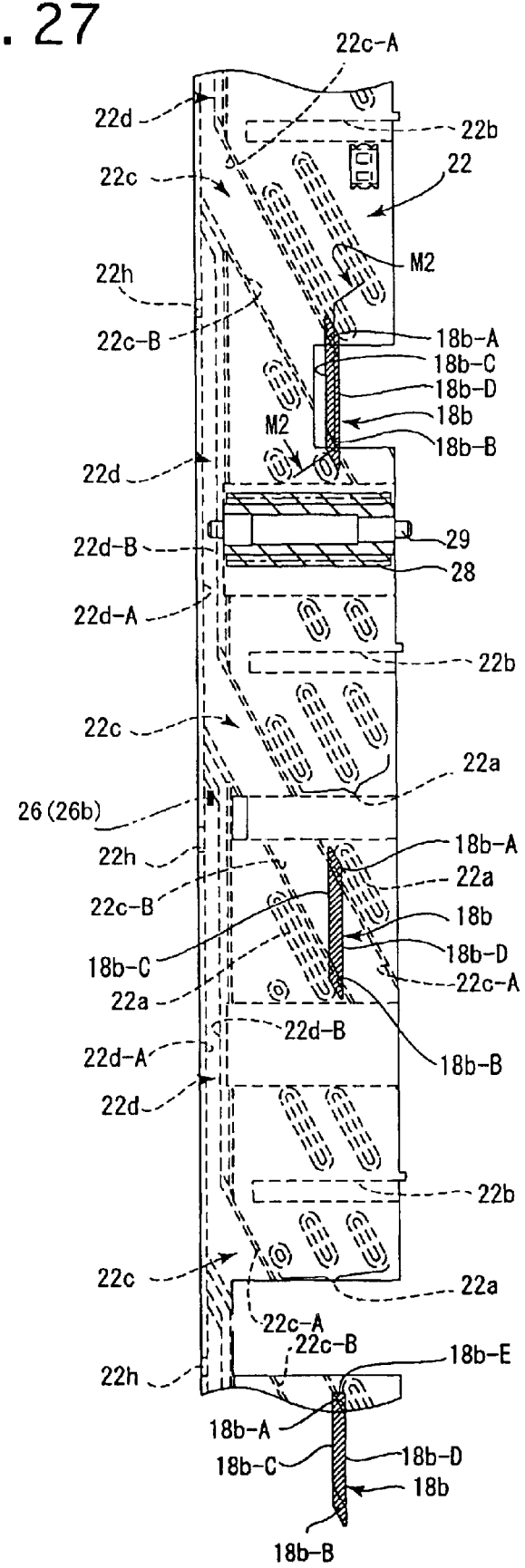
FIG. 27 is a developed view of the stationary barrel, showing the positions of a set of rotational sliding projections of the helicoid ring with respect to the stationary barrel in the retracted state of the zoom lens.

In the state shown in FIGS. 23 and 27 in which the zoom lens 71 is in the retracted state, the two circumferential end surfaces 18b-A and 18b-B of each rotational sliding projection 18b are not in contact with the two opposed inclined surfaces 22c-A and 22c-B in each inclined groove 22c though the set of three rotational sliding projections 18b are positioned in the set of three inclined grooves 22c, respectively, as shown in FIG. 31. In the retracted state of the zoom lens 71, the male helicoid 18a is engaged with the female helicoid 22a while the set of three rotational sliding projections 18b are engaged in the set of three inclined grooves 22c, respectively. Therefore, if the helicoid ring 18 is rotated in a lens barrel advancing direction (in an upward direction as viewed in FIG. 23) by rotation of the zoom gear 28 that is in mesh with the annular gear 18c of the helicoid ring 18, the helicoid ring 18 moves forward in the optical axis direction (in a leftward direction as viewed in FIG. 23) while rotating about the lens barrel axis Z0 due to engagement of the male helicoid 18a with the female helicoid 22a. During this rotating-advancing operation of the helicoid ring 18, the set of three rotational sliding projections 18b do not interfere with the stationary barrel 22 since the set of three rotational sliding projections 18b move in the set of three set of three inclined grooves 22c therealong, respectively.

Figure 35:
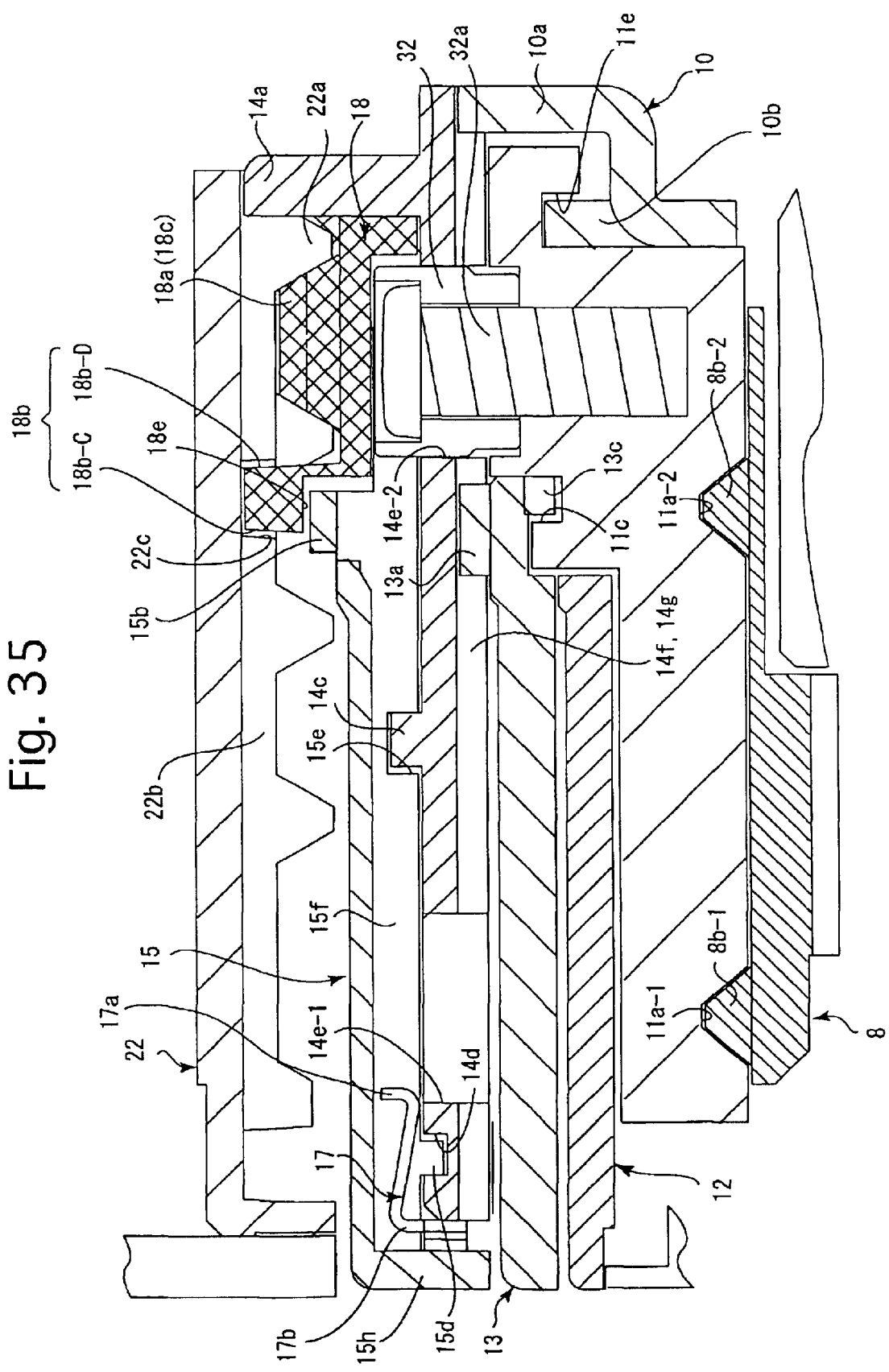
FIG. 35 is an enlarged cross sectional view of a portion of the upper half of the zoom lens shown in FIG. 10.
Figure 36:
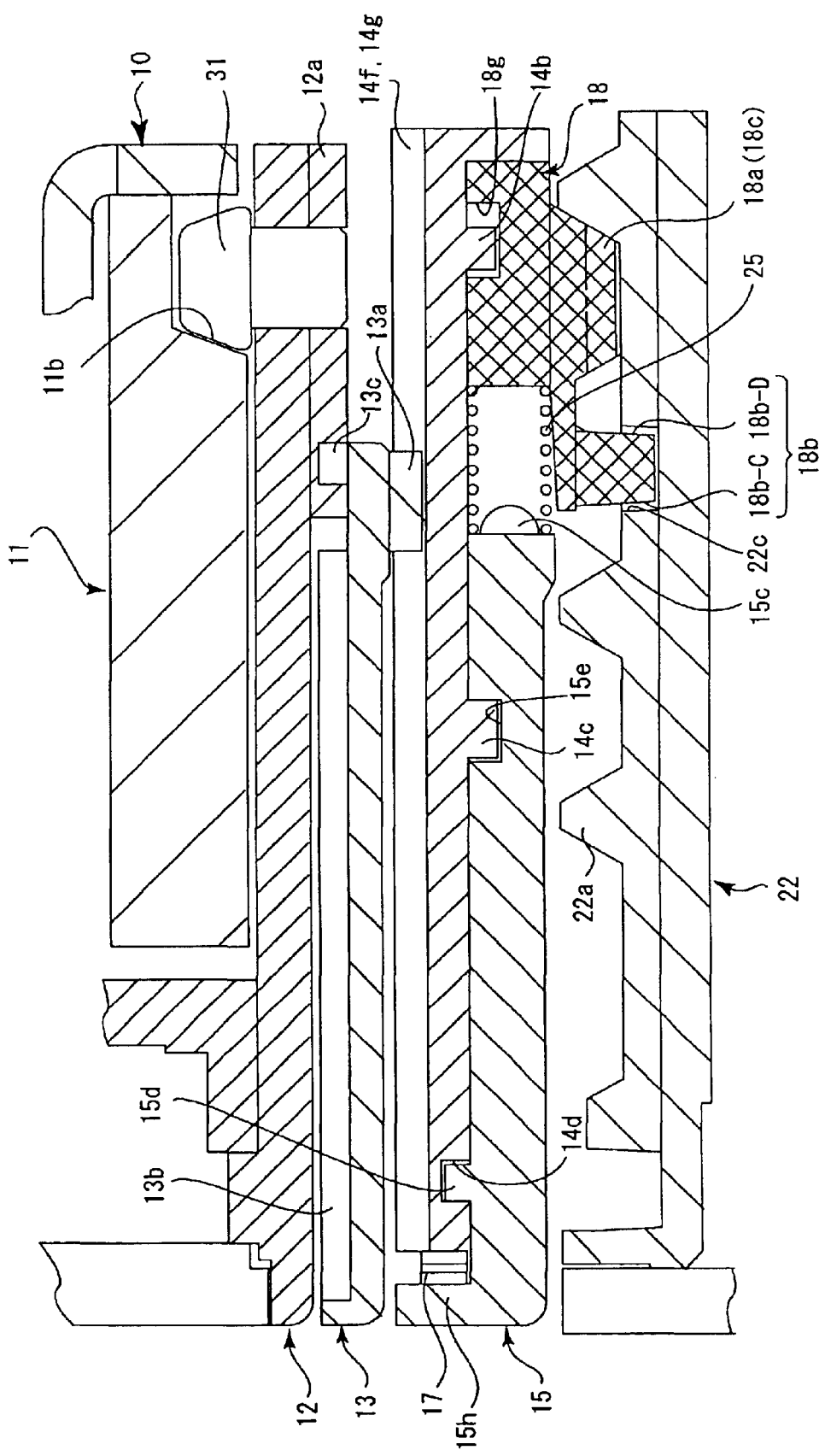
FIG. 36 is an enlarged cross sectional view of a portion of the lower half of the zoom lens shown in FIG. 10.

When the set of three rotational sliding projections 18b are respectively positioned in the set of three set of three inclined grooves 22c, positions of the set of three engaging projections 15b in the optical axis direction are not limited by the set of three inclined grooves 22c, respectively, and also a position of the front sliding surface 18b-C and a position of the rear sliding surface 18b-D of each rotational sliding projection 18b in the optical axis direction are not limited by the associated inclined groove 22c. As shown in FIGS. 35 and 36, the third external barrel 15 and the helicoid ring 18, which are biased in opposite directions away from each other by the spring force of the three compression coil springs 25, are slightly apart from each other in the optical axis direction by a distance corresponding to the amount of clearance between the relative rotation guide projections 14b, 14c and 15d and the circumferential grooves 18g, 15e and 14d, respectively, i.e., by a distance corresponding to the sum of the amount of play (clearance) between the helicoid ring 18 and the first linear guide ring 14 in the optical axis direction and the amount of play (clearance) between the third external barrel 15 and the first linear guide ring 14 in the optical axis direction. In this state, the spring force of the three compression coil springs 25 by which the third external barrel 15 and the helicoid ring 18 are biased in opposite directions away from each other is small because the three compression coil springs 25 are not compressed largely, so that the space between the third external barrel 15 and the helicoid ring 18 is loosely maintained. The existence of this loosely maintained space does not become a substantial problem because any pictures are not taken during the translation of the zoom lens 71 from the retracted state to the ready-to-photograph state, i.e., when the set of three rotational sliding projections 18b are engaged in the set of three inclined grooves 22c. In retractable telescoping type zoom lenses including the preset embodiment of the zoom lens 71, it is generally the case that the total time in which the zoom lens is in the retracted position (including the time when the power is OFF) is greater than the service hours (operating time). Accordingly, it is desirable to apply no heavy load to biasing members such as three compression coil springs 25 to prevent the biasing members from deteriorating with time unless the zoom lens is in the ready-to-photograph state. In addition, if the spring force of the three compression coil springs 25 is small, only a little load is applied to the associated moving parts of the zoom lens 71 during the translation of the zoom lens 71 from the retracted state to the ready-to-photograph state. This lessens the loads applied to the zoom motor 150.

A forward movement of the helicoid ring 18 in the optical axis direction causes the first linear guide ring 14 to move together with the helicoid ring 18 in the optical axis direction due to engagement of the engagement of the first plurality of relative rotation guide projections 14b with the circumferential groove 18g. At the same time, a rotation of the helicoid ring 18 is transferred to the cam ring 11 via the third external barrel 15 to move the cam ring 11 forward in the optical axis direction while rotating the cam ring 11 about the lens barrel axis Z0 relative to the first linear guide ring 14 by engagement of the set of three roller followers 32 with the lead slot portions 14e-3 of the set of three through-slots 14e, respectively. This rotation of the cam ring 11 causes the first lens group LG1 and the second lens group LG2 to move along the photographing optical axis Z1 in a predetermined moving manner in accordance with contours of the set of three outer cam grooves 11b for moving the first lens group LG1 and the plurality of inner cam grooves 11a (11a-1 and 11a-2) for moving the second lens group LG2.

Upon moving beyond the front ends of the set of three inclined grooves 22c, the set of three rotational sliding projections 18b enter the set of three rotational sliding grooves 22d, respectively. The ranges of formation of the male helicoid 18a and the female helicoid 22a on the helicoid ring 18 and the stationary barrel 22, respectively, are determined so that the male helicoid 18a and the female helicoid 22a are disengaged from each other at the time when the set of three rotational sliding projections 18b enter the set of three rotational sliding grooves 22d, respectively. More specifically, the stationary barrel 22 is provided, on an inner peripheral surface thereof immediately behind the set of three rotational sliding grooves 22d, with the aforementioned non-helicoid area 22z, on which no threads of the female helicoid 22a are formed, and the width of the non-helicoid area 22z in the optical axis direction is greater than the width of that area on the outer peripheral surface of the helicoid ring 18 on which the male helicoid 18 is formed in the optical axis direction. On the other hand, the space between the male helicoid 18a and the set of three rotational sliding projections 18b in the optical axis direction is determined so that the male helicoid 18a and the set of three rotational sliding projections 18b are positioned within the non-helicoid area 22z in the optical axis direction when the set of three rotational sliding projections 18b are positioned in the set of three rotational sliding grooves 22d, respectively. Therefore, at the time when the set of three rotational sliding projections 18b respectively enter the set of three rotational sliding grooves 22d, the male helicoid 18a and the female helicoid 22a are disengaged from each other, so that the helicoid ring 18 does not move in the optical axis direction even if rotating about the lens barrel axis Z0 relative to the stationary barrel 22. Thereafter, the helicoid ring 18 rotates about the lens barrel axis Z0 without moving in the optical axis direction in accordance with rotation of the zoom gear 28 in the lens barrel advancing direction. As shown in FIG. 24, the zoom gear 28 remains engaged with the annular gear 18c even after the helicoid ring 18 has moved to the fixed axis position thereof, at which the helicoid ring 18 rotates about the lens barrel axis Z0 without moving in the optical axis direction due to the engagement of the set of three rotational sliding projections 18b with the set of three rotational sliding grooves 22d. This makes it possible to continue to transfer rotation of the zoom gear 28 to the helicoid ring 18.

Figure 28:
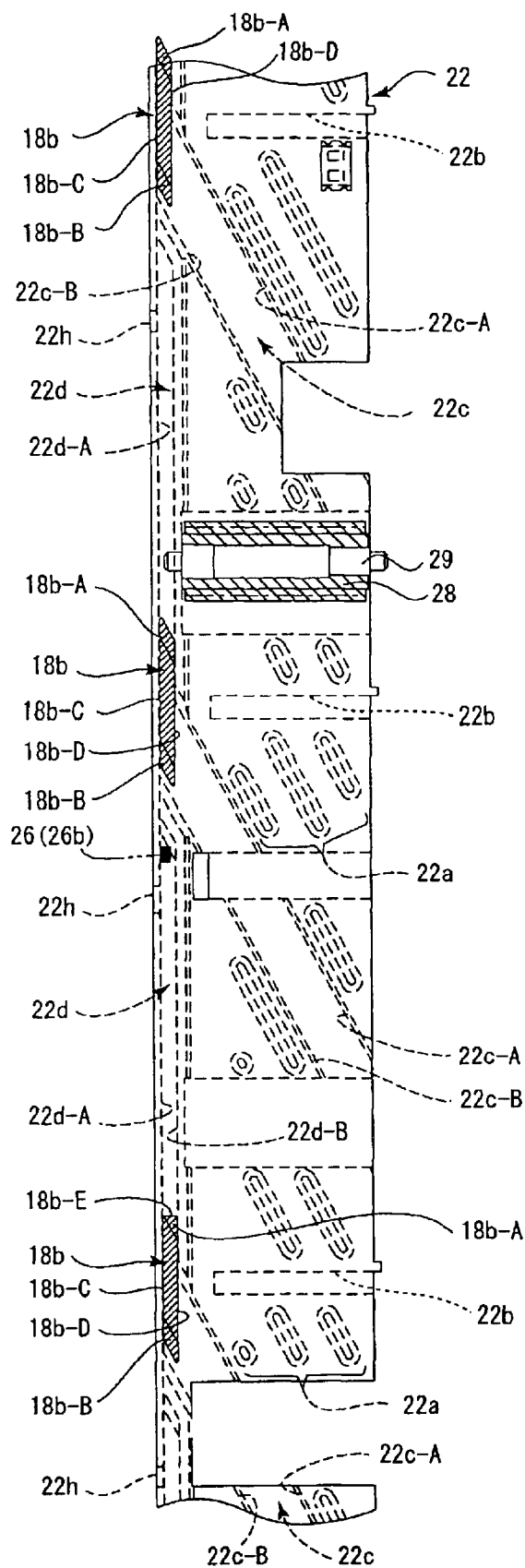
FIG. 28 is a view similar to that of FIG. 27, showing the positions of the set of rotational sliding projections of the helicoid ring with respect to the stationary barrel at the wide-angle extremity of the zoom lens.

The state of the zoom lens 71 shown in FIGS. 24 and 28 in which the helicoid ring 18 can rotate at the axial fixed position while the set of three rotational sliding projections 18b have slightly moved in the set of three rotational sliding grooves 22d corresponds to a state in which the zoom lens 71 is set at the wide-angle extremity. As shown in FIG. 28 in which the zoom lens 71 is set at the wide-angle extremity, each rotational sliding projection 18b is positioned in the associated rotational sliding groove 22d with the front sliding surface 18b-C and the rear sliding surface 18b-D of the rotational sliding projection 18b facing the front guide surface 22d-A and the rear guide surface 22d-B in the associated rotational sliding groove 22d, so that the helicoid ring 18 is prevented from moving in the optical axis direction relative to the stationary barrel 22.

Figure 33:
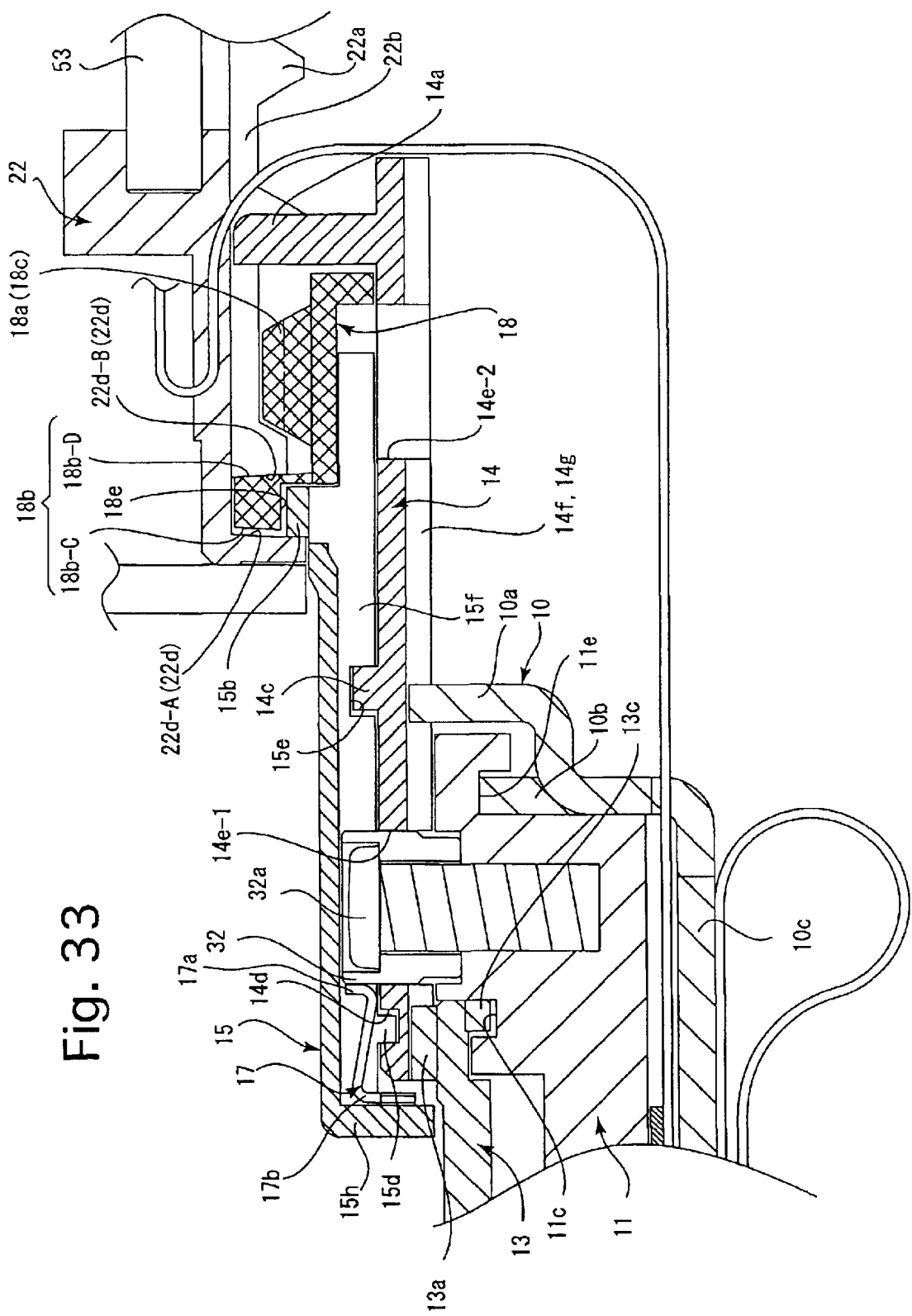
FIG. 33 is an enlarged cross sectional view of a portion of the upper half of the zoom lens shown in FIG. 9.

When the set of three rotational sliding projections 18b move into the set of three rotational sliding grooves 22d, respectively, as shown in FIG. 33, the set of three engaging projections 15b of the third external barrel 15 move into the set of three rotational sliding grooves 22d at the same time, respectively, so that the set of three engaging projections 15b are respectively pressed against the front guide surfaces 22d-A in the set of three rotational sliding grooves 22d by the spring force of the three compression coil springs 25 and so that the set of three rotational sliding projections 18b of the helicoid ring 18 are respectively pressed against the rear guide surfaces 22d-B in the set of three rotational sliding grooves 22d by the spring force of the three compression coil springs 25. The space between the front guide surfaces 22d-A and the rear guide surfaces 22d-B in the optical axis direction is determined to make the set of three rotational sliding projections 18b and the set of three engaging projections 15b positioned closer to each other in the optical axis direction than those when the set of three rotational sliding projections 18b and the set of three engaging projections 15b are respectively positioned in the set of three inclined grooves 22c. At this time when the set of three rotational sliding projections 18b and the set of three engaging projections 15b are made to be positioned closer to each other in the optical axis direction, the three compression coil springs 25 are largely compressed to thereby apply a stronger spring force to the set of three engaging projections 15b and the set of three rotational sliding projections 18b than the spring force which is applied thereto by the three compression coil springs 25 when the zoom lens 71 is in the retracted state. Thereafter, while the set of three rotational sliding projections 18b and the set of three engaging projections 15b are positioned in the set of three rotational sliding grooves 22d, the set of three engaging projections 15b and the set of three rotational sliding projections 18b are pressed against each other by the spring force of the three compression coil springs 25. This stabilizes axial positions of the third external barrel 15 and the helicoid ring 18 relative to the stationary barrel 22 in the optical axis direction. Namely, the third external barrel 15 and the helicoid ring 18 are supported by the stationary barrel 22 with no play between the third external barrel 15 and the helicoid ring 18 in the optical axis direction.

Figure 25:
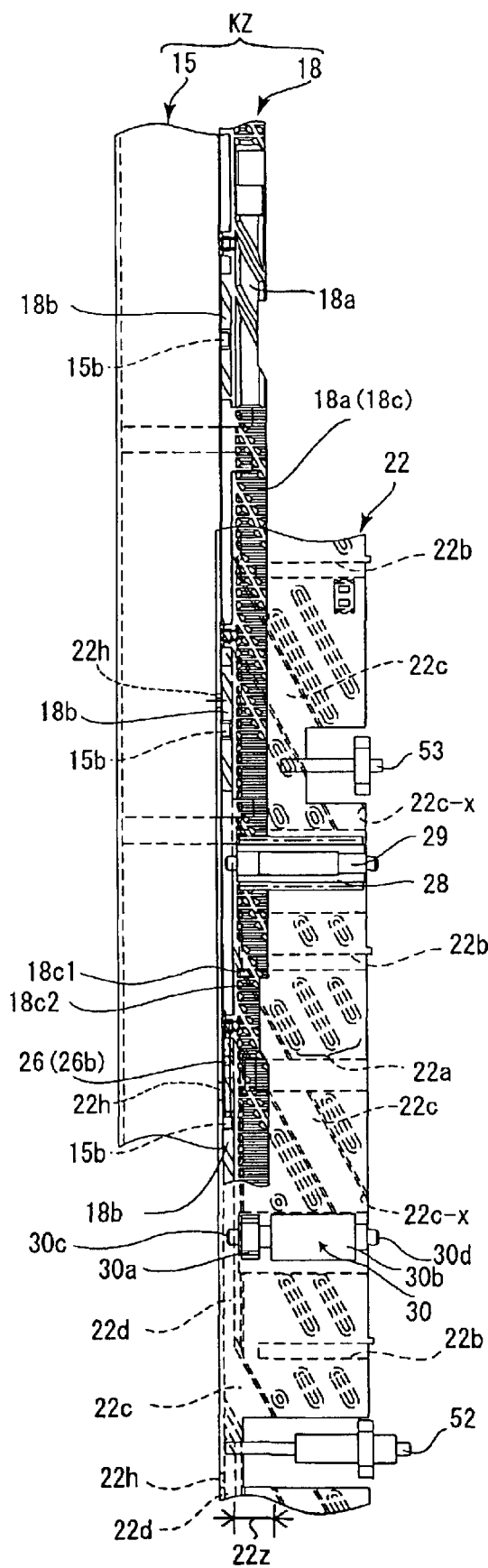
FIG. 25 is a developed view of the helicoid ring, the third external barrel and the stationary barrel, showing the positional relationship among thereamong at the telephoto extremity the zoom lens.
Figure 29:
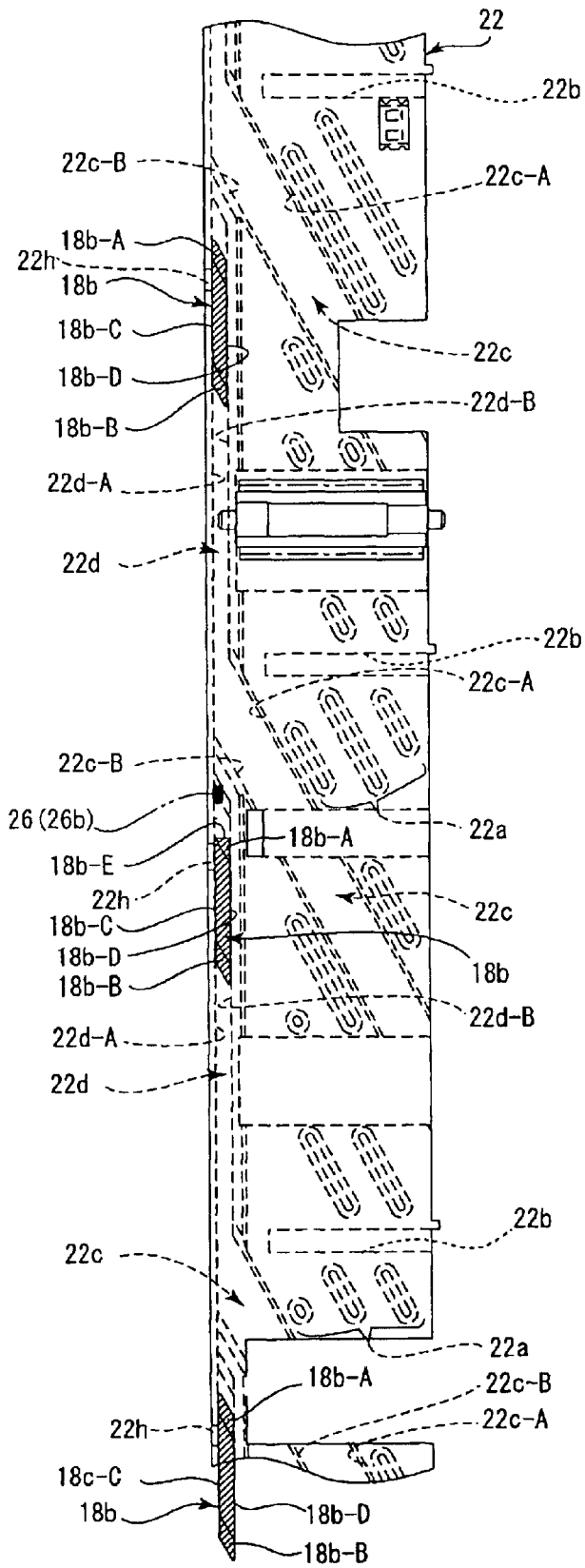
FIG. 29 is a view similar to that of FIG. 27, showing the positions of the set of rotational sliding projections of the helicoid ring with respect to the stationary barrel at the telephoto extremity of the zoom lens.

Rotating the third external barrel 15 and the helicoid ring 18 in the lens barrel advancing direction from their respective wide-angle extremities (from the positions shown in FIGS. 24 and 28) causes the set of three engaging projections 15b and the set of three rotational sliding projections 18b (the rear sliding surface 18b-D thereof) to firstly move toward the terminal ends of the set of three rotational sliding grooves 22d (upwards as viewed in FIG. 28) while being guided by the front guide surfaces 22d-A and the rear guide surfaces 22d-B and subsequently reach telephoto extremities of the third external barrel 15 and the helicoid ring 18 (the positions shown in FIGS. 25 and 29). Since the set of three engaging projections 15b and the set of three rotational sliding projections 18b remain engaged in the set of three rotational sliding grooves 22d, respectively, the helicoid ring 18 and the third external barrel 15 are prevented from moving in the optical axis direction relative to the stationary barrel 22 and accordingly rotate about the lens barrel axis Z0 without moving in the optical axis direction relative to the stationary barrel 22. In this state, the helicoid ring 18 is guided to be rotatable about the lens barrel axis Z0 mainly by the rear sliding surfaces 18b-D of the set of three rotational sliding projections 18b and the rear guide surfaces 22d-B of the stationary barrel 22 because the helicoid ring 18 is biased rearward in the optical axis direction by the three compression coil springs 25, i.e., in a direction to make the rear sliding surfaces 18b-D come into pressing contact with the rear guide surfaces 22d-B, respectively (see FIG. 32).

When the helicoid ring 18 rotates at the axial fixed position, the cam ring 11 also rotates at the axial fixed position without moving in the optical axis direction relative to the first linear guide ring 14 because the set of three roller followers 32 are engaged in the front circumferential slot portions 14e-1 of the set of three through-slots 14e, respectively. Accordingly, the first and second lens groups LG1 and LG2 move in the optical axis direction relative to each other in a predetermined moving manner to perform a zooming operation in accordance with contours of respective zooming sections of the plurality of inner cam grooves 11a (11a-1 and 11a-2) and the set of three outer cam grooves 11b.

Figure 26:
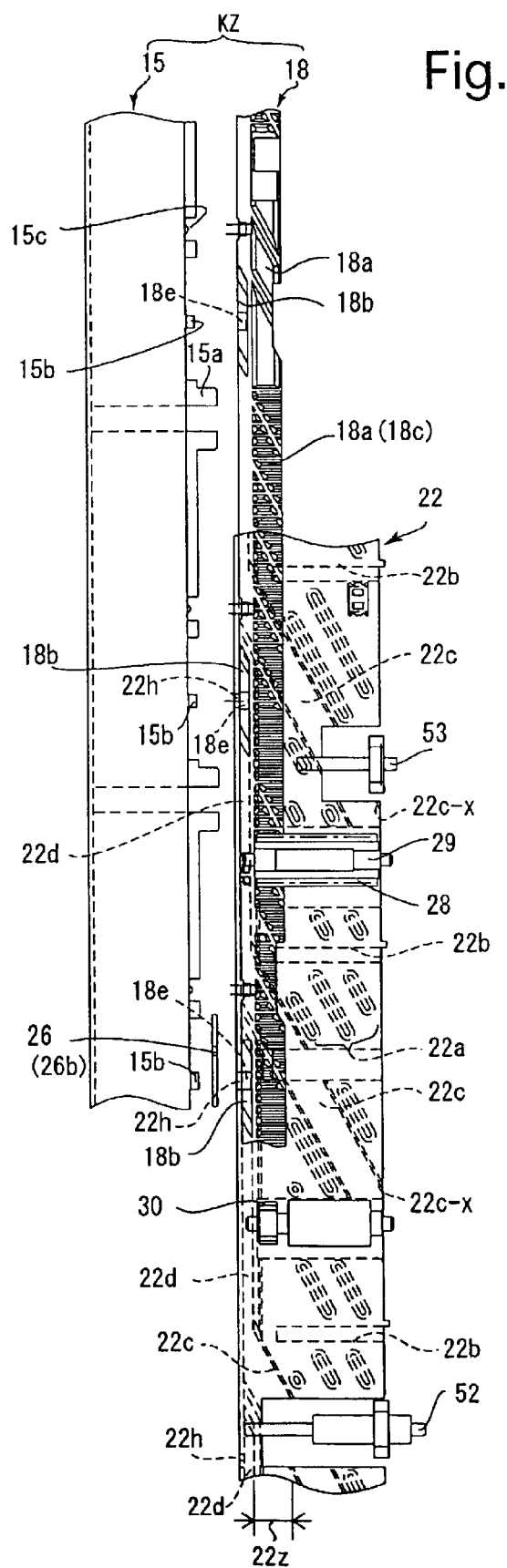
FIG. 26 is a developed view of the helicoid ring, the third external barrel and the stationary barrel, showing a positional relationship thereof.
Figure 30:
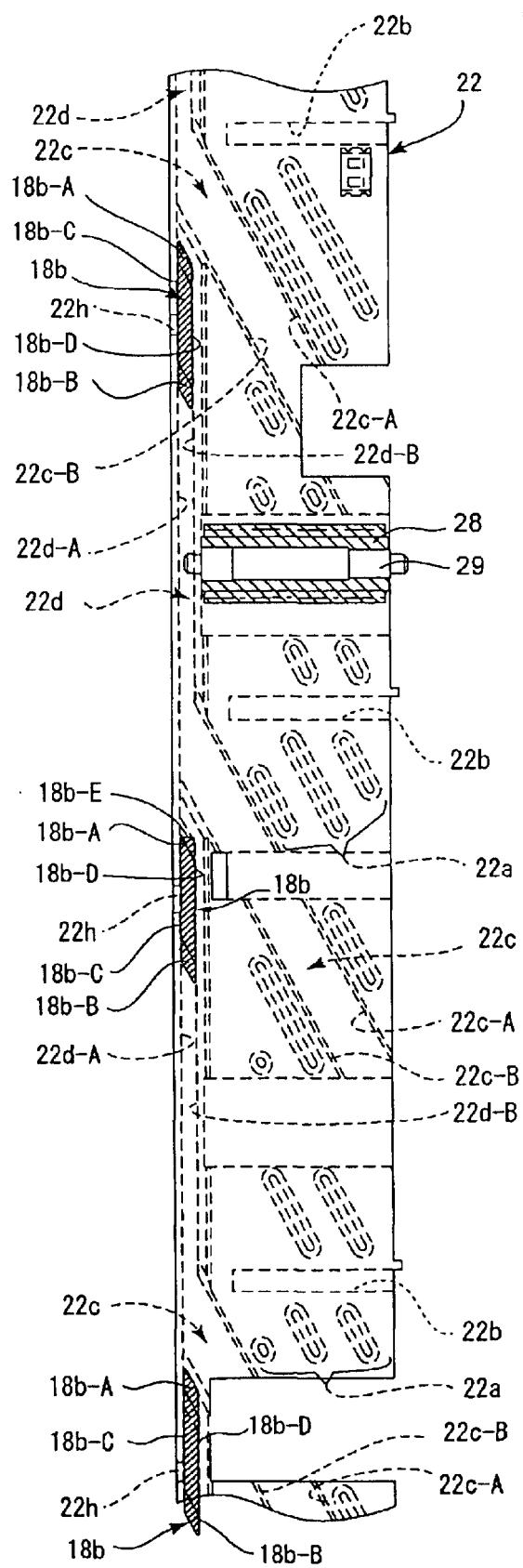
FIG. 30 is a view similar to that of FIG. 27, showing the positions of the set of rotational sliding projections of the helicoid ring with respect to the stationary barrel.
Figure 41:
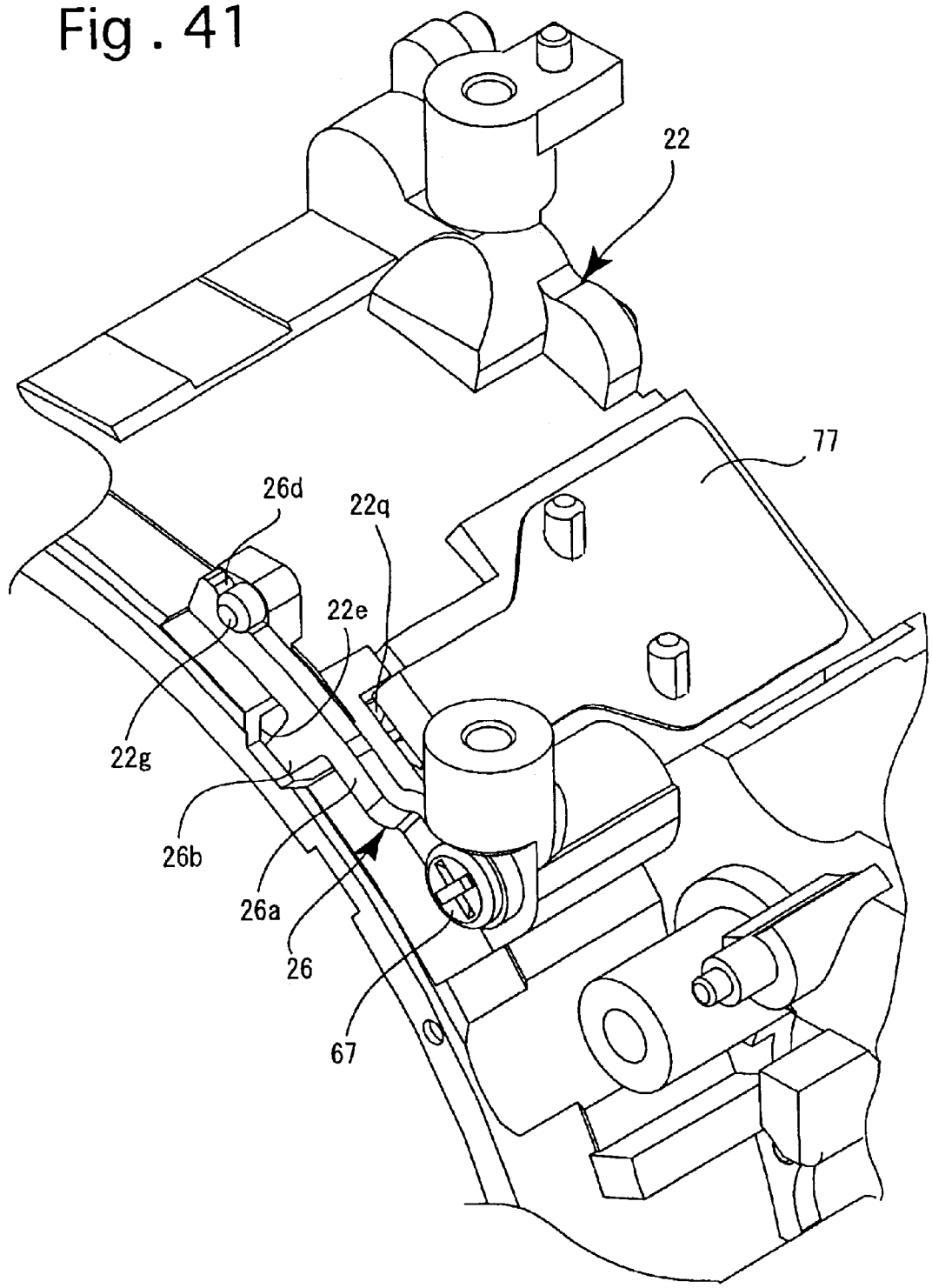
FIG. 41 is a perspective view similar to that shown in FIG. 40, showing a state where the stop member is properly fixed the stationary barrel via the set screw.

Further rotating the external barrel 15 and the helicoid ring 18 in the lens barrel advancing direction to move the external barrel 15 and the helicoid ring 18 in the optical axis direction beyond their respective telephoto extremities causes the set of three rotational sliding projections 18b to reach the terminal ends (assembly/disassembly sections) of the set of three rotational sliding grooves 22d as shown in FIGS. 26 and 30. In this state shown in FIGS. 26 and 30, movable elements of the zoom lens 71 such as the first through third external barrels 12, 13 and 15 can be removed from the stationary barrel 22 from the front thereof. However, if the stop member 26 is provided fixed to the stationary barrel 22 as shown in FIG. 41, such movable elements cannot be removed from the stationary barrel 22 unless the stop member 26 is removed from the stationary barrel 22 because the engaging surface 18b-E, which is provided on specific one of the three rotational sliding projections 18b, comes into contact with the stop projection 26b of the stop member 26 to prevent the set of three rotational sliding projections 18b from reaching the terminal ends (assembly/disassembly sections) of the set of three rotational sliding grooves 22d, respectively.

Rotating the third external barrel 15 and the helicoid ring 18 in a lens barrel retracting direction (downwards as viewed in FIG. 25) from their respective telephoto extremities causes the set of three rotational sliding projections 18b and the set of three engaging projections 15b to move toward the set of three inclined grooves 22c in the set of three rotational sliding grooves 22d, respectively. During this movement, the third external barrel 15 and the helicoid barrel 18 rotate together about the lens barrel axis Z0 with no play between the third external barrel 15 and the helicoid ring 18 in the optical axis direction because the set of three engaging projections 15b are respectively pressed against the front guide surfaces 22d-A in the set of three rotational sliding grooves 22d by the spring force of the three compression coil springs 25 while the set of three rotational sliding projections 18b of the helicoid ring 18 are respectively pressed against the rear guide surfaces 22d-B in the set of three rotational sliding grooves 22d by the spring force of the three compression coil springs 25.

Further rotating the external barrel 15 and the helicoid ring 18 in the lens barrel retracting direction beyond their respective wide-angle extremities (the positions shown in FIGS. 24 and 28) causes the circumferential end surfaces 18*b*-B of the set of three rotational sliding projections 18*b* to come into contact with the inclined surfaces 22*c*-B in the set of three inclined grooves 22*c*, respectively. Thereupon, the movement of the helicoid ring 18 in the lens barrel retracting direction generates a component force in a direction to make the circumferential end surfaces 18*b*-B of the set of three rotational sliding projections 18*b* move rearward in the optical axis direction along the inclined surfaces 22*c*-B in the set of three inclined grooves 22*c* while sliding thereon, respectively, because the two circumferential end surfaces 18*b*-A and 18*b*-B of each of the three rotational sliding projections 18*b* are parallel to the two opposed inclined surfaces 22*c*-A and 22*c*-B in the associated inclined groove 22*c* as shown in FIG. 31, respectively. Therefore, the helicoid ring 18 starts moving rearward in the optical axis direction while rotating about the lens barrel axis Z0 in the reverse manner to when the helicoid ring 18 moves forward while rotating. A slight rearward movement of the helicoid ring 18 in the optical axis direction by the engagement of the set of three rotational sliding projections 18*b* with the set of three inclined grooves 22*c*, respectively, causes the male helicoid 18*a* to be engaged with the female helicoid 22*a* again. Thereafter, further rotating the helicoid ring 18 in the lens barrel retracting direction causes the helicoid barrel 18 to keep moving rearward in the optical axis direction by the engagement of the set of three rotational sliding projections 18*b* with the set of three inclined grooves 22*c*, respectively, until the helicoid ring 18 reaches a retracted position thereof shown in FIGS. 23 and 27, i.e., until the zoom lens 71 is fully retracted. The third external barrel 15 moves rearward in the optical axis direction while rotating about the lens barrel axis Z0 due to the structures of the helicoid ring 18 and the first linear guide ring 14. During this rearward movement of the third external barrel 15, the set of three engaging projections 15*b* moves together with the set of three rotational sliding projections 18*b* in the set of three inclined grooves 22*c*, respectively. When the helicoid ring 18 and the third external barrel 15 move rearward in the optical axis direction, the first linear guide ring 14 also moves rearward in the optical axis direction, which causes the cam ring 11, which is supported by the first linear guide ring 14, to move rearward in the optical axis direction. In addition, at the time when the helicoid ring 18 starts moving rearward while rotating after rotating at the axial fixed position, the set of three roller followers 32 are disengaged from the front circumferential slot portions 14*e*-1 to be engaged in the lead slot portions 14*e*-3, respectively, while the cam ring 11 moves rearward in the optical axis direction while rotating about the lens barrel axis Z0 with respect to the first linear guide ring 14.

Figure 34:
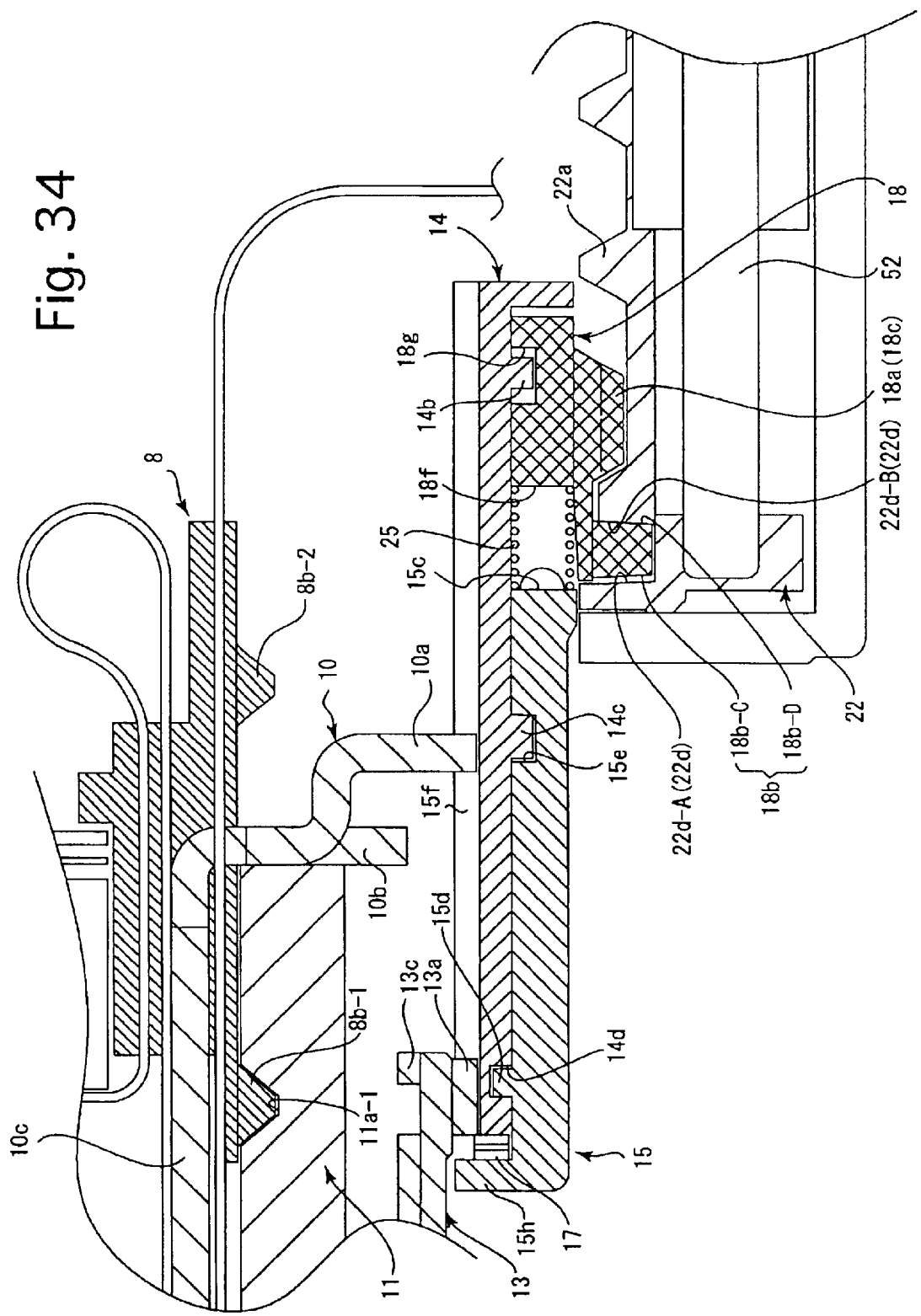
FIG. 34 is an enlarged cross sectional view of a portion of the lower half of the zoom lens shown in FIG. 9.

Upon the set of three rotational sliding projections 18*b* entering the set of three inclined grooves 22*c* from the set of three rotational sliding grooves 22*d*, respectively, the third external barrel 15 and the helicoid ring 18 change the relationship therebetween from the relationship in the ready-to-photograph state shown in FIGS. 33 and 34, in which the relative axial positions of the third external barrel 15 and the helicoid ring 18 in the optical axis direction are finely determined, back to the relationship shown in FIGS. 35 and 36, in which the axial positions of the third external barrel 15 and the helicoid ring 18 are coarsely determined due to the engagement of the third external barrel 15 with the first linear guide ring 14 with a clearance therebetween in the optical axis direction and the engagement of the helicoid barrel 18 with the first linear guide ring 14 with a clearance therebetween in the optical axis direction since either positions of the set of three engaging projections 15*b* in the optical axis direction or positions of the set of three rotational sliding projections 18*b* in the optical axis direction are not limited by the set of three rotational sliding grooves 22*d*, respectively. In the state shown in FIGS. 35 and 36 in which the set of three rotational sliding projections 18*b* are engaged in the set of three inclined grooves 22*c*, the respective positions of the third external barrel 15 and the helicoid ring 18 in the optical axis direction do not need to be determined finely since the zoom lens 71 is no longer in the ready-to-photograph state.

As can be understood from the above descriptions, in the present embodiment of the zoom lens 71, a simple mechanism having the male and female helicoids 18*a* and 22*a* (that have male threads and female threads which are formed on radially-opposed outer and inner peripheral surfaces of the helicoid ring 18 and the stationary barrel 22, respectively), the set of three rotational sliding projections 18*b*, the set of three inclined grooves 22*c* and the set of three rotational sliding grooves 22*d* can make the helicoid ring 18 perform a rotating advancing/rotating-retracting operation in which the helicoid ring 18 rotates while moving forward or rearward in the optical axis direction, and a fixed-position rotating operation in which the helicoid ring 18 rotates at a predetermined axial fixed position without moving in the optical axis direction relative to the stationary barrel 22. A simple fit between two ring members such as the helicoid ring 18 and the stationary barrel 22 with a highly reliable precision in driving one of the two ring members relative to the other can generally be achieved with a fitting structure using helicoids (male and female helicoid threads). Moreover, the set of three rotational sliding projections 18*b* and the set of three rotational sliding grooves 22*d*, which are adopted to make the helicoid ring 18 rotatable at the axial fixed position which cannot be achieved by helicoids, also constitute a simple projection-depression structure similar to the above fitting structure using helicoids. Furthermore, the set of three rotational sliding projections 18*b* and the set of three rotational sliding grooves 22*d* are formed on the outer and inner peripheral surfaces of the helicoid ring 18 and the stationary barrel 22 on which the male helicoid 18*a* and the female helicoid 22*a* are also formed. This does not require any additional space for the installation of the set of three rotational sliding projections 18*b* and the set of three rotational sliding grooves 22*d* in the zoom lens 71. Accordingly, the aforementioned rotating-advancing/rotating-retracting operation and the fixed-position rotating operation that are performed by rotation of the helicoid ring 18 are achieved with a simple, compact and low-cost structure.

The zoom gear 28 has a sufficient length in the optical axis direction to remain engaged with the annular gear 18*c* of the helicoid ring 18 regardless of variations of the position thereof in the optical axis direction. Therefore, the zoom gear 28, that is provided as a single gear, can transfer rotation thereof to the helicoid ring 18 at all times in each of the rotating advancing/rotating-retracting operation and the fixed-position rotating operation of the helicoid ring 18. Accordingly, a simple and compact rotation transfer mechanism for transferring rotation to the helicoid ring 18 that presents intricate movements is achieved in the present embodiment of the zoom lens, and the helicoid ring 18 and components associated therewith which are positioned inside the helicoid ring 18 can be driven with a high degree of precision.

Figure 32:
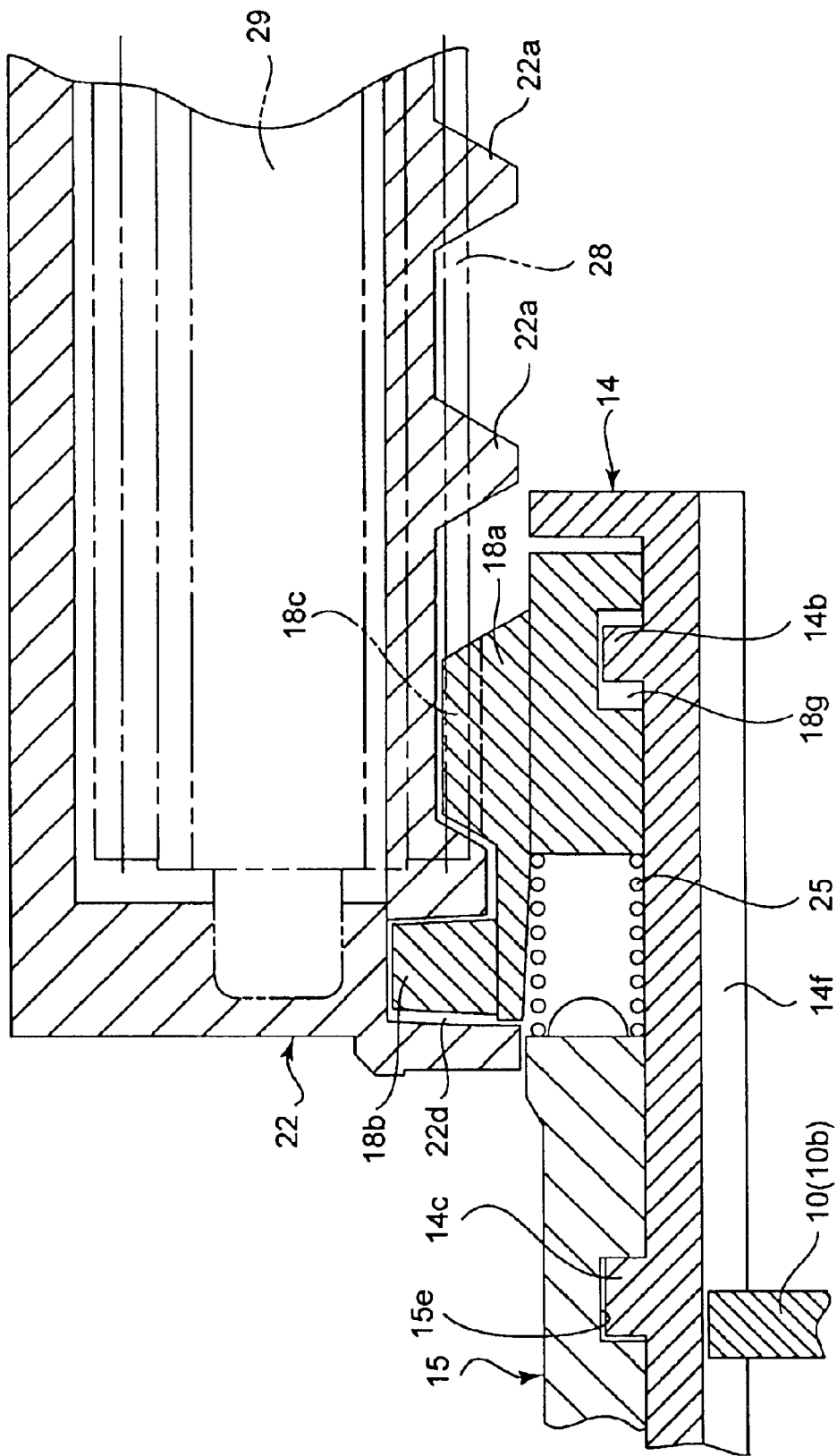
FIG. 32 is a cross sectional view taken along M1—M1 line shown in FIG. 23.

As shown in FIGS. 31 and 32, the tooth depth of each rotational sliding projection 18*b* of the female helicoid 18*a* is greater than that of each thread of the female helicoid 18*a*, and accordingly the set of three inclined grooves 22*c* and the set of three rotational sliding grooves 22*d* are formed to have greater tooth depths than the threads of the female helicoid 22*a*. On the other hand, the zoom gear 28 is supported by the stationary barrel 22 so that the gear teeth formed around the zoom gear 28 project radially inwards from an inner peripheral surface of the stationary barrel 22 (from a tooth flank of the female helicoid 22*a*) to be engaged with the annular gear 18*c*, which is formed on an outer peripheral surface of each thread of the male helicoid 18*a*. Therefore, the set of three rotational sliding projections 18*b* and gear teeth of the zoom gear 28 are positioned in the same annular range (radial range) about the lens barrel axis Z0 as viewed from the front of the zoom lens 71. However, the zoom gear 28 does not overlap the moving paths of set of three rotational sliding projections 18*b* because the zoom gear 28 is positioned between two of the set of three inclined grooves 22*c* in a circumferential direction of the stationary barrel 22 and because the zoom gear 28 is installed on the stationary barrel 22 at a position different from the position of the set of three rotational sliding grooves 22*d* in the optical axis direction. Accordingly, the set of three rotational sliding projections 18*b* do not interfere with the zoom gear 28 even though engaged in either the set of three inclined grooves 22*c* or the set of three rotational sliding grooves 22*d*.

It is possible that the set of three rotational sliding projections 18*b* and the zoom gear 28 be prevented from interfering with each other by reducing the amount of projection of the gear teeth of the zoom gear 28 from an inner peripheral surface of the stationary barrel 22 (from a tooth flank of the female helicoid 22*a*) so that the tooth depth of the zoom gear 28 becomes smaller than that of the male helicoid 18*a*. However, in this case, the amount of engagement of the teeth of the zoom gear 28 with the teeth of the male helicoid 18*a* will be small, which makes it difficult to achieve a stable rotation of the helicoid ring 18 when it rotates at the axial fixed position. Alternatively, if the tooth depth of the male helicoid 18*a* is increased without changing the amount of projection of each rotational sliding projection 18*b*, both the diameter of the stationary barrel 22 and the radial distance between the zoom gear 28 and the lens barrel axis Z0 increase accordingly. This increases the diameter of the zoom lens 71. Accordingly, if either the tooth depth of the male helicoid 18*a* or the amount of projection of the set of three rotational sliding projections 18*b* in radial directions of the helicoid ring 18 is changed to prevent the set of three rotational sliding projections 18*b* and the zoom gear 28 from interfering with each other, the helicoid ring 18 may not be driven with stability; moreover, a sufficient downsizing of the zoom barrel 71 may not be done. In contrast, according to the configurations of the zoom gear 28 and the set of three rotational sliding projections 18*b* shown in FIGS. 27 through 30, the set of three rotational sliding projections 18*b* and the zoom gear 28 can be prevented from interfering with each other without such problems.

In the present embodiment of the zoom lens 71, a rotatable portion of the zoom lens 71 which rotates at an axial fixed position at one time and also rotates while moving forward or rearward in the optical axis direction at another time is divided into two parts: the third external barrel 15, and the helicoid ring 18 that are slightly movable relative to each other in the optical axis direction. In addition, the third external barrel 15 and the helicoid ring 18 are biased in opposite directions away from each other in the optical axis direction by the resilience of the three compression coil springs 25 to press the set of three engaging projections 15*b* of the third external barrel 15 against the front guide surfaces 22*d*-A in the set of three rotational sliding grooves 22*d*, respectively, and to press the set of three rotational sliding projections 18*b* of the helicoid ring 18 against the rear guide surfaces 22*d*-B in the set of three rotational sliding grooves 22*d*, respectively, to eliminate backlash between the third external barrel 15 and the stationary barrel 22 and backlash between the helicoid ring 18 and the stationary barrel 22. As described above, the set of three rotational sliding grooves 22*d* and the set of three rotational sliding projections 18*b* are elements of a drive mechanism for rotating the helicoid ring 18 at the axial fixed position or rotating the helicoid ring 18 while moving the same in the optical axis direction, and are also used as elements for removing the aforementioned backlashes. This reduces the number of elements of the zoom lens 71.

The zoom lens 71 does not have to secure an additional space in the vicinity of the stationary barrel 22 in which the three compression coil springs 25 adopted for removing backlash are accommodated because the three compression coil springs 25 are compressed and held between opposed end surfaces of the third external barrel 15 and the helicoid ring 18 that rotate in one piece about the lens barrel axis Z0. In addition, the set of three engaging projections 15*b* are respectively received in the set of three engaging recesses 18*e*. This achieves a space-saving connected portion between the third external barrel 15 and the helicoid ring 18.

As described above, the three compression coil springs 25 are largely compressed to apply a strong spring force to the set of three engaging projections 15*b* and the set of three rotational sliding projections 18*b* only when the zoom lens 71 is in the ready-to-photograph state. Namely, the three compression coil springs 25 are not largely compressed to apply a strong spring force to the set of three engaging projections 15*b* and the set of three rotational sliding projections 18*b* when the zoom lens 71 is not in the ready-to-photograph state, e.g., the retracted state. This reduces load on the associated moving parts of the zoom lens 71 during the translation of the zoom lens 71 from the retracted state to the ready-to-photograph state, especially at the beginning of driving the zoom lens in the lens barrel advancing operation, and also increases durability of the three compression coil springs 25.

The helicoid ring 18 and the third external barrel 15 are disengaged from each other firstly in the disassembling operation of the zoom lens 71. A zoom lens assembling mechanism which makes it easy for the zoom lens 71 to be assembled and disassembled, mainly elements of the zoom lens assembling mechanism which are associated with the helicoid ring 18 and the third external barrel 15, will be discussed hereinafter.

As described above, the stationary barrel 22 is provided with the stop-member insertion hole 22*e* that radially penetrates the stationary barrel 22, from an outer peripheral surface of the stationary barrel 22 to a bottom surface of specific one of the three rotational sliding grooves 22*d*. The stationary barrel 22 is provided on a surface thereof in the vicinity of the stop-member insertion hole 22*e* with a screw hole 22*f* and a stop member positioning protrusion 22*g*. The stop member 26, which is fixed to the stationary barrel 22 as shown in FIG. 41, is provided with an arm portion 26*a* which extends along an outer peripheral surface of the stationary barrel 22, and the aforementioned stop projection 26*b* which projects radially inwards from the arm portion 26*a*. The stop member 26 is provided at one end thereof with an insertion hole 26*c* into which the set screw 67 is inserted, and is further provided at the other end thereof with a hook portion 26*d*. The stop member 26 is fixed to the stationary barrel 22 by screwing the set screw 67 into the screw hole 22*f* through the insertion hole 26*c* with the hook portion 26*d* being engaged with the stop member positioning protrusion 22*g* as shown in FIG. 41. In a state where the stop member 26 is fixed to the stationary barrel 22 in this manner, the stop projection 26*b* is positioned in the stop-member insertion hole 22*e* so that the tip of the stop projection 26*b* projects inside a specific rotational sliding groove 22*d* among the set of three rotational sliding grooves 22*d*. This state is shown in FIG. 37. Note that the stationary barrel 22 is not shown in FIG. 37.

Figure 42:
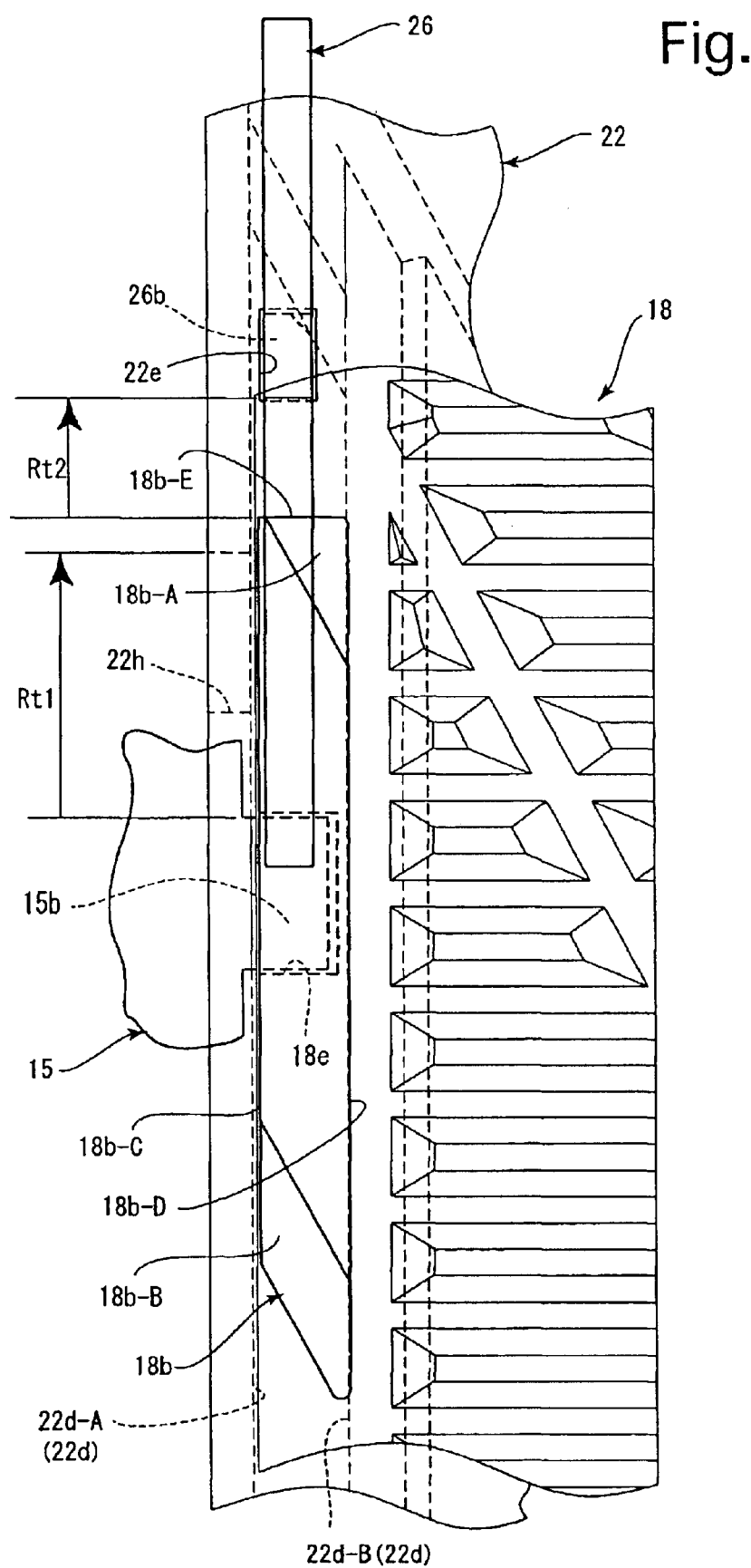
FIG. 42 is an enlarged developed view of a portion of helicoid ring in relation to a corresponding portion of the stationary barrel.

The stationary barrel 22 is provided, at the front end thereof on the front walls of the three rotational sliding grooves 22*d*, with three insertion/removable holes 22*h* through which the front of the stationary barrel 22 communicate with the three rotational sliding grooves 22*d* in the optical axis direction, respectively. Each of the three insertion/removable holes 22*h* has a sufficient width allowing the associated one of the three engaging projections 15*b* to be inserted into the insertion/removable hole 22*h* in the optical axis direction. FIG. 42 shows one of the three insertion/removable holes 22*h* and peripheral parts when the zoom lens 71 is set at the telephoto extremity as shown in FIGS. 25 and 29. As can be clearly seen in FIG. 42, in the case where the zoom lens 71 is set at the telephoto extremity, the set of three engaging projections 15*b* cannot be removed, toward the front of the zoom lens 71, from the three rotational sliding grooves 22*d* through the three insertion/removable holes 22*h* because the three engaging projections 15*b* and the three insertion/removable holes 22*h* are not aligned in the optical axis direction (horizontal direction as viewed in FIG. 42), respectively. This positional relationship is true for the remaining two insertion/removable holes 22*h* though only one of the three insertion/removable holes 22*h* is shown in FIG. 42. On the other hand, when the zoom lens 71 is set at the wide-angle extremity as shown in FIGS. 24 and 28, the three engaging projections 15*b* are respectively positioned further from the three insertion/removable holes 22*h* than the three engaging projections 15*b* shown in FIGS. 25 and 29 in which the zoom lens 71 is set at the telephoto extremity. This means that the set of three engaging projections 15*b* cannot be removed from the three rotational sliding grooves 22*d* through the three insertion/removable holes 22*h*, respectively, when the zoom lens 71 is in the ready-to-photograph state, i.e., when the zoom lens 71 is set at a focal length between the wide-angle extremity and the telephoto extremity.

In order to align the three engaging projections 15*b* and the three insertion/removable holes 22*h* in the optical axis direction, respectively, from the state shown in FIG. 42 in which the zoom lens 71 is set at the telephoto extremity, the third external barrel 15 needs to be further rotated together with the helicoid ring 18 counterclockwise as viewed from the front of the zoom lens 71 relative to the stationary barrel 22 (upwards as viewed in FIG. 42) by a rotational angle (disassembling rotational angle) Rt1 (see FIG. 42). However, in a state where the stop projection 26*b* is inserted into the stop-member insertion hole 22*e* as shown in FIG. 41, if the third external barrel 15 is rotated together with the helicoid ring 18 counterclockwise as viewed from the front of the zoom lens 71 relative to the stationary barrel 22 by a rotational angle (allowable rotational angle) Rt2 (see FIG. 42), which is smaller than the disassembling rotational angle Rt1, from the state shown in FIG. 42 in which the zoom lens 71 is set at the telephoto extremity, the engaging surface 18*b*-E that is formed on one of the three rotational sliding projections 18*b* comes into contact with the stop projection 26*b* of the stop member 26 to prevent the third external barrel 15 and the helicoid ring 18 from further rotating (see FIG. 37). Since the allowable rotational angle Rt2 is smaller than the disassembling rotational angle Rt1, the three engaging projections 15*b* and the three insertion/removable holes 22*h* cannot be aligned in the optical axis direction, respectively, which makes it impossible to remove the set of three engaging projections 15*b* from the three rotational sliding grooves 22*d* through the three insertion/removable holes 22*h*, respectively. Namely, although terminal end portions of the set of three rotational sliding grooves 22*d*, which respectively communicate with the front of the stationary barrel 22 through the three insertion/removable holes 22*h*, serve as assembly/disassembly sections, the third external barrel 15 cannot be rotated together with the helicoid ring 18 to a point where the set of three engaging projections 15*b* are positioned in the terminal end portions of the set of three rotational sliding grooves 22*d*, respectively, as long as the stop member 26 remains fixed to the stationary barrel 22 with the stop projection 26*b* in the stop-member insertion hole 22*e*.

Figure 43:
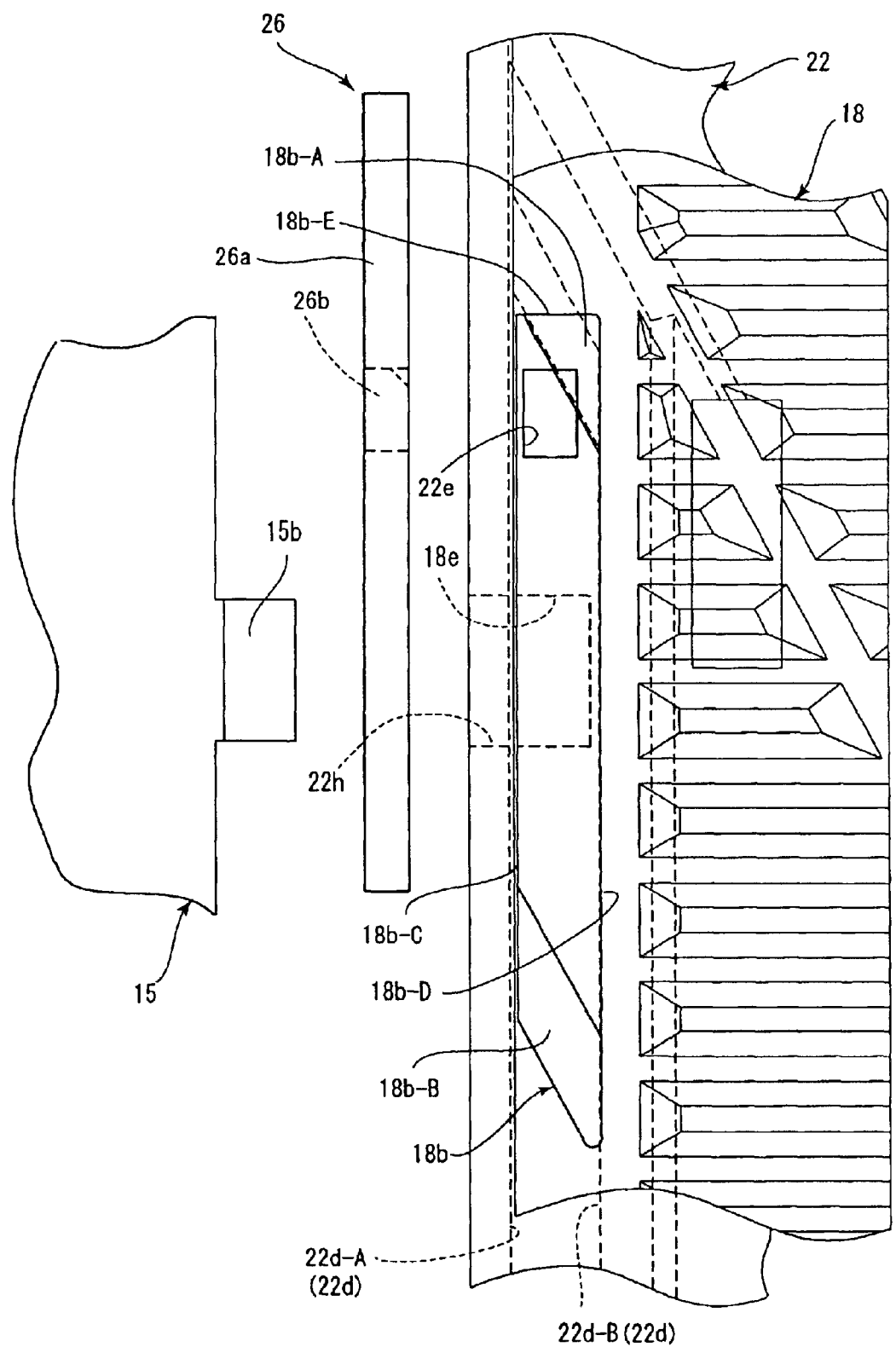
FIG. 43 is a view similar to that of FIG. 42, showing the positional relationship between the specific rotational sliding projection of the helicoid ring and the circumferential groove of the stationary barrel.
Figure 63:
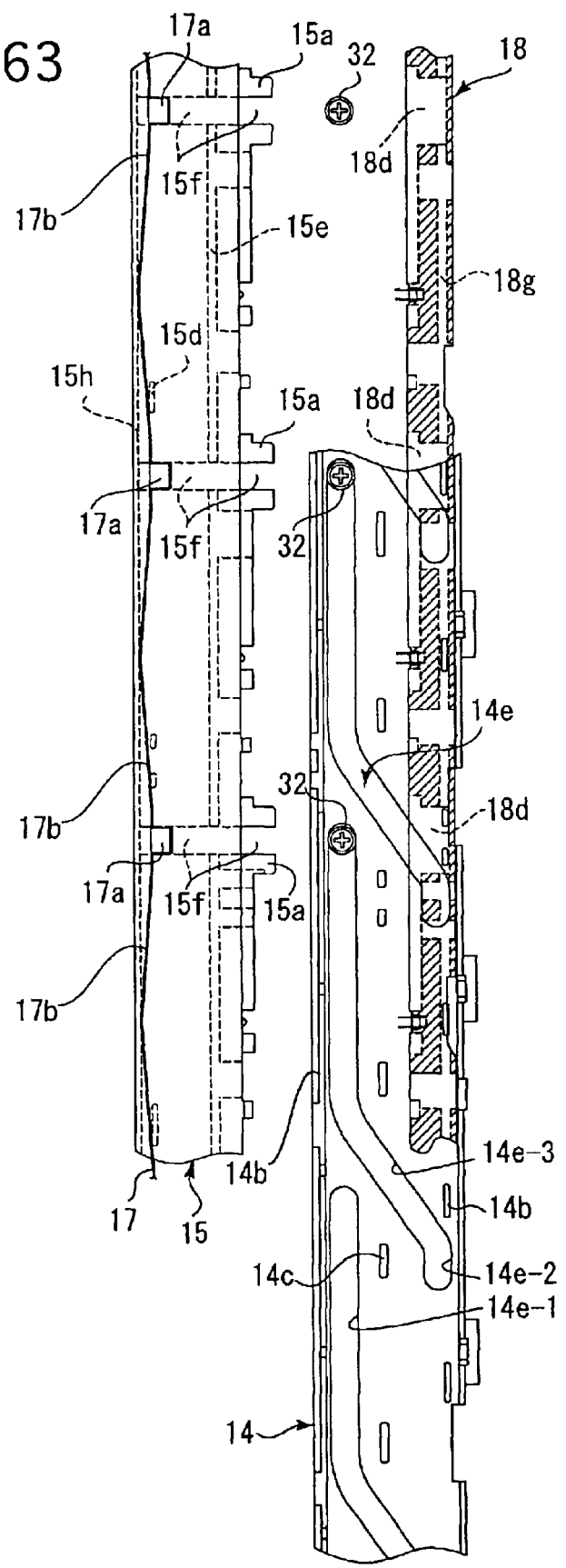
FIG. 63 is a view similar to that of FIG. 60, showing the positional relationship among the helicoid ring, the third external barrel and the first linear guide ring.

In the disassembling operation of the zoom lens 71, the stop member 26 needs to be removed from the stationary barrel 22 in the first place. If the stop member 26 is removed, the stop projection 26*b* comes out of the stop-member insertion hole 22*e*. Once the stop projection 26*b* comes out of the stop-member insertion hole 22*e*, the third external barrel 15 and the helicoid ring 18 can be rotated together by the disassembling rotational angle Rt1. Rotating the third external barrel 15 and the helicoid ring 18 together by the disassembling rotational angle Rt1 in a state where the zoom lens 71 is set at the telephoto extremity causes the third external barrel 15 and the helicoid ring 18 to be positioned to their respective specific rotational positions relative to the stationary barrel 22 (hereinafter referred to as assembling/disassembling angular positions) as shown in FIGS. 26, 63. FIGS. 26 and 30 show a state of the zoom lens 71 where the third external barrel 15 and the helicoid ring 18 have been rotated together by the disassembling rotational angle Rt1 to be positioned in the respective assembling/disassembling angular positions from a state where the zoom lens 71 is set at the telephoto extremity. This state of the zoom lens 71, in which the third external barrel 15 and the helicoid ring 18 are positioned in the respective assembling/disassembling angular positions, is hereinafter referred to as an assemblable/disassemblable state. FIG. 43 shows a portion of the stationary barrel 22 on which one of the three insertion/removable holes 22*h* is formed and portions of peripheral elements in the able-to-be assembled/disassembled state. As can be clearly understood from FIG. 43, if the third external barrel 15 and the helicoid ring 18 have rotated by the disassembling rotational angle Rt1 as shown in FIG. 43, the three insertion/removable holes 22*h* and the three engaging recesses 18*e* that are formed on the set of three rotational sliding projections 18*b* are aligned in the optical axis direction so that the set of three engaging projections 15*b* accommodated in the set of three engaging recesses 18*e* can be removed therefrom through the three insertion/removable holes 22*h* from the front of the zoom lens 71, respectively. Namely, the third external barrel 15 can be removed from the stationary barrel 22 from the front thereof. Removing the set of three engaging projections 15*b* from the set of three engaging recesses 18*e*, respectively, causes the set of three engaging projections 15*b* of the third external barrel 15 and the set of three rotational sliding projections 18*b* of the helicoid ring 18 to be free from the spring force of the three compression coil springs 25, which are adopted to bias the set of three engaging projections 15*b* and the set of three rotational sliding projections 18*b* in opposite directions away from each other in the optical axis direction. At the same time, a function of the three rotational sliding projections 18*b* for removing backlash between the third external barrel 15 and the stationary barrel 22 and backlash between the helicoid ring 18 and the stationary barrel 22 is cancelled. The three engaging projections 15*b* and the three insertion/removable holes 22*h* are aligned in the optical axis direction when the set of three engaging projections 15*b* are in contact with the terminal ends (upward ends as viewed in FIG. 28) of the set of three rotational sliding grooves 22*d*, respectively. Accordingly, the three engaging projections 15*b* and the three insertion/removable holes 22*h* are automatically aligned in the optical axis direction if the third external barrel 15 and the helicoid ring 18 are fully rotated together counterclockwise as viewed from the front of the zoom lens 71 relative to the stationary barrel 22, i.e., if the third external barrel 15 and the helicoid ring 18 are rotated together to the respective assembling/disassembling angular positions.

Although the third external barrel 15 can be removed from the stationary barrel 22 when rotated to the assembling/disassembling angular position as shown in FIGS. 26 and 30, the third external barrel 15 is still engaged with the first linear guide ring 14 by the engagement of the plurality of relative rotation guide projections 15*d* with the circumferential groove 14*d* and the engagement of the second plurality of relative rotation guide projections 14*c* with the circumferential groove 15*e*. As can be seen in FIGS. 14 and 15, the second plurality of relative rotation guide projections 14*c* are formed on the first linear guide ring 14 at irregular intervals in a circumferential direction thereof, and some of the second plurality of relative rotation guide projections 14*c* have different circumferential widths than another ones. Likewise, the plurality of relative rotation guide projections 15*d* are formed on the third external barrel 15 at irregular intervals in a circumferential direction thereof, and some of the relative rotation guide projections 15*d* have different circumferential widths than another ones. The third external barrel 15 is provided at a rear end thereof with a plurality of insertion/removable holes 15*g* through which the second plurality of relative rotation guide projections 14*c* can be removed from the circumferential groove 15*e* in the optical axis direction, respectively, only when the first linear guide ring 14 is positioned in a specific rotational position relative to the third external barrel 15. Likewise, the first linear guide ring 14 is provided at the front end thereof with a plurality of insertion/removable holes 14*h* through which the plurality of relative rotation guide projections 15*d* can be removed from the circumferential groove 14*d* in the optical axis direction, respectively, only when the third external barrel 15 is positioned in a specific rotational position relative to the first linear guide ring 14.

Figure 46:
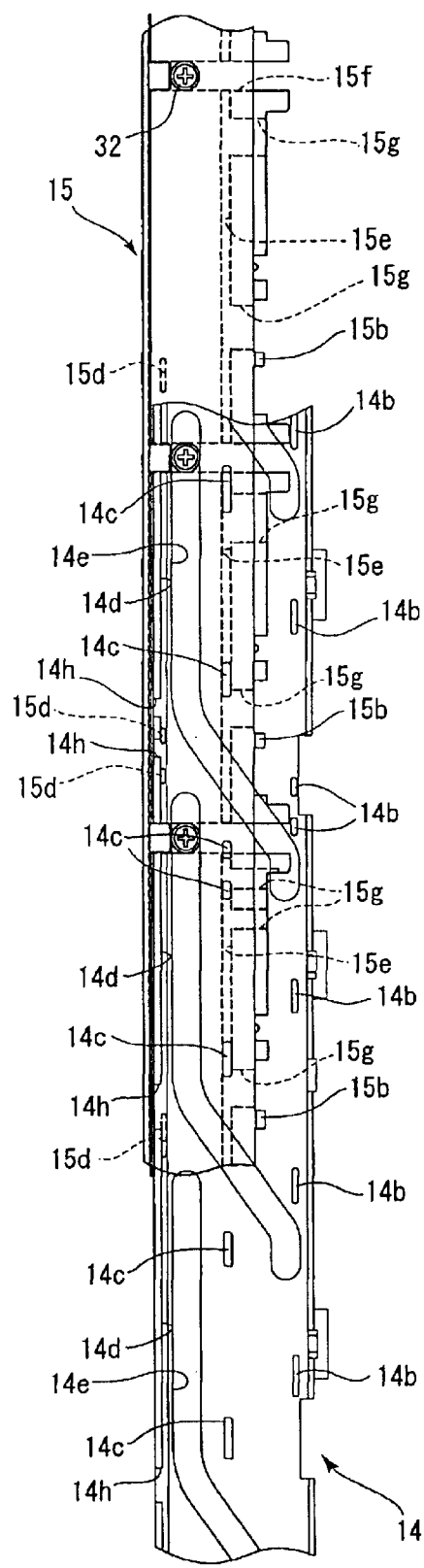
FIG. 46 is a view similar to that of FIG. 44, showing the positional relationship between the helicoid ring and the stationary barrel at the telephoto extremity of the zoom lens.
Figure 47:
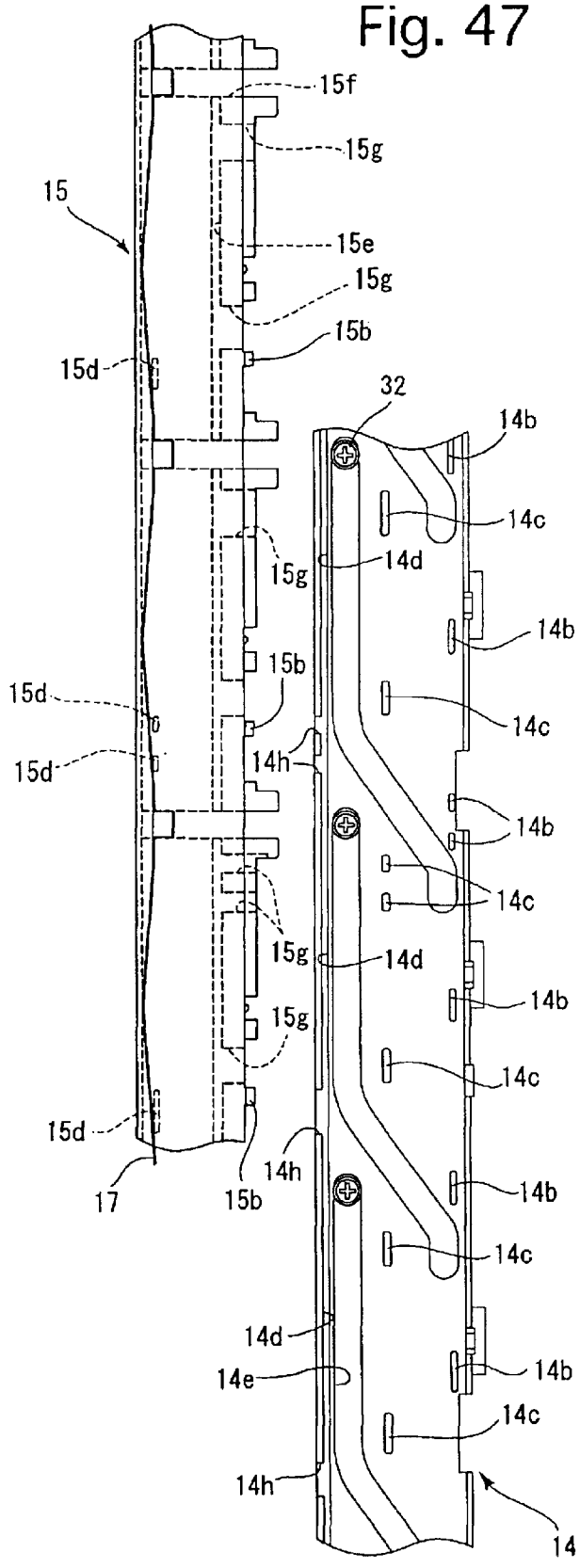
FIG. 47 is a view similar to that of FIG. 44, showing the positional relationship between the helicoid ring and the stationary barrel.
Figure 56:
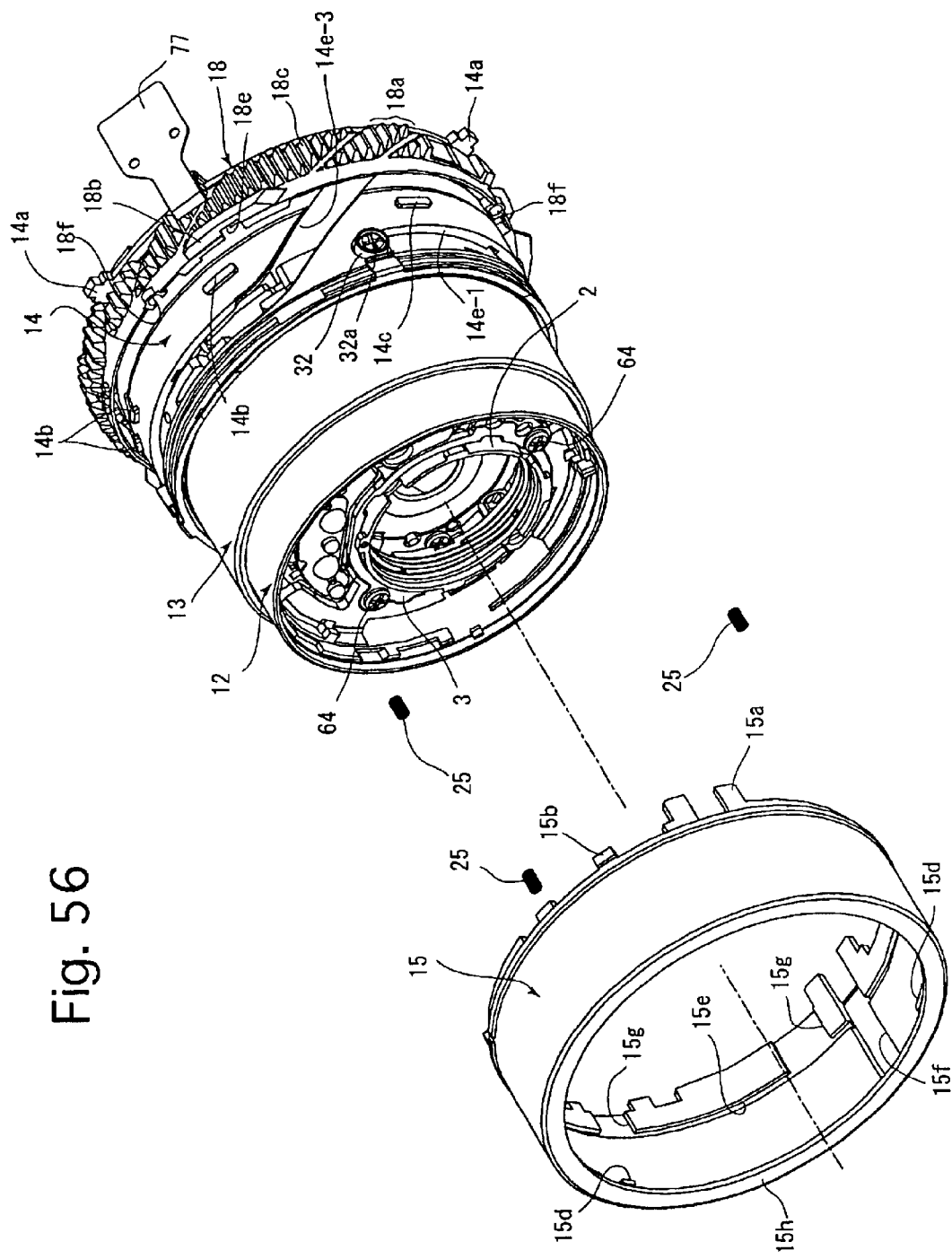
FIG. 56 is an exploded perspective view of elements of the zoom lens, showing a state where the third external barrel has been removed from the first linear guide ring.

FIGS. 44 through 47 are developed views of the third external barrel 15 and the first linear guide ring 14, showing the relationship of coupling therebetween in different states. Specifically, FIG. 44 shows a state of coupling between the third external barrel 15 and the first linear guide ring 14 when the zoom lens 71 is in the retracted state (which corresponds to the state shown in each of FIGS. 23 and 27), FIG. 45 shows the same when the zoom lens 71 is set at the wide-angle extremity (which corresponds to the state shown in each of FIGS. 24 and 28), FIG. 46 shows the same when the zoom lens 71 is set at the telephoto extremity (which corresponds to the state shown in each of FIGS. 25 and 29), and FIG. 47 shows the same when the zoom lens 71 is in the assemblable/disassemblable state (which corresponds to the state shown in each of FIGS. 26 and 30). As can be seen from FIGS. 44 through 47, all of the second plurality of relative rotation guide projections 14*c* and the plurality of relative rotation guide projections 15*d* cannot be inserted into or removed from the circumferential groove 15*e* and the circumferential groove 14*d* in the optical axis direction through the plurality of insertion/removable holes 15*g* and the plurality of insertion/removable holes 14*h* at the same time, respectively, when the zoom lens 71 is in between the wide-angle extremity and the telephoto extremity, or even in between the wide-angle extremity and the retracted position, because some of the second plurality of relative rotation guide projections 14*c* and some of the plurality of relative rotation guide projections 15*d* are engaged in the circumferential groove 15*e* and the circumferential groove 14*d*, respectively. Only when the third external barrel 15 and the helicoid ring 18 are rotated together to the respective assembling/disassembling angular positions as shown in FIGS. 26 and 63 with the stop member having been removed, the second plurality of relative rotation guide projections 14*c* reach respective specific positions in the circumferential groove 15*e* at which the second plurality of relative rotation guide projections 14*c* and the plurality of insertion/removable holes 15*g* are aligned in the optical axis direction and at the same time the plurality of relative rotation guide projections 15*d* reach respective specific positions in the circumferential groove 14*d* at which the plurality of relative rotation guide projections 15*d* and the plurality of insertion/removable holes 14*h* are aligned in the optical axis direction. This makes it possible to remove the third external barrel 15 from the first linear guide ring 14 from the front thereof as shown in FIGS. 47 and 56. Note that the stationary barrel 22 is not shown in FIG. 56. If the third external barrel 15 is removed, the three compression coil springs 25, which are to be held between the third external barrel 15 and the helicoid ring 18, are exposed to the outside of the zoom lens 71, and can be removed accordingly (see FIGS. 39 and 56).

Therefore, if the third external barrel 15 and the helicoid ring 18 are rotated together to the respective assembling/disassembling angular positions as shown in FIGS. 26 and 63 after the stop member has been removed, the third external barrel 15 can be removed from both the stationary barrel 22 and the first linear guide ring 14 at the same time. In other words, the stop member 26 serves as a rotation limiting device for limiting the range of rotation of each of the third external barrel 15 and the helicoid ring 18 about the lens barrel axis Z0 relative to the stationary barrel 22 therein so that the third external barrel 15 and the helicoid ring 18 cannot be rotated together to the respective assembling/disassembling angular positions in a normal operating state of the zoom lens 71. As can be understood from the above descriptions, a guiding structure consisting of the set of three rotational sliding projections 18*b*, the set of three rotational sliding grooves 22*d* and the set of three inclined grooves 22*c* is simple and compact; moreover, if only the stop member 26 is added to the guiding structure, the range of rotation of each of the third external barrel 15 and the helicoid ring 18 about the lens barrel axis Z0 relative to the stationary barrel 22 can be securely limited so that the third external barrel 15 and the helicoid ring 18 cannot be rotated together to the respective assembling/disassembling angular positions in a normal operating state of the zoom lens 71.

Figure 16:
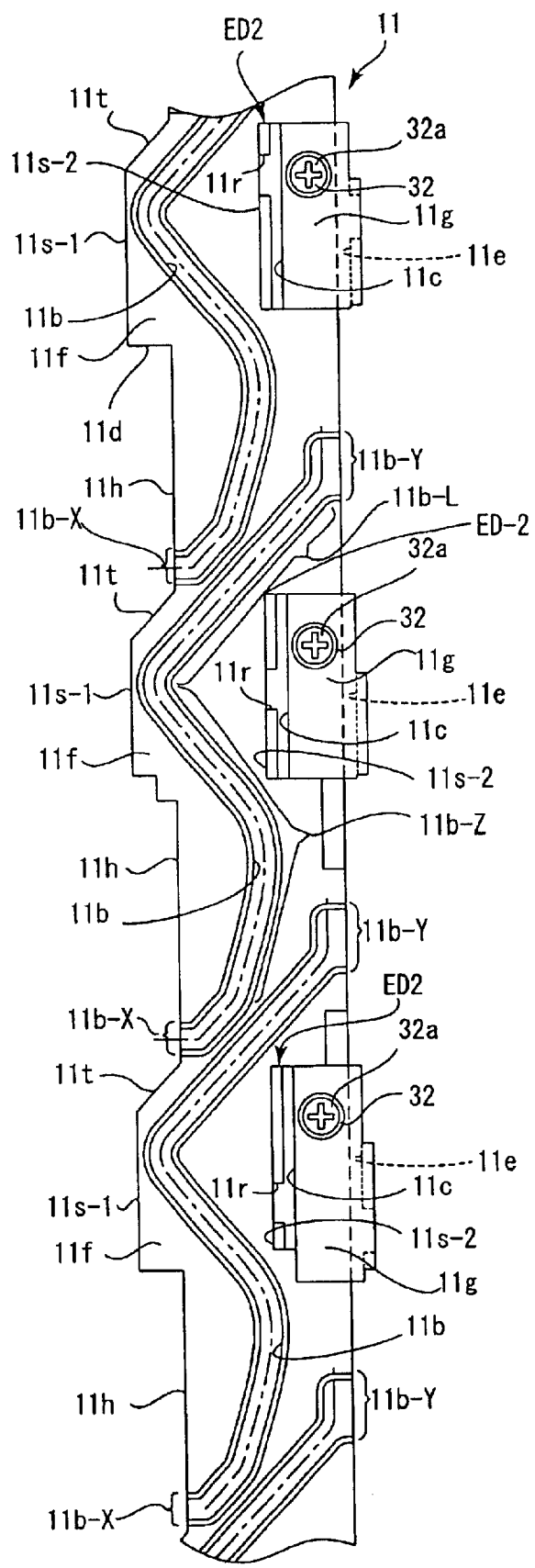
FIG. 16 is a developed view of a cam ring shown in FIG. 1.
Figure 20:
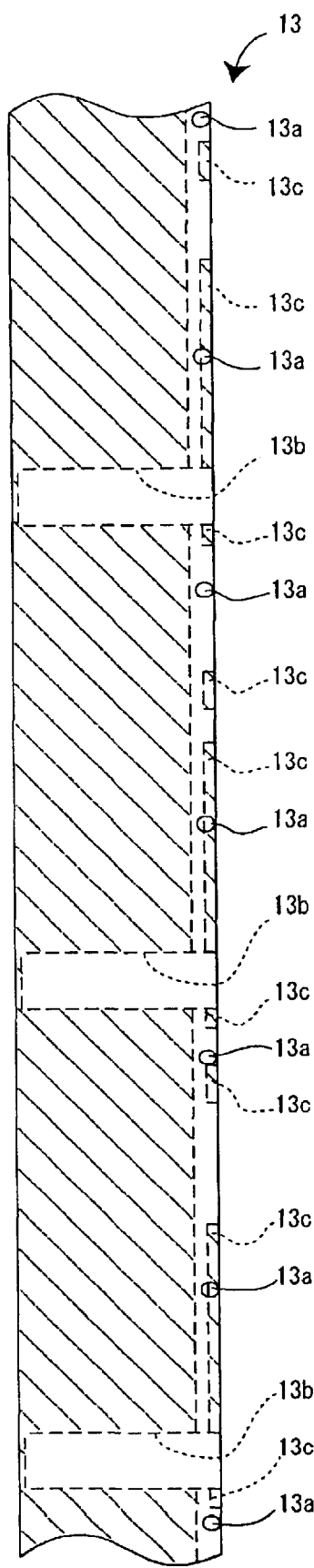
FIG. 20 is a developed view of a second external barrel shown in FIG. 1.

Removing the third external barrel 15 from the zoom lens 71 makes it possible to further disassemble the zoom lens 71 in a manner which will be discussed hereinafter. As shown in FIGS. 9 and 10, the third external barrel 15 is provided at the front end thereof with a frontmost inner flange 15h which projects radially inwards to close the front ends of the set of six second linear guide grooves 14g. The second external barrel 13, the set of six radial projections 13a of which are respectively engaged in the set of six second linear guide grooves 14g, cannot be removed from the front of the zoom lens 71 in a state where the third external barrel 15 and the first linear guide ring 14 are coupled to each other because the frontmost inner flange 15h prevents the set of six radial projections 13a from being removed from the set of six second linear guide grooves 14g, respectively. Hence, the second external barrel 13 can be removed from the first linear guide ring 14 once the third external barrel 15 is removed. However, the second external barrel 13 cannot be removed from the cam ring 11 in the optical axis direction if the discontinuous inner flange 13c remains engaged in the discontinuous circumferential groove 11c of the cam ring 11. As shown in FIG. 20, the discontinuous inner flange 13c is formed as a discontinuous groove which is disconnected at irregular intervals in a circumferential direction of the second external barrel 13. On the other hand, as shown in FIG. 16, the cam ring 11 is provided on outer peripheral surface thereof with a set of three external protuberances 11g which project radially outwards, while the discontinuous circumferential groove 11c is formed discontinuously on only respective outer surfaces of the set of three external protuberances 11g. The discontinuous circumferential groove 11c is provided on each of the three external protuberances 11g with an insertion/removable hole 11r which is open at the front end of the external protuberance 11g. The insertion/removable holes 11r are arranged at irregular intervals in a circumferential direction of the cam ring 11.

Figures 52, 53:
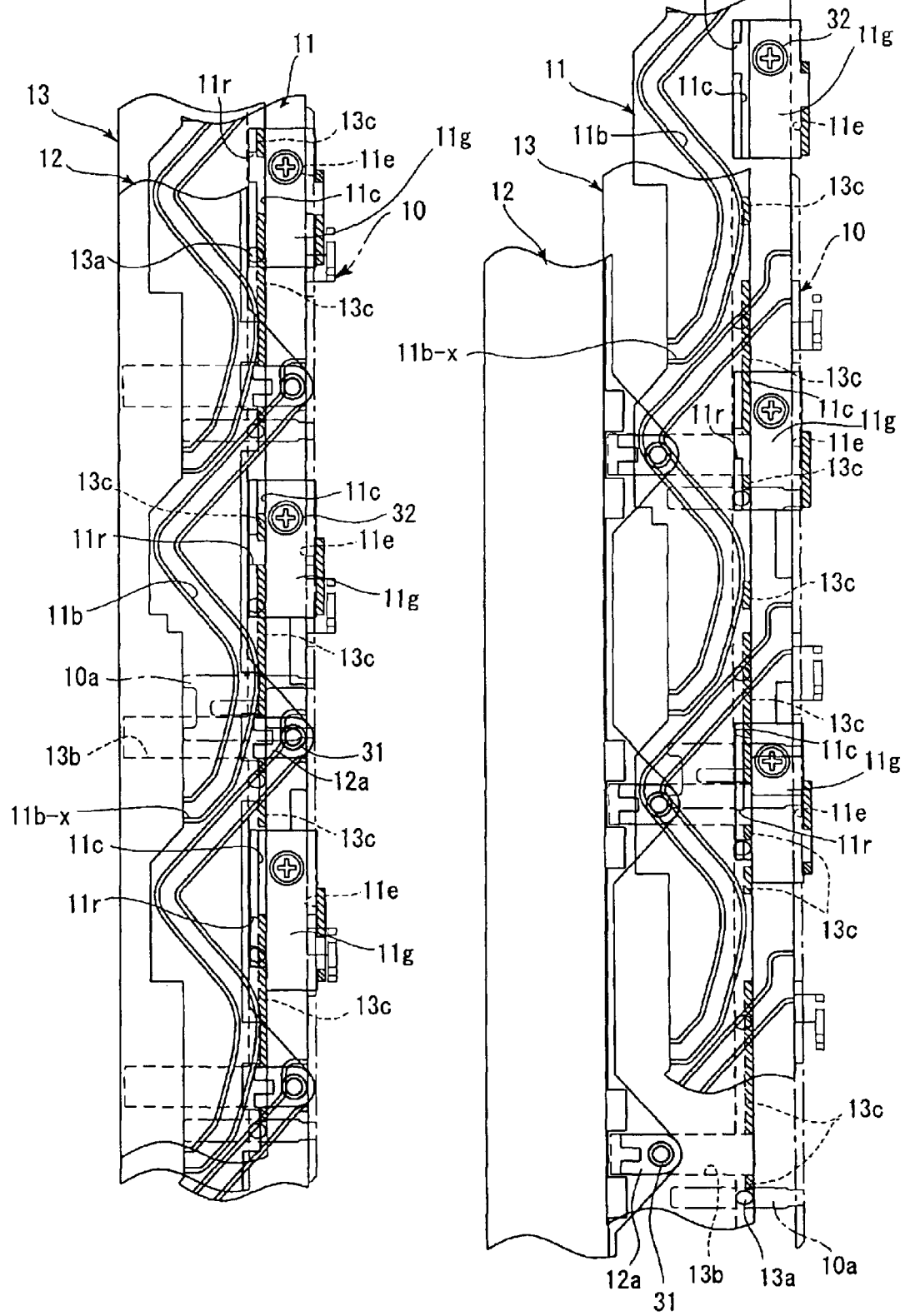
FIG. 52 is a developed view of the cam ring, the first external barrel, the second external barrel and the second linear guide ring, showing the positional relationship thereamong in the retracted state of the zoom lens.
FIG. 53 is a view similar to that of FIG. 52, showing the positional relationship among the cam ring, the first external barrel, the second external barrel and the second linear guide ring at the wide-angle extremity of the zoom lens.
Figure 54:
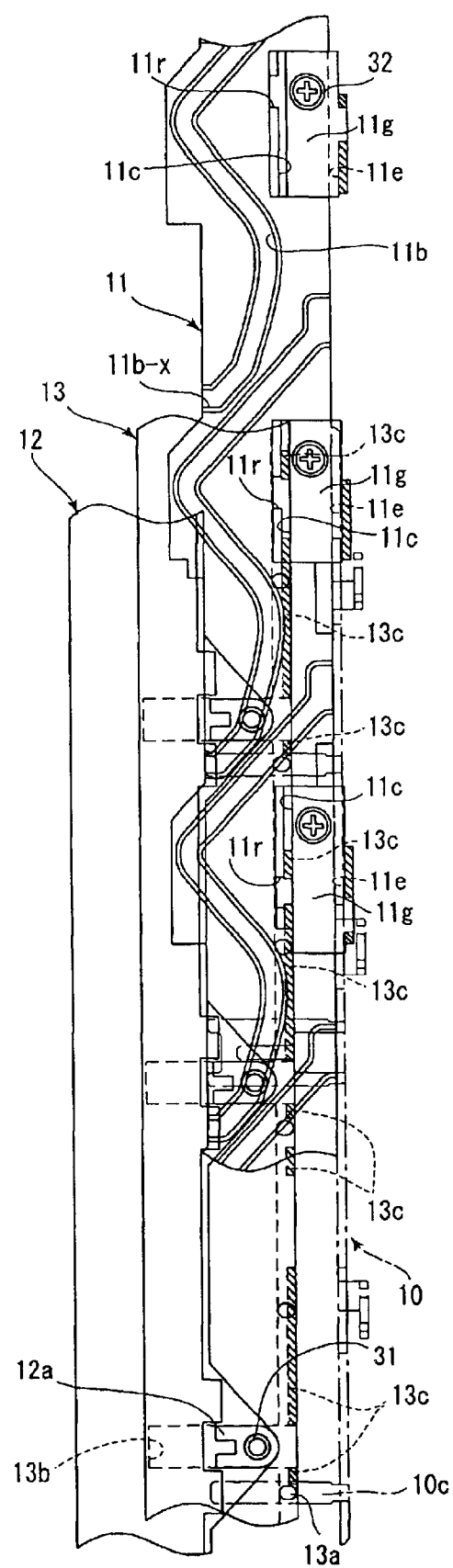
FIG. 54 is a view similar to that of FIG. 52, showing the positional relationship among the cam ring, the first external barrel, the second external barrel and the second linear guide ring at the telephoto extremity of the zoom lens.
Figure 55:
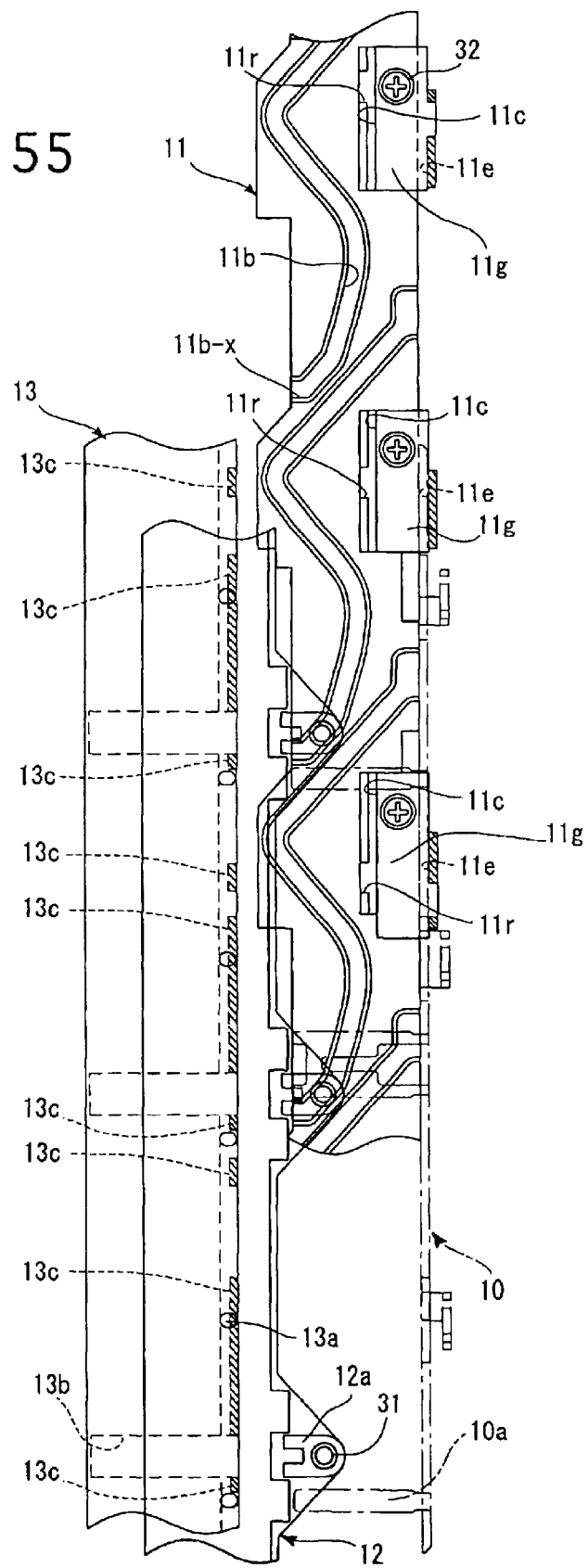
FIG. 55 is a view similar to that of FIG. 52, showing the positional relationship among the cam ring, the first external barrel, the second external barrel and the second linear guide ring.

FIGS. 52 through 55 are developed views of the cam ring 11, the first external barrel 12 and the second external barrel 13, showing the relationship of coupling of each of the first external barrel 12 and the external barrel 13 to the cam ring 11 in different states. Specifically, FIG. 52 shows a state of coupling of the first external barrel 12 and the external barrel 13 to the cam ring 11 when the zoom lens 71 is in the retracted state (which corresponds to the state shown in each of FIGS. 23 and 27), FIG. 53 shows the same when the zoom lens 71 is set at the wide-angle extremity (which corresponds to the state shown in each of FIGS. 24 and 28), FIG. 54 shows the same when the zoom lens 71 is set at the telephoto extremity (which corresponds to the state shown in each of FIGS. 25 and 29), and FIG. 55 shows the same when the zoom lens 71 is in the assemblable/disassemblable state (which corresponds to the state shown in each of FIGS. 26 and 30). As can be seen from FIGS. 52 through 54, the second external barrel 13 cannot be removed from the cam ring 11 in the optical axis direction when the zoom lens 71 is in between the wide-angle extremity and the telephoto extremity, or even in between the wide-angle extremity and the retracted position because some portions of the discontinuous inner flange 13c are engaged in at least a part of the discontinuous circumferential groove 11c. Only when the third external barrel 15 and the helicoid ring 18 are rotated together to the respective assembling/disassembling angular positions as shown in FIGS. 26 and 63, the rotation of the third external barrel 15 causes the cam ring 11 to rotate to a specific rotational position thereof at which all the portions of the discontinuous inner flange 13c of the second external barrel 13 are exactly aligned with the three insertion/removable hole 11r or the three circumferential spaces among the three external protuberances 11g, respectively. This makes it possible to remove the second external barrel 13 from the cam ring 11 from the front thereof as shown in FIGS. 55 and 57.

Figure 58:
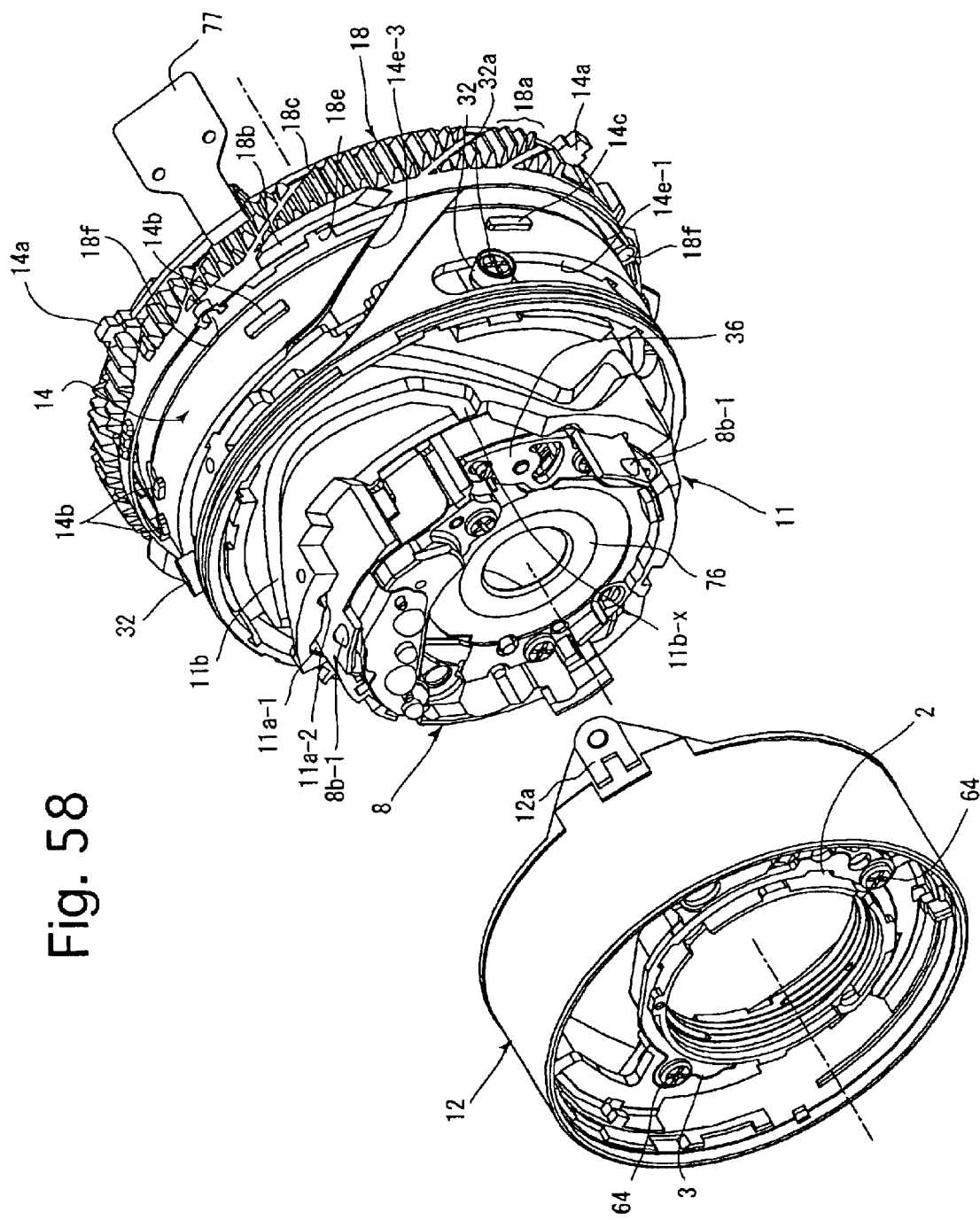
FIG. 58 is an exploded perspective view of elements of the zoom lens, showing a state where the first external barrel has been removed from the block of the zoom lens shown in FIG. 57.

In addition, in the state shown in FIG. 55 in which the zoom lens 71 is in the assemblable/disassemblable state, the set of three cam followers 31 on the first external barrel 12 are positioned close to the front open ends of the set of three outer cam grooves 11b, respectively, so that the first external barrel 12 can be removed from the front of the zoom lens 71 as shown in FIG. 58. In addition, the first lens group adjustment ring 2 can also be removed from the second external barrel 12 after the two set screws 64 are screwed off to remove the fixing ring 3 as shown in FIG. 2. Thereafter, the first lens frame 1 that is supported by the first lens group adjustment ring 2 therein can also be removed from the first lens group adjustment ring 2 from the front thereof.

Although the first linear guide ring 14, the helicoid ring 18, the cam ring 11, and some other elements in the cam ring 11 such as the second lens group moving frame 8 still remain in the stationary barrel 22 in the state shown in FIG. 58, the zoom lens 71 can be further disassembled as needed.

Figure 57:
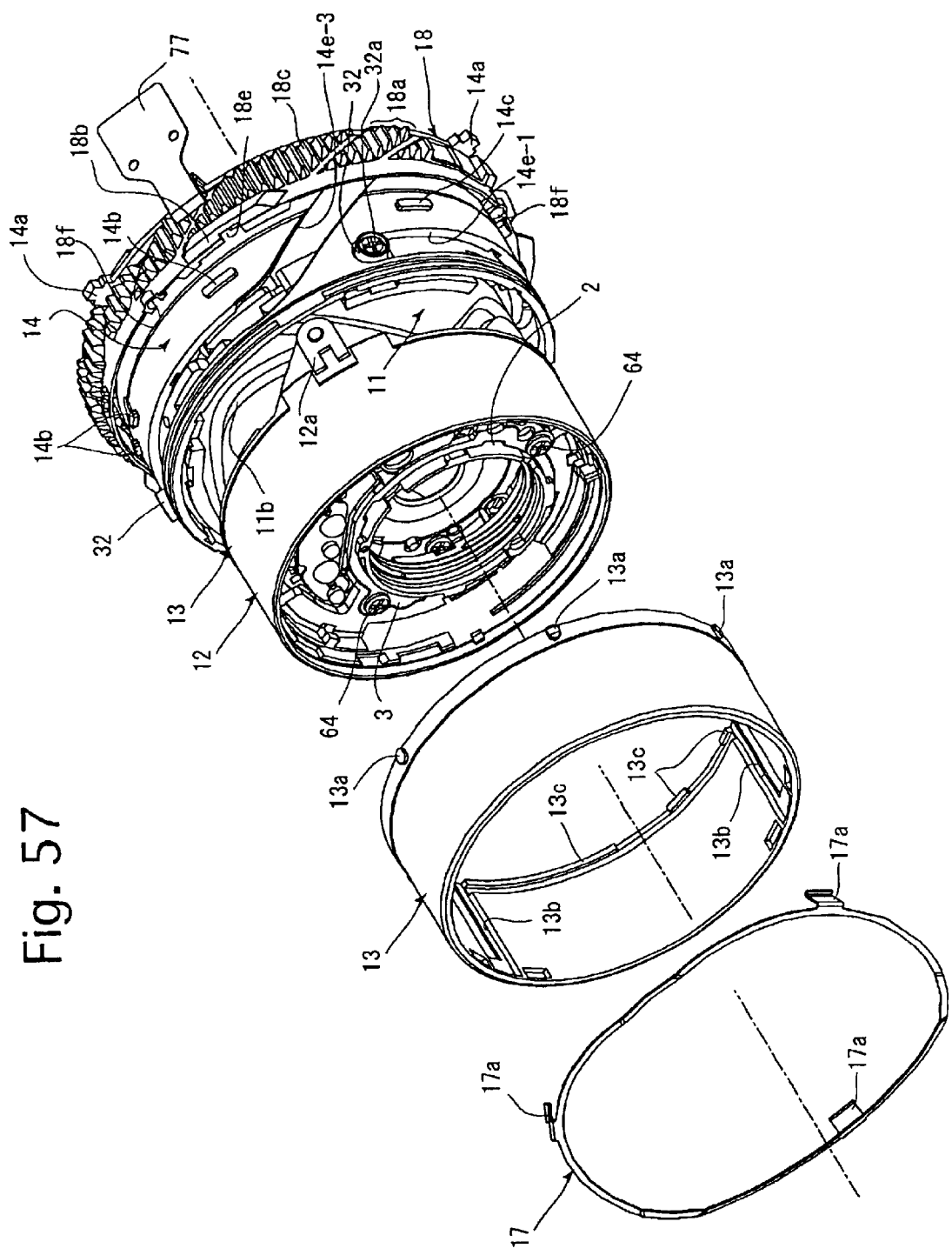
FIG. 57 is an exploded perspective view of elements of the zoom lens, showing a state where the second external barrel and a follower-biasing ring spring have been removed from the block of the zoom lens shown in FIG. 56.
Figure 59:
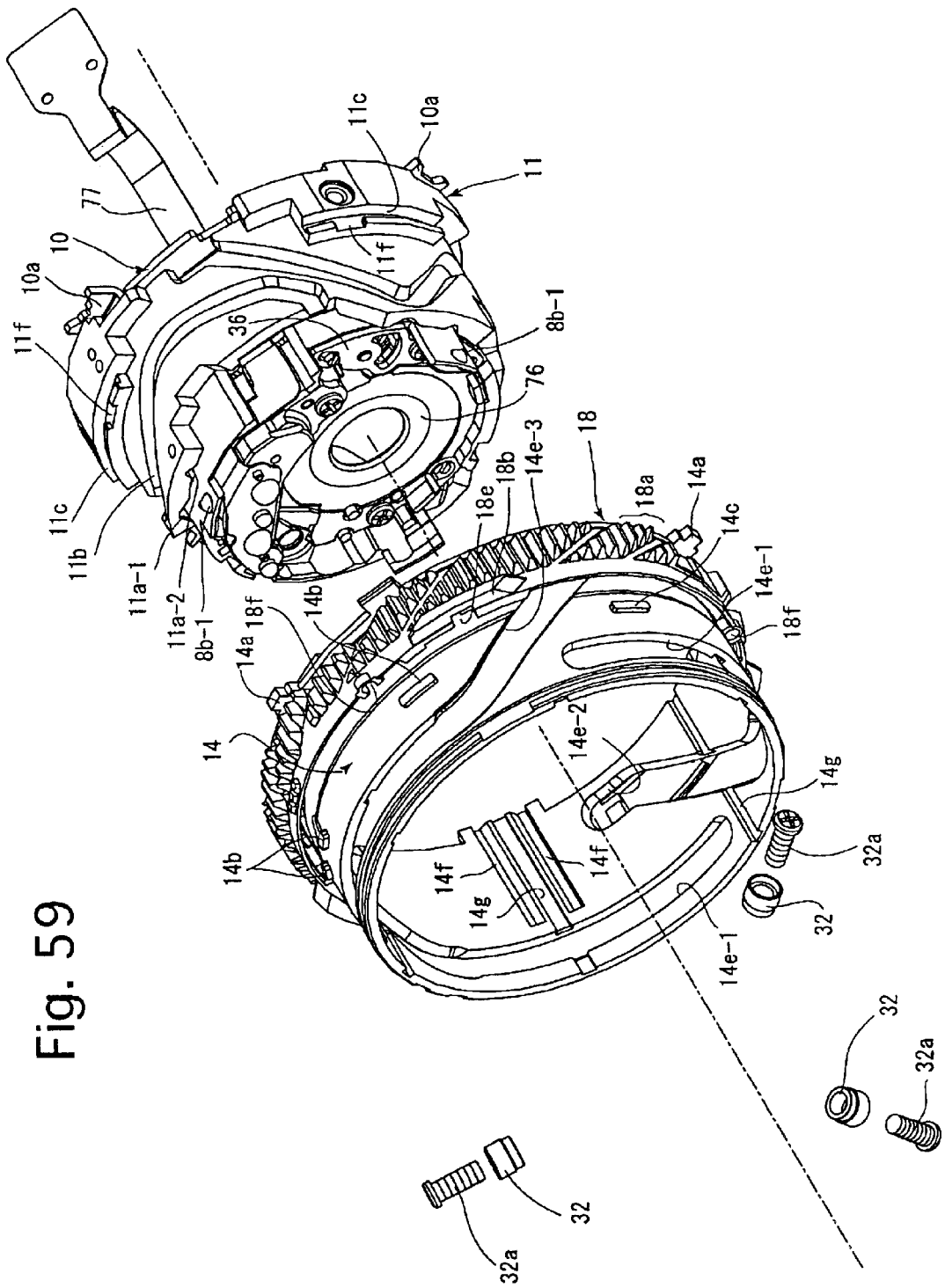
FIG. 59 is an exploded perspective view of elements of the zoom lens, showing a state where the second linear guide ring has been removed from the block of the zoom lens shown in FIG. 58 while the set of roller followers have been removed from the cam ring included in the block.

As can be seen from FIGS. 57 and 58, if the third external barrel 15 is removed with the zoom lens 71 being fully extended forward from the stationary barrel 22, each of the three set screws 32a becomes accessible. Thereafter, if the set of three roller followers 32 are removed together with the three set screws 32a as shown in FIG. 59, a combination of the cam ring 11 and the second linear guide ring 10 can be removed from the first linear guide ring 14 from the rear thereof because no elements of the zoom lens 71 prevent the cam ring 11 from moving rearward in the optical axis direction relative to the first linear guide ring 14. As shown in FIGS. 15 and 59, frond ends of each pair of first linear guide grooves 14f, in which the pair of radial projections of the associated bifurcated projection 10a are engaged, are each formed as a closed end while rear ends of the same are each formed as an open end at the rear end of the first linear guide ring 14. Accordingly, the combination of the cam ring 11 and the second linear guide ring 10 can be removed from the first linear guide ring 14 only from the rear thereof. Although the second linear guide ring 10 and the cam ring 11 are coupled to each other with the discontinuous outer edge of the ring portion 10b being engaged in the discontinuous circumferential groove 11e to be rotatable relative to each other about the lens barrel axis Z0, the second linear guide ring 10 and the cam ring 11 can be disengaged from each other as shown in FIG. 3 when one of the second linear guide ring 10 and the cam ring 11 is positioned in a specific rotational position relative to the other.

When the third external barrel 15 and the helicoid ring 18 are rotated together to the respective assembling/disassembling angular positions as shown in FIGS. 26 and 63, the set of three front cam followers 8b-1 are removed from the set of three front inner cam grooves 11a-1 in the optical axis direction from the front of the cam ring 11 while the set of three rear cam followers 8b-2 are positioned in front open end sections 11a–2x of the set of three rear inner cam grooves 11a-2, respectively. Therefore, the second lens group moving frame 8 can be removed from the cam ring 11 from the front thereof as shown in FIG. 3. Since the front open end sections 11a–2x of the set of three rear inner cam grooves 11a-2 are formed as linear grooves extending in the optical axis direction, the second lens group moving frame 8 can be removed from the cam ring 11 from the front thereof regardless of whether the second lens group moving frame 8 is guided linearly in the optical axis direction by the second linear guide ring 10, i.e., whether or not the set of three front cam followers 8*b*-1 and the set of three rear cam followers 8*b*-2 are engaged in the set of three front inner cam grooves 11*a*-1 and the set of three rear inner cam grooves 11*a*-2, respectively. In the state shown in FIG. 58 in which the cam ring 11 and the second linear guide ring 10 remain inside the first linear guide ring 14, only the second lens group moving frame 8 can be removed.

The pivot shaft 33 and the second lens frame 6 can be removed from the second lens group moving frame 8 after the set screws 66 are unscrewed to remove the pair of second lens frame support plates 36 and 37 (see FIG. 3).

Aside from the elements positioned inside the cam ring 11, the helicoid ring 18 can be removed from the stationary barrel 22. In this case, after the CCD holder 21 is removed from the stationary barrel 22, the helicoid ring 18 is rotated in the lens barrel retracting direction from the assembling/disassembling angular position to be removed from the stationary barrel 22. This rotation of the helicoid ring 18 in the lens barrel retracting direction causes the set of three rotational sliding projections 18*b* to move back into the set of three inclined grooves 22*c* from the set of three rotational sliding grooves 22*d* so that the male helicoid 18*a* is engaged with the female helicoid 22*a*, thus causing the helicoid ring 18 to move rearward while rotating about the lens barrel axis Z0. Upon the helicoid ring 18 moving rearward beyond the position thereof shown in FIGS. 23 and 27, the set of three rotational sliding projections 18*b* are respectively removed from the set of three inclined grooves 22*c* from rear open end sections 22*c–x* thereof while the male helicoid 18*a* is disengaged from the female helicoid 22*a*. Consequently, the helicoid ring 18, together with the linear guide ring 14, is removed from the stationary barrel 22 from the rear thereof.

The helicoid ring 18 and the linear guide ring 14 are engaged with each other by engagement of the first plurality of relative rotation guide projections 14*b* with the circumferential groove 18*g*. Similar to the second plurality of relative rotation guide projections 14*c*, the first plurality of relative rotation guide projections 14*b* are formed on the first linear guide ring 14 at irregular intervals in a circumferential direction thereof, and some of the first plurality of relative rotation guide projections 14*b* have different circumferential widths than another ones. The helicoid ring 18 is provided on an inner peripheral surface thereof with a plurality of insertion/removable grooves 18*h* via which the first plurality of relative rotation guide projections 14*b* can enter the helicoid ring 18 (the circumferential groove 18*g*) in the optical axis direction, respectively, only when the first linear guide ring 14 is positioned in a specific rotational position relative to the helicoid ring 18.

Figure 48:
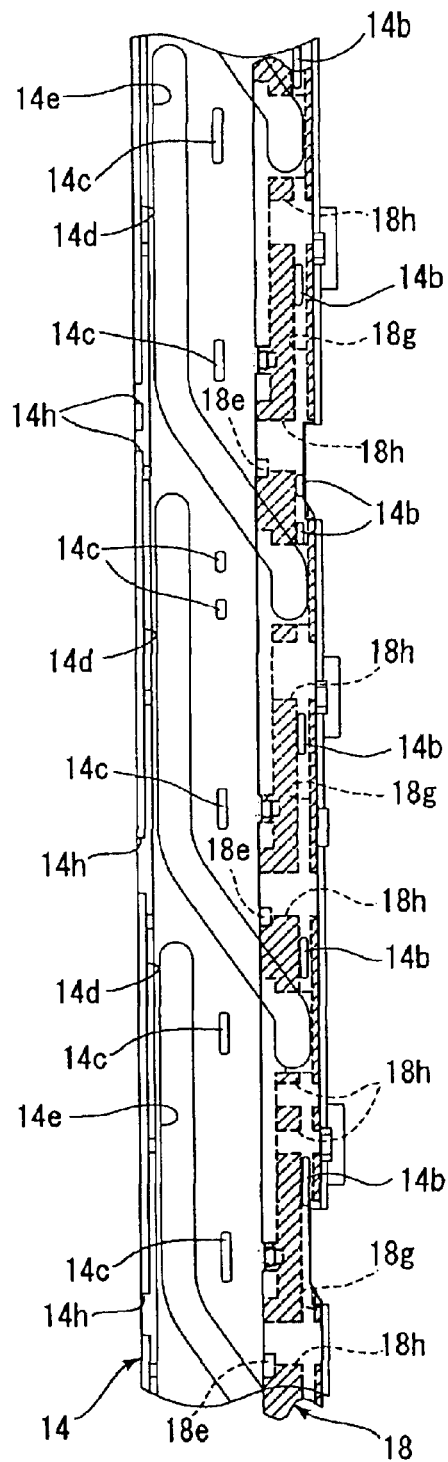
FIG. 48 is a developed view of the helicoid ring and the first linear guide ring, showing the positional relationship therebetween in the retracted state of the zoom lens.
Figure 49:
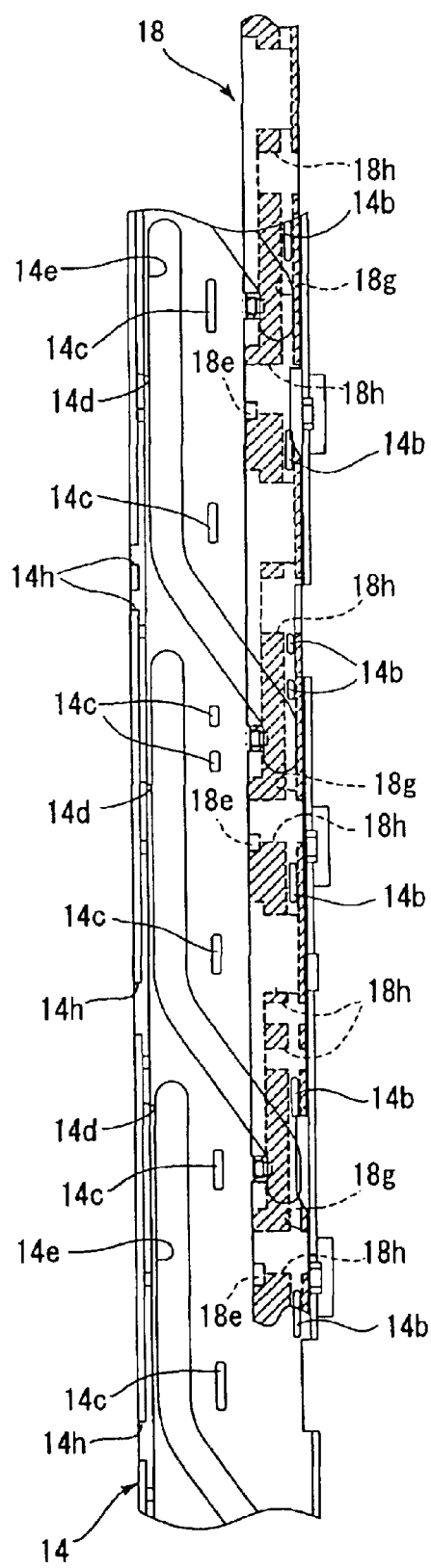
FIG. 49 is a view similar to that of FIG. 48, showing the positional relationship between the helicoid ring and the first linear guide ring at the wide-angle extremity of the zoom lens.
Figure 50:
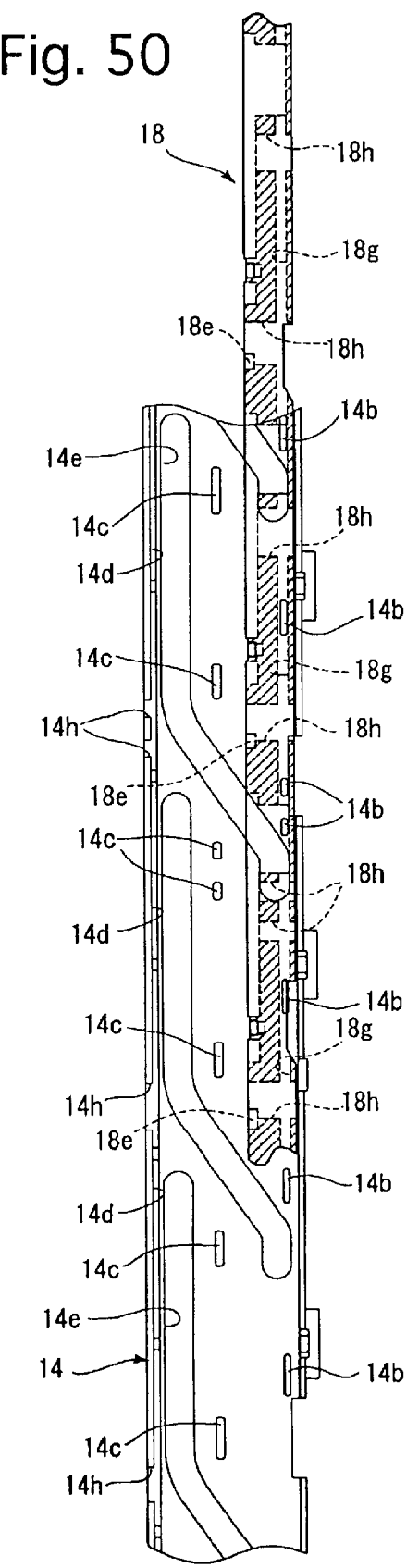
FIG. 50 is a view similar to that of FIG. 48, showing the positional relationship between the helicoid ring and the first linear guide ring at the telephoto extremity of the zoom lens.
Figure 51:
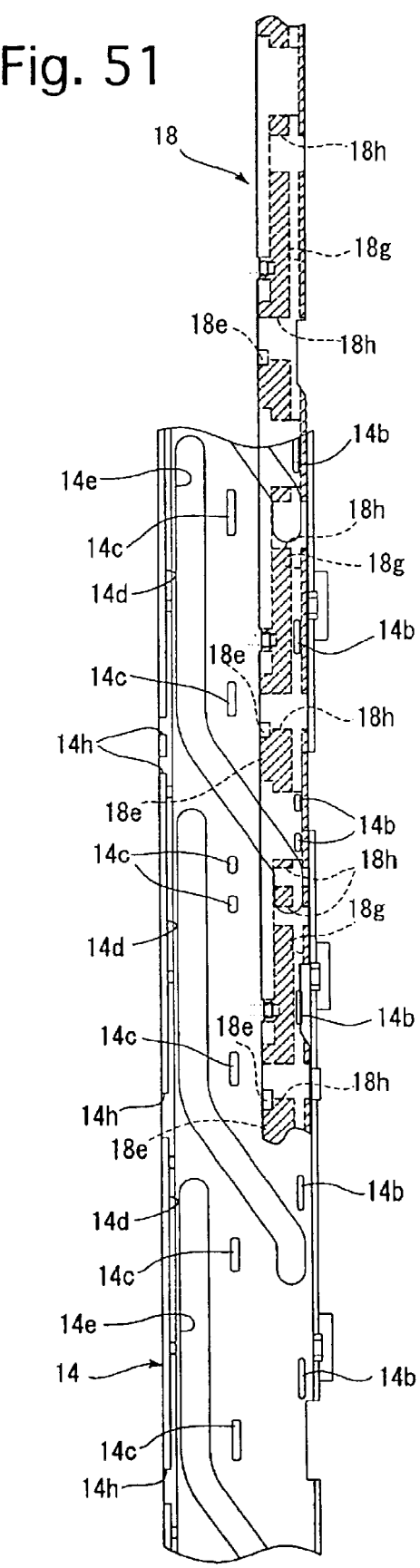
FIG. 51 is a view similar to that of FIG. 48, showing the positional relationship between the helicoid ring and the first linear guide ring.

FIGS. 48 through 51 show developed views of the first linear guide ring 14 and the helicoid ring 18, showing the relationship of coupling therebetween in different states. Specifically, FIG. 48 shows a state of coupling between the first linear guide ring 14 and the helicoid ring 18 when the zoom lens 71 is in the retracted state (which corresponds to the state shown in each of FIGS. 23 and 27), FIG. 49 shows another state of coupling between the first linear guide ring 14 and the helicoid ring 18 when the zoom lens 71 is set at the wide-angle extremity (which corresponds to the state shown in each of FIGS. 24 and 28), FIG. 50 shows the same when the zoom lens 71 is set at the telephoto extremity as shown in FIGS. 25 and 29, and FIG. 51 shows another state of coupling between the first linear guide ring 14 and the helicoid ring 18 when the zoom lens 71 is in the assemblable/disassemblable state (which corresponds to the state shown in each of FIGS. 26 and 30). As can be seen from FIGS. 48 through 51, when the zoom lens 71 is in between the retracted position and the position in the assemblable/disassemblable state, in which the third external barrel 15 and the helicoid ring 18 are positioned in the respective assembling/disassembling angular positions as shown in FIGS. 26 and 63, all of the first plurality of relative rotation guide projections 14*b* cannot be inserted into or removed from the plurality of insertion/removable grooves 18*h* at the same time, respectively, which makes it impossible to disengage the helicoid ring 18 and the first linear guide ring 14 from each other in the optical axis direction. All the first plurality of relative rotation guide projections 14*b* can be inserted into or removed from the plurality of insertion/removable grooves 18*h* at the same time, respectively, only when the helicoid ring 18 is further rotated in the lens barrel retracting direction (downwards as viewed in FIG. 48) to a specific rotational position beyond the retracted position of the helicoid ring 18 shown in FIG. 48. After the helicoid ring 18 has been rotated to the specific rotational position, moving the helicoid 18 forward (leftward as viewed in FIGS. 48 through 51) with respect to the first linear guide ring 14 causes the first plurality of relative rotation guide projections 14*b* to be removed from the plurality of insertion/removable grooves 18*h* to the rear of the circumferential groove 18*g*, respectively. Alternatively, it is possible to modify the structure coupling between the first linear guide ring 14 and the helicoid ring 18 so that all the first plurality of relative rotation guide projections 14*b* can pass the helicoid ring 18 in the optical axis direction through the plurality of insertion/removable grooves 18*h* at the same time when the helicoid ring 18 and the linear guide ring 14 are positioned at the aforementioned respective rotational positions at which the helicoid ring 18 and the linear guide ring 14 can be removed from the stationary barrel 22.

The second plurality of relative rotation guide projections 14*c*, which are engaged in the circumferential groove 15*e* of the third external barrel 15, are formed in front of the first plurality of relative rotation guide projections 14*b* on first linear guide ring 14 in the optical axis direction. As described above, the first plurality of relative rotation guide projections 14*b* are formed as circumferentially elongated projections at different circumferential positions on the first linear guide ring 14 while the second plurality of relative rotation guide projections 14*c* are formed as circumferentially elongated projections at different circumferential positions on the first linear guide ring 14. More specifically, although the respective positions of the first plurality of relative rotation guide projections 14*b* are not coincident with those of the second plurality of relative rotation guide projections 14*c* in a circumferential direction of the first linear guide ring 14, the first plurality of relative rotation guide projections 14*b* and the second plurality of relative rotation guide projections 14*c* are the same as each other in the number of projections, intervals of projections, and circumferential widths of corresponding projections as shown in FIG. 15. Namely, there is a specific relative rotational position between the second plurality of relative rotation guide projections 14*c* and the plurality of insertion/removable grooves 18*h*, in which the second plurality of relative rotation guide projections 14*c* and the plurality of insertion/removable grooves 18*h* can be disengaged from each other in the optical axis direction. If the helicoid ring 18 is moved forward from the first linear guide ring 14 in a state where the second plurality of relative rotation guide projections 14*c* and the plurality of insertion/removable grooves 18*h* are in such a specific relative rotational position, each relative rotation guide projections 14*c* can be inserted into the corresponding insertion/removable groove 18h from the front end thereof and subsequently removed from the same insertion/removable groove 18h from the rear end thereof so that the helicoid ring 18 can be removed from the first linear guide ring 14 from the front thereof. Accordingly, the front and rear ends of each insertion/removable groove 18h are respectively formed as open ends so that the associated relative rotation guide projections 14c can pass the helicoid ring 18 in the optical axis direction through the insertion/removable groove 18h.

Namely, the helicoid ring 18 and the first linear guide ring 14 are not in a disengagable state until the helicoid ring 18 and the first linear guide ring 14 are removed from the stationary barrel 22 and relatively rotated by a predetermined amount of rotation. In other words, when disassembling the third external barrel 15, the helicoid ring 18 and the first linear guide ring 14 are mutually engaged with each other while being supported inside the stationary barrel 22. The assembly process is accordingly facilitated by disallowing the first linear guide ring 14 from being disengaged.

As can be understood from the foregoing, in the present embodiment of the zoom lens, the third external barrel 15, which performs the rotating advancing/rotating-retracting operation and the fixed-position rotating operation, can be easily removed from the zoom lens 71 by rotating the third external barrel 15 and the helicoid ring 18 together to the respective assembling/disassembling angular positions as shown in FIGS. 26 and 63, which are different from any of their respective positions in either of the zooming range and the retracting range, after the stop member 26 has been removed from the stationary barrel 22. Moreover, a function of the three rotational sliding projections 18b for removing backlash between the third external barrel 15 and the stationary barrel 22 and backlash between the helicoid ring 18 and the stationary barrel 22 can be cancelled by removing the third external barrel 15 from the zoom lens 71. Furthermore, when the zoom lens 71 is in the assemblable/disassemblable state, in which the third external barrel 15 can be inserted into or removed from the zoom lens 71, the second external barrel 13, the first external barrel 12, the cam ring 11, the second lens group moving frame 8 and other elements are also positioned at their respective assembling/disassembling positions to become removable from the zoom lens 71 one after another after the third external barrel 15 is removed from the zoom lens 71. This results in an improvement in workability of disassembling the zoom lens 71.

Although only a disassembling procedure of the zoom lens 71 has been discussed above, a reverse procedure to the above disassembling procedure can be performed as an assembling procedure of the zoom lens 71. This also results in an improvement in workability of assembling the zoom lens 71.

Figure 64:
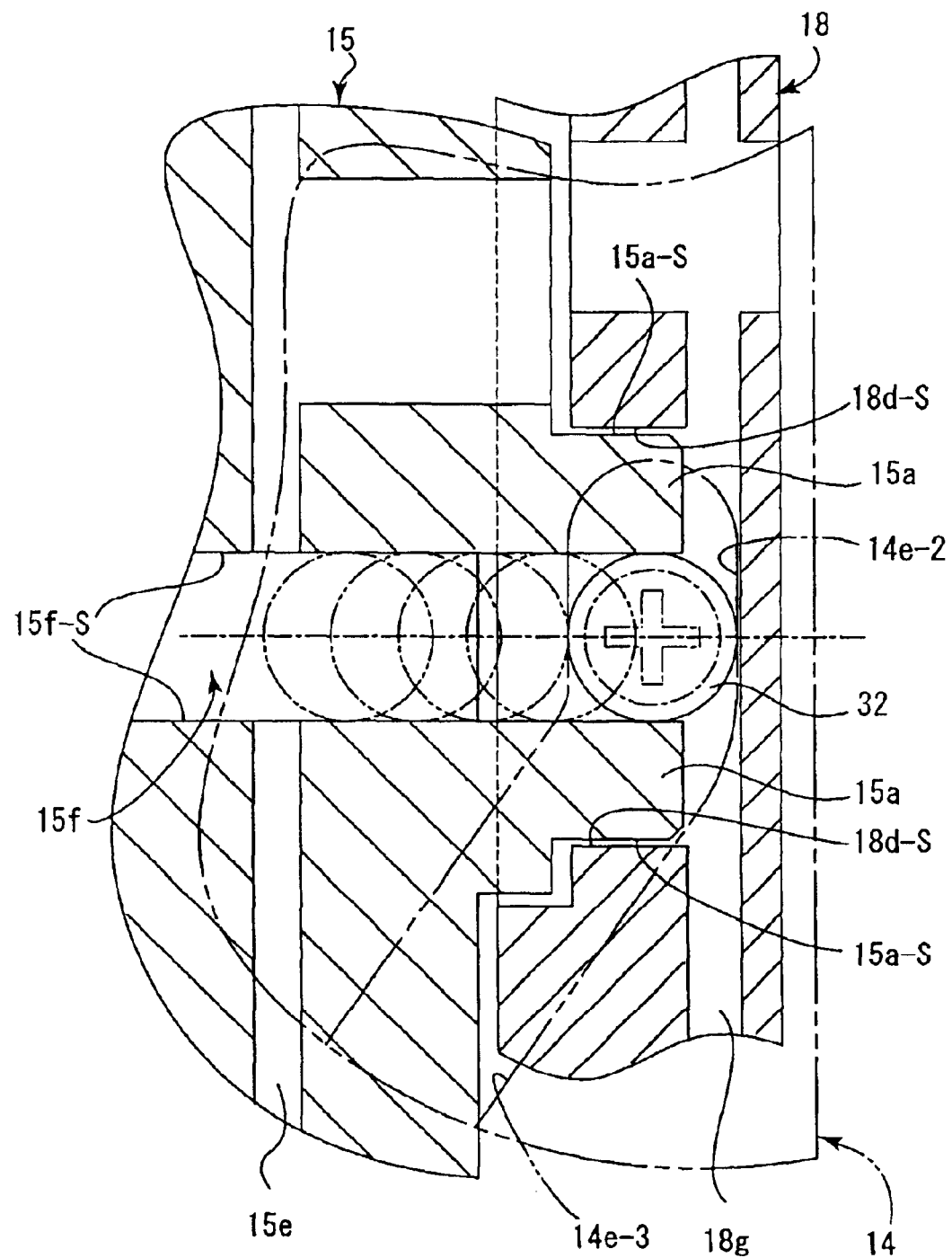
FIG. 64 is an enlarged developed view of portions of the third external barrel and the helicoid ring in relation to the set of roller followers fixed to the cam ring, viewed from radially inside the third external barrel and the helicoid ring.
Figure 65:
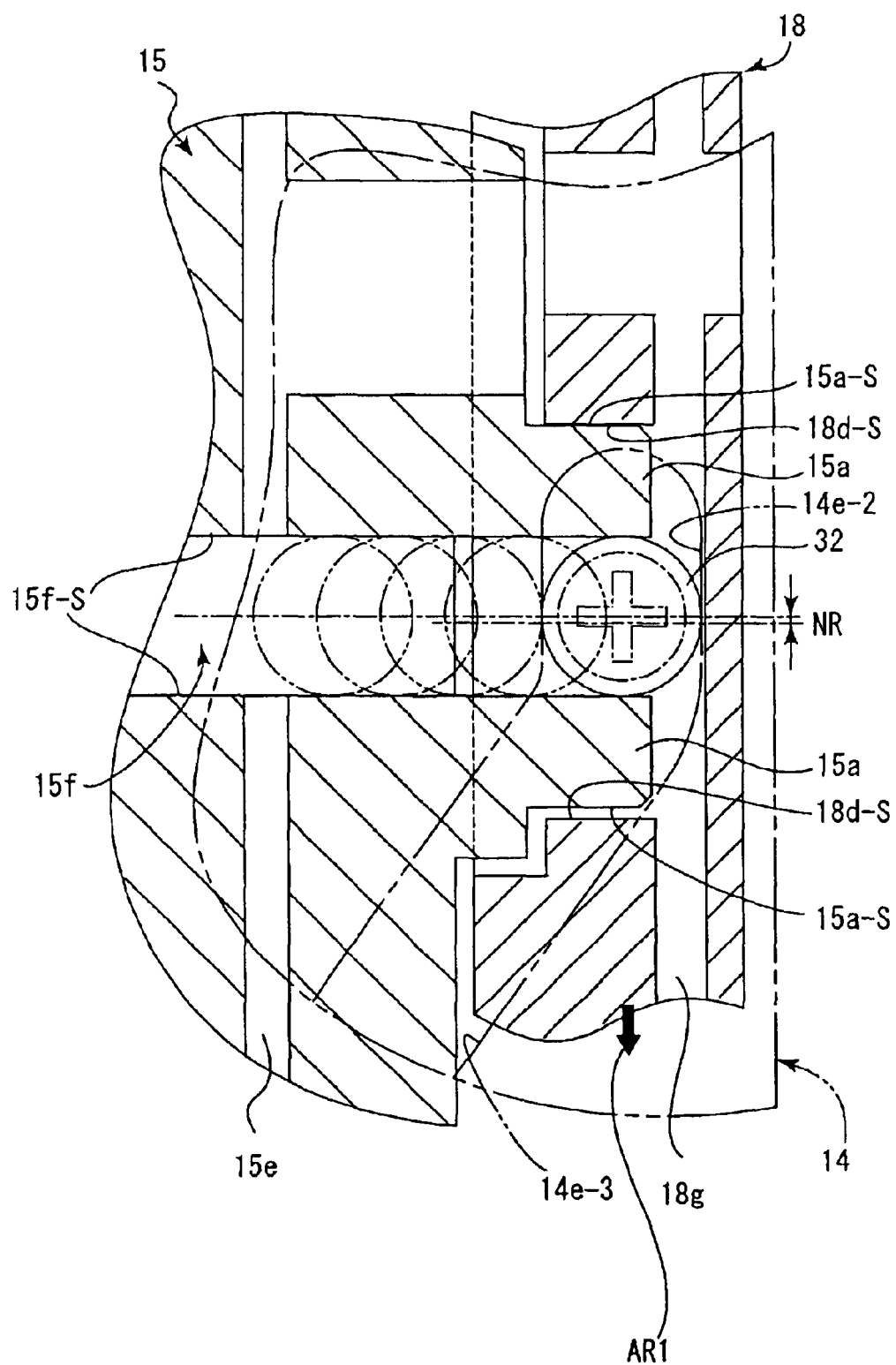
FIG. 65 is a view similar to that of FIG. 64, showing a state where the helicoid ring is rotated in a lens barrel advancing direction thereof.
Figure 66:
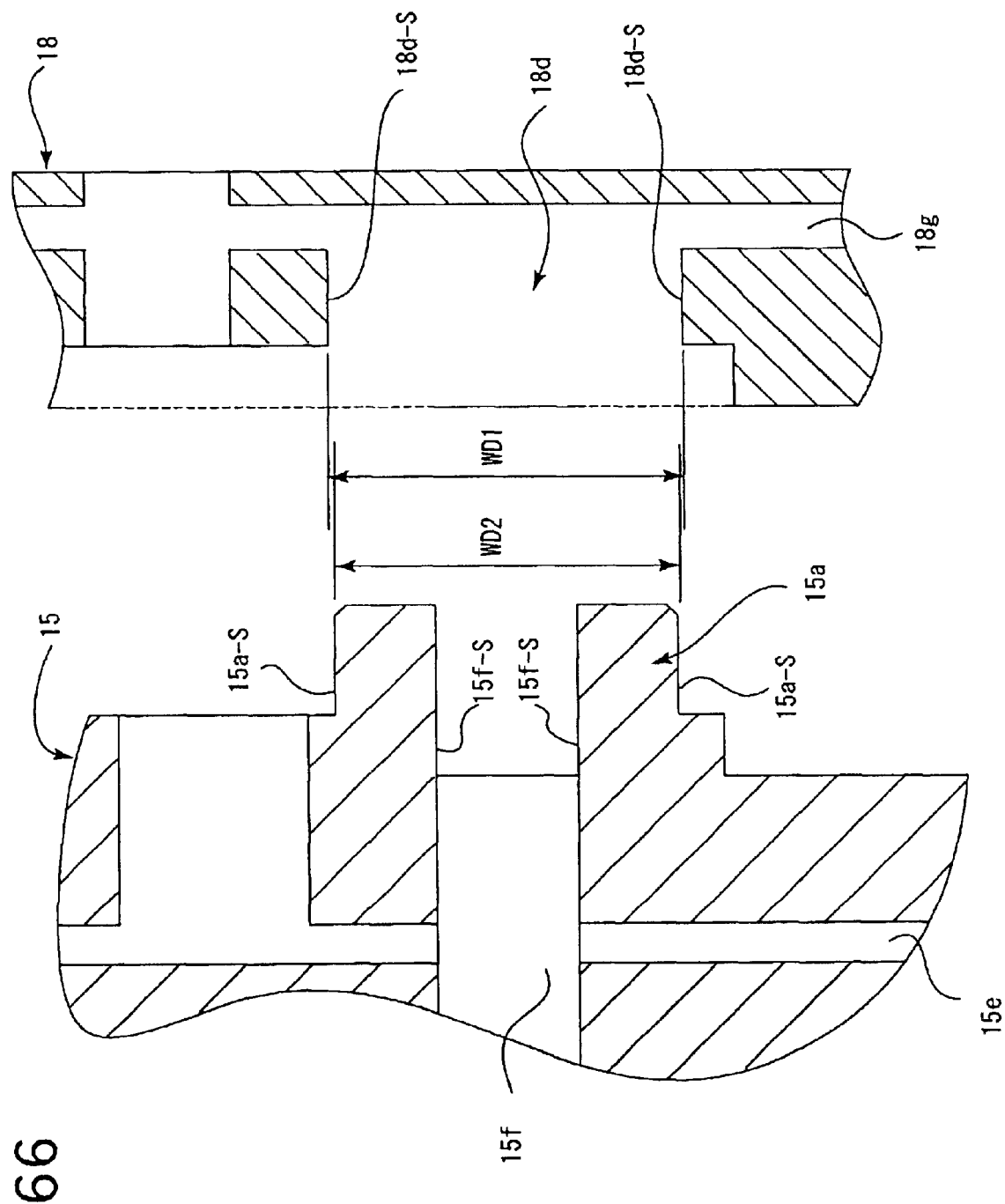
FIG. 66 is an enlarged developed view of portions of the third external barrel and the helicoid ring shown in FIG. 64.

Another feature of the zoom lens 71 which is associated with the third external barrel 15 (and also the helicoid ring 18) will be hereinafter discussed with reference mainly to FIGS. 60 through 72. In FIGS. 60 through 63, some portions of the linear guide ring 14 and the third external barrel 15, and the follower-biasing ring spring 17 for biasing the set of three roller followers 32 would not normally be visible (i.e., are supposed to be shown by hidden lines), but are shown by solid lines for the purpose of illustration. FIGS. 64 through 66 show portions of the third external barrel 15 and the helicoid ring 18, viewed from the inside thereof, and accordingly the direction of inclination of, e.g. the inclined lead slot portion 14e-3 appeared in FIGS. 64 and 65, is opposite to that shown in the other Figures.

As can be understood from the above descriptions, in the present embodiment of the zoom lens 71, a rotatable barrel positioned immediately inside the stationary barrel 22 (namely, the first rotatable barrel when viewed from the side of the stationary barrel 22) is divided into two parts: the third external barrel 15 and the helicoid ring 18. In the following descriptions, the third external barrel 15 and the helicoid ring 18 are referred to as a rotatable barrel KZ in some cases for clarity (e.g., see FIGS. 23 through 26, 60 through 62). The function of the rotatable barrel KZ is to impart motion to the set of three roller followers 32 to rotate the set of three roller followers 32 about the lens barrel axis Z0. The cam ring 11 receives force, which makes the cam ring 11 rotate about the lens barrel axis Z0 while moving in the optical axis direction, via the set of three roller followers 32 to move the first and second lens groups LG1 and LG2 in the optical axis direction in a predetermined moving manner. Engaging portions of the rotatable barrel KZ which are engaged with the set of three roller followers 32, i.e., the set of three rotation transfer grooves 15f satisfy some conditions which will be hereinafter discussed.

First of all, the set of three rotation transfer grooves 15f, in which the set of three roller followers 32 are engaged, need to have lengths corresponding to the range of movement of the set of three roller followers 32 in the optical axis direction. This is because each roller follower 32 is not only rotated about the lens barrel axis Z0 between a retracted position shown in FIG. 60 and a position shown in FIG. 62 which corresponds to the telephoto extremity of the zoom lens 71 via a position shown in FIG. 61 which corresponds to the wide-angle extremity of the zoom lens 71, but also moved in the optical axis direction relative to the rotatable barrel KZ by the associated inclined lead slot portion 14e-3 of the first linear guide ring 14.

The third external barrel 15 and the helicoid ring 18 substantially operate as a one-piece rotatable barrel: the rotatable barrel KZ. This is because the third external barrel 15 and the helicoid ring 18 are prevented from rotating relative to each other by engagement of the three pairs of rotation transfer projections 15a with the three rotation transfer recesses 18d, respectively. However, in the present embodiment of the zoom lens, since the third external barrel 15 and the helicoid ring 18 are provided as separate members for the purpose of assembling and disassembling the zoom lens 71, there is provided a slight clearance between each pair of rotation transfer projections 15a and the associated rotation transfer recess 18d in a rotational direction (vertical direction as viewed in FIG. 66). More specifically, as shown in FIG. 66, the three pairs of rotation transfer projections 15a and the three rotation transfer recesses 18d are formed so that a circumferential space WD1 between circumferentially-opposed two side surfaces 18d-S of the helicoid ring 18 in each rotation transfer recess 18d that extend parallel to each other becomes slightly greater than a circumferential space WD2 between opposite end surfaces 15a-S of the associated pair of rotation transfer projections 15a that also extend parallel to each other. Due to this clearance, the third external barrel 15 and the helicoid ring 18 slightly rotate relative to each other about the lens barrel axis Z0 when one of the third external barrel 15 and the helicoid ring 18 is rotated about the lens barrel axis Z0 relative to the other. For instance, in the state shown in FIG. 64, if the helicoid ring 18 is rotated in the lens barrel advancing direction shown by an arrow AR1 in FIG. 65 (downwards as viewed in FIGS. 64 and 65) with respect to the third external barrel 15, the helicoid ring 18 rotates in the same direction by an amount of rotation "NR" with respect to the third external barrel 15 so that one of the circumferentially-opposed two side surfaces 18*d*-S in each rotation transfer recess 18*d* comes into contact with corresponding one of the opposite end surfaces 15*a*-S of the associated pair of rotation transfer projections 15*a* as shown in FIG. 65. Therefore, the set of three rotation transfer grooves 15*f* must be formed on the third external barrel 15 to be capable of guiding the set of three roller followers 32 smoothly in the optical axis direction at all times regardless of the presence or absence of a variation in the relative rotational position between the third external barrel 15 and the helicoid ring 18 that is caused by the presence of the clearance between each pair of rotation transfer projections 15*a* and the associated rotation transfer recess 18*d*. This clearance is exaggerated in the drawings for the purpose of illustration.

In the present embodiment of the zoom lens, the three pairs of rotation transfer projections 15*a* that extend rearward in the optical axis direction are formed on the third external barrel 15 as engaging portions thereof for engaging the third external barrel 15 with the helicoid ring 18. This structure of the three pairs of rotation transfer projections 15*a* has been fully utilized for the formation of the set of three rotation transfer grooves 15*f* on the third external barrel 15. More specifically, the major potion of each rotation transfer groove 15*f* is formed on an inner peripheral surface of the third external barrel 15 so that the circumferential positions of the three rotation transfer grooves 15*f* correspond to those of the three pairs of rotation transfer projections 15*a*, respectively. In addition, the remaining rear end portion of each rotation transfer groove 15*f* is elongated rearward in the optical axis direction to be formed between opposed guide surfaces 15*f*-S (see FIG. 66) of the associated pair of rotation transfer projections 15*a*.

No gaps or steps are formed in each rotation transfer groove 15*f* because each rotation transfer groove 15*f* is formed only on the third external barrel 15, not formed as a groove extending over the third external barrel 15 and the helicoid ring 18. Even if the relative rotational position between the third external barrel 15 and the helicoid ring 18 slightly varies due to the clearance between each pair of rotation transfer projections 15*a* and the associated rotation transfer recess 18*d*, the opposed guide surfaces 15*f*-S of each rotation transfer groove 15*f* remain invariant in shape. Therefore, the set of three rotation transfer grooves 15*f* are capable of guiding the set of three roller followers 32 smoothly in the optical axis direction at all times.

Figure 60:
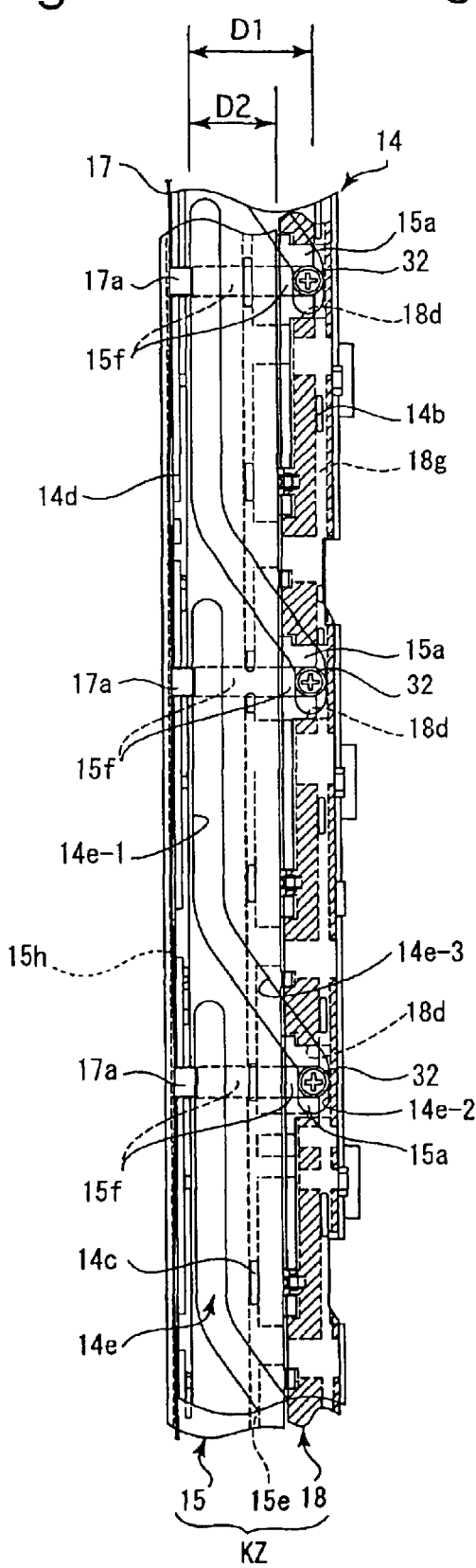
FIG. 60 is a developed view of the helicoid ring, the third external barrel, the first linear guide ring and the follower-biasing ring spring in relation to the set of roller followers fixed to the cam ring, showing the positional relationship thereamong in the retracted state of the zoom lens.
Figure 61:
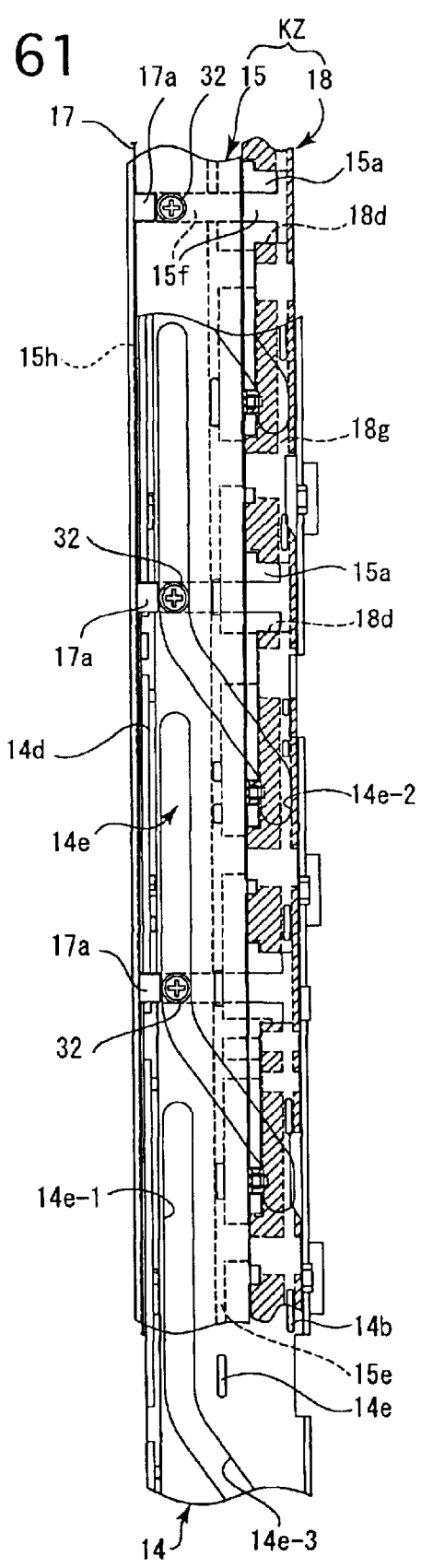
FIG. 61 is a view similar to that of FIG. 60, showing the positional relationship among the helicoid ring, the third external barrel and the first linear guide ring at the wide-angle extremity of the zoom lens.
Figure 62:
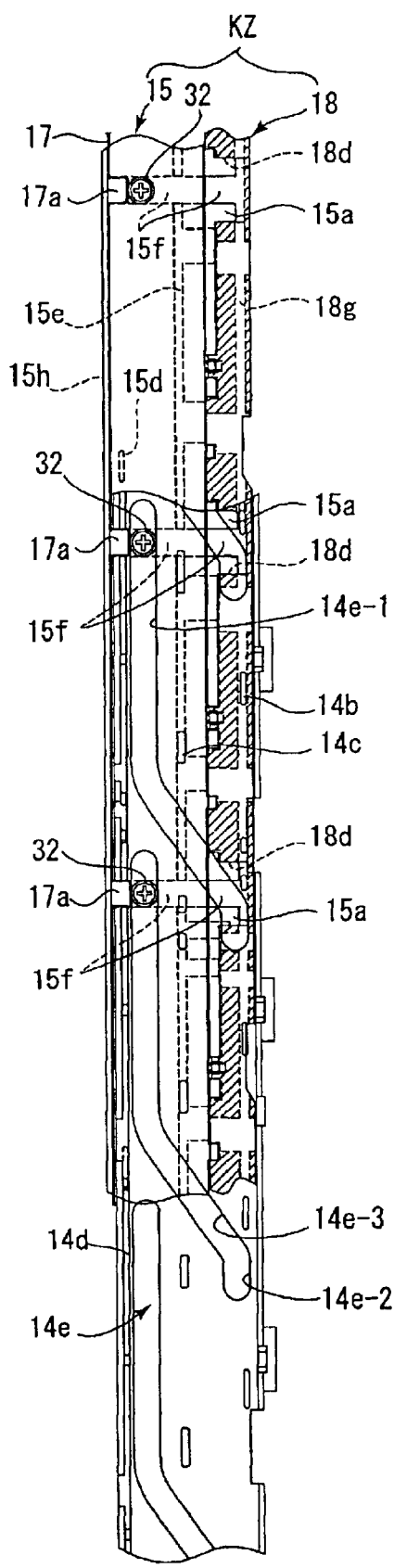
FIG. 62 is a view similar to that of FIG. 60, showing the positional relationship among the helicoid ring, the third external barrel and the first linear guide ring at the telephoto extremity of the zoom lens.

The set of three rotation transfer grooves 15*f* can be formed to have sufficient lengths in the optical axis direction by making most of the three pairs of rotation transfer projections 15*a* that project in the optical axis direction, respectively. As shown in FIGS. 60 through 62, a range of movement D1 of the set of three roller followers 32 in the optical axis direction (see FIG. 60) is greater than an axial length D2 of an area on the inner peripheral surface of the third external barrel 15 (except for the three pairs of rotation transfer projections 15*a*) in the optical axis direction on which grooves extending in the optical axis direction can be formed. Specifically, in the state shown in FIGS. 60 and 64 in which the zoom lens 71 is in the retracted state as shown in FIG. 10, each roller follower 32 has moved rearward to a point (retracted point) between the front and rear ends of the helicoid ring 18 in the optical axis direction. However, since each pair of rotation transfer projections 15*a* extends rearward to a point corresponding to the retracted point between the front and rear ends of the helicoid ring 18 in the optical axis direction because the three pairs of rotation transfer projections 15*a* need to remain engaged in the three rotation transfer recesses 18*d*, respectively, the engagement of the set of three roller followers 32 with the set of three rotation transfer grooves 15*f* is maintained even if the set of three roller followers 32 are moved rearward to the respective retracted points. Accordingly, the set of three roller followers 32 can be guided in the optical axis direction in a range of movement extending over the third external barrel 15 and the helicoid ring 18 even if guiding portions (the set of three rotation transfer grooves 15*f*) which are engaged with the set of three roller followers 32 (to guide the set of three roller followers 32) are formed only on the third external barrel 15 of the rotatable barrel KZ.

Even though the circumferential groove 15*e* intersects each rotation transfer groove 15*f* on the inner peripheral surface of the third external barrel 15, the circumferential groove 15*e* does not deteriorate the guiding function of the set of three rotation transfer grooves 15*f* because the depth of the circumferential groove 15*e* is smaller than that of each rotation transfer groove 15*f*.

Figure 67:
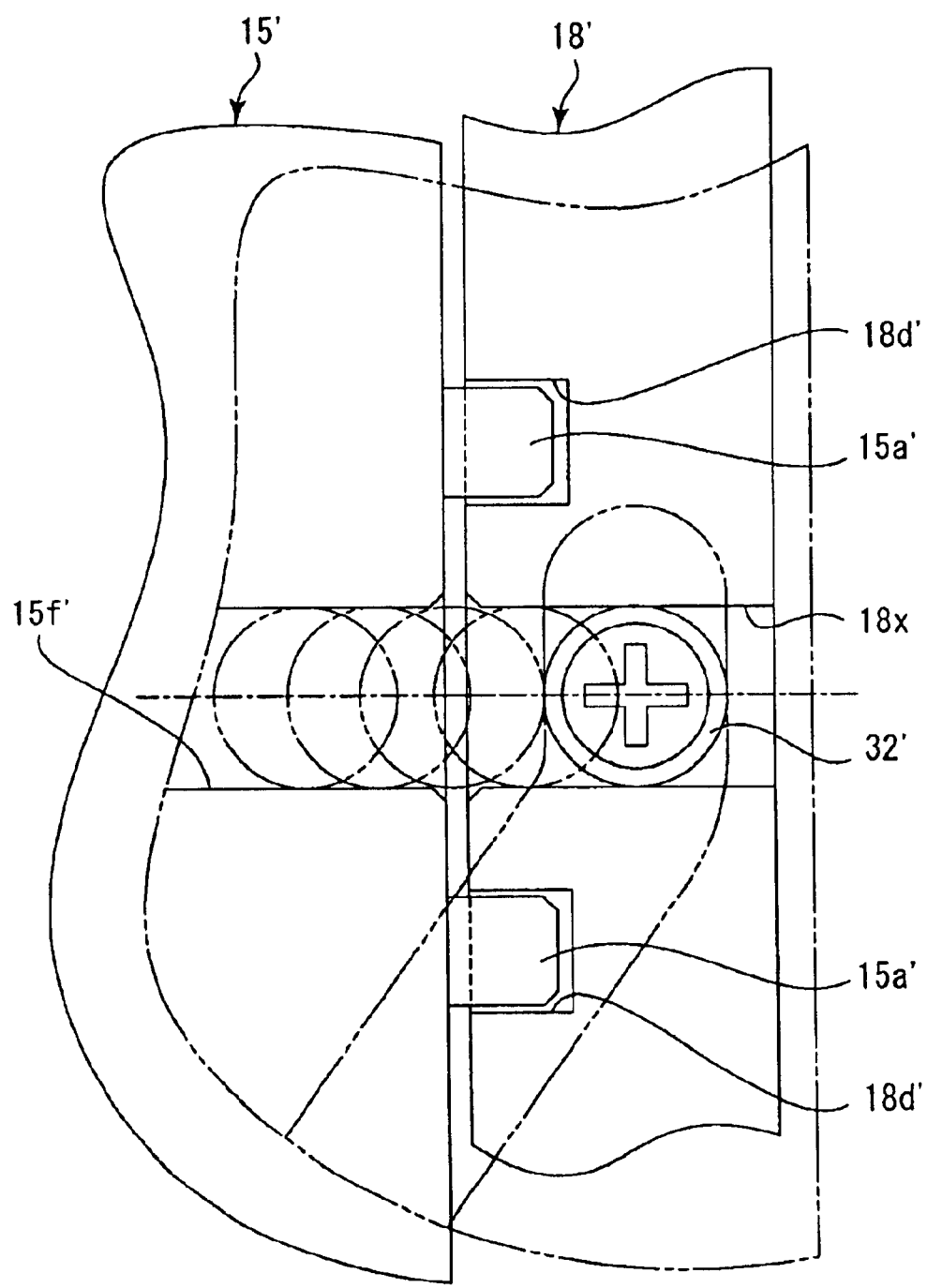
FIG. 67 is an enlarged developed view of portions of a front rind and a rear ring of a comparative example which are to be compared with the third external barrel and the helicoid ring shown in FIGS. 64 through 66.
Figure 68:
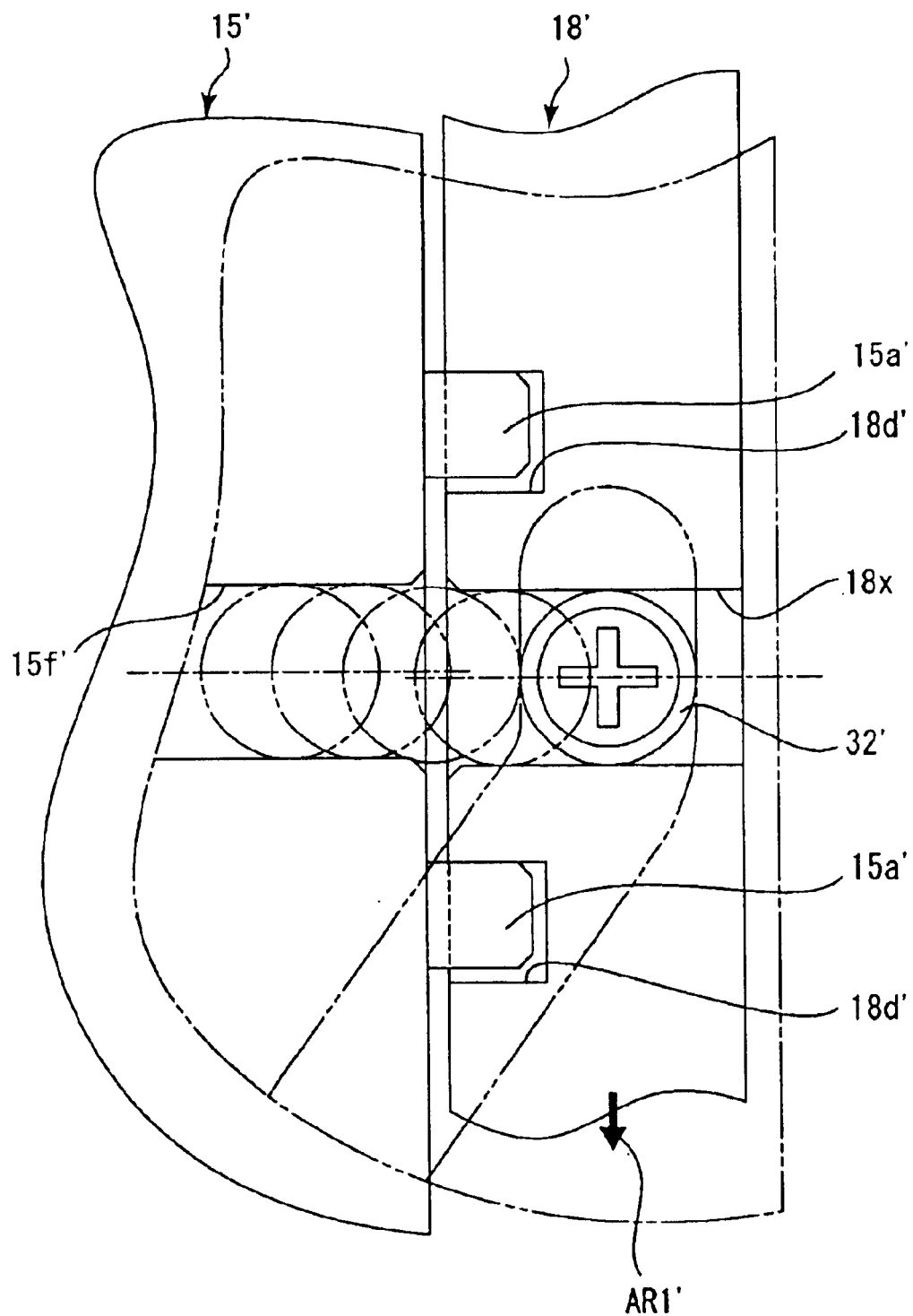
FIG. 68 is a view similar to that of FIG. 67, showing a state where the rear ring has slightly rotated with respect to the front ring from the state shown in FIG. 67.

FIGS. 67 and 68 show a comparative example which is to be compared with the above described structure shown mainly in FIGS. 64 through 66. In this comparative example, a front ring 15' (which corresponds to the third external barrel 15 of the present embodiment of the zoom lens) is provided with a set of three rotation transfer grooves 15*f'* (only one of them is shown in FIGS. 67 and 68) extending linearly in the optical axis direction, while a rear ring 18' (which corresponds to the helicoid ring 18 of the present embodiment of the zoom lens) is provided with a set of three extension grooves 18*x* extending linearly in the optical axis direction. A set of three roller followers 32' (which corresponds to the set of three roller followers 32 of the present embodiment of the zoom lens 71) are engaged in the set of three rotation transfer grooves 15*f'* or the set of three extension grooves 18*x* so that each roller follower 32' can move in the associated rotation transfer groove 15*f'* and the associated extension groove 18*x* in the optical axis direction. Namely, the set of three roller followers 32' are respectively movable in a set of three grooves extending over the front ring 15' and the rear ring 18'. The front ring 15' and the rear ring 18' are engaged with each other via a plurality of rotation transfer projections 15*a'* of the front ring 15' and a corresponding plurality of rotation transfer grooves 18*d'* of the rear ring 18' in which the plurality of rotation transfer projections 15*a'* are respectively engaged. The plurality of rotation transfer projections 15*a'* are formed on a rear end surface of the front ring 15' which faces a front surface of the rear ring 18', while the plurality of rotation transfer grooves 18*d'* are formed on the front surface of the rear ring 18'. There is a slight clearance between the plurality of rotation transfer projections 15*a'* and the plurality of rotation transfer grooves 18*d'* in a rotational direction (vertical direction as viewed in FIG. 68). FIG. 67 shows a state where the set of three rotation transfer grooves 15*f'* and the set of three extension grooves 18*x* are precisely aligned in the optical axis direction.

In the comparative example having the above described structure, in the state shown in FIG. 67, if the front ring 18' is rotated in a direction shown by an arrow AR1' in FIG. 68 (downwards as viewed in FIGS. 67 and 68) with respect to the rear ring 18', the rear ring 18' slightly rotates in the same direction due to the aforementioned clearance between the plurality of rotation transfer projections 15*a'* and the plurality of rotation transfer grooves 18*d'*. This causes a misalignment between the set of three rotation transfer grooves 15*f'* and the set of three extension grooves 18*x*. Therefore, in the state shown in FIG. 68, a gap is produced between a guide surface of each rotation transfer groove 15*f'* and a corresponding guide surface of the associated extension groove 18*x*. This gap may interfere with a movement of each roller follower 32' in the associated rotation transfer groove 15*f'* and the associated extension groove 18*x* in the optical axis direction, which cannot ensure a smooth movement of each roller follower 32'. If the gap becomes large, each roller follower 32' may not be able to move between the associated rotation transfer groove 15*f'* and the associated extension groove 18*x* across a border therebetween.

Supposing either the set of rotation transfer grooves 15*f'* or the set of extension grooves 18*x* is omitted to prevent such an undesirable gap from being produced between a guide surface of each rotation transfer groove 15*f'* and a corresponding guide surface of the associated extension groove 18*x*, the other set of rotation transfer grooves 15*f'* or extension grooves 18*x* may need to be elongated in the optical axis direction. Consequently, the length of either the front ring 15' or the rear ring 18' in the optical axis direction will increase. For instance, if it is desired to omit the set of extension grooves 18*x*, each rotation transfer groove 15*f'* must be elongated forward by a length corresponding to the length of each extension groove 18*x*. This increases the dimensions of the zoom lens, specifically the length thereof.

In contrast to this comparative example, the present embodiment of the zoom lens, in which the three pairs of rotation transfer projections 15*a* that extend rearward in the optical axis direction are formed on the third external barrel 15 as engaging portions thereof for engaging the third external barrel 15 with the helicoid ring 18, has the advantage that the set of three rotation transfer grooves 15*f* are respectively capable of guiding the set of three roller followers 32 smoothly in the optical axis direction at all times without any gaps being produced in the set of three rotation transfer grooves 15*f*. Moreover, the present embodiment of the zoom lens has the advantage that each rotation transfer groove 15*f* can be formed to have a sufficient effective length without the third external barrel 15 being elongated forward in the optical axis direction.

Exerting a force to the set of three roller followers 32 in a direction to rotate the same about the lens barrel axis Z0 via the set of three rotation transfer grooves 15*f* causes the cam ring 11 to rotate about the lens barrel axis Z0 while rotating in the optical axis direction due to engagement of the set of three roller followers 32 with the lead slot portions 14*e*-3 of the set of three through-slots 14*e*, respectively, when the zoom lens 71 is set in between the wide-angle extremity and the retracted position. When the zoom lens 71 is in the zooming range, the cam ring 11 rotates at the axial fixed position without moving in the optical axis direction due to engagement of the set of three roller followers 32 with the front circumferential slot portions 14*e*-1 of the set of three through-slots 14*e*, respectively. Since the cam ring 11 rotates at the axial fixed position in the ready-to-photograph state of the zoom lens 71, the cam ring 11 must be positioned precisely at a predetermined position in the optical axis direction to insure optical accuracy of movable lens groups of the zoom lens 71 such as the first lens group LG1 and the second lens group LG2. Although the position of the cam ring 11 in the optical axis direction when the cam ring 11 rotates at the axial fixed position thereof is determined by the engagement of the set of three roller followers 32 with the front circumferential slot portions 14*e*-1 of the set of three through-slots 14*e*, respectively, a clearance is provided between the set of three roller followers 32 and the front circumferential slot portions 14*e*-1 so that the set of three roller followers 32 can smoothly move in the front circumferential slot portions 14*e*-1 of the set of three through-slots 14*e*, respectively. Accordingly, it is necessary to remove backlash between the set of three roller followers 32 and the set of three through-slots 14*e* which is caused by the clearance when the set of three roller followers 32 are engaged in the front circumferential slot portions 14*e*-1 of the set of three through-slots 14*e*, respectively.

The follower-biasing ring spring 17 for removing the backlash is positioned inside the third external barrel 15, and a structure supporting the follower-biasing ring spring 17 is shown in FIGS. 33, 35, 63 and 69 through 72. The frontmost inner flange 15*h* is formed on the third external barrel 15 to extend radially inwards from a front end of the inner peripheral surface of the third external barrel 15. As shown in FIG. 63, the follower-biasing ring spring 17 is a non-flat annular member which is provided with a plurality of bends which are bent in the optical axis direction to be resiliently deformable in the optical axis direction. More specifically, the follower-biasing ring spring 17 is disposed so that the set of three follower pressing protrusions 17*a* are positioned at the rear end of the follower-biasing ring spring 17 in the optical axis direction. The follower-biasing ring spring 17 is provided with a set of three forwardly-projecting arc portions 17*b* which project forward in the optical axis direction. The three forwardly-projecting arc portions 17*b* and the three follower pressing protrusions 17*a* are alternately arranged to form the follower-biasing ring spring 17 as shown in FIGS. 4, 14 and 63. The follower-biasing ring spring 17 is disposed between the frontmost inner flange 15*h* and the plurality of relative rotation guide projections 15*d* in a slightly compressed state so as not to come off the third external barrel 15 from the inside thereof. If the set of three forwardly-projecting arc portions 17*b* are installed between the frontmost inner flange 15*h* and the plurality of relative rotation guide projections 15*d* with the set of three follower pressing protrusions 17*a* and the set of three rotation transfer grooves 15*f* being aligned in the optical axis direction, the set of three follower pressing protrusions 17*a* are engaged in respective front portions of the set of three rotation transfer grooves 15*f* to be supported thereby. When the first linear guide ring 14 is not attached to the third external barrel 15, each follower pressing protrusion 17*a* is sufficiently apart from the frontmost inner flange 15*h* of the third external barrel 15 in the optical axis direction as clearly shown in FIG. 72 to be movable to a certain degree in the associated rotation transfer groove 15*f*.

When the first linear guide ring 14 is attached to the third external barrel 15, the set of three forwardly-projecting arc portions 17*b* of the follower-biasing ring spring 17 are deformed by being pressed forward, toward the frontmost inner flange 15*h*, by the front end of the linear guide ring 14 to make the shape of the set of three forwardly-projecting arc portions 17*b* become close to a flat shape. When the follower-biasing ring spring 17 is deformed in such a manner, the first linear guide ring 14 is biased rearward by the resiliency of the follower-biasing ring spring 17 to thereby fix the position of the first linear guide ring 14 with respect to the third external barrel 15 in the optical axis direction. At this time, a front guide surface in the circumferential groove 14*d* of the first linear guide ring 14 is pressed against respective front surfaces of the plurality of relative rotation guide projections 15*d*, while respective rear surfaces of the second plurality of relative rotation guide projections 14*c* are pressed against a rear guide surface in the circumferential groove 15*e* of the third external barrel 15 in the optical axis direction, as clearly shown in FIG. 69. At the same time, the front end of the first linear guide ring 14 is positioned between the frontmost inner flange 15*h* and the plurality of relative rotation guide projections 15*d* in the optical axis direction, while front surfaces the set of three forwardly-projecting arc portions 17*b* of the follower-biasing ring spring 17 are not entirely in pressing contact with the frontmost inner flange 15*h*. Therefore, when the zoom lens 71 is in the retracted state, a slight space is secured between the set of three follower pressing protrusions 17*a* and the frontmost inner flange 15*h* so that each follower pressing protrusion 17*a* can move to a certain extent in the associated rotation transfer groove 15*f* in the optical axis direction. In addition, as shown in FIGS. 35 and 69, each follower pressing protrusion 17*a* which extends rearward that the tip thereof (rear end thereof in the optical axis direction) is positioned inside the front circumferential slot portion 14*e*-1 of the associated radial slot 14.

In the state shown in FIGS. 60 and 64 in which the zoom lens 71 is in the retracted state, the follower-biasing ring spring 17 do not contact with any elements other than the first linear guide ring 14. At this time, although engaged in the set of three rotation transfer grooves 15*f*, the set of three roller followers 32 stay away from the set of three follower pressing protrusions 17*a*, respectively, because each roller follower 32 is engaged in the associated rear circumferential slot portion 14*e*-2 to be positioned in the vicinity of the rear end thereof.

Figure 69:
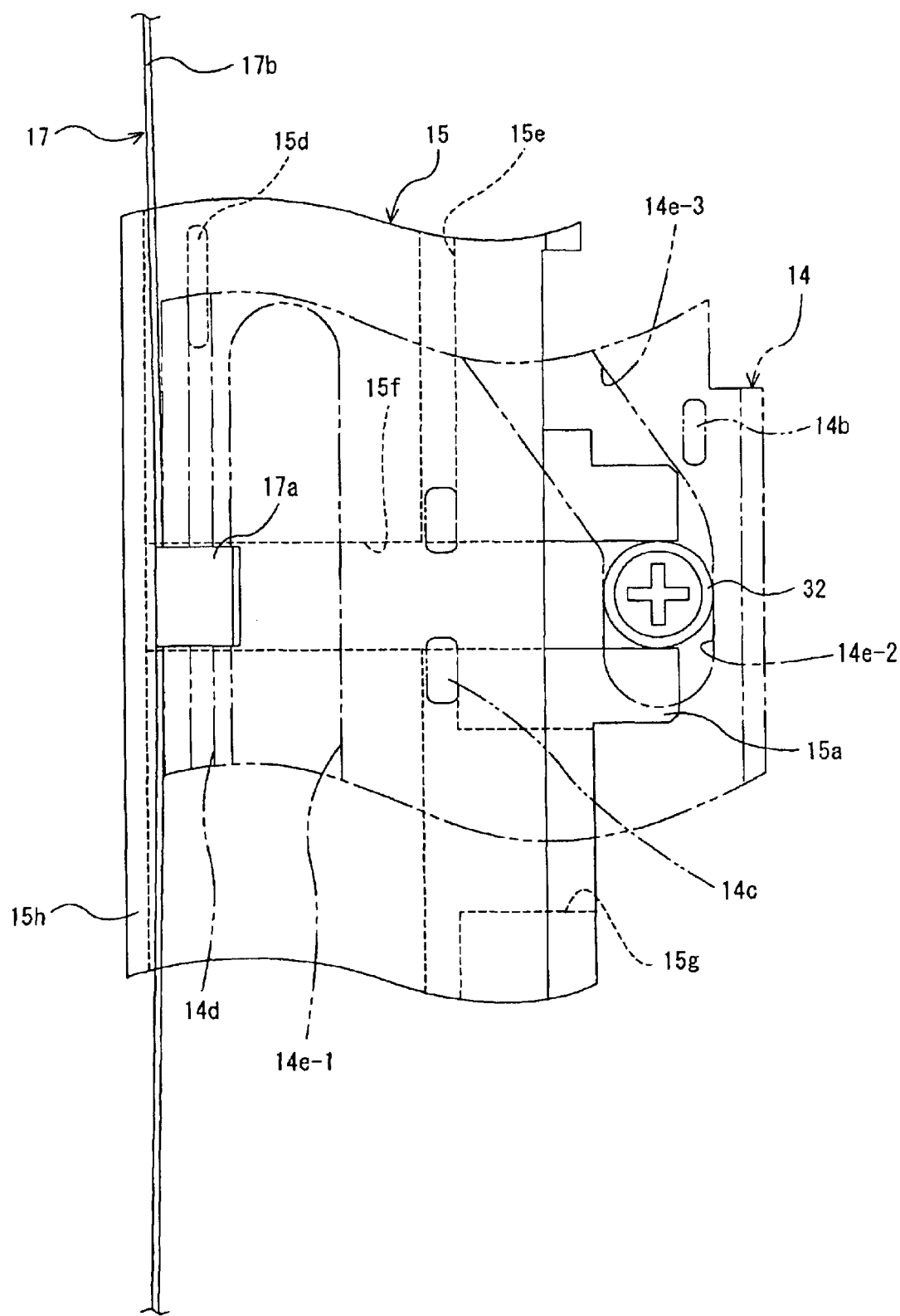
FIG. 69 is a magnified view of a part of the drawing shown in FIG. 60 (FIG. 44)

Rotating the third external barrel 15 in the lens barrel advancing direction (upwards as viewed in FIGS. 60 and 69) causes the set of three rotation transfer groove 15*f* to push the set of three roller followers 32 upwards as viewed in FIGS. 60 and 69, respectively, to move each roller follower 32 in the associated through-slots 14*e* from the rear circumferential slot portion 14*e*-2 to the inclined lead slot portion 14*e*-3. Since the inclined lead slot portion 14*e*-3 of each through-slot 14*e* extends in a direction having both a component in a circumferential direction of the first linear guide ring 14 and a component in the optical axis direction, each roller follower 32 gradually moves forward in the optical axis direction as the roller follower 32 moves in the inclined lead slot portion 14*e*-3 of the associated through-slot 14*e* toward the front circumferential slot portion 14*e*-1. However, as long as the roller follower 32 is in the inclined lead slot portion 14*e*-3 of the associated through-slot 14*e*, the roller follower 32 is still away from the associated pressing protrusion 17*a*. This means that the set of three roller followers 32 are not at all biased by the set of three follower pressing protrusions 17*a*, respectively. Nevertheless, no substantial problem arises even if backlash between the set of three roller followers 32 and the set of three through-slots 14*e* are removed thoroughly since the zoom lens 71 is in the retracted state or the transitional state from the retracted state to the ready-to-photograph state when each roller follower 32 is engaged in the rear circumferential slot portion 14*e*-2 or the inclined lead slot portion 14*e*-3 of the associated through-slot 14*e*, respectively. If anything, the load on the zoom motor 150 decreases with decrease in frictional resistance to each roller follower 32.

Figure 70:
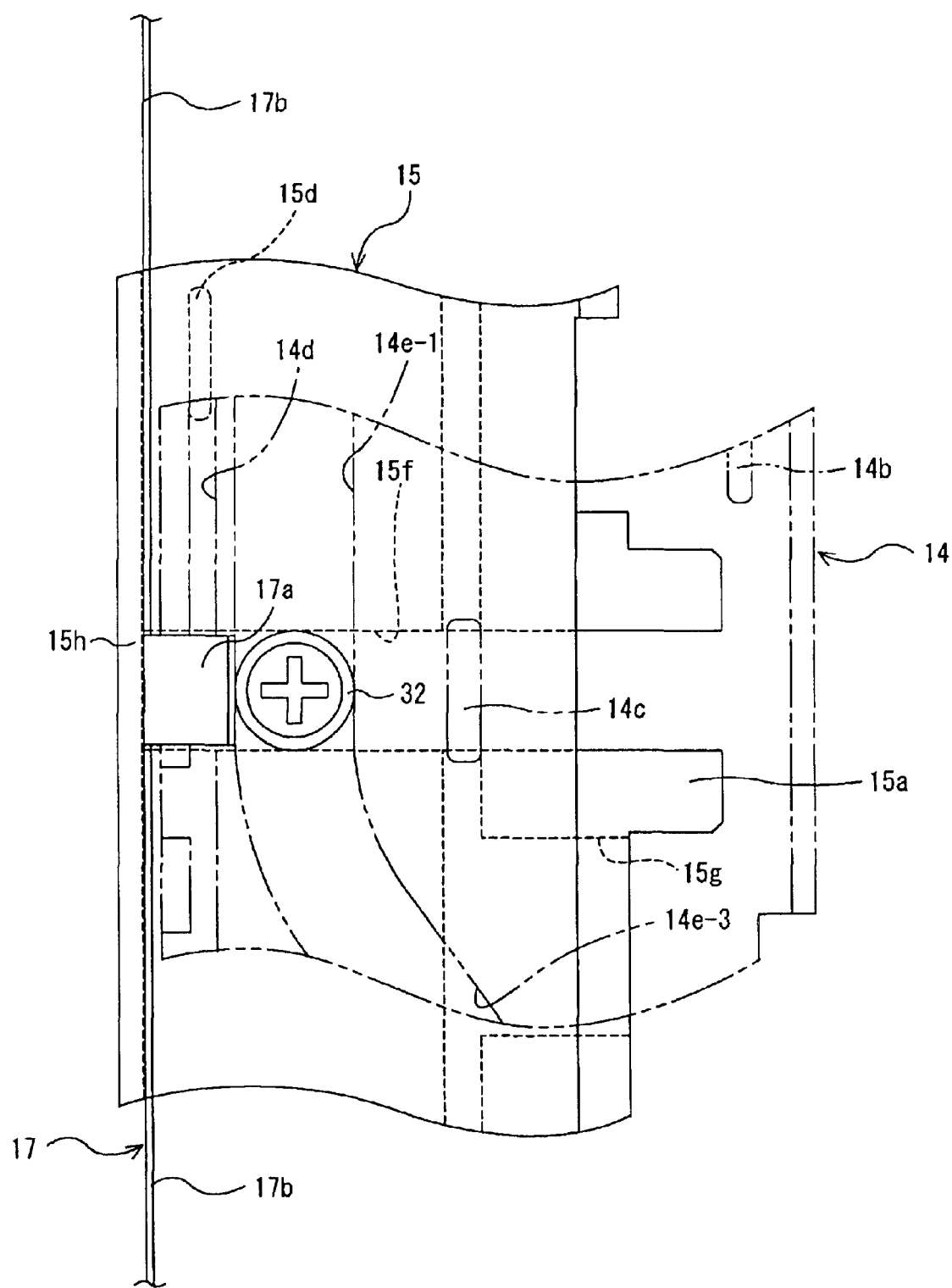
FIG. 70 is a magnified view of a part of the drawing shown in FIG. 61 (FIG. 45)

If the set of three roller followers 32 move from the inclined lead slot portions 14*e*-3 of the set of three through-slots 14*e* to the front circumferential slot portions 14*e*-1 of the same, respectively, by a further rotation of the third external barrel 15 in the lens barrel advancing direction, the first linear guide ring 14, the third external barrel 15 and the set of three roller followers 32 are positioned as shown in FIGS. 61 and 70 so that the zoom lens 71 is set at the wide-angle extremity. Since the tip of each follower pressing protrusion 17*a* is positioned inside the front circumferential slot portion 14*e*-1 of the associated radial slot 14 as described above, each roller follower 32 comes into contact with the associated follower pressing protrusion 17*a* upon entering the associated front circumferential slot portion 14*e*-1 (see FIGS. 33, 61 and 70). This causes each follower pressing protrusion 17*a* to be pressed forward in the optical axis direction by the associated roller follower 32, thus causing the follower-biasing ring spring 17 to be further deformed to make the shape of the set of three forwardly-projecting arc portions 17*b* become closer to a flat shape. At this time, each roller follower 32 is pressed against a rear guide surface in the associated front circumferential slot portion 14*e*-1 in the optical axis direction by the resiliency of the follower-biasing ring spring 17 to thereby remove backlash between the set of three roller followers 32 and the set of three through-slots 14*e*, respectively.

Figure 71:
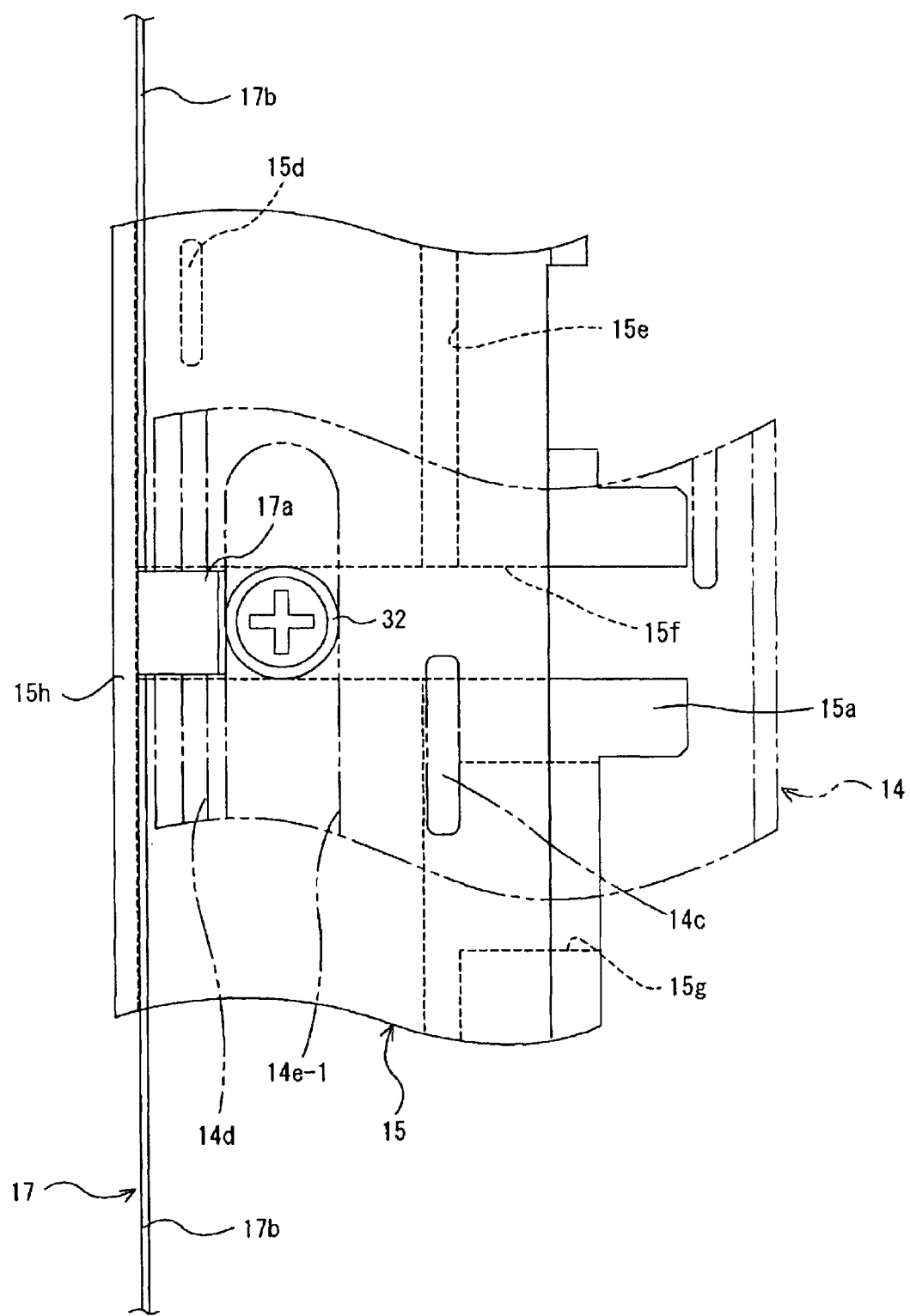
FIG. 71 is a magnified view of a part of the drawing shown in FIG. 62 (FIG. 46)
Figure 72:
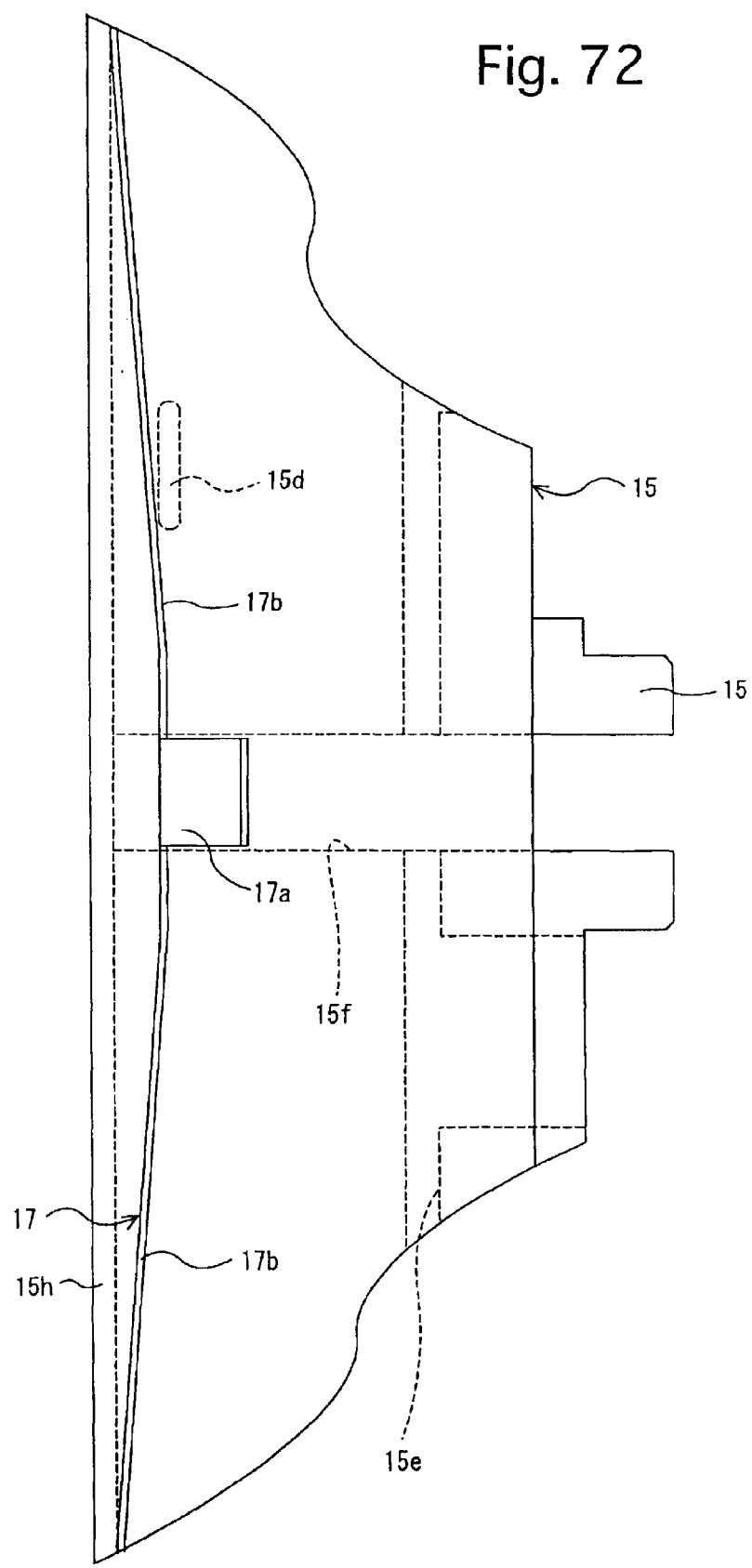
FIG. 72 is a magnified view of a part of the drawing shown in FIG. 63 (FIG. 47)

Thereafter, even if the set of three roller followers 32 move in the front circumferential slot portions 14*e*-1 of the set of three through-slots 14*e* during a zooming operation between the positions shown in FIGS. 61 and 70 in which the zoom lens 71 is set at the wide-angle extremity and the positions shown in FIGS. 62 and 71 in which the zoom lens 71 is set at the telephoto extremity, each roller follower 32 remains in contact with the associated follower pressing protrusion 17*a* because each roller follower 32 does not move in the associated rotation transfer groove 15*f* in the optical axis direction when moving in the associated front circumferential slot portion 14*e*-1 that extend only in a circumferential direction of the first linear guide ring 14. Therefore, in the zooming range of the zoom lens 71 in which photographing is possible, the set of three roller followers 32 are always biased rearward in the optical axis direction by the roller spring 17, which achieves a stable positioning of the set of three roller followers 32 with respect to the first linear guide ring 14.

Rotating the third external barrel 15 in the lens barrel retracting direction causes the first linear guide ring 14 and the set of three roller followers 32 to operate in the reverse manner to the above described operations. In this reverse operation, each roller follower 32 is disengaged from the associated follower pressing protrusion 17*a* upon passing a point (wide-angle extremity point) in the associated through-slot 14*e* which corresponds to the wide-angle extremity of the zoom lens 71 (the position of each roller follower 32 in the associated through-slot 14*e* in FIG. 61). From the wide-angle extremity point down to a point (retracted point) in the associated through-slot 14*e* which corresponds to the retracted position of the zoom lens 71 (the position of each roller follower 32 in the associated through-slot 14*e* in FIG. 60), the set of three roller followers 32 receive no pressure from the set of three follower pressing protrusions 17*a*, respectively. If the set of three follower pressing protrusions 17*a* do not apply any pressure to the set of three roller followers 32, the frictional resistance to each roller follower 32 becomes small when moving in the associated through-slot 14*e*. Consequently, the load on the zoom motor 150 decreases with decrease in frictional resistance to each roller follower 32.

As can be understood from the above descriptions, the set of three follower pressing protrusions 17*a*, which are respectively fixed at the locations of the set of three roller followers 32 in the optical axis direction in the set of three rotation transfer grooves 15*f* when the zoom lens 71 is in the ready-to-photograph state, automatically bias the set of three roller followers 32 rearward to press the set of three roller followers 32 against rear guide surfaces of the front circumferential slot portions 14e-1 of the set of three through-slots 14e immediately after the set of three roller followers 32 which are guided by the inclined lead slot portions 14e-3 of the set of three through-slots 14e to move forward in the optical axis direction reach their respective photographing positions in a rotatable range at an axial fixed position (i.e., in the front circumferential slot portions 14e-1). With this structure, the backlash between the set of three roller followers 32 and the set of three through-slots 14e can be removed by a simple structure using a single biasing member: the follower-biasing ring spring 17. Moreover, the follower-biasing ring spring 17 consumes little space in the zoom lens 71 since the follower-biasing ring spring 17 is a substantially simple annular member disposed along an inner peripheral surface and since the set of three follower pressing protrusions 17a are positioned in the set of three rotation transfer grooves 15f, respectively. Accordingly, in spite of its small and simple structure, the follower-biasing ring spring 17 cam make the cam ring 11 positioned precisely at a predetermined fixed position in the optical axis direction with stability in the ready-to-photograph state of the zoom lens 71. This insures optical accuracy of the photographing optical system such as the first lens group LG1 and the second lens group LG2. Furthermore, the follower-biasing ring spring 17 can be removed easily because the set of three forwardly-projecting arc portions 17b are simply held and supported between the frontmost inner flange 15h and the plurality of relative rotation guide projections 15d.

The follower-biasing ring spring 17 has not only a function of biasing the set of three roller followers 32 rearward in the optical axis direction to position the cam ring 11 precisely with respect to the first linear guide ring 14 in the optical axis direction, but also a function of biasing the first linear guide ring 14 rearward in the optical axis direction to give stability to positioning of the first linear guide ring 14 with respect to the third external barrel 15 in the optical axis direction. Although the second plurality of relative rotation guide projections 14c and the circumferential groove 15e are engaged with each other to be slightly movable relative to each other in the optical axis direction while the plurality of relative rotation guide projections 15d and the circumferential groove 14d are engaged with each other to be slightly movable relative to each other in the optical axis direction as shown in FIGS. 69 through 72, both backlash between the second plurality of relative rotation guide projections 14c and the circumferential groove 15e and backlash between the plurality of relative rotation guide projections 15d and the circumferential groove 14d are removed since the front end of the first linear guide ring 14 contacts with the follower-biasing ring spring 17 to be biased rearward in the optical axis direction by the follower-biasing ring spring 17. Accordingly, in the case where three annular members: the cam ring 11, the first linear guide ring 14 and the third external barrel 15 are regarded as a rotating-advancing/rotating-retracting unit, all the different backlashes arising in this whole rotating-advancing/rotating-retracting unit can be removed by a single biasing member: the follower-biasing ring spring 17. This achieves a quite simple backlash removing structure.

Figure 73:
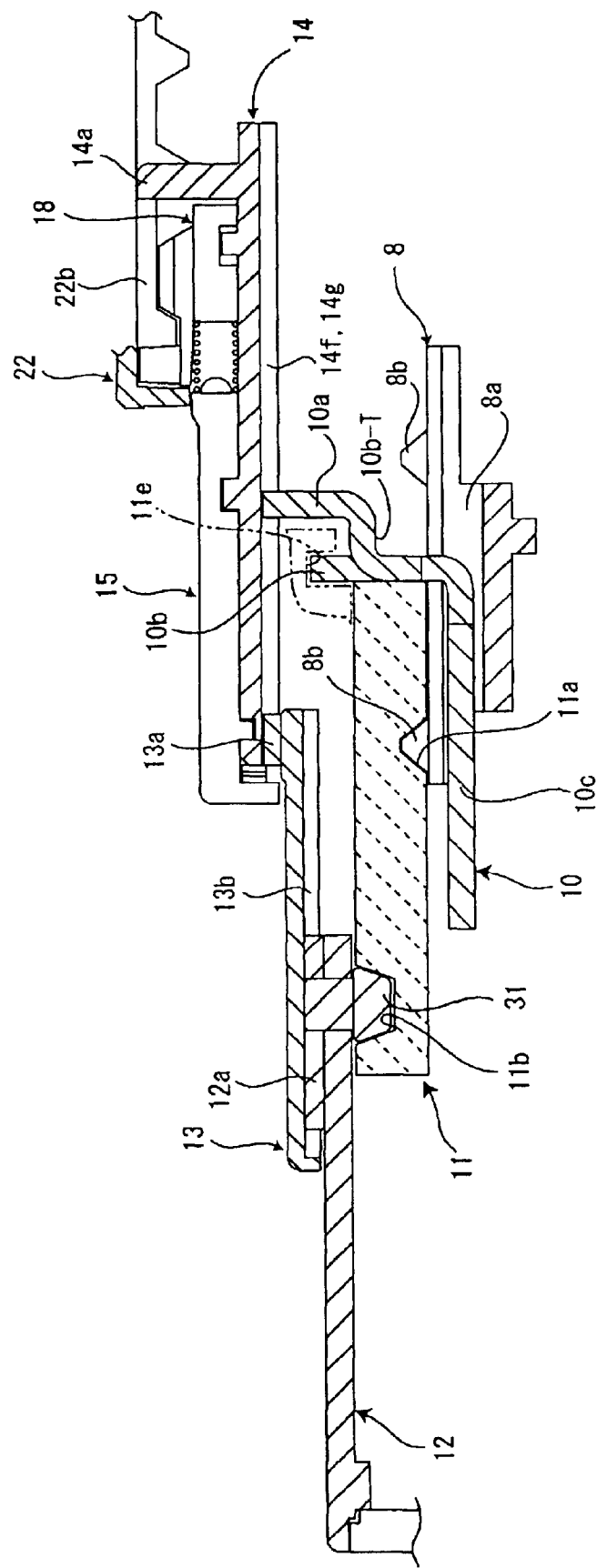
FIG. 73 is an axial cross sectional view of an upper half of elements of a linear guide structure of the zoom lens shown in FIGS. 5 and 10, showing the linear guide structure at the wide-angle extremity of the zoom lens.
Figure 74:
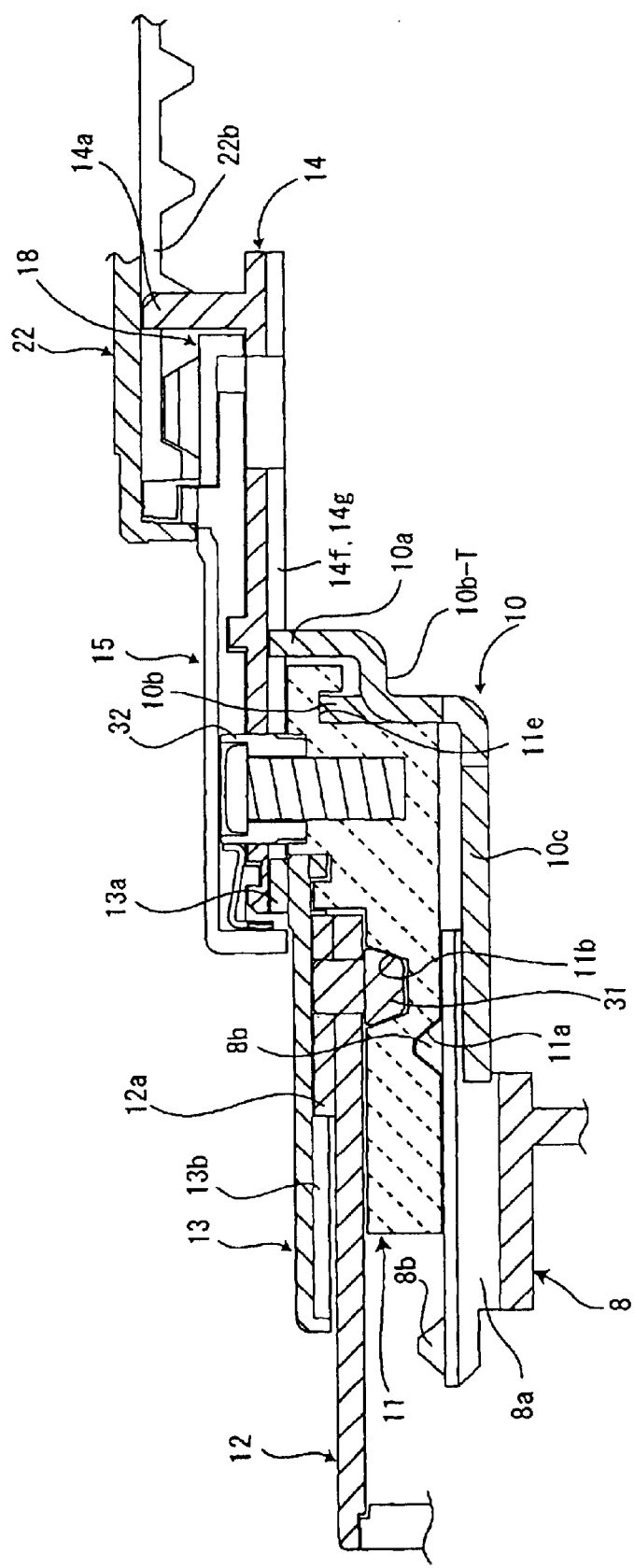
FIG. 74 is a view similar to that of FIG. 73, showing the linear guide structure at the wide-angle extremity of the zoom lens.
Figure 75:
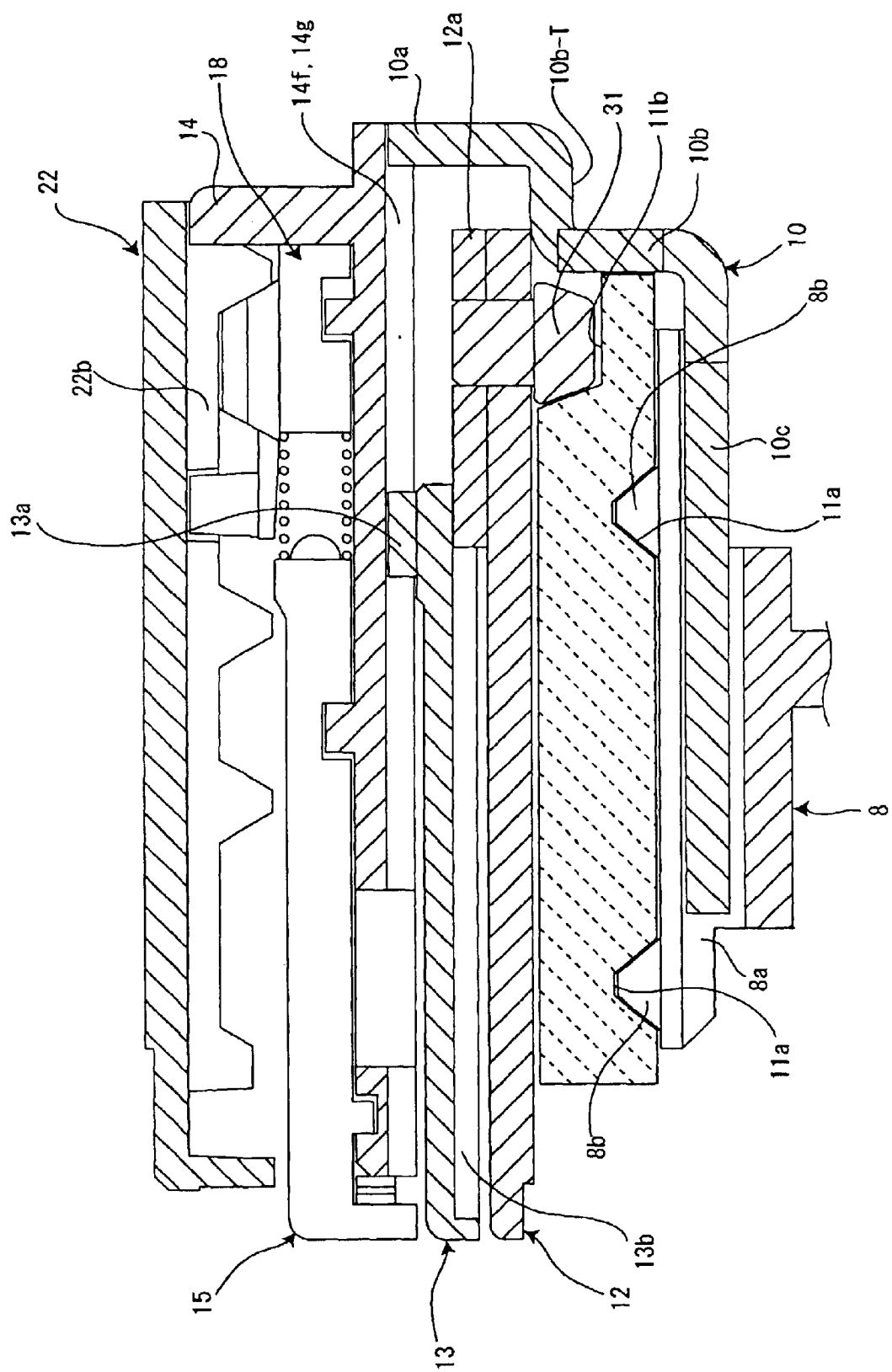
FIG. 75 is a view similar to that of FIG. 74, showing the linear guide structure in the retracted state of the zoom lens.

FIGS. 73 through 75 show elements of a linear guide structure in section which guides the first external barrel 12 (which supports the first lens group LG1) and the second lens group moving frame 8 (which supports the second lens group LG2) linearly in the optical axis direction without rotating each of the first external barrel 12 and the second lens group moving frame 8 about the lens barrel axis Z0.

Figure 76:
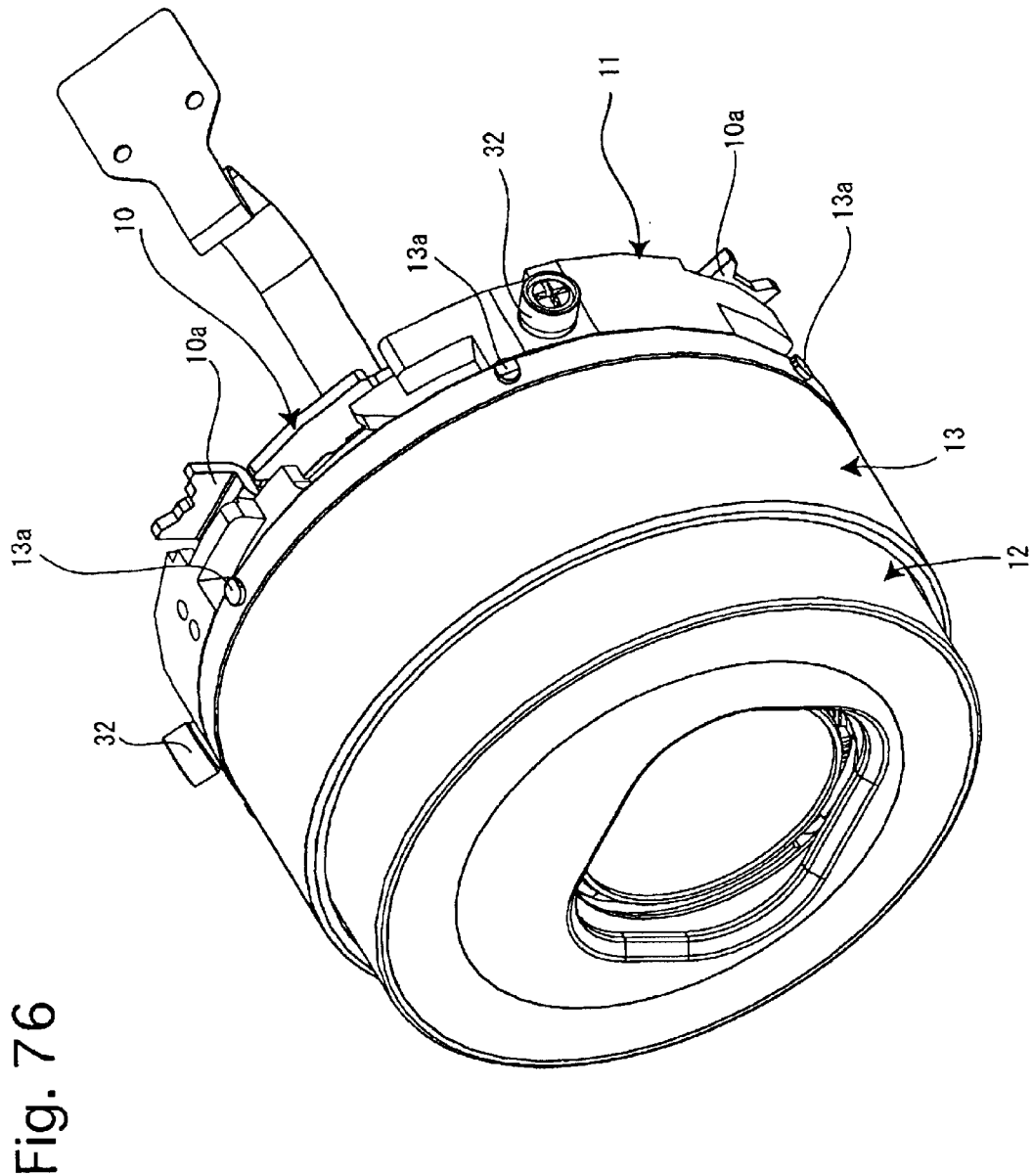
FIG. 76 is a perspective view of a subassembly of the zoom lens shown in FIGS. 5 through 10 which includes the first external barrel, the external barrel, the second linear guide ring, the cam ring and other elements, showing the positional relationship between the first external barrel and the second linear guide ring that are positioned radially inside and outside the cam ring, respectively.
Figure 77:
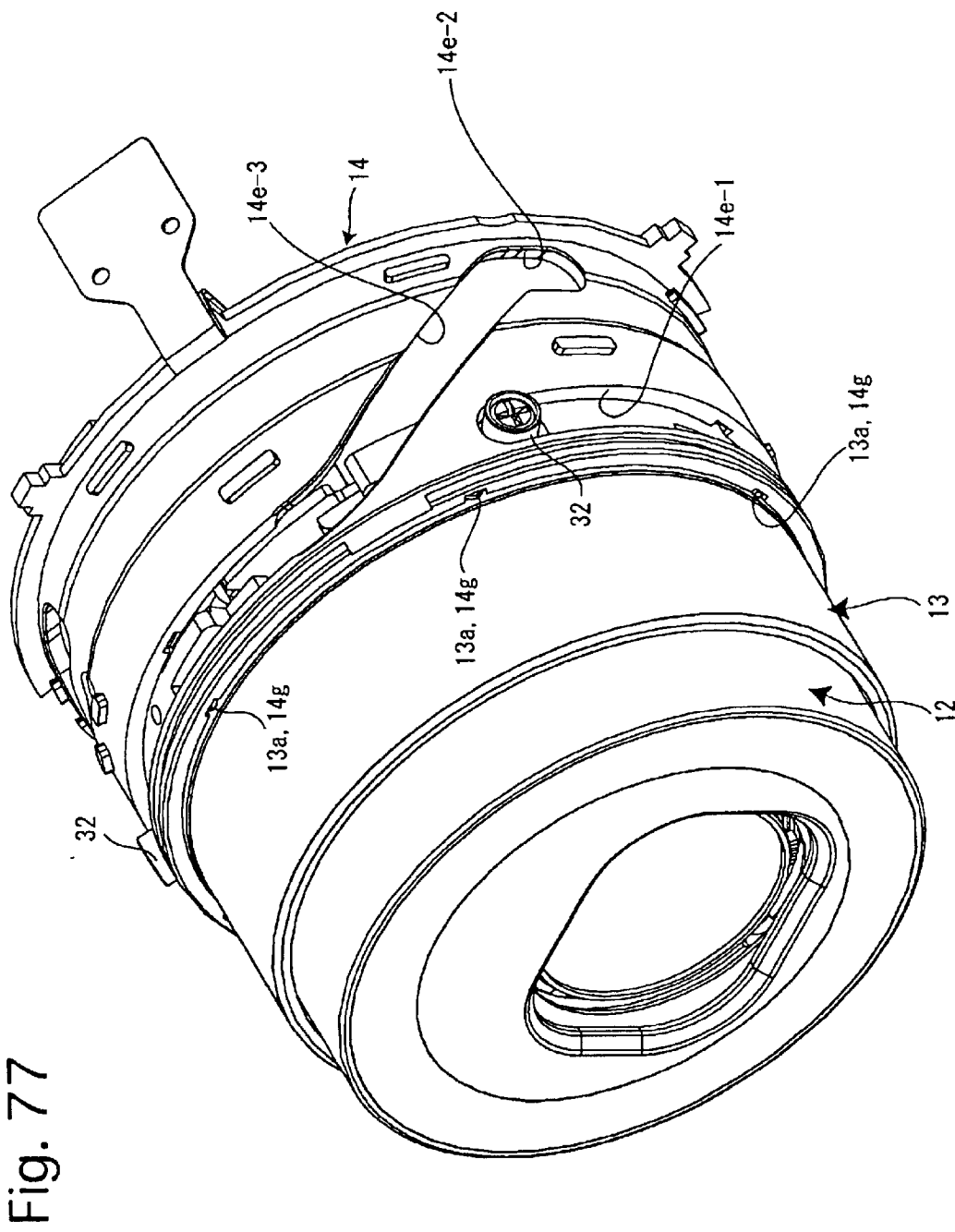
FIG. 77 is a perspective view of a subassembly of the zoom lens shown in FIGS. 5 through 10 which includes all the elements shown in FIG. 77 and the first linear guide ring, showing a state where the first external barrel has been extended forward to its assembling/disassembling position.
Figure 78:
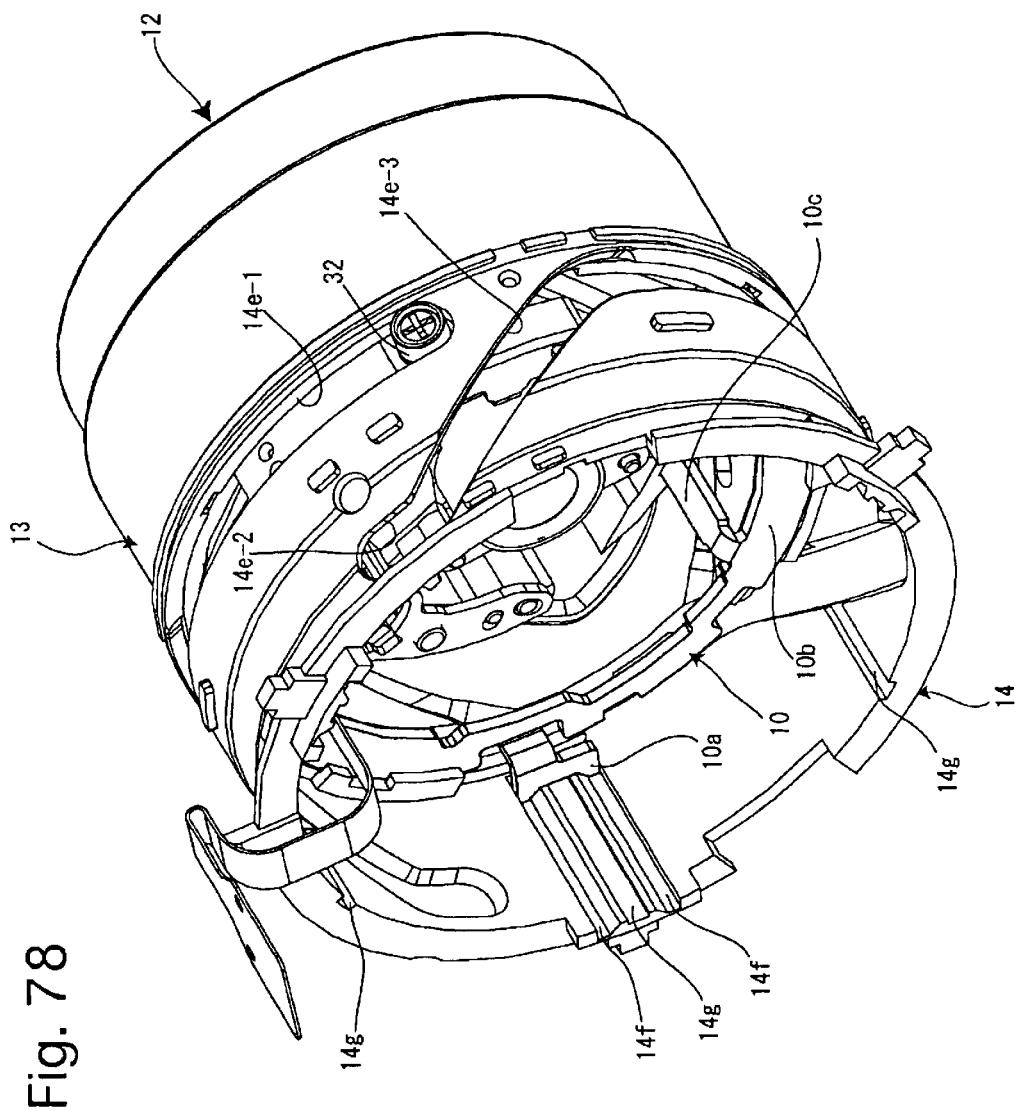
FIG. 78 is a perspective view of the subassembly shown in FIG. 77, viewed obliquely from behind the subassembly.

FIGS. 76 through 78 show the elements of the linear guide structure in oblique perspective. FIGS. 73, 74 and 75 show the linear guide structure when the zoom lens 71 is set at the wide-angle extremity, when the zoom lens 71 is set at the telephoto extremity, and when the zoom lens 71 is in the retracted state, respectively. In each of the cross sectional views in FIGS. 73 through 75, the elements of the linear guide structure are crosshatched for the purpose of illustration. In addition, in each of the cross sectional views in FIGS. 73 through 75, among all the rotatable elements only the cam ring is crosshatched by dashed lines for the purpose of illustration.

The cam ring 11 is a double-side grooved cam ring that is provided on an outer peripheral surface thereof with the set of three outer cam grooves 11b for moving the first external barrel 12 in a predetermined moving manner, and that is provided on an inner peripheral surface of the cam ring 11 with the plurality of inner cam grooves 11a (11a-1 and 11a-2) for moving the second lens group moving frame 8 in a predetermined moving manner. Accordingly, the first external barrel 12 is positioned radially outside the cam ring 11 while the second lens group moving frame 8 is positioned radially inside the cam ring 11. On the other hand, the first linear guide ring 14, which is adopted for guiding each of the first external barrel 12 and the second lens group moving frame 8 linearly without rotating each of the first external barrel 12 and the second lens group moving frame 8 about the lens barrel axis Z0, is positioned radially outside the cam ring 11.

In this linear guide structure having the above described positional relationship among the first linear guide ring 14, the first external barrel 12 and the second lens group moving frame 8, the first linear guide ring 14 directly guides the second external barrel 13 (which serves as a linear guide member for guiding the first external barrel 12 linearly in the optical axis direction without rotating the same about the lens barrel axis Z0) and the second linear guide ring 10 (which serves as a linear guide member for guiding the second lens group moving frame 8 linearly in the optical axis direction without rotating the same about the lens barrel axis Z0) linearly in the optical axis direction without rotating the same about the lens barrel axis Z0. The second external barrel 13 is positioned radially between the cam ring 11 and the first linear guide ring 14, and guided linearly in the optical axis direction without rotating about the lens barrel axis Z0 by engagement of the set of six radial projections 13a, which are formed on an outer peripheral surface of the second external barrel 13, with the set of six second linear guide grooves 14g, respectively. Moreover, the second external barrel 13 guides the first external barrel 12 linearly in the optical axis direction without rotating the same about the lens barrel axis Z0 by engagement of the set of three linear guide grooves 13b, which are formed on an inner peripheral surface of the second external barrel 13, with the set of three engaging protrusions 12a of the first external barrel 12, respectively. On the other hand, as for the second linear guide ring 10, to make the first linear guide ring 14 guide the second lens group moving frame 8 that is positioned inside the cam ring 11, the ring portion 10b is positioned behind the cam ring 11, the set of three bifurcated projections 10a are formed to project radially outwards from the ring portion 10b to be respectively engaged in the set of three pairs of first linear guide grooves 14f, and the set of three linear guide keys 10c are formed to project forward from the ring portion 10b in the optical axis direction to be respectively engaged in the set of three guide grooves 8a.

In the case of a linear guide structure having conditions similar to conditions of the linear guide structure shown in FIGS. 73 through 75 that two linearly guided outer and inner movable elements (the first external barrel 12 and the second lens group moving frame 8) are respectively positioned outside and inside a double-side grooved cam ring (the cam ring 11) and that a primary linear guide member (the first linear guide ring 14) of the linear guide structure is positioned outside the cam ring, a secondary linear guide member serving as the outer movable element (which corresponds to the second external barrel 13) is disposed outside the cam ring, while a linearly guided movable member (which corresponds to the first external barrel 12) which is guided linearly in the optical axis direction without rotating by the secondary linear guide member is provided with a set of linear guide portions for guiding a movable member serving as the inner movable element (which corresponds to the second lens group moving frame 8) positioned inside the cam ring linearly in the optical axis direction without rotating the same in a conventional zoom lens. In other words, in the linear guide structure of such a conventional zoom lens, each of the aforementioned set of linear guide portions of the outer movable element extend radially inwards from the outside of the cam ring to the inside of the cam ring to be engaged with the inner movable element through a single path. According to this type of conventional linear guide structure, the resistance produced due to linear guiding operations of the outer and inner movable elements of the linear guide structure increases when a relative velocity in the optical axis direction between the two linearly guided movable elements that are respectively positioned outside and inside the cam ring is fast. In addition, since the inner movable element is indirectly guided linearly in the optical axis direction without rotating via the outer movable element, the inner movable element, in particular, is difficult to be guided linearly in the optical axis direction without rotating with a high degree of travel accuracy.

In contrast to such a conventional linear guide structure, according to the linear guide structure of the zoom lens 71 shown in FIGS. 73 through 75, the aforementioned resistance problem can be prevented from occurring by the structure wherein the second external barrel 13, which serves as a linear guide member for guiding the first external barrel 12 (positioned outside the cam ring 11) linearly in the optical axis direction without rotating the same about the lens barrel axis Z0, is engaged with the set of six second linear guide grooves 14g while the second linear guide ring 10, which serves as a linear guide member for guiding the second lens group moving frame 8 (positioned inside the cam ring 11) linearly in the optical axis direction without rotating the same about the lens barrel axis Z0, is engaged with the set of three pairs of first linear guide grooves 14f so that the second external barrel 13 and the second linear guide ring 10 are directly guided by the first linear guide ring 14 through two paths: a first path (inner path) extending from the set of three pairs of first linear guide grooves 14f to the set of three bifurcated projections 10a and a second path (outer path) extending from the set of six second linear guide grooves 14g to the set of six radial projections 13a. Moreover, the first linear guide ring 14 that directly guides each of the second linear guide ring 10 and the second external barrel 13 linearly at the same time is, in effect, reinforced by the second linear guide ring 10 and the second external barrel 13. This structure makes it easy for the linear guide structure to secure sufficient strength.

Furthermore, each pair of first linear guide grooves 14f, which are adopted for guiding the second linear guide ring 10 linearly in the optical axis direction without rotating the same about the lens barrel axis Z0, are formed by using two opposed side walls between which the associated second linear guide groove 14g is formed. This structure is advantageous to make the linear guide structure simple, and does not impair the strength of the first linear guide ring 14 very much.

The relationship between the cam ring 11 and the second lens group moving frame 8 will be hereinafter discussed in detail. As described above, the plurality of inner cam grooves 11a, which are formed on an inner peripheral surface of the cam ring 11, consist of the set of three front inner cam grooves 11a-1 that are formed at different circumferential positions, and the set of three rear inner cam grooves 11a-2 that are formed at different circumferential positions behind the set of three front inner cam grooves 11a-1 in the optical axis direction. Each rear inner cam groove 11a-2 is formed as a discontinuous cam groove as shown in FIG. 17. All the six cam grooves of the cam ring 11: the set of three front inner cam grooves 11a-1 and the set of three rear inner cam grooves 11a-2 trace six reference cam diagrams "VT" having the same shape and size, respectively. Each reference cam diagram VT represents the shape of each cam groove of the set of three front inner cam grooves 11a-1 and the set of three rear inner cam grooves 11a-2, and includes a lens-barrel operating section and a lens-barrel assembling/disassembling section, wherein the lens-barrel operating section consists of a zooming section and a lens-barrel retracting section. The lens-barrel operating section serves as a control section which controls movement of the second lens group moving frame 8 with respect to the cam ring 11, and which is to be distinguished from the lens-barrel assembling/disassembling section that is used only when the zoom lens 71 is assembled or disassembled. The zooming section serves as a control section which controls the movement of the second lens group moving frame 8 with respect to the cam ring 11, especially from a position of the second lens group moving frame 8 which corresponds to the wide-angle extremity of the zoom lens 71 to another position of the second lens group moving frame 8 which corresponds to the telephoto extremity of the zoom lens 71, and which is to be distinguished from the lens-barrel retracting section. If each front inner cam groove 11a-1 and the rear inner cam groove 11a-2 positioned therebehind in the optical axis direction are regarded as a pair, it can be said that the cam ring 11 is provided, at regular intervals in a circumferential direction of the cam ring 11, with three pairs of inner cam grooves 11a for guiding the second lens group LG2.

As can be seen in FIG. 17, the length of an axial range W1 of the reference cam diagrams VT of the set of three front inner cam grooves 11a-1 in the optical axis direction (the horizontal direction as viewed in FIG. 17), which is equivalent to an axial range of the reference cam diagrams VT of the set of three rear inner cam grooves 11a-2 in the optical axis direction, is greater than a length W2 of the cam ring 11 in the optical axis direction. The length of the zooming section included in the axial range W1 of the reference cam diagrams VT of the set of three front inner cam grooves 11a-1 (or the rear inner cam grooves 11a-2) in the optical axis direction is represented by a length W3 shown in FIG. 17 which is alone substantially equivalent to the length W2 of the cam ring 11. This means that a set of cam grooves each having a sufficient length will not be obtained for the present embodiment of the cam ring 11 if designed according to a conventional method of formation of cam groove wherein a set of long cam grooves which entirely trace a corresponding set of long cam diagrams are formed on a peripheral surface of a cam ring. According to a cam mechanism of the present embodiment of the zoom lens, a sufficient range of movement of the second lens group moving frame 8 in the optical axis direction can be secured without increasing the length of the cam ring 11 in the optical axis direction. The detail of this cam mechanism will be discussed hereinafter.

Each front inner cam groove 11*a*-1 does not cover the entire range of the associated reference cam diagram VT while each rear inner cam groove 11*a*-2 does not cover the entire range of the associated reference cam diagram VT either. A range of each front inner cam groove 11*a*-1 which is included in the associated reference cam diagram VT is partly different from a range of each rear inner cam groove 11*a*-2 which is included in the associated reference cam diagram VT. Each reference cam diagram VT can be roughly divided into four sections: first through fourth sections VT1 through VT4. The first section VT1 extends in the optical axis direction. The second section VT2 extends from a first inflection point VTh positioned at the rear end of the first section VT1 to a second inflection point VTm positioned behind the first inflection point VTh in the optical axis direction. The third section VT3 extends from the second inflection point VTm to a third inflection point VTn positioned in front of the second inflection point VTm in the optical axis direction. The fourth section VT4 extends from the third inflection point VTn. The fourth section VT4 is used only when the zoom lens 71 is assembled or disassembled, and is included in both each front inner cam groove 11*a*-1 and each rear inner cam groove 11*a*-2. Each front inner cam groove 11*a*-1 is formed in the vicinity of the front end of the cam ring 11 not to include the entire part of the first section VT1 and a part of the second section VT2, and is formed to include a front end opening R1 at an intermediate point of the second section VT2 so that the front end opening R1 opens on a front end surface of the cam ring 11. On the other hand, each rear inner cam groove 11*a*-2 is formed in the vicinity of the rear end of the cam ring 11 not to include adjoining portions of the second section VT2 and the third section VT3 on opposite sides of the second inflection point VTm. In addition, each rear inner cam groove 11*a*-2 is formed to include a front end opening R4 (which corresponds to the aforementioned front open end section 11*a*-2*x*) at the front end of the first section VT1 so that the front end opening R4 opens on a front end surface of the cam ring 11. A missing portion of each front inner cam groove 11*a*-1 which lies on the associated reference cam diagram VT is included in the associated rear inner cam groove 11*a*-2 that is positioned behind the front inner cam groove 11*a*-1 in the optical axis direction, whereas a missing portion of each rear inner cam groove 11*a*-2 which lies on the associated reference cam diagram VT is included in the associated front inner cam groove 11*a*-1 that is positioned in front of the rear inner cam groove 11*a*-2 in the optical axis direction. Namely, if each front inner cam groove 11*a*-1 and the associated rear inner cam groove 11*a*-2 are combined into a single cam groove, this signal cam groove will include the entire part of one reference cam diagram VT. In other words, one of each front inner cam groove 11*a*-1 and the associated rear inner cam groove 11*a*-2 is complemented by the other. The width of each front inner cam groove 11*a*-1 and the width of each rear inner cam groove 11*a*-2 are the same.

Meanwhile, as shown in FIG. 19, the plurality of cam followers 8*b*, which are respectively engaged in the plurality of inner cam grooves 11*a*, consist of the set of three front cam followers 8*b*-1 that are formed at different circumferential positions, and the set of three rear cam followers 8*b*-2 that are formed at different circumferential positions behind the set of three front cam followers 8*b*-1 in the optical axis direction, wherein each front cam follower 8*b*-1 and the rear cam follower 8*b*-2 positioned therebehind in the optical axis direction are provided as a pair in a manner similar to each pair of inner cam grooves 11*a*. The space between the set of three front cam followers 8*b*-1 and the set of three rear cam followers 8*b*-2 in the optical axis direction is determined so that the set of three front cam followers 8*b*-1 are respectively engaged in the set of three front inner cam grooves 11*a*-1 and so that the set of three rear cam followers 8*b*-2 are respectively engaged in the set of three rear inner cam grooves 11*a*-2. The diameter of each front cam follower 8*b*-1 and the diameter of each rear cam follower 8*b*-2 are the same.

Figure 79:
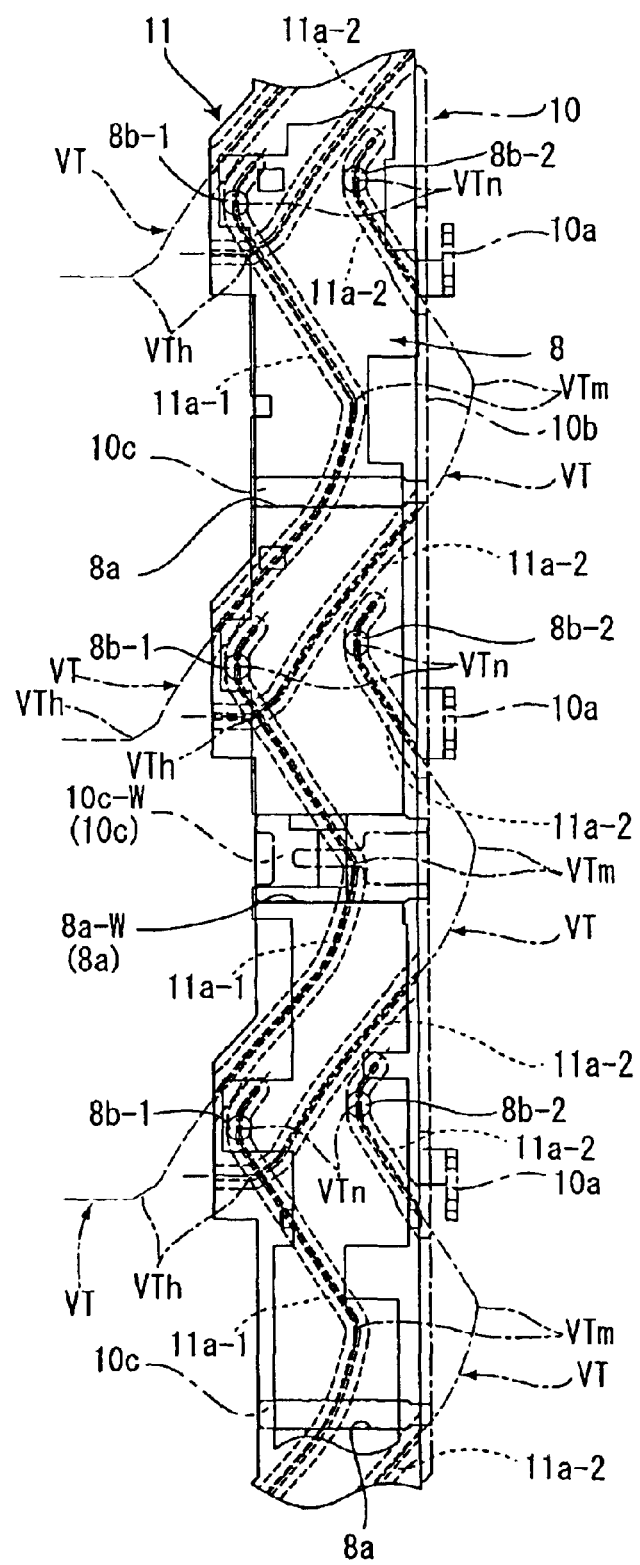
FIG. 79 is a developed view of the cam ring, the second lens group moving frame and the second linear guide ring, showing the positional relationship thereamong in the retracted state of the zoom lens.

FIG. 79 shows the positional relationship between the plurality of inner cam grooves 11*a* and the plurality of cam followers 8*b* when the zoom lens 71 is the retracted state as shown in FIG. 10. When the zoom lens 71 is the retracted state, each front cam follower 8*b*-1 is positioned in the associated front inner cam groove 11*a*-1 in the vicinity of the third inflection point VTn thereof while each rear cam follower 8*b*-2 is positioned in the associated rear inner cam groove 11*a*-2 in the vicinity of the third inflection point VTn thereof. Since each front inner cam groove 11*a*-1 includes a portion thereof in the vicinity of the third inflection point VTn while each rear inner cam groove 11*a*-2 includes a portion thereof in the vicinity of the third inflection point VTn, each front cam follower 8*b*-1 and each rear cam follower 8*b*-2 are engaged in the associated front inner cam groove 11*a*-1 and the associated rear inner cam groove 11*a*-2, respectively.

Rotating the cam ring 11 in the lens barrel advancing direction (upwards as viewed in FIG. 79) in the retracted state shown in FIG. 79 causes each front cam follower 8*b*-1 and each rear cam follower 8*b*-2 to be guided rearward in the optical axis direction to move on the third section VT3 toward the second inflection point VTm by the associated front inner cam groove 11*a*-1 and the associated rear inner cam groove 11*a*-2, respectively. In the middle of this movement of each cam follower 8*b*, each rear cam follower 8*b*-2 is disengaged from the associated rear inner cam groove 11*a*-2 through a first rear end opening R3 thereof which opens on a rear end surface of the cam ring 11 because each rear inner cam groove 11*a*-2 does not include adjoining portions of the second section VT2 and the third section VT3 on opposite sides of the second inflection point VTm. At this time, each front cam follower 8*b*-1 remains engaged in the associated front inner cam groove 11*a*-1 since each front inner cam groove 11*a*-1 includes a rear portion thereof in the optical axis direction which corresponds to the missing rear portion of each rear inner cam groove 11*a*-2 in the optical axis direction. On or after each rear cam follower 8*b*-2 being disengaged from the associated rear inner cam groove 11*a*-2 through the first rear end opening R3 thereof, the second lens group moving frame 8 moves in the optical axis direction by rotation of the cam ring 11 only due to engagement of each front cam follower 8*b*-1 with the associated front inner cam groove 11*a*-1.

Figure 80:
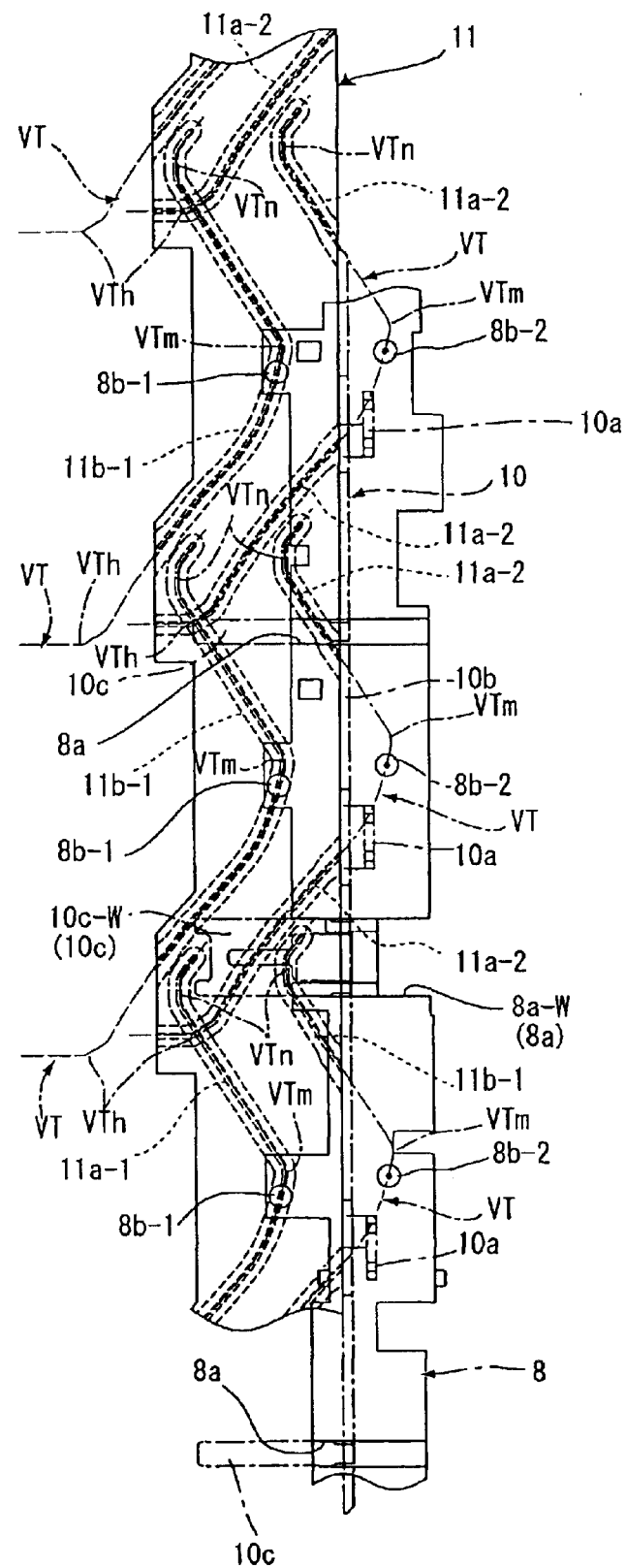
FIG. 80 is a view similar to that of FIG. 79, showing the positional relationship among the cam ring, the second lens group moving frame and the second linear guide ring at the wide-angle extremity of the zoom lens.

FIG. 80 shows the positional relationship between the plurality of inner cam grooves 11*a* and the plurality of cam followers 8*b* when the zoom lens 71 is in the state shown below the photographing lens axis Z1 in FIG. 9 in which the zoom lens 71 is set at the wide-angle extremity. In this state shown below the photographing lens axis Z1 in FIG. 9, each front cam follower 8*b*1 is positioned in the second section VT2 slightly beyond the second inflection point VTm. Although each rear cam follower 8*b*-2 is currently disengaged from the associated rear inner cam groove 11a-2 through the first rear end opening R3 thereof as described above, each rear cam follower 8b-2 remains positioned on the associated reference cam diagram VT because the associated front cam follower 8b-1 positioned in front of the rear cam follower 8b-2 remains engaged in the associated front inner cam groove 11a-1.

Rotating the cam ring 11 in the lens barrel advancing direction (upward as viewed in FIG. 80) in the state shown in FIG. 80, in which the zoom lens 71 is set at the wide-angle extremity, causes each front cam follower 8b-1 to be guided forward in the optical axis direction to move on the second section VT2 toward the first section VT1 by the associated front inner cam groove 11a-1. With this forward movement of each front cam follower 8b-1, each rear cam follower 8b-2 which is currently disengaged from the associated rear inner cam groove 11a-2 moves on the second section VT2 toward the first section VT1, and shortly enters a second rear end opening R2 formed on a rear end surface of the cam ring 11 to be re-engaged in the associated rear inner cam groove 11a-2. On or after this re-engagement of each rear cam follower 8b-2 with the associated rear inner cam groove 11a-2, each front cam follower 8b-1 and each rear cam follower 8b-2 are guided by the associated front inner cam groove 11a-1 and the associated rear inner cam groove 11a-2, respectively. However, a shortly after the re-engagement of each rear cam follower 8b-2 with the associated rear inner cam groove 11a-2, each front cam follower 8b-1 is disengaged from the associated front inner cam groove 11a-1 through the front end opening R1 because a front end portion of each front inner cam groove 11a-1 which lies on the associated reference cam diagram VT is missing. At this time, each rear cam follower 8b-2 remains engaged in the associated rear inner cam groove 11a-2 since each rear inner cam groove 11a-2 includes a front end portion thereof in the optical axis direction which corresponds to the missing front end portion of each front inner cam groove 11a-1 in the optical axis direction. On or after each front cam follower 8b-1 being disengaged from the associated front inner cam groove 11a-1 through the front end opening R1 thereof, the second lens group moving frame 8 moves in the optical axis direction by rotation of the cam ring 11 only due to engagement of each rear cam follower 8b-2 with the associated rear inner cam groove 11a-2.

Figure 81:
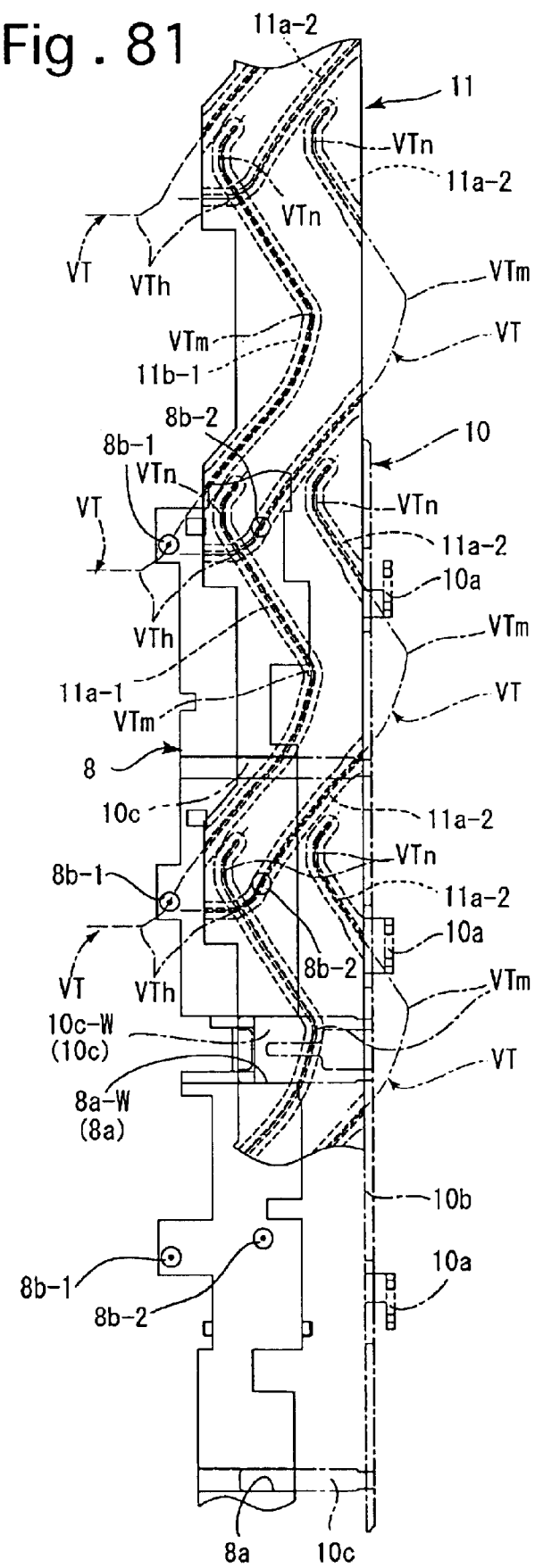
FIG. 81 is a view similar to that of FIG. 79, showing the positional relationship among the cam ring, the second lens group moving frame and the second linear guide ring at the telephoto extremity of the zoom lens.

FIG. 81 shows the positional relationship between the plurality of inner cam grooves 11a and the plurality of cam followers 8b when the zoom lens 71 is in the state shown above the photographing lens axis Z1 in FIG. 9 in which the zoom lens 71 is set at the telephoto extremity. In this state shown above the photographing lens axis Z1 in FIG. 9, each front cam follower 8b-1 is positioned in the second section VT2 in the vicinity of the first inflection point VTh. Although each front cam follower 8b-1 is currently disengaged from the associated front inner cam groove 11a-1 through the front end opening R1 thereof as described above, each front cam follower 8b-1 remains on the associated reference cam diagram VT because the associated rear cam follower 8b-2 positioned behind the front cam follower 8b-1 remains engaged in the associated rear inner cam groove 11a-2.

Figure 82:
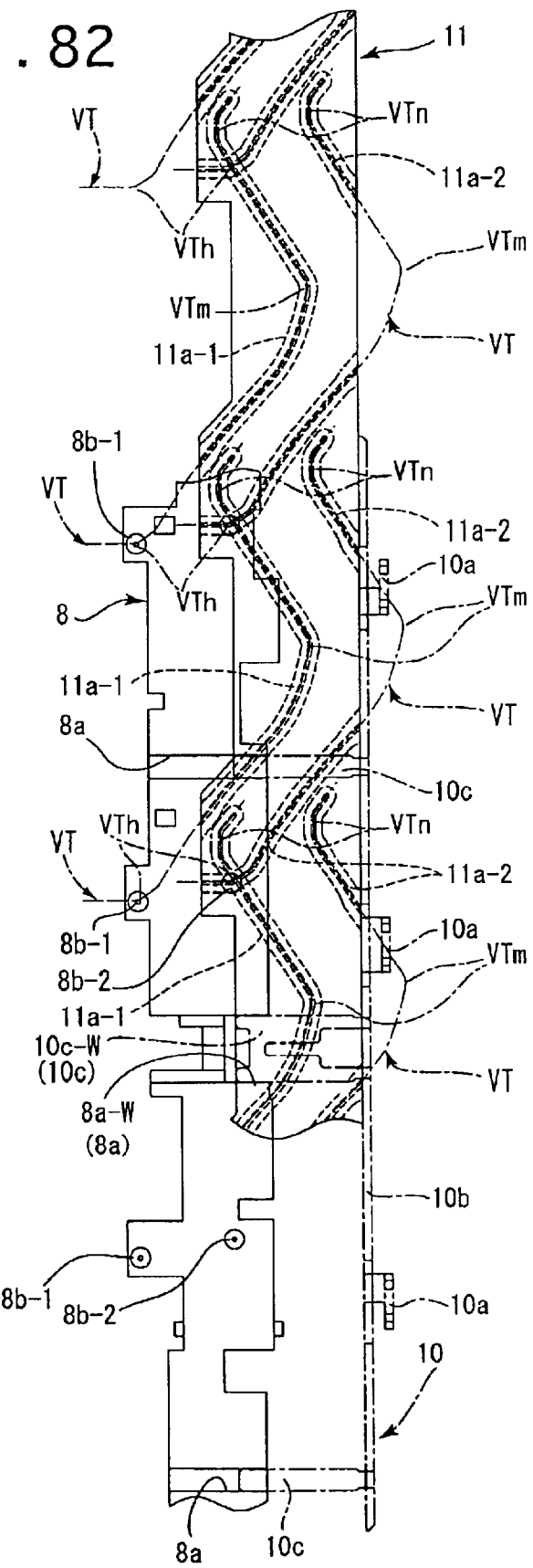
FIG. 82 is a view similar to that of FIG. 79, showing a positional relationship among the cam ring, the second lens group moving frame and the second linear guide ring.

Further rotating the cam ring 11 in the lens barrel advancing direction (upward as viewed in FIG. 81) in the state shown in FIG. 81, in which the zoom lens 71 is set at the telephoto extremity, causes each rear cam follower 8b-2 to enter the first section VT1 via the first inflection point VTh as shown in FIG. 82. At this time, each front cam follower 8b-1 has been disengaged from the associated front inner cam groove 11a-1, and merely each rear cam follower 8b-2 is engaged in a front end portion (the first section VT1) of the associated rear inner cam groove 11a-2 which extends in the optical axis direction, so that the second lens group moving frame 8 can be removed from the cam ring 11 from the front thereof in the optical axis direction to remove each rear cam follower 8b-2 from the associated rear inner cam groove 11a-2 via the front end opening R4. Accordingly, FIG. 82 shows a state where the cam ring 11 and the second lens group moving frame 8 are put together or removed from each other.

As described above, in the present embodiment of the zoom lens, each pair of cam grooves having the same reference cam diagram VT, i.e., each front inner cam groove 11a-1 and the associated rear inner cam groove 11a-2 are formed at different points in the optical axis direction on the cam ring 11; moreover, each front inner cam groove 11a-1 and the associated rear inner cam groove 11a-2 are formed so that one end of the front inner cam groove 11a-1 opens on a front end surface of the cam ring 11 without the front inner cam groove 11a-1 including the entire part of the associated reference cam diagram VT and so that one end of the rear inner cam groove 11a-2 opens on a rear end surface of the cam ring 11 without the rear inner cam groove 11a-2 including the entire part of the associated reference cam diagram VT; and furthermore, one of the front inner cam groove 11a-1 and the rear inner cam groove 11a-2 is complemented by the other to include the entire part of one reference cam diagram VT. In addition, only each rear cam follower 8b-2 is engaged in the associated rear inner cam groove 11a-2 when the second lens group moving frame 8 is positioned at a front limit for the axial movement thereof with respect to the cam ring 11 (which corresponds to the state shown above the photographing lens axis Z1 in FIG. 9 in which the zoom lens 71 is set at the telephoto extremity), while only each front cam follower 8b-1 is engaged in the associated front inner cam groove 11a-1 when the second lens group moving frame 8 is positioned at a rear limit for the axial movement thereof with respect to the cam ring 11 (which corresponds to a state shown below the photographing lens axis Z1 in FIG. 9 in which the zoom lens 71 is set at the wide-angle extremity). With this structure, a sufficient range of movement of the second lens group moving frame 8 in the optical axis direction which is greater than the range of movement of the cam ring 11 in the optical axis direction is achieved. Namely, the length of the cam ring 11 in the optical axis direction can be reduced without sacrificing the range of movement of the second lens group moving frame 8, which supports the second lens group LG2 via the second lens frame 6, in the optical axis direction.

In a typical cam mechanism having a rotatable cam ring on which a set of cam grooves are formed and a driven member having a set of cam followers which are respectively engaged in the set of cam grooves, the amount of movement of each cam follower per unit of rotation of the cam ring decreases to thereby make it possible to move the driven member with a higher degree of positioning accuracy by rotation of the cam ring as the degree of inclination of each cam groove on the cam ring relative to the rotational direction of the cam ring becomes small, i.e., as the direction of extension of each cam groove becomes close to a circumferential direction of the cam ring. In addition, the degree of resistance to the cam ring when it rotates becomes smaller to thereby make the driving torque for rotating the cam ring smaller as the degree of inclination of each cam groove on the cam ring relative to the rotational direction of the cam ring becomes small. A reduction of the driving torque results in an increase in durability of elements of the cam mechanism and a decrease in power consumption of the motor for driving the cam ring, and makes it possible to adopt a small motor for driving the cam ring to downsize the lens barrel. Although it is known that the actual contours of the cam grooves are determined in consideration of various factors such as the effective area of an outer or inner peripheral surface of the cam ring and the maximum angle of rotation of the cam ring, it is generally the case that the cam grooves have the above described tendencies.

As described above, it can be said that the cam ring 11 is provided, at regular intervals in a circumferential direction of the cam ring 11, with three pairs (groups) of inner cam grooves 11a for guiding the second lens group LG2 if each front inner cam groove 11a-1 and the rear inner cam groove 11a-2 positioned therebehind in the optical axis direction are regarded as a pair (group). Similarly, it can be said that the second lens group moving frame 8 is provided, at regular intervals in a circumferential direction thereof, with three pairs (groups) of cam followers 8b if each front cam follower 8b-1 and the rear cam follower 8b-2, positioned therebehind in the optical axis direction, are regarded as a pair (group). As for the reference cam diagrams VT of the plurality of inner cam grooves 11a, provided only three of the reference cam diagrams VT are to be arranged on an inner peripheral surface of the cam ring 11 along a line thereon extending in a circumferential direction of the cam ring 11, the three reference cam diagrams VT will not interfere with one another on the inner peripheral surface of the cam ring 11 though each reference cam diagram VT has an undulating shape. However, in the present embodiment of the zoom lens, in order to shorten the length of the cam ring 11 in the optical axis direction to thereby minimize the length of the zoom lens 71, six reference cam diagrams VT need to be arranged on the inner peripheral surface of the cam ring 11 in total because the set of three front inner cam grooves 11a-1 and the corresponding set of three rear cam grooves (three discontinuous rear cam grooves) 11a-2, six cam grooves in total, need to be formed separately on front and rear portions on the inner peripheral surface of the cam ring 11 in the optical axis direction, respectively. Although each of the six inner cam grooves 11a-1 and 11a-2 is shorter than the reference cam diagram VT, it is generally the case that the space for the inner cam grooves 11a-1 and 11a-2 on the cam ring 11 becomes tighter as the number of the cam grooves is great. Therefore, if the number of the cam grooves is great, it is difficult to form the cam grooves on the cam ring without making the cam grooves interfering with each other. To prevent this problem from occurring, it has been conventionally practiced to increase the degree of inclination of each cam groove relative to the rotational direction of the cam ring (i.e., to make the direction of extension of each cam groove close to a circumferential direction of the cam ring) or to increase the diameter of the cam ring to enlarge the area of a peripheral surface of the cam ring on which the cam grooves are formed. However, increasing the degree of inclination of each cam groove is not desirable in terms of the attainment of a high degree of positioning accuracy in driving a driven member driven by the cam ring and also a saving in the driving torque for rotating the cam ring, and increasing the diameter of the cam ring is not desirable either because the zoom lens will be increased in size.

In contrast to such conventional practices, according to the present embodiment of the zoom lens, the inventor of the present invention has found the fact that a substantial performance characteristics of the cam mechanism is maintained even if each front inner cam groove 11a-1 intersects one of the set of three rear inner cam grooves 11a-2, as long as the reference cam diagrams VT of the six inner cam grooves 11a (11a-1 and 11a-2) are the same while one cam follower of each pair of cam followers (each front cam follower 8b-1 and the associated rear cam follower 8b-2) remains engaged in the associated inner cam groove 11a-1 or 11a-2 at the moment at which the other cam follower 8b-1 or 8b-2 passes through a point of intersection between the front inner cam groove 11a-1 and the rear inner cam groove 11a-2. On the basis of this fact, each front inner cam groove 11a-1 and adjacent one of the set of three rear inner cam grooves 11a-2, which are adjacent to each other in a circumferential direction of the cam ring 11, are formed to intersect each other intentionally without changing the shape of each reference cam diagram VT and without increasing the diameter of the cam ring 11. More specifically, if the three pairs of inner cam grooves 11a are respectively treated as a first pair of cam grooves G1, a second pair of cam grooves G2 and a third pair of cam grooves G3 as shown in FIG. 17, the front inner cam groove 11a-1 of the first pair G1 and the rear inner cam groove 11a-2 of the second pair G2, which are adjacent to each other in a circumferential direction of the cam ring 11, intersect each other, the first inner cam groove 11a-1 of the second pair G2 and the rear inner cam groove 11a-2 of the third pair G3, which are adjacent to each other in a circumferential direction of the cam ring 11, intersect each other, and the front inner cam groove 11a-1 of the third pair G3 and the rear inner cam groove 11a-2 of the first pair G1, which are adjacent to each other in a circumferential direction of the cam ring 11, intersect each other.

To make one cam follower of each pair of cam followers (each front cam follower 8b-1 and the associated rear cam follower 8b-2) remain properly engaged in the associated inner cam groove 11a-1 or 11a-2 at the moment at which the other cam follower 8b-1 or 8b-2 passes through the point of intersection between the front inner cam groove 11a-1 and the rear inner cam groove 11a-2, the front inner cam groove 11a-1 and the rear inner cam groove 11a-2 of each pair of the first through third pairs of cam grooves G1, G2 and G3 are formed not only at different axial positions in the optical axis direction but also at different circumferential positions in a circumferential direction of the cam ring 11. The positional difference in a circumferential direction of the cam ring 11 between the front inner cam groove 11a-1 and the rear inner cam groove 11a-2 of each pair of the first through third pairs of cam grooves G1, G2 and G3 is indicated by "HJ" in FIG. 17. This positional difference HJ changes the point of intersection between the front inner cam groove 11a-1 and the rear inner cam groove 11a-2 in a circumferential direction of the cam ring 11. Consequently, in each pair of the first through third pairs of cam grooves G1, G2 and G3, the point of intersection is positioned in the vicinity of the second inflection point VTm on the third section VT3 of the front inner cam groove 11a-1, and also in the vicinity of the first inflection point VTh the front end opening R4 (the front open end section 11a-2x) at the front end of the first section VT1.

Figure 83:
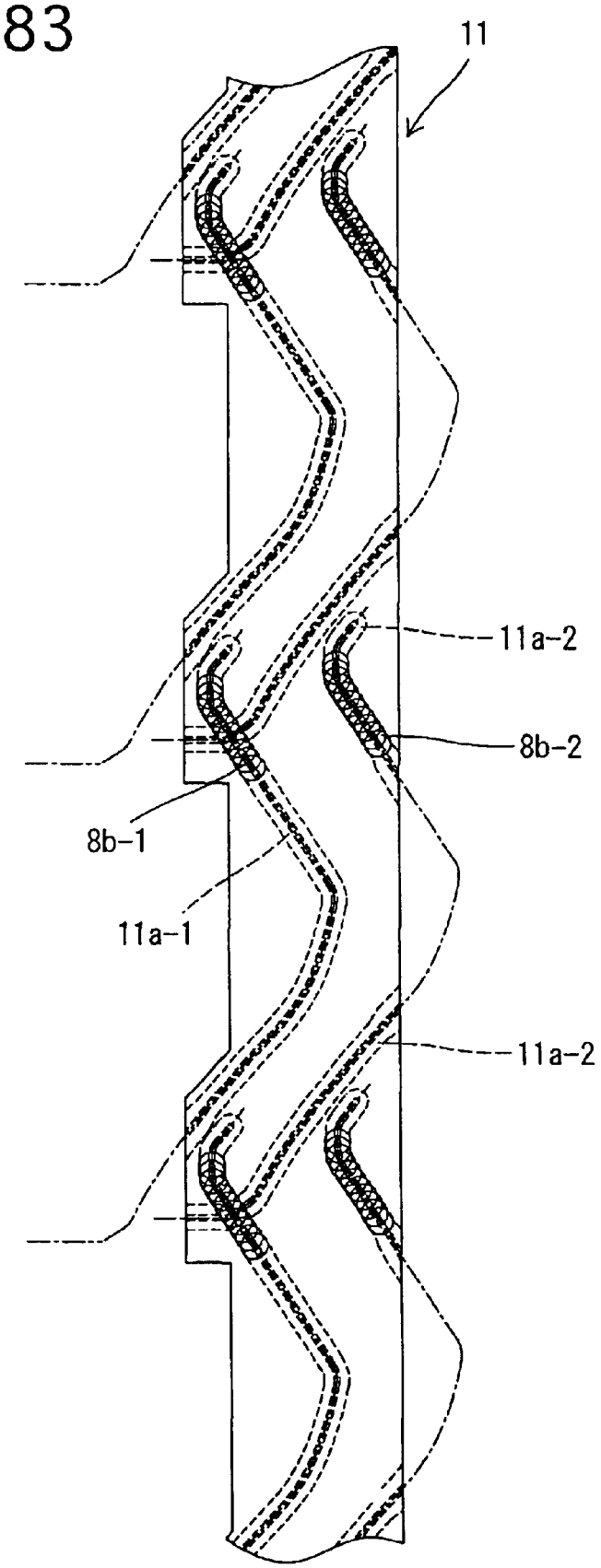
FIG. 83 is developed view of the cam ring, showing a state where a set of front cam followers of the second lens group moving frame pass through the points of intersection between a set of front inner cam grooves and a set of rear inner cam grooves of the cam ring.

As can be understood from the above descriptions, at the moment at which the set of three front cam followers 8b-1 pass through the points of intersection in the set of three front inner cam grooves 11a-1, the set of three rear cam followers 8b-2 remain engaged in the set of three rear inner cam grooves 11a-2 so that the set of three front cam followers 8b-1 can pass through the points of intersection without being disengaged from the set of three front inner cam grooves 11a-1, respectively (see FIG. 83), by forming the set of three front inner cam grooves 11a-1 and the corresponding set of three rear inner cam grooves 11a-2 in the above described manner. Although each front inner cam groove 11a-1 has the point of intersection therein between the zooming section and the lens-barrel retracting section, i.e. in the lens-barrel operating section, the lens barrel 71 can securely be advanced and retracted with the cam ring 11 regardless of the existence of a section of each front inner cam groove 11a-1 which includes the point of intersection therein.

Although each front cam follower 8b-1 is already disengaged from the associated front inner cam groove 11a-1 when each rear cam follower 8b-2 reaches the point of intersection in the rear inner cam groove 11a-2 as shown in FIG. 82, this point of intersection is positioned in the lens-barrel assembling/disassembling section, i.e., out of the lens-barrel operating section, so that each rear cam follower 8b-2 is not in a state where it receives torque from the cam ring 11. Accordingly, as for the set of three rear inner cam grooves 11a-2, a possibility of each rear cam follower 8b-2 being disengaged from the associated rear inner cam groove 11a-2 at the point of intersection therein does not have to be taken into consideration when the zoom lens 71 is in the ready-to-photograph state.

The point of intersection in each front inner cam groove 11a-1 is in a section thereof through which the associated front cam follower 8b-1 passes between a state shown in FIG. 79 in which the zoom lens 71 is in the retracted state and a state shown in FIG. 80 in which the zoom lens 71 is in the wide-angle extremity, while the point of intersection in each rear inner cam groove 11a-2 is in the lens-barrel assembling/disassembling section as described above. Therefore, either each front inner cam groove 11a-1 or each rear inner cam groove 11a-2 does not have the point of intersection therein in the zooming range between the wide-angle extremity and the telephoto extremity. This makes it possible to insure a high degree of positioning accuracy in driving the second lens group LG2 during a zooming operation of the zoom lens 71 regardless of the existence of the point of intersection between cam grooves.

Namely, the timing of engagement or disengagement of each cam follower in or from the associated cam groove can be varied by adjusting the aforementioned positional difference b. Moreover, the point of intersection between two cam grooves (11a-1 and 11a-2) can be positioned in an appropriate section therein which does not affect any adverse effect on a zooming operation by adjusting the aforementioned positional difference b.

As can be understood from the above descriptions, in the present embodiment of the zoom lens, each front inner cam groove 11a-1 and each rear inner cam groove 11a-2 are successfully arranged on the inner peripheral surface of the cam ring 11 in a space-saving fashion without deteriorating the positioning accuracy in driving the second lens group LG2 by making each front inner cam groove 11a-1 and adjacent one of the set of three rear inner cam grooves 11a-2, which are adjacent to each other in a circumferential direction of the cam ring 11, intersect each other intentionally and further by forming each front inner cam groove 11a-1 and the associated rear inner cam groove 11a-2 not only at different axial positions in the optical axis direction but also at different circumferential positions in a circumferential direction of the cam ring 11. Accordingly, not only the length of the cam ring 11 in the optical axis direction but also the diameter of the cam ring 11 can be reduced.

The second lens group moving frame 8 is movable in the optical axis direction by a comparatively great amount of movement as compared with the length of the zoom lens by the above described structure of the cam ring 11. However, it is conventionally the case that it is difficult to guide such a moving member the moving range of which is great linearly in a direction of an optical axis without rotating the moving member about the optical axis by a small linear guide structure. In the present embodiment of the zoom lens, the second lens group moving frame 8 can be guided linearly in the optical axis direction without rotating about the lens barrel axis Z0 with reliability, without increasing the size of the second lens group moving frame 8.

As can be seen from FIGS. 73 through 75 and 79 through 82, the second linear guide ring 10 does not move in the optical axis direction relative to the cam ring 11. This is because the discontinuous outer edge of the ring portion 10b of the second linear guide ring 10 is engaged in the discontinuous circumferential groove 11e of the cam ring 11 to be rotatable about the lens barrel axis Z0 relative to the cam ring 11 and to be immovable relative to the cam ring 11 in the optical axis direction. On the other hand, in the operating range of the zoom lens 71 from the retracted position to the telephoto extremity via the wide-angle extremity, the second lens group moving frame 8 is positioned at the rear limit for the axial movement thereof with respect to the cam ring 11 when the zoom lens 71 is set at a focal length in the vicinity of the wide-angle extremity, while the second lens group moving frame 8 is positioned at the front limit for the axial movement thereof with respect to the cam ring 11 when the zoom lens 71 is set at the telephoto extremity. More specifically, the second lens group moving frame 8 is positioned at the rear limit for the axial movement thereof with respect to the cam ring 11 when each front cam follower 8b-1 and each rear cam follower 8b-2 are positioned on the second inflection point VTm of the associated front inner cam groove 11a-1 and the second inflection point VTm of the associated rear inner cam groove 11a-2, respectively, namely, when each front cam follower 8b-1 and each rear cam follower 8b-2 are each positioned in close vicinity of its wide-angle position between this wide-angle position and its retracted position.

Figure 88:
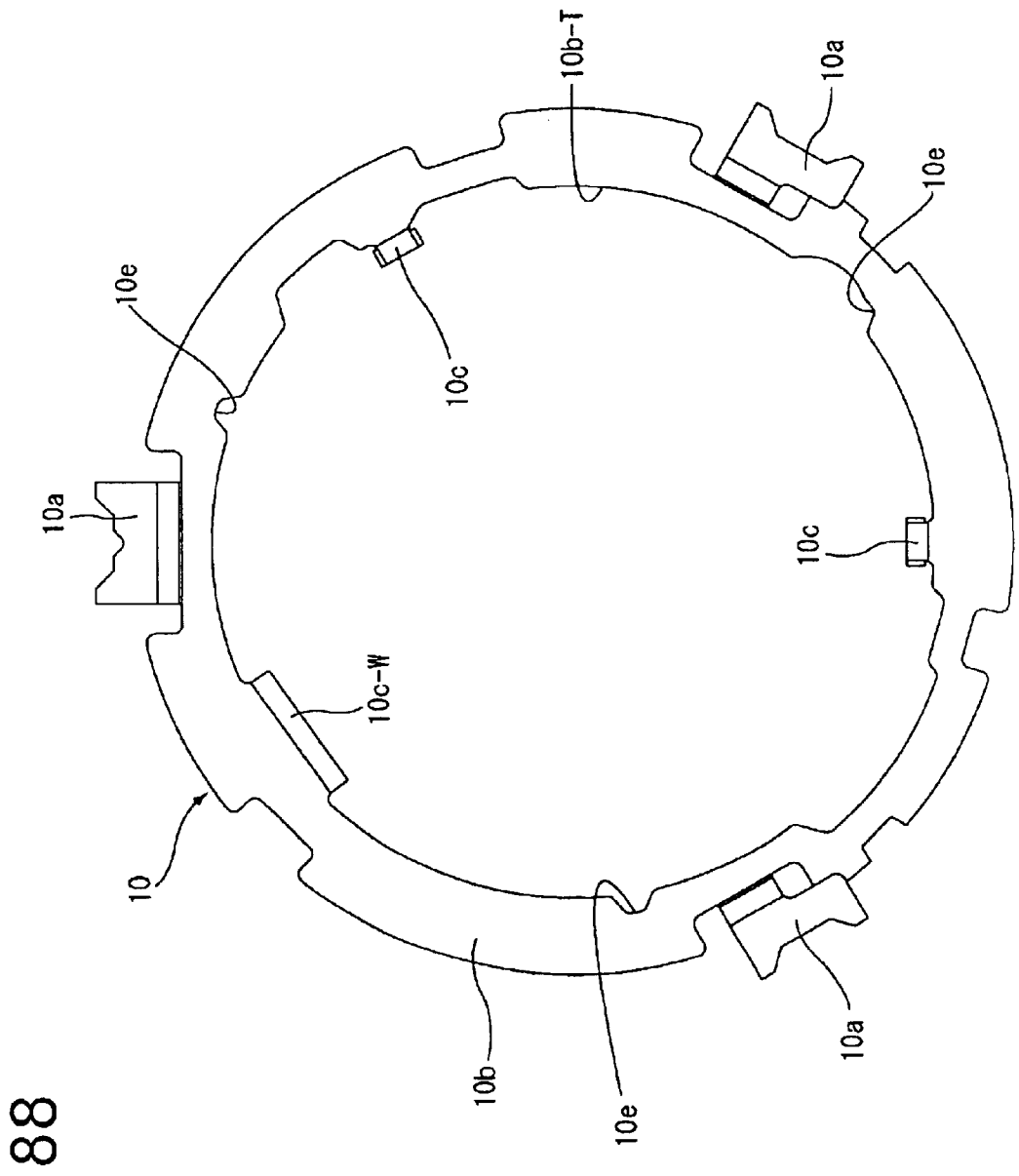
FIG. 88 is a front elevational view of the second linear guide ring.

As for the second linear guide ring 10, the set of three linear guide keys 10c project forward in the optical axis direction from the ring portion 10b, whereas the rear end of the second lens group moving frame 8 projects rearward, beyond the ring portion 10b of the second linear guide ring 10, when the zoom lens 71 is set at the wide-angle extremity as shown in FIGS. 73 and 80. To allow the second lens group moving frame 8 having such a structure to move in the optical axis direction with respect to the second linear guide ring 10, the ring portion 10b of the second linear guide ring 10 is provided with a central aperture 10b-T (see FIG. 88) which has a diameter allowing the second lens group moving frame 8 to pass therethrough. The set of three linear guide keys 10c are positioned to project forward through the central aperture 10b-T. In other words, the set of three linear guide keys 10c are formed on the second linear guide ring 10 at radial positions not interfering with the ring portion 10b. Front and rear ends of each guide groove 8a that is formed on the second lens group moving frame 8 are open on front and rear end surfaces of the second lens group moving frame 8 so that the associated linear guide key 10c can project forward and rearward from the front and the rear of the second lens group moving frame 8, respectively.

Figure 84:
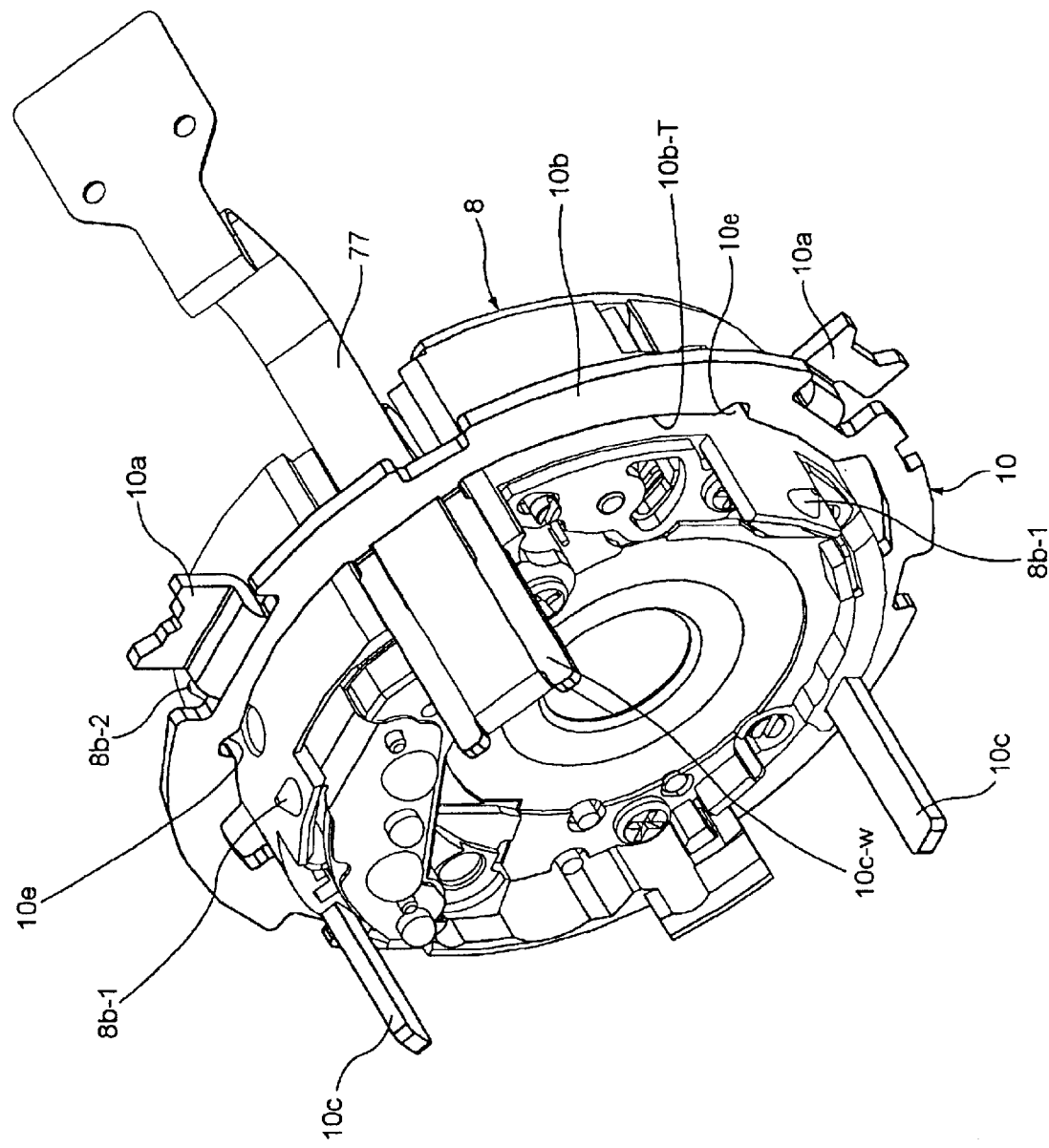
FIG. 84 is a perspective view of a portion of the zoom lens shown in FIGS. 5 through 10 which includes the second lens group moving frame, the second linear guide ring, a shutter unit and other elements, viewed obliquely from the front thereof.
Figure 85:
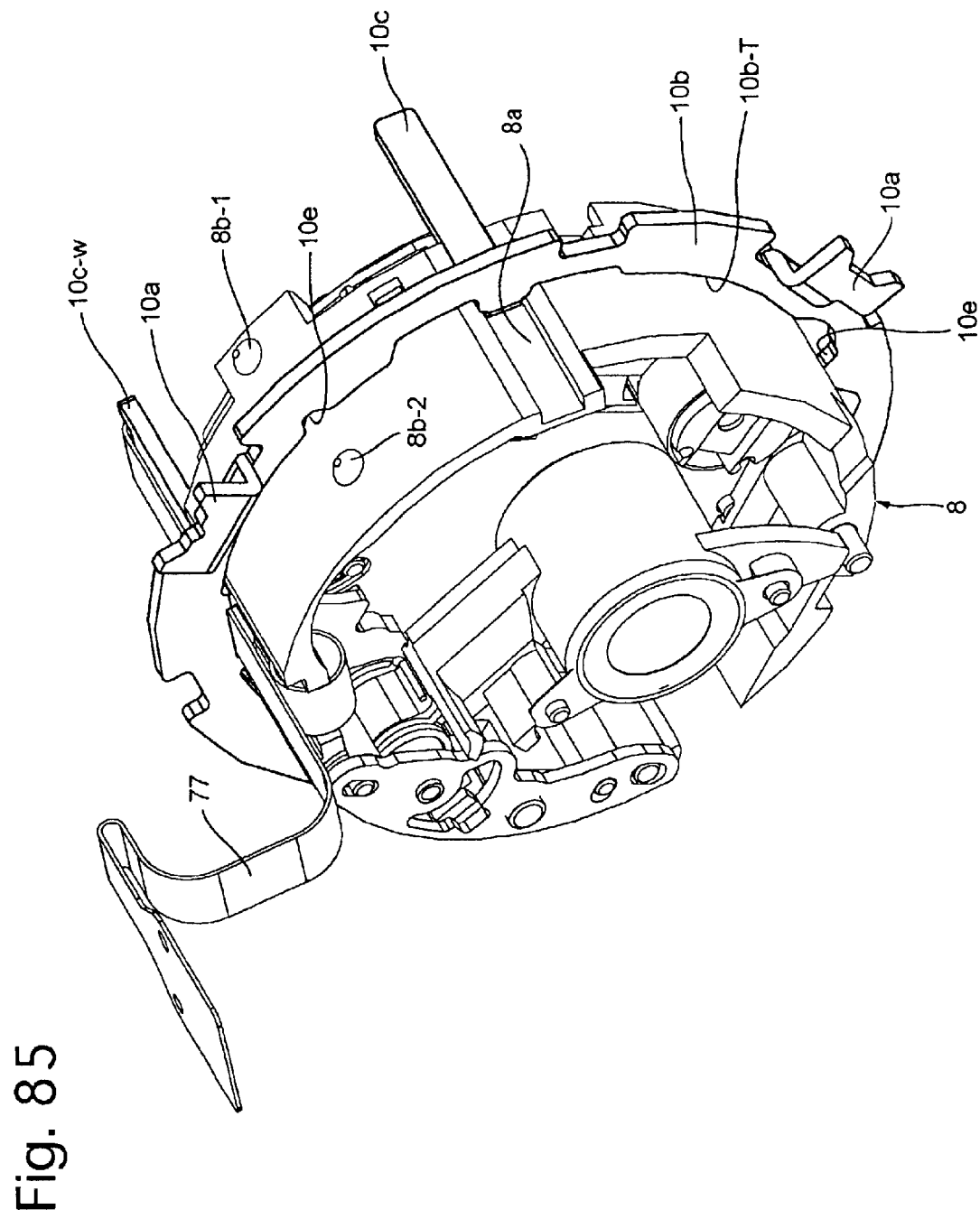
FIG. 85 is a perspective view of the portion of the zoom lens in FIG. 84, viewed obliquely from behind.

Therefore, the second lens group moving frame 8 does not interfere with the ring portion 10b of the second linear guide ring 10 wherever the second lens group moving frame 8 is positioned relative to the second linear guide ring 10 in the optical axis direction. This makes it possible to utilize the full ranges of each linear guide key 10c and each guide groove 8a as sliding parts for guiding the second lens group moving frame 8 linearly without rotating the same about the lens barrel axis Z0. For instance, in the state shown in FIGS. 84 and 85 showing the positional relationship between the second lens group moving frame 8 and the second linear guide ring 10 when the zoom lens 71 is set at the wide-angle extremity (i.e., when the second lens group moving frame 8 is positioned at its rear limit for the axial movement thereof with respect to the second linear guide ring 10), approximately a rear half of the second lens group moving frame 8 projects rearward from the ring portion 10b through the central aperture 10b-T in the optical axis direction, and a rear portion of each linear guide key 10c in the vicinity of the rear end thereof in the optical axis direction is engaged with a front portion of the associated guide groove 8a in the vicinity of the front end thereof in the optical axis direction. In addition, the front end of each linear guide key 10c projects forward from the associated guide groove 8a. Assuming that each linear guide key 10c is not positioned radially inside the ring portion 10b but projects forward directly from the front of the ring portion 10b unlike the present embodiment of the zoom lens, the second lens group moving frame 8 will not be capable of moving rearward beyond the position thereof shown in FIGS. 84 and 85 since the second lens group moving frame 8 will be prevented from moving rearward upon contacting with the ring portion 10b.

Figure 86:
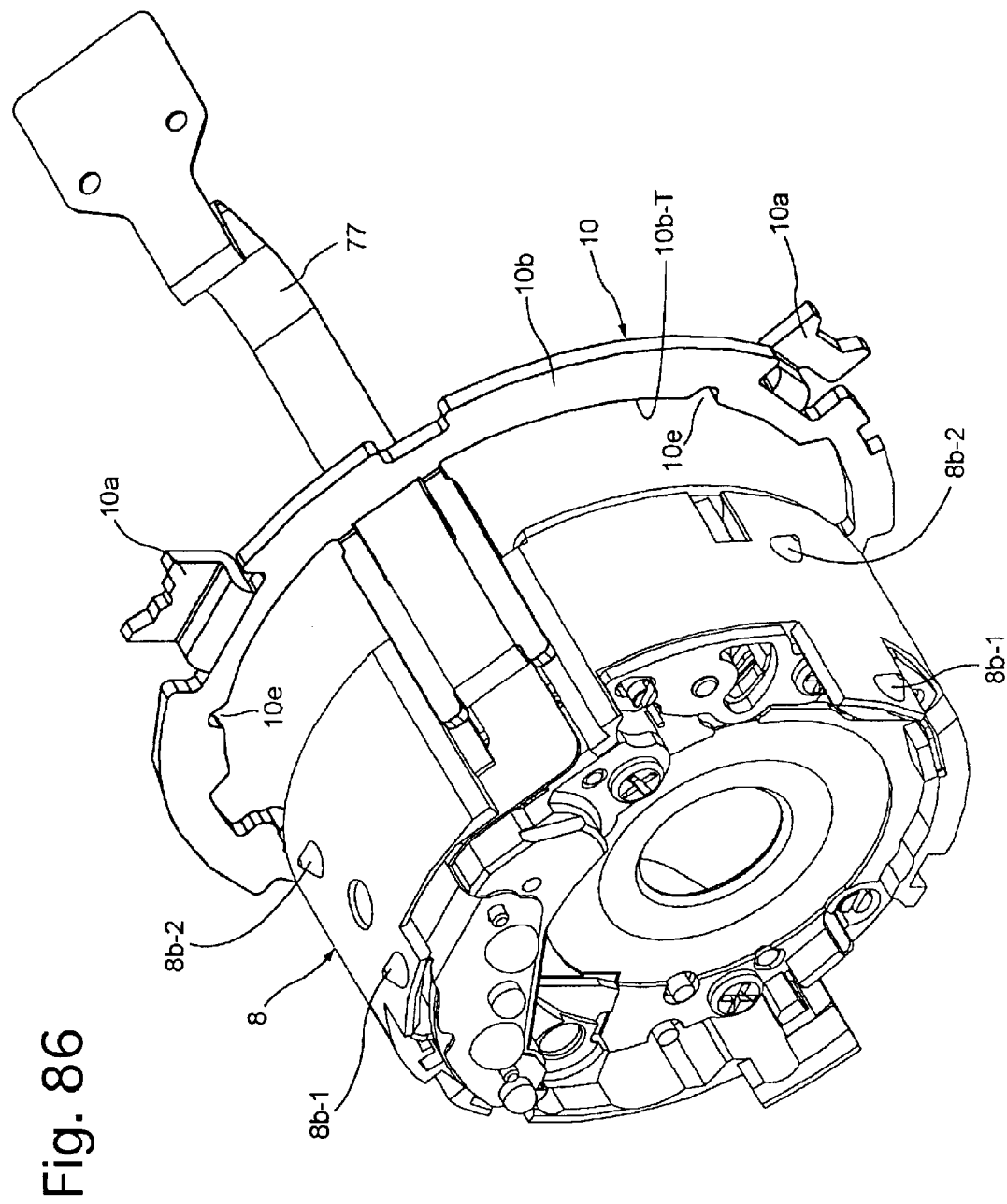
FIG. 86 is a view similar to that of FIG. 84, showing the positional relationship between the second lens group moving frame and the second linear guide ring when the second lens group moving frame is positioned at its front limit for the axial movement thereof with respect to the second linear guide ring.
Figure 87:
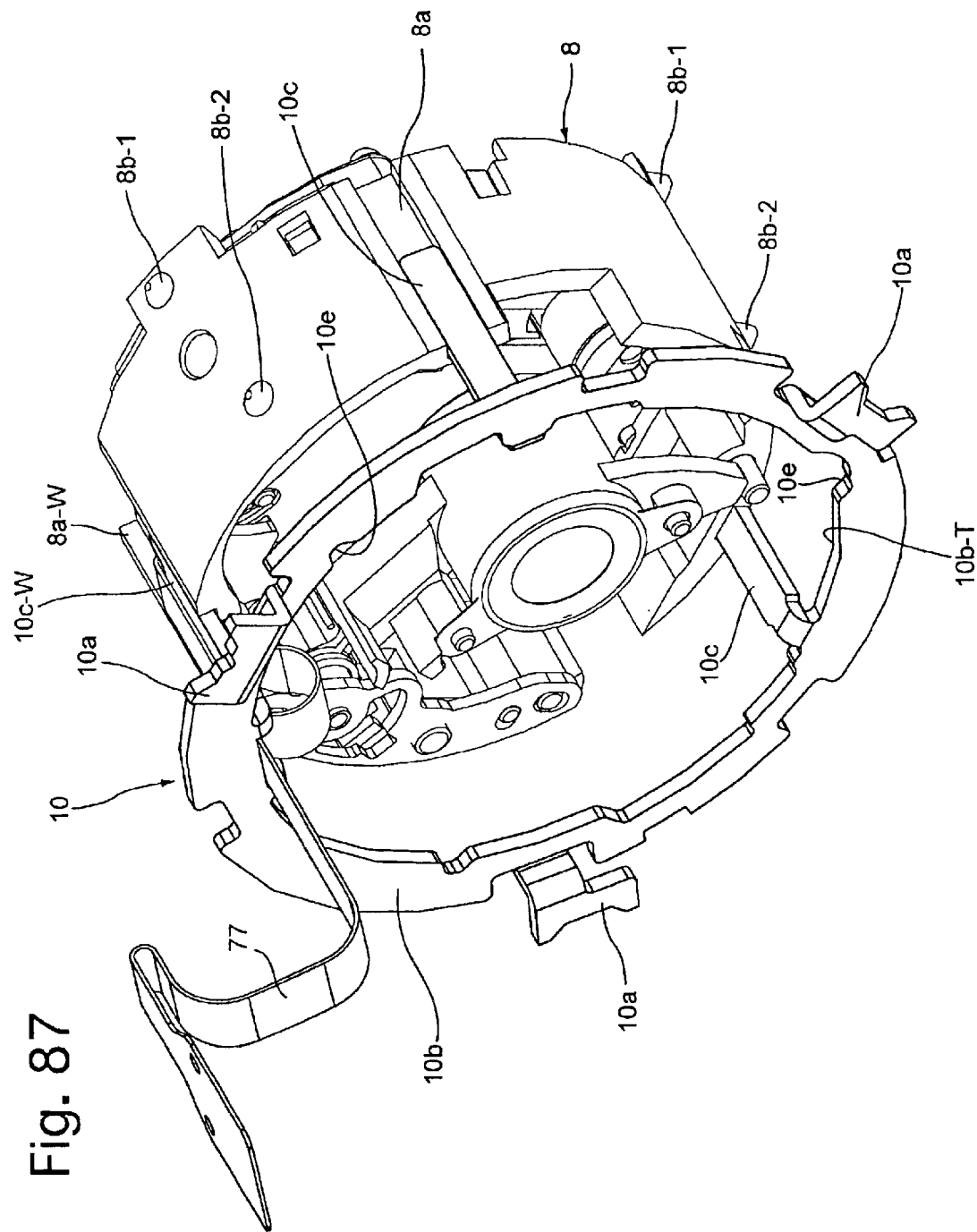
FIG. 87 is a perspective view of the portion of the zoom lens in FIG. 86, viewed obliquely from behind.

Thereafter, if the zoom lens 71 changes its focal length from the wide-angle extremity to the telephoto extremity, a rear portion of the second lens group moving frame 8 which is positioned behind the ring portion 10b in the optical axis direction when the zoom lens 71 is set at the wide-angle extremity has been moved forward from the ring portion 10b through the central aperture 10b-T in the optical axis direction so that the entire part of the second lens group moving frame 8 is positioned in front of the ring portion 10b as shown in FIGS. 86 and 87. As a result, the rear end of each linear guide key 10c projects rearward from the associated guide groove 8a so that only a front portion of each linear guide key 10c and a rear portion of the associated guide groove 8a are engaged with each other in the optical axis direction. During the movement of the second lens group moving frame 8 in the optical axis direction when the zoom lens 71 changes its focal length from the wide-angle extremity to the telephoto extremity, the set of three linear guide keys 10c remain engaged in the set of three guide grooves 8a so that the second lens group moving frame 8 is securely guided linearly in the optical axis direction without rotating about the lens barrel axis Z0.

In the case where only a linear guiding function between the second linear guide ring 10 and the second lens group moving frame 8 is considered, almost the entire portion of each linear guide key 10c in the optical axis direction and almost the entire portion of each guide groove 8a in the optical axis direction can be utilized theoretically as effective guide portions which can remain engaged with each other until just before being disengaged from each other. However, each of the respective effective guide portions is determined with a margin so as not to deteriorate the stability of engagement of the set of three linear guide keys 10c with the set of three guide grooves 8a. For instance, in the state shown in FIGS. 84 and 85 in which the zoom lens 71 is set at the wide-angle extremity, the relative position between the set of three linear guide keys 10c and the set of three guide grooves 8a shown in FIGS. 84 and 85 corresponds to the wide-angle extremity of the zoom lens 71 to ensure a sufficient amount of engagement between the set of three linear guide keys 10c and the set of three guide grooves 8a though each guide groove 8a still has room for the associated linear guide key 10c to further move rearward in the optical axis direction. Although the second lens group moving frame 8 is positioned at the rear limit for the axial movement thereof with respect to the cam ring 11 when each front cam follower 8b-1 and each rear cam follower 8b-2 are positioned on the second inflection point VTm of the associated front inner cam groove 11a-1 and the second inflection point VTm of the associated rear inner cam groove 11a-2, respectively, namely, when each front cam follower 8b-1 and each rear cam follower 8b-2 are each positioned in close vicinity of its wide-angle position between this wide-angle position and its retracted position as described above, a sufficient amount of engagement of the set of three linear guide keys 10c with the set of three guide grooves 8a is secured even when the second lens group moving frame 8 is positioned at such a rear limit for the axial movement thereof with respect to the cam ring 11. In the state shown in FIGS. 86 and 87 in which the zoom lens 71 is set at the telephoto extremity, the second lens group moving frame 8 can further move forward to the second linear guide ring 10 when the zoom lens 71 is in the assembling/disassembling state, each linear guide key 10c remains engaged in the associated guide groove 8a in the assembling/disassembling state (see FIG. 82).

Figure 89:
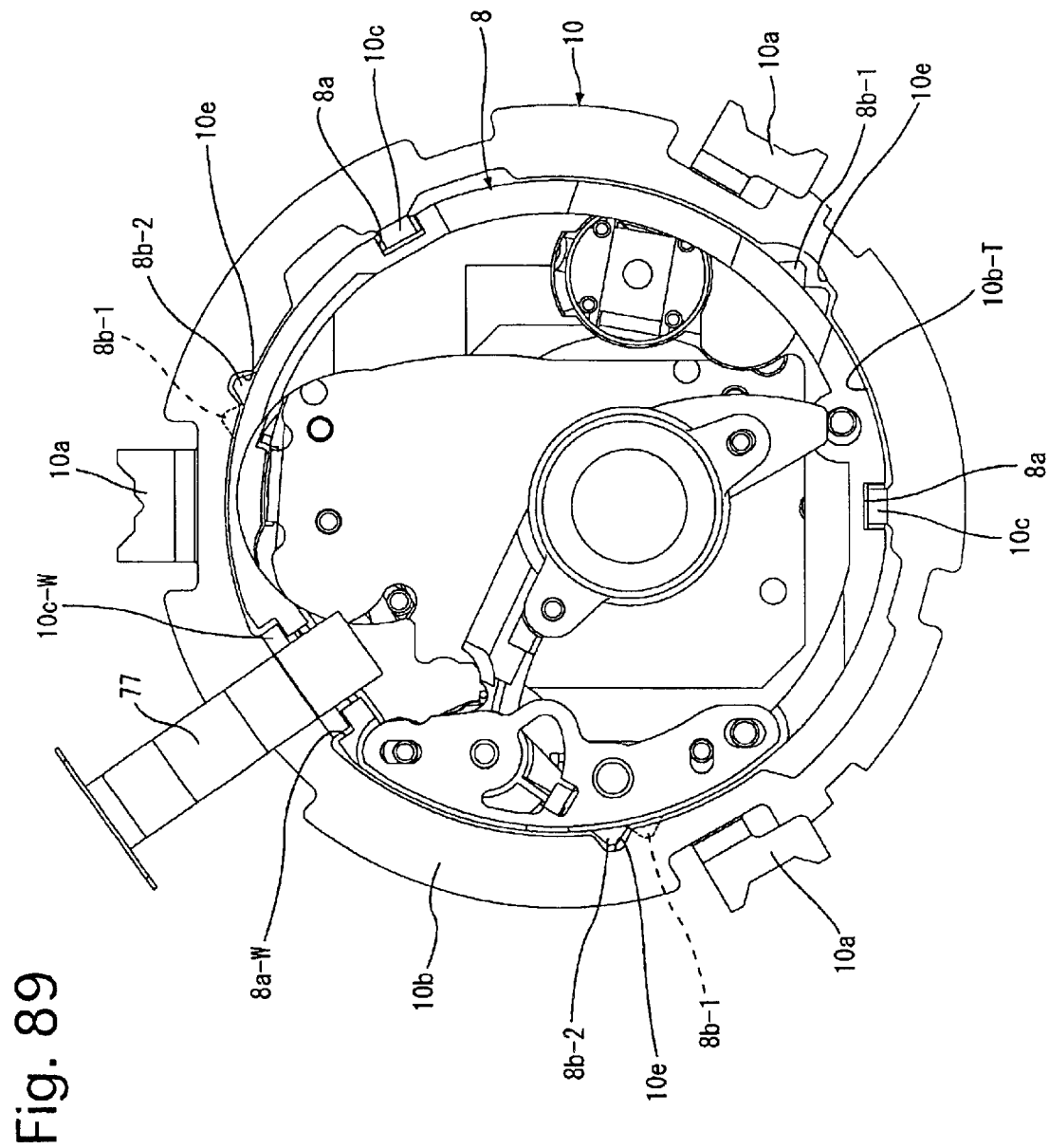
FIG. 89 is a rear elevational view of the second lens group moving frame, the second linear guide ring and other elements in an assembled state thereof.

As described above, to increase the maximum amount of movement of the second lens group moving frame 8 relative to the cam ring 11, the plurality of cam followers 8b of the second lens group moving frame 8 include the set of three front cam followers 8b-1, which are formed at different circumferential positions to be respectively engaged in the set of three front inner cam grooves 11a-1, and a set of three rear cam followers 8b-2, which are formed at different circumferential positions behind the set of three front cam followers 8b-1 to be respectively engaged in the set of three rear inner cam grooves 11a-2. The set of three rear cam followers 8b-2 move rearward from the ring portion 10b when the zoom lens 71 is driven from the retracted position to the wide-angle extremity, and move forward from the ring portion 10b when the zoom lens 71 is driven from the wide-angle extremity to the telephoto extremity. The set of three rear cam followers 8b-2 are positioned behind the ring portion 10b when disengaged from the set of three rear inner cam grooves 11a-2 from the first rear end openings R3 or the second rear end openings R2, respectively. The ring portion 10b is provided on an inner edge thereof at different circumferential positions with three radial recesses 10e through which the set of three rear cam followers 8b-2 can pass the ring portion 10b in the optical axis direction, respectively, (see FIGS. 88 and 89).

The three radial recesses 10e are formed on the ring portion 10b to be aligned with the set of three rear cam followers 8b-2 in the optical axis direction when engaged therewith, respectively. Therefore, at the time when each rear cam follower 8b-2 reaches the first rear end opening R3 of the associated rear inner cam groove 11a-2 in the course of rearward movement of the rear cam follower 8b-2 with respect to the second linear guide ring 10 from the retracted position shown in FIG. 79 toward a position shown in FIG. 80 which corresponds to the wide-angle extremity of the zoom lens 71, the three radial recesses 10e are also aligned with the three first rear end openings R3 in the optical axis direction to allow the set of three rear cam followers 8*b*-2 to move rearward beyond the ring portion 10*b* through the three radial recesses 10*e* and the three first rear end openings R3, respectively. Thereafter, each rear cam follower 8*b*2 changes the direction of movement thereof at the second inflection point VTm of the associated reference cam diagram VT to then move forward in the optical axis direction, and remains positioned behind the ring portion 10*b* until reaching the second rear end opening R2 of the associated rear inner cam groove 11*a*-2 as shown in FIGS. 80 and 85. Upon each rear cam follower 8*b*-2 reaching the second rear end opening R2 of the associated rear inner cam groove 11*a*-2 when moving forward further from the position shown in FIG. 80 which corresponds to the wide-angle extremity of the zoom lens 71, the three radial recesses 10*e* are aligned with the three second rear end openings R2 in the optical axis direction this time to allow the set of three rear cam followers 8*b*-2 to enter the set of three rear inner cam grooves 11*a*-2 through the three radial recesses 10*e* and the three second rear end openings R2, respectively. Accordingly, the ring portion 10*b* of the second linear guide ring 10 does not interfere with movement of the set of three rear cam followers 8*b*-2 because the ring portion 10*b* is provided with the three radial recesses 10*e*, through which the set of three rear cam followers 8*b*-2 can pass the ring portion 10*b* in the optical axis direction, respectively.

As can be understood from the above descriptions, according to the above described linear guide structure, the second lens group moving frame 8, the moving range of which in the optical axis direction is comparatively great, can be securely guided linearly without rotating about the lens barrel axis Z0 by the second linear guide ring 10 without the ring portion 10*b* interfering with the second lens group moving frame 8. As can be seen from FIGS. 79 through 82, the present embodiment of the linear guide structure cannot be greater than a conventional linear guide structure because the length of each linear guide key 10*c* is smaller than the length of the cam ring 11 in the optical axis direction.

The support structure between the second linear guide ring 10 and the second lens group moving frame 8 that are positioned inside the cam ring 11 has been discussed above. The support structure between the first external barrel 12 and the second external barrel 13 that are positioned outside the cam ring 11 will be discussed hereinafter.

The cam ring 11 and the first external barrel 12 are arranged concentrically about the lens barrel axis Z0. The first external barrel 12 moves in the optical axis direction in a predetermined moving manner by engagement of the set of three cam followers 31, which project radially inwards from the first external barrel 12, with the set of three outer cam grooves 11*b*, which are formed on an outer peripheral surface of the cam ring 11. FIGS. 90 through 100 show positional relationships between the set of three cam followers 31 and the set of three outer cam grooves 11*b*. In FIGS. 90 through 100, the first external barrel 12 is shown by one-dot chain lines while the second external barrel 13 is shown by two-dot chain lines.

Figure 92:
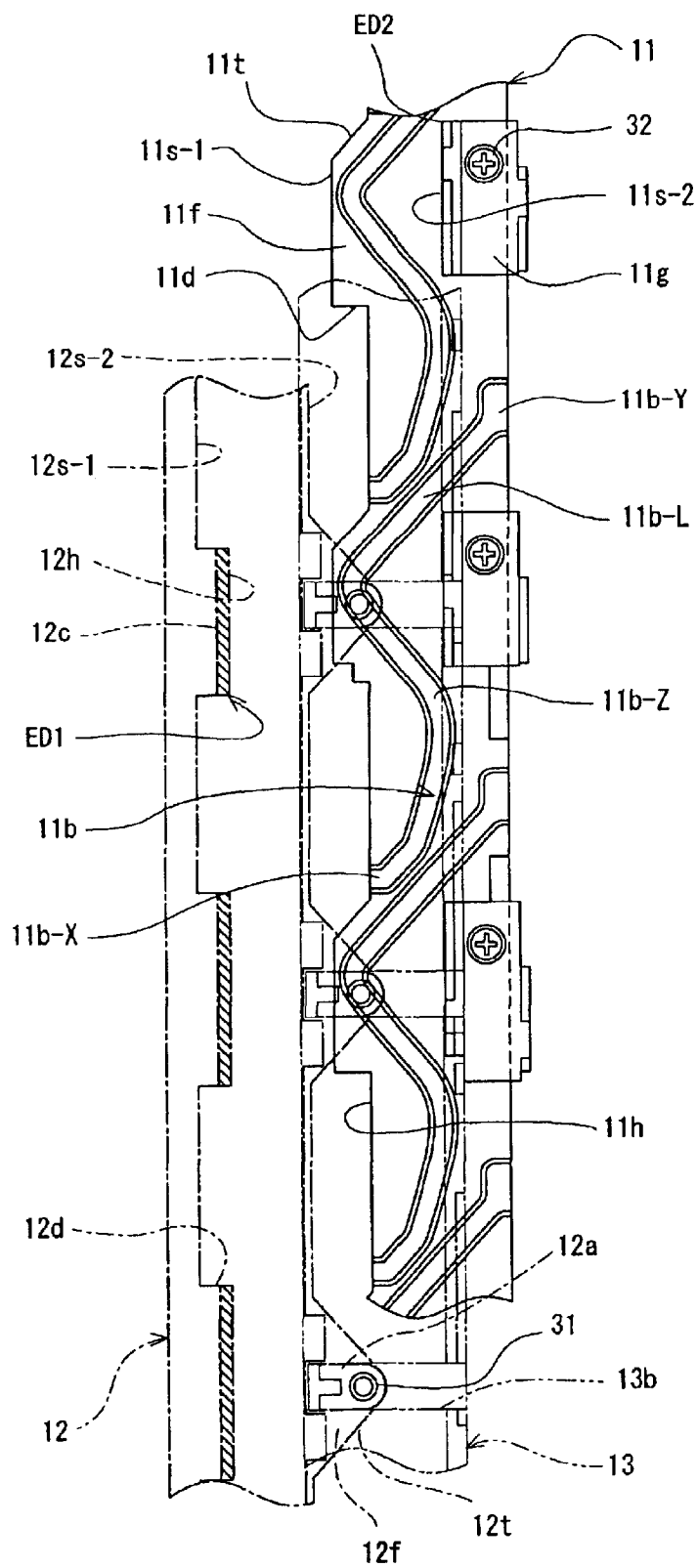
FIG. 92 is a view similar to that of FIG. 90, showing the positional relationship between the first external barrel and the cam ring at the wide-angle extremity of the zoom lens.
Figure 93:
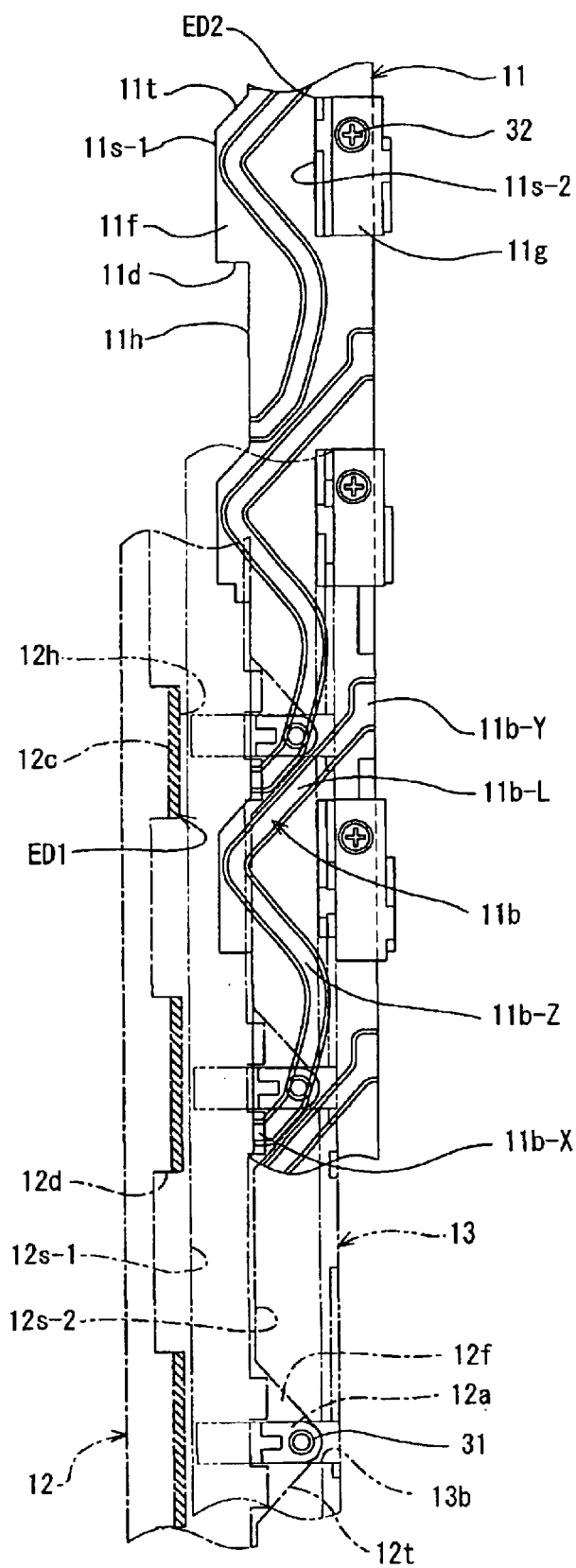
FIG. 93 is a view similar to that of FIG. 90, showing the positional relationship between the first external barrel and the cam ring at the telephoto extremity of the zoom lens.
Figure 94:
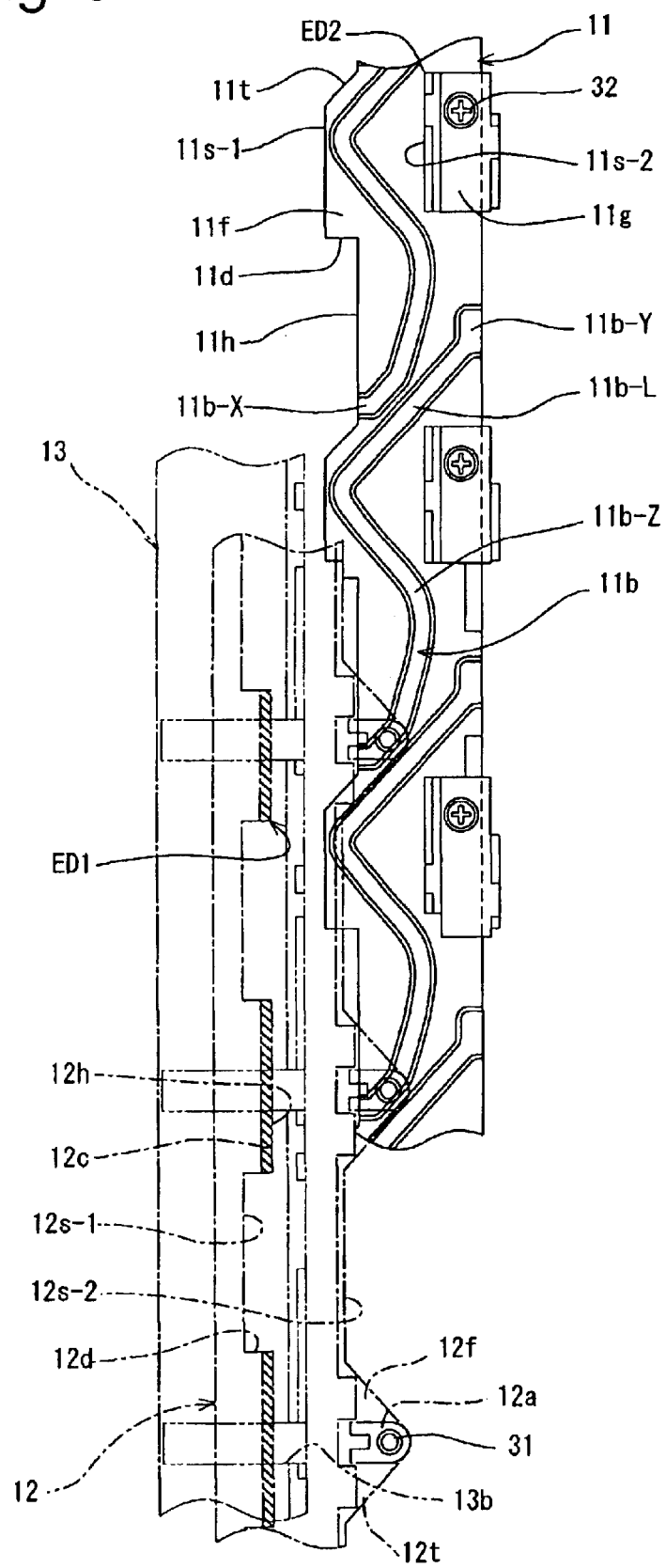
FIG. 94 is a view similar to that of FIG. 90, showing a positional relationship between the first external barrel and the cam ring.
Figure 96:
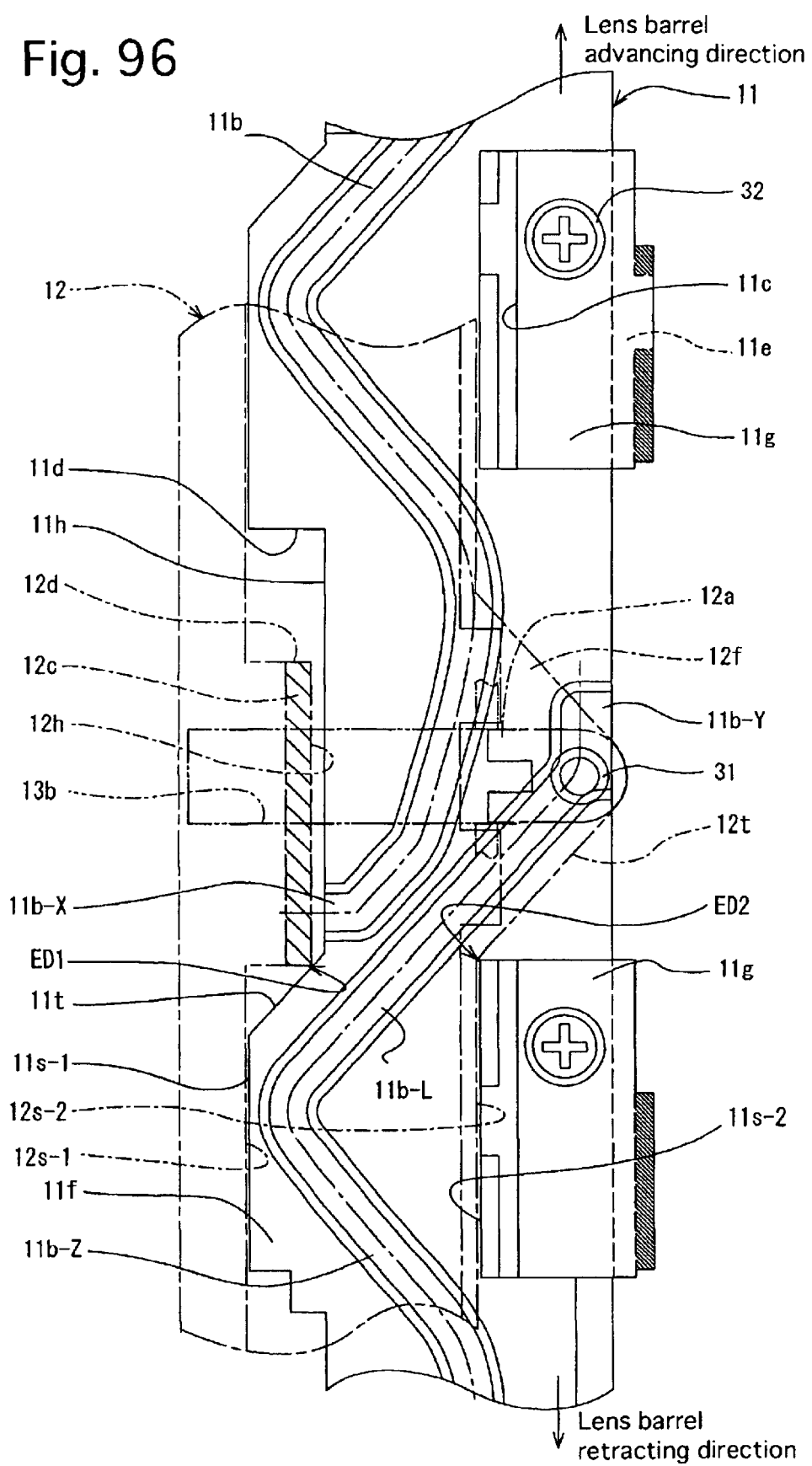
FIG. 96 is a magnified view of a part of the drawing shown in FIG. 91.
Figure 97:
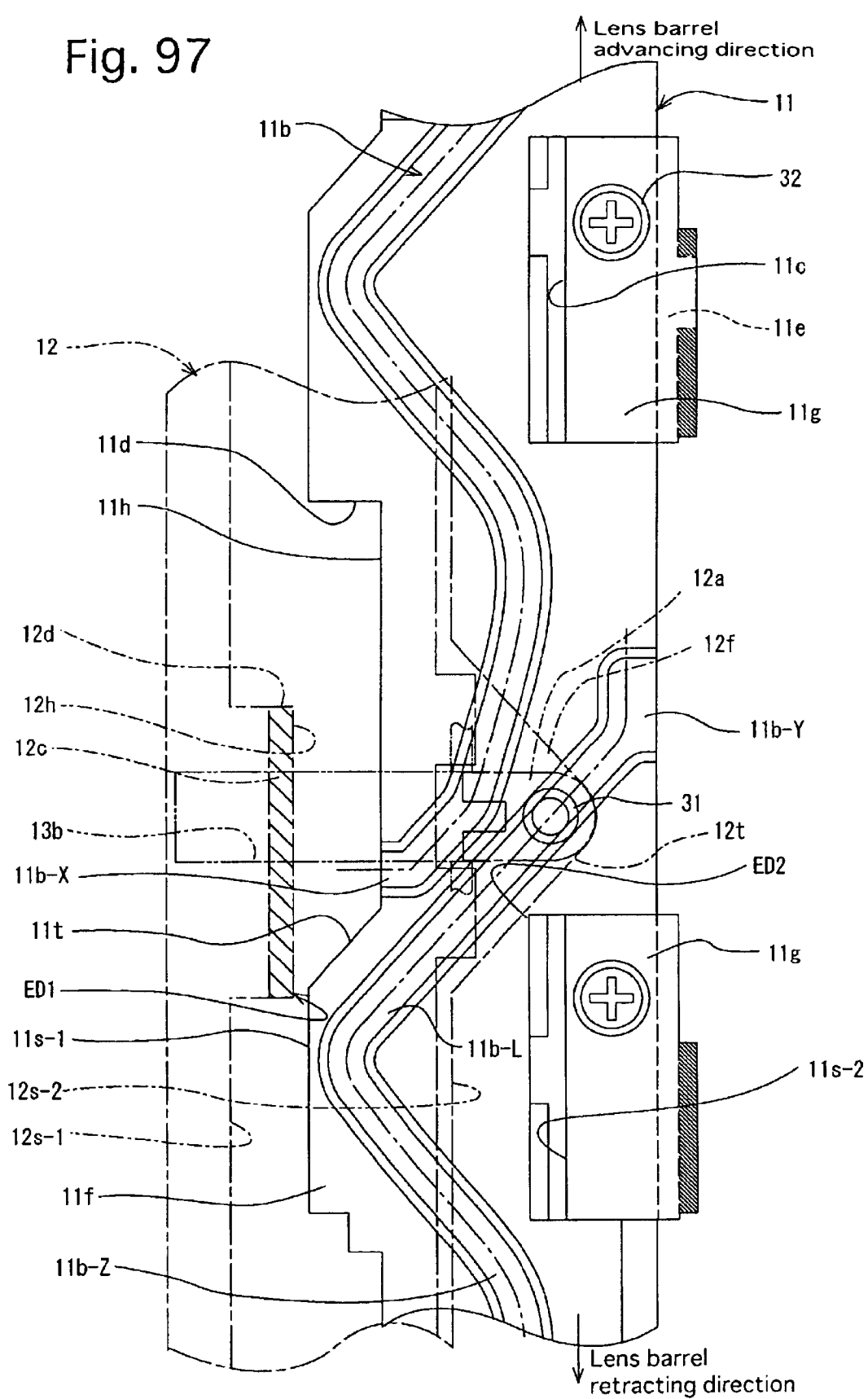
FIG. 97 is view similar to those of FIGS. 95 and 96, showing a state where each cam follower of the first external barrel are positioned in the inclined lead section of the associated outer cam groove of the cam ring.
Figure 98:
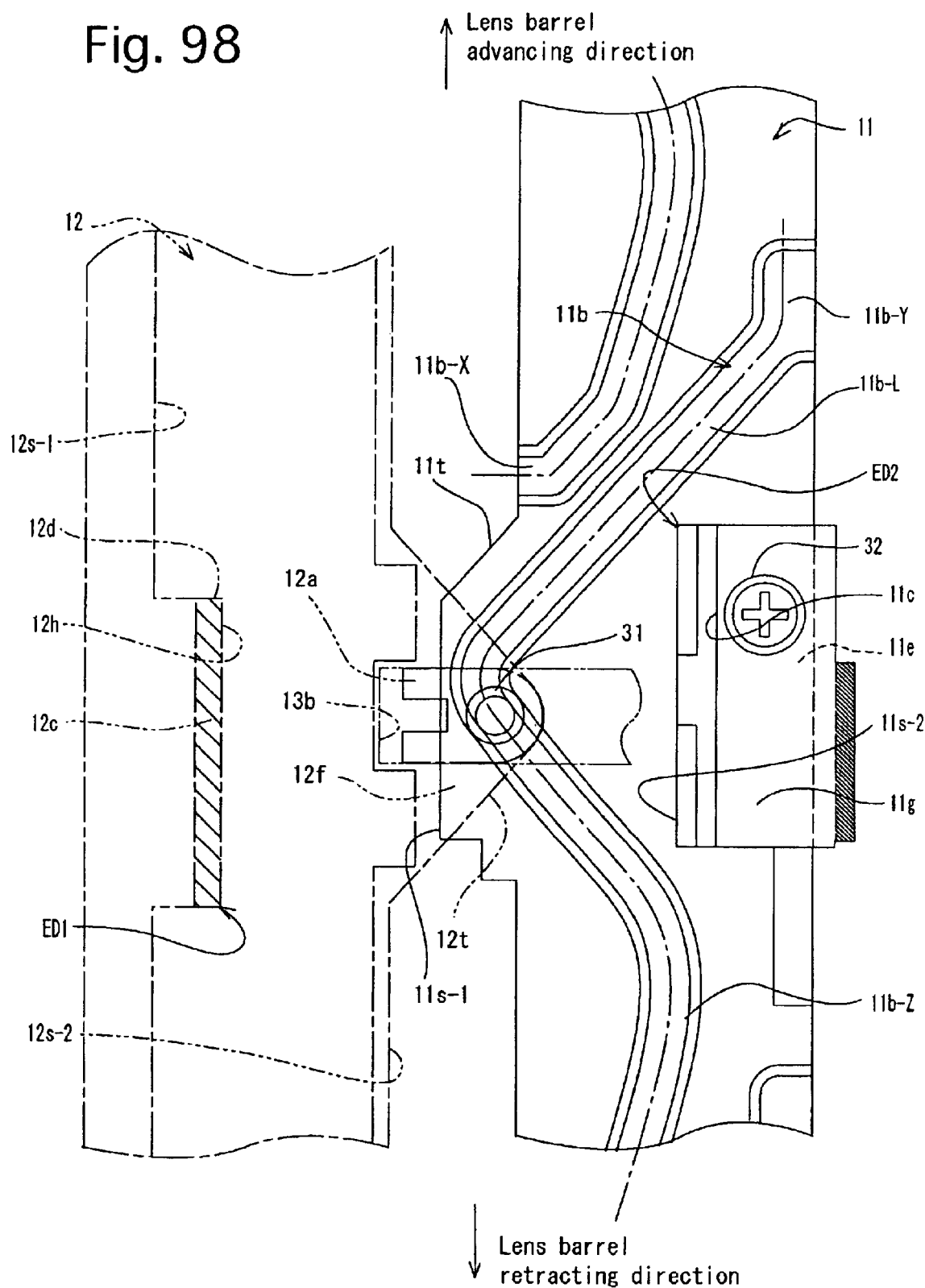
FIG. 98 is a magnified view of a part of the drawing shown in FIG. 92.
Figure 99:
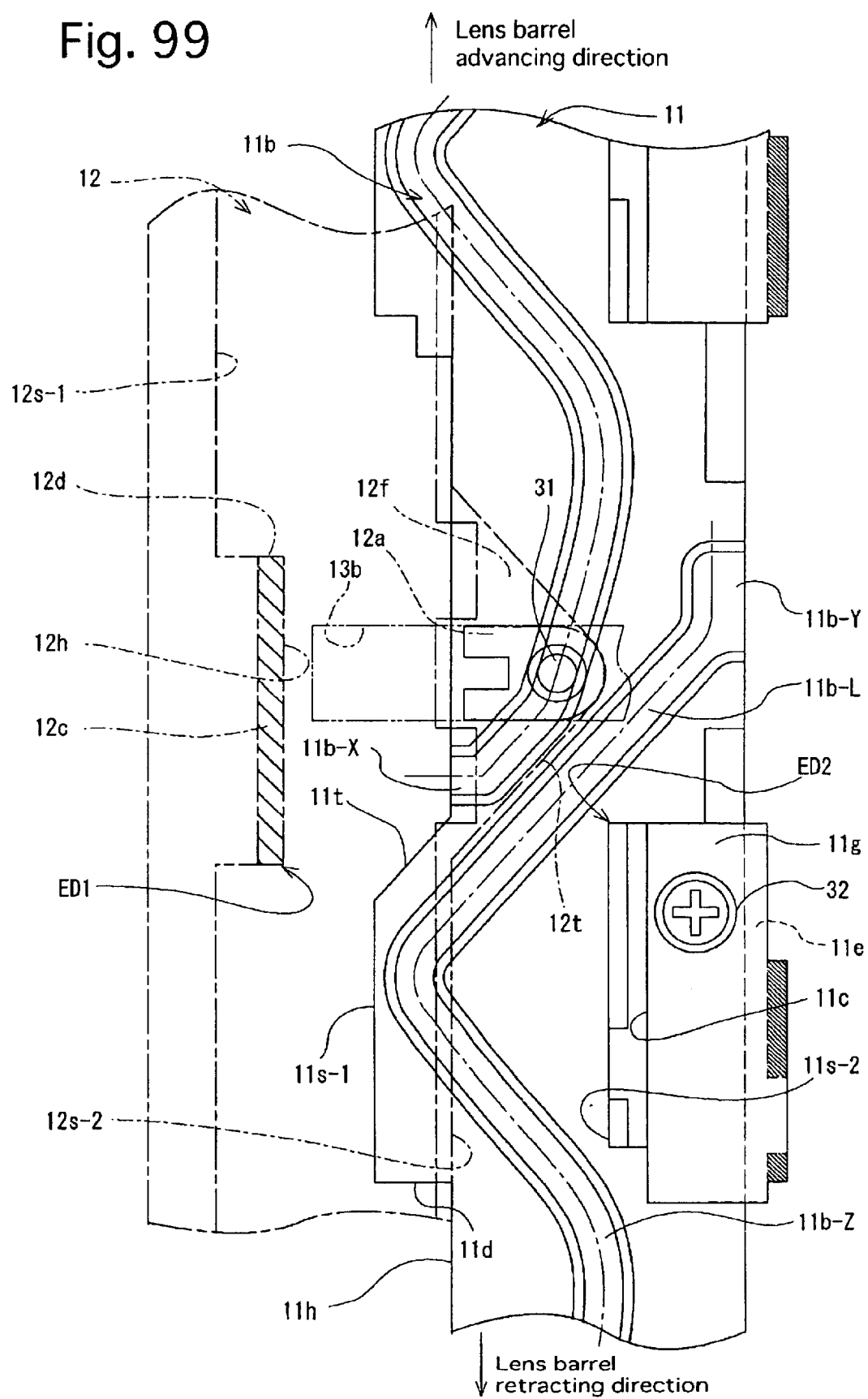
FIG. 99 is a magnified view of a part of the drawing shown in FIG. 93.
Figure 100:
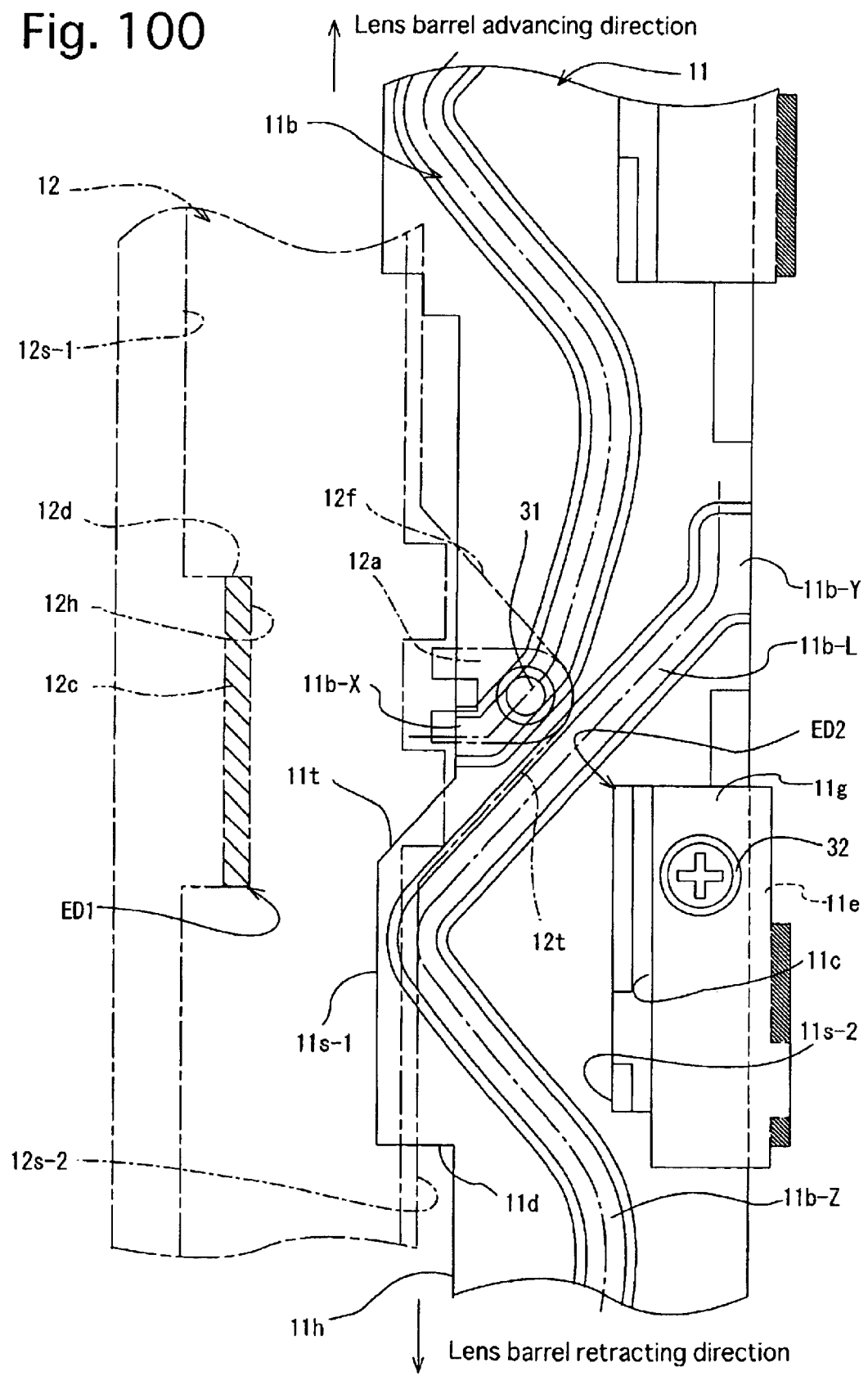
FIG. 100 is a magnified view of a part of the drawing shown in FIG. 94.

As shown in FIG. 16, each outer cam groove 11*b*, which is formed on an outer peripheral surface of the cam ring 11, is provided at one end (front end) thereof with a front end opening section 11*b*-X which is open on a front end surface of the cam ring 11, and is provided at the other end (rear end) thereof with a rear end opening section 11*b*-Y which is open on a rear end surface of the cam ring 11. Accordingly, the opposite ends of each outer cam groove 11*b* are respectively formed as open ends. Each outer cam groove 11*b* is provided between the front end opening section 11*b*-X and the rear end opening section 11*b*-Y with an inclined lead section 11*b*-L which extends linearly obliquely from the rear end opening section 11*b*-Y toward the front of the optical axis direction, and a curved section 11*b*-Z which is positioned between the inclined lead section 11*b*-L and the front end opening section 11*b*-X to be curved rearward (downward as viewed in FIG. 16) in the optical axis direction. A zooming section for changing the focal length of the zoom lens 71 before picture taking is included in the curved section 11*b*-Z of each outer cam groove 11*b*. AS shown in FIGS. 94 through 100, the set of three cam followers 31 can be inserted into and removed from the set of three outer cam grooves 11*b* through the front end opening sections 11*b*-X thereof, respectively. When the zoom lens 71 is set at the telephoto extremity, each cam follower 31 is positioned in the associated curved section 11*b*-Z in the vicinity of the front end opening section 11*b*-X as shown in FIGS. 93 and 99. When the zoom lens 71 is set at the wide-angle extremity, each cam follower 31 is positioned in the associated curved section 11*b*-Z in the vicinity of inclined lead section 11*b*-L as shown in FIGS. 92 and 98.

Figure 90:
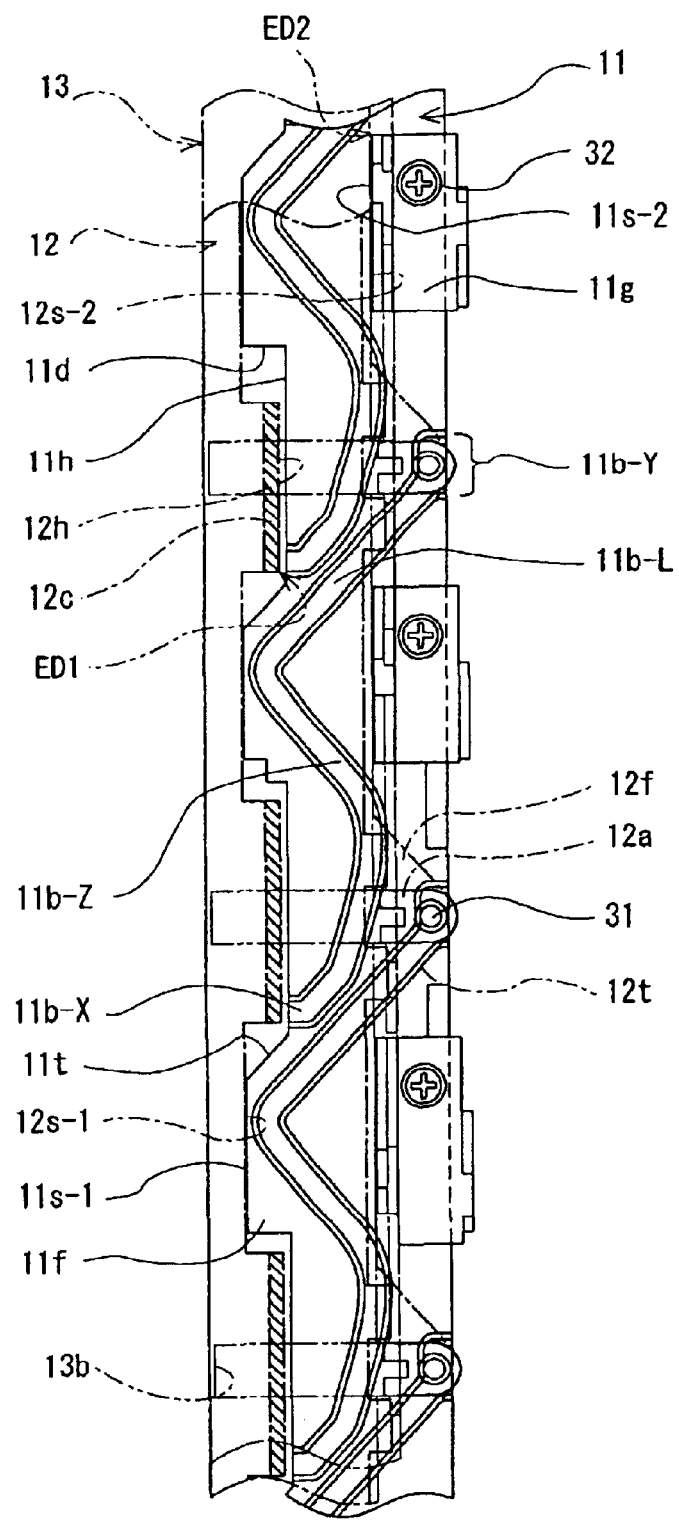
FIG. 90 is a developed view of the first external barrel and the cam ring in relation to a set of cam followers of the first external barrel, showing the positional relationship between the first external barrel and the cam ring in the retracted state of the zoom lens.
Figure 95:
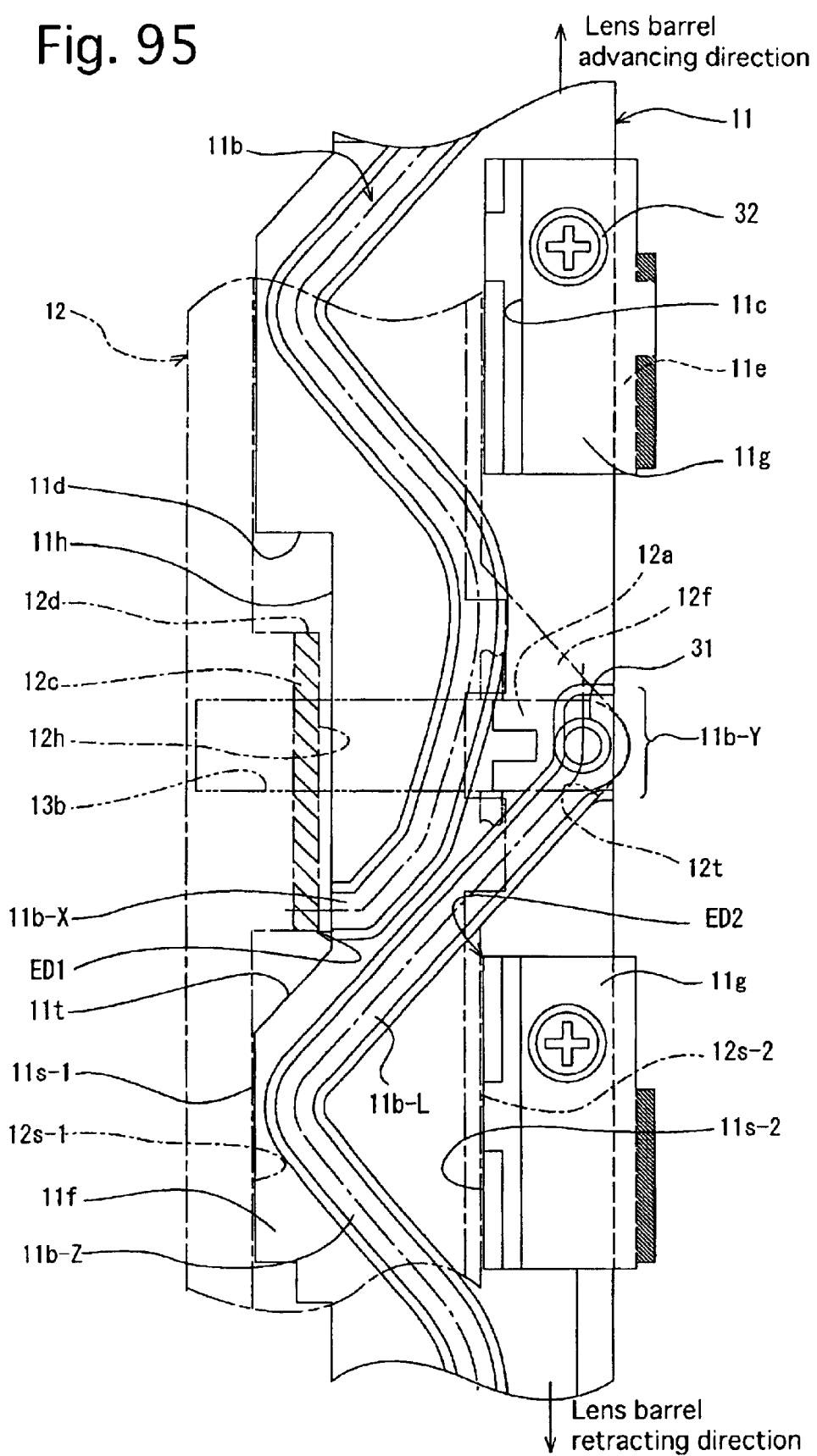
FIG. 95 is a magnified view of a part of the drawing shown in FIG. 90.

In the state shown in FIGS. 90 and 95 in which the zoom lens 71 is in the retracted state, each cam follower 31 is in the associated rear end opening section 11*b*-Y. The width of the rear end opening section 11*b*-Y of each outer cam groove 11*b* is greater than the width of the inclined lead section 11*b*-L and the width of the curved section 11*b*-Z in a circumferential direction of the cam ring 11 so that each cam follower 31 is allowed to move in a circumferential direction of the cam ring 11 to some extent in the associated rear end opening section 11*b*-Y. Although the rear end opening section 11*b*-Y of each outer cam groove 11*b* is open at the rear of the cam ring 11, the set of three cam followers 31 do not come off the set of three outer cam grooves 11*b* through the three rear end opening sections 11*b*-Y, respectively, because the cam ring 11 is provided with at least one stop portion which determines a rear limit for the axial movement of the first external barrel 12 with respect to the cam ring 11.

Figure 21:
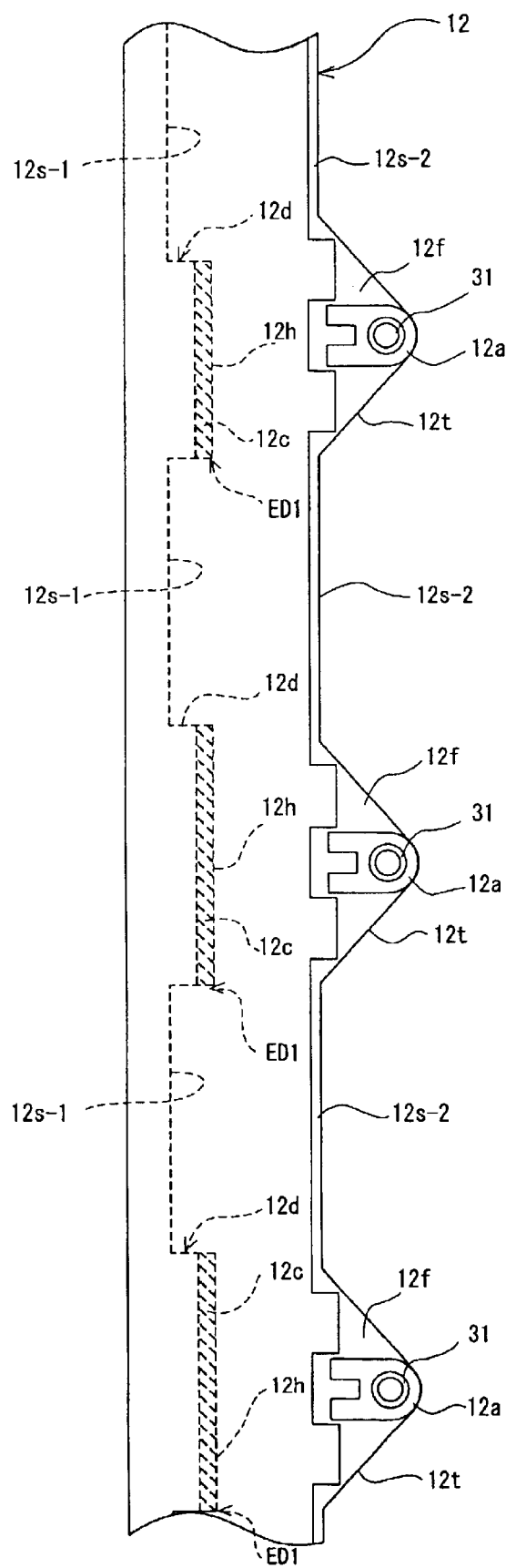
FIG. 21 is a developed view of a first external barrel shown in FIG. 1.

More specifically, the cam ring 11 is provided, at the front end thereof at different circumferential positions, with a set of three front projecting portions 11*f* which project forward in the optical axis direction as shown in FIG. 16. The aforementioned set of three external protuberances 11*g*, which are formed on the cam ring 11 to project radially outwards, are formed behind the set of three front projecting portions 11*f* in the optical axis direction, respectively. Each external protuberance 11*g* is provided with a corresponding section of the discontinuous circumferential groove 11*c*. The set of three roller followers 32 are fixed onto the set of three external protuberances 11*g* by the three set screws 32*a*, respectively. The set of three front projecting portions 11*f* are provided at the front ends thereof with a set of three front stop surfaces 11*s*-1, respectively, which lie in a plane orthogonal to the photographing optical axis Z1. The set of three external protuberances 11*g* are provided at the front ends thereof with a set of three rear stop surfaces 11*s*-2 which lie in a plane orthogonal to the photographing optical axis Z1. On the other hand, as shown in FIG. 21, the first external barrel 12 is provided on an inner peripheral surface thereof with a set of three protuberances, and a set of three front stop surfaces 12*s*-1 are provided at the rear end surface of the protuberances to correspond (oppose) to the set of three front stop surfaces 11*s*-1 so that the set of three front stop surfaces 12*s*-1 can come into contact with the set of three front stop surfaces 11*s*-1, respectively. The first external barrel 12 is provided at the rear end thereof with a set of three rear stop surfaces 12s-2 to correspond to the set of three rear stop surfaces 11s-2 so that the set of three rear stop surfaces 12s-2 can come into contact with the set of three rear stop surfaces 11s-2, respectively. Each front stop surface 12s-1 and each rear stop surface 12s-2 are parallel to each front stop surface 11s-1 and each rear stop surface 11s-2, respectively. The space between the set of three front stop surfaces 11s-1 and the set of three rear stop surfaces 11s-2 is the same as the space between the set of three front stop surfaces 12s-1 and the set of three rear stop surfaces 12s-2.

When the zoom lens 71 is in the retracted state, each front stop surface 12s-1 comes very close to the associated front stop surface 11s-1 while each rear stop surface 12s-2 comes very close to the associated rear stop surface 11s-2 so that the first external barrel 12 does not further move rearward beyond the position thereof shown in FIGS. 90 and 95. In the lens barrel retracting operation of the zoom lens 71, the first external barrel 12 stops moving rearward immediately before each front stop surface 12s-1 and each rear stop surface 12s-2 comes into contact with the associated front stop surface 11s-1 and the associated rear stop surface 11s-2, respectively, because the first external barrel 12 stops being driven in the optical axis direction by the cam ring 11 via the set of three cam followers 31 at the time when the set of three cam followers 31 respectively enter the rear end opening sections 11b-Y of the set of three outer cam grooves 11b due to a wide circumferential width of each rear end opening section 11b-Y. The space between the set of three front stop surfaces 11s-1 and the set of three front stop surfaces 12s-1 in the retracted state of the zoom lens 71 is predetermined at approximately 0.1 mm. Likewise, the space between the set of three rear stop surfaces 11s-2 and the set of three rear stop surfaces 12s-2 in the retracted state of the zoom lens 71 is also predetermined at approximately 0.1 mm. However, in an alternative embodiment, the first external barrel 12 can be allowed to retract by inertia so that the front stop surfaces 11s-1 and 12s-1 and the rear stop surfaces 11s-2 and 12s-2 contact each other, respectively.

The first external barrel 12 is provided on an inner peripheral surface thereof with an inner flange 12c which projects radially inwards. The set of three front stop surfaces 12s-1 are positioned in front of the inner flange 12c in the optical axis direction. The inner flange 12c of the first external barrel 12 is provided with a set of three radial recesses 12d through which the set of three front projecting portions 11f can pass the inner flange 12c in the optical axis direction, respectively. When the set of three front stop surfaces 11s-1 approach the set of three front stop surfaces 12s-1, the set of three front projecting portions 11f passes the inner flange 12c through the set of three radial recesses 12d.

Although each of the cam ring 11 and the first external barrel 12 is provided, at front and rear portions thereof in the optical axis direction, with a set of front stop surfaces (11s-1 or 12s-1) and a set of rear stop surfaces (11s-2 or 12s-2) in the present embodiment of the zoom lens, each of the cam ring 11 and the first external barrel 12 can be provided with only one of the set of front stop surfaces or the set of rear stop surfaces to determine the rear limit for the axial movement of the first external barrel 12 with respect to the cam ring 11. Conversely, each of the cam ring 11 and the first external barrel 12 can be provided with one or more additional sets of stop surfaces. For instance, in addition to the front stop surfaces 11s-1 and 12s-1 and the rear stop surfaces 11s-2 and 12s-2, three front end surfaces 11h each of which are formed between two adjacent front projecting portions 11f can be made to be capable of coming into contact with a rear surface 12h of the inner flange 12c to determine the rear limit for the axial movement of the first external barrel 12 with respect to the cam ring 11. Note that the front projecting portions 11f do not contact with the rear surface 12h, in the illustrated embodiment.

In each of the three outer cam grooves 11b, the entire section thereof except for the front end opening section 11b-X serving as a lens-barrel assembling/disassembling section serves as a lens-barrel operating section consisting of a zooming section and a lens-barrel retracting section. Namely, a specific section of each of the three outer cam grooves 11b which extends from the position of the associated cam follower 31 in the outer cam groove 11b shown in FIGS. 90 and 95 (i.e., the rear end opening section 11b-Y), where the zoom lens 71 is in the retracted state, to that shown in FIGS. 93 and 99, where the zoom lens 71 is set at the telephoto extremity serves as a lens-barrel operating section consisting of a zooming section and a lens-barrel retracting section. In the present embodiment of the zoom lens, the rear end opening section 11b-Y of each outer cam groove 11b is formed as an opening which is open at the rear of the cam ring 11. This structure makes it unnecessary to form any rear end wall having a certain thickness on a portion of the cam ring 11 behind each rear end opening section 11b-Y, thus reducing the length of the cam ring 11 in the optical axis direction. In a conventional cam ring having cam grooves thereon, at least the terminal end of an operating section of each cam groove (one end of each cam groove if the other end is an open end for the insertion of the associated cam groove in the cam groove) has to be formed as a closed end which requires the cam ring to have a end wall having a certain thickness to close the terminal end of the operating section of each cam groove. This kind of end wall does not have to be formed on the cam ring 11 of the present embodiment of the zoom lens, which is advantageous to downsize the cam ring 11.

The reason why the rear end of each outer cam groove 11b is successfully formed as an open end such as the rear end opening section 11b-Y is that the rear limit for the axial movement of the first external barrel 12 with respect to the cam ring 11 is determined by the front stop surfaces (11s-1 and 12s-1) and the rear stop surfaces (11s-2 and 12s-2) which are provided independent of the set of three outer cam grooves 11b and the set of three cam followers 31. Providing the cam ring 11 and the first external barrel 12 with such stop surfaces as the front and rear stop surfaces (11s-1, 12s-1, 11s-2 and 12s-2) that operate independently of the set of three outer cam grooves 11b and the set of three cam followers 31, eliminates a possibility of each cam follower 31 becoming incapable of being re-engaged in the associated outer cam groove 11b through the rear end opening section 11b-Y thereof if each cam follower 31 should be disengaged therefrom.

When the set of three cam followers 31 are respectively positioned in the rear end opening sections 11b-Y of the set of three outer cam grooves 11b, the optical elements of the zoom lens 71 are not required to have a high degree of positioning accuracy because the zoom lens 71 is in the retracted state as shown in FIG. 10. Due to this reason, there is no substantial problem even if each rear end opening section 11b-Y has a wide circumferential width so that each cam follower 31 is loosely engaged in the associated rear end opening section 11b-Y. Conversely, the lens-barrel retracting section of the lens-barrel operating section of each outer cam groove 11b is successfully formed as an open end such as the rear end opening section 11b-Y because the lens-barrel retracting section of the lens-barrel operating section of each outer cam groove 11*b*, in which the associated cam follower 31 is allowed to be loosely engaged, is formed at the terminal end of the outer cam groove 11*b* and further because the entire cam contour of each outer cam groove 11*b* is determined so that the terminal end thereof is positioned at the rearmost position of the outer cam groove 11*b* in the optical axis direction.

To make each cam follower 31 move from the rear end opening section 11*b*-Y, in which the cam follower 31 is loosely engaged, to the inclined lead section 11*b*-L of the associated outer cam groove 11*b* with reliability, the cam ring 11 is provided at different circumferential positions with a set of three beveled lead surfaces 11*t* while the first external barrel 12 is provided at different circumferential positions with a set of three beveled lead surfaces 12*t*. The set of three beveled lead surfaces 11*t* are formed to adjoin the set of three front stop surfaces 11*s*-1 on the set of three front projecting portions 11*f* so that the set of three beveled lead surfaces 11*t* and the set of three front stop surfaces 11*s*-1 become a set of three continuous surfaces, respectively. The first external barrel 12 is provided at different circumferential positions with a set of three rear end protrusions 12*f* each having a substantially isosceles triangle shape. The set of three engaging protrusions 12*a* are formed on the set of three rear end protrusions 12*f*, respectively. One of the two equal sides of each rear end protrusion 12*f* is formed as one of the three beveled lead surfaces 12*t*. As shown in FIGS. 95 through 100, each beveled lead surface 11*t* and each beveled lead surface 12*t* extend parallel to the inclined lead section 11*b*-L.

Figure 91:
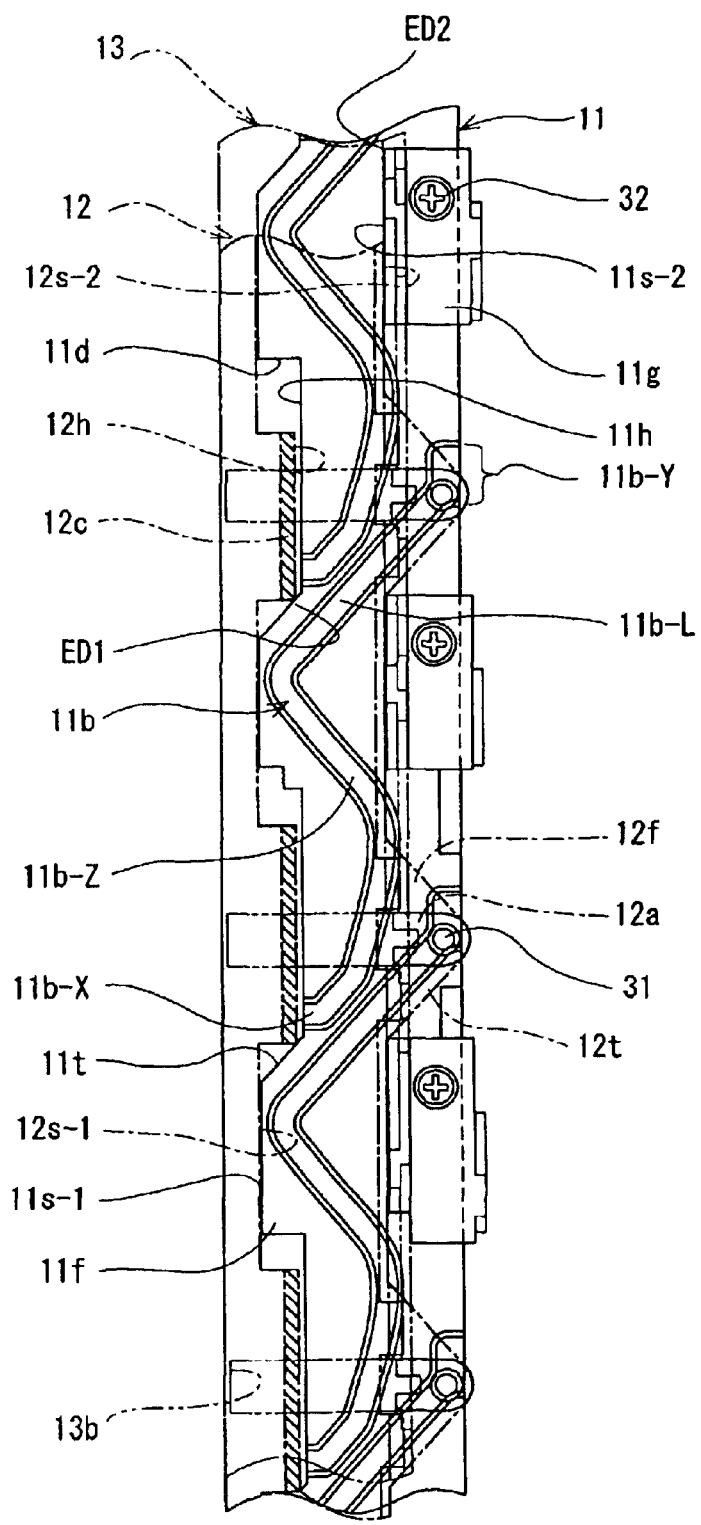
FIG. 91 is a view similar to that of FIG. 90, showing a state where each cam follower of the first external barrel is positioned at the insertion end of the inclined lead section of the associated outer cam groove of a set of outer cam grooves of the cam ring by a rotation of the cam ring in a lens barrel advancing direction thereof.

In the state shown in FIGS. 90 and 95 in which the zoom lens 71 is in the retracted state, an edge ED1 of each of the three inner flanges 12*c* is positioned to be opposed to the adjacent beveled lead surface 11*t* in a circumferential direction, and also an edge ED2 of each of the three external protuberances 11*g* is positioned to be opposed to the adjacent beveled lead surface 12*t* in a circumferential direction. In addition, in the same state shown in FIGS. 90 and 95, the edge ED1 of each inner flange 12*c* is slightly apart from the adjacent beveled lead surface 11*t* while the edge ED2 of each external protuberance 11*g* is slightly apart from the adjacent beveled lead surface 12*t*. In this state shown in FIGS. 90 and 95, a rotation of the cam ring 11 in the lens barrel advancing direction (upwards as viewed in FIGS. 91 and 96) causes each beveled lead surface 11*t* to come into contact with the edge ED1 of the adjacent inner flange 12*c*, and at the same time causes each beveled lead surface 12*t* to come into contact with the edge ED2 of the associated external protuberance 11*g* as shown in FIGS. 91 and 96. Accordingly, at an initial stage of rotation of the cam ring 11 from the state shown in FIG. 95, in which the three edges ED1 and the three edges ED2 are respectively apart from the three beveled lead surfaces 11*t* and the three beveled lead surfaces 12*t*, to the state shown in FIG. 96, in which the three edges ED1 and the three edges ED2 are respectively in contact with the three beveled lead surfaces 11*t* and the three beveled lead surfaces 12*t*, each cam follower 31 moves solely within the associated rear end opening section 11*b*-Y in a circumferential direction of the cam ring 11, so that the first external barrel 12 is not moved in the optical axis direction with respect to the cam ring 11 by rotation of the cam ring 11.

In the state shown in FIGS. 91 and 96, in which the three edges ED1 and the three edges ED2 are respectively in contact with the three beveled lead surfaces 11*t* and the three beveled lead surfaces 12*t*, each cam follower 31 is positioned at the insertion end of the inclined lead section 11*b*-L of the associated outer cam groove 11*b*. A further rotation of the cam ring 11 causes each edge ED1 to slide on the associated beveled lead surface 11*t* and at the same time causes each edge ED2 to slide on the associated beveled lead surface 12*t* so that the first external barrel 12 is pushed forward with respect to the cam ring 11 by the three beveled lead surfaces 11*t* in accordance with the sliding movements of the three edges ED1 and the three edges ED2 on the three beveled lead surfaces 11*t* and the three beveled lead surfaces 12*t*, respectively. Since each beveled lead surface 11*t* and each beveled lead surface 12*t* extend parallel to the inclined lead section 11*b*-L, the force acting on the first external barrel 12 by the rotation of the cam ring 11 via the three beveled lead surfaces 11*t* causes each cam follower 31 to move into the inclined lead section 11*b*-L of the associated outer cam groove 11*b* from the rear end opening section 11*b*-Y thereof. After each cam follower 31 completely enters the inclined lead section 11*b*-L of the associated outer cam groove 11*b* as shown in FIG. 97, each beveled lead surface 11*t* and each beveled lead surface 12*t* are disengaged from the associated edge ED1 and the associated edge ED2, respectively, and accordingly, the first external barrel 12 is guided linearly in the optical axis direction due only to the engagement of the set of three cam followers 31 with the set of three outer cam grooves 11*b*, respectively.

Accordingly, in the lens barrel advancing operation of the zoom lens 71 which commences from the retracted state shown in FIG. 10, providing the cam ring 11 and the first external barrel 12 with the three beveled lead surfaces 11*t* and the three beveled lead surfaces 12*t*, whose functions are similar to those of the three inclined lead section 11*b*-L, and further providing the first external barrel 12 with the three edge ED2 and the three ED1, whose functions are similar to those of the three cam followers 31, respectively, make it possible to have each cam follower 31 enter the inclined lead section 11*b*-L of the associated outer cam groove 11*b* properly to move therein toward the associated curved section 11*b*-Z even from a state as shown in FIG. 95 where each cam follower 31 is loosely engaged in the associated rear end opening section 11*b*-Y. This prevents the zoom lens 71 from malfunctioning.

Although each of the cam ring 11 and the first external barrel 12 is provided with a set of three beveled lead surfaces (11*t* or 12*t*) in the present embodiment of the zoom lens, only one of the cam ring 11 and the first external barrel 12 can be provided with a set of three beveled lead surfaces (11*t* or 12*t*), or each of the cam ring 11 and the first external barrel 12 can be provided with more than one set of three beveled lead surfaces.

Figure 101:
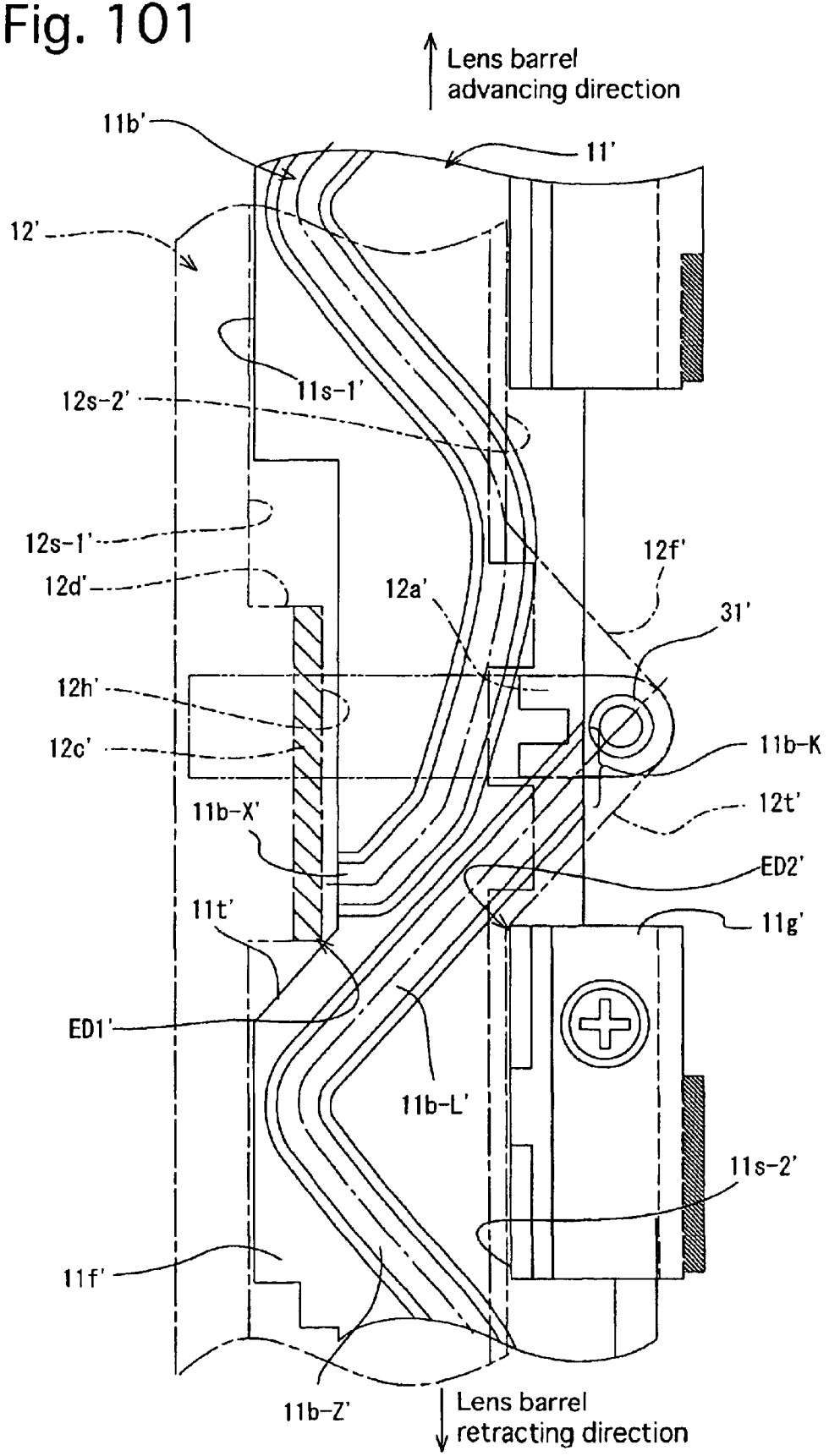
FIG. 101 is a view similar to that of FIG. 95, showing another embodiment of the structure of the set of outer cam grooves of the cam ring, showing the positional relationship between the first external barrel and the cam ring in the retracted state of the zoom lens.

FIG. 101 shows another embodiment of the structure shown in FIG. 95, in which the zoom lens 71 is in the retracted state. Elements shown in FIG. 101 which are similar to those shown in FIG. 95 are designated by the same reference numerals each of which the mark (') is appended to.

Each outer cam groove 11*b*' is provided at the rear end of each inclined lead section 11*b*-L' with a rear end opening 11*b*-K instead of the rear end opening section 11*b*-Y of the cam ring 11 shown in FIG. 95. Unlike each rear end opening section 11*b*-Y, each rear end opening 11*b*-K is formed as a simple end opening of the associated outer cam groove 11*b*. Performing the lens barrel retracting operation in a state where the zoom lens is set at the wide-angle extremity causes each cam follower 31' to move rearward (rightward as viewed in FIG. 101) in the associated inclined lead section 11*b*-L', and subsequently causes each cam follower 31' to come out of the associated outer cam groove 11*b*' through the rear end opening 11b-K thereof upon the zoom lens reaching the retracted position thereof. If each cam follower 31' comes out of the associated outer cam groove 11b' through the rear end opening 11b-K thereof, the first external barrel 12' stops being driven by the cam ring 11' via the set of three cam followers 31' and therefore stops moving rearward. At this time, the first external barrel 12' is prevented from further moving rearward because each front stop surface 12s-1' and each rear stop surface 12s-2' are positioned very close to the associated front stop surface 11s-1' and the associated rear stop surface 11s-2', respectively. Therefore, the first external barrel 12' is prevented from moving rearward overly even if each cam follower 31' comes out of the associated outer cam groove 11b' through the rear end opening 11b-K thereof. In this embodiment shown in FIG. 101, similar to the embodiment shown in FIG. 95, the space between the set of three front stop surfaces 11s-1' and the set of three front stop surfaces 12s-1' in the retracted state of the zoom lens is desirably at approximately 0.1 mm. Likewise, the space between the set of three rear stop surfaces 11s-2' and the set of three rear stop surfaces 12s-2' in the retracted state of the zoom lens is desirably at approximately 0.1 mm. However, in an alternative embodiment, the first external barrel 12' can be allowed to retract by inertia so that the front stop surfaces 11s-1' and 12s-1' and the rear stop surfaces 11s-2' and 12s-2' contact each other, respectively.

According to the structure shown in FIG. 101 in which each cam follower 31' comes out of the associated outer cam groove 11b' in the retracted state of the zoom lens 71, it is possible to further downsize the cam ring 11' because each outer cam groove 11b' does not have to be provided with any accommodation section, which corresponds to each rear end opening section 11b-Y of the cam ring 11, for accommodating the associated cam follower therein when the zoom lens is in the retracted position.

In the retracted state shown in FIG. 101, the edge ED1' of each of the three inner flanges 12c' is in contact with the beveled lead surface 11t' of the associated front projecting portions 11f' while the edge ED2' of each of the three external protuberances 11g' is in contact with the beveled lead surface 12t' of the associated rear projecting portions 12f'. Each beveled lead surface 11t' and each beveled lead surface 12t' extend parallel to the inclined lead section 11b-L'. Due to this structure, rotating the cam ring 11' in the retracted state shown in FIG. 101 causes the first external barrel 12' to be pushed forward with respect to the cam ring 11', and subsequently causes each cam follower 31' which is currently positioned outside the associated outer cam groove 11b' to move into the inclined lead section 11b-L' of the associated outer cam groove 11b' from the rear end opening 11b-K thereof. Thereafter, a further rotation of the cam ring 11' in the lens barrel advancing direction causes each cam follower 31' to move into the associated curved section 11b-Z' in the associated outer cam groove 11b'. Thereafter, each cam follower 31' moves in the associated outer cam groove 11b' to perform a zooming operation in accordance with rotation of the cam ring 11'. Moving each cam follower 31' to the front end opening sections 11b-X of the associated outer cam groove 11b makes it possible to remove the first external barrel 12' from the cam ring 11'.

As can be understood from the foregoing, also in the embodiment shown in FIG. 101, the rear limit for the axial movement of the first external barrel 12' with respect to the cam ring 11' can be surely determined, while each cam follower 31' can properly enter the inclined lead section 11b-L' of the associated outer cam groove 11b' even though each cam follower 31' comes out of the associated outer cam groove 11b' through the rear end opening 11b-K thereof when the zoom lens is retracted into the camera body.

The structure of the zoom lens 71 which accommodates the zoom lens 71 in the camera body 72 as shown in FIG. 9 upon a main switch (not shown) of the digital camera 70 being turned OFF, which incorporates the structure retracting the second lens frame 6 (the second lens group LG2) to the radially retracted position, will be hereinafter discussed in detail. In the following descriptions the terms "vertical direction" and "horizontal direction" mean the vertical direction and the horizontal direction as viewed from front or rear of the digital camera 70 such as the vertical direction of FIG. 110 and the horizontal direction of FIG. 111, respectively. In addition, the term "forward/backward direction" corresponds to the optical axis direction (i.e., a direction parallel to the photographing optical axis Z1).

Figure 102:
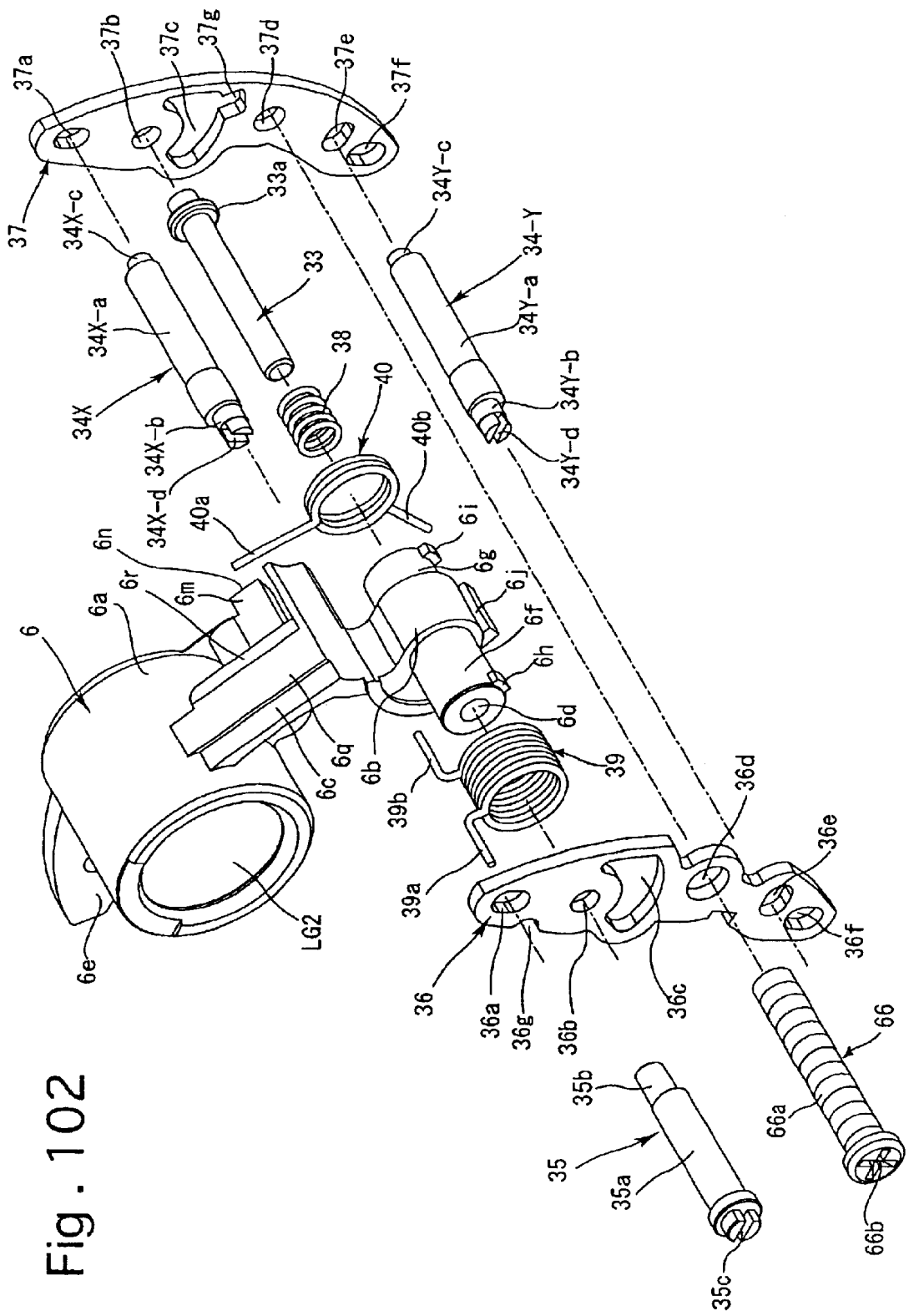
FIG. 102 is an exploded perspective view of a structure of the zoom lens for supporting a second lens frame which holds the second lens group, for retracting the second lens frame to a radially retracted position thereof, and for adjusting the position of the second lens frame.

The second lens group LG2 is supported by the second lens group moving frame 8 via peripheral elements shown in FIG. 102. The second lens frame 6 is provided with a cylindrical lens holder portion 6a, a pivoted cylindrical portion 6b, a swing arm portion 6c and an engaging protrusion 6e. The cylindrical lens holder portion 6a directly holds and supports the second lens group L2. The swing arm portion 6c extends in a radial direction of the cylindrical lens holder portion 6a to connect the cylindrical lens holder portion 6a to the pivoted cylindrical portion 6b. The engaging protrusion 6e is formed on the cylindrical lens holder portion 6a to extend in a direction away from the swing arm portion 6c. The pivoted cylindrical portion 6b is provided with a through hole 6d extending in a direction parallel to the optical axis of the second lens group LG2. The pivoted cylindrical portion 6b is provided at front and rear ends thereof, on front and rear sides of a portion of the pivoted cylindrical portion 6b which is connected to the swing arm portion 6c, with a front spring support portion 6f and a rear spring support portion 6g, respectively. The front spring support portion 6f is provided, on an outer peripheral surface thereof in the vicinity of the front end of the front spring support portion 6f, with a front spring hold projection 6h. The rear spring support portion 6g is provided, on an outer peripheral surface thereof in the vicinity of the rear end of the rear spring support portion 6g, with a rear spring hold projection 6i. The pivoted cylindrical portion 6b is provided on an outer peripheral surface thereof with a position control arm 6j extending in a direction away from the swing arm portion 6c. The position control arm 6j is provided with a first spring engaging hole 6k, and the swing arm portion 6c is provided with a second spring engaging hole 6p (see FIGS. 118 through 120).

The second lens frame 6 is provided with a rear projecting portion 6m which projects rearward in the optical axis direction from the swing arm portion 6c. The rear projecting portion 6m is provided at the rear end thereof with a contacting surface 6n which lies in a plane orthogonal to the optical axis of the second lens group LG2, i.e., to the photographing optical axis Z1. Although a light shield ring 9 is fixed as shown in FIGS. 104, 105, 128 and 129, the contacting surface 6n is positioned behind the second lens group light shield ring in the optical axis direction. Namely, the contacting surface 6n is positioned behind the rearmost position of the second lens group LG2 in the optical axis direction.

The front second lens frame support plate 36 is a vertically-elongated narrow plate having a narrow width in horizontal direction. The front second lens frame support plate 36 is provided with a first vertically-elongated hole 36a, a pivot hole 36b, a cam-bar insertable hole 36c, a screw insertion hole 36d, a horizontally-elongated hole 36e and a second vertically-elongated hole 36f, in this order from top to bottom of the front second lens frame support plate 36. All of these holes 36a through 36f are through holes which penetrate the front second lens frame support plate 36 in the optical axis direction. The front second lens frame support plate 36 is provided on an outer edge thereof in the vicinity of the first vertically-elongated hole 36a with a spring engaging recess 36g.

Similar to the front second lens frame support plate 36, the rear second lens frame support plate 37 is also a vertically-elongated narrow plate having a narrow width in horizontal direction. The rear second lens frame support plate 37 is provided with a first vertically-elongated hole 37a, a pivot hole 37b, a cam-bar insertable hole 37c, a screw hole 37d, a horizontally-elongated hole 37e and a second vertically-elongated hole 37f, in this order from top to bottom of the rear second lens frame support plate 37. All of these holes 37a through 37f are through holes which penetrate through the rear second lens frame support plate 37 in the optical axis direction. The rear second lens frame support plate 37 is provided on an inner edge of the cam-bar insertable hole 37c with a guide key insertable recess 37g. The through holes 36a through 36f of the front second lens frame support plate 36 and the through holes 37a through 37f of the rear second lens frame support plate 37 are aligned in the optical axis direction, respectively.

The set screw 66 is provided with a threaded shaft portion 66a and a head portion fixed to an end of the threaded shaft portion 66. The head portion is provided with a cross-slot 66b into which the tip of a Phillips screwdriver (not shown) serving as an adjusting tool can be inserted. The screw insertion hole 36d of the front second lens frame support plate 36 has a diameter by which the threaded shaft portion 66a of the set screw 66 is insertable. The threaded shaft portion 66a of the set screw 66 can be screwed through the screw hole 37d of the rear second lens frame support plate 37 to fix the front second lens frame support plate 36 and the rear second lens frame support plate 37 to the second lens group moving frame 8.

The zoom lens 71 is provided between the front second lens frame support plate 36 and the rear second lens frame support plate 37 with a first eccentric shaft 34X which extends in the optical axis direction. The first eccentric shaft 34X is provided with a large diameter portion 34X-a, and is provided at front and rear ends of the large diameter portion 34X-a with a front eccentric pin 34X-b and a rear eccentric pin 34X-c which project forward and rearward in the optical axis direction, respectively. The front eccentric pin 34X-b and the rear eccentric pin 34X-c have the common axis eccentric to the axis of the large diameter portion 34X-a. The front eccentric pin 34X-b is provided at the front end thereof with a recess 34X-d into which the tip of a flatblade screwdriver (not shown) serving as an adjusting tool can be inserted.

The zoom lens 71 is provided between the front second lens frame support plate 36 and the rear second lens frame support plate 37 with a second eccentric shaft 34Y which extends in the optical axis direction. The structure of the second eccentric shaft 34Y is the same as the structure of the first eccentric shaft 34X. Namely, the second eccentric shaft 34Y is provided with a large diameter portion 34Y-a, and is provided at front and rear ends of the large diameter portion 34Y-a with a front eccentric pin 34Y-b and a rear eccentric pin 34Y-c which projects forward and rearward in the optical axis direction, respectively. The front eccentric pin 34Y-b and the rear eccentric pin 34Y-c have the common axis eccentric to the axis of the large diameter portion 34Y-a. The front eccentric pin 34Y-b is provided at the front end thereof with a recess 34Y-d into which the tip of a flatblade screwdriver (not shown) serving as an adjusting tool can be inserted.

The bore diameter of a rear end portion of the through hole 6d that penetrates the second lens frame 6 is increased to form a spring-accommodation large diameter hole 6Z (see FIG. 126) so that the compression coil spring 38 is accommodated in the spring-accommodation large diameter hole 6Z. The front torsion coil spring 39 and a rear torsion coil spring 40 are fitted on the front spring support portion 6f and the rear spring support portion 6g, respectively. The front torsion coil spring 39 is provided with a front spring end 39a and a rear spring end 39b, and the rear torsion coil spring 40 is provided with a front stationary spring end 40a and a rear movable spring end 40b.

Figure 113:
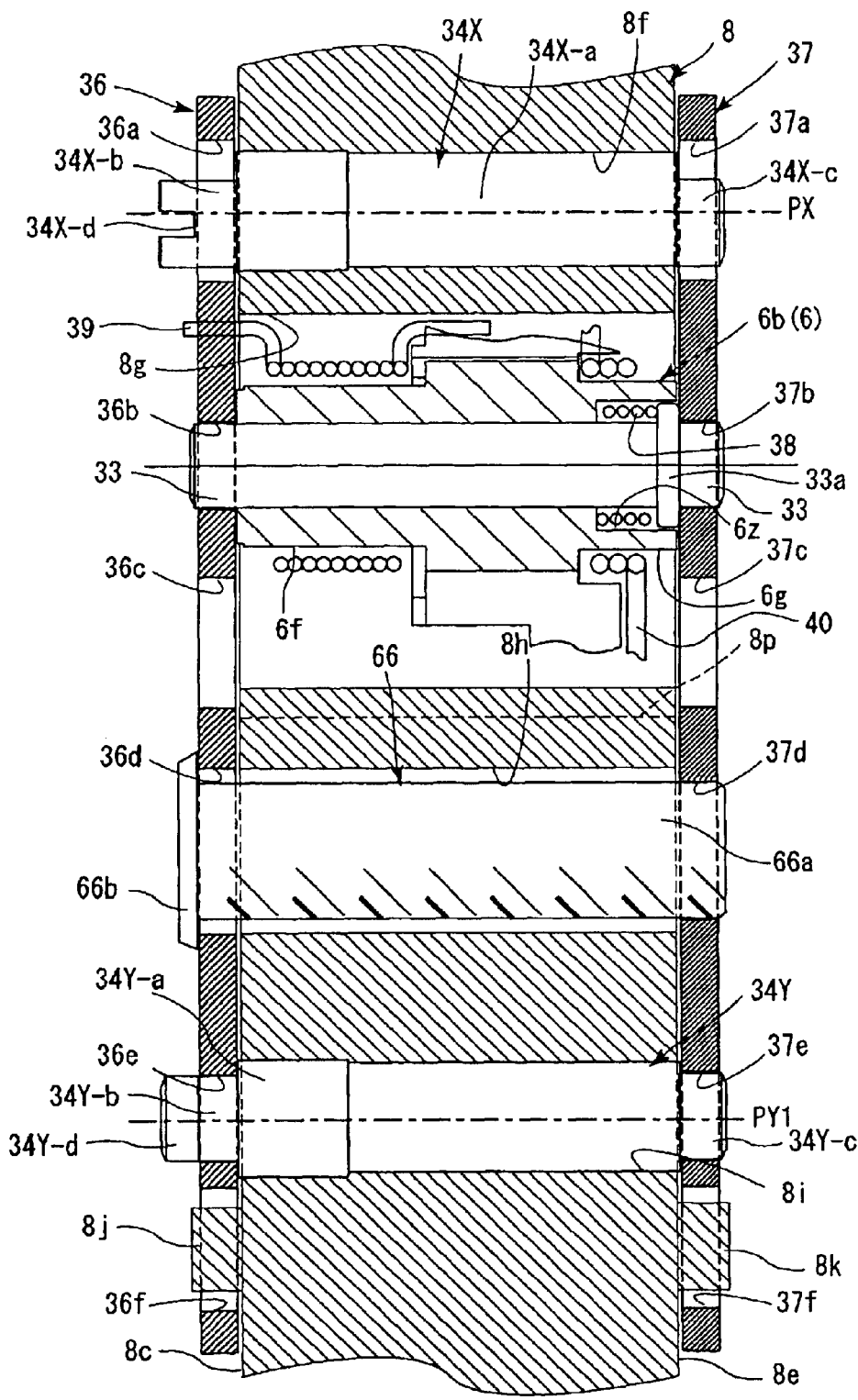
FIG. 113 is a cross sectional view taken along M3—M3 line shown in FIG. 110.

The pivot shaft 33 is fitted in the through hole 6d from the rear end thereof so that the pivoted cylindrical portion 6b of the second lens frame 6 can freely rotate on the pivot shaft 33 with no play in radial directions. The diameters of front and rear ends of the pivot shaft 33 correspond to the pivot hole 36b of the front second lens frame support plate 36 and the pivot hole 37b of the rear second lens frame support plate 37 so that the front and rear ends of the pivot shaft 33 are fitted in the pivot hole 36b and the pivot hole 37b to be supported by the front second lens frame support plate 36 and the rear second lens frame support plate 37, respectively. In a state where the pivot shaft 33 is fitted in the through hole 6d, the axis of the pivot shaft 33 extends parallel to the optical axis of the second lens group LG2. As shown in FIG. 113, the pivot shaft 33 is provided in the vicinity of the rear end thereof with a flange 33a which is inserted in the spring-accommodation large diameter hole 6Z to contact with the rear end of the compression coil spring 38 that is accommodated in the spring-accommodation large diameter hole 6Z.

Figure 106:
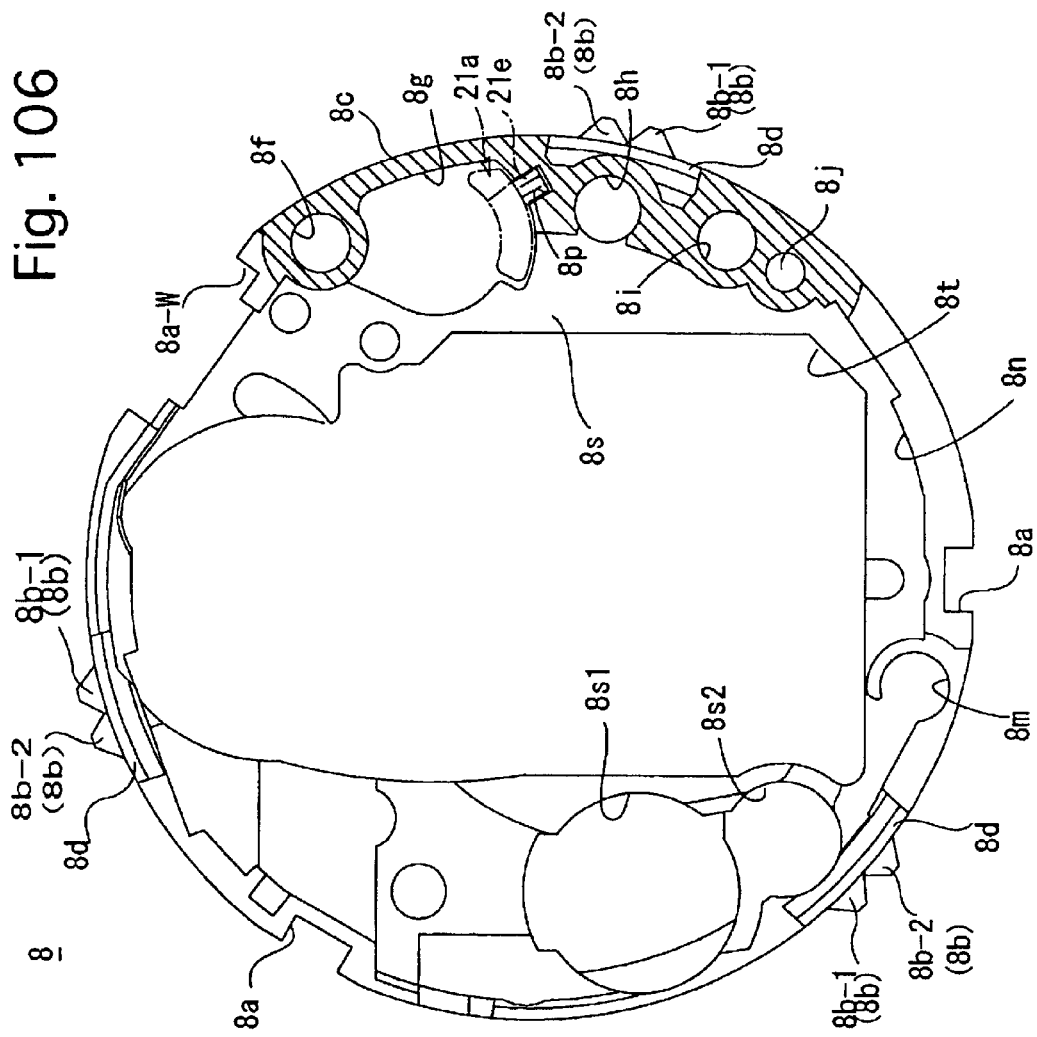
FIG. 106 is a front elevational view of the second lens group moving frame.
Figure 107:
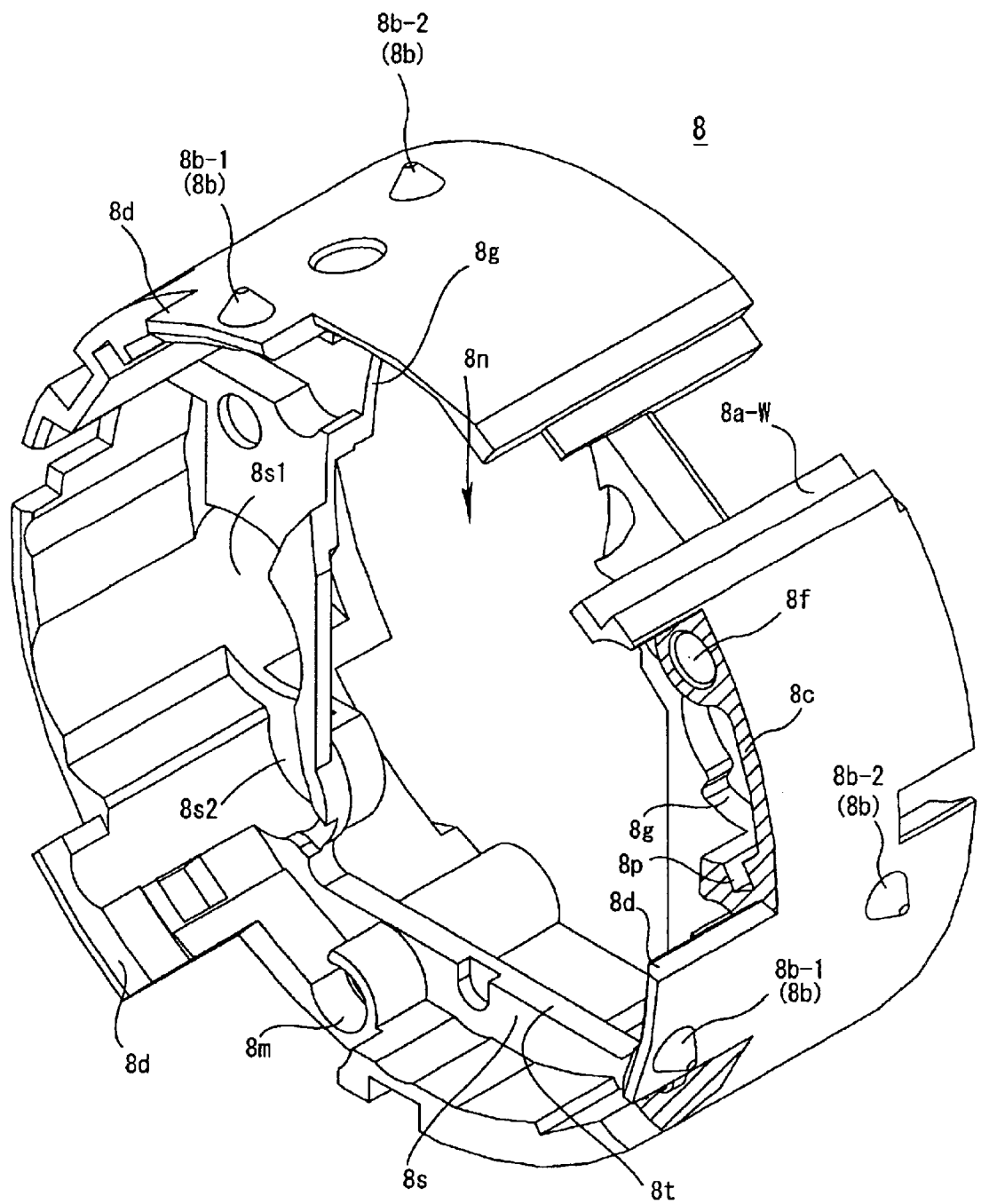
FIG. 107 is a perspective view of the second lens group moving frame.

As clearly shown in FIGS. 106 and 107, the second lens group moving frame 8 is an annular member having a through internal space 8n which penetrates the second lens group moving frame 8 in the optical axis direction. The second lens group moving frame 8 is provided, on an inner peripheral surface thereof at a substantially center thereof in the optical axis direction, with a central inner flange 8s. The inner edge of the central inner flange 8s forms a vertically-elongated opening 8t in which the second lens frame 6 is swingable. The shutter unit 76 is fixed to a front surface of the central inner flange 8s. The second lens group moving frame 8 is provided on an inner peripheral surface thereof behind the central inner flange 8s in the optical axis direction with a first radial recess 8q (see FIGS. 111 and 112) which is recessed radially outwards (upwards as viewed in FIG. 111) to correspond to the shape of an outer peripheral surface of the cylindrical lens holder portion 6a of the second lens frame 6 so that the cylindrical lens holder portion 6a can partly enter the radial recess 8q. The second lens group moving frame 8 is further provided on an inner peripheral surface thereof behind the central inner flange 8s with a second radial recess 8r (see FIGS. 111 and 112) which is recessed radially outwards to correspond to the shape of an outer edge of the engaging protrusion 6e of the second lens frame 6 so that the engaging protrusion 6e can partly enter the second radial recess 8r.

As shown in FIGS. 106 and 107, the second lens group moving frame 8 is provided on a front end surface thereof (specifically, a right portion of the front end surface of the second lens group moving frame 8, on the right hand side of the vertically-elongated opening 8t, as viewed from front of the second lens group moving frame 8) with a vertically-elongated front fixing surface 8c to which the front second lens frame support plate 36 is fixed. The front fixing surface 8c is hatched in FIGS. 106 and 107 for the purpose of illustration. The front fixing surface 8c does not overlap the vertically-elongated opening 8t in the optical axis direction, and lies in a plane orthogonal to the lens barrel axis Z0 (the photographing optical axis Z1, the optical axis of the second lens group LG2). The front fixing surface 8c is positioned in front of the shutter unit 76 in the optical axis direction. The front fixing surface 8c is formed to be exposed to the front of the second lens group moving frame 8. The second lens group moving frame 8 is provided at the front end thereof with a set of three extensions 8d extending forward in the optical axis direction. The set of three extensions 8d are formed as extensions of the second lens group moving frame 8 which extend forward from the front end of the second lens group moving frame 8. The set of three front cam followers 8b-1 are formed on outer peripheral surfaces of the set of three extensions 8d, respectively. The second lens group moving frame 8 is provided on a rear end surface thereof (specifically, a left portion of the rear end surface of the second lens group moving frame 8, on the left hand side of the vertically-elongated opening 8t, as viewed from rear of the second lens group moving frame 8) with a vertically-elongated rear fixing surface 8e to which the rear second lens frame support plate 37 is fixed. The rear fixing surface 8e is positioned on the opposite side of the central inner flange 8s from the front fixing surface 8c in the optical axis direction to be parallel to the front fixing surface 8c. The rear fixing surface 8e is formed as a part of the rear end surface of the second lens group moving frame 8; namely, the rear fixing surface 8e is flush with the rear end surface of the second lens group moving frame 8.

The second lens group moving frame 8 is provided with a first eccentric shaft support hole 8f, a pivoted cylindrical portion receiving hole 8g, a screw insertion hole 8h and a second eccentric shaft support hole 8i, in this order from top to bottom of the second lens group moving frame 8. All of these holes 8f, 8g, 8h and 8i are through holes which penetrate the second lens group moving frame 8 in the optical axis direction between the front fixing surface 8c and the rear fixing surface 8e. The through holes 8f, 8h and 8i of the second lens group moving frame 8 are aligned with the through holes 36a, 36d and 36e of the front second lens frame support plate 36, respectively, and also aligned with the through holes 37a, 37d and 37e of the rear second lens frame support plate 37 in the optical axis direction, respectively. The second lens group moving frame 8 is provided on an inner peripheral surface thereon in the pivoted cylindrical portion receiving hole 8g with a key way 8p extending in the optical axis direction. The key way 8p penetrates the second lens group moving frame 8 in the optical axis direction between the front fixing surface 8c and the rear fixing surface 8e. The diameter of the first eccentric shaft support hole 8f is determined so that the large diameter portion 34X-a is rotatably fitted in the first eccentric shaft support hole 8f, and the diameter of the second eccentric shaft support hole 8i is determined so that the large diameter portion 34Y-a is rotatably fitted in the second eccentric shaft support hole 8i (see FIG. 113). On the other hand, the diameter of the screw insertion hole 8h is determined so that the threaded shaft portion 66a is inserted in the screw insertion hole 8h with a substantial gap between the threaded shaft portion 66a and an inner peripheral surface of the screw insertion hole 8h (see FIG. 113). The second lens group moving frame 8 is provided on the front fixing surface 8c and the rear fixing surface 8e with a front boss 8j and a rear boss 8k which project forward and rearward in the optical axis direction, respectively. The front boss 8j and the rear boss 8k have a common axis extending in the optical axis direction. The second lens group moving frame 8 is provided below the vertically-elongated opening 8t with a through hole 8m which penetrates through the central inner flange 8s in the optical axis direction so that the rotation limit shaft 35 can be inserted into the vertically-elongated opening 8t.

The rotation limit shaft 35 is provided with a large diameter portion 35a, and is provided at a rear end thereof with an eccentric pin 35b which projects rearward in the optical axis direction. The axis of the eccentric pin 35b is eccentric to the axis of the large diameter portion 35. The rotation limit shaft 35 is provided at a front end thereof with a recess 35c into which the tip of a flatblade screwdriver (not shown) serving as an adjusting tool can be inserted.

FIGS. 108 through 112 show a state where the above described assemble parts shown in FIGS. 102 through 107 are put together, viewed from different angles. A manner of putting the assembled parts together will be discussed hereinafter.

First, the front torsion coil spring 39 and the rear torsion coil spring 40 are fixed to the second lens frame 6. At this time, a coil portion of the front torsion coil spring 39 is fitted on the front spring support portion 6f of the pivoted cylindrical portion 6b with the rear spring end 39b being engaged with a portion of the second lens frame 6 between the pivoted cylindrical portion 6b and the swing arm portion 6c (see FIG. 104). The front spring end 39a of the front torsion coil spring 39 is not engaged with any part of the second lens frame 6. A coil portion of the rear torsion coil spring 40 is fitted on the rear spring support portion 6g of the pivoted cylindrical portion 6b with the front stationary spring end 40a and the rear movable spring end 40b being inserted into the second spring engaging hole 6p of the swing arm portion 6c and the first spring engaging hole 6k of the position control arm 6j, respectively. The front stationary spring end 40a is fixed to the second spring engaging hole 6p while the rear movable spring end 40b is allowed to move in the first spring engaging hole 6k in a range "NR1" shown in FIG. 120. In a free state, the rear torsion coil spring 40 is supported by the second lens frame 6 thereon with the front stationary spring end 40a and the rear movable spring end 40b being slightly pressed to move in opposite directions approaching each other so that the rear movable spring end 40b is in pressing contact with an inner wall surface of the position control arm 6j in the first spring engaging hole 6k (see FIG. 120). The front torsion coil spring 39 is prevented from coming off the front spring support portion 6f from the front end thereof in the optical axis direction by the front spring hold projection 6h, while the rear torsion coil spring 40 is prevented from coming off the rear spring support portion 6g from the rear end thereof in the optical axis direction by the rear spring hold projection 6i.

Aside from the installation of the front torsion coil spring 39 and the rear torsion coil spring 40, the pivot shaft 33 is inserted into the through hole 6d after the compression coil spring 38 is inserted into the spring-accommodation large diameter hole 6Z that is formed in the rear end portion of the rear spring support portion 6g. At this time, the flange 33a of the pivot shaft 33 enters the rear spring support portion 6g to contact with the rear end of the compression coil spring 38. The axial length of the pivot shaft 33 is greater than the axial length of the pivoted cylindrical portion 6b so that the opposite ends of the pivot shaft 33 project from the front and rear ends of the pivoted cylindrical portion 6b, respectively.

Concurrent with the above described installation operations to the pivoted cylindrical portion 6b, the first eccentric shaft 34X and the second eccentric shaft 34Y are inserted into the first eccentric shaft support hole 8f and the second eccentric shaft support hole 8i, respectively. As shown in FIG. 113, the diameter of a front end portion (left end portion as viewed in FIG. 113) of the large diameter portion 34X-a of the first eccentric shaft 34X is greater than the diameter of the remaining portion of the large diameter portion 34X-a, and the inner diameter of a corresponding front end portion (left end portion as viewed in FIG. 113) of the first eccentric shaft support hole 8f is greater than the inner diameter of the remaining portion of the first eccentric shaft support hole 8f. Likewise, the diameter of a front end portion (left end portion as viewed in FIG. 113) of the large diameter portion 34Y-a of the second eccentric shaft 34Y is greater than the diameter of the remaining portion of the large diameter portion 34Y-a, and the inner diameter of a corresponding front end portion (left end portion as viewed in FIG. 113) of the second eccentric shaft support hole 8i is greater than the inner diameter of the remaining portion of the second eccentric shaft support hole 8i. Therefore, when inserted into the first eccentric shaft support hole 8f from the front end thereof (the left end as viewed in FIG. 113), the first eccentric shaft 34X is prevented from being further inserted into the first eccentric shaft support hole 8f upon the stepped portion between the large diameter portion 34X-a and the remaining portion of the first eccentric shaft 34X contacting with the bottom of the large-diameter front end portion of the first eccentric shaft support hole 8f as shown in FIG. 113. Likewise, when inserted into the second eccentric shaft support hole 8i from the front end thereof (the left end as viewed in FIG. 113), the second eccentric shaft 34Y is prevented from being further inserted into the second eccentric shaft support hole 8i upon the stepped portion between the large diameter portion 34Y-a and the remaining portion of the first eccentric shaft 34Y contacting with the bottom of the large-diameter front end portion of the second eccentric shaft support hole 8i as shown in FIG. 113. In this state, the front eccentric pin 34X-b and the front eccentric pin 34Y-b project forward in the optical axis direction from the front fixing surface 8c while the rear eccentric pin 34X-c and the eccentric pin 34Y-c project rearward in the optical axis direction from the rear fixing surface 8e.

Subsequently, the front second lens frame support plate 36 and the rear second lens frame support plate 37 are fixed to the front fixing surface 8c and the rear fixing surface 8e, respectively, while the front end of the pivot shaft 33, which projects from the front end of the front spring support portion 6f of the pivoted cylindrical portion 6b, is fitted into the pivot hole 36b of the front second lens frame support plate 36 and at the same time the rear end of the pivot shaft 33 is fitted into the pivot hole 37b of the rear second lens frame support plate 37. At this time, the front eccentric pin 34X-b, the front eccentric pin 34Y-b and the front boss 8j which project forward from the front fixing surface 8c are inserted into the first vertically-elongated hole 36a, the horizontally-elongated hole 36e and the second vertically-elongated hole 36f, respectively, and also the rear eccentric pin 34X-c, the rear eccentric pin 34Y-c and the rear boss 8k which project rearward from the rear fixing surface 8e are inserted into the first vertically-elongated hole 37a, the horizontally-elongated hole 37e and the second vertically-elongated hole 37f, respectively. The front eccentric pin 34X-b is movable and immovable in the first vertically-elongated hole 36a in the lengthwise direction and the widthwise direction thereof (vertically and horizontally as viewed in FIG. 110), respectively, the front eccentric pin 34Y-b is movable and immovable in the horizontally-elongated hole 36e in the lengthwise direction and the widthwise direction thereof (horizontally and vertically as viewed in FIG. 110), respectively, and the front boss 8j is movable and immovable in the second vertically-elongated hole 36f in the lengthwise direction and the widthwise direction thereof (vertically and horizontally as viewed in FIG. 110), respectively. Likewise, the rear eccentric pin 34X-c is movable and immovable in the first vertically-elongated hole 37a in the lengthwise direction and the widthwise direction thereof (vertically and horizontally as viewed in FIG. 111), respectively, the rear eccentric pin 34Y-c is movable and immovable in the horizontally-elongated hole 37e in the lengthwise direction and the widthwise direction thereof (horizontally and vertically as viewed in FIG. 111), respectively, and the rear boss 8k is movable and immovable in the second vertically-elongated hole 37f in the lengthwise direction and the widthwise direction thereof (vertically and horizontally as viewed in FIG. 111), respectively.

Lastly, the threaded shaft portion 66a of the set screw 66 is inserted into the screw insertion hole 36d and the screw insertion hole 8h, and is screwed through the screw hole 37d to fix the front second lens frame support plate 36 and the rear second lens frame support plate 37 to the second lens group moving frame 8. In this state, screwing down the set screw 66 with the set screw 66 being engaged in the screw hole 37d causes the front second lens frame support plate 36 and the rear second lens frame support plate 37 to be pressed against the front fixing surface 8c and the rear fixing surface 8e, respectively, so that the front second lens frame support plate 36 and the rear second lens frame support plate 37 are fixed to the second lens group moving frame 8 with a spacing therebetween which corresponds to the spacing between the front fixing surface 8c and the rear fixing surface 8e in the optical axis direction. As a result, the first eccentric shaft 34X and the second eccentric shaft 34Y are prevented from coming off the second lens group moving frame 8 by the front second lens frame support plate 36 and the rear second lens frame support plate 37. The front end of the pivoted cylindrical portion 6b is pressed against the front second lens frame support plate 36 because the flange 33a of the pivot shaft 33 contacts with the rear second lens frame support plate 37 to be prevented from moving rearward beyond the rear second lens frame support plate 37 so that the pivot shaft 33 is biased forward in the optical axis direction by the spring force of the compression coil spring 38 which is compressed in the spring-accommodation large diameter hole 6Z of the rear spring support portion 6g. This maintains the position of the second lens frame 6 relative to the second lens group moving frame 8 in the optical axis direction. In a state where the rear second lens frame support plate 37 is fixed to the second lens group moving frame 8, the guide key insertable recess 37g communicates with the key way 8p in the optical axis direction (see FIG. 112).

After the front second lens frame support plate 36 is fixed to the second lens group moving frame 8, the front spring end 39a of the front torsion coil spring 39 is placed into the spring engaging recess 36g. The rear spring end 39b of the front torsion coil spring 39 has been engaged with a portion of the second lens frame 6 between the pivoted cylindrical portion 6b and the swing arm portion 6c as mentioned above. Placing the front spring end 39a into the spring engaging recess 36g causes the front torsion coil spring 39 to be twisted, thus causing the second lens frame 6 to be biased to rotate about the pivot shaft 33 in a counterclockwise direction as viewed from front of the second lens frame 6 (counterclockwise as viewed in FIG. 114).

Figure 109:
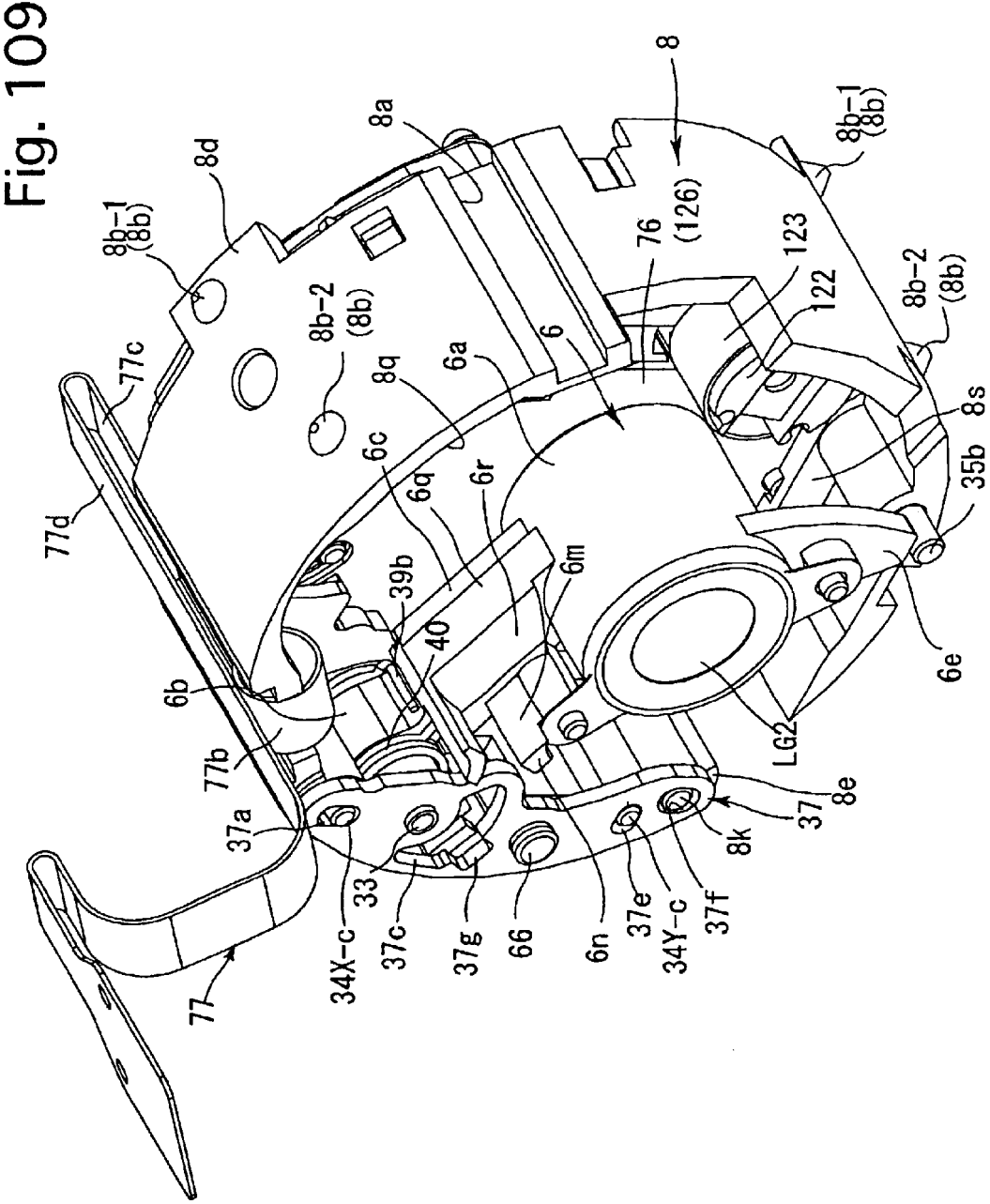
FIG. 109 is a perspective view of the second lens group moving frame and the shutter unit shown in FIG. 108, viewed obliquely from behind.

Aside from the installation of the second lens frame 6, the rotation limit shaft 35 is inserted into the through hole 8m of the second lens group moving frame 8 from the front end of the through hole 8m. An inner peripheral surface in the through hole 8m is formed to prevent the rotation limit shaft 35 from being further inserted into the through hole 8m from the position of the rotation limit shaft 35 shown in FIGS. and 108 and 109. In this state where the rotation limit shaft 35 is properly inserted into the through hole 8m, the eccentric pin 35b of the rotation limit shaft 35 projects rearward from the rear end of the through hole 8m as shown in FIG. 109.

Figure 111:
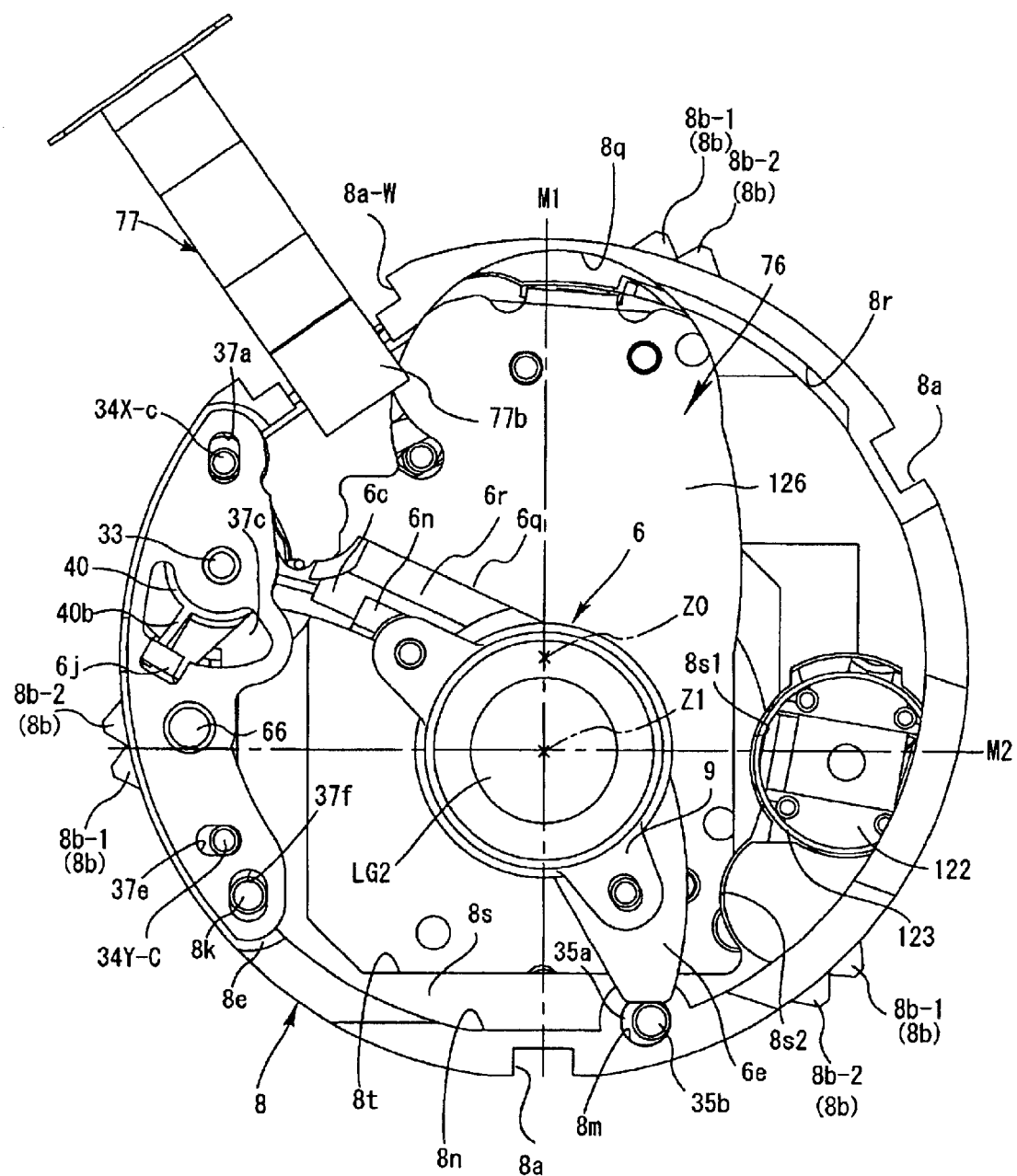
FIG. 111 is a rear elevational view of the second lens group moving frame and the shutter unit shown in FIG. 108.

In a state where the second lens frame 6 is properly mounted to the second lens group moving frame 8 in the above described manner, the second lens frame 6 can swing about the pivot shaft 33. The pivoted cylindrical portion receiving hole 8g of the second lens group moving frame 8 is sufficiently large so that the pivoted cylindrical portion 6b and the swing arm portion 6c may not interfere with the inner edge in the pivoted cylindrical portion receiving hole 8g when the second lens frame 6 swings. Since the pivot shaft 33 extends parallel to the photographing optical axis Z1 and the optical axis of the second lens group LG2, the second lens group LG2 swings about the pivot shaft 33 while the optical axis thereof remaining parallel to the photographing optical axis Z1 when the second lens frame 6 swings. One end of the range of rotation of the second lens frame 6 about the pivot shaft 33 is determined by the engagement of the tip of the engaging protrusion 6e with the eccentric pin 35b as shown in FIG. 111. The front torsion coil spring 39 biases the second lens frame 6 to rotate in a direction to bring the tip of the engaging protrusion 6e into contact with the eccentric pin 35b.

Subsequently, the shutter unit 76 is fixed to the second lens group moving frame 8 to obtain a sub-assembly shown in FIGS. 108 through 112. As can be seen in FIGS. 108 through 112, the shutter unit 76 is fixed to the front of the central inner flange 8s. In this state where the shutter unit 76 is fixed to the front of the central inner flange 8s, the front fixing surface 8c is positioned in front of the shutter S and the adjustable diaphragm A in the shutter unit 76 in the optical axis direction. A front portion of the cylindrical lens holder portion 6a of the second lens frame 6 is positioned in the vertically-elongated opening 8t, and is also positioned immediately behind the shutter unit 76 regardless of variation of the position of the second lens frame 6 relative to the second lens group moving frame 8 as can be see in FIGS. 111 and 112.

In a state where the second lens group moving frame 8 and the second linear guide ring 10 are coupled to each other, the flexible PWB 77 that extends from the shutter unit 76 is installed as shown in FIG. 125. As described above, the wide linear guide key 10c-W of the second linear guide ring 10 is engaged in the wide guide groove 8a-W. The flexible PWB 77, the wide guide groove 8a-W and the wide linear guide key 10c-W in a radial direction of the lens barrel axis Z0 are positioned in the same position in a circumferential direction of the zoom lens 71. Namely, the flexible PWB 77, the wide guide groove 8a-W and the wide linear guide key 10c-W are aligned in a radial direction perpendicular to the optical axis direction. As shown in FIG. 125, the flexible PWB 77 includes a first straight portion 77a, a loop-shaped turning portion 77b, a second straight portion 77c and a third straight portion 77d in this order from the side of the shutter unit 76. A bend of the flexible PWB 77 is formed between the second straight portion 77c and the third straight portion 77d in the vicinity of the front end of the wide linear guide key 10c-W. From the side of the shutter unit 76 (the left side as viewed in FIG. 125), firstly the first straight portion 77a extends rearward in the optical axis direction from the shutter unit 76, and subsequently the flexible PWB 77 bends radially outwards to extend forward so that the loop-shaped turning portion 77b is formed in the vicinity of the rear end of the second lens group moving frame 8 and so that the second straight portion 77c extends forward in the optical axis direction along an inner surface of the wide linear guide key 10c-W. Subsequently, the flexible PWB bends radially outwards to extend rearward so that the third straight portion 77d extends rearward in the optical axis direction along an outer surface of the wide linear guide key 10c-W. Subsequently, the tip of the third straight portion 77d (the tip of the flexible PWB) passes through the radial through hole 10d to extend rearward, is further passed through a hole 22q (see FIGS. 4 and 40) to extend through to the outer side of the stationary barrel 22, to be connected to the control circuit 140 via a main circuit board (not shown). The third straight portion 77d is partly fixed to the outer surface of the wide linear guide key 10c-W by a fixing means such as a double-faced tape (not shown) so that the size of the loop-shaped turning portion 77b becomes variable in accordance with relative axial movement between the second lens group moving frame 8 and the second linear guide ring 10.

Figure 128:
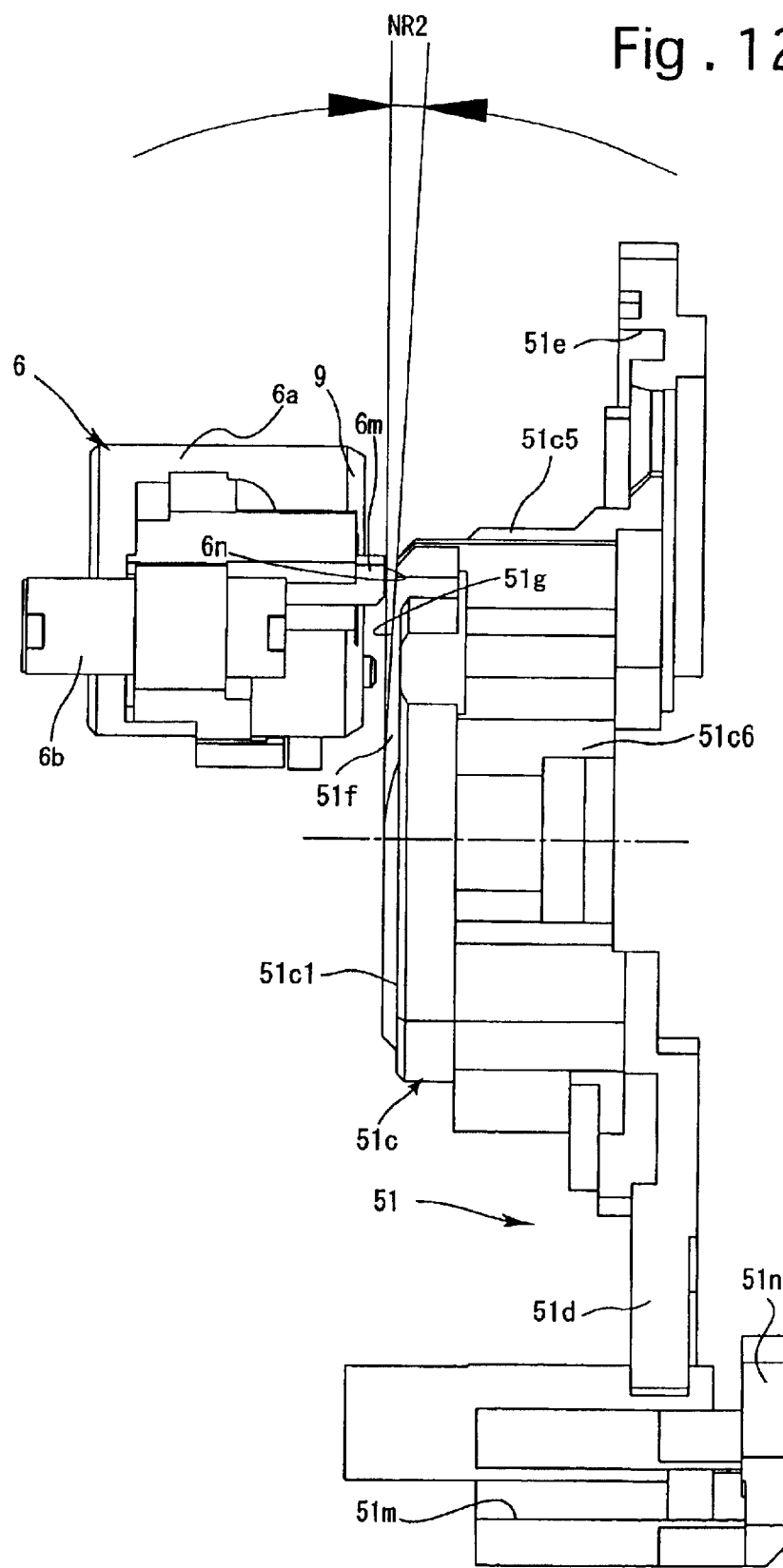
Figure 129:
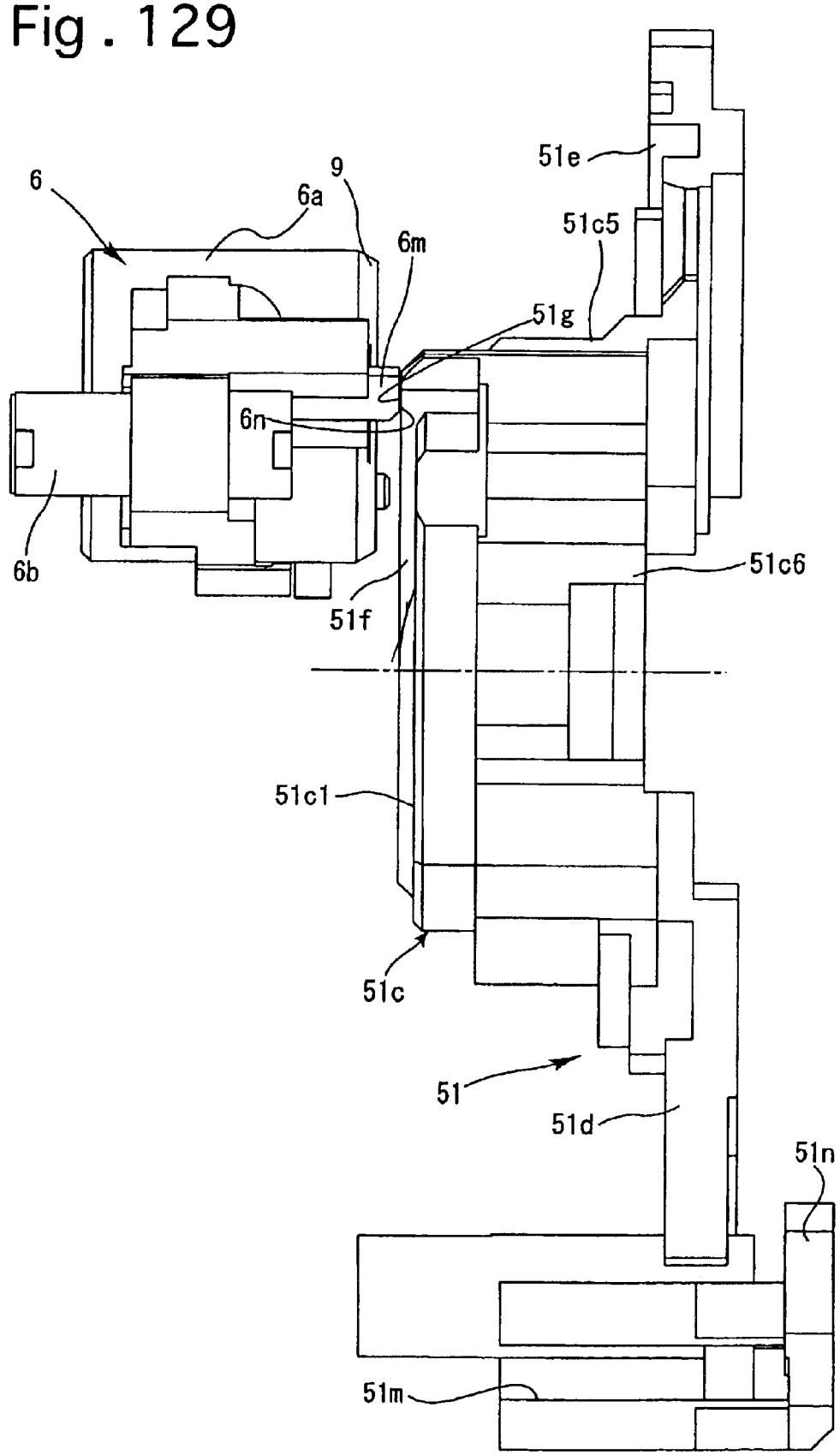
Figure 130:
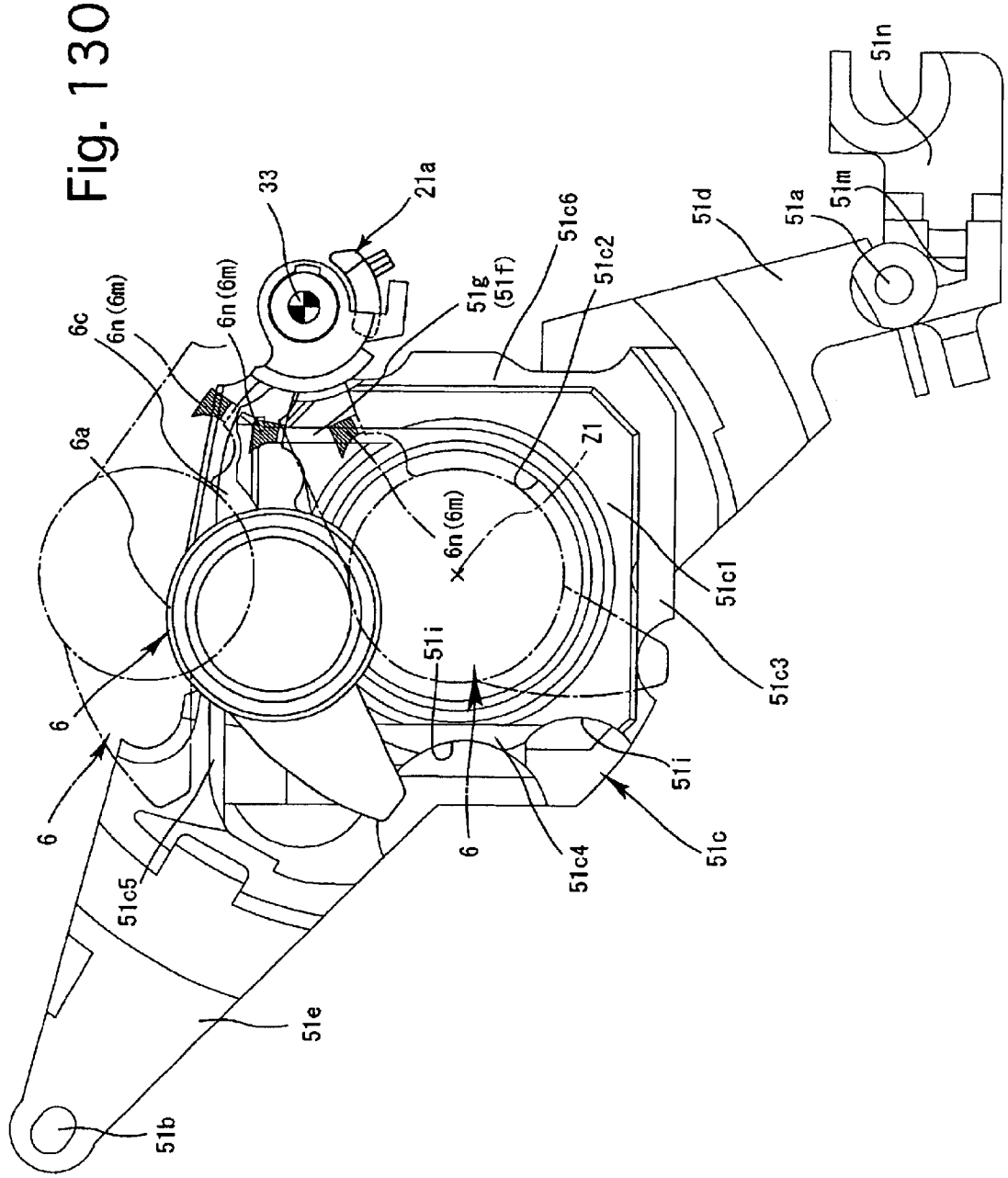

The AF lens frame 51, which is positioned behind the second lens group moving frame 8, is made of an opaque material, and is provided with a forwardly-projecting lens holder portion 51c, a first arm portion 51d and a second arm portion 51e. The first arm portion 51d and the second arm portion 51e are positioned on radially opposite sides of the forwardly-projecting lens holder portion 51c. The forwardly-projecting lens holder portion 51c is positioned in front of the first arm portion 51d and the second arm portion 51e in the optical axis direction. The pair of guide holes 51a and 52a, in which the pair of AF guide shafts 52 and 53 are respectively fitted, are formed on the first arm portion 51d and the second arm portion 51e, respectively. The forwardly-projecting lens holder portion 51c is formed in a box shape (rectangular ring shape) including a substantially square-shaped front end surface 51c1 and four side surfaces 51c3, 51c4, 51c5 and 51c6. The front end surface 51c1 lies in a plane orthogonal to the photographing optical axis Z1. The four side surfaces 51c3, 51c4, 51c5 and 51c6 extend rearward in a direction substantially parallel to the photographing optical axis Z1, toward the CCD image sensor 60, from the four sides of the front end surface 51c1. The rear end of the forwardly-projecting lens holder portion 51c is formed as an open end which is open toward the low-pass filter LG4 the CCD image sensor 60. The forwardly-projecting lens holder portion 51c is provided on the front end surface 51c1 thereof with a circular opening 51c2 the center of which is coincident with the photographing optical axis Z1. The third lens group LG3 is positioned inside the circular opening 51c2. The first arm portion 51d and the second arm portion 51e extend from the forwardly-projecting lens holder portion 51c radially in opposite directions away from each other. More specifically, the first arm portion 51d extends from a corner of the forwardly-projecting lens holder portion 51c between the two side surfaces 51c3 and 51c6 radially in a lower-rightward direction as viewed from front of the AF lens frame 51, while the second arm portion 51e extends from another corner of the forwardly-projecting lens holder portion 51c between the two side surfaces 51c4 and 51c5 radially in a upper-leftward direction as viewed from front of the AF lens frame 51 as shown in FIG. 130. As can be seen in FIGS. 128 and 129, the first arm portion 51d is fixed to the rear end of the corner of the forwardly-projecting lens holder portion 51c between the two side surfaces 51c3 and 51c6 while the second arm portion 51e is fixed to the rear end of the corner of the forwardly-projecting lens holder portion 51c between the two side surfaces 51c4 and 51c5.

As shown in FIG. 9, radially outwards ends of the first arm portion 51d and the second arm portion 51e are positioned radially outside a cylindrical wall 22k of the stationary barrel 22. The pair of guide holes 51a and 52a are respectively formed on radially outer ends of the first arm portion 51d and the second arm portion 51e which are positioned outside the cylindrical wall 22k. Accordingly, the AF guide shaft 52, which is fitted in the guide hole 51a and serves as a main guide shaft for guiding the AF lens frame 51 in the optical axis direction with a high positioning accuracy, is positioned outside the cylindrical wall 22k, while the AF guide shaft 53, which is loosely fitted in the guide hole 51b to serve as an auxiliary guide shaft for secondarily guiding the AF lens frame 51 in the optical axis direction is also positioned outside the cylindrical wall 22k. As shown in FIG. 9, the cylindrical wall 22k is provided on the outer peripheral surface thereof with two radial projections 22t1 and 22t2 provided at different circumferential positions. A shaft-supporting hole 22v1 is formed on the rear surface of the radial projection 22t1. Similarly, a shaft-supporting hole 22v2 is formed on the rear surface of the radial projection 22t2. The CCD holder 21 is provided on the front surface thereof with two shaft-supporting holes 21v1 and 21v2 which oppose the shaft-supporting holes 22v1 and 22v2 in the optical axis direction, respectively. The front end and the rear end of the AF guide shaft 52 are supported by (fixed to) the shaft-supporting hole 22v1 and the shaft-supporting hole 21v1, respectively. The front end and the rear end of the AF guide shaft 53 are supported by (fixed to) the shaft-supporting hole 22v2 and the shaft-supporting hole 21v2, respectively.

Figure 122:
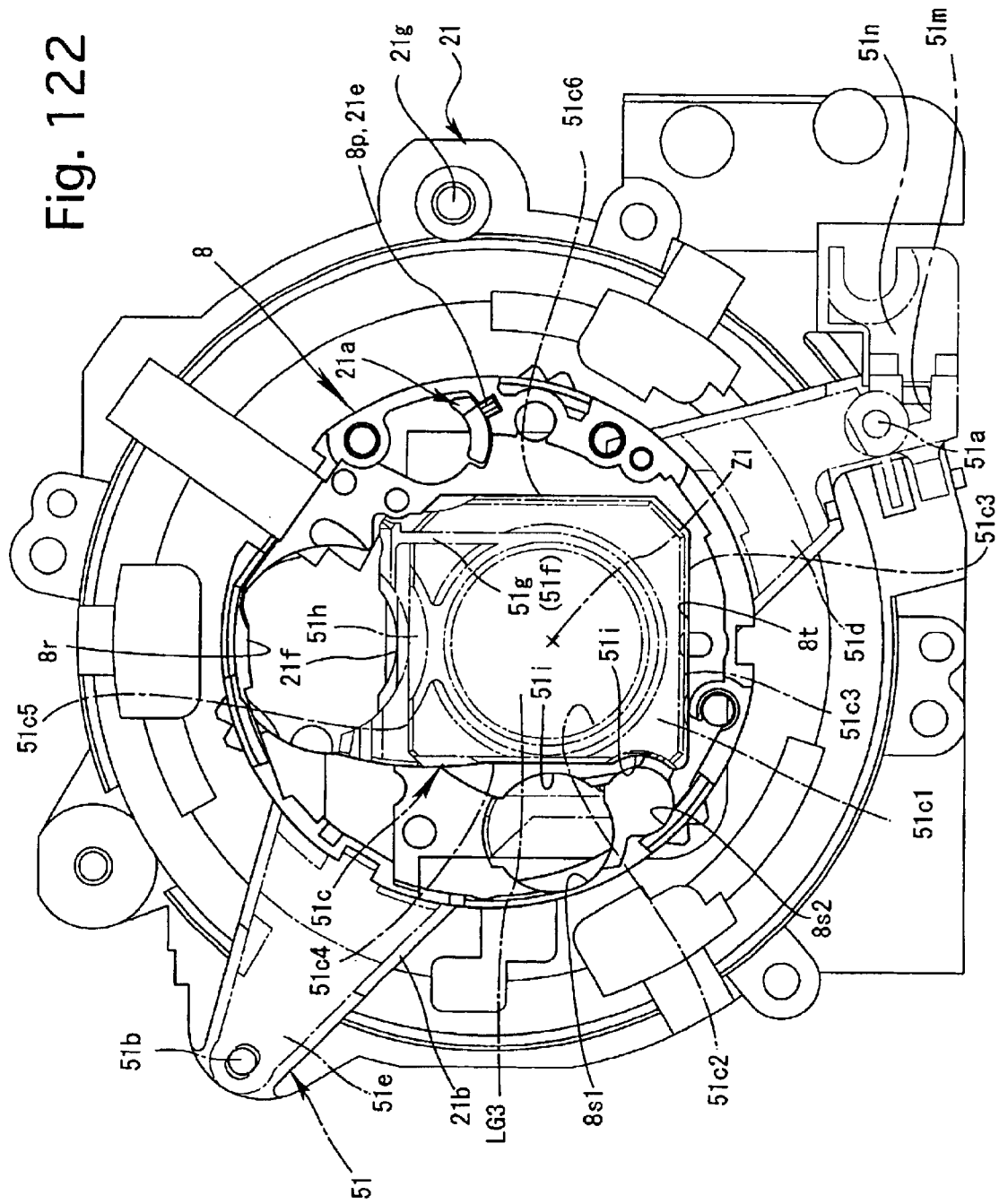

The cylindrical wall 22k is provided with two cutout portions 22m and 22n (see FIG. 11) which are cut out along the AF guide shafts 52 and 53 to prevent the second arm portion 51e and the first arm portion 51d from interfering with the cylindrical wall 22k when the AF lens frame 51 moves in the optical axis direction. As shown in FIGS. 122 and 130, the pair of guide holes 51a and 52a are positioned on radially opposite sides of the photographing optical axis Z1, and accordingly, the pair of AF guide shafts 52 and 53 are positioned on radially opposite sides of the photographing optical axis Z1.

The AF lens frame 51 can move rearward in the optical axis direction to a point (rear limit for the axial movement of the AF lens frame 51) at which the forwardly-projecting lens holder portion 51c comes into contact with the filter holder portion 21b (see FIG. 10) formed on a front surface of the CCD holder 21. In other words, the CCD holder 21 includes a stop surface (front surface of the filter holder portion 21b) which determines rear limit for the axial movement of the AF lens frame 51. In a state where the forwardly-projecting lens holder portion 51c is in contact with the filter holder portion 21b, the front end of the position-control cam bar 21a, which projects forward from the CCD holder 21, is positioned in front of the AF lens frame 51 in the optical axis direction (see FIGS. 121, 123 and 124). The cam-bar insertable hole 36c of the front second lens frame support plate 36 and the cam-bar insertable hole 37c of the rear second lens frame support plate 37 are positioned on an axis of the position-control cam bar 21a. Namely, the cam-bar insertable hole 36c, the cam-bar insertable hole 37c and the position-control cam bar 21a are aligned in the optical axis direction.

Figure 103:
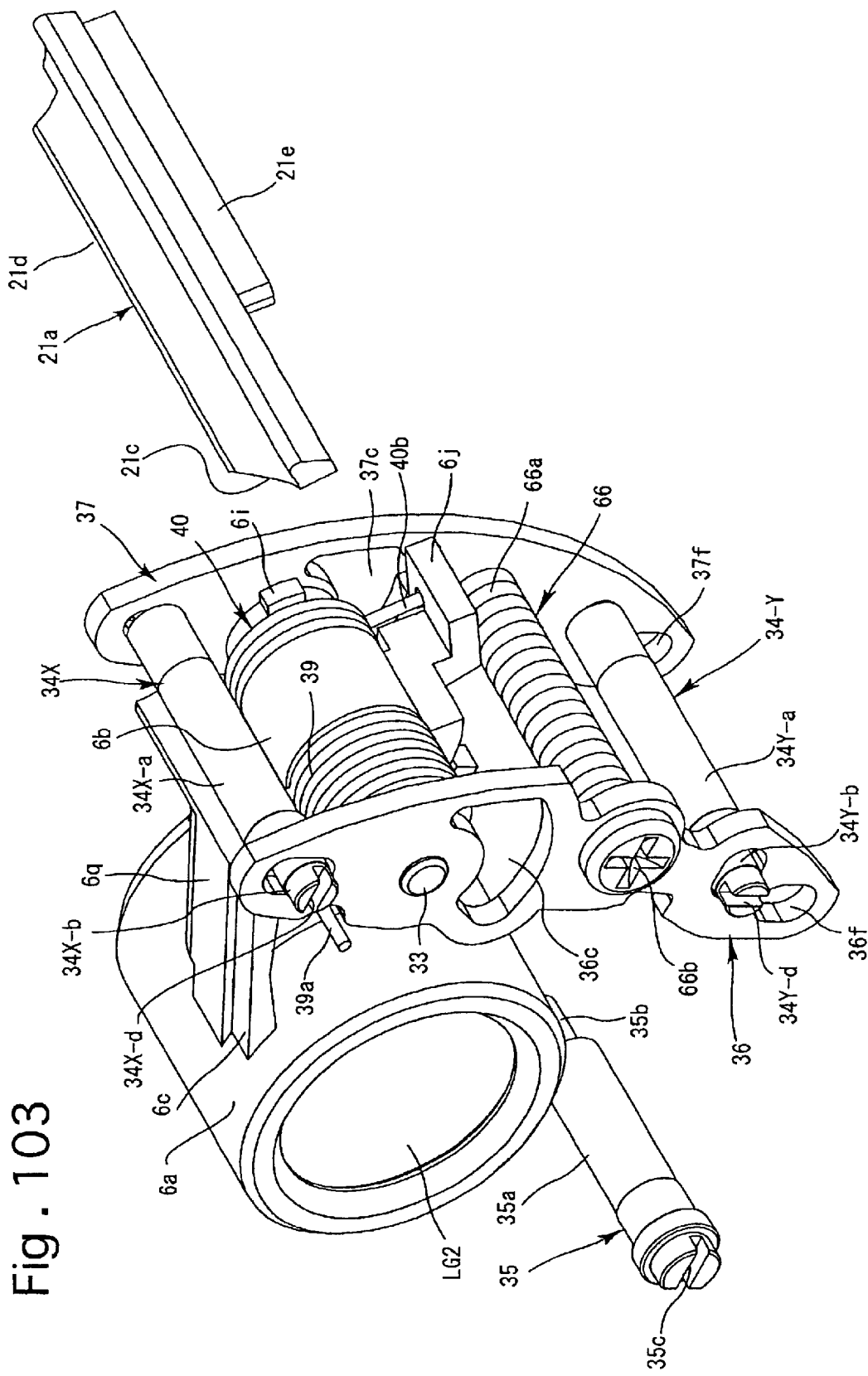
FIG. 103 is a perspective view of the structure for the second lens frame shown in FIG. 102 in an assembled state and a position-control cam bar of a CCD holder, viewed obliquely from the front.
Figure 104:
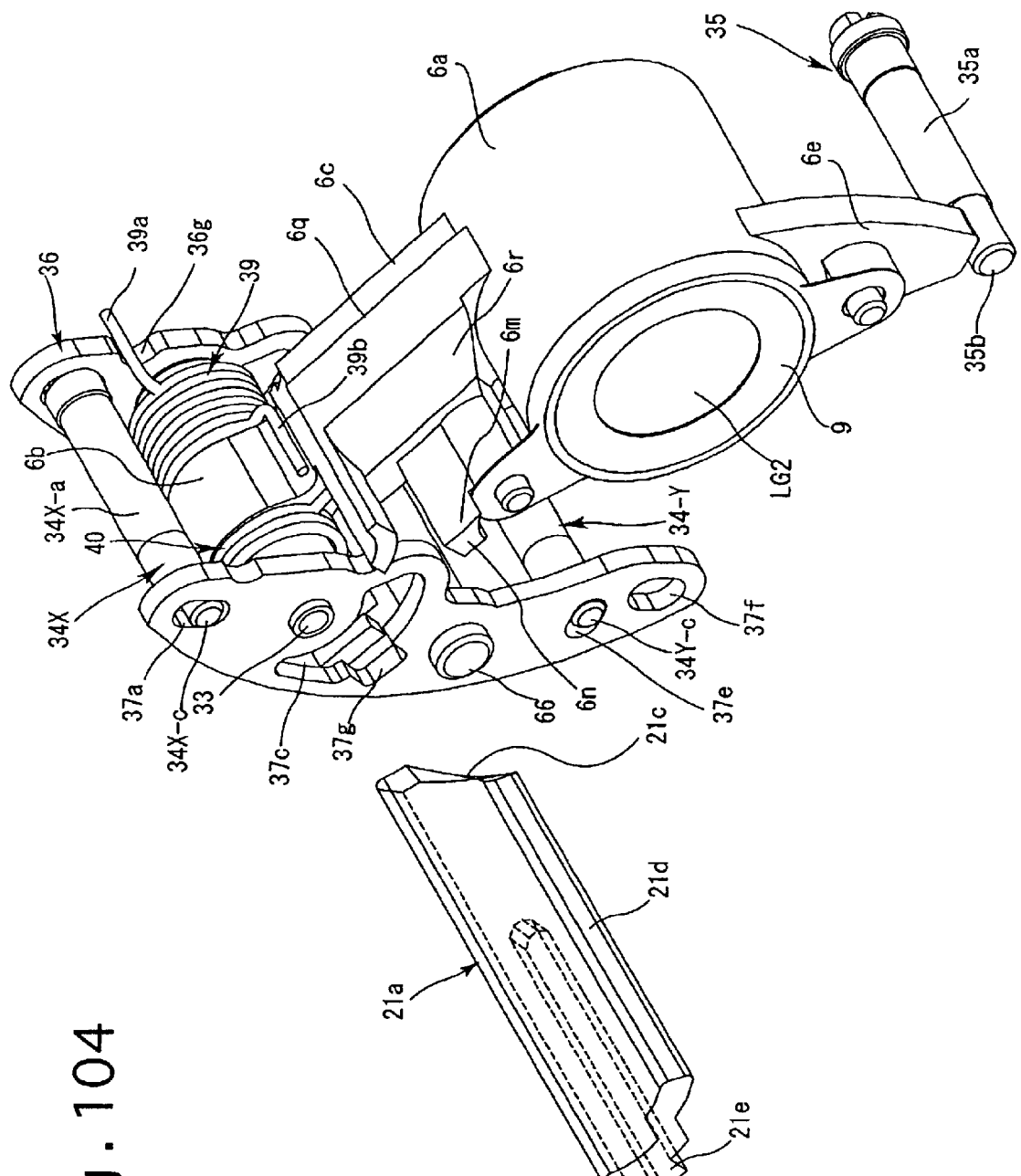
FIG. 104 is a perspective view of the structure for the second lens frame and the position-control cam bar shown in FIG. 103, viewed obliquely from behind.
Figure 118:
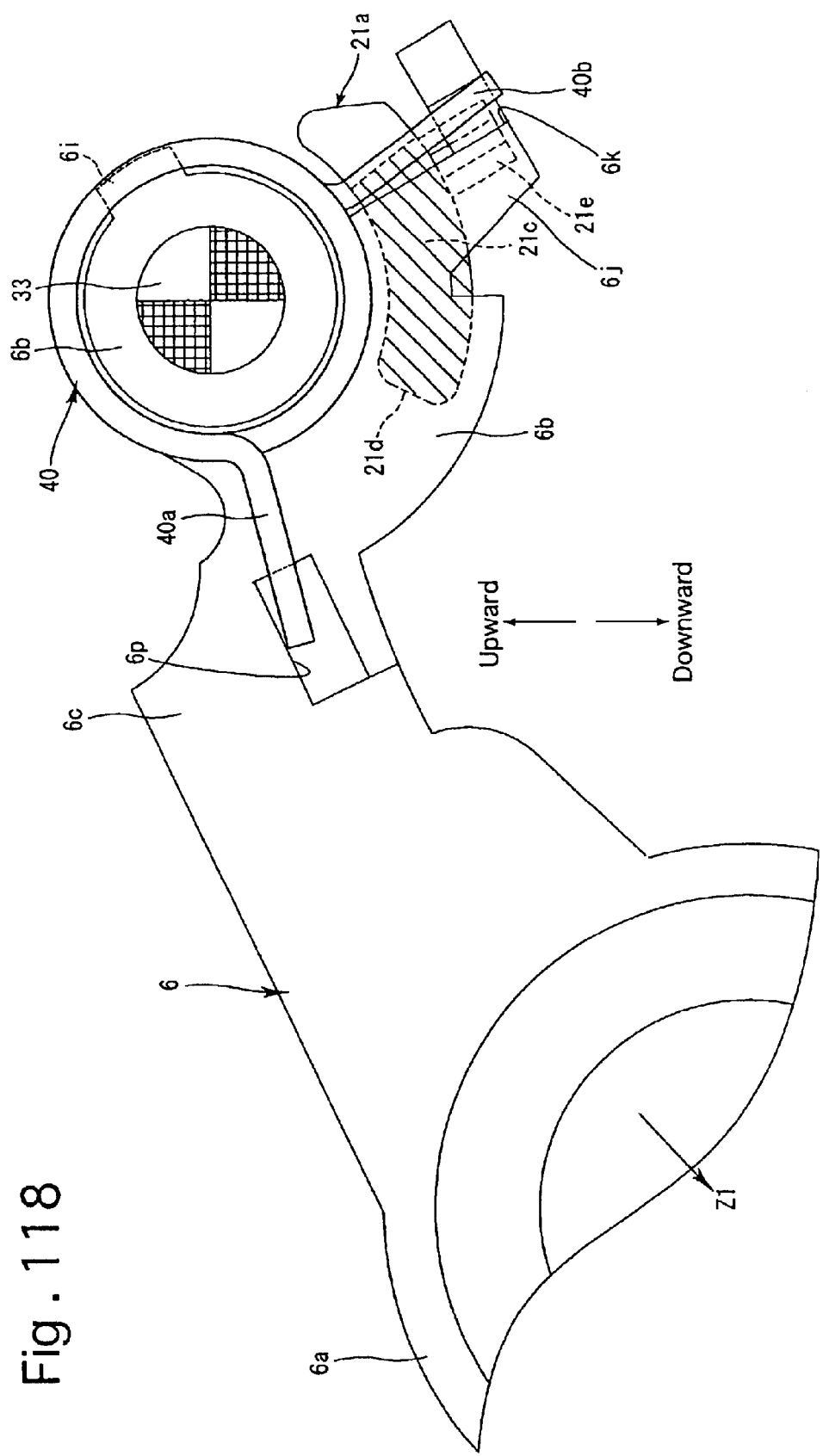
FIG. 118 is a front elevational view of a portion of the structure for the second lens frame shown in FIGS. 105 and 108 through 116, showing the positional relationship between the second lens frame and the position-control cam bar of the CCD holder when the second lens frame is held in a photographing position thereof as shown in FIGS. 109 and 111.
Figure 119:
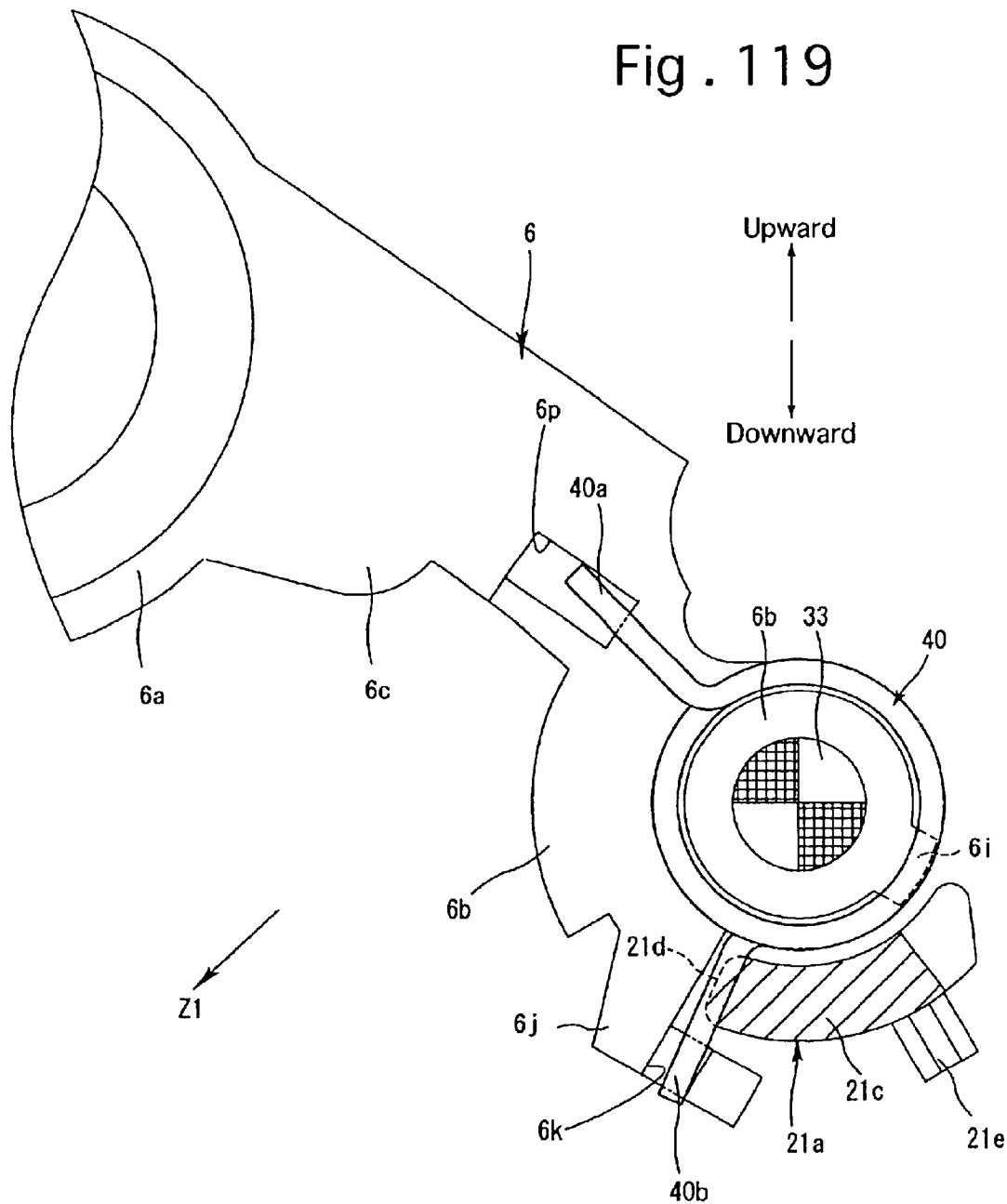
Figure 120:
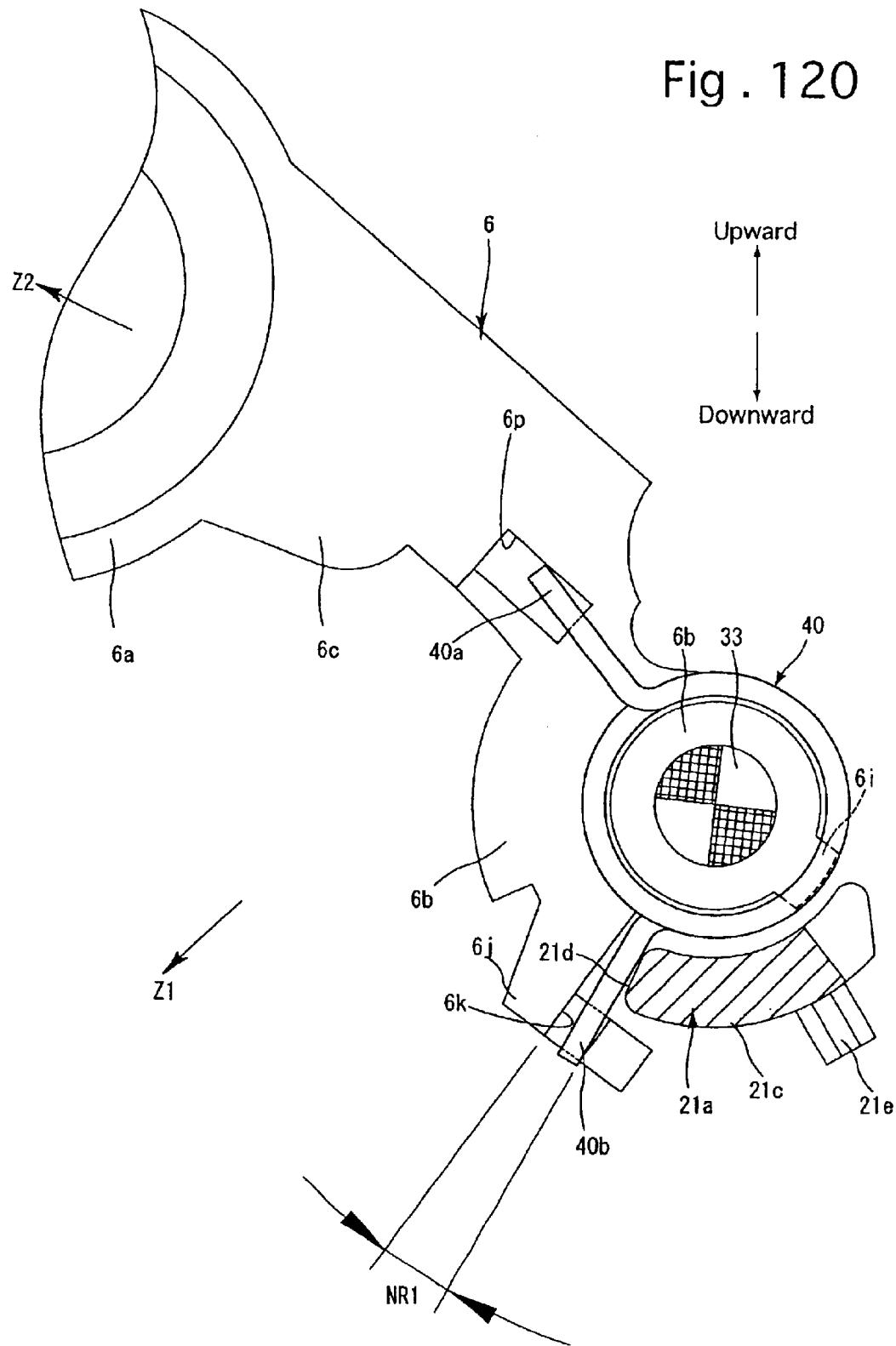

As shown in FIGS. 103 and 104, the position-control cam bar 21a is provided at a front end thereof with the aforementioned retracting cam surface 21c which is inclined with respect to the optical axis direction, and is further provided along an inner side edge of the position-control cam bar 21a with a removed-position holding surface 21d which extends rearward from the retracting cam surface 21c in the optical axis direction. As can be seen in FIGS. 118 through 120 and 122, in which the position-control cam bar 21a is viewed from front thereof, the position-control cam bar 21a has a certain width in a substantially radial direction of the photographing optical axis Z1. The retracting cam surface 21c is formed as an inclined surface which is inclined forward in a direction from the radially inner side to the radially outer side of the position-control cam bar 21a (i.e., from a side closer to the photographing optical axis Z1 to a side farther from the photographing optical axis Z1), substantially along a widthwise direction of the retracting cam surface 21c. In other words, the retracting cam surface 21c is formed as an inclined surface which is inclined forward in a direction away from the photographing optical axis Z1. In FIGS. 118 through 120, the retracting cam surface 21c is hatched for the purpose of illustration. Moreover, the position-control cam bar 21a is formed so that an upper surface and a lower surface of the position-control cam bar 21a become a concave surface and a convex surface, respectively, to prevent the position-control cam bar 21a from interfering with the pivoted cylindrical portion 6b of the second lens frame 6. In other words, the position-control cam bar 21a is formed as a portion a cylinder centered about the pivot shaft 33 of the second lens group 6, and the retracting cam surface 21c is a lead surface which is formed on the periphery (edge surface) of this cylinder. The position-control cam bar 21a is provided on a lower surface thereof with a guide key 21e which is elongated in the optical axis direction. The guide key 21e extends from the rear end of the position-control cam bar 21a to an intermediate point thereon behind the front end of the position-control cam bar 21a. Therefore, no part of the guide key 21e is formed on the position-control cam bar 21a in the vicinity of the front end thereof. The guide key 21e is formed to have a cross section shape allowed to enter the guide key insertable recess 37g in the optical axis direction.

Operations of the second lens group LG2, the third lens group LG3 and other associated elements, which are supported by the above described accommodating structure including a structure retracting the second lens frame 6 to the radially retracted position thereof, will be hereinafter discussed. The position of the second lens group moving frame 8 with respect to the CCD holder 21 in the optical axis direction is determined by a combination of the axial movement of the cam ring 11 by the cam diagrams of the plurality of inner cam grooves 11a (11a-1 and 11a-2) and the axial movement of the cam ring 11 itself. The second lens group moving frame 8 is positioned farthest from the CCD holder 21 when the zoom lens 71 is set at about the wide-angle extremity as shown above the photographing optical axis Z1 in FIG. 9, and is positioned closest to the CCD holder 21 when the zoom lens 71 is in the retracted state as shown in FIG. 10. The second lens frame 6 is retracted to the radially retracted position thereof by utilizing the retracting rearward movement of the second lens group moving frame 8 from the frontmost axial potion thereof (wide-angle extremity) to the rearmost axial position thereof (retracted position).

In the zooming range between the wide-angle extremity and the telephoto extremity, the second lens frame 6 is held still at a fixed position by the engagement of the tip of the engaging protrusion 6e with the eccentric pin 35b of the rotation limit shaft 35 as shown in FIG. 111. At this time, the optical axis of the second lens group LG2 is coincident with the photographing optical axis Z1, so that the second lens frame 6 is in a photographing position thereof. When the second lens frame 6 is in a photographing position thereof as shown in FIG. 111, a part of the position control arm 6j and the rear movable spring end 40b of the rear torsion coil spring 40 are exposed to the rear of the second lens group moving frame 8 through the cam-bar insertable hole 37c.

Figure 121:
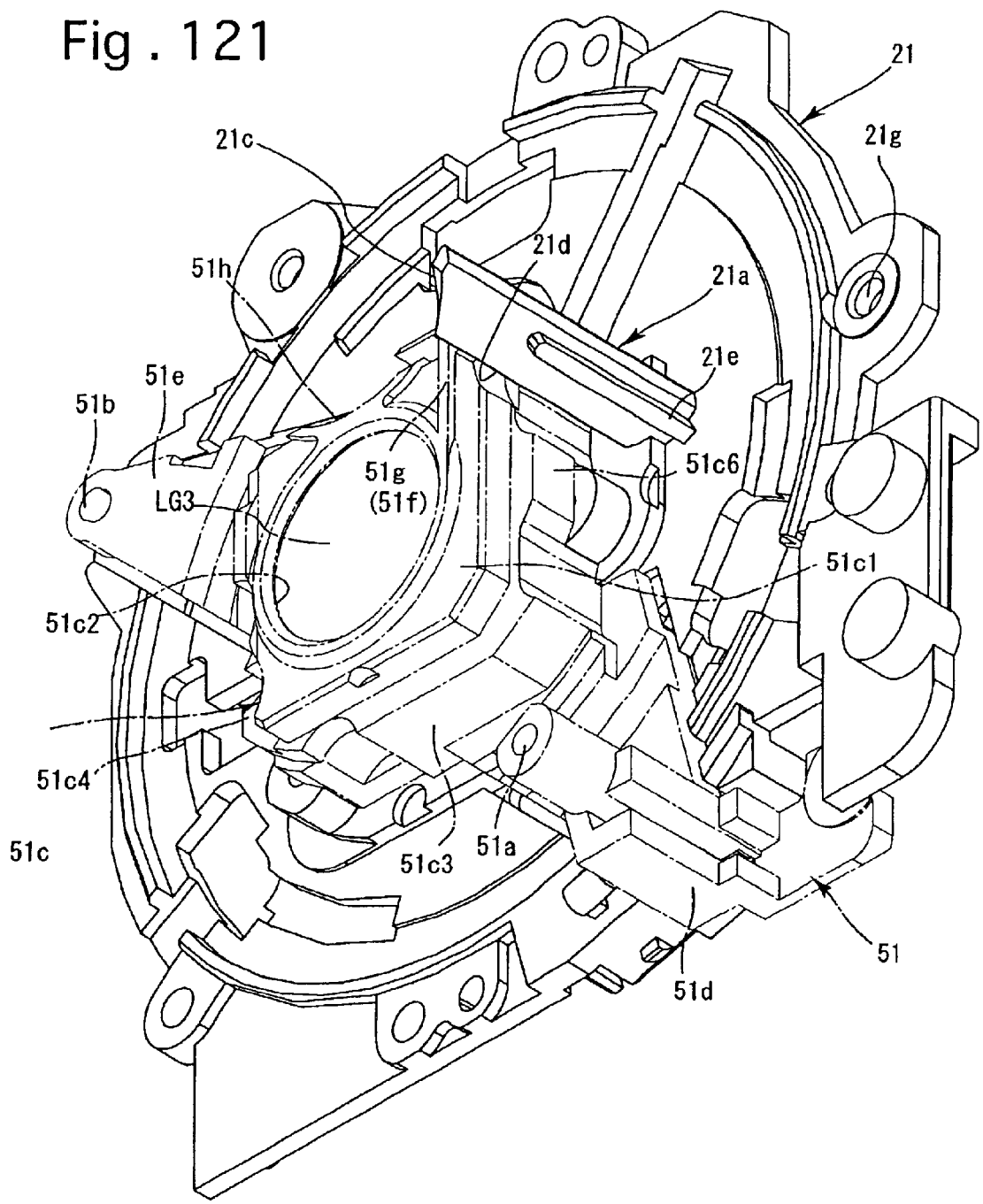
Figure 123:
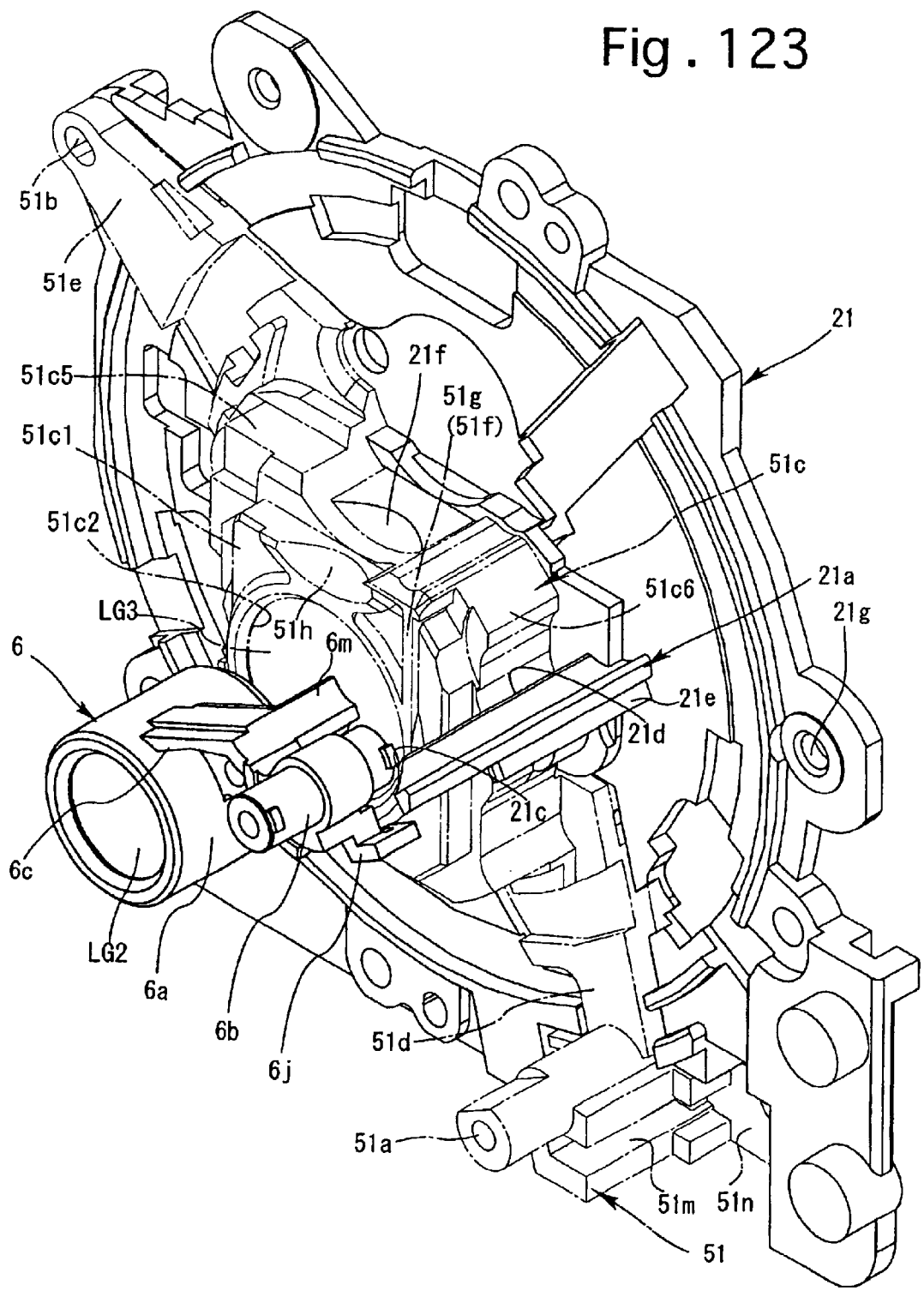
Figure 124:
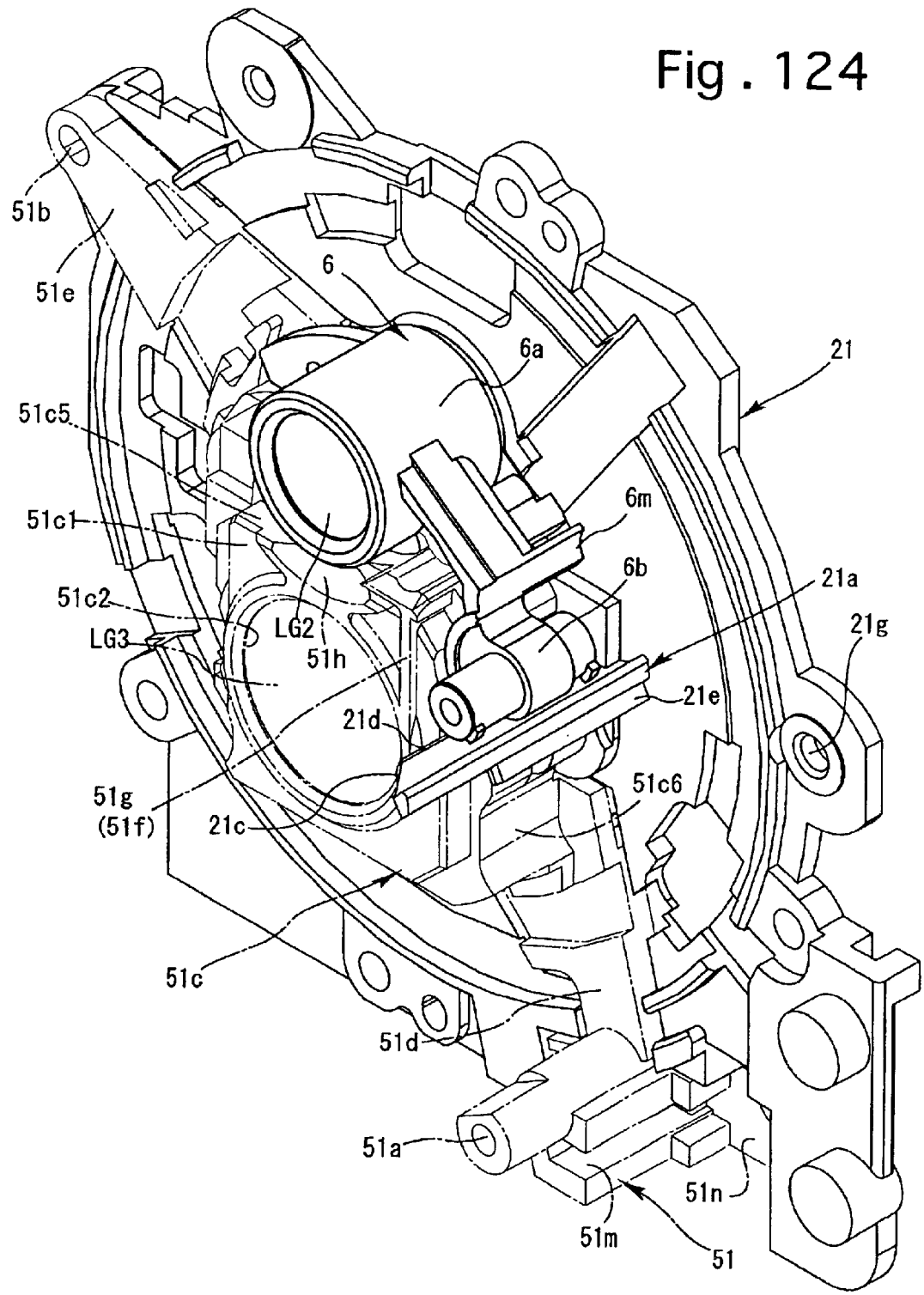

Upon the main switch of the digital camera 70 being turned OFF in the ready-to-photograph state of the zoom lens 71, the control circuit 140 drives the AF motor 160 in the lens barrel retracting direction to move the AF lens frame 51 rearward, toward the CCD holder 21 to a rearmost position (retracted position) thereof as shown in FIGS. 121, 123 and 124. The forwardly-projecting lens holder portion 51c holds the third lens group LG3 therein in the vicinity of the front end surface 51c1. The space immediately behind the third lens group LG3 is provided as an open space surrounded by the four side surfaces 51c3, 51c4, 51c5 and 51c6 so that the low-pass filter LG4 and the CCD image sensor 60, which are supported by the CCD holder 21 (the filter holder portion 21b), can enter the space immediately behind the third lens group LG3 so as to reduce the space between the third lens group LG3 and the low-pass filter LG4 when the AF lens frame 51 is retracted to the rearmost position. In a state where the AF lens frame 51 is in the rearmost position as shown in FIG. 10, the front end of the position-control cam bar 21a is positioned in front of the AF lens frame 51 in the optical axis direction.

Subsequently, the control circuit 140 drives the zoom motor 150 in the lens barrel retracting direction to perform the above described lens barrel retracting operation. Keep driving the zoom motor 150 in the lens barrel retracting direction beyond the wide-angle extremity of the zoom lens 71 causes the cam ring 11 to move rearward in the optical axis direction while rotating about the lens barrel axis Z0 due to engagement of the set of three roller followers 32 with the set of three through-slots 14e, respectively. As can be understood from the relationship shown in FIG. 17 between the plurality of inner cam grooves 11a and the plurality of cam followers 8b, even though the second lens group moving frame 8 is positioned closer to the front of the zoom lens 71 in the optical axis direction relative to the cam ring 11 when the zoom lens 71 is in the retracted position than that when the zoom lens 71 is in the wide-angle extremity, the second lens group moving frame 8 comes near the CCD holder 21 when the zoom lens 71 is in the retracted state because the amount or rearward movement of the cam ring 11 relative to the stationary barrel 22 is greater than the amount of forward movement of the second lens group moving frame 8 in the cam ring 11 relative to the cam ring 11 in the lens barrel retracting operation.

Figure 105:
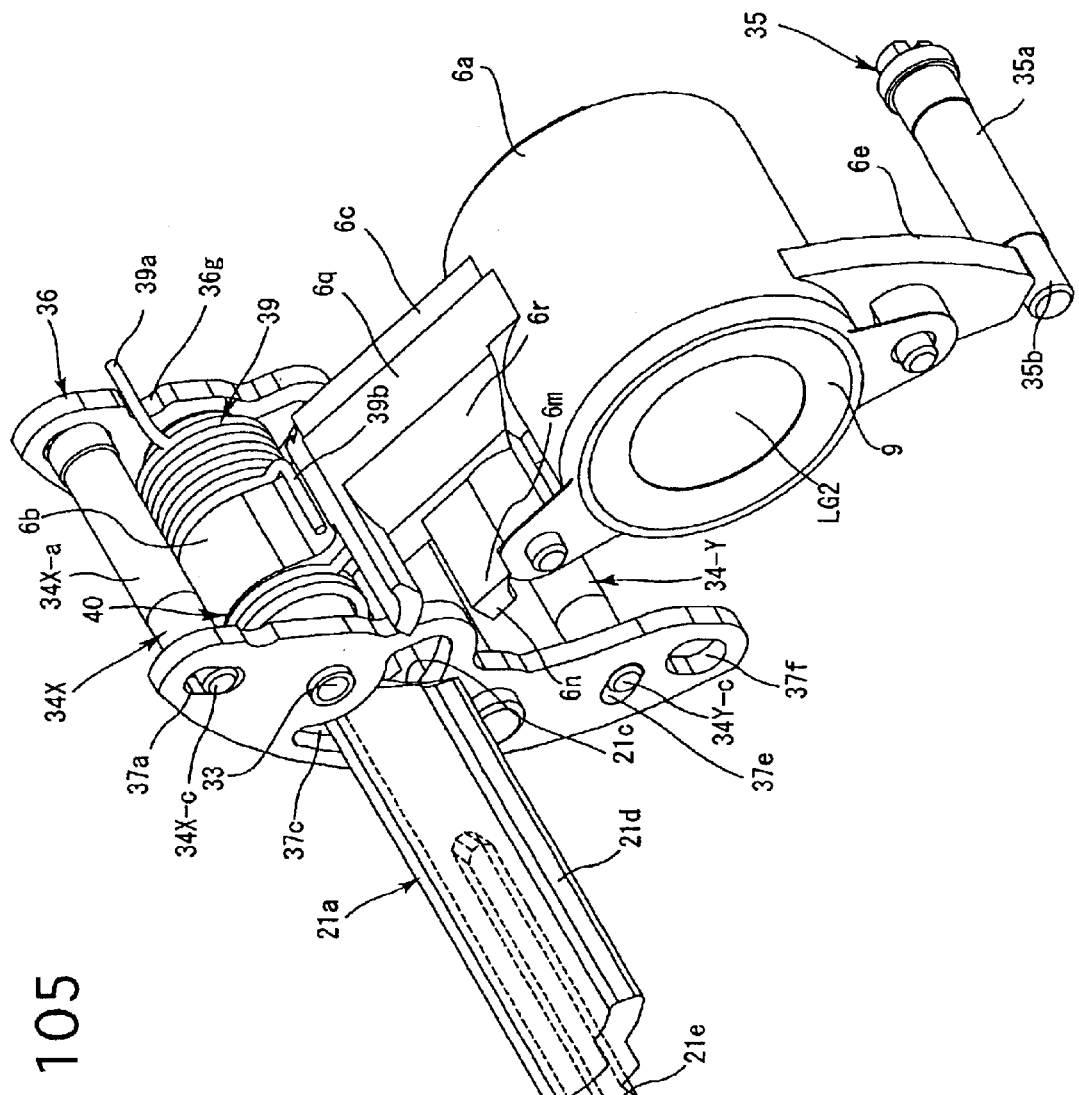
FIG. 105 is a view similar to that of FIG. 104, showing a state where the position-control cam bar is in the process of entering the cam-bar insertable hole of a rear second lens frame support plate fixed to the second lens group moving frame.

A further retracting movement of the second lens group moving frame 8 together with the second lens frame 6 causes the front end of the position-control cam bar 21a to enter the cam-bar insertable hole 37c (see FIG. 105). As described above, a part of the position control arm 6j and the rear movable spring end 40b of the rear torsion coil spring 40 are exposed to the rear of the second lens group moving frame 8 through the cam-bar insertable hole 37c as shown in FIG. 111. FIG. 118 shows the positional relationship at this time among the position control arm 6j, the rear movable spring end 40b and the position-control cam bar 21a, viewed from the front of the zoom lens 71. The rear movable spring end 40b is positioned closer to the position-control cam bar 21a than the position control arm 6j (except for a protrusion formed thereon for the formation of the first spring engaging hole 6k) in a radial direction of the photographing optical axis Z1. On the other hand, the retracting cam surface 21c is formed as an inclined surface which is inclined forward in a direction away from the photographing optical axis Z1. A frontmost portion of the retracting cam surface 21c is positioned immediately behind the rear movable spring end 40b of the rear torsion coil spring 40 in the state shown in FIG. 118. A rearward movement of the second lens frame 6 together with the second lens group moving frame 8 toward the CCD holder 21 with the positional relationship shown in FIG. 118 being maintained causes the retracting cam surface 21c to come into contact with the rear movable spring end 40b, not the position control arm 6j of the second lens frame 6. FIG. 123 shows the position of the second lens frame 6 at the time immediately before the rear movable spring end 40b comes into contact with the retracting cam surface 21c.

A further rearward movement of the second lens frame 6 together with the second lens group moving frame 8 with the rear movable spring end 40b remaining in contact with the retracting cam surface 21c causes the rear movable spring end 40b to slide on the retracting cam surface 21c in a clockwise direction as viewed in FIG. 118 in accordance with the shape of the retracting cam surface 21c. This clockwise rotation of the rear movable spring end 40b is transferred to the second lens group 6 via the front stationary spring end 40a. The spring force (rigidity) of the rear torsion coil spring 40 is predetermined to be capable of transferring a torque from the rear movable spring end 40b to the second lens group 6 via the front stationary spring end 40a without the front stationary spring end 40a and the rear movable spring end 40b being further pressed to move in opposite directions approaching each other than those shown in FIGS. 118 through 120. Namely, the resiliency of the rear torsion coil spring 40 is determined to be greater than that of the front torsion coil spring 39 at the time the front torsion coil spring 39 holds the second lens frame 6 in the photographing position.

Figure 112:
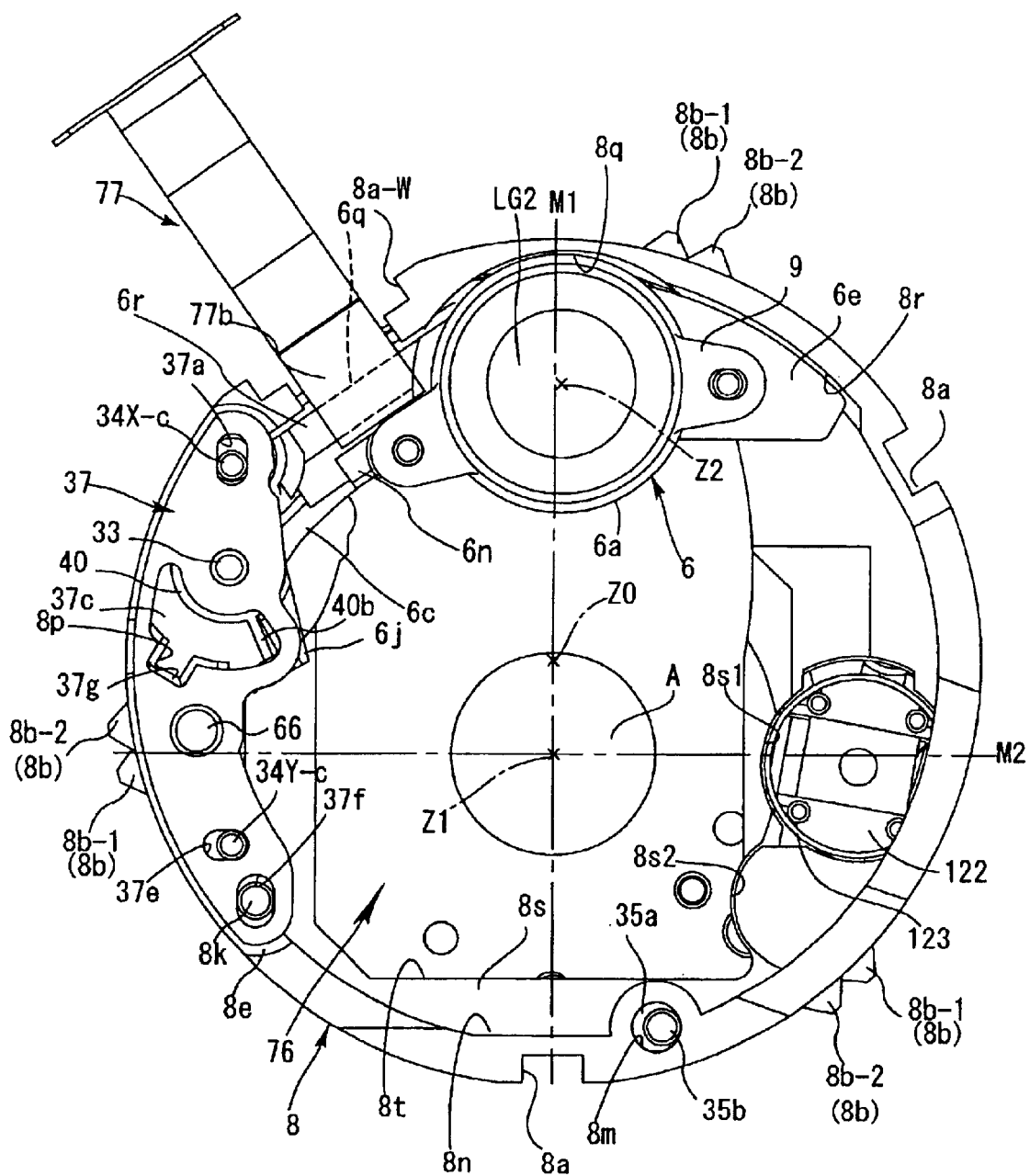
FIG. 112 is a view similar to that of FIG. 111, showing a state where the second lens frame has retracted to the radially retracted position.

Upon receiving a turning force from the retracting cam surface 21c via the rear torsion coil spring 40, the second lens group 6 rotates about the pivot shaft 33 against the spring force of the front torsion coil spring 39 from the photographing position shown in FIG. 111 toward the radially retracted position shown in FIG. 112 in accordance with the retracting movement of the second lens group moving frame 8. With this rotation of the second lens group 6, the rear movable spring end 40b of the rear torsion coil spring 40 slides on the retracting cam surface 21c from the position shown in FIG. 118 to the position shown in FIG. 119. Upon the second lens frame 6 rotating to the radially retracted position shown in FIG. 112, the rear movable spring end 40b moves from the retracting cam surface 21c to the removed-position holding surface 21d to be engaged therewith. Thereafter, the second lens frame 6 is not rotated about the pivot shaft 33 in a direction to the radially retracted position by a retracting movement of the second lens group moving frame 8. In a state where the second lens frame 6 is held in the radially retracted position as shown in FIG. 112, an outer peripheral portion of the cylindrical lens holder portion 6a enters the radial recess 8q while an outer edge of the engaging protrusion 6e enters the second radial recess 8r of the second lens group moving frame 8.

After the second lens frame 6 reaches the radially retracted position, the second lens group moving frame 8 continues to move rearward until reaching the retracted position shown in FIG. 10. During this rearward movement of the second lens group moving frame 8, the second lens group 6 moves rearward together with the second lens group moving frame 8 to the position shown in FIG. 124 with the second lens group 6 held in the radially retracted position, in which the rear movable spring end 40b remains in engaged with the retracting cam surface 21c. At this time, the front end of the position-control cam bar 21a projects forward from the cam-bar insertable hole 37c through the cam-bar insertable hole 36c and the pivoted cylindrical portion receiving hole 8g.

As shown in FIGS. 10 and 124, in the retracted state of the zoom lens 71, the cylindrical lens holder portion 6a of the second lens frame 6 has moved into the space immediately above the forwardly-projecting lens holder portion 51c, the forwardly-projecting lens holder portion 51c has moved into that space in the second lens group moving frame 8 in which the second lens group LG2 is positioned in the ready-to-photograph state of the zoom lens 71, and the third lens group LG3 is positioned immediately behind the shutter unit 76. In addition, the low-pass filter LG4 and the CCD image sensor 60 have entered the forwardly-projecting lens holder portion 51c from the rear thereof by a rearward movement of the forwardly-projecting lens holder portion 51c, and accordingly, the space between the third lens group LG3 and the low-pass filter LG4 and also the space between the third lens group LG3 and the CCD image sensor 60 in the optical axis direction are smaller in the retracted state of the zoom lens 71 than those in the ready-to-photograph state of the zoom lens 71 as can be seen by making a comparison between FIGS. 9 and 10. Namely, in the retracted state of the zoom lens 71, the second lens group LG2 is positioned in the space radially outside the space in which the third lens group LG3, the low-pass filter LG4 and the CCD image sensor 60 are positioned. In a conventional photographing lens barrel including a plurality of optical elements in which one or more movable optical elements thereof are moved only along a photographing optical axis, it is impossible to make the length of the photographing lens barrel smaller than the sum of the thicknesses of all the plurality of optical elements. However, according to the accommodating structure of the zoom lens 71, it is substantially unnecessary to secure any space for accommodating the second lens group LG2 on the photographing optical axis Z1. This makes it possible to make the length of the zoom lens 71 smaller than the sum of the thicknesses of all the plurality of optical elements of the zoom lens 71.

In the present embodiment of the zoom lens, the AF lens frame 51 has various features in its shape and supporting structure that make it possible to retract the zoom lens 71 in the camera body 72 in a highly space-saving fashion. Such features will be hereinafter discussed in detail.

The AF guide shaft 52, which serves as a main guide shaft for guiding the AF lens frame 51 in the optical axis direction with a high positioning accuracy, and the AF guide shaft 53, which serves as an auxiliary guide shaft for secondarily guiding the AF lens frame 51 in the optical axis direction, are positioned outside cylindrical wall 22k of the stationary barrel 22 on radially opposite sides of the photographing optical axis Z1 (at positions not interfering with any of the movable lens groups of the zoom lens 71). This structure of the AF lens frame 51 contributes to a reduction of the length of the zoom lens 71 when the zoom lens 71 is retracted into the camera body 72 because neither the AF guide shaft 52 nor the AF guide shaft 53 becomes an obstruction which interferes with one or more of the first through third lens groups LG1, LG2 and LG3 and the low-pass filter LG4.

In other words, according to such a structure of the AF lens frame 51, since the pair of AF guide shafts 52 and 53 can be disposed freely without being subject to constraints by moving parts positioned in the stationary barrel 22 such as the second lens frame 6, the effective length of each of the AF guide shafts 52 and 53 for guiding the AF lens frame 51 in the optical axis direction can be made long enough to guide the AF lens frame 51 in the optical axis direction with a high positioning accuracy. As can be seen in FIGS. 9 and 10, the LCD panel 20 is positioned immediately behind the zoom lens barrel 71 (on a rearward extension line of the optical axis Z1) while the pair of AF guide shafts 52 and 53 are positioned outside the LCD panel 20 in radial directions of the lens barrel axis Z0. This arrangement achieves the pair of AF guide shafts 52 and 53 having long axial lengths which are largely extended even toward the rear of the camera body 72 without interfering with the LCD panel 20 that is comparatively large in dimension. In practice, the rear end of the AF guide shaft 52 is extended to a position below the LCD panel 20 in the camera body 72 as shown in FIG. 9.

Additionally, an annular space which is surrounded by the outer peripheral surface of the forwardly-projecting lens holder portion 51c, the first arm portion 51d, the second arm portion 51e and the inner peripheral surface of the stationary barrel 22 (the AF guide shafts 52 and 53) is secured due to the structure wherein the AF lens frame 51 is shaped so that the first arm portion 51d extends radially outwards from the rear end of the corner of the forwardly-projecting lens holder portion 51c between the two side surfaces 51c3 and 51c6 and so that the second arm portion 51e extends radially outwards from the rear end of the corner of the forwardly-projecting lens holder portion 51c between the two side surfaces 51c4 and 51c5. This annular space is used to accommodate not only the second lens group LG2 but also rear end portions of annular members such as the first through third external barrels 12, 13 and 15 and the helicoid ring 18 to maximize the utilization of the internal space of the camera body 72. Moreover, the annular space contributes to a further retraction of the zoom lens 71 in the camera body 72 (see FIG. 10). If the AF lens frame 51 does not have the above described space-saving structure, e.g., if each of the first and second arm portions 51d and 51e is formed on the forwardly-projecting lens holder portion 51c to extend radially from an axially intermediate portion or an axially front end portion thereof unlike the present embodiment of the zoom lens, such elements as the second lens group L2 cannot be retracted to their respective positions shown in FIG. 10.

In addition, in the present embodiment of the zoom lens, the AF lens frame 51 is constructed so that the third lens group LG3 is supported by the forwardly-projecting lens holder portion 51c in a front end space thereof and so that the low-pass filter LG4 and the CCD image sensor 60 are accommodated in the space in the rear of the forwardly-projecting lens holder portion 51c in the retracted state of the zoom lens 71. This further maximizes the utilization of the internal space of the zoom lens 71.

Upon the main switch of the digital camera 70 being turned ON in the retracted state of the zoom lens 71, the control circuit 140 drives the AF motor 160 in the lens barrel advancing direction so that the above described moving parts operate in the reverse manner to the above described retracting operations. The cam ring 11 advances while rotating relative to the first linear guide ring 14 and at the same time the second lens group moving frame 8 and the first external barrel 12 advance together with the cam ring 11 without rotating relative to the first linear guide ring 14. At an initial stage of the advancement of the second lens group moving frame 8, the second lens frame 6 remains in the radially retracted position since the rear movable spring end 40*b* is still engaged with the removed-position holding surface 21*d*. A further forward movement of the second lens group moving frame 8 causes the rear movable spring end 40*b* to firstly reach the front end of the position-control cam bar 21*a* and subsequently be disengaged from the removed-position holding surface 21*d* to be engaged with the retracting cam surface 21*c* as shown in FIG. 120. At this stage, the cylindrical lens holder portion 6*a* of the second lens frame 6 has moved ahead of the forwardly-projecting lens holder portion 51*c* in the optical axis direction, so that the cylindrical lens holder portion 6*a* does not interfere with the forwardly-projecting lens holder portion 51*c* even if the second lens frame 6 commences to rotate about the pivot shaft 33 in a direction to the photographing position. A further forward movement of the second lens group moving frame 8 causes the rear movable spring end 40*b* to slide on the retracting cam surface 21*c* so that the second lens frame 6 starts rotating from the radially retracted position to the photographing position by the spring force of the front torsion coil spring 39.

A further forward movement of the second lens group moving frame 8 firstly causes the rear movable spring end 40*b* to keep sliding on the retracting cam surface 21*c* in a direction away from the removed-position holding surface 21*d* (left to right as viewed in FIG. 118), and subsequently causes the rear movable spring end 40*b* to be disengaged from the retracting cam surface 21*c* upon the rear movable spring end 40*b* moving to a predetermined point on the retracting cam surface 21*c*. At this time, the relative position between the rear movable spring end 40*b* and the retracting cam surface 21*c* as viewed from front of the second lens frame 6 corresponds to that shown in FIG. 118. As a result, the second lens frame 6 becomes totally free from the constraint of the position-control cam bar 21*a*. Consequently, the second lens frame 6 is held in the photographing position as shown in FIG. 111 with the tip of the engaging protrusion 6*e* being in pressing contact with the eccentric pin 35*b* of the rotation limit shaft 35 by the spring force of the front torsion coil spring 39. Namely, the optical axis of the second lens group LG2 coincides with the photographing optical axis Z1. The second lens frame 6 finishes rotating from the radially retracted position to the photographing position by the time the zoom lens 71 has been extended to the wide-angle extremity when the main switch of the digital camera 70 is turned ON.

Although the AF lens frame 51 moves forward from its rearmost position when the zoom lens 71 changes from the retracted state shown in FIG. 10 to the ready-to-photograph state shown in FIG. 9, the forwardly-projecting lens holder portion 51*c* still covers the front of the low-pass filter LG4 and the CCD image sensor 60 even in the ready-to-photograph state shown in FIG. 9 so that the front end surface 51*c*1 and the four side surfaces 51*c*3, 51*c*4, 51*c*5 and 51*c*6 can prevent unnecessary light such as stray light from being incident on the low-pass filter LG4 and the CCD image sensor 60 through any part other than the third lens group LG3. Accordingly, the forwardly-projecting lens holder portion 51*c* of the AF lens frame 51 serves as not only a member for supporting the third lens group LG3 but also a member for accommodating the low-pass filter LG4 and the CCD 60 in the retracted state of the zoom lens 71, and also a light shield member for preventing unnecessary light such as stray light from being incident on the low-pass filter LG4 and the CCD image sensor 60 in the ready-to-photograph state of the zoom lens 71.

In general, a structure supporting a movable lens group of a photographing lens system must be precise so as not to deteriorate the optical performance of the photographing lens system. In the present embodiment of the zoom lens, each of the second lens frame 6 and the pivot shaft 33, in particular, is required to have high dimensional accuracy which is several orders of magnitude higher than those of simple movable elements since the second lens group LG2 is driven to not only move along the photographing optical axis Z1 but also rotate to retract to the radially retracted position. For instance, with the shutter unit 76 (having exposure control devices such as the shutter S and the diaphragm A) provided inside the second lens group moving frame 8, if a pivot shaft corresponding to the pivot shaft 33 is provided in front of or behind the shutter unit 76, the length of the pivot shaft would be limited, or would make the pivot shaft act as a cantilever type pivot shaft. Nevertheless, since it is necessary to secure a minimum clearance allowing the pivot shaft (such as the pivot shaft 33) and a through hole (such as the through hole 6*d*) into which the pivot shaft is fitted to rotate relative to each other, such a clearance may cause the axis of the through hole to tilt relative to the axis of the pivot shaft if the pivot shaft is a short shaft or a cantilever pivot shaft. Even if within tolerance in a conventional lens supporting structure, such a tilt must be prevented from occurring in the present embodiment of the zoom lens because each of the second lens frame 6 and the pivot shaft 33 is required to have a very high dimensional accuracy.

Figure 108:
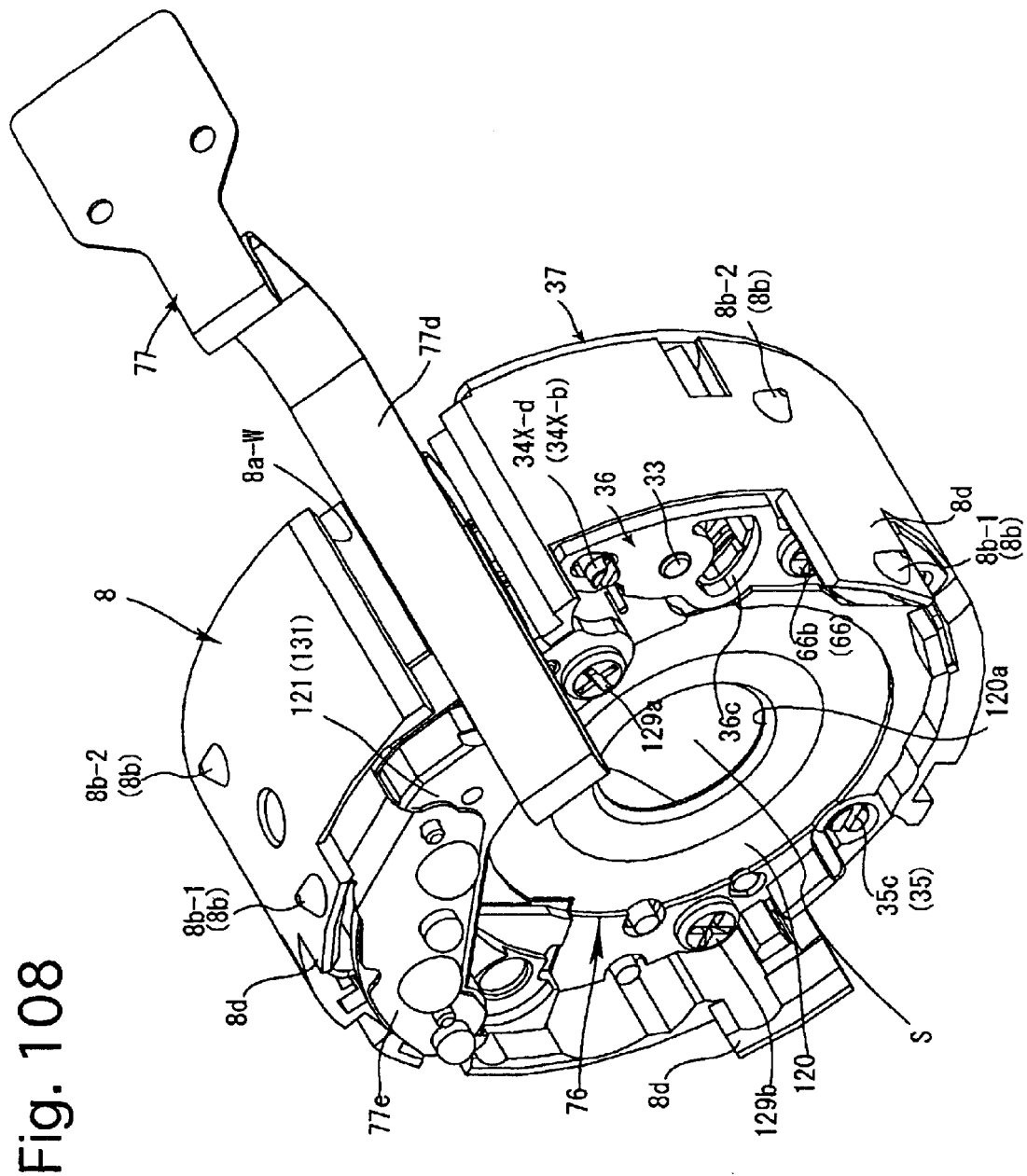
FIG. 108 is a perspective view of the second lens group moving frame and the shutter unit fixed thereto, viewed obliquely from front.

In the above described retracting structure for the second lens frame 6, since it can be seen in FIGS. 108, 109 and 113 that the front second lens frame support plate 36 and the rear second lens frame support plate 37 are respectively fixed to the front fixing surface 8*c* and the rear fixing surface 8*e*, which are respectively positioned on front and rear of the shutter unit 76 in the optical axis direction, and that the pivot shaft 33 is disposed to extend between the front second lens frame support plate 36 and the rear second lens frame support plate 37, both the front end and the rear end of the pivot shaft 33 are supported by the front second lens frame support plate 36 and the rear second lens frame support plate 37, respectively. Accordingly, the axis of the pivot shaft 33 does not easily tilt with respect to the axis of the through hole 6*d* of the second lens frame 6. Moreover, the pivot shaft 33 can be lengthened regardless of the shutter unit 76 (without interfering with the shutter unit 76) since the front second lens frame support plate 36, the rear second lens frame support plate 37 and the pivoted cylindrical portion receiving hole 8*g*, which serve as elements of the structure supporting the pivot shaft 33, are positioned not to overlap the shutter unit 76. In fact, the pivot shaft 33 is elongated so that the length thereof becomes close to the length of the second lens group moving frame 8 in the optical axis direction. In accordance with the length of the pivot shaft 33, the pivoted cylindrical portion 6*b* is elongated in the optical axis direction. Namely, a wide range of engagement in the axial direction is secured between the pivoted cylindrical portion 6*b* and the pivot shaft 33. With this structure, there is little possibility of the second lens frame 6 from tilting with respect to the pivot shaft 33, which makes it possible to rotate the second lens frame 6 about the pivot shaft 33 with a high degree of positioning accuracy.

The front boss 8j and the rear boss 8k that project from the front fixing surface 8c and the rear fixing surface 8e determine the position of the front second lens frame support plate 36 and the position of the rear second lens frame support plate 37, respectively, and the front and rear second lens frame support plates 36 and 37 are firmly fixed to the second lens group moving frame 8 by the common set screw 66. With this structure, the front and rear second lens frame support plates 36 and 37 are positioned relative to the second lens group moving frame 8 with a high degree of positioning accuracy. Therefore, the pivot pin 33 is also positioned relative to the second lens group moving frame 8 with a high degree of positioning accuracy.

In the present embodiment of the zoom lens, the set of three extensions 8d are formed on the front end surface of the second lens group moving frame 8 in front of the front fixing surface 8c, whereas the rear fixing surface 8e is flush with the rear end surface of the second lens group moving frame 8. Namely, the front fixing surface 8c is not formed on the frontmost end surface of the second lens group moving frame 8. However, if the second lens group moving frame 8 is formed as a simple cylindrical member having no projections such as the set of three extensions 8d, the front and rear second lens frame support plates 36 and 37 can be fixed to frontmost and rearmost end surfaces of the simple cylindrical member, respectively.

In the above described retracting structure for the second lens frame 6, if the range of movement of the second lens group moving frame 8 in the optical axis direction from the position corresponding to the wide-angle extremity to the retracted position is fully used to rotate the second lens frame 6 about the pivot shaft 33 from the photographing position to the radially retracted position, the second lens frame 6 will interfere with the forwardly-projecting lens holder portion 51c of the AF lens frame 51 on the way to the radially retracted position To prevent this problem from occurring, in the above described retracting structure for the second lens frame 6, the second lens frame 6 finishes rotating to the radially retracted position within an axial range of movement sufficiently shorter than the range of movement of the second lens group moving frame 8 in the optical axis direction, and subsequently the cylindrical lens holder portion 6a of the second lens frame 6 moves rearward in parallel in the optical axis direction to the space immediately above the forwardly-projecting lens holder portion 51c. Therefore, the space for the parallel displacement of the cylindrical lens holder portion 6a to the space immediately above the forwardly-projecting lens holder portion 51c must be secured in the zoom lens 71. In order for the second lens frame 8 to secure a sufficient range of rotation from the photographing position to the radially retracted position within a short range of movement in the optical axis direction, it is necessary to increase the inclination of the retracting cam surface 21c, that is formed on the front end of the position-control cam bar 21a of the CCD holder 21, with respect to the direction of movement of the second lens group moving frame 8, i.e., with respect to the optical axis direction. While the retracting cam surface 21c that is formed in such a manner presses the rear movable spring end 40b during the rearward movement of the second lens group 8, a great reaction force is exerted on the position-control cam bar 21a and the second lens group moving frame 8; such a reaction force is greater than that in the case where a cam surface (which corresponds to the cam surface 21c) the inclination of which with respect to the direction of movement of the second lens group moving frame 8 is small presses the rear movable spring end 40b during the rearward movement of the second lens group 8.

The position-control cam bar 21a is a fixed member just like the stationary barrel 22, whereas the second lens group moving frame 8 is a linearly movable member; the second lens group moving frame 8 is guided linearly without rotating about the lens barrel axis Z0 indirectly by the stationary barrel 22 via such intermediate members as the first and second linear guide rings 14 and 10, not directly by the stationary barrel 22. A clearance exits in each of the following two engagements: the engagement of the second lens group moving frame 8 with the second linear guide ring 10 and the engagement of the second linear guide ring 10 with the second linear guide ring 14. Due to this reason, it has to be taken into account that such clearances may cause the second lens group moving frame 8 and the CCD holder 21 to become misaligned in the plane orthogonal to the lens barrel axis Z0 to thereby exert an averse effect on the retracting operation for the second lens frame 6 from the photographing position to the radially retracted position if a great reaction force is exerted on the position-control cam bar 21a and the second lens group moving frame 8. For instance, if the second lens frame 6 rotates beyond an original radial-outer limit thereof (see FIG. 112) for the rotational movement of the second lens frame 6 about the pivot shaft 33 when rotated from the photographing position to the radially retracted position, the cylindrical lens holder portion 6a may interfere with an inner peripheral surface of the second lens group moving frame 8. Likewise, if the second lens frame 6 stops rotating before the original radial-outer limit when rotated from the photographing position to the radially retracted position, i.e., if the second lens frame 6 does not rotate to the original radial-outer limit when rotated from the photographing position to the radially retracted position, the cylindrical lens holder portion 6a may interfere with the AF lens frame 51 and others.

The position-control cam bar 21a and the second lens group moving frame 8 are prevented from being misaligned by inserting the guide key 21e into the guide key insertable recess 37g to hold the second lens frame 6 precisely in the radially retracted position when the second lens frame 6 rotates from the photographing position to the radially retracted position (see FIG. 106). Specifically, when the second lens group moving frame 8 is in the process of retracting toward the retracted position with the second lens frame 6 having been held in the radially retracted position by the engagement of the rear movable spring end 40b of the rear torsion coil spring 40 with the removed-position holding surface 21d, the guide key 21e enters the key way 8p of the second lens group moving frame 8 from the rear end thereof through the guide key insertable recess 37g. Since the guide key 21e and the key way 8p are an elongated projection and an elongated groove which extend in the optical axis direction, the guide key 21e is freely movable relative to the key way 8p in the optical axis direction and prevented from moving in a widthwise direction of the key way 8p when the guide key 21e is engaged in the key way 8p. Due to this structure, even if a comparatively great reaction force is exerted on the second lens group moving frame 8 while the retracting cam surface 21c presses the rear movable spring end 40b, the engagement of the guide key 21e with the key way 8p prevents the second lens group moving frame 8 and the position-control cam bar 21a from being misaligned in the plane orthogonal to the lens barrel axis Z0. Consequently, the second lens frame 6 is held precisely in the radially retracted position when the second lens frame 6 rotates from the photographing position to the radially retracted position.

Although the guide key 21e commences to be engaged in the key way 8p after the second lens frame 6 has been rotated to the radially retracted position in the present embodiment of the zoom lens, the guide key 21e can commence to be engaged in the key way 8p before the second lens frame 6 has been rotated to the radially retracted position or during the retracting movement of the second lens frame 6 toward the radially retracted position. In short, the second lens group moving frame 8 and the position-control cam bar 21a have only to be precisely aligned at the time when the second lens frame 6 is held in the radially retracted position after all. The timing of commencement of the engagement between the guide key 21e with the key way 8p can be freely determined by, e.g., changing the axial range of formation of the guide key 21e in the optical axis direction.

It is possible that the guide key 21e and the key way 8p be replaced by a key way corresponding to the key way 8p and a guide key corresponding to the guide key 21e, respectively.

Although the guide key 21e is formed on the position-control cam bar 21a which includes the retracting cam surface 21c in the above illustrated embodiment, an element corresponding to the guide key 21e can be formed on any portion on the CCD holder 21 other than the position-control cam bar 21a. However, from a structural point of view, it is desirable that the guide key 21e be formed together with the retracting cam surface 21c on the position-control cam bar 21a. In addition, to align the second lens group moving frame 8 and the position-control cam bar 21a precisely, it is desirable that the guide key 21e be formed on the position-control cam bar 21a which serves as an engaging portion which is engageable with the second lens frame 6 through the side second lens group moving frame 8.

Not only the aforementioned reaction force which is exerted on the second lens group moving frame 8 while the retracting cam surface 21c presses the rear movable spring end 40b, but also the positioning accuracy of each element of the retracting structure for the second lens frame 6 exert an adverse influence on the operating accuracy of the second lens frame 6. As described above, it is undesirable if the range of rotation of the second lens frame 6 about the pivot shaft 33 from the photographing position to the radially retracted position is either excessive or insufficient. However, if a force which may retract the second lens frame 6 beyond the radially retracted position shown in FIG. 112 is applied to the second lens frame 6, a mechanical stress is applied to the retracting structure for the second lens frame 6 because cylindrical lens holder portion 6a and the engaging protrusion 6e are brought very close to an inner peripheral surface of the second lens group moving frame 8 in the retracted state of the zoom lens 71 to achieve a space-saving retracting structure for the second lens frame 6 (see FIG. 112). Accordingly, it is required to prevent such a mechanical stress from being applied to the retracting structure for the second lens frame 6.

To prevent such mechanical stress from being applied to the retracting structure for the second lens frame 6, rather than the position control arm 6j of the pivoted cylindrical portion, the rear movable spring end 40b of the rear torsion coil spring 40 serves as a portion which is to be engageable with the retracting cam surface 21c and the removed-position holding surface 21d when the second lens frame 6 retracts from the photographing position to the radially retracted position so that a slight error in movement of the second lens group 6 is absorbed by a resilient deformation of the rear torsion coil spring 40. Although the rear torsion coil spring 40 transfers a torque from the rear movable spring end 40b to the second lens group 6 via the front stationary spring end 40a without the front stationary spring end 40a and the rear movable spring end 40b being further pressed to move in opposite directions approaching each other than those shown in FIGS. 118 through 120 as mentioned above in a normal retracting operation of the zoom lens 71, the rear movable spring end 40b is further pressed to move in a direction approaching the front stationary spring end 40a than the rear movable spring end 40b shown in FIGS. 118 through 120 within the range q1 shown in FIG. 120 if the position-control cam bar 21a slightly deviates leftward, as viewed in FIG. 120 from the original position shown in FIG. 120, since the rear movable spring end 40b is allowed to move in the first spring engaging hole 6k in the range q1 as mentioned above. Accordingly, such a movement of the rear movable spring end 40b within the range NR1 can absorb the deviation of the position-control cam bar 21a from the original position thereof. Namely, even if the position-control cam bar 21a further presses the rear movable spring end 40b in a state where the cylindrical lens holder portion 6a and the engaging protrusion 6e are in contact with an inner peripheral surface of the second lens frame moving frame 8 (in a state where an outer peripheral portion of the cylindrical lens holder portion 6a and an outer edge of the engaging protrusion 6e have entered the radial recess 8q and the second radial recess 8r, respectively), an excessive mechanical stress is prevented from being applied to the retracting structure for the second lens frame 6 by a resilient deformation of the rear torsion coil spring 40.

Figure 126:
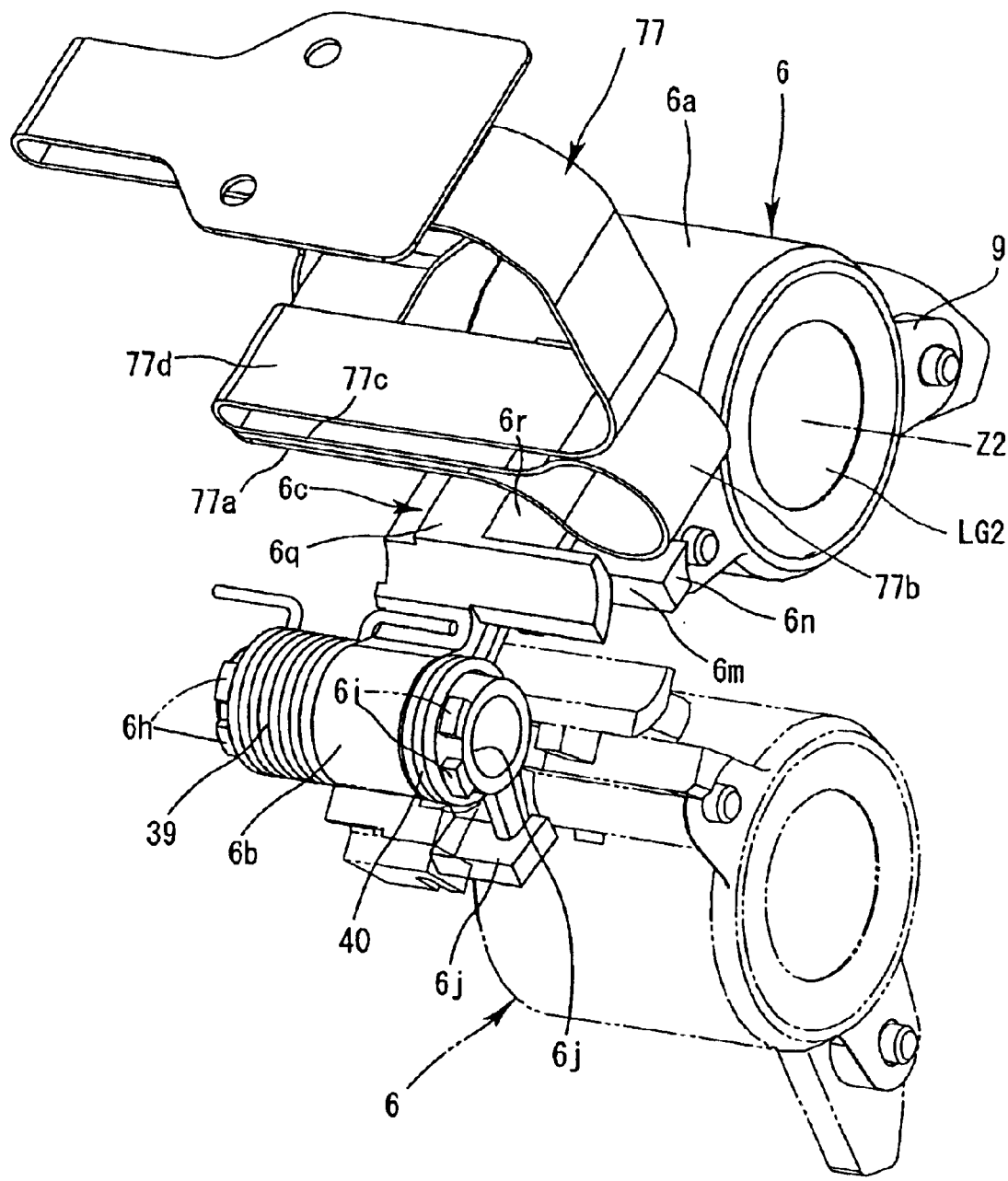

In the retracting structure for the second lens frame 6, when the second lens frame 6 is in the radially retracted position as shown in FIG. 112, a radially outside surface of the swing arm portion 6c is positioned to adjoin the bottom of the wide guide groove 8a-W to partly close the bottom of the wide guide groove 8a-W. In other words, the bottom of the wide guide groove 8a-W is formed on the radially outside of an intermediate point of a line extending between the axis of the pivot shaft 33 and the retracted optical axis Z2 of the second lens group LG2, and a part of the flexible PWB 77 is positioned in the wide guide groove 8a-W. Due to this structure, the swing arm portion 6c supports this part of the flexible PWB 77 from inside the second lens group moving frame 8 as shown in FIG. 112 when the second lens frame 6 is positioned in the radially retracted position. FIG. 126 shows the flexible PWB 77 and the second lens frame 6 by solid lines when the second lens frame 6 is positioned in the radially retracted position, and shows the second lens frame 6 by two-dot chain lines when the second lens frame 6 is positioned in the photographing position. It can be understood from FIG. 126 that the swing arm portion 6c prevents the flexible PWB 77 from curving radially inwards by pushing the first straight portion 77a and the loop-shaped turning portion 77b of the flexible PWB 77 radially outwards Specifically, the swing arm portion 6c is provided on a radially outer surface thereof with a straight flat surface 6q, and is further provided immediately behind the straight flat surface 6q with an oblique surface 6r. The rear projecting portion 6m projects rearward in the optical axis direction from a portion of the swing arm portion 6c immediately behind the straight flat surface 6q (see FIG. 105). In the retracted state of the zoom lens 71, the straight flat surface 6q pushes the first straight portion 77a radially outwards while the oblique surface 6r and the rear projecting portion 6m push the loop-shaped turning portion 77b radially outwards. The oblique surface 6r is inclined to correspond to a curve of the loop-shaped turning portion 77b.

In typical retractable lenses, in the case where a flexible PWB extends between a movable element guided in an optical axis direction and a fixed element, the flexible PWB needs to be sufficiently long to cover the full range of movement of the movable element. Therefore, the flexible PWB tends to sag when the amount of advancement of the movable element is minimum, i.e., when the retractable lens is in the retracted state. Such a tendency of the flexible PWB is especially strong in the present embodiment of the zoom lens because the length of the zoom lens 71 is greatly reduced in the retracted state thereof by retracting the second lens group so that it is positioned on the retracted optical axis Z2 and also by adopting a three-stage telescoping structure for the zoom lens 71. Since interference of any sag of the flexible PWB with internal elements of the retractable lens or jamming of a sagging portion of the flexible PWB into internal elements of the retractable lens may cause a failure of the retractable lens, it is necessary for the retractable lens to be provided with a structure preventing such problems associated with the flexible PWB from occurring. However, this preventing structure is generally complicated in conventional retractable lenses. In the present embodiment of the zoom lens 71, in the view of the fact that the flexible PWB 77 tends to sag when the zoom lens 71 is in the retracted state, the loop-shaped turning portion 77b is pushed radially outwards by the second lens frame 6 positioned in the radially retracted position, which reliably prevents the flexible PWB 77 from sagging with a simple structure.

In the retracting structure for the second lens frame 6 in the present embodiment of the zoom lens, the moving path of the second lens frame 6 from the photographing position to the radially retracted position extends obliquely from a point (front point) on the photographing optical axis Z1 to a point (rear point) behind the front point and above the photographing optical axis Z1 because the second lens frame 6 moves rearward in the optical axis direction while rotating about the pivot shaft 33. On the other hand, the AF lens frame 51 is provided thereon between the front end surface 51c1 and the side surface 51c5 with a recessed oblique surface 51h. The recessed oblique surface 51h is inclined in a radially outward direction from the photographing optical axis Z1 from front to rear of the optical axis direction. The edge of the forwardly-projecting lens holder portion 51c between the front end surface 51c1 and the side surface 51c5 is cut out along a moving path of the cylindrical lens holder portion 6a so as to form the recessed oblique surface 51h. Moreover, the recessed oblique surface 51h is formed as a concave surface which corresponds to the shape of an associated outer surface of the cylindrical lens holder portion 6a.

As described above, the AF lens frame 51 moves rearward to the rear limit for the axial movement thereof (i.e., the retracted position), at which the AF lens frame 51 (forwardly-projecting lens holder portion 51c) comes into contact with the filter holder portion 21b (stop surface), before the commencement of retracting movement of the second lens frame 6 from the photographing position to the radially retracted position. In the state shown in FIG. 123 in which the AF lens frame 51 is in contact with the filter holder portion 21b while the second lens frame 6 has not commenced to retract from the photographing position to the radially retracted position, if the second lens frame 6 starts moving rearward in the optical axis direction while rotating about the pivot shaft 33 to retract to the radially retracted position, the rear end of the cylindrical lens holder portion 6a firstly moves obliquely rearward while approaching the recessed oblique surface 51h, and subsequently further moves obliquely rearward while just missing (passing closely across) the recessed oblique surface 51h to finally reach a fully retracted position shown in FIG. 124. Namely, the retracting operation for the second lens frame 6 from the photographing position to the radially retracted position can be performed at a closer point to the AF lens frame 51 in the optical axis direction substantially by the amount by which the oblique surface 51h is recessed.

If the recessed oblique surface 51h or a similar surface is not formed on the AF lens frame 51, the retracting operation for the second lens frame 6 from the photographing position to the radially retracted position has to be completed at an earlier stage than that in the illustrated embodiment to prevent the cylindrical lens holder portion 6a from interfering with the AF lens frame 51. To this end, it is necessary to increase the amount of rearward movement of the second lens group moving frame 8 or the amount of projection of the position-control cam bar 21a from the CCD holder 22; this runs counter to further miniaturization of the zoom lens 71. If the amount of rearward movement of the second lens group moving frame 8 is fixed, the inclination of the retracting cam surface 21c with respect to the photographing axis direction has to be increased. However, if this inclination is excessively large, the reaction force which is exerted on the position-control cam bar 21a and the second lens group moving frame 8 while the retracting cam surface 21c presses the rear movable spring end 40b is increased. Accordingly, it is undesirable that the inclination of the retracting cam surface 21c be increased to prevent a jerky motion from occurring in the retracting operation for the second lens frame 6. In contrast, in the present embodiment of the zoom lens, the retracting movement of the second lens frame 6 from the photographing position to the radially retracted position can be performed even after the AF lens frame 51 has retracted at a point very close to the AF lens frame 51 due to the formation of the recessed oblique surface 51h. Therefore, even if the amount of rearward movement of the second lens group moving frame 8 is limited, the retracting cam surface 21c does not have to be shaped to be inclined largely with respect to the optical axis direction. This makes it possible to achieve further miniaturization of the zoom lens 71 with a smoothing of the retracting movement of the second lens group moving frame 8. Similar to the AF lens frame 51, the CCD holder 21 is provided on a top surface thereof behind the recessed oblique surface 51h with a recessed oblique surface 21f the shape of which is similar to the shape of the recessed oblique surface 51h. The recessed oblique surface 51h and the recessed oblique surface 21f are successively formed along a moving path of the cylindrical lens holder portion 6a to be shaped like a single oblique surface. Although the AF lens frame 51 serves as a movable member guided in the optical axis direction in the illustrated embodiment, a lens frame similar to the AF lens frame 51 can be provided with a recessed oblique surface corresponding to the recessed oblique surface 51h to incorporate features similar to the above described features of the recessed oblique surface 51h even if the lens frame similar to the AF lens frame 51 is of a type which is not guided in an optical axis direction.

As can be understood from the above descriptions, the retracting structure for the second lens frame 6 is designed so that the second lens frame 6 does not interfere with the AF lens frame 51 when moving rearwards while retracting radially outwards to the radially retracted position in a state where the AF lens frame 51 has retracted to the rear limit (the retracted position) for the axial movement of the AF lens frame 51 as shown in FIGS. 123 and 124. In this state, upon the main switch being turned OFF, the control circuit 140 drives the AF motor 160 in the lens barrel retracting direction to move the AF lens frame 51 rearward the retracted position thereof. However, if the AF lens frame 51 does not retract to the retracted position accidentally for some reason upon the main switch being turned OFF, the AF lens frame 51 may interfere with the moving path of the second lens group 6 which is in the middle of moving rearward together with the second lens group moving frame 8 while rotating to the radially retracted position (see FIGS. 127 and 129).

To prevent such a problem from occurring, the zoom lens 71 is provided with a fail-safe structure. Namely, the second lens frame 6 is provided on the swing arm portion 6*c* with the rear projecting portion 6*m* that projects rearward, beyond the rear end of the second lens group LG2, in the optical axis direction, while the AF lens frame 51 is provided, on that portion of the front end surface 51*c*1 of the forwardly-projecting lens holder portion 51*c* which faces the rear projecting portion 6*m*, with a rib-like elongated protrusion 51*f* which projects forward from the front end surface 51*c*1 (see FIGS. 123, 124 and 127 through 130). As shown in FIG. 130, the elongated protrusion 51*f* is elongated vertically, and is formed to lie in a plane orthogonal to the photographing optical axis Z1 to correspond to the range of rotation of the rear projecting portion 6*m* (the contacting surface 6*n*) about the pivot shaft 33 at the rotation of the second lens frame 6 from the photographing position to the radially retracted position. The rear projecting portion 6*m* and the rib-like elongated protrusion 51*f* are elements of the aforementioned fail-safe structure.

With the fail-safe structure, even if the second lens frame 6 starts retracting to the radially retracted position in a state where the AF lens frame 51 does not retract to the retracted position and stops short of the retracted position accidentally upon the main switch being turned OFF, the contacting surface 6*n* of the rear projecting portion 6*m* surely comes into contact with the rib-like elongated protrusion 51*f* of the AF lens frame 51 first. This prevents the second lens group LG2 from coming into collision with the AF lens frame 51 to get scratched and damaged thereby even if such a malfunction occurs. In other words, since the moving path of the rear projecting portion 6*m* does not overlap the third lens group LG3 in the optical axis direction at any angular positions of the second lens frame 6, there is no possibility of any portions of the second lens group 6 other than the rear projecting portion 6*m* coming into contact with the third lens group LG3 to scratch the third lens group LG3. Accordingly, since the rear projecting portion 6*m* and the elongated protrusion 51*f* are only the portions at which the second lens group LG2 and the AF lens frame 51 can contact with each other, the optical performances of the second lens group LG2 and the third lens group LG3 are prevented from deteriorating even if the AF lens frame 51 stops short of the retracted position accidentally upon the main switch being turned OFF. If such a malfunction occurs, it is possible for the second lens frame 6 in the process of moving rearward while rotating to the radially retracted position to push back the AF lens frame 51 forcefully, via the rear projecting portion 6*m*, which stops short of the retracted position.

Note that although in the illustrated embodiment, the contacting surface 6*n* and the rib-like elongated protrusion 51*f* are (possible) contact surfaces, an alternative embodiment can be applied wherein (possible) contact surfaces of the second lens group frame 6 and the AF lens frame 51 differ from that of the illustrated embodiment. For example, a projection like that of the rear projecting portion 6*m* can be provided on the AF lens frame 51. Namely, an appropriate position can be provided whereby the above-mentioned projection and another member contact each other before the second lens group LG2 and the third lens group L3 contact any other members.

The contacting surface 6*n* lies in a plane orthogonal to the photographing optical axis Z1, whereas the front surface of the elongated protrusion 51*f* is formed as an inclined contacting surface 51*g* which is inclined to a plane orthogonal to the optical axis of the photographing optical axis Z1 by an angle of NR2 as shown in FIG. 128. The inclined contacting surface 51*g* is inclined toward the rear of the optical axis direction in the direction of movement of the rear projecting portion 6*m* from a position when the second lens frame 6 is in the photographing position to a position when the second lens frame 6 is in the radially retracted position (upwards as viewed in FIGS. 128 through 130). Unlike the illustrated embodiment, if the front surface of the elongated protrusion 51*f* is formed as a mere flat surface parallel to the contacting surface 6*n*, the frictional resistance produced between the elongated protrusion 51*f* and the contacting surface 6*n* becomes great to impede a smooth movement of the second lens frame 6 in the event that the contacting surface 6*n* comes into contact with the elongated protrusion 51*f* when the second lens frame 6 is in the process of moving rearward while rotating to the radially retracted position. In contrast, according to the present embodiment of the fail-safe structure, even if the contacting surface 6*n* comes into contact with the elongated protrusion 51*f* when the second lens frame 6 is in the middle of moving rearward while rotating to the radially retracted position, a great frictional resistance is not produced between the elongated protrusion 51*f* and the contacting surface 6*n* because of the inclination of the elongated protrusion 51*f* with respect to the contacting surface 6*n*. This makes it possible to retract the zoom lens 71 with reliability with less frictional force produced between the elongated protrusion 51*f* and the contacting surface 6*n* even if the aforementioned malfunction occurs. In the present embodiment of the fail-safe structure, the angle of inclination NR 2 shown in FIG. 128 is set at three degrees as a desirable angle of inclination.

It is possible that the elongated protrusion 51*f* be formed so that the recessed oblique surface 51*h* can come into contact with the light shield ring 9, that is fixed to the rear end of the cylindrical lens holder portion 6*a*, to serve just like the inclined contacting surface 51*g* of the above illustrated embodiment of the fail-safe structure in the case where the AF lens frame 51 stops short of the retracted position accidentally to a lesser extent than the rear projecting portion 6*m* comes into contact with the elongated protrusion 51*f*.

In the retracted position for the second lens frame 6, the position of the optical axis of the second lens group LG2 can be adjusted in directions lying in a plane orthogonal to the photographing optical axis Z1 in such a case where the optical axis of the second lens group LG2 is not precisely coincident with the photographing optical axis Z1 even though the second lens group LG2 is in the photographing position. Such an adjustment is carried out by two positioning devices: a first positioning device for adjusting the positions of the front and rear second lens frame support plates 36 and 37 relative to the second lens group moving frame 8, and a second positioning device for adjusting the point of engagement of the eccentric pin 35*b* of the rotation limit shaft 35 with the engaging protrusion 6*e* of the second lens frame 6. The first eccentric shaft 34X and the second eccentric shaft 34Y are elements of the first positioning device; the positions of the front and rear second lens frame support plates 36 and 37 relative to the second lens group moving frame 8 are adjusted by rotating the first eccentric shaft 34X and the second eccentric shaft 34Y. The rotation limit shaft 35 is a element of the second positioning device; the point of engagement of the eccentric pin 35b with the engaging protrusion 6e is adjusted by rotating the rotation limit shaft 35.

Figure 110:
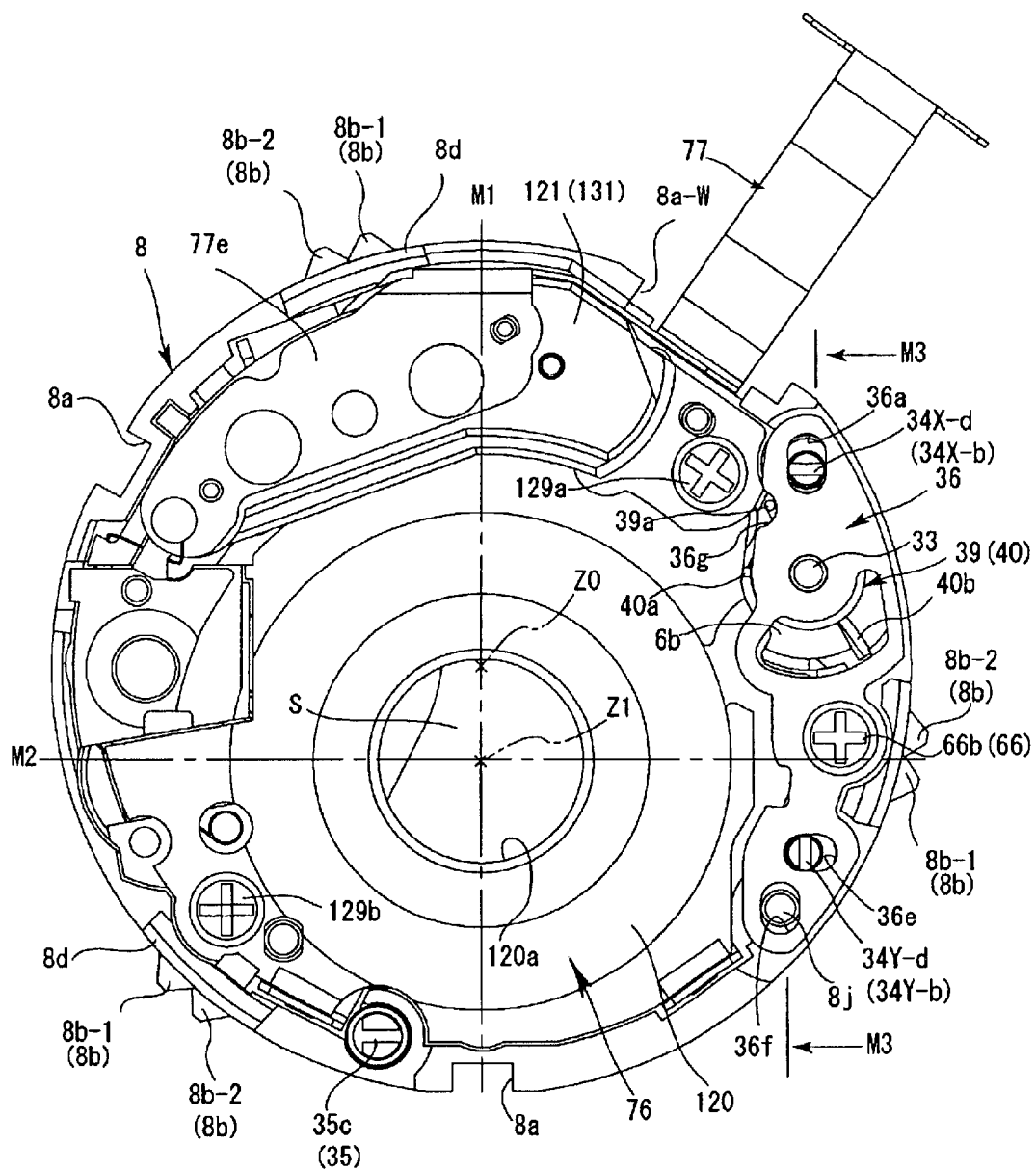
FIG. 110 is a front elevational view of the second lens group moving frame and the shutter unit shown in FIG. 108.
Figure 114:
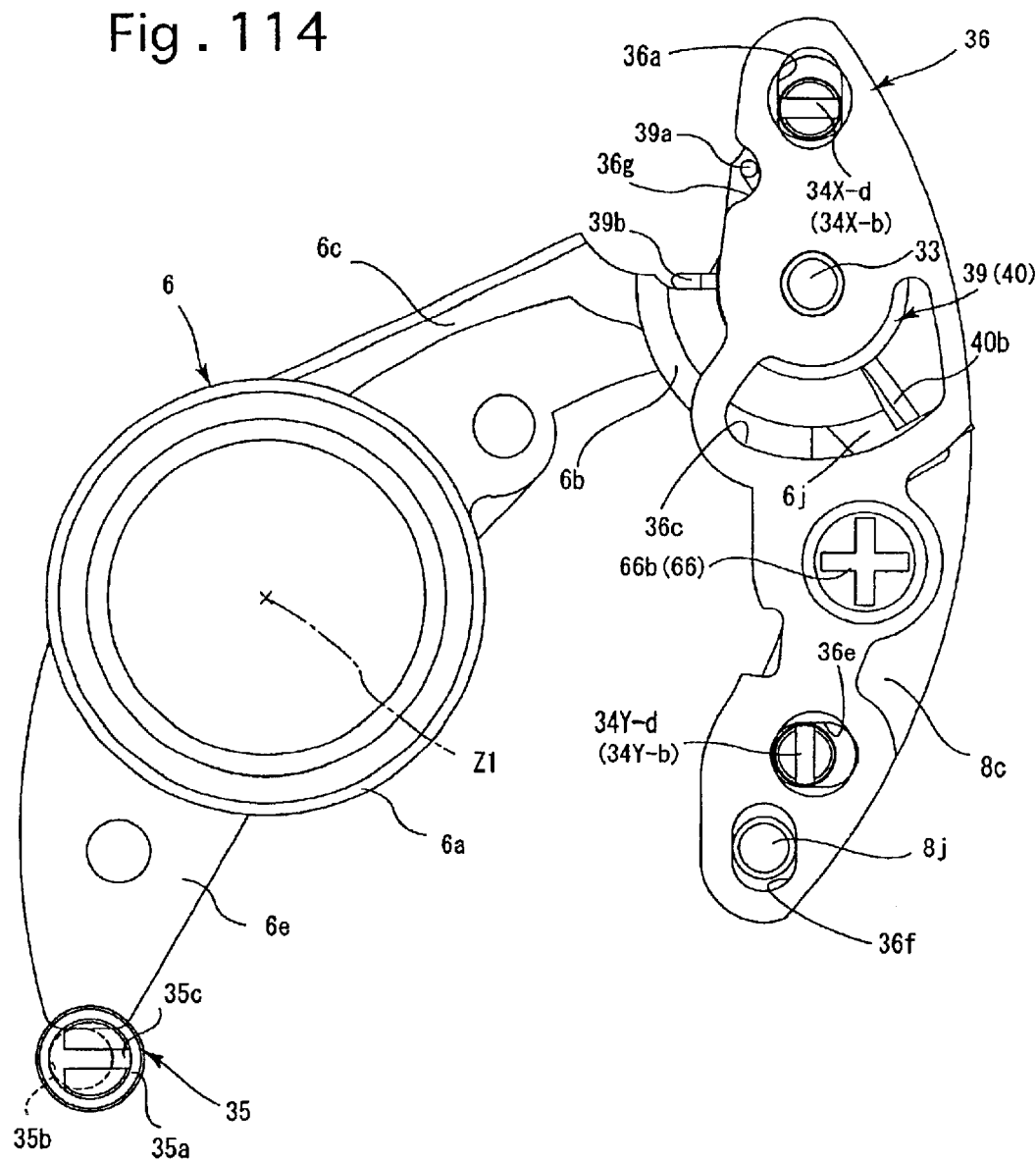
FIG. 114 is a front elevational view of the structure for the second lens frame shown in FIGS. 105 and 108 through 112, showing a state where the second lens frame is held at a photographing position thereof as shown in FIG. 110.
Figure 115:
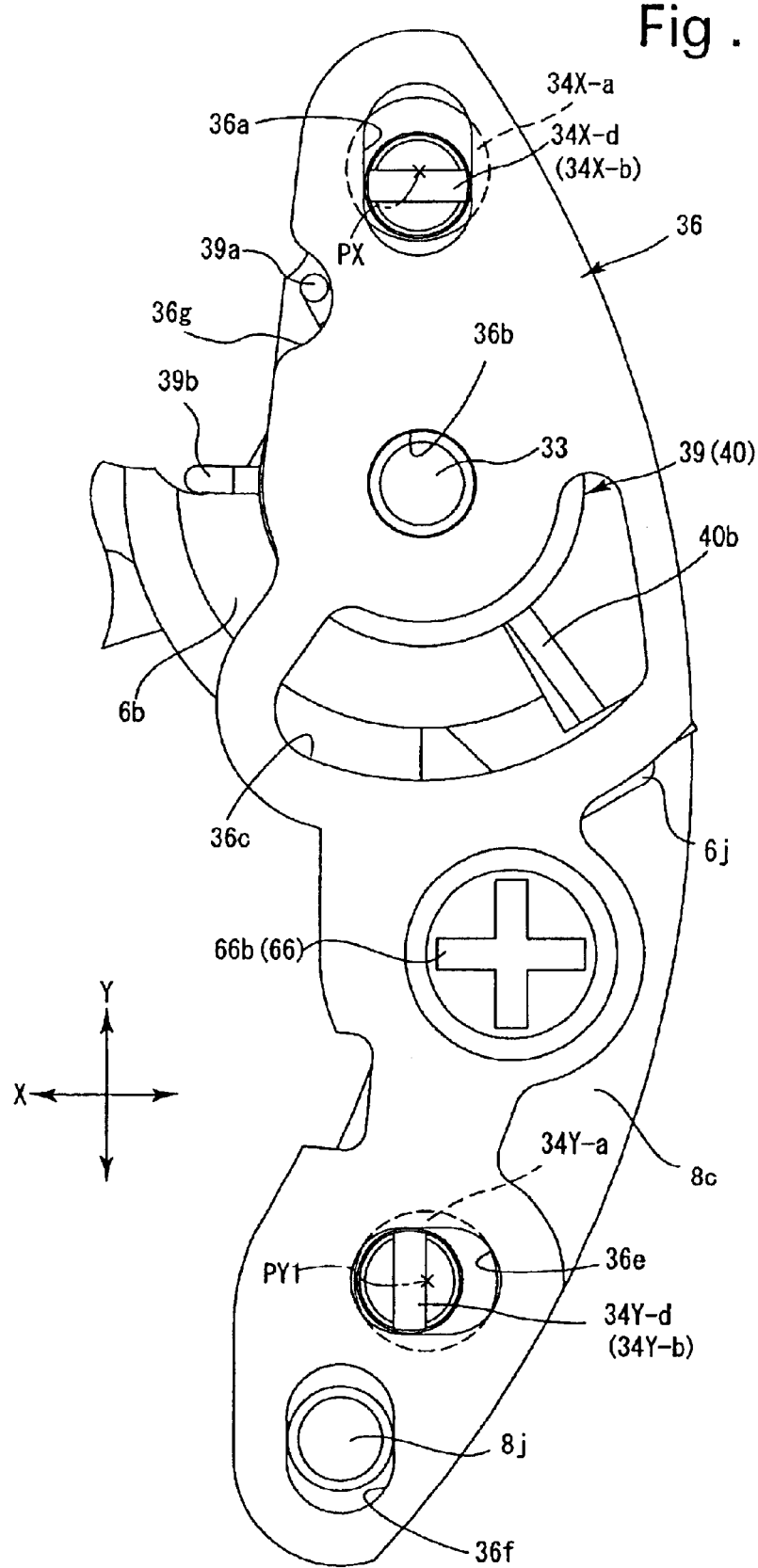
FIG. 115 is a front elevational view of a portion of the structure for the second lens frame shown in FIG. 114.

First, the first positioning device for adjusting the positions of the front and rear second lens frame support plates 36 and 37 relative to the second lens group moving frame 8 will be discussed hereinafter. As described above, the front eccentric pin 34X-b of the first eccentric shaft 34X is inserted into the first vertically-elongated hole 36a to be movable and immovable in the first vertically-elongated hole 36a in the lengthwise direction and the widthwise direction thereof, respectively, while the rear eccentric pin 34Y-b of the second eccentric shaft 34Y is inserted into the horizontally-elongated hole 36e to be movable and immovable in the horizontally-elongated hole 36e in the lengthwise direction and the widthwise direction thereof, respectively, as shown in FIGS. 110, 114 and 115. The lengthwise direction of the first vertically-elongated hole 36a, which corresponds to the vertical direction of the digital camera 70, is orthogonal to the lengthwise direction of the horizontally-elongated hole 36e, which corresponds to the horizontal direction of the digital camera 70 as shown in FIGS. 110, 114 and 115. In the following descriptions, the lengthwise direction of the first vertically-elongated hole 36a is referred to as "Y-direction" while the lengthwise direction of the horizontally-elongated hole 36e is referred to as "X-direction".

The lengthwise direction of the first vertically-elongated hole 37a is parallel to the lengthwise direction of the first vertically-elongated hole 36a. Namely, the first vertically-elongated hole 37a is elongated in the Y-direction. The first vertically-elongated hole 36a and the first vertically-elongated hole 37a are formed at opposed positions on the front and rear second lens frame support plates 36 and 37 in the optical axis direction. The lengthwise direction of the horizontally-elongated hole 37e is parallel to the lengthwise direction of the horizontally-elongated hole 36e. Namely, the horizontally-elongated hole 37e is elongated in the X-direction. The horizontally-elongated hole 36e and the horizontally-elongated hole 37e are formed at opposed positions on the front and rear second lens frame support plates 36 and 37 in the optical axis direction. Similar to the front eccentric pin 34X-b, the rear eccentric pin 34X-c is movable and immovable in the first vertically-elongated hole 37a in the Y-direction and X-direction, respectively. The front eccentric pin 34Y-b is movable and immovable in the horizontally-elongated hole 37e in the X-direction and Y-direction, respectively.

Similar to the pair of first vertically-elongated holes 36a and 37a and the pair of horizontally-elongated holes 36e and 37e, the lengthwise direction of the second vertically-elongated hole 36f is parallel to the lengthwise direction of the second vertically-elongated hole 37f, while the second vertically-elongated hole 36f and the second vertically-elongated hole 37f are formed at opposed positions on the front and rear second lens frame support plates 36 and 37 in the optical axis direction. The pair of the second vertically-elongated holes 36f and 37f are each elongated in the Y-direction to extend parallel to the pair of first vertically-elongated holes 36a and 37a. The front boss 8j, which is engaged in the second vertically-elongated hole 36f, is movable and immovable in the second vertically-elongated hole 36f in the Y-direction and X-direction, respectively. Similar to the front boss 8j, the rear boss 8k, which is engaged in the second vertically-elongated hole 37f, is movable and immovable in the second vertically-elongated hole 37f in the Y-direction and X-direction, respectively.

As shown in FIG. 113, the large diameter portion 34X-a is inserted into the first eccentric shaft support hole 8f so as not to move in radial directions thereof, and is accordingly rotatable about the axis (adjustment axis PX) of the large diameter portion 34X-a. Likewise, the large diameter portion 34Y-a is inserted into the second eccentric shaft support hole 8i so as not to move in radial directions thereof, and is accordingly rotatable on the axis (adjustment axis PY1) of the large diameter portion 34Y-a.

The front eccentric pin 34Y-b and the rear eccentric pin 34Y-c have the common axis eccentric to the axis of the large diameter portion 34Y-a as mentioned above. Therefore, a rotation of the second eccentric shaft 34Y on the adjustment axis PY1 causes the front and rear eccentric pins 34Y-b and 34b-c to revolve about the adjustment axis PY1, i.e., rotate in a circle about the adjustment axis PY1, thus causing the front eccentric pin 34Y-b to push the front second lens frame support plate 36 in the Y-direction while moving in the X-direction and at the same time causing the rear eccentric pin 34Y-c to push the rear second lens frame support plate 37 in the Y-direction while moving in the X-direction. At this time, the front second lens frame support plate 36 moves linearly in the Y-direction while guided in the same direction by the front eccentric pin 34Y-b and the front boss 8j since both the first vertically-elongated hole 36a and the second vertically-elongated hole 36f are elongated in the Y-direction, and at the same time, the rear second lens frame support plate 37 moves linearly in the Y-direction while guided in the same direction by the rear eccentric pin 34Y-c and the rear boss 8k since both the first vertically-elongated hole 37a and the second vertically-elongated hole 37f are elongated in the Y-direction. Consequently, the position of the second lens frame 6 relative to the second lens group moving frame 8 on the front fixing surface 8c thereof varies to adjust the position of the optical axis of the second lens group LG2 in the Y-direction.

The front eccentric pin 34X-b and the rear eccentric pin 34X-c have the common axis eccentric to the axis of the large diameter portion 34X-a as mentioned above. Therefore, a rotation of the first eccentric shaft 34X on the adjustment axis PX causes the front and rear eccentric pins 34X-b and 34X-c to revolve about the adjustment axis PX, i.e., rotate in a circle about the adjustment axis PX, thus causing the front eccentric pin 34X-b to push the front second lens frame support plate 36 in the X-direction while moving in the Y-direction and at the same time causing the rear eccentric pin 34X-c to push the rear second lens frame support plate 37 in the X-direction while moving in the Y-direction. At this time, although the front eccentric pin 34Y-b and the rear eccentric pin 34Y-c are respectively movable in the horizontally-elongated hole 36e and the horizontally-elongated hole 37e in the X-direction, the front second lens frame support plate 36 swings about a fluctuating axis (not shown) extending substantially parallel to the common axis of the front and rear bosses 8j and 8k in the vicinity of this common axis since the second vertically-elongated hole 36f is immovable in the X-direction relative to the front boss 8j and at the same time the rear second lens frame support plate 37 swings about the fluctuating axis since the second vertically-elongated hole 37f is immovable in the X-direction relative to the rear boss 8k. The position of the fluctuating axis corresponds to the following two resultant positions: a front resultant position between the position of the horizontally-elongated hole 36e relative to the front eccentric pin 34Y-b and the position of the second vertically-elongated hole 36f relative to the front boss 8j, and a rear resultant position between the position of the horizontally-elongated hole 37e relative to the rear eccentric pin 34Y-b and the position of the second vertically-elongated hole 37f relative to the rear boss 8k. Therefore, the fluctuating axis fluctuates in parallel to itself by a swing of the front and rear second lens frame support plates 36 and 37 about the fluctuating axis. A swing of the front and rear second lens frame support plates 36 and 37 about the fluctuating axis causes the pivot shaft 33 to move substantially linearly in the X-direction. Therefore, the second lens group LG2 moves in the X-direction by a rotation of the first eccentric shaft 34X on the adjustment axis PX.

Figure 116:
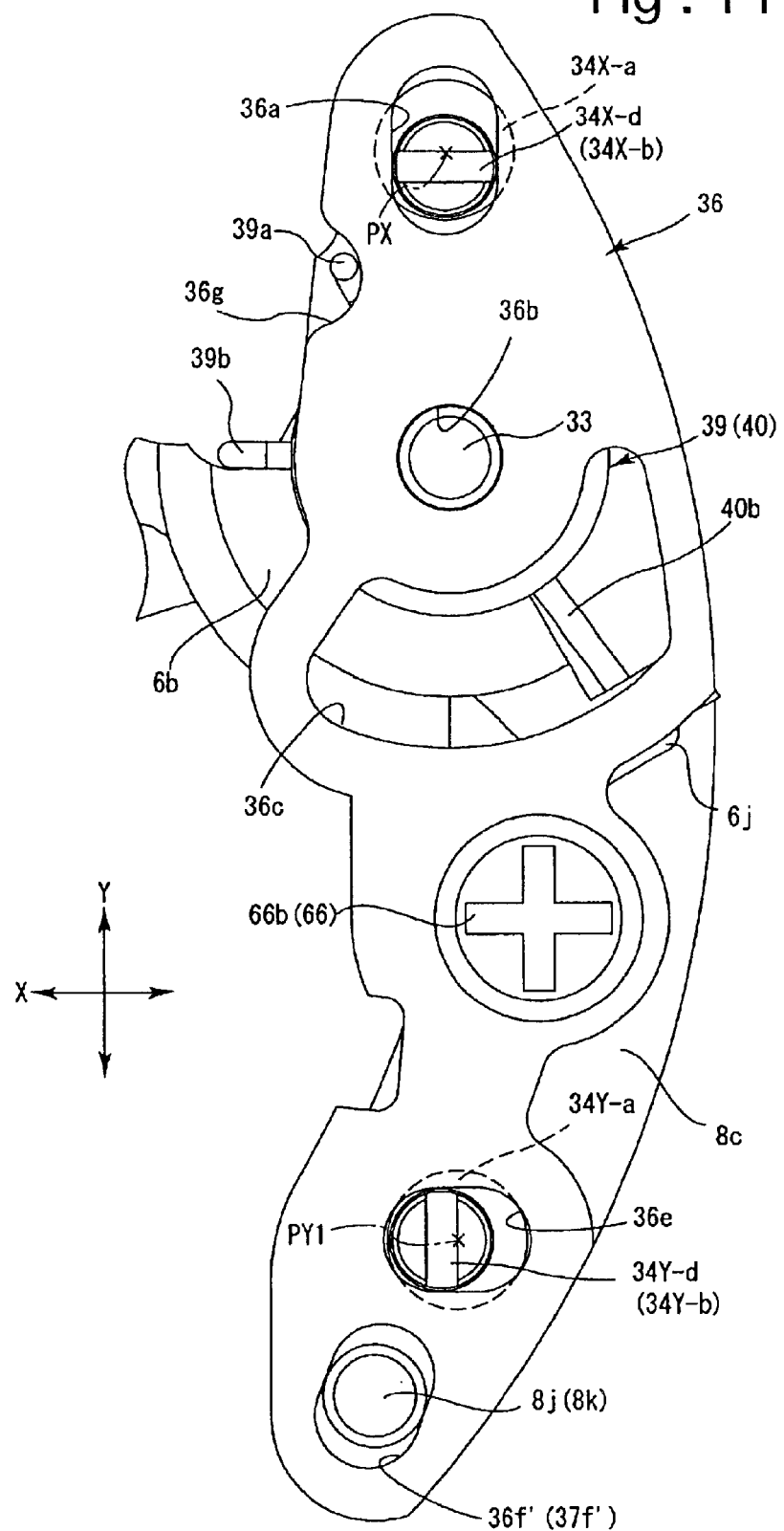
FIG. 116 is a view similar to that of FIG. 115 in a different state.

FIG. 116 shows another embodiment of the first positioning device for adjusting the positions of the front and rear second lens frame support plates 36 and 37 relative to the second lens group moving frame 8. This embodiment of the first positioning device is different from the above described first positioning device in that a front obliquely-elongated hole 36f' and a rear obliquely-elongated hole 37f' in which the front boss 8j and the rear boss 8k are engaged are formed on the front and rear second lens frame support plates 36 and 37 instead of the second vertically-elongated hole 36f and the second vertically-elongated hole 37f, respectively. The front obliquely-elongated hole 36f' and the rear obliquely-elongated hole 37f' extend parallel to each other obliquely to both X-direction and Y-direction, and are aligned in the optical axis direction. Since each of the front obliquely-elongated hole 36f' and the rear obliquely-elongated hole 37f' includes both a component in the X-direction and a component in the Y-direction, a rotation of the second eccentric shaft 34Y on the adjustment axis PY1 causes the front obliquely-elongated hole 36f' and the rear obliquely-elongated hole 37f' to move in the Y-direction while moving in the X-direction slightly relative to the front boss 8j and the rear boss 8k, respectively. Consequently, the front and rear second lens frame support plates 36 and 37 move in the Y-direction while the respective lower end portions thereof swing slightly in the X-direction. On the other hand, a rotation of the first eccentric shaft 34X on the adjustment axis PX causes the front and rear second lens frame support plates 36 and 37 to move in the X-direction while moving (swinging) slightly in the Y-direction. Accordingly, the position of the optical axis of the second lens group LG2 can be adjusted in directions lying in a plane orthogonal to the photographing optical axis Z1 by a combination of an operation of the first eccentric shaft 34X and an operation of the second eccentric shaft 34Y.

The set screw 66 needs to be loosened before the position of the optical axis of the second lens group LG2 is adjusted by operating the first eccentric shaft 34X and the second eccentric shaft 34Y. The set screw 66 is tightened after the adjustment operation is completed. Thereafter, the front and rear second lens frame support plates 36 and 37 are tightly fixed to the front fixing surface 8c and the rear fixing surface 8e to be held at their respective adjusted positions. Therefore, the pivot shaft 33 is also held at its adjusted position. Consequently, the position of the optical axis of the second lens group LG2 is held at its adjusted position since the position of the optical axis of the second lens group LG2 depends on the position of the pivot shaft 33. As a result of the optical axis position adjustment operation, the set screw 66 has been moved radially from the previous position thereof; however, this presents no problem because the set screw 66 does not move radially to such an extent so as to interfere with the second lens group moving frame 8 by the optical axis position adjustment operation since the threaded shaft portion 66a is loosely fitted in the screw insertion hole 8h as shown in FIG. 113.

A two-dimensional positioning device which incorporates a first movable stage movable linearly along a first direction and a second movable stage movable linearly along a second direction perpendicular to the first direction, wherein an object the position of which is to be adjusted is mounted on the second movable stage, is known in the art. The structure of this conventional two-dimensional positioning device is generally complicated. In contrast, the above illustrated first positioning device for adjusting the positions of the front and rear second lens frame support plates 36 and 37 relative to the second lens group moving frame 8 is simple because each of the front second lens frame support plate 36 and the rear second lens frame support plate 37 is supported on a corresponding single flat surface (the front fixing surface 8c or the rear fixing surface 8e) to be movable thereon in both X-direction and Y-direction, which makes it possible to achieve a simple two-dimensional positioning device.

Although the above illustrated first positioning device includes two support plates (the pair of second lens frame support plates 36 and 37) for supporting the second lens frame 6, which are positioned separately from each other in the optical axis direction to increase a stability of the structure supporting the second lens frame 6, it is possible for the second lens frame 6 to be supported with only one of the two support plates. In this case, the first positioning device has only to be provided on the one support plate.

Nevertheless, in the above illustrated embodiment of the first positioning device, the front second lens frame support plate 36 and the rear second lens frame support plate 37 are arranged on front and rear sides of the second lens group moving frame 8, each of the first and second eccentric shafts 34X is provided at the front and rear ends thereof with a pair of eccentric pins (34X-b and 34X-c), respectively, and the second lens group moving frame 8 is provided on front and rear sides thereof with a pair of bosses (8j and 8k), respectively. With this arrangement, a rotation of either eccentric shafts 34X or 34Y causes the pair of second lens frame support plates 36 and 37 to move in parallel as one-piece member. Specifically, rotating the first eccentric shaft 34X with a screwdriver engaged in the recess 34X-d causes the front and rear eccentric pins 34X-b and 34X-c to rotate together by the same amount of rotation in the same rotational direction, thus causing the pair of second lens frame support plates 36 and 37 to move in parallel as an integral member in the X-direction. Likewise, rotating the second eccentric shaft 34Y with a screwdriver engaged in the recess 34Y-d causes the front and rear eccentric pins 34Y-b and 34Y-c to rotate together by the same amount of rotation in the same rotational direction, thus causing the pair of second lens frame support plates 36 and 37 to move in parallel as an integral member in the Y-direction. When the first and second eccentric shafts 34X and 34Y are each rotated with a screwdriver engaged in the recesses 34X-d and 34Y-d, respectively, the rear second lens frame support plate 37 properly follows the movement of the front second lens frame support plate 36 without being warped. Accordingly, the optical axis of the second lens group LG2 does not tilt by an operation of the first positioning device, which makes it possible to adjust the position of the optical axis of the second lens group LG2 two-dimensionally in directions lying in a plane orthogonal to the photographing optical axis Z1 with a high degree of precision.

Since the first and second eccentric shafts 34X and 34Y are supported and held between the front second lens frame support plate 36 and the rear second lens frame support plate 37 disposed on front and rear sides of the shutter unit 76, each of the first and second eccentric shafts 34X and 34Y is elongated so that the length thereof becomes close to the length of the second lens group moving frame 8 in the optical axis direction, just as the length of the pivot shaft 33. This prevents the second lens group moving frame 8 from tilting, which accordingly makes it possible to adjust the position of the optical axis of the second lens group LG2 two-dimensionally in directions lying in a plane orthogonal to the photographing optical axis Z1 with a higher degree of precision.

The second positioning device for adjusting the point of engagement of the eccentric pin 35b of the rotation limit shaft 35 with the engaging protrusion 6e of the second lens frame 6 will be hereinafter discussed. As shown in FIGS. 111 and 112, the large diameter portion 35a of the rotation limit shaft 35 is rotatably fitted in the through hole 8m with the eccentric pin 35b projecting rearward from the rear end of the through hole 8m. Note that the large diameter portion 35a of the rotation limit shaft 35 does not rotate by itself with respect to the through hole 8m, however, if a predetermined amount of force is applied, it is possible for the large diameter portion 35a to be rotated.

Figure 117:
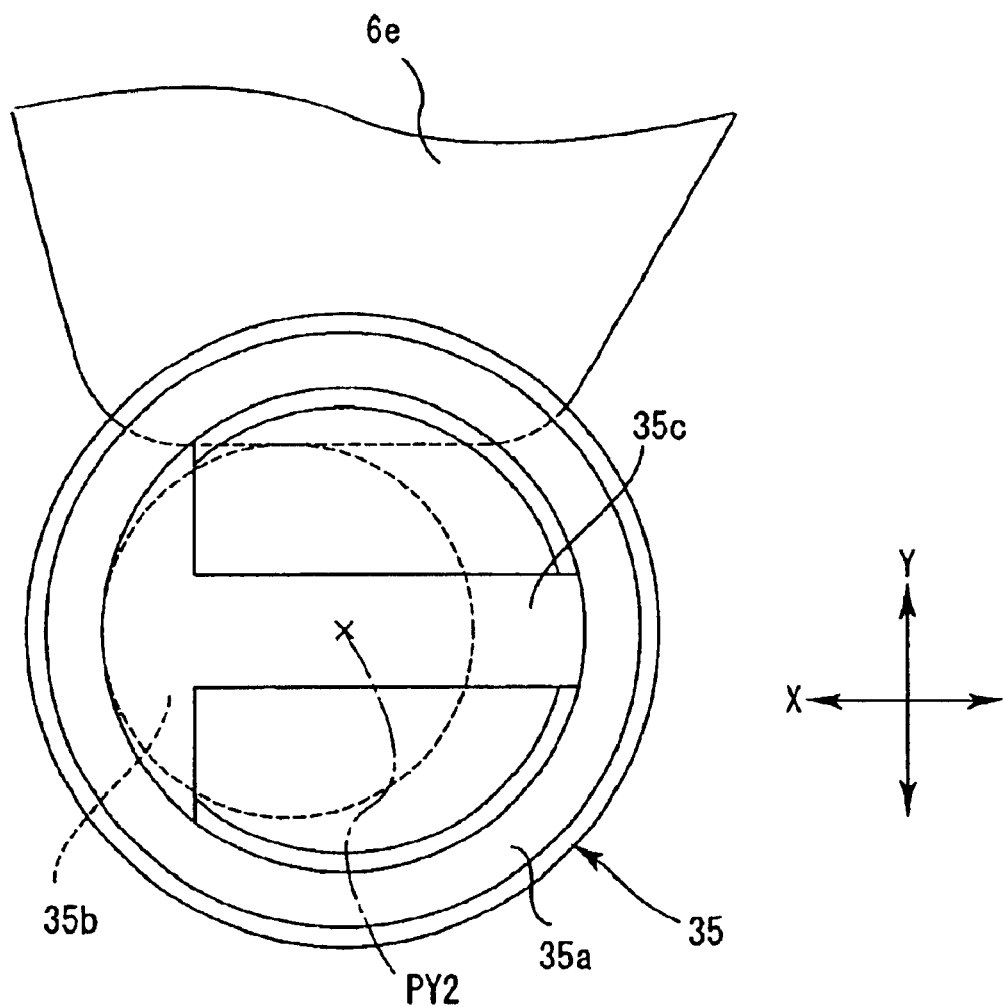
FIG. 117 is a front elevational view of a portion of the structure for the second lens frame shown in FIGS. 105 and 108 through 116.

As shown in FIG. 109, the eccentric pin 35b is positioned at one end of the moving path of the tip of the engaging protrusion 6e of the second lens frame 6. The eccentric pin 35b projects rearward from the rear end of the large diameter portion 35a so that the axis of the eccentric pin 35b is eccentric from the axis of the large diameter portion 35a as shown in FIG. 117. Therefore, a rotation of the eccentric pin 35b on an axis thereof (adjustment axis PY2) causes the eccentric pin 35b to revolve about the adjustment axis PY2, thus causing the eccentric pin 35b to move in the Y-direction. Since the eccentric pin 35b of the rotation limit shaft 35 serves as an element for determining the photographing position of the second lens frame 6, a displacement of the eccentric pin 35b in the Y-direction causes the second lens group LG2 to move in the Y-direction. Therefore, the position of the optical axis of the second lens group LG2 can be adjusted in the Y-direction by an operation of the rotation limit shaft 35. Accordingly, the position of the optical axis of the second lens group LG2 can be adjusted in the Y-direction by the combined use of the rotation limit shaft 35 and the second eccentric shaft 34Y. It is desirable that the rotation limit shaft 35 be operated secondarily in a particular case where the range of adjustment of the second eccentric shaft 34Y is insufficient.

As shown in FIG. 110, the recess 34X-d of the first eccentric shaft 34X, the recess 34Y-d of the second eccentric shaft 34Y and the recess 35c of the rotation limit shaft 35 are all exposed to the front of the second lens group moving frame 8. In addition, the head of the set screw 66 that is provided with the cross slot 66b is exposed to the front of the second lens group moving frame 8. Due to this structure, the position of the optical axis of the second lens group LG2 can be adjusted two-dimensionally with the above described first and second positioning devices from the front of the second lens group moving frame 8, i.e., all the operating members of the first and second positioning devices are accessible from the front of the second lens group moving frame 8. On the other hand, the first external barrel 12, that is positioned radially outside the second lens group moving frame 8, is provided on an inner peripheral surface thereof with the inner flange 12c which projects radially inwards to close the front of the second lens group moving frame 8 in cooperation with the fixing ring 3.

As shown in FIGS. 131 and 132, the first external barrel 12 is provided on the inner flange 12c with four screwdriver insertion holes 12g1, 12g2, 12g3 and 12g4 which penetrate the inner flange 12c in the optical axis direction so that the recess 34X-d, the recess 34Y-d, the recess 35c and the cross slot 66b are exposed to the front of the first external barrel 12, respectively. A screwdriver can be brought into engagement with the recess 34X-d, the recess 34Y-d, the recess 35c and the cross slot 66b from the front of the second lens group moving frame 8 through the four screwdriver insertion holes 12g1, 12g2, 12g3 and 12g4, respectively, without removing the first external barrel 12 from the front of the second lens group moving frame 8. As shown in FIGS. 2, 131 and 132, portions of the fixing ring 3 which are aligned with the screwdriver insertion holes 12g2, 12g3 and 12g4 are cut out so as not to interfere with the screwdriver. The respective front ends of the four screwdriver insertion holes 12g1, 12g2, 12g3 and 12g4 are exposed to the front of the zoom lens 71 by removing the lens barrier cover 101 and the aforementioned lens barrier mechanism positioned immediately behind the lens barrier cover 101. Due to this structure, the position of the optical axis of the second lens group LG2 can be adjusted two-dimensionally with the above described first and second positioning devices from the front of the second lens group moving frame 8 without dismounting components of the zoom lens 71 except for substantially the lens barrier mechanism, i.e., in substantially finished form. Accordingly, the position of the optical axis of the second lens group LG2 can be easily adjusted two-dimensionally with the first and second positioning devices in a final assembling process even if the degree of deviation of the second lens group LG2 is out of tolerance during assembly. This results in an improvement in workability of the assembly process.

The structure accommodating the second lens group LG2 and other optical elements behind the second lens group LG2 in the camera body 72 upon the main switch of the digital camera 70 being turned OFF has mainly been discussed above. Improvements in the structure of the zoom lens 71 which accommodates the first lens group LG1 upon the main switch of the digital camera 70 being turned OFF will be hereinafter discussed in detail.

As shown in FIG. 2, the inner flange 12c of the first external barrel 12 is provided at radially opposite positions thereon with respect to the photographing optical axis Z1 with a pair of first guide grooves 12b, respectively, while the first lens group adjustment ring 2 is provided on an outer peripheral surface thereof with a corresponding pair of guide projections 2b which project radially outwards in opposite directions away from each other to be slidably fitted in the pair of first guide grooves 12b, respectively. Only one guide projection 2b and the associated first guide groove 12b appear in FIGS. 9, 141 and 142. The pair of first guide grooves 12b extend parallel to the photographing optical axis Z1 so that the combination of the first lens frame 1 and the first lens group adjustment ring 2 is movable in the optical axis direction with respect to the first external barrel 12 by engagement of the pair of guide projections 2b with the pair of first guide grooves 12b.

The fixing ring 3 is fixed to the first external barrel 12 by the two set screws 64 to close the front of the pair of guide projections 2b. The fixing ring 3 is provided at radially opposite positions thereon with respect to the photographing optical axis Z1 with a pair of spring receiving portions 3a, so that a pair of compression coil springs 24 are installed in a compressed manner between the pair of spring receiving portions 3a and the pair of guide projections 2b, respectively. Therefore, the first lens group adjustment ring 2 is biased rearward in the optical axis direction with respect to the first external barrel 12 by the spring force of the pair of compression coil springs 24.

In an assembly process of the digital camera 70, the position of the first lens frame 1 relative to the first lens group adjustment ring 2 in the optical axis direction can be adjusted by changing the position of engagement of the male screw thread 1a relative to the female screw thread 2a of the first lens group adjustment ring 2. This adjusting operation can be carried out in a state where the zoom lens 71 is set at the ready-to-photograph state as shown in FIG. 141. Two-dot chain lines shown in FIG. 141 show movements of the first lens frame 1 together with the first lens group LG1 with respect to the first external barrel 12 in the optical axis direction. On the other hand, when the zoom lens 71 is retracted to the retracted position as shown in FIG. 10, the first external barrel 12, together with the fixing ring 3, can further move rearward relative to the first lens frame 1 and the first lens group adjustment ring 2 while compressing the pair of compression coil springs 24 even after the first lens frame 1 has fully retracted to a point at which the first lens frame 1 contacts with a front surface of the shutter unit 76 to thereby be prevented from further moving rearward (see FIG. 142). Namely, when the zoom lens 71 is retracted to the retracted position, the first external barrel 12 is retracted to be accommodated in such a manner as to reduce an axial margin (axial space) for positional adjustment of the first lens frame 1 in the optical axis direction. This structure makes it possible for the zoom lens 71 to be fully retracted deeper into the camera body 72. Conventional telescoping lens barrels in which a lens frame (which corresponds to the first lens frame 1) is directly fixed to an external lens barrel (which corresponds to the first external barrel 12) by screw threads (similar to the female screw thread 2a and the male screw thread 1a) without any intermediate member (which corresponds to the first lens group adjustment ring 2) interposed between the lens frame and the external lens barrel are known in the art. In this type of telescoping lens barrels, since the amount of retracting movement of the external lens barrel into a camera body is the same as that of the lens frame, the external lens barrel cannot be further moved rearward relative to the lens frame, unlike the first external barrel 12 of the present embodiment of the zoom lens.

The first lens frame 1 is provided at the rear end thereof with an annular end protrusion 1b (see FIGS. 133, 134, 141 and 142), the rear end of which is position behind the rearmost point on the rear surface of the first lens group LG1 in the optical axis direction, so that the rear end of the annular end protrusion 1b comes into contact with a front surface of the shutter unit 76 to prevent the rear surface of the first lens group LG1 from contacting with the shutter unit 76 and being damaged thereby when the zoom lens 71 is retracted to the retracted position.

More than two guide projections, each corresponding to each of the two guide projections 2b, can be formed on the first lens group adjustment ring 2 at any positions on an outer peripheral surface thereof, and also the shape of each guide projection is optional. According to the number of the guide projections of the first lens group adjustment ring 2, the fixing ring 3 can be provided with more than two spring receiving portions each corresponding to each of the two spring receiving portions 3a, and also the shape of each spring receiving portion is optional. In addition, the pair of spring receiving portions 3a is not essential; the pair of compression coil springs 24 can be installed in a compressed manner between corresponding two areas on a rear surface of the fixing ring 3 and the pair of guide projections 2b, respectively.

The first lens group adjustment ring 2 is provided on an outer peripheral surface thereof, at the front end of the outer peripheral surface at substantially equi-angular intervals about the photographing optical axis Z1, with a set of four engaging projections 2c (see FIG. 2) which are engageable with a front surface 3c of the fixing ring 3. The rear limit for the axial movement of the first lens group adjustment ring 2 with respect to the fixing ring 3 (i.e., with respect to the first external barrel 12) is determined by engagement (bayonet engagement) of the set of four engaging projections 2c with the front surface 3c of the fixing ring 3 (see FIGS. 9 and 141). The set of four engaging projections 2c serve as a set of bayonets.

Specifically, the fixing ring 3 is provided on an inner edge thereof with a set of four recesses 3b (see FIG. 2) to correspond to the set of four engaging projections 2c, respectively. The set of four engaging projections 2c can be inserted into the set of four recesses 3b from behind, respectively, and are engaged with the front surface 3c of the fixing ring 3 by rotating one of the first lens group adjustment ring 2 and the fixing ring 3 relative to the other clockwise or counterclockwise after the set of four engaging projections 2c are inserted into the set of four recesses 3b from behind. After this operation rotating one of the first lens group adjustment ring 2 and the fixing ring 3 relative to the other, a rear end surface 2c1 of each engaging projection 2c is pressed against the front surface 3c (a surface of the fixing ring 3 which can be seen in FIG. 2) of the fixing ring 3 by the spring force of the pair of compression coil springs 24. This firm engagement of the set of four engaging projections 2c with the front surface 3c of the fixing ring 3 prevents the combination of the first lens frame 1 and the first lens group adjustment ring 2 from coming off the first external barrel 12 from the rear thereof, and accordingly determines the rear limit for the axial movement of the first lens group adjustment ring 2 with respect to the first external barrel 12.

When the zoom lens 71 is fully retracted into the camera body 72 as shown in FIGS. 10 and 142, the rear surfaces 2c1 of the set of four engaging projections 2c are disengaged from the front surface 3c of the fixing ring 3 because the first lens group adjustment ring 2 has moved forward slightly with respect to the first external barrel 12 from the position of the first lens group adjustment ring 2 shown in FIG. 141 by further compressing the pair of compression coil springs 24. However, once the zoom lens 71 enters the ready-to-photograph state as shown in FIG. 141, the rear surfaces 2c1 are re-engaged with the front surface 3c. Accordingly, the rear surfaces 2c1 of the four engaging projections 2c and the front surface 3c serve as reference surfaces for determining the position of the first lens group LG1 with respect to the first external barrel 12 in the optical axis direction in the ready-to-photograph state of the zoom lens barrel 71. With this structure, even if the axial position of the first lens group LG1 with respect to the first external barrel 12 changes when the zoom lens 71 is retracted into the camera body 72, the first lens group LG1 automatically returns to its original position by the action of the pair of compression coil springs 24 as soon as the zoom lens 71 is ready to photograph.

At least two and any number other than four engaging projections each corresponding to each of the four engaging projections 2c can be formed on the first lens group adjustment ring 2 at any position on an outer peripheral surface thereof. According to the number of the engaging projections of the first lens group adjustment ring 2, the fixing ring 3 can be provided with at least two and any number other than four recesses each corresponding to each of the four recesses 3b. Moreover, the shape of each engaging projection of the first lens group adjustment ring 2 and also the shape of each spring receiving portion of the fixing ring 3 are optional as long as each engaging projection of the first lens group adjustment ring 2 is insertable into the corresponding recess of the fixing ring 3.

As has been described above, when the zoom lens 71 changes from the ready-to-photograph state to the retracted state, the cylindrical lens holder portion 6a of the second lens frame 6, which holds the second lens group LG2, rotates about the pivot pin 33 in a direction away from the photographing optical axis Z1 inside the second lens group moving frame 8, while the AF lens frame 51 which holds the third lens group LG3 enters the space in the second lens group moving frame 8 from which the lens holder portion 6a has retracted (see FIGS. 134, 136 and 137). In addition, when the zoom lens 71 changes from the ready-to-photograph state to the retracted state, the first lens frame 1 that holds the first lens group LG1 enters the second lens group moving frame 8 from the front thereof (see FIGS. 133 and 135). Accordingly, the second lens group moving frame 8 has to be provided with two internal spaces: a front internal space immediately in front of the central inner flange 8s in which the first lens frame 1 is allowed to move in the optical axis direction, and a rear internal space immediately behind the central inner flange 8s in which the second lens frame 6 is allowed to retract along a plane orthogonal to the photographing optical axis Z1 and in which the AF lens frame 51 is allowed to move in the optical axis direction. In the present embodiment of the zoom lens, the shutter unit 76, specifically an actuator thereof, is disposed inside the second lens group moving frame 8, which accommodates more than one lens group therein, in a space-saving manner to maximize the internal space of the second lens group moving frame 8.

FIG. 140 shows the elements of the shutter unit 76. The shutter unit 76 is provided with a base plate 120 having a central circular aperture 120a with its center on the photographing optical axis Z1. The base plate 120 is provided on a front surface thereof (a surface which can be seen in FIG. 140) above the circular aperture 120a with a shutter-actuator support portion 120b formed integral with the base plate 120. The shutter-actuator support portion 120b is provided with a substantially cylindrical accommodation recess 120b1 in which the shutter actuator 131 is accommodated. After the shutter actuator 131 is embedded in the accommodation recess 120b1, a holding plate 121 is fixed to the shutter-actuator support portion 120b so that the shutter actuator 131 is supported by the base plate 120 on the front thereof.

The shutter unit 76 is provided with a diaphragm-actuator support member 120c which is fixed to the back of the base plate 120 on the right side of the cylindrical recess 120b1 as viewed from the rear of the base plate 120. The shutter unit 76 is provided with a diaphragm-actuator support cover 122 having a substantially cylindrical accommodation recess 122a in which the diaphragm actuator 132 is accommodated. The diaphragm-actuator support cover 122 is fixed to the back of the diaphragm-actuator support member 120c. After the diaphragm actuator 132 is embedded in the accommodation recess 122a, the diaphragm-actuator support cover 122 is fixed to the back of the diaphragm-actuator support member 120c so that the diaphragm actuator 132 is supported by the diaphragm-actuator support member 120c on the back thereof. The shutter unit 76 is provided with a cover ring 123 which is fixed to the diaphragm-actuator support cover 122 to cover an outer peripheral surface thereof.

The holding plate 121 is fixed to the shutter-actuator support portion 120b by a set screw 129a. The diaphragm-actuator support member 120c is fixed to the back of the base plate 120 by set screw 129b. Furthermore, the diaphragm-actuator support member 120c is fixed to the holding plate 121 by a set screw 129c. A lower end portion of the diaphragm-actuator support member 120c which is provided with a screw hole into which the set screw 129b is screwed is formed as a rearward-projecting portion 120c1.

The shutter S and the adjustable diaphragm A are mounted to the rear of the base plate 120 immediately beside the diaphragm-actuator support member 120c. The shutter S is provided with a pair of shutter blades S1 and S2, and the adjustable diaphragm A is provided with a pair of diaphragm blades A1 and A2. The pair of shutter blades S1 and S2 are pivoted on a first pair of pins (not shown) projecting rearward from the back of the base plate 120, respectively, and the pair of diaphragm blades A1 and A2 are pivoted on a second pair of pins (not shown) projecting rearward from the back of the base plate 120, respectively. These first and second pairs of pints do no appear in FIG. 140. The shutter unit 76 is provided between the shutter S and the adjustable diaphragm A with a partition plate 125 which prevents the shutter S and the adjustable diaphragm A from interfering with each other. The shutter S, the partition plate 125 and the adjustable diaphragm A are fixed to the back of the base plate 120 in this order from front to rear in the optical axis direction, and thereafter a blade-holding plate 126 is fixed to the back of the base plate 120 to hold the shutter S, the partition plate 125 and the adjustable diaphragm A between the base plate 120 and the blade-holding plate 126. The partition plate 125 and the blade-holding plate 126 are provided with a circular aperture 125a and a circular aperture 126a, respectively, through which rays of light of an object image which is to be photographed pass to be incident on the CCD image sensor 60 through the third lens group LG3 and the low-pass filter LG4. The circular apertures 125a and 126a are aligned with the central circular aperture 120a of the base plate 120.

The shutter actuator 131 is provided with a rotor 131a, a rotor magnet (permanent magnet) 131b, a stator 131c made of steel, and a bobbin 131d. The rotor 131a is provided with a radial arm portion, and an eccentric pin 131e which projects rearwards from the tip of the radial arm portion to be inserted into cam grooves S1a and S2a of the pair of shutter blades S1 and S2. Strands (not shown) through which electric current is passed via the flexible PWB 77 to control rotation of the rotor 131a are wound on the bobbin 131d. Passing a current through the strands wound on the bobbin 131d causes the rotor 131a to rotate forward or reverse depending on the magnetic field which varies in accordance with the direction of the passage of the current. Rotations of the rotor 131a forward and reverse cause the eccentric pin 131e to swing in forward and revere directions, thus causing the pair of shutter blades S1 and S2 to open and close, respectively, by engagement of the eccentric pin 131e with the cam grooves S2a and S2a.

The diaphragm actuator 132 is provided with a rotor 132a and a rotor magnet (permanent magnet) 132b. The rotor 132a is provided with a radial arm portion having two ninety-degree bends, and an eccentric pin 132c which projects rearwards from the tip of the radial arm portion to be inserted into cam grooves A1a and A2a of the pair of diaphragm blades A1 and A2. Strands (not shown) through which electric current is passed via the flexible PWB 77 to control rotation of the rotor 132a are wound on the diaphragm-actuator support member 120c and the diaphragm-actuator support cover 122. Passing a current through the strands wound on the diaphragm-actuator support member 120c and the diaphragm-actuator support cover 122 causes the rotor 132a to rotate forward or reverse depending on the magnetic field which varies in accordance with the direction of the passage of the current. Rotations of the rotor 132a forward and reverse cause the eccentric pin 132c to swing in forward and revere directions, thus causing the pair of diaphragm blades A1 and A2 to open and close, respectively, by engagement of the eccentric pin 132c with the cam grooves A1a and A2a.

The shutter unit 76 is prepared as a subassembly in advance, and fitted into the second lens group moving frame 8 to be fixed thereto. As shown in FIGS. 108 and 110, the shutter unit 76 is supported by the second lens group moving frame 8 therein so that the base plate 120 is positioned immediately in front of the central inner flange 8s. A terminal end 77e of the flexible PWB 77 is fixed to a front surface of the holding plate 121 (see FIGS. 108, 110, 133 and 135).

The second lens group moving frame 8 has a cylindrical shape coaxial to other rotatable rings such as the cam ring 11. The axis of the second lens group moving frame 8 coincides with the lens barrel axis Z0 of the zoom lens 71. The photographing optical axis Z1 is eccentric downward from the lens barrel axis Z0 to secure some space in the second lens group moving frame 8 into which the second lens group LG2 is retracted to the radially-retracted position (see FIGS. 110 through 112). On the other hand, the first lens frame 1, which supports the first lens group LG1, is in the shape of a cylinder with its center on the photographing optical axis Z1, and is guided along the photographing optical axis Z1. Due to this structure, the space in the second lens group moving frame 8 which is occupied by the first lens group LG1 is secured in the second lens group moving frame 8 below the lens barrel axis Z0. Accordingly, sufficient space (upper front space) is easily secured in the second lens group moving frame 8 in front of the central inner flange 8s on the opposite side of the lens barrel axis Z0 from the photographing optical axis Z1 (i.e., above the lens barrel axis Z0) so that the shutter actuator 131 and supporting members therefor (the shutter-actuator support portion 120b and the holding plate 121) are positioned in the upper front space along an inner peripheral surface of the second lens group moving frame 8. With this structure, the first lens frame 1 does not interfere with either the shutter actuator 131 or the holding plate 121 even if the first lens frame 1 enters the second lens group moving frame 8 from the front thereof as shown in FIG. 135. Specifically, in the retracted state of the zoom lens 71, the holding plate 121 and the shutter actuator 131, which is positioned behind the holding plate 121, are positioned in an axial range in which the first lens group LG1 is positioned in the optical axis direction; namely, the holding plate 121 and the shutter actuator 131 are positioned radially outside the first lens group LG1. This maximizes the utilization of the internal space of the second lens group moving frame 8, thus contributing to a further reduction of the length of the zoom lens 71.

The first lens frame 1 that holds the first lens group LG1 is positioned in the first external barrel 12 to be supported thereby via the first lens group adjustment ring 2 as shown in FIG. 138 to be movable together with the first external barrel 12 in the optical axis direction though the first lens group adjustment ring 2 is not shown in FIGS. 133 and 135 around the first lens frame 1 for the purpose of illustration. The inner flange 12c of the first external barrel 12 is provided, above the portion thereof which holds the first lens frame 1 and the first lens group adjustment ring 2, with a through hole 12c1 which has a substantially arm shape as viewed from or rear of the first external barrel 12 and which penetrates the first external barrel 12 in the optical axis direction. The through hole 12c1 is shaped so that the holding plate 121 can enter the through hole 12c1 from behind. The holding plate 121 enters the through hole 12c1 as shown in FIG. 138 when the zoom lens 71 is in the retracted position.

In the rear internal space of the second lens group moving frame 8 behind the central inner flange 8s, not only the forwardly-projecting lens holder portion 51c (the third lens group LG3) of the AF lens frame 51 moves in and out in the optical axis direction above the photographing optical axis Z1 that is positioned below the lens barrel axis Z0, but also the cylindrical lens holder portion 6a retracts into the space on the opposite side of the lens barrel axis Z0 from the photographing optical axis Z1 when the zoom lens 71 is retracted into the camera body 72. Accordingly, there is substantially no extra space in the second lens group moving frame 8 behind the central inner flange 8s in a direction (vertical direction) of a straight line M1 orthogonally intersecting both the lens barrel axis Z0 and the photographing optical axis Z1 (see FIG. 112). Whereas, two side spaces not interfering with either the second lens group LG2 or the third lens group LG3 are successfully secured on respective sides (right and left sides) of the line M1 in the second lens group moving frame 8 until an inner peripheral surface thereof behind the central inner flange 8s in a direction (see FIG. 112) of a straight line M2 which is orthogonal to the straight line M1 and intersecting the photographing optical axis Z1. As can be seen in FIGS. 111 and 112, the left side space of the two side spaces which is positioned on the left side as viewed in FIG. 112 (on the left side of the lens barrel axis Z0 and the photographing optical axis Z1 as viewed from the rear of the second lens frame 8) is utilized partly as the space for the swing arm portion 6c of the swingable second lens frame 6 to swing therein and partly as the space for accommodating the above described first positioning device, with which the positions of the front and rear second lens frame support plates 36 and 37 relative to the second lens group moving frame 8 can be adjusted. The right side space of the aforementioned two side spaces which is positioned on the right side as viewed in FIG. 112 is utilized as the space for accommodating the diaphragm actuator 132 and supporting members therefor (the diaphragm-actuator support cover 122 and the cover ring 123) so that the diaphragm actuator 132 and the supporting members are positioned along an inner peripheral surface of the second lens group moving frame 8. More specifically, the diaphragm actuator 132 and the supporting members (the diaphragm-actuator support cover 122 and the cover ring 123) lie on the straight line M2. Accordingly, as can be understood from FIGS. 111, 112 and 137, the diaphragm actuator 132, the diaphragm-actuator support cover 122 and the cover ring 123 do not interfere with either the range of movement of the second lens group LG2 or the range of movement of the third lens group LG3.

Specifically, in the inside of the second lens group moving frame 8 behind the central inner flange 8s, the second lens group LG2 (the cylindrical lens holder portion 6a) and the third lens group LG3 (forwardly-projecting lens holder portion 51c) are accommodated on upper and lower sides of the lens barrel axis Z0, respectively, while the above described first positioning device and diaphragm actuator 132 are positioned on right and left sides of the lens barrel axis Z0 when the zoom lens 71 is in the retracted state. This maximizes the utilization of the internal space of the second lens group moving frame 8 in the retracted state of the zoom lens 71. In this state, the diaphragm-actuator support cover 122, the cover ring 123 and the diaphragm actuator 132 are positioned in the space radially outside the space in which the second lens group LG2 and the third lens group LG3 are accommodated. This contributes to a further reduction of the length of the zoom lens 71.

In the present embodiment of the zoom lens, the base plate 120 of the shutter unit 120 is positioned in front of the central inner flange 8s, whereas the diaphragm actuator 132, the diaphragm-actuator support cover 122 and the cover ring 123 are positioned behind the central inner flange 8s. In order to allow the diaphragm actuator 132, the diaphragm-actuator support cover 122 and the cover ring 123 extend behind the central inner flange 8s, the central inner flange 8s is provided with a substantially circular through hole 8s1 in which the cover ring 123 is fitted (see FIGS. 110 through 112). The central inner flange 8s is further provided below the through hole 8s1 with an accommodation recess 8s2 in which the rearward-projecting portion 120c1 of the diaphragm-actuator support member 120c is accommodated.

The forwardly-projecting lens holder portion 51c of the AF lens frame 51 is provided, on the side surface 51c4 among the four side surfaces 51c3, 51c4, 51c5 and 51c6 around the forwardly-projecting lens holder portion 51c, with a recess 51i which is formed by cutting out a part of the forwardly-projecting lens holder portion 51c. The recess 51i is formed to correspond to the shapes of outer peripheral surfaces of the ring cover 123 and the accommodation recess 8s2 of the second lens group moving frame 8 so that the forwardly-projecting lens holder portion 51c does not interfere with the ring cover 123 and the accommodation recess 8s2 in the retracted state of the zoom lens 71. Namely, the outer peripheral portions of the ring cover 123 and the accommodation recess 8s2 partly enter the recess 51i when the zoom lens 71 is fully retracted into the camera body 72 (see FIGS. 122, 130 and 137). This further maximizes the utilization of the internal space of the second lens group moving frame 8 to minimize the length of the zoom lens 71.

In the present embodiment of the zoom lens, even the shutter actuator 131 and the diaphragm actuator 132 are structured in consideration of the utilization of the internal space of the zoom lens 71.

The space in front of the base plate 120 is narrow in the optical axis direction since the shutter unit 76 is supported by the second lens group moving frame 8 therein toward the front thereof as can be seen in FIGS. 9 and 10. Due to the limitation of the space in front of the base plate 120, the shutter actuator 131 adopts the structure, in which the rotor magnet 131b and the bobbin 131d do not adjoin each other in the optical axis direction but are positioned separately from each other in a direction perpendicular to the optical axis direction, so that variations of the magnetic field generated on the side of the bobbin 131d are transferred to the side of the rotor magnet 131d via the stator 131c. This structure reduces the thickness of the shutter actuator 131 in the optical axis direction, thus making it possible for the shutter actuator 131 to be positioned in the limited space in front of the base plate 120 without problems.

On the other hand, the space behind the base plate 120 is also limited in a direction perpendicular to the optical axis direction because the second lens group LG2 and other retractable parts are positioned behind the base plate 120. Due to the limitation of the space behind the base plate 120, the diaphragm actuator 132 adopts the structure in which strands are wound directly on the diaphragm-actuator support member 120c and the diaphragm-actuator support cover 122 which cover the rotor magnet 132b. This structure reduces the height of the diaphragm actuator 132 in a direction perpendicular to the optical axis direction, thus making it possible for the diaphragm actuator 132 to be positioned in the limited space behind the base plate 120 without problems.

The digital camera 70 is provided above the zoom lens 71 with a zoom viewfinder, the focal length of which varies to correspond to the focal length of the zoom lens 71. As shown in FIGS. 9, 10 and 143, the zoom viewfinder is provided with a zoom type viewing optical system including an objective window plate 81a (not shown in FIG. 143), a first movable power-varying lens 81b, a second movable power-varying lens 81c, a mirror 81d, a fixed lens 81e, a prism (erecting system) 81f, an eyepiece 81g and an eyepiece window plate 81h, in that order from the object side along a viewfinder optical axis. The objective window plate 81a and the eyepiece window plate 81h are fixed to the camera body 72, and the remaining optical elements (81b through 81g) are supported by a viewfinder support frame 82. Among the optical elements 81b through 81g supported by the viewfinder support frame 82, the mirror 81d, the fixed lens 81e, the prism 81f and the eyepiece 81g are fixed to the viewfinder support frame 82 at their respective predetermined positions thereon. The zoom viewfinder is provided with a first movable frame 83 and a second movable frame 84 which hold the first movable power-varying lens 81b and the second movable power-varying lens 81c, respectively. The first movable frame 83 and the second movable frame 84 are guided in the optical axis direction by a first guide shaft 85 and a second guide shaft 86 which extend in a direction parallel to the photographing optical axis Z1, respectively. The first movable power-varying lens 81b and the second movable power-varying lens 81c have a common optical axis Z3 which remains in parallel to the photographing optical axis Z1 regardless of variations of the relative position between the first movable power-varying lens 81b and the second movable power-varying lens 81c. The first movable frame 83 and the second movable frame 84 are biased forward, toward the objective side, by a first compression coil spring 87 and a second compression coil spring 88, respectively. The zoom viewfinder is provided with a cam-incorporated gear 90 having a substantially cylindrical shape. The cam-incorporated gear 90 is fitted on a rotational shaft 89 to be supported thereon. The rotational shaft 89 is fixed to the viewfinder support frame 82 to extend parallel to the optical axis Z3 (the photographing optical axis Z1).

The cam-incorporated gear 90 is provided at the front end thereof with a spur gear portion 90a. The cam-incorporated gear 90 is provided immediately behind the spur gear portion 90a with a first cam surface 90b, and is provided between the first cam surface 90b and the rear end of the cam-incorporated gear 90 with a second cam surface 90c. The cam-incorporated gear 90 is biased forward by a compression coil spring 90d to remove backlash. A first follower pin 83a (see FIG. 148) projected from the first movable frame 83 is pressed against the first cam surface 90b by the spring force of the first compression coil spring 87, while a second follower pin 84a (see FIGS. 143, 146 and 148) projected from the second movable frame 84 is pressed against the second cam surface 90c by the spring force of the second compression coil spring 88. A rotation of the cam-incorporated gear 90 causes the first movable frame 83 and the second movable frame 84 that respectively hold the first movable power-varying lens 81b and the second movable power-varying lens 81c to move in the optical axis direction in a predetermined moving manner while changing the space therebetween in accordance with the contours of the first cam surface 90*b* and the second cam surface 90*c* to vary the focal length of the zoom viewfinder in synchronization with the focal length of the zoom lens 71. FIG. 156 is a developed view of an outer peripheral surface of the cam-incorporated gear 90, showing the positional relationship between the first follower pin 83*a* and the first cam surface 90*b* and the positional relationship between the second follower pin 84*a* and the second cam surface 90*c* in each of three different states, i.e., at the wide-angle extremity, the telephoto extremity and the retracted position of the zoom lens 71. All the elements of the zoom viewfinder except for the objective window plate 81*a* and the eyepiece window plate 81*h* are put together to be prepared as a viewfinder unit (subassembly) 80 as shown in FIG. 143. The viewfinder unit 80 is mounted on top of the stationary barrel 22 via set screws 80*a* as shown in FIG. 5.

Figure 7:
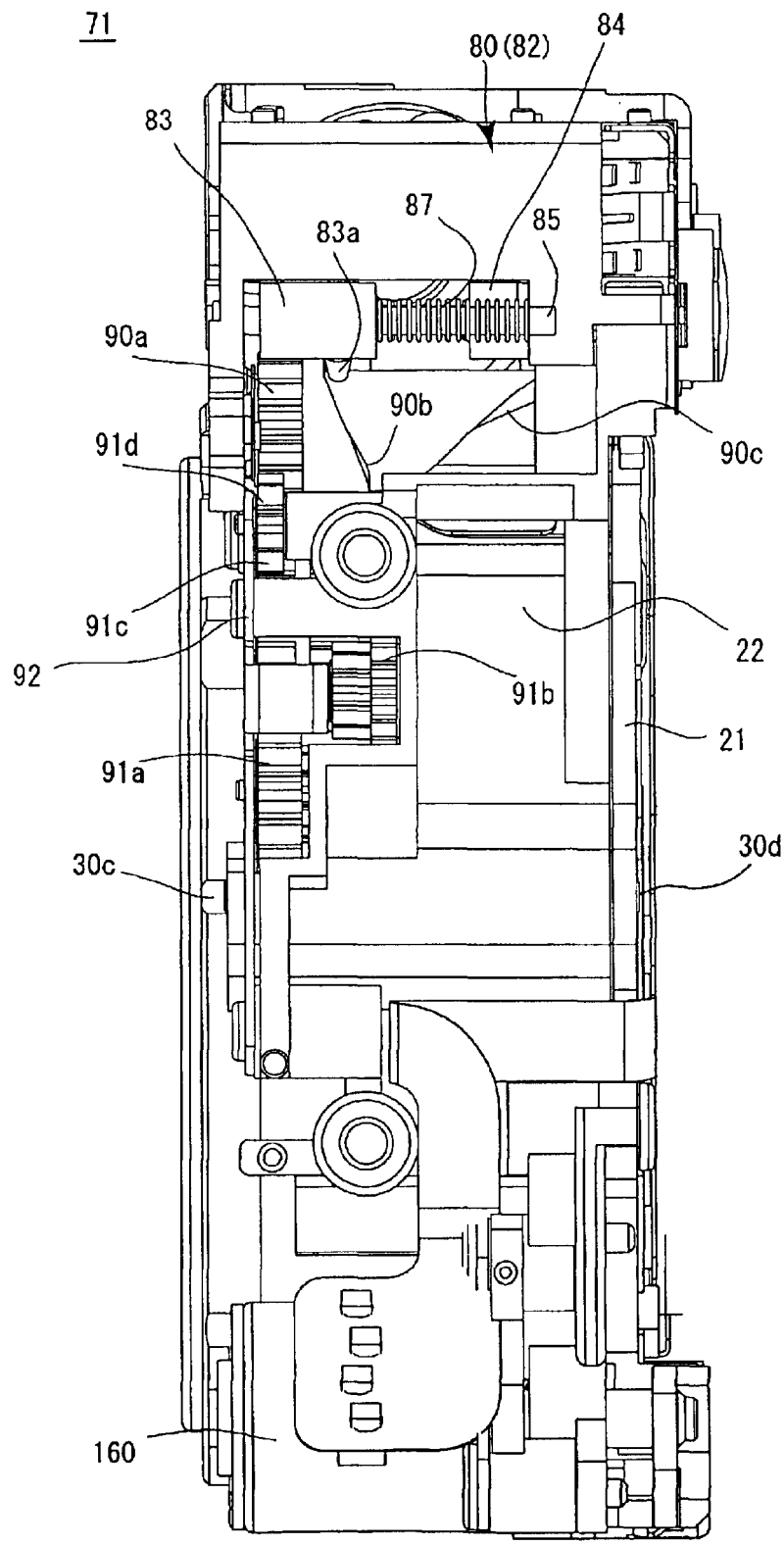
FIG. 7 is a side elevational view of the zoom lens assembly shown in FIG. 6.
Figure 8:
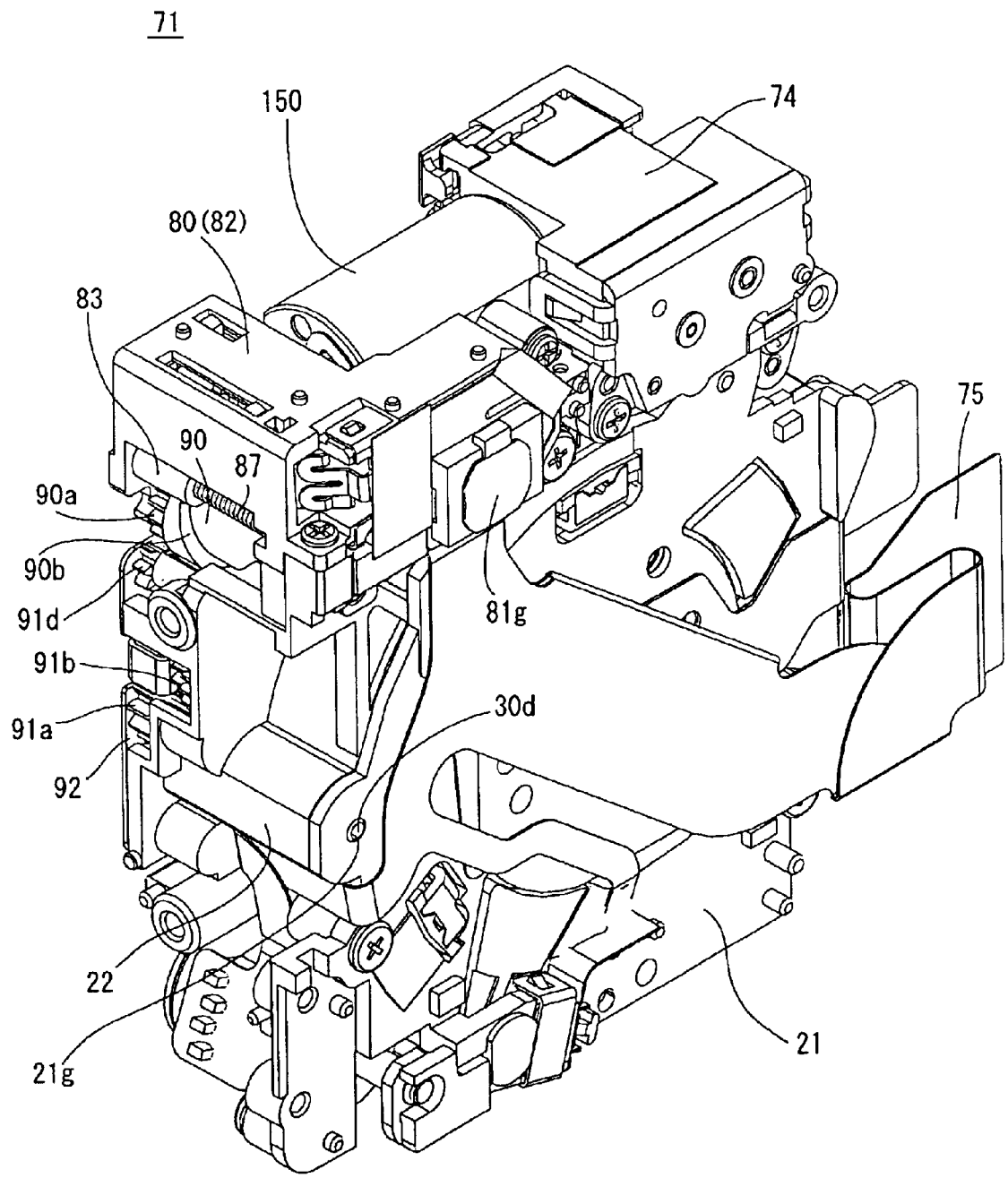
FIG. 8 is a perspective view of the zoom lens assembly shown in FIG. 6, viewed obliquely from behind.

The digital camera 70 is provided between the helicoid ring 18 and the cam-incorporated gear 90 with a viewfinder drive gear 30 and a gear train (reduction gear train) 91. The viewfinder drive gear 30 is provided with a spur gear portion 30*a* which is in mesh with the annular gear 18*c* of the helicoid ring 18. Rotation of the zoom motor 150 is transferred from the annular gear 18*c* to the cam-incorporated gear 90 via the viewfinder drive gear 30 and the gear train 91 (see FIGS. 146 and 147). The viewfinder drive gear 30 is provided behind the spur gear portion 30*a* with a semi-cylindrical portion 30*b*, and is further provided with a front rotational pin 30*c* and a rear rotational pin 30*d* which project from the front end of the spur gear portion 30*a* and the rear end of the semi-cylindrical portion 30*b*, respectively so that the front rotational pin 30*c* and the rear rotational pin 30*d* are positioned on a common rotational axis of the viewfinder drive gear 30. The front rotational pin 30*c* is rotatably fitted into a bearing hole 22*p* (see FIG. 6) formed on the stationary barrel 22 while the rear rotational pin 30*d* is rotatably fitted into a bearing hole 21*g* (see FIG. 8) formed on the CCD holder 21. Due to this structure, the viewfinder drive gear 30 is rotatable about its rotational axis (the rotational pins 30*c* and 30*d*) extending parallel to the lens barrel axis Z0 (the rotational axis of the helicoid ring 18), and is immovable in the optical axis direction. The gear train 91 is composed of a plurality of gears: a first gear 91*a*, a second gear 91*b*, a third gear 91*c* and a fourth gear 91*d*. Each of the first through third gears 91*a*, 91*b* and 91*c* is a double gear consisting of a large gear and a small gear, and the fourth gear 91*d* is a simple spur gear as shown in FIGS. 5 and 146. The first through fourth gears 91*a*, 91*b*, 91*c* and 91*d* are respectively rotatably fitted on four rotational pins projecting from the stationary barrel 22 in parallel to the photographing optical axis Z1. As shown in FIGS. 5 through 7, a gear hold plate 22 is fixed to the stationary barrel 22 by set screws 92*a* to be positioned immediately in front of the first through fourth gears 91*a*, 91*b*, 91*c* and 91*d* to prevent the first through fourth gears 91*a*, 91*b*, 91*c* and 91*d* from coming off their respective rotational pins. With the gear train 91 fixed properly at their respective fixing positions as shown in FIGS. 146 through 148, rotation of the viewfinder drive gear 30 is imparted to the cam-incorporated gear 90 via the gear train 91. FIGS. 6 through 8 show the zoom lens 71 in a state where the viewfinder drive gear 30, the viewfinder unit 80 and the gear train 91 are all fixed to the stationary barrel 22.

As described above, the helicoid ring 18 continues to be driven to move forward along the lens barrel axis Z0 (the photographing optical axis Z1) while rotating about the lens barrel axis Z0 with respect to the stationary barrel 22 and the first linear guide ring 14 until the zoom lens 71 reaches the wide-angle extremity (zooming range) from the retracted position. Thereafter, the helicoid ring 18 rotates about the lens barrel axis Z0 at a fixed position with respect to the stationary barrel 22 and the first linear guide ring 14, i.e., without moving along the lens barrel axis Z0 (the photographing optical axis Z1). FIGS. 23 through 25, 144 and 145 show different operational states of the helicoid ring 18. Specifically, FIGS. 23 and 144 show the helicoid ring 18 in the retracted state of the zoom lens 71, FIGS. 24 and 145 show the helicoid ring 18 at the wide-angle extremity of the zoom lens 71, and FIG. 25 shows the telephoto extremity of the zoom lens 71. In FIGS. 144 and 145, the stationary barrel 22 is not shown for the purpose of making the relationship between the viewfinder drive gear 30 and the helicoid ring 18 easier to understand.

The viewfinder drive gear 30 does not rotate about the lens barrel axis Z0 during the time the helicoid ring 18 rotates about the lens barrel axis Z0 while moving in the optical axis direction, i.e., during the time the zoom lens 71 is extended forward from the retracted position to a position immediately behind the wide-angle extremity (i.e., immediately behind the zooming range). The viewfinder drive gear 30 rotates about the lens barrel axis Z0 at a fixed position only when the zoom lens 71 is in the zoom ranging between the wide-angle extremity and the telephoto extremity. Namely, in the viewfinder drive gear 30, the spur gear portion 30*a* is formed thereon to occupy only a front small part of the viewfinder drive gear 30, so that the spur gear portion 30*a* is not in mesh with the annular gear 18*c* of the helicoid ring 18 in the retracted state of the zoom lens 71 because the annular gear 18*c* is positioned behind the front rotational pin 30*c* the retracted state of the zoom lens 71. The annular gear 18*c* reaches the spur gear portion 30*a* to mesh therewith immediately before the zoom lens 71 reaches the wide-angle extremity. Thereafter, from the wide-angle extremity to the telephoto extremity, the annular gear 18*c* remains in mesh with the spur gear portion 30*a* because the helicoid ring 18 does not move in the optical axis direction (horizontal direction as viewed in FIGS. 23 through 25, 144 and 145).

As can be understood from FIGS. 153 through 155, the semi-cylindrical portion 30*b* of the viewfinder drive gear 30 is provided with an incomplete cylindrical portion 30*b*1 and a flat surface portion 30*b*2 which is formed as a cut-away portion of the incomplete cylindrical portion 30*b*1 so that the flat surface portion 30*b*2 extends along the rotational axis of the viewfinder drive gear 30. Accordingly, the semi-cylindrical portion 30*b* has a non-circular cross section, i.e., a substantially D-shaped cross section. As can be seen in FIGS. 153 through 155, some specific teeth of the spur gear portion 30*a* adjacent to the flat surface portion 30*b*2 project radially outwards beyond the position of the flat surface portion 30*b*2 in a direction of engagement of the some specific teeth of the spur gear portion 30*a* with the annular gear 18*c* (i.e., horizontal direction as viewed in FIG. 153). When the zoom lens 71 is in the retracted state, the viewfinder drive gear 30 is in its specific angular position in which the flat surface portion 30*b*2 faces the annular gear 18*c* of the helicoid ring 18 as shown in FIG. 153. In this state shown in FIG. 153, the viewfinder drive gear 30 cannot rotate even if driven to rotate because the flat surface portion 30*b*2 is in close vicinity of the addendum circle of the annular gear 18*c*. Namely, even if the viewfinder drive gear 30 tries to rotate in the state shown in FIG. 153, the flat surface portion 30*b*2 would hit some teeth of the annular gear 18*c*, so that the viewfinder drive gear 30 cannot rotate.

If the helicoid ring 18 moves forward until the annular gear 18*c* of the helicoid ring 18 is properly engaged with the spur gear portion 30a of the viewfinder drive gear 30 as shown in FIG. 145, the portion of the helicoid ring 18 which includes the entire part of the annular gear 18c is positioned in front of the semi-cylindrical portion 30b in the optical axis direction. In this state, the viewfinder drive gear 30 rotates by rotation of the helicoid ring 18 since the semi-cylindrical portion 30b does not overlap the annular gear 18c in radial directions of the zoom lens 71.

Although the helicoid ring 18 is provided in front of the annular gear 18c with the set of three rotational sliding projections 18b each having a radial height greater than the radial height (tooth depth) of the annular gear 18c, the set of three rotational sliding projections 18b do not interfere with the view finder drive gear 30 during the time the helicoid ring 18 moves between the position thereof at the wide-angle extremity and the position thereof at the telephoto extremity while rotating about the lens barrel axis Z0 because the rotation of the helicoid ring 18 for driving the zoom lens 71 from the retracted position to the wide-angle extremity is completed while the viewfinder drive gear 30 is positioned in between two of the three rotational sliding projections 18b in a circumferential direction of the helicoid ring 18. Thereafter, the set of three rotational sliding projections 18b and the spur gear portion 30a do not interfere with each other since the set of three rotational sliding projections 18b are positioned in front of the spur gear portion 30a in the optical axis direction in a state where the annular gear 18c is engaged with the spur gear portion 30a.

In the above illustrated embodiment, with respect to the helicoid ring 18 which rotates about the lens barrel axis Z0 while moving in the optical axis direction in one state and which rotates at a fixed position on the lens barrel axis Z0 in another state, the spur gear portion 30a is formed on the specific portion of the viewfinder drive gear 30 which is engageable with the annular gear 18c only when the helicoid ring 18 rotates at its predetermined axial fixed position. Moreover, the semi-cylindrical portion 30b is formed on the viewfinder drive gear 30 behind the spur gear portion 30a thereof, so that the viewfinder drive gear 30 is prohibited from rotating by interference of the semi-cylindrical portion 30b with the annular gear 18c during the time the helicoid ring 18 rotates about the lens barrel axis Z0 while moving in the optical axis direction. Due to this structure, although the viewfinder drive gear 30 does not rotate while the zoom lens 71 is extended or retracted between the retracted position and a position immediately behind the wide-angle extremity, the viewfinder drive gear 30 rotates only when the zoom lens 71 is driven to change its focal length between the wide-angle extremity and the telephoto extremity. In short, the viewfinder drive gear 30 is driven only when the viewfinder drive gear 30 needs to be associated with the photographing optical system of the zoom lens 71.

Assuming the viewfinder drive gear 30 rotates whenever the helicoid ring 18 rotates, a drive transfer system extending from the viewfinder drive gear to a movable lens of the zoom viewfinder has to be provided with an idle running section for disengaging the movable lens from the viewfinder drive gear, because the viewfinder drive gear 30 rotates even when it is not necessary to drive the zoom viewfinder, i.e., when the zoom lens 71 is extended forward to the wide-angle extremity from the retracted state. FIG. 157 is a developed view, similar to that of FIG. 156, of an outer peripheral surface of a cam-incorporated gear 90' (which corresponds to the cam-incorporated gear 90 of the zoom lens 71) which is provided with such an idle running section. In each of FIGS. 156 and 157, the spur gear portion 90a is not shown for clarity.

A first cam surface 90b' of the cam-incorporated gear 90', which correspond to the first cam surface 90b of the cam-incorporated gear 90, is provided with a long linear surface 90b1' for preventing a follower pin 83a' (which corresponds to the follower pin 83a) from moving in an optical axis direction Z3' (which corresponds to the optical axis Z3) even if the cam-incorporated gear 90 rotates. Likewise, a second cam surface 90c' of the cam-incorporated gear 90', which correspond to the second cam surface 90c of the cam-incorporated gear 90, is provided with a long linear surface 90c1' for preventing a follower pin 84a' (which corresponds to the follower pin 84a) from moving in the optical axis direction Z3' even if the cam-incorporated gear 90 rotates. As can be understood by a comparison between FIGS. 156 and 157, the long linear surface 90b1' consumes a large circumferential range of the first cam surface 90b' to thereby shorten the remaining circumferential range of the first cam surface 90b' which is used as a cam surface for moving the follower pin 83a' in the optical axis direction; this inevitably increases the degree of inclination of the cam surface. Likewise, the long linear surface 90c1' consumes a large circumferential range of the second cam surface 90c' to thereby shorten the remaining circumferential range of the second cam surface 90c' which is used as a cam surface for moving the follower pin 84a' in the optical axis direction; this inevitably increases the degree of inclination of the cam surface. If the degree of inclination of each of the first cam surface 90b' and the second cam surface 90c' is great, the amount of movement of each follower pin 83' and 84' along the rotational axis of the cam-incorporated gear 90' (i.e., along the optical axis Z3) per unit of rotation of the cam-incorporated gear 90' becomes great, which makes it difficult to move each follower pin 83' and 84' with a high degree of positioning accuracy. If the degree of inclination of each of the first cam surface 90b' and the second cam surface 90c' is reduced to prevent this problem from occurring, the diameter of the cam-incorporated gear 90' has to be increased, which is detrimental to miniaturization of the zoom lens. This problem is also true for the case of adopting a cam plate instead of a cylindrical cam member such as the cam-incorporated gear 90.

In contrast, in the present embodiment of the zoom lens, in which the viewfinder drive gear 30 is not driven when not necessary to rotate, the cam-incorporated gear 90 does not have to be provided on each of the first and second cam surfaces 90b and 90c with an idle running section. Therefore, an effective circumferential range of a cam surface for moving the follower pin 83a or 84a in the optical axis direction can be secured on each of the first and second cam surfaces 90b and 90c without increasing either the degree of inclination of the cam surfaces or the diameter of the cam-incorporated gear 90. In other words, miniaturizing the drive system for the zoom viewfinder and driving the movable lenses of the viewfinder optical system with high accuracy can be both achieved. In the present embodiment of the zoom lens, the first and second cam surfaces 90b and 90c of the cam-incorporated gear 90 are provided with linear surfaces 90b1 and 90c1 which look like the aforementioned linear surfaces 90b1' and 90c1', respectively, due to the fact that the annular gear 18c is brought into engagement with the spur gear portion 30a intentionally at the moment immediately before the zoom lens 71 reaches the zooming range (the wide-angle extremity) when the zoom lens 71 is extended forward from the retracted position in consideration of backlash and play among gears shown in FIGS. 146 through 148. Nevertheless, the circumferential lengths of the linear surfaces 90b1 and 90c1 are much smaller than those of the linear surfaces 90b1' and 90c1' of the comparative embodiment.

In the present embodiment of the zoom lens, the annular gear 18c is formed so that the spur gear portion 30a of the viewfinder drive gear 30 can smoothly mesh with the annular gear 18c. Specifically, one of a plurality of gear teeth of the annular gear 18c, i.e., a short gear tooth 18c1 is formed to have a shorter tooth depth than those of other normal gear teeth 18b2 of the annular gear 18c.

FIGS. 149 through 152 show the positional relationship between the annular gear 18c of the helicoid ring 18 and the spur gear portion 30a of the viewfinder drive gear 30 in different states in time sequence in the course of variation in state of the zoom lens from the state shown in FIG. 144 in which the zoom lens 71 is in the retracted state to the state as shown in FIG. 145 in which the zoom lens 71 is set at wide-angle extremity. The positional relationship between the annular gear 18c and the spur gear portion 30a is obtained in the middle of rotation of the helicoid ring 18 in a direction from the retracted position to the wide-angle extremity.

Subsequently, the short gear teeth 18c1 approaches the spur gear portion 30a and is positioned in the immediate vicinity of the spur gear portion 30a as shown in FIG. 150. FIG. 153 shows this state shown in FIG. 150, viewed from the front of the viewfinder drive gear 30. It can be seen from FIG. 153 that the short gear teeth 18c1 is not yet engaged with the spur gear portion 30a. The normal gear teeth 18c2 are positioned farther from the spur gear portion 30a than the short gear tooth 18c1, and therefore are not yet engaged with the spur gear portion 30a either. No gear teeth serving as gear teeth of the annular gear 18c is formed on a specific portion of the outer peripheral surface of the helicoid ring 18; the specific portion is right next to the short gear tooth 18c1 on one of the opposite sides thereof in the circumferential direction of the helicoid ring 18. Accordingly, at the stage shown in FIGS. 150 and 153, the annular gear 18c is not yet engaged with the spur gear portion 30a, so that rotation of the helicoid rig 18 is not yet transferred to the viewfinder drive gear 30. In this connection, at the stage shown in FIGS. 150 and 153, a part of the annular gear 18c still faces the flat surface portion 30b2 to prohibit the viewfinder drive gear 30 from rotating.

A further rotation of the helicoid ring 18 in the lens barrel advancing direction causes to the short gear tooth 18c1 to reach its position shown in FIG. 151. At this stage shown in FIG. 151, the short gear tooth 18c1 comes into contact with one of the teeth of the spur gear portion 30a and subsequently presses the same in the lens barrel advancing direction (upwards as viewed in FIG. 151) to start rotating the viewfinder drive gear 30.

A further rotation of the helicoid ring 18 in the lens barrel advancing direction causes a gear tooth of the normal tooth gear 18c2, which is adjacent to the short gear tooth 18c1 on one of the opposite sides thereof in the circumferential direction of the helicoid ring 18, to press the subsequent gear teeth of the spur gear portion 30a to keep rotating the viewfinder drive gear 30. Thereafter, the annular gear 18c imparts a further rotation of the helicoid ring 18 to the viewfinder drive gear 30 via the engagement of the normal tooth gear 18c2 with the gear teeth of the spur gear portion 30a. At the stage shown in FIG. 145 at which the helicoid ring 18 reaches the position thereof at the wide-angle extremity, the short gear teeth 18c1 is not used for the subsequent rotation of the helicoid ring 18 in the zooming range between the wide-angle extremity and the telephoto extremity since the short gear teeth 18c1 has already passed the point of engagement with the spur gear portion 30a.

Accordingly, in the present embodiment of the zoom lens, a portion of the annular gear 18c, which is firstly engaged with the spur gear portion 30a of the viewfinder drive gear 30, is formed as at least one short gear tooth (18c1), the teeth depth of which is smaller than those of the other gear teeth of the annular gear 18c. According to this construction, the annular gear 18c can be reliably and surely engaged with the spur gear portion 30a upon commencement of engagement therewith. Namely, in the case of tall (normal) gear teeth, since the tips of mutually neighboring tall gear teeth having very different relative angles, the engagement thereof is shallow (the initial engagement range is narrow) so that there is a chance of engagement therebetween failing (miss engagement). Whereas, since the short gear teeth 18c1 moves until the relative angle between the short gear teeth 18c1 and the tall gear teeth (the spur gear portion 30a of the viewfinder drive gear 30) becomes substantially the same before engaging, a deeper engagement is achieved (the initial engagement range is wide), so that there is no chance of engagement therebetween failing (missing engagement). Furthermore, this structure reduces the shock at the movement of engagement of the annular gear 18c with the spur gear portion 30a, thus making it possible to smoothly start operations of the zoom viewfinder drive system including the viewfinder drive gear 30 and to reduce the noise produced by the zoom viewfinder drive system.

Although the above descriptions have been directed mainly to the features found in operations of the zoom lens 71 when the zoom lens 71 advances from the retracted position toward the zooming range, similar features can surely be expected in operations of the zoom lens 71 when the zoom lens 71 retracts to the retracted position.

As can be understood from the above descriptions, in a fully extended state of the zoom lens 71, i.e., in the ready-to-photograph state of the zoom lens 71, the respective axial positions (respective rearmost movement limits relative to the first external barrel 12) of the first lens frame 1 and the first lens group adjustment ring 2 inside the first external barrel 12 are determined by making the four engaging projections 2c contact the front surface 3c of the fixing ring 3 by the spring force of the pair of compression coil springs 24. In this state (the state shown in FIG. 141), since sufficient space allowing the first lens group LG1 to move forward and rearward relative to the first external barrel 12 to adjust the axial position of the first lens group LG1 relative to the first external barrel 12 is secured, the axial position of the first lens frame 1 can be adjusted relative to the first external barrel 12 in the optical axis direction by changing the position of engagement of the male screw thread 1a relative to the female screw thread 2a of the first lens group adjustment ring 2. On the other hand, when the zoom lens 71 is retracted into the camera body 72, the first external barrel 12, together with the fixing ring 3, can further move rearward relative to the first lens frame 1 and the first lens group adjustment ring 2 while compressing the pair of compression coil springs 24 even after the first lens frame 1 has fully retracted to a point at which the first lens frame 1 contacts with the shutter unit 76 to thereby be prevented from further moving rearward (see FIG. 142). This reduces an axial margin (axial space) for positional adjustment of the first lens frame 1 in the optical axis direction to thereby make it possible for the zoom lens 71 to be fully retracted deeper into the camera body 72 in the retracted state of the zoom lens 71.

However, once the zoom lens 71 is fully extended to return to the ready-to-photograph state from the retracted state, the rear surfaces 2c1 are re-engaged with the front surface 3c, so that the aforementioned sufficient space that allows the first lens group LG1 to move forward and rearward relative to the first external barrel 12 for position adjustment is obtained again.

The present invention is not limited solely to the particular embodiment described above. For instance, although the pair of guide projections 2*b* are formed on the first lens group adjustment ring 2 at regular intervals in a circumferential direction thereof while the corresponding pair of first guide grooves 12*b* are formed on the first external barrel 12 at regular intervals in a circumferential direction thereof in the above illustrated embodiment of the zoom lens, the number of the guide projections 2*b* and the number of the first guide grooves 12*b* can be one or more than two; moreover, the guide projections 2*b* and the number of the first guide grooves 12*b* can be formed on the first lens group adjustment ring 2 and the first external barrel 12 at irregular intervals in a circumferential direction thereof if the number of the guide projections 2*b* and the number of the first guide grooves 12*b* are two or more.

Although the four engaging projections 2*c* are formed on the first lens group adjustment ring 2 at regular intervals in a circumferential direction thereof while the corresponding four recesses 3*b* are formed on the fixing ring 3 at regular intervals in a circumferential direction thereof in the above illustrated embodiment of the zoom lens, the number of the engaging projections 2*c* and the number of the four recesses 3*b* can be smaller or greater than four; moreover, the engaging projections 2*c* can be formed on the first lens group adjustment ring 2 at irregular intervals in a circumferential direction thereof while the recesses 3*b* can be formed on the fixing ring 3 correspondingly at irregular intervals in a circumferential direction thereof. In addition, the number of the compression coil springs 24 is not limited solely to two, but can be any other number, and the placement of the compression coil springs 24 is not limited solely to the particular placement in the above described embodiment of the zoom lens, either.

Although the annular end protrusion 1*b* comes into contact with the shutter unit 76 in the retracted state of the zoom lens 71 in the above illustrated embodiment of the zoom lens, a portion corresponding to the annular end protrusion 1*b* can be formed on the first lens group adjustment ring 2.

The present invention can be applied not only to a retractable zoom lens such as the zoom lens 71 described above, but also to a retractable fixed focal length lens.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A retracting mechanism of a retractable lens, comprising:
    an external barrel movable in an optical axis direction;
    an adjustment ring positioned in said external barrel and configured to be guided linearly in the optical axis direction without rotating;
    a stopper configured to set a rear movement limit of said adjustment ring with respect to said external barrel;
    a lens frame configured to hold a lens group, said lens frame configured to be screwed into said adjustment ring;
    a fixing ring fixed to said external barrel and configured to prevent said adjustment ring coming off said external barrel; and
    at least one spring positioned between said fixing ring and said adjustment ring and configured to bias said adjustment ring toward the rear movement limit of said adjustment ring with respect to said external barrel.

2. The retracting mechanism according to claim 1, wherein said adjustment ring is positioned in front of the rear movement limit of the adjustment ring, with respect to said external barrel, when said retractable lens is in a retracted state.

3. The retracting mechanism according to claim 2, further comprising a movement limiter configured to come into contact with at least one of said fixing ring and said lens frame and prevent said fixing ring and said lens frame from further moving rearward, such that said fixing ring and said lens frame move forward relative to said external barrel when said external barrel moves rearward during a retracting operation of said retractable lens.

4. The retracting mechanism according to claim 3, wherein said lens frame comprises a rearward protrusion which projects rearward so that a rear end of said rearward protrusion is positioned behind a rearmost point on a rear surface of said lens group in said optical axis direction, said rear end of said rearward protrusion configured to come into contact with said movement limiter when said external barrel moves rearward during said retracting operation of said retractable lens.

5. The retractable mechanism according to claim 1, wherein said movement limiter comprises a shutter unit.

6. The retracting mechanism according to claim 1, wherein said adjustment ring comprises at least one guide projection, and
    wherein said external barrel comprises at least one guide groove into which said guide projection of said adjustment ring is configured to be engaged and guide said guide projection linearly in said optical axis direction.

7. The retracting mechanism according to claim 6, wherein said spring comprises at least one compression coil spring,
    wherein one end of said compression coil spring is in contact with said guide projection, and
    wherein the other end of said compression coil spring is in contact with at least one spring receiving portion on said fixing ring in front of said guide projection.

8. The retracting mechanism according to claim 1, wherein said stopper comprises at least one engaging projection on said adjustment ring, said engaging projection configured to be positioned in front of said fixing ring and come into contact with a front end surface of said fixing ring.

9. The retracting mechanism according to claim 8, wherein said engaging projection comprises a plurality of engaging projections on an outer peripheral surface of said adjustment ring at different circumferential positions proximate a front end of said adjustment ring.

10. The retracting mechanism according to claim 9, wherein said fixing ring comprises a plurality of recesses configured to allow said plurality of engaging projections to be engaged in said plurality of recesses in said optical axis direction, respectively, when said fixing ring is positioned in a predetermined rotational position relative to said adjustment ring, and
    wherein relative movement between said fixing ring and said adjustment ring causes rear end surfaces of said plurality of engaging projections and front end surfaces of said fixing ring to come into pressing into contact with each other by a spring force of said spring after said plurality of engaging projections are engaged in said plurality of recesses, respectively.

11. The retracting mechanism according to claim 10, wherein said plurality of recesses are at regular intervals in a circumferential direction of said adjustment ring, and wherein said plurality engaging projections are at regular intervals in a circumferential direction of said adjustment ring.

12. The retracting mechanism according to claim 11, further comprising a retractable lens group positioned along the optical axis on which said lens group is positioned, in an operating state of the retractable lens, wherein at least said lens group and said retractable lens group are independently movable along the optical axis direction, and wherein said retractable lens group is configured to retract to a position outside the optical axis.

13. The retracting mechanism according to claim 12, further comprising a rear lens group positioned behind said retractable lens group in the operating state of the retractable lens, wherein said lens group, said retractable lens group and said rear lens group are positioned along the optical axis in the operating state of the retractable lens, and wherein said retractable lens group is configured to retract to said position outside the optical axis while said retractable lens retracts toward a rear of the optical axis direction, to a position radially outside of said rear lens group, when the retractable lens moves from said operating state to a retracted state.

14. The retractable mechanism according to claim 13, wherein said lens group and said retractable lens group are configured to move along the optical axis while changing space therebetween to perform a focal-length varying operation in said operating state of said retractable lens, and wherein said rear lens group is configured to move along the optical axis to perform a focusing operation in the operating state of the retractable lens.

15. A retracting mechanism of a retractable lens, comprising:

an external barrel movable in an optical axis direction;

an adjustment ring positioned in said external barrel and configured to be guided linearly in said optical axis direction without rotating;

a lens frame configured to hold a lens group, said lens frame configured to be screwed into said adjustment ring;

a fixing ring fixed to said external barrel and configured to prevent said adjustment ring coming off said external barrel;

at least one spring positioned between said fixing ring and said adjustment ring and configured to bias said adjustment ring rearward with respect to said external barrel; and at least one engaging projection on said adjustment ring, said at least one engaging projection configured to engage said fixing ring, and further configured to set a rear movement limit of said adjustment ring with respect to said external barrel, against a biasing force of said at least one spring.

* * * * *